US005586175A

United States Patent [19]

Hogan et al.

[11] Patent Number: 5,586,175

[45] Date of Patent: Dec. 17, 1996

[54] CALL-PROCESSING SYSTEM AND METHOD

[75] Inventors: Steven J. Hogan; Kristi T. Feltz; Douglas R. Murdock; Todd A. Goodman; David J. Vercande; Michael R. Tangeman; Eric M. Busch; Raghavan Kripakaran; Madhigubba G. Jayasimha; Keith E. Smith; Mark A. Austin; Dana B. Berry, all of Cedar Rapids, Iowa

[73] Assignee: LinkUSA Corporation, Cedar Rapids, Iowa

[21] Appl. No.: 460,633

[22] Filed: Jun. 2, 1995

Related U.S. Application Data

[62] Division of Ser. No. 136,211, Oct. 15, 1993.

[51] Int. Cl.[6] .................................................... H64B 13/00

[52] U.S. Cl. ............................ 379/112; 379/113; 379/196

[58] Field of Search .................................... 379/111, 112, 379/113, 114, 115, 121, 127, 189, 188, 91, 93, 186

[56] References Cited

U.S. PATENT DOCUMENTS 4,232,199 11/1980 Boatwright et al. .................. 179/18 B
4,577,061 3/1986 Katzeff et al. ....................... 179/2 AM (List continued on next page.)

FOREIGN PATENT DOCUMENTS

WO91/16779 10/1991 WIPO .

OTHER PUBLICATIONS

Weinstein, *Smart Credit Cards: The Answer To Cashless Shopping*, IEEE Spectrum, Feb., 1984, pp. 43–49.

Briere, *The Secret To Success With Virtual Nets*, Network World, Mar. 1992, pp. 1, 31, 41–43.

Joneleit, *Signaling System 7 Rescues Antiquated Billing System*, Telephony, Dec., 1991, pp. 32, 34, and 36.

Product Information Brochure: *Summa Architec Series Portico* (SDS Product Overview), Summa Four Inc., Mar. 1992, selected pages.

Product Information Brochure: The Open Architecture Network Interface, *Profit From Open Architecture*, SDS Series, Date Unknown.

Product Information Brochure: *DMS–250 Operator Services*, Northern Telecom, Sep., 1987.

*Primary Examiner*—Wellington Chin
*Assistant Examiner*—Paul Loomis
*Attorney, Agent, or Firm*—Sterne, Kessler, Goldstein & Fox P.L.L.C.

[57] ABSTRACT

A system and method for processing telephone calls and providing enhanced services is presented. The call processing system includes a network control processor for controlling the processing and routing of the calls and for providing enhanced features, and a matrix switch for routing calls from an originating location to a terminating location. Operator consoles can be included to provide operator assistance to the caller. The network control processor comprises a central message processor that receives call data, determines the type of call, determines the processing required, and determines whether operator assistance is required. A call route distributor allocates an operator console to the call if required. A billing server is used to track billing information for the call while it is in progress. A database server is provided for database look-ups and storage. The call processing system also includes a validation system, a billing system, a distribution system, and a fraud detection and prevention system. The validation system is used to validate call information to determine whether the call can be placed. The billing system determines rates for calls and calculates the cost of completed calls. The distribution system distributes changes that are made to a master database to the appropriate slave database. The fraud detection and prevention system monitors originating and in-process calls to detect and possibly prevent possible fraudulent uses of phone services and systems. A client interface is provided to facilitate communications among applications and DEF records are used to define specific call processing actions.

43 Claims, 209 Drawing Sheets

CALL PROCESSING SYSTEM AB102

U.S. PATENT DOCUMENTS 4,611,096 9/1986 Asmuth et al. .......... 179/18 B
4,625,081 11/1986 Lotito et al. .......... 379/88
4,685,127 8/1987 Miller et al. .......... 379/221
4,706,275 11/1987 Kamil .......... 379/144
4,782,519 11/1988 Patel et al. .......... 379/221
4,791,640 12/1988 Sand .......... 370/58
4,893,330 1/1990 Franco .......... 379/91
5,003,584 3/1991 Benyacar et al. .
5,068,891 11/1991 Marshall .......... 379/91
5,195,086 3/1993 Baumgartner et al. .......... 370/62
5,222,120 6/1993 McLeod et al. .......... 379/91
5,259,023 11/1993 Katz .......... 379/127
5,287,403 2/1994 Atkins et al. .
5,351,290 9/1994 Naeni et al. .......... 379/189 X
5,353,335 10/1994 D'Urso et al. .......... 379/115 X
5,365,580 11/1994 Morisaki .......... 379/188 X
5,402,474 3/1995 Miller et al. .......... 379/127 X

AUDIT TABLE HB126

| | | | | |
|---|---|---|---|---|
| SERVICE # HC104 | SERVER NAME HC108 | POINTER HC112 | ACTION HC116 | UPDATE FLAG HC120 |
| SERVICE # HC104 | SERVER NAME HC108 | POINTER HC112 | ACTION HC116 | UPDATE FLAG HC120 |
| SERVICE # HC104 | SERVER NAME HC108 | POINTER HC112 | ACTION HC116 | UPDATE FLAG HC120 |
| | | | | |

FIG 98

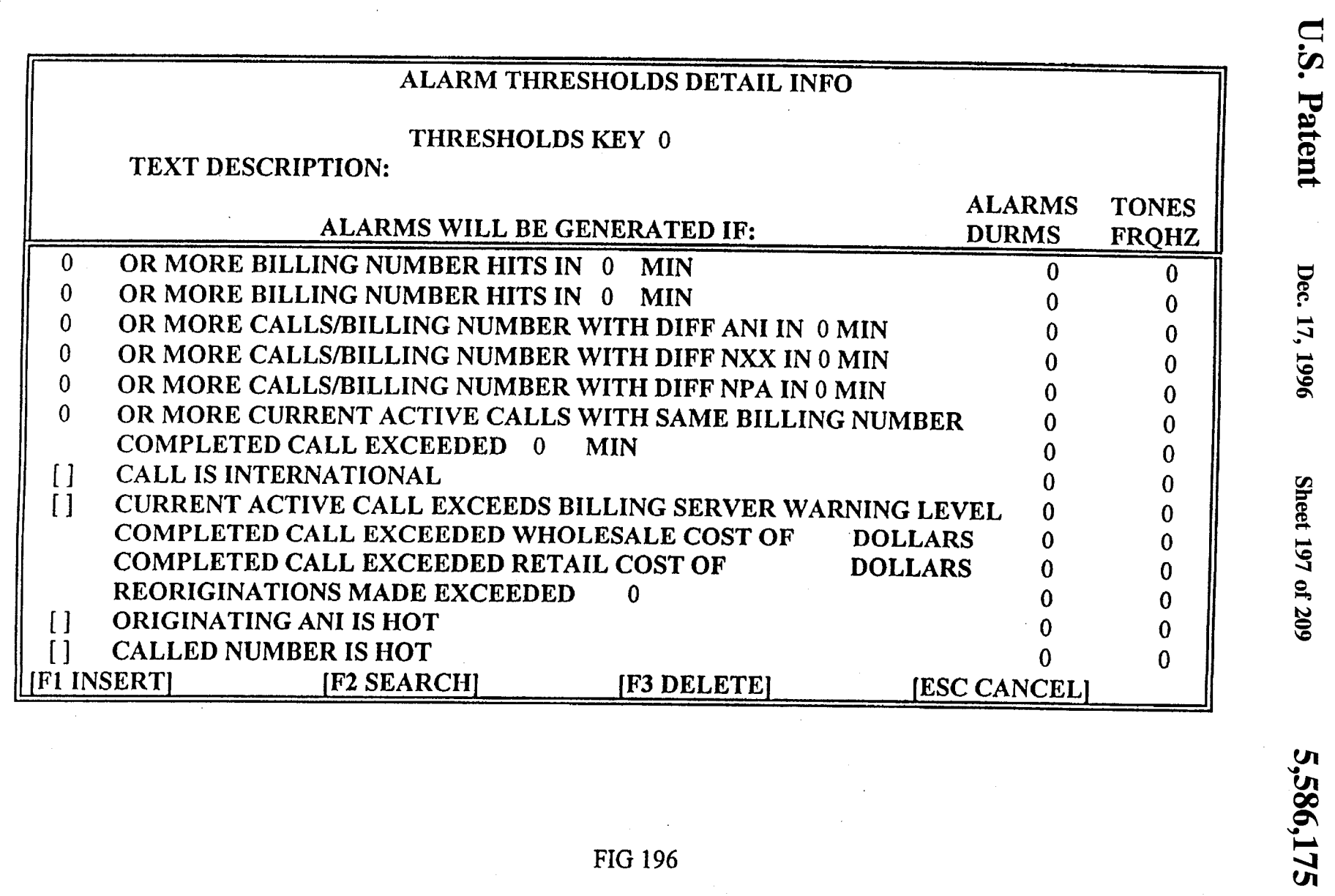

ALARM THRESHOLDS DETAIL INFO

THRESHOLDS KEY 0

TEXT DESCRIPTION:

| | ALARMS WILL BE GENERATED IF: | ALARMS DURMS | TONES FRQHZ |
|---|---|---|---|
| 0 | OR MORE BILLING NUMBER HITS IN 0 MIN | 0 | 0 |
| 0 | OR MORE BILLING NUMBER HITS IN 0 MIN | 0 | 0 |
| 0 | OR MORE CALLS/BILLING NUMBER WITH DIFF ANI IN 0 MIN | 0 | 0 |
| 0 | OR MORE CALLS/BILLING NUMBER WITH DIFF NXX IN 0 MIN | 0 | 0 |
| 0 | OR MORE CALLS/BILLING NUMBER WITH DIFF NPA IN 0 MIN | 0 | 0 |
| 0 | OR MORE CURRENT ACTIVE CALLS WITH SAME BILLING NUMBER | 0 | 0 |
| | COMPLETED CALL EXCEEDED 0 MIN | 0 | 0 |
| [ ] | CALL IS INTERNATIONAL | 0 | 0 |
| [ ] | CURRENT ACTIVE CALL EXCEEDS BILLING SERVER WARNING LEVEL | 0 | 0 |
| | COMPLETED CALL EXCEEDED WHOLESALE COST OF DOLLARS | 0 | 0 |
| | COMPLETED CALL EXCEEDED RETAIL COST OF DOLLARS | 0 | 0 |
| | REORIGINATIONS MADE EXCEEDED 0 | 0 | 0 |
| [ ] | ORIGINATING ANI IS HOT | 0 | 0 |
| [ ] | CALLED NUMBER IS HOT | 0 | 0 |

[F1 INSERT] [F2 SEARCH] [F3 DELETE] [ESC CANCEL]

FIG 196

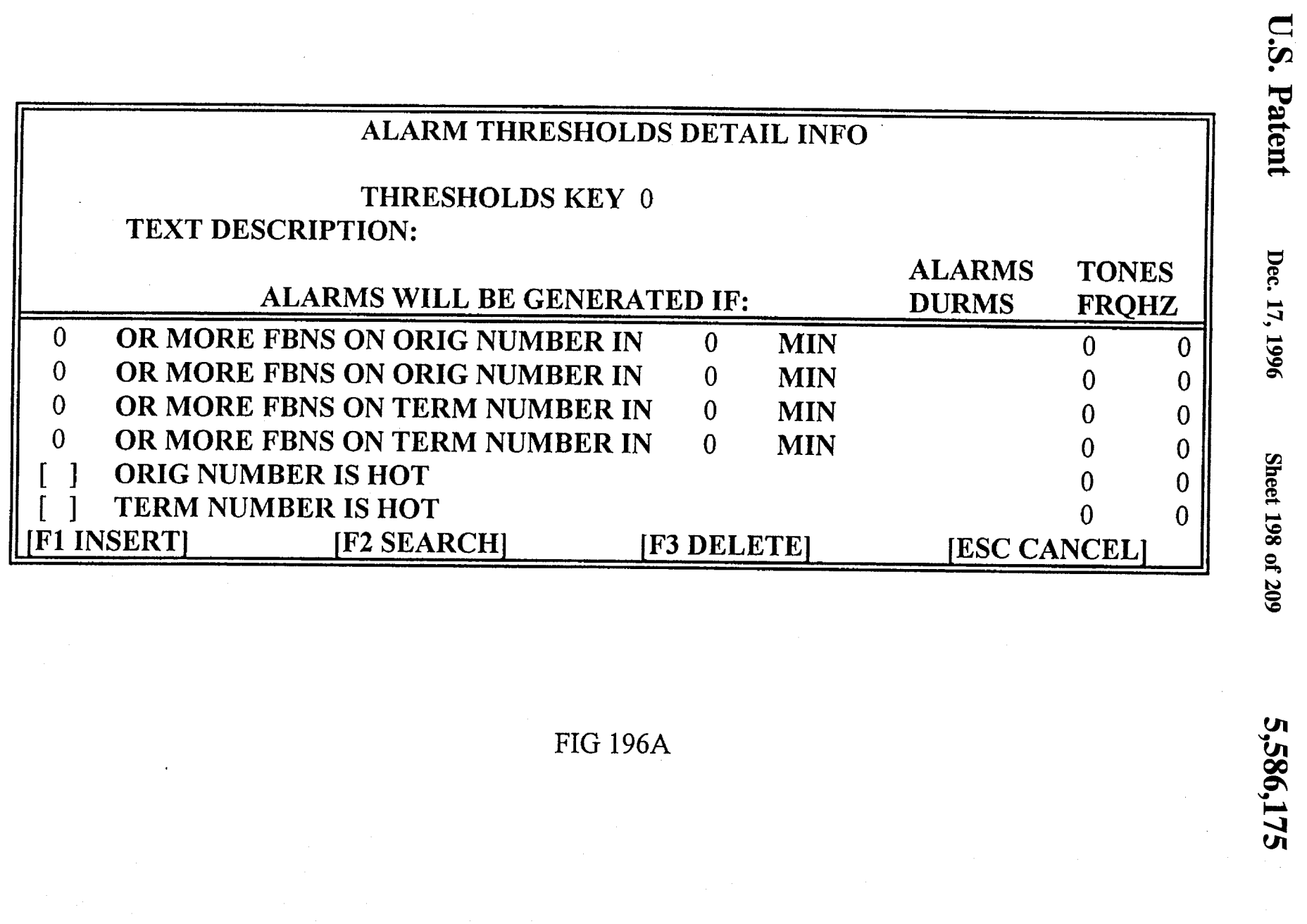

ALARM THRESHOLDS DETAIL INFO

THRESHOLDS KEY 0

TEXT DESCRIPTION:

ALARMS WILL BE GENERATED IF:

| | | | | ALARMS DURMS | TONES FRQHZ |
|---|---|---|---|---|---|
| 0 | OR MORE FBNS ON ORIG NUMBER IN | 0 | MIN | 0 | 0 |
| 0 | OR MORE FBNS ON ORIG NUMBER IN | 0 | MIN | 0 | 0 |
| 0 | OR MORE FBNS ON TERM NUMBER IN | 0 | MIN | 0 | 0 |
| 0 | OR MORE FBNS ON TERM NUMBER IN | 0 | MIN | 0 | 0 |
| [ ] | ORIG NUMBER IS HOT | | | 0 | 0 |
| [ ] | TERM NUMBER IS HOT | | | 0 | 0 |

[F1 INSERT] [F2 SEARCH] [F3 DELETE] [ESC CANCEL]

FIG 196A

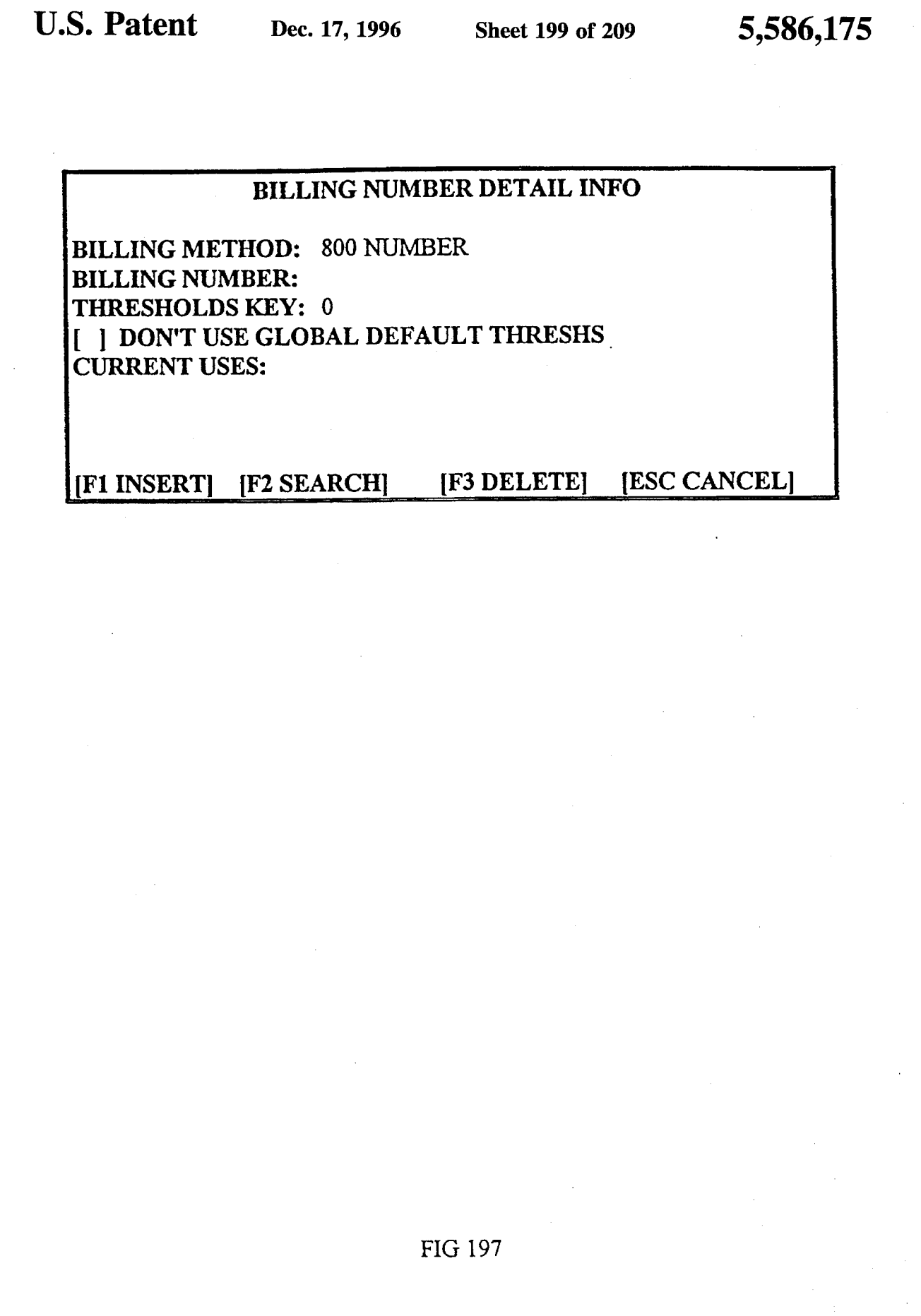

BILLING NUMBER DETAIL INFO

BILLING METHOD: 800 NUMBER
BILLING NUMBER:
THRESHOLDS KEY: 0
[ ] DON'T USE GLOBAL DEFAULT THRESHS
CURRENT USES:

[F1 INSERT] [F2 SEARCH] [F3 DELETE] [ESC CANCEL]

FIG 197

[F1] SEARCH BIRS FROM TIME 06/15/93 15:00:00
[F2] SEARCH BIRS FROM BIRID 0

BIRID LINK CONNECT TIME

[ESC CANCEL]

FIG 198

| ALARMS SEARCH FROM 06/14/93 00:00:00 | | | |
|---|---|---|---|
| ALARM TYPE | TIME | BILLNUM TYPE | BILLING NUMBER |
| | | | |
| [F2 SEARCH] [ESC CANCEL] | | | |

FIG 199

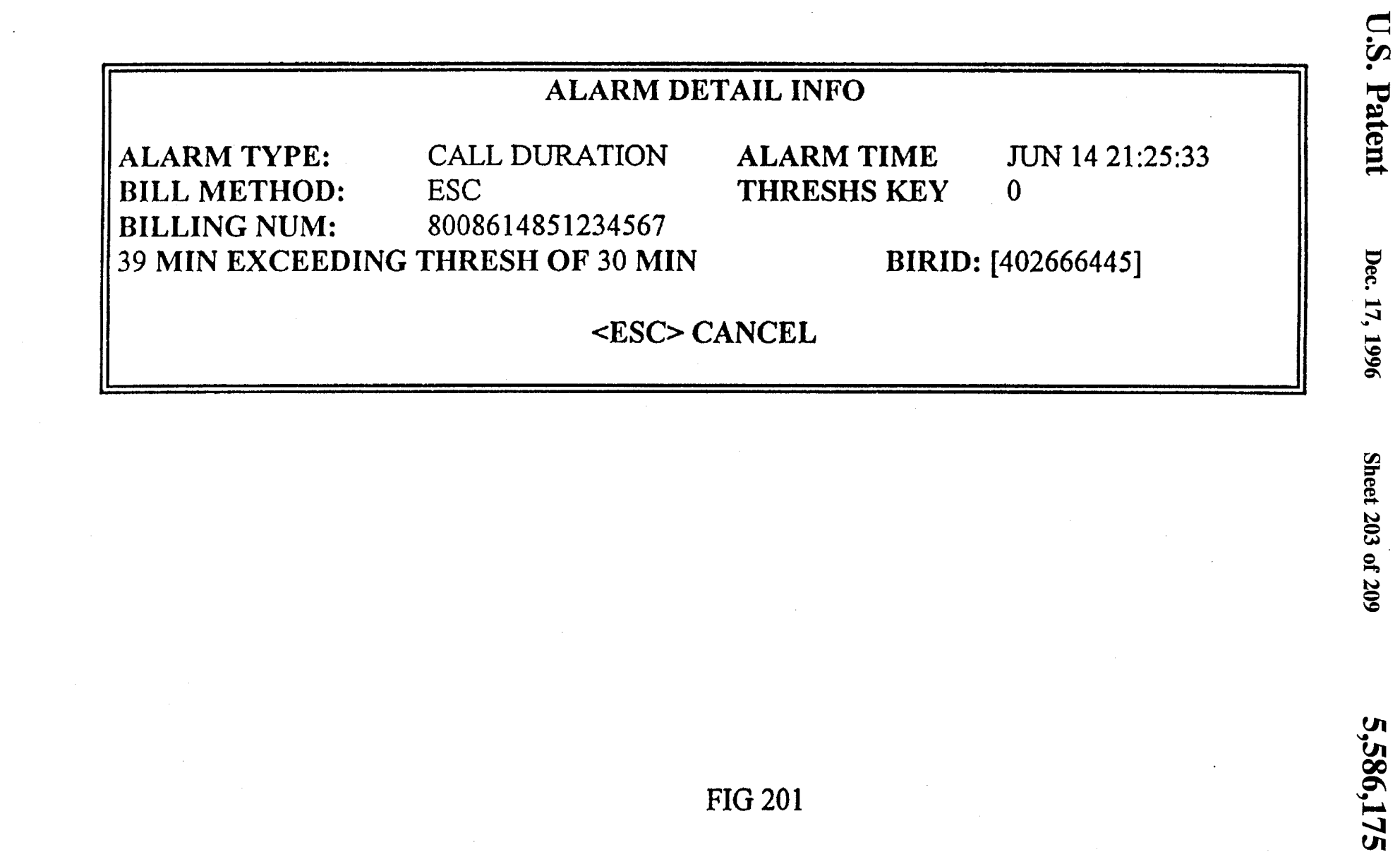

ALARM DETAIL INFO

| | | | |
|---|---|---|---|
| ALARM TYPE: | CALL DURATION | ALARM TIME | JUN 14 21:25:33 |
| BILL METHOD: | ESC | THRESHS KEY | 0 |
| BILLING NUM: | 8008614851234567 | | |

39 MIN EXCEEDING THRESH OF 30 MIN BIRID: [402666445]

<ESC> CANCEL

FIG 201

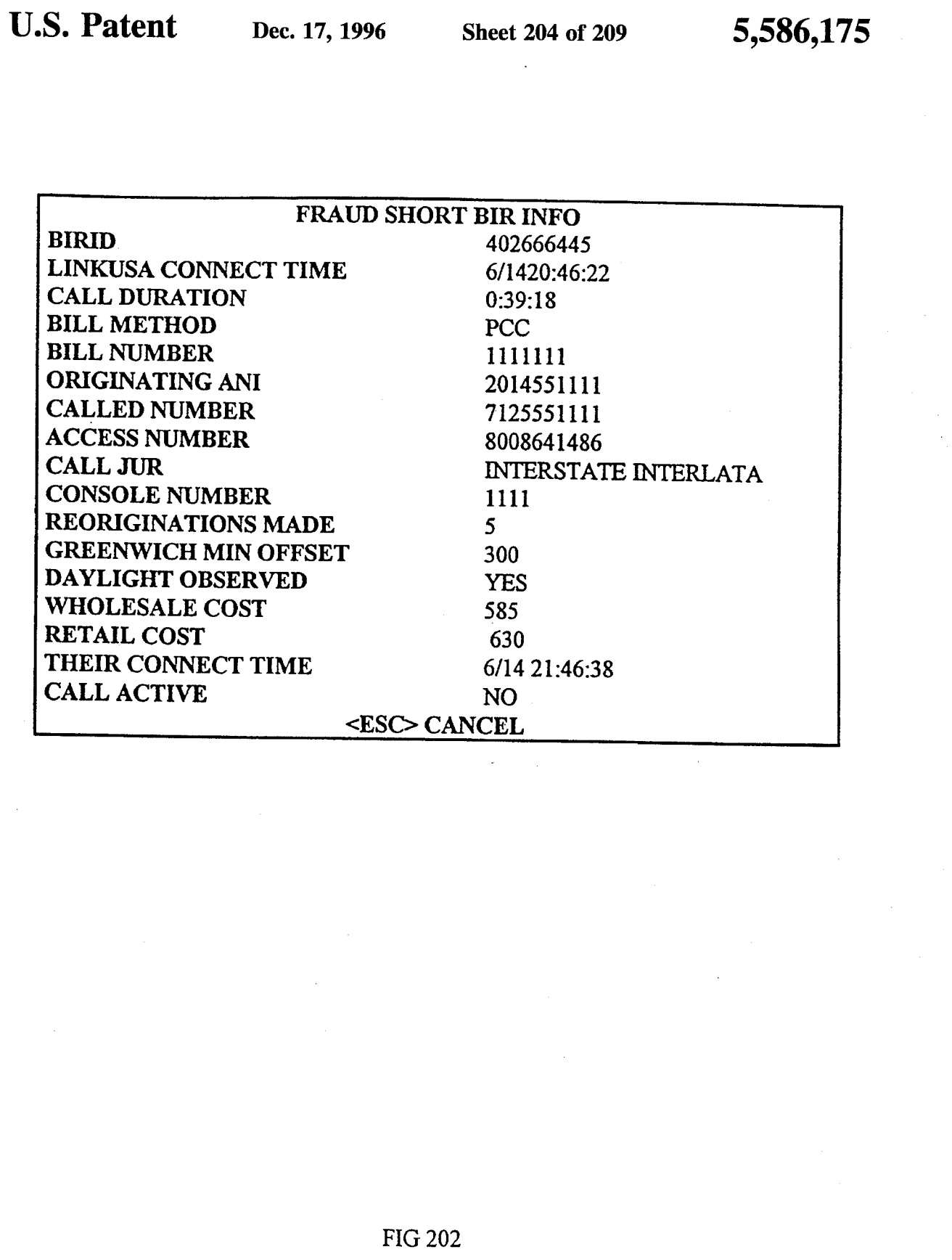

| FRAUD SHORT BIR INFO | |
|---|---|
| BIRID | 402666445 |
| LINKUSA CONNECT TIME | 6/1420:46:22 |
| CALL DURATION | 0:39:18 |
| BILL METHOD | PCC |
| BILL NUMBER | 1111111 |
| ORIGINATING ANI | 2014551111 |
| CALLED NUMBER | 7125551111 |
| ACCESS NUMBER | 8008641486 |
| CALL JUR | INTERSTATE INTERLATA |
| CONSOLE NUMBER | 1111 |
| REORIGINATIONS MADE | 5 |
| GREENWICH MIN OFFSET | 300 |
| DAYLIGHT OBSERVED | YES |
| WHOLESALE COST | 585 |
| RETAIL COST | 630 |
| THEIR CONNECT TIME | 6/14 21:46:38 |
| CALL ACTIVE | NO |
| <ESC> CANCEL | |

FIG 202

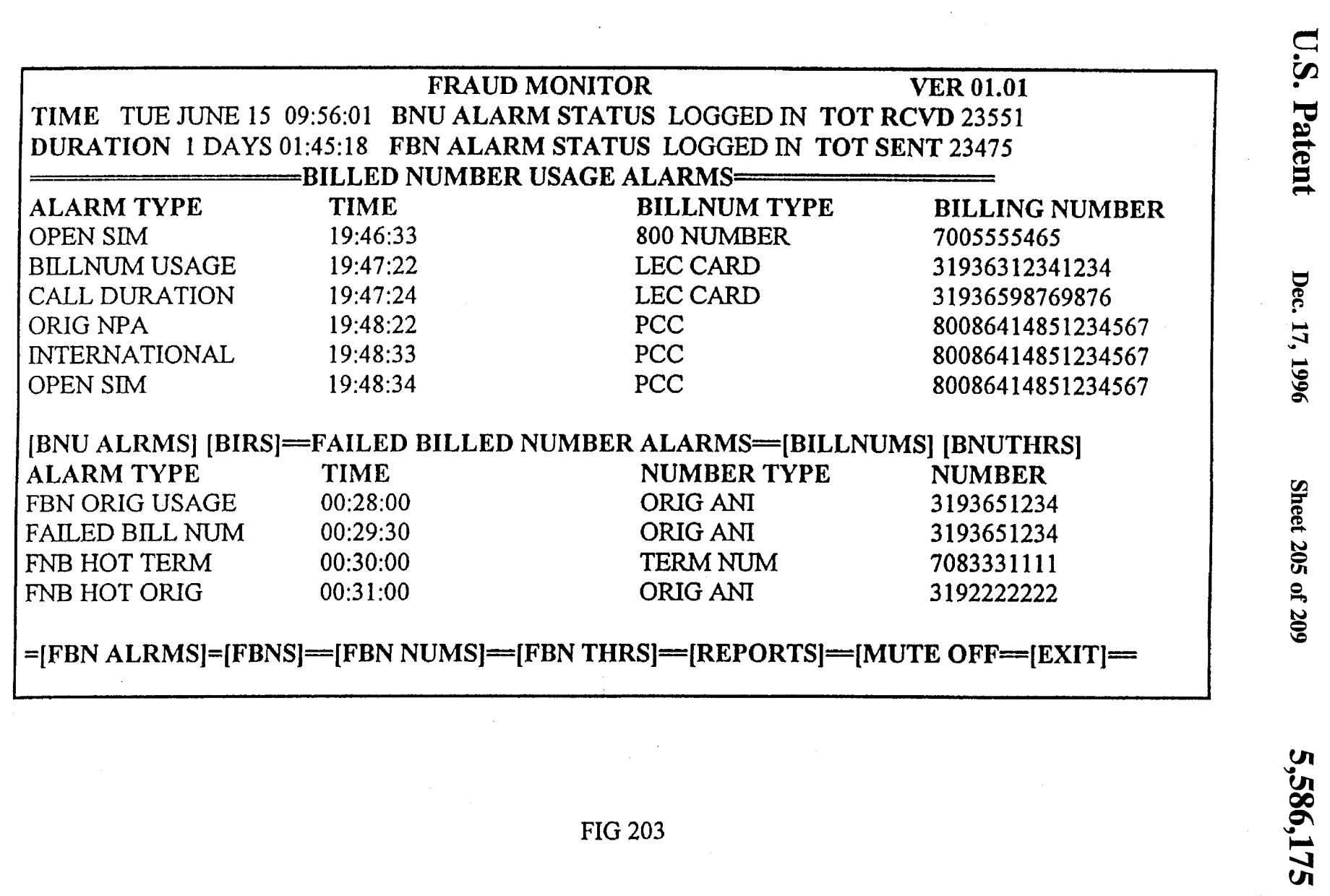

FRAUD MONITOR VER 01.01

TIME TUE JUNE 15 09:56:01 BNU ALARM STATUS LOGGED IN TOT RCVD 23551

DURATION 1 DAYS 01:45:18 FBN ALARM STATUS LOGGED IN TOT SENT 23475

================BILLED NUMBER USAGE ALARMS================

| ALARM TYPE | TIME | BILLNUM TYPE | BILLING NUMBER |
|---|---|---|---|
| OPEN SIM | 19:46:33 | 800 NUMBER | 7005555465 |
| BILLNUM USAGE | 19:47:22 | LEC CARD | 31936312341234 |
| CALL DURATION | 19:47:24 | LEC CARD | 31936598769876 |
| ORIG NPA | 19:48:22 | PCC | 80086414851234567 |
| INTERNATIONAL | 19:48:33 | PCC | 80086414851234567 |
| OPEN SIM | 19:48:34 | PCC | 80086414851234567 |

[BNU ALRMS] [BIRS]==FAILED BILLED NUMBER ALARMS==[BILLNUMS] [BNUTHRS]

| ALARM TYPE | TIME | NUMBER TYPE | NUMBER |
|---|---|---|---|
| FBN ORIG USAGE | 00:28:00 | ORIG ANI | 3193651234 |
| FAILED BILL NUM | 00:29:30 | ORIG ANI | 3193651234 |
| FNB HOT TERM | 00:30:00 | TERM NUM | 7083331111 |
| FNB HOT ORIG | 00:31:00 | ORIG ANI | 3192222222 |

=[FBN ALRMS]=[FBNS]==[FBN NUMS]==[FBN THRS]==[REPORTS]==[MUTE OFF==[EXIT]==

FIG 203

CALL-PROCESSING SYSTEM AND METHOD

This application is a division of application Ser. No. 08/136,211, filed Oct. 15, 1993, (status: pending).

BACKGROUND OF THE INVENTION

1. Field of the Invention

The present invention relates generally to systems and methods used in processing telephone calls, and more particularly, to systems and methods for allowing telephone carriers to offer enhanced products and services to their subscribers.

2. Related Art

Deregulation of the long-distance telephone industry spawned the growth of numerous long-distance service providers, each vying for a share of the United States' long-distance market. Thus far, the U.S. industry is dominated by three large companies: AT&T, MCI and Sprint. These large carriers have the resources and capital at their disposal to enable them to develop and provide a wide range of telephone-related services to their customers.

Perhaps less known, but still extremely important in the more than $50 billion interexchange U.S. long-distance market, are the smaller companies. In 1991, AT&T, MCI and Sprint controlled approximately 85 percent of the U.S. market. At this time, 12 medium-sized companies shared eight percent of the U.S. market. The remaining seven percent of the U.S. market was divided among nearly 320 small carriers.

The larger carriers are able to attract customers by offering a full range of services in addition to direct dial calling. These services include, but are not limited to: operator-assisted calling, full-feature calling cards, and specialized 800 number routing.

The strategy followed by the smaller carriers in attracting customers has been to offer excellent service and low-cost, direct-dial long-distance calling (e.g. 1+ calling). Many smaller carriers, for example, focus on a particular geographic market. By understanding the market's calling patterns, the smaller carrier can maximize crucial economies and can attract subscribers by offering long-distance calling at rates lower than those offered by larger carriers.

Additionally, many smaller carriers use the fact that they are a small, local business in order to attract other local businesses as their clients. These carriers stress the ability to offer more personalized, responsive attention than some larger carriers may provide.

However, many of the smaller carriers are finding it increasingly difficult to compete with the larger carriers by offering direct-dial calling alone. For these carriers to attract and retain customers, they need the ability to offer the same range of features and services provided by some of the larger carriers. For example, a small carrier may have a small travel agency as a long-distance subscriber. As the travel agency grows, develops more business, and hires additional salespersons, the travel agency's telephone services requirements also grow. The travel agency may want to offer calling cards to its salespersons who travel frequently. The travel agency may also want the ability to re-route an incoming call that was made to their 800 number. Such re-routing allows the travel agency to re-route incoming 800-number calls to any telephone number, a voice mailbox, or a pager. Additionally, the travel agency may want the ability for its office workers, clients and vendors to make operator-assisted calls.

Unfortunately, most smaller carriers can only provide direct-dial long distance service to its customers. If a smaller carrier wants to offer enhanced products to its customers, the smaller carrier has two choices. First, the smaller carrier may purchase its own telephone switching system and operator consoles. Second, the smaller carrier may purchase and resell the products of one of its larger competitors.

However, reliable, affordable, and scalable switching equipment is not commercially available. If a long-distance carrier wants to purchase its own equipment, the selection is limited to the large-scale complex switching systems that are currently available. Because these systems are costly, in most instances, the smaller carrier is forced to go through a larger carrier to obtain enhanced products.

Several problems arise out of the inability of smaller carriers to provide enhanced calling services. Four of these problems are now described.

First, the flexibility and customization options available to the smaller carriers in providing services are limited when they resell the products of their larger competitors. One reason for this is that those products were not designed with the smaller carriers' needs in mind. For example, consider a smaller carrier that wants to offer a product like 800 number forwarding to its customers. The smaller carrier will want its customers to hear customized user prompts, including the identification of the carrier. The smaller carrier will also want to establish its own prices for the service. To further customize its systems, the carrier may want to change the way the call processes, or to add additional features such as the ability to route an 800 number to a voice mailbox.

In another example, the smaller carrier is unable to provide carrier-unique operator services. The cost of providing operator services prohibits most smaller carriers from hiring their own operators and purchasing the required equipment. Instead, smaller carriers typically purchase operator services from a competitor carrier or from operator service providers.

One drawback of having to use a competitor's operators is the inability to custom brand the call. For example, when a customer of the smaller carrier places an operator-assisted call using a competitor carrier's operators, she hears the operator of the competitor carrier thank her for using the competitor carrier's services.

Another drawback of having to use another's operators is the inability to custom-tailor call processing because the operator services provided and the operator responses cannot be customized. The smaller carrier has no control over the operators used by the competitor carrier or the operator service provider.

Relying on larger carriers for providing these enhanced products does not give smaller carriers the flexibility they desire. This is because smaller carriers cannot customize the products they obtain from the larger carriers to provide unique services to their subscribers.

A second problem is the range of services that can be provided by a smaller carrier is limited to the services that carrier can purchase from its competitors. As a result, the smaller carrier often cannot create innovative new products and services to offer its customers.

An additional problem is that the amount of fraudulent calling considered acceptable, and therefore not monitored or halted by a larger carrier, may be well above a level that is economically tolerable for the smaller carrier.

Another problem is the smaller carrier's inability to get customized fulfillment material through a competitor carrier.

For example, calling cards provided by a larger competitor carrier, in turn to be provided to the smaller carrier's customers, often bear the name of the competitor carrier.

In summary, because the small carriers must rely on the larger competitor carriers for advanced products and services such as calling cards, operator assistance, 800 service, audiotext, voice mail, and the like, the smaller carriers cannot offer a full range of carrier-unique and customer-unique products. As a result, the smaller carriers lose part of their ability to compete in the U.S. long-distance market.

The problems of flexible control of a telephone network are not limited to the smaller carriers or the long-distance industry. All telephone carriers would benefit from the ability to offer popular, customized, value-added services. Commercially available hardware and conventional solutions to date, however, do not offer this ability.

SUMMARY OF THE INVENTION

The present invention is directed to a call processing system and method which provides a wide range of enhanced calling products and features to subscribers. The subscribers can include individual users as well as customers who, in turn, provide telephone service to their own clients (also called "users"). These customers can include telephone carriers whose clients are subscribers of the carriers' network and can also include other types of businesses.

The call processing system is implemented in such a way that customer-unique and user-unique customized products and features can be provided. The features, products and services provided can be extensively customized to provide system flexibility and to offer users the option of choosing the level and types of features, products and services they receive. Customization can also be provided at the business- or carrier-customer level so that these customers can choose the level and types of features, products and services they wish to make available to their clients.

The call processing system includes at least one network control processor (NCP) and at least one switch (for example, a matrix switch). The network control processor (NCP) is a unique combination of hardware and software configured to determine the type of call being placed, the type of handling to be provided to the call, and to control the routing of the call. Because the NCP makes call handling and routing determinations regarding each call received, the switch implemented can be a passive switch that simply responds to routing instructions received from the NCP. Thus, control of the call is maintained by the NCP.

One feature of the invention is that it provides call data associated with a call is provided to the NCP to enable the NCP to make call processing determinations. The call data can include information such as the originating (caller's) phone number (the ANI), the called phone number, originating and terminating area codes, customer identification codes, and other like information. The NCP uses this call data to make determinations regarding the manner in which each individual call is to be handled and to instruct the switch on how to route the call.

According to this philosophy, only the audio portion of the call is routed to the switch. The call data is not routed to the switch. Therefore, all call processing and handling determinations are made by the NCP and the switch can be implemented as a passive device.

The call processing system can also include one or more operator consoles to provide operator assistance to callers. The operator consoles provided can be manual operator consoles (MOCs) staffed by human operators to provide a human operator interface to callers. Alternately the operator consoles can be automated voice response units (VRUs) that provide automated assistance to callers. Additionally, a customer service console (CSC) can be used to provide derailed customer assistance to subscribers.

When a call is received by the call processing system, the call data is routed to the NCP and the call audio to the switch. The NCP begins handling the call while the audio circuit is held at the switch. The NCP first assigns a callhandle to the call; this is a unique identifier that can be used to identify both the call and call handling operations performed in conjunction with the call.

Once a callhandle is assigned, the NCP determines the type of handling and/or processing the call requires. In one embodiment, this is accomplished by retrieving call parameters for the call. The call parameters indicate the type of call being placed, whether and what type of operator assistance is required, and other processing required for the call. The call parameters are contained in a data record that is retrieved based on the call data. The NCP uses the call data for each call to look up a data record that contains the call parameters for that call. Because different data records can be maintained for different combinations of call data, unique or custom call handling and/or processing can be defined down to the customer and/or user level.

The call parameters include information on how the call is to be processed in the call processing system. The call parameters include what are termed a "DEF Record Number" and a "Base Process Number" that point to a series of data records chained together to define the call processing required for the call. These records are termed "DEF Records." DEF records are described in more detail below.

The call parameters also include information regarding whether operator assistance is required to handle the call. If operator assistance is required, call parameters include a device type list that indicates the type of operator assistance required. This list can specify whether a MOC, VRU, or CSC can be used to handle the call. Because call parameters can be uniquely defined for each customer and/or user, the operator services provided can be customized down to the same level, if desired. Thus, a particular caller can be defined as always receiving operator assistance from a human operator, or a particular call type (such as a calling card call) can always be designated to receive automated VRU handling initially. The device type list can also indicate that a less complex device, such as a recorded message playback device is required.

Call parameters can provide further specificity in the type of operator assistance required. For example, the call parameters can include a language type that indicates the particular call requires operator assistance in a specific language. When the NCP retrieves call parameters that indicate a specific language is required, the call is routed to an operator console that can provide assistance in that language. For example, when a call is received from a specific originating number, the call parameters retrieved for that number may indicate that Spanish-language operator assistance is desired. Again, as with the other call parameters, the determination is made based on call data associated with the call. Thus, the language provided to handle each call can be customized at the user and/or customer level.

If operator assistance is required, the NCP allocates an operator console to handle the call. The allocation is made based on the call parameters retrieved for the call. For example, if a device type list indicates that a MOC is desired, the call is routed to an available MOC. If no MOC is currently available, the call can be placed on a queue. Music and/or other messages can be provided to the caller while the call is queued. A status display provides a visual indication of the number of calls in the queue.

So that the correct device type can be allocated to handle a given call, the NCP maintains a list of consoles available to handle calls and those consoles currently handling calls. The list can include information about each console pertaining to the type of console, the languages that console can support, and other pertinent information. Thus, if a French-speaking human operator is required, the NCP checks the list to see if a MOC with a French-speaking operator is currently available. If available, that console is allocated to handle the call. If unavailable, the call is queued.

Once a console is allocated to handle a call, the NCP instructs the switch to route the call audio to the allocated console. Because the switch is routing only the call audio (and is not handling call data), the consoles can be treated as any other terminating point on the switch. Thus specific, or dedicated, operator console ports are not required on the switch.

The NCP also sends operator control data to the allocated operator console, informing the allocated console that a call is being routed to it. Included with the operator control data is the base process number, a DEF record number and other call information from the call data.

When the call audio is routed to the operator console, the operator requests information from the caller. A script is displayed on a screen on the operator console for the human operator to read. For an automated VRU, the script is a recorded or synthesized voice that prompts the caller for information. The particular script to be read or played is retrieved from a database by the operator console when processing the call. One manner in which this can be accomplished is through the use of DEF records as discussed below.

The caller responds with the requested information. This information could be verbally provided to a human operator, who then enters it into the system via the operator console, or could be a sequence of one or more keys pressed on the telephone keypad. The information requested of the caller can include: the number to be called (if not originally entered on a 0-call); billing information such as a calling card number, enhanced services card number, credit card number, debit card number, or telephone number to be billed; a feature identification (for example 2# for speed-dial); a security code; and other like information.

The information entered is validated to ensure that it is correct and that the call can be completed. One method of performing validations is to do an internal validation. For example, the called number is validated to ensure that it is the correct number of digits or terminating number is validated to ensure that the call is being placed to an area that is within that caller's allowed calling area (if restricted).

Alternatively, a validation system, which is part of the call processing system, could be used to validate other information required to complete the call. Billing information can be validated to ensure that the method of billing is acceptable. Credit card numbers can be checked through validation service providers and debit cards can be checked to determine whether the balance is sufficient to place the call. Security codes can be checked against the feature to be accessed, the originating number, the billing information, or other parameters screened through the use of the security codes.

If the information entered is invalid, the caller may be given a second chance to re-enter the correct information, or alternatively, the call may be terminated. If the call is being handled by a VRU, the VRU may transfer the call to a human operator to provide additional assistance. The number of chances provided to a caller who enters incorrect information, whether and when the call is transferred to a human operator, and when the call is terminated due to invalid information is customizable to the customer and user, as parameters in the DEF record.

If the information is valid, the operator console sends data to the NCP indicating that the call can be routed to the terminating (called) number. The NCP performs a number translation, where required, to determine the proper routing for the call. Once the routing is determined, the NCP generates instructions to command the switch to route the call to the destination. In one embodiment, the switch instructions are packetized for transmission via a LAN. A gateway removes the instructions from the LAN packet(s) and formats them into a form that is recognized by the switch (SS#7). The NCP also releases the operator console from the call so that it is free to handle another call.

The switch routes the call to the destination via a telephone network based on the instructions received from the NCP. Standard telephony signalling can be used to complete the call to the called number. This includes call accept messages (for example, ACMs) and answer messages (for example, ANMs).

If the call does not require operator assistance, the operator allocation steps and the operator handling steps described above can be bypassed. In this case, the called number can be validated to determine whether the call can be completed. This can include validations to determine whether the call is to an acceptable calling area and whether the called number contains the correct number of digits.

The validation system can be used to validate billing information, and information i.e., whether a credit card number is valid for credit card calls.

When an operator console wishes to validate call information prior to the completion of a call, it sends a validation request to the validation system. The validation request includes an index and call data or other information to be validated. When the validation system receives the request to perform a validation, it retrieves validation instructions, termed "p-code,", from a database. These instructions contain the process to be followed in validating the information. In one embodiment, the index provided with the validation request indicates the specific p-code instruction to retrieve for that validation. The operator console requesting the validation determines the index and provides it with the request. In one embodiment, the index is defined based on the call type. Thus, for each call of the same type (i.e. for each calling card call, or for each credit card call, etc.), the index points to the same p-code instruction. In alternative embodiments, the index can be uniquely defined at the user and/or customer level to customize the validation process at this level.

The retrieved p-code instruction provides information to the validation system regarding validation of the call. For example, the p-code instructions may tell the validation system that it must first look for the originating number (ANI) in a hot/cold database. If the number appears as a "hot" number, the validation fails and the call should not be completed for that number. An example of when this occurs is when an originating number is used to place fraudulent calls. This number can be put in the hot file to stop toll calls from being placed from that number. If the number appears as a "cold" number, that call is to be completed without further validation. This could be used for calls originating from a number where time is of the essence.

The p-code may then instruct the validation system to validate the call against a validation index file. In this validation step, the call data (for example called number, originating number, originating area code, etc) is validated against various parameters to determine whether the call should be blocked. If the call is blocked, a response is sent to the console indicating that the call cannot be completed.

The p-code may also instruct the validation system to perform an external validation. One example of where this is useful is where a credit card number is to be validated via an external credit card validation service. In this step, the outside source is contacted via modem or other datalink and provided with the information to be validated. The outside source performs the validation and responds with a positive or negative response. If the information is invalid, a response is sent to the console indicating that the call cannot be completed.

A key feature provided by this architecture is that changes to the validation process can be made quickly and easily by simply updating p-code in the database. Operational code of the validation system does not have to be recompiled to implement changes to the validation process.

The call processing system also can include a billing system for determining the rates for calls and services, determining the costs for calls and services, and for generating bills to bill subscribers of the call processing system. The billing system includes a rating system, a rate file, and a toll file.

The billing system can provide rate quotes for a call that tell the requestor how much a call will cost. This feature can also be used by the call processing system to determine when the dollar amount left on a user's debit card is going to be depleted. In one embodiment, when a user places a debit card call, the operator console requests a rate quote from the billing system. The billing system looks up the rate for the call in the rate file. The rate can be based on the time of day, the distance over which the call is placed and the particular customer or user placing the call.

The billing system provides the quote to the operator console and to the NCP. The NCP retrieves information indicating the remaining dollar amount on the credit card. The NCP then computes the amount of time that is remaining on the card based on the rate quote for the call and the remaining dollar amount. When the remaining time is about to expire, the user is provided with a warning indicating how much time is left. When the time expires, the call can be terminated or the user given options to replenish the debit card.

When a call is received by the call processing system for routing, a billing information record (BIR) is generated for the call. Among other information, the BIR is updated with timing information such as when the call is completed to a VRU or to an operator console or when it is terminated. When the call is completed, the BIR is sent to the billing system so the cost of the call can be calculated. The billing system uses the time information to compute wholesale and retail call durations. The billing system uses other information contained in or derived from the BIR such as time of day and distance of the call to retrieve a rate for the call. The billing system calculates a cost for the call (wholesale and/or retail) using the appropriate rate and the call duration. If required, a tax for the call is computed and added to the cost of the call. The cost information is stored in a toll file from which bills can be generated and sent to the appropriate subscriber.

According to one embodiment of the present invention, call processing is performed using what are known as DEF records. The call parameters determined by the NCP when a call is received include information pertaining to a DEF record and a base process for processing the call. This information is provided to the operator console in the form of a base process number and a DEF record number. In processing the call, the operator console starts the base process identified by the NCP. The base process is the basic process that is to be followed by the operator console in handling the call. It can include the basic steps to be followed by the operator console and can be coded to look for specific data (identified by tag numbers) in a DEF record, respond to certain types of information contained within the DEF record, or wait for and respond to information received from the caller.

The base process is started by the operator console. The base process indicates the data (using tag numbers) to be retrieved from the identified DEF record, and the order in which it is to be retrieved. This data contains information regarding steps to be performed in processing the call. The data may indicate that certain scripts are to be played (or synthesized or read) to the caller, that certain validations are to be performed, or other processes started. The data may also indicate the actions that are to be taken in response to key entries made by the caller. When the base process is finished, it runs a finish process. The finish process may point to another process to be run or it may point to a complete process used to complete the call.

Because call processing is controlled using data records, one advantage of using DEF records is that changes to the manner in which calls are processed can be implemented by changing the data in the data records. An additional advantage is that call processing can be customized for a specific user or customer. Because the particular DEF record chosen for call processing (initially) is selected based on call data, changes to the DEF record selected can result in changes to the way the call is processed. Thus, one DEF record may indicate that a certain script is to be played or that certain information is to be validated or that key sequences input by a user are to be responded to in a certain way. Other DEF records may indicate other operations to perform or other ways to respond to user input when processing a call. Thus, it is the DEF record that defines how a call is to be handled.

Changes to the data in databases of the call processing system can be made using a distribution system. For redundancy, certain databases are mirrored to provide a high degree of fault tolerance. To maintain integrity of all databases, changes to any of the master databases must be made to all affected slave databases as well. To accomplish this, the call processing system uses a distribution system, which captures the changes made to tables in the master database and updates the affected slave databases with these changes.

A trigger captures changes made to the master database and stores these changes in a delta table. A distribution server retrieves these changes and creates a net message table indicating the changes to be made and an audit table indicating the slave databases affected by each change. The distribution system then updates the affected slave databases using the messages in the net message table.

One advantage of the distribution system is that triggers are used to simplify the operations performed and to ensure the integrity of slave databases throughout the entire call processing system. A trigger is called each time a change is made to the master database. The distribution system is transparent to the application making changes to master database. The application making the changes to master database is not involved with the process of modifying the slave databases with the same changes.

The use of a delta table is another advantage of the distribution system. Through the use of the delta table, only the data that is needed to update slave databases is provided to the distributor. The changes are then read from the delta table to be applied to the appropriate slave databases. This method allows the application performing the change to the master database to continue performing any other activities required, while the distribution system makes the changes to the appropriate slave databases.

Still another advantage of the distribution system is that it does not require that updates to all databases be simultaneous. This feature allows slave databases to be updated at their own pace. If any one of the affected slave databases is down, the changes are queued until that database is ready to receive them.

The call processing system can also provide real-time monitoring, detection, and prevention of fraudulent uses of the system. This functionality is provided by a fraud system. The fraud system handles and detects fraud in both calls that successfully complete (go through), and calls that fail. The fraud system is an integrated system that monitors manual operator consoles, automated VRU consoles, as well as the NCP and the billing system. Specific fraud consoles are provided to fraud administrators assigned to the task of fraud detection and prevention. These individuals can monitor the operation of any call in the system in real time and can take any necessary actions for fraud detection and prevention. Automatic database storage of critical data associated with detection and prevention is provided. Alarm levels can be set so that when data exceeds specified limits, an alarm is triggered to a fraud administrator. The architecture of the system allows for specific fraud scenarios to be detected and prevented. The present invention is robust enough to accommodate additional fraud scenarios in the future.

Further features and advantages of the present invention, as well as the structure and operation of various embodiments of the present invention, are described in detail below with reference to the accompanying drawings.

BRIEF DESCRIPTION OF THE DRAWINGS

The present invention is described herein with reference to the accompanying drawings. In the drawings, like reference numbers indicate identical or functionally similar elements. Additionally, the first three characters of each reference number identifies the drawing in which the reference number first appears as per the table attached to the document as Appendix 1.

FIG. 7 is a high-level operational flow diagram illustrating the process that the call the processing system uses to process operator-assisted calls according to one embodiment of the invention.

FIG. 8, which is a continuation of FIG. 7, illustrates a high-level operational flow of the process that the call processing system uses to process operator-assisted calls according to one embodiment of the invention.

FIG. 12 is an operational flow diagram illustrating the steps followed by the network call processor in handling a call requiring operator assistance according to one embodiment of the invention.

FIG. 13, which is a continuation of FIG. 12, is an operational flow diagram that illustrates the steps involved in handling the call requiring operator assistance according to one embodiment of the invention.

FIG. 16 is a data flow diagram illustrating the data flows that occur within and external to the network control processor when a calling card, credit card, or debit card call is completed according to one embodiment.

FIG. 17, which is a continuation of FIG. 16, illustrates the data flows that occur within and external to the network control processor when a calling card, credit card, or debit card call is completed according to one embodiment.

FIG. 20 is a dataflow diagram illustrating the dataflows that occur within and external to the network control processor when a collect call is completed according to one embodiment of the invention.

FIG. 21, which is a continuation of FIG. 20, illustrates the dataflows that occur within and external to the network control processor when a collect call is completed according to one embodiment of the invention.

FIG. 31 is an operational flow diagram illustrating the operations performed by the central message processor in sending and receiving the messages illustrated in FIG. 29 according to one embodiment of the invention.

FIG. 32, which is a continuation of FIG. 31, is an operational flow diagram illustrating the operations performed by the central message processor in sending and receiving the messages illustrated in FIG. 29 according to one embodiment of the invention.

FIG. 35 is an operational flow diagram illustrating the manner by which the message manager of the central message processor uses action records to process a network request according to one embodiment of the invention.

FIG. 36, which is a continuation of FIG. 35, is an operational flow diagram illustrating the manner by which the message manager of the central message processor uses action records to process a network request according to one embodiment of the invention.

FIG. 39 is an operational flow diagram illustrating the manner in which the central message processor releases a call from an operator console according to one embodiment of the invention.

FIG. 40, which is a continuation of FIG. 39, is an operational flow diagram illustrating the manner in which the central message processor releases a call from an operator console according to one embodiment of the invention.

FIG. 42 is an operational flow diagram illustrating the process of releasing a call when a user terminates the call according to one embodiment of the invention.

FIG. 43, which is a continuation of FIG. 42, is an operational flow diagram illustrating the process of releasing a call when a user terminates the call according to one embodiment of the invention.

FIG. 44, which is a continuation of FIG. 42, is an operational flow diagram illustrating the process of releasing a call when a user terminates the call according to one embodiment of the invention.

FIG. 45, which is a continuation of FIGS. 43 and 44, is an operational flow diagram illustrating the process of releasing a call when a user terminates the call according to one embodiment of the invention.

FIG. 58 is an operational flow diagram illustrating the steps followed by a main root procedure kernel during start-up, operation and cleanup of the billing server according to one embodiment of the invention.

FIG. 59, which is a continuation of FIG. 58, is an operational flow diagram illustrating the steps followed by a main root procedure kernel during start-up, operation and cleanup of the billing server according to one embodiment of the invention.

FIG. 72 is an operational flow diagram illustrating the steps performed by the database server when a network message is received according to one embodiment of the invention.

FIG. 73, which is a continuation of FIG. 72, is an operational flow diagram illustrating the steps performed by the database server when a network message is received according to one embodiment of the invention.

FIG. 91 is an operational flow diagram illustrating the steps involved in executing the p-code in the validation system according to one embodiment of the invention.

FIG. 92, which is a continuation of FIG. 91, is an operational flow diagram illustrating the steps involved in executing the p-code in the validation system according to one embodiment of the invention.

FIG. 98 is a diagram illustrating a representative configuration for an audit table according to one embodiment of the invention.

FIG. 118 is a data flow diagram illustrating the messages sent in completing and terminating a long-distance call placed using a debit card according to one embodiment of the invention.

Figure 119:
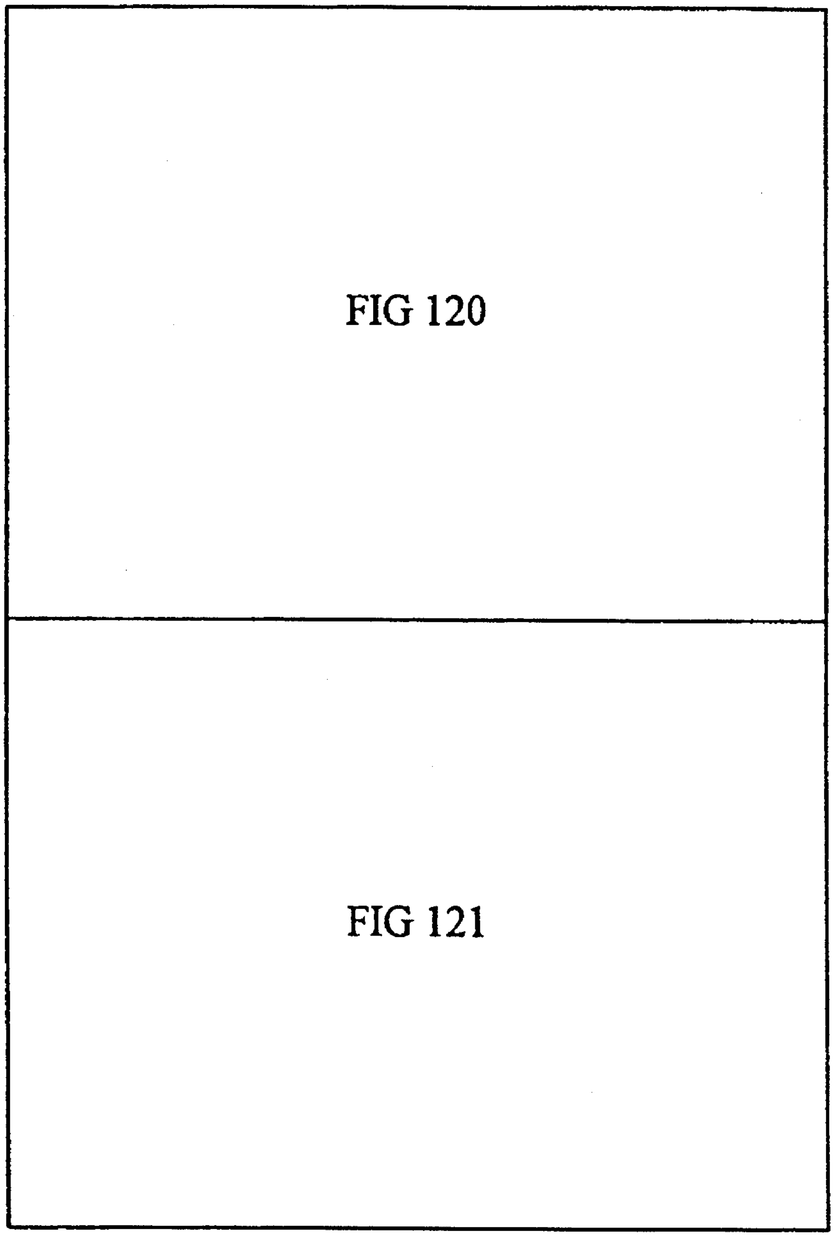
Figure 120:
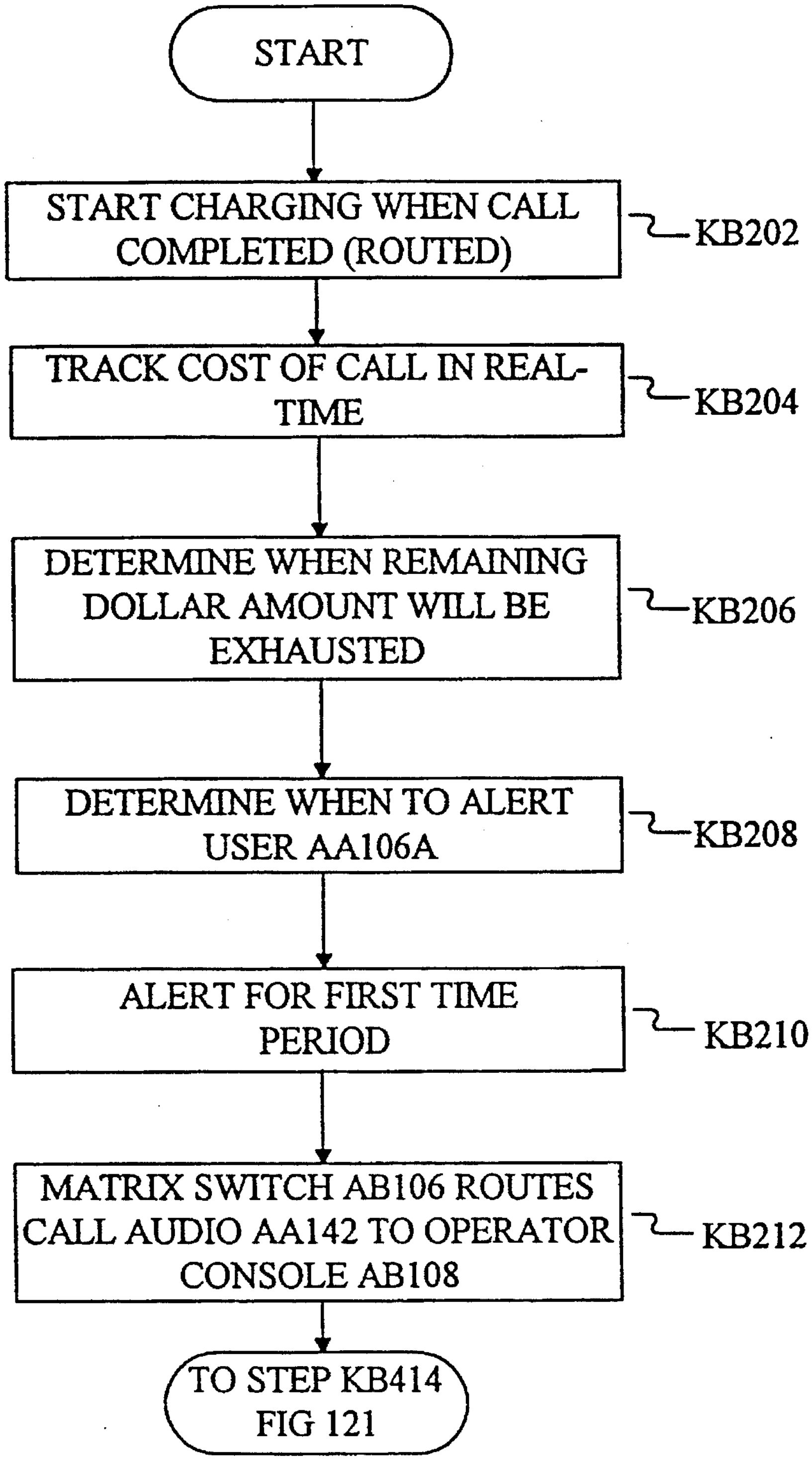
Figure 121:
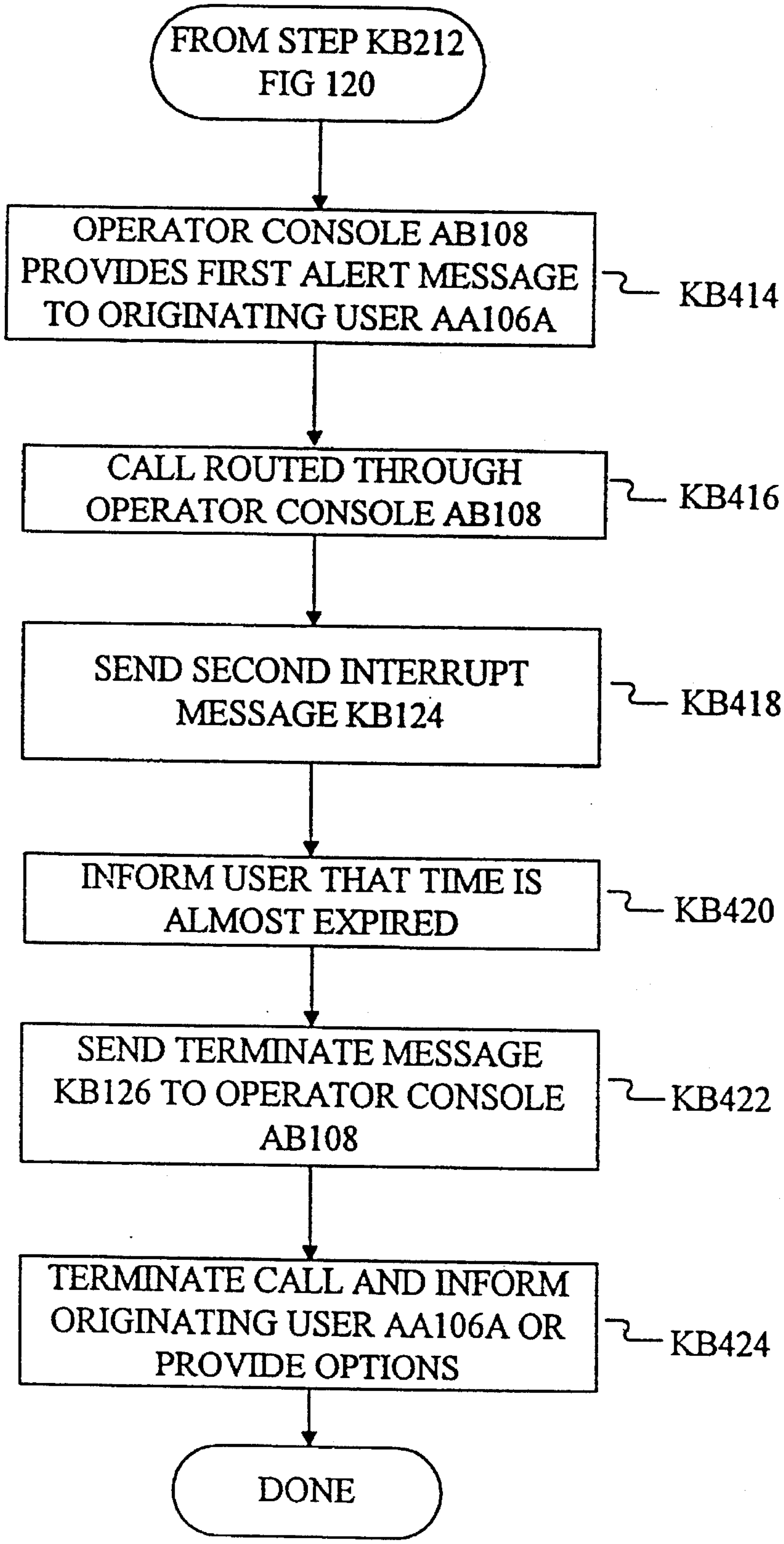

FIG. 119, which comprises FIGS. 120 and 121, is an operational flow diagram illustrating the steps involved in completing and terminating a debit card call using real-time billing according to one embodiment of the invention.

FIG. 120 is an operational flow diagram illustrating the steps involved in completing and terminating a debit card call using real-time billing according to one embodiment of the invention.

FIG. 121, which is a continuation of FIG. 120, is an operational flow diagram illustrating the steps involved in completing and terminating a debit card call using real-time billing according to one embodiment of the invention.

Figure 122:
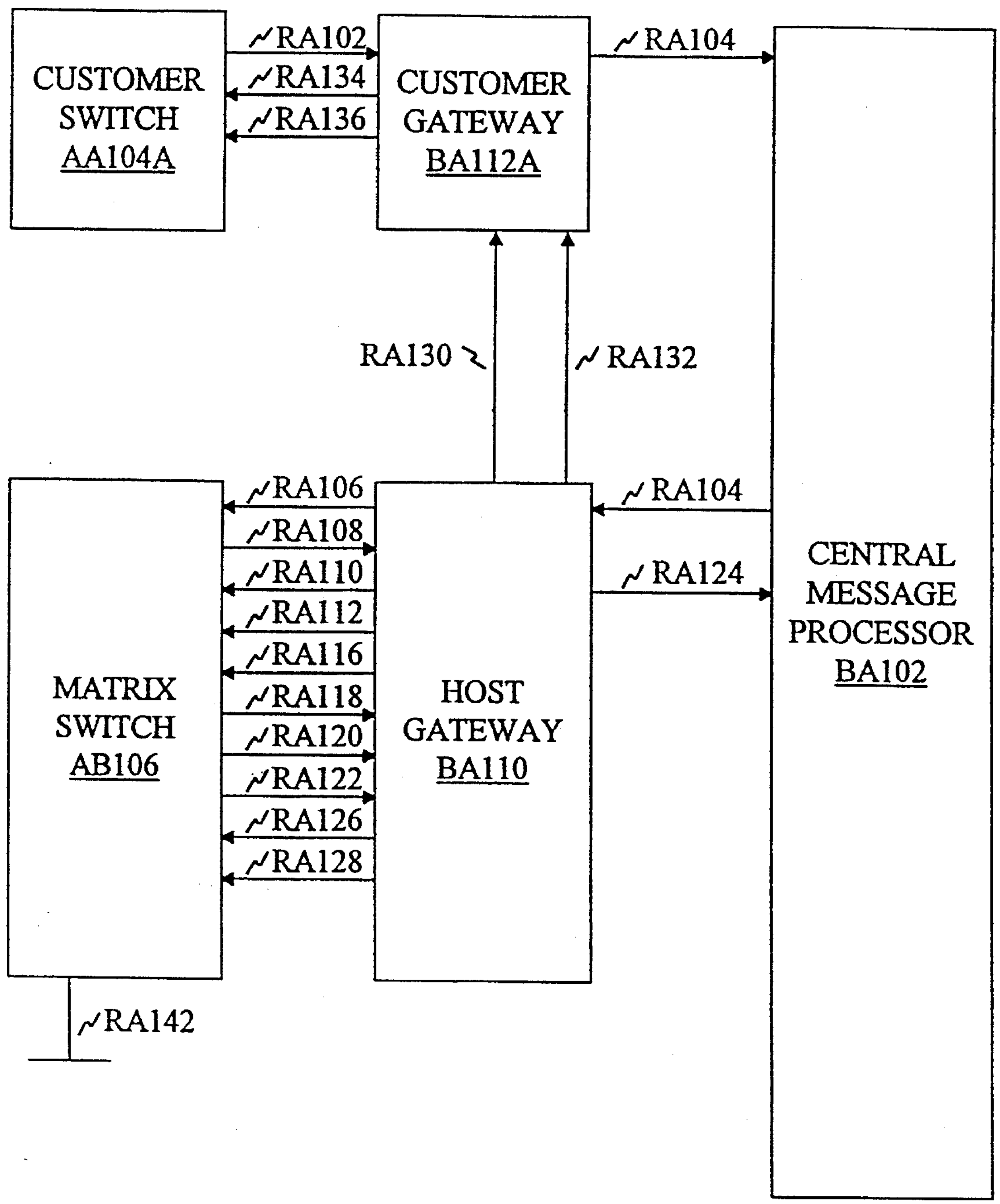

FIG. 122 is a block diagram illustrating the data flow during call setup according to one embodiment of the invention.

Figure 123:
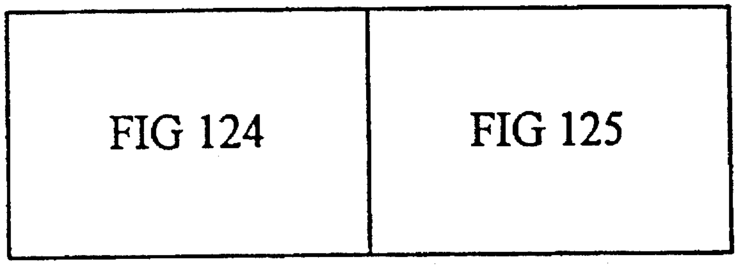
Figure 124:
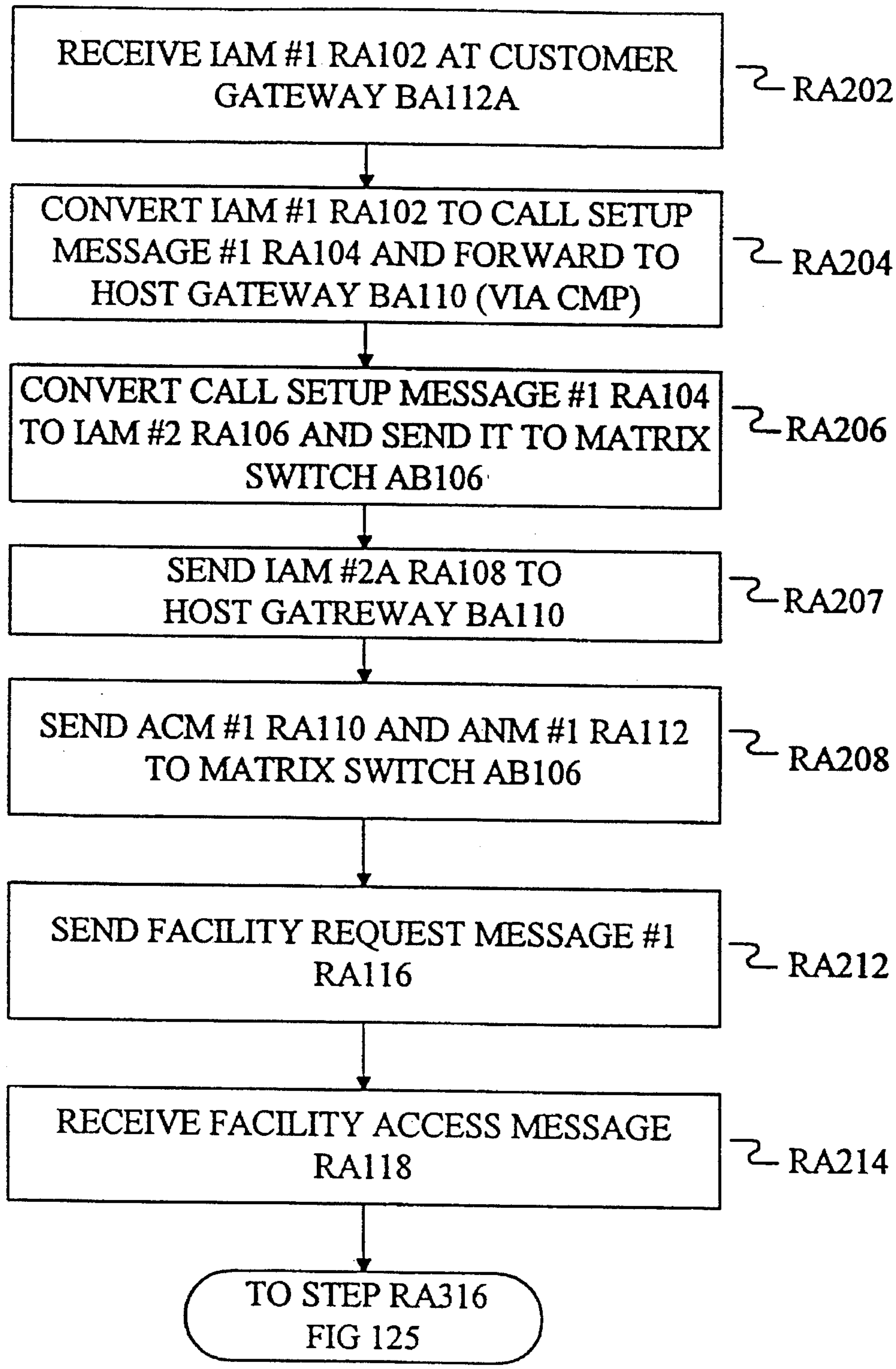
Figure 125:
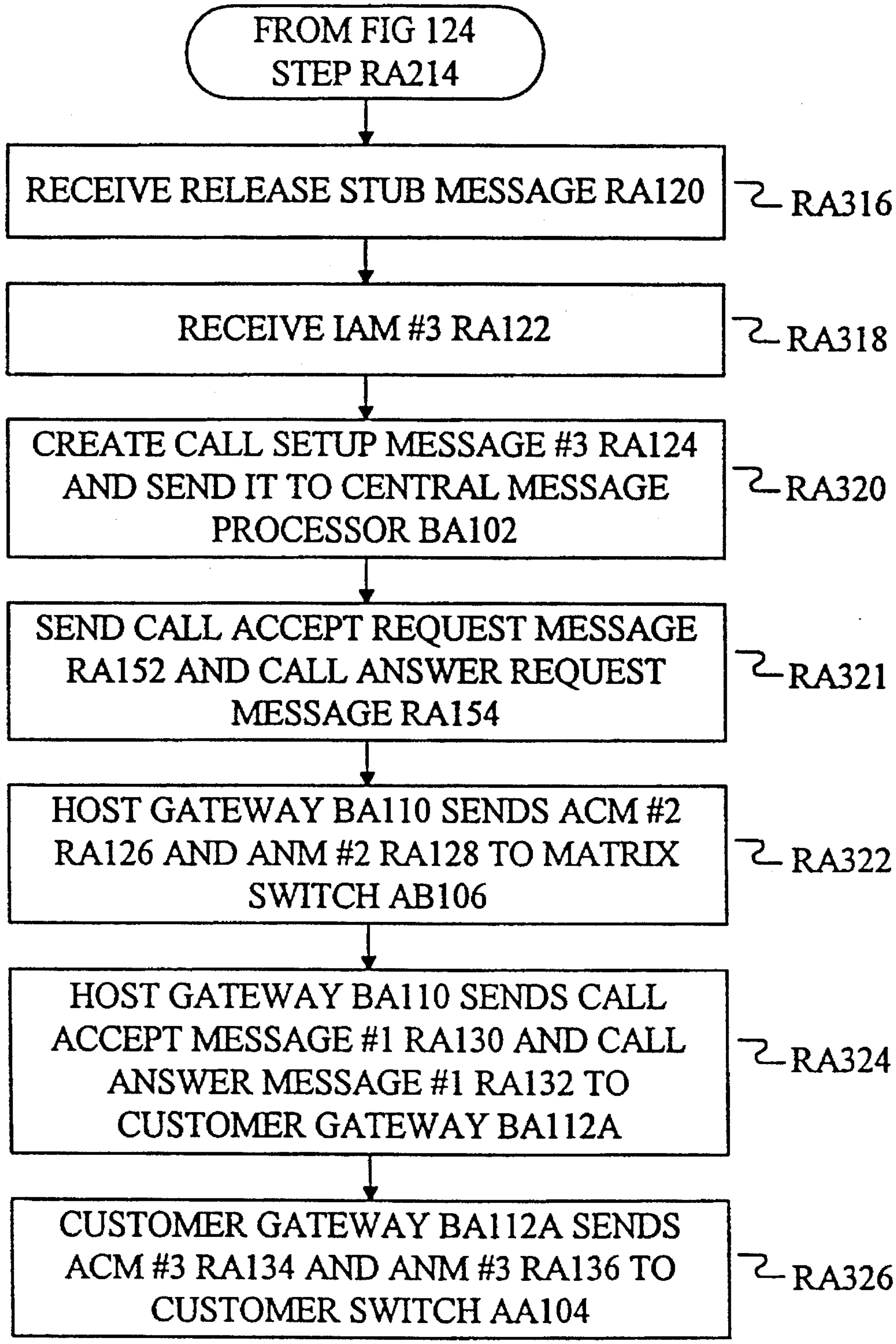

FIG. 123, which comprises FIGS. 124 and 125, is an operational flow diagram illustrating the process followed during call setup according to one embodiment of the invention.

FIG. 124 is an operational flow diagram illustrating the process followed during call setup according to one embodiment of the invention.

FIG. 125, which is a continuation of FIG. 124, is an operational flow diagram illustrating the process followed during call setup according to one embodiment of the invention.

Figure 126:
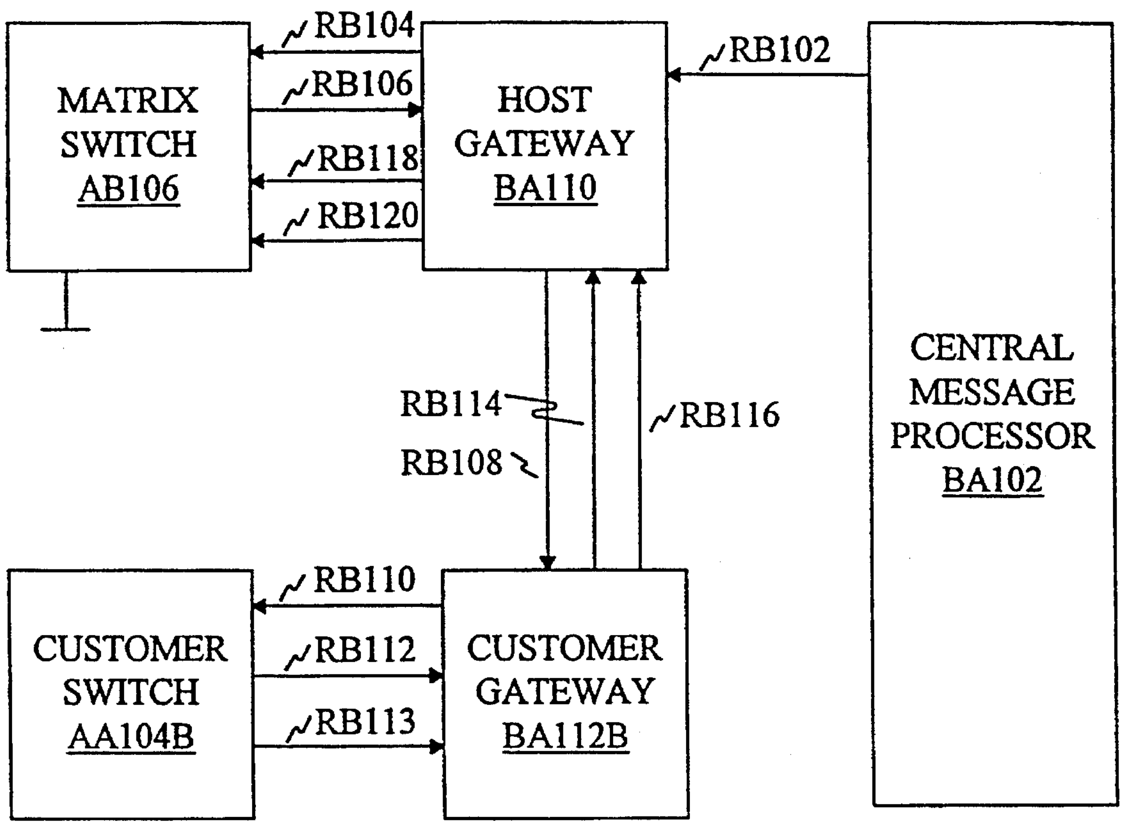

FIG. 126 is a data flow diagram illustrating the messages sent in completing a call according to one embodiment of the invention.

Figure 127:
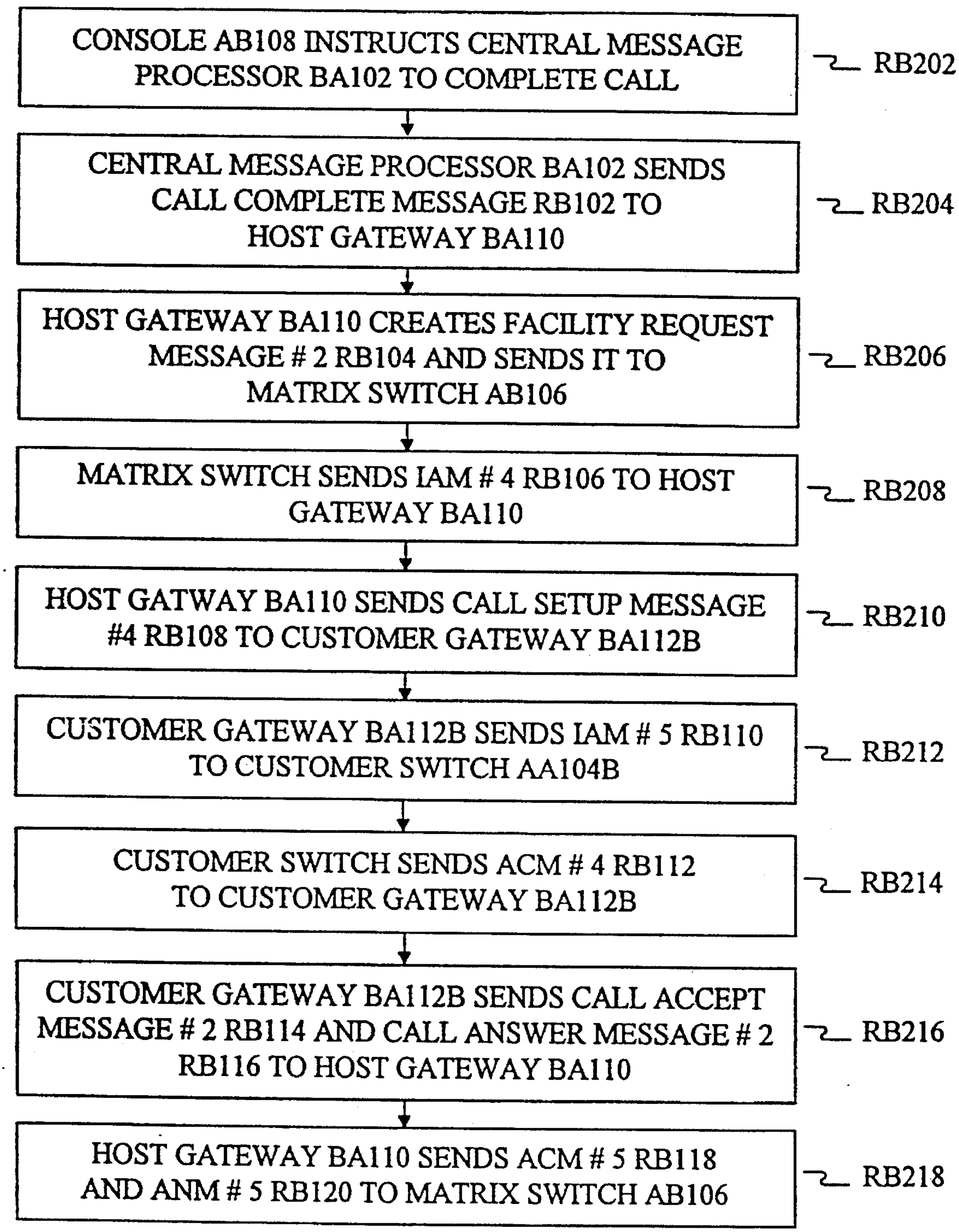

FIG. 127 is an operational flow diagram illustrating the steps followed in completing a call according to one embodiment of the invention.

Figure 128:
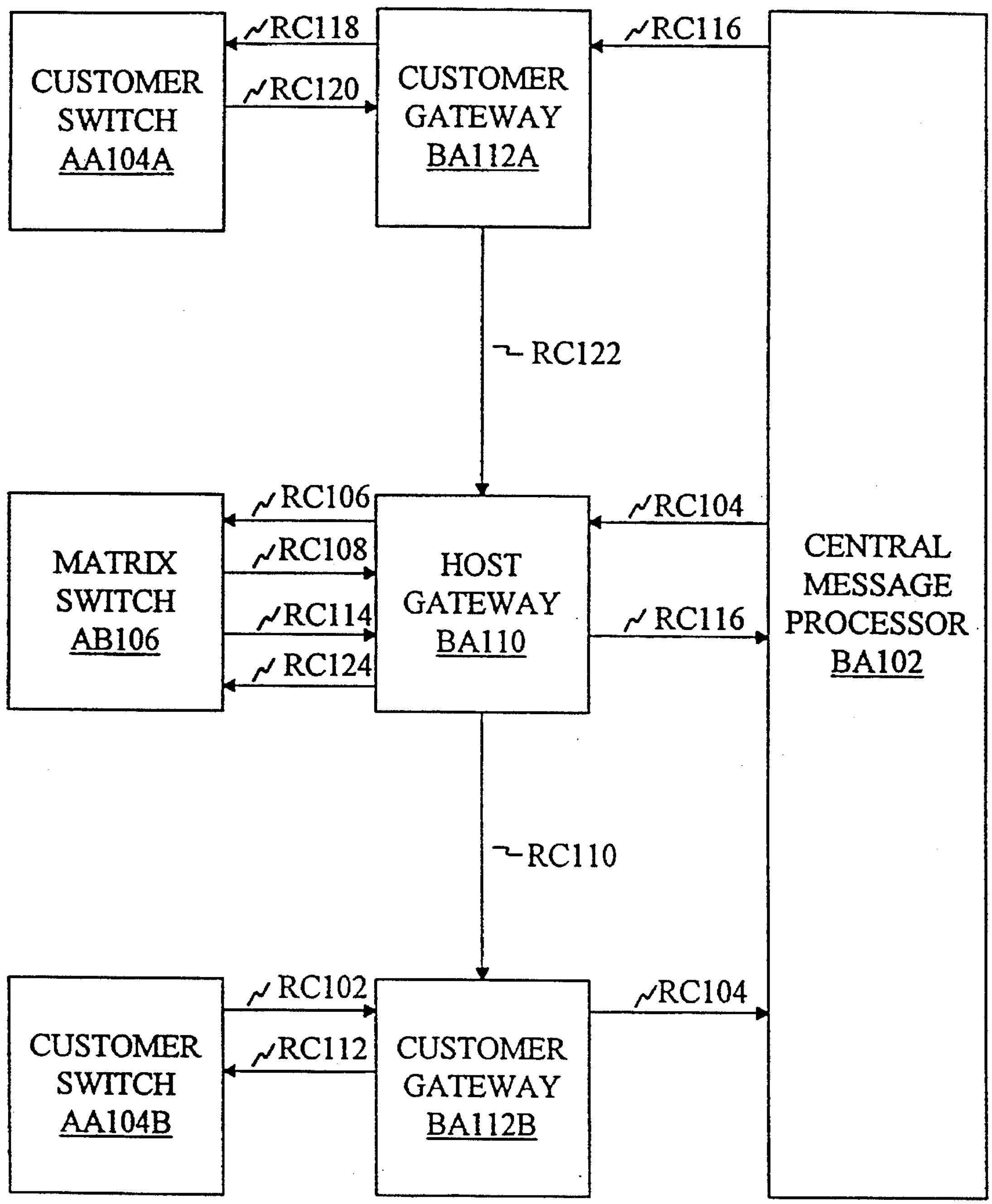

FIG. 128 is a data flow diagram illustrating the data flow that occurs when a call is terminated according to one embodiment of the invention.

Figure 129:
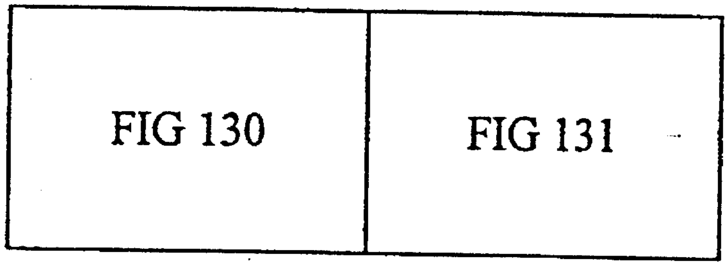
Figure 130:
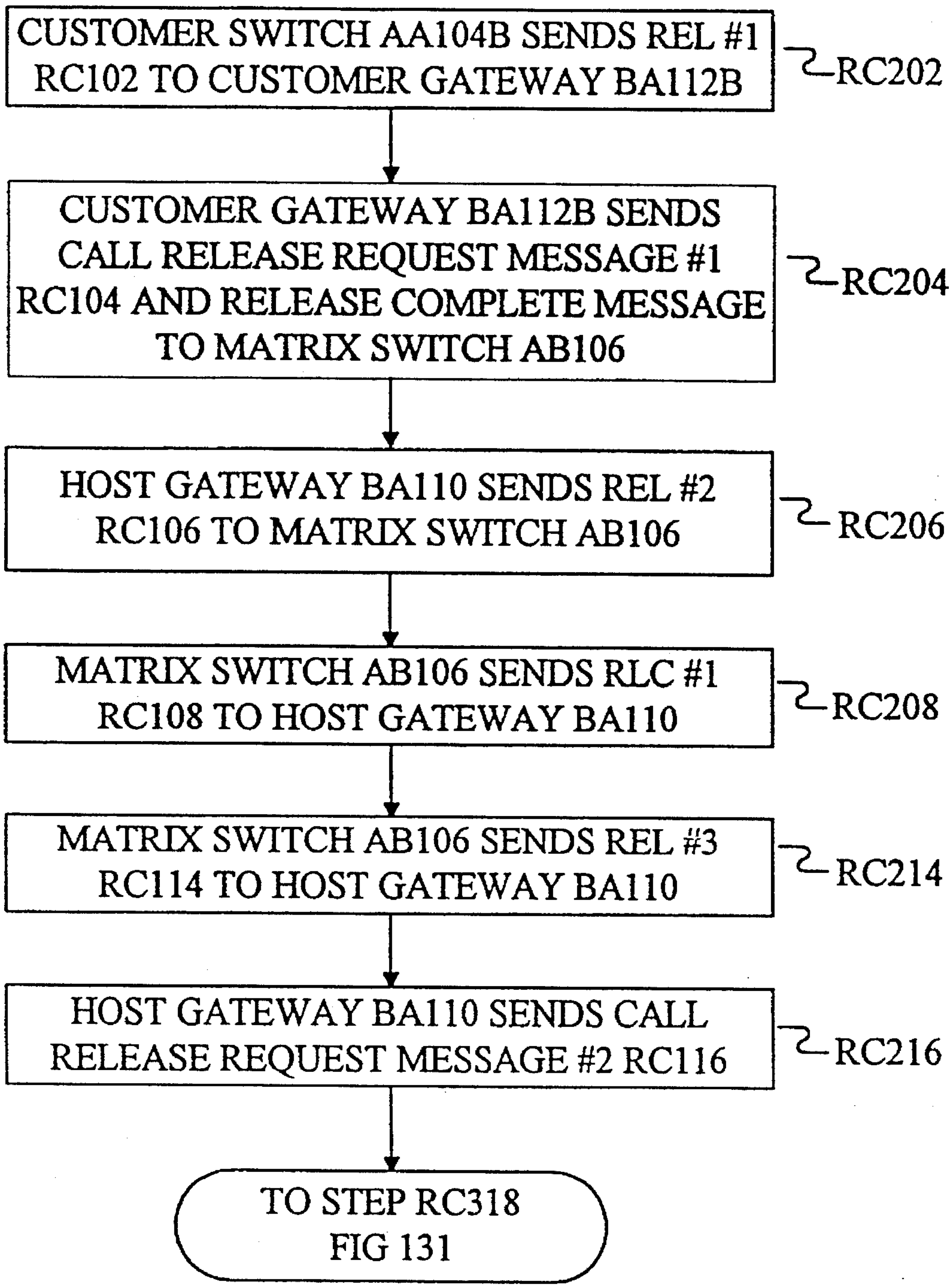
Figure 131:
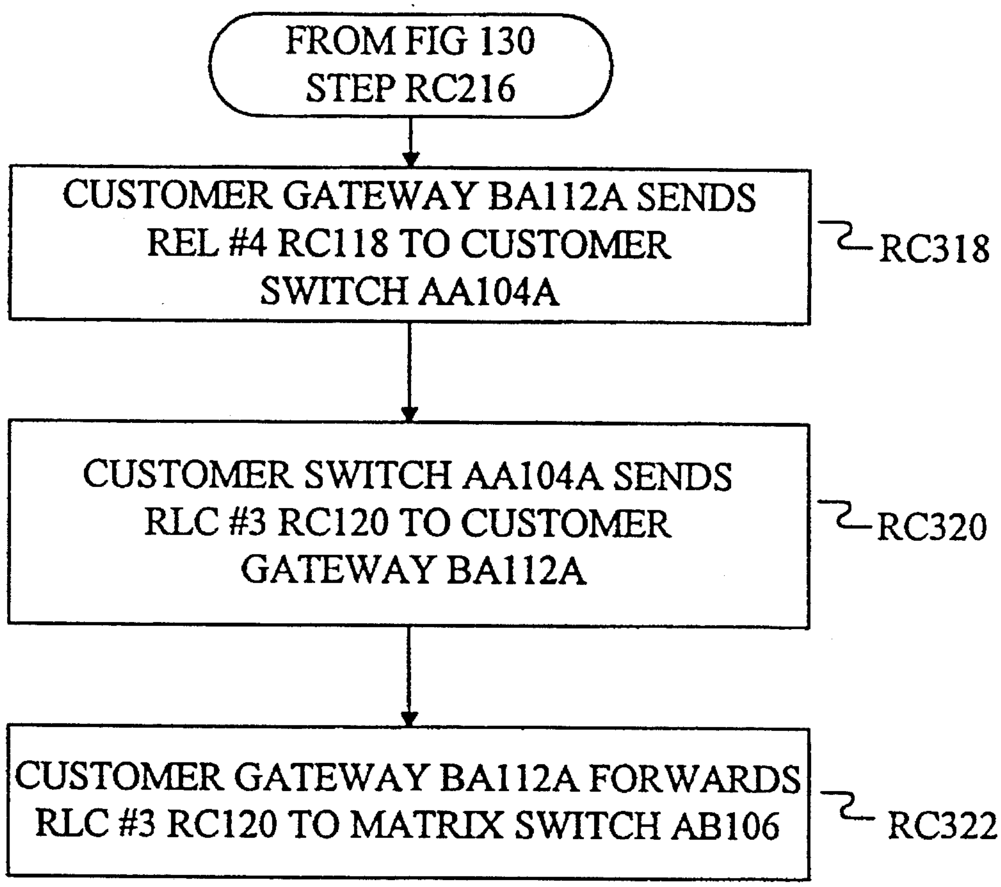

FIG. 129, which comprises FIGS. 130 and 131, is an operational flow diagram illustrating the process by which a call is terminated according to one embodiment of the invention.

FIG. 130 is an operational flow diagram illustrating the process by which a call is terminated according to one embodiment of the invention.

FIG. 131, which is a continuation of FIG. 130, is an operational flow diagram illustrating the process by which a call is terminated according to one embodiment of the invention.

Figure 132:
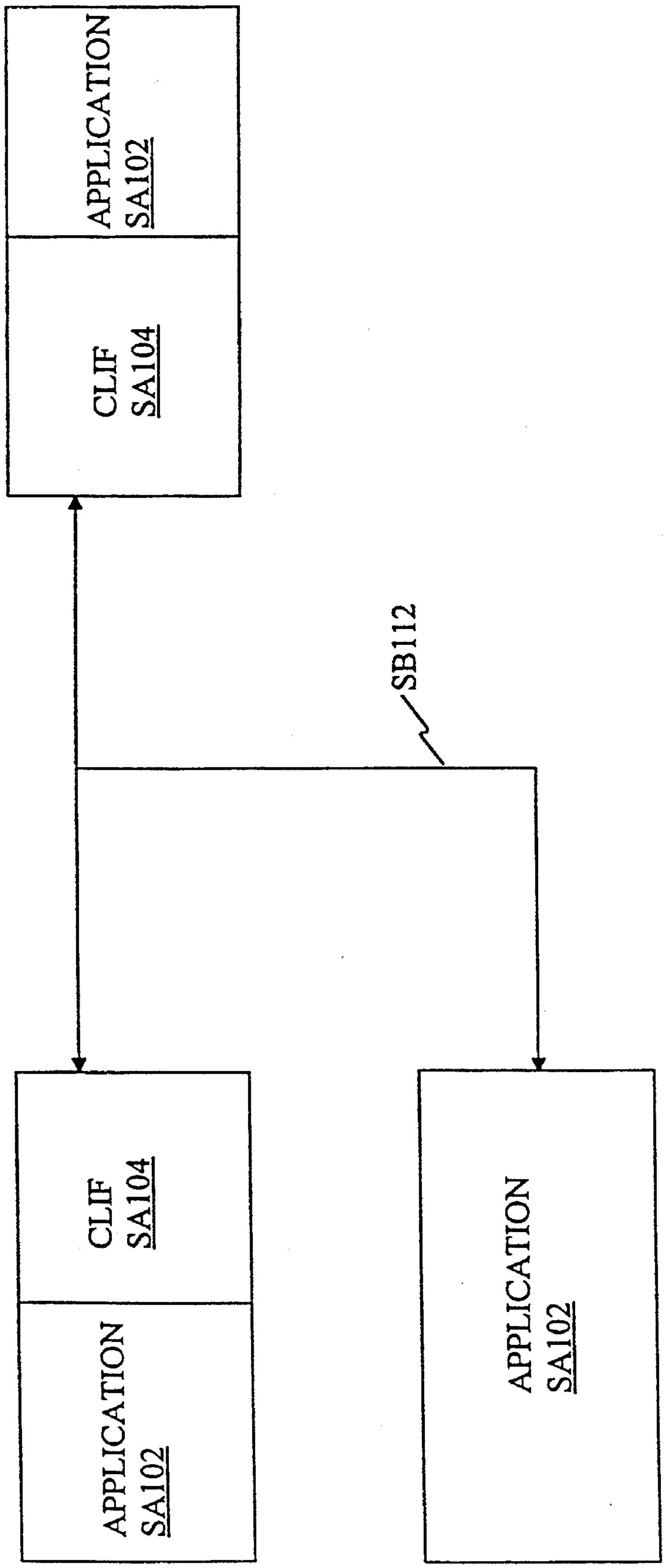

FIG. 132 is a high-level block diagram illustrating the use of a client interface (CLIF) according to one embodiment of the invention.

Figure 133:
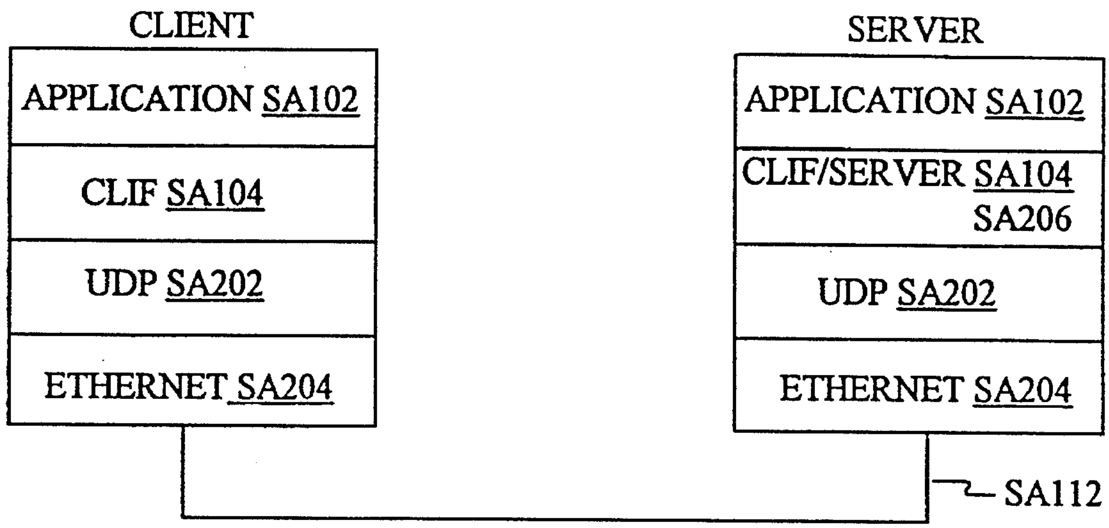

FIG. 133 is a diagram illustrating layers within a client and a server to handle communications an Ethernet LAN according to one embodiment of the invention.

Figure 134:
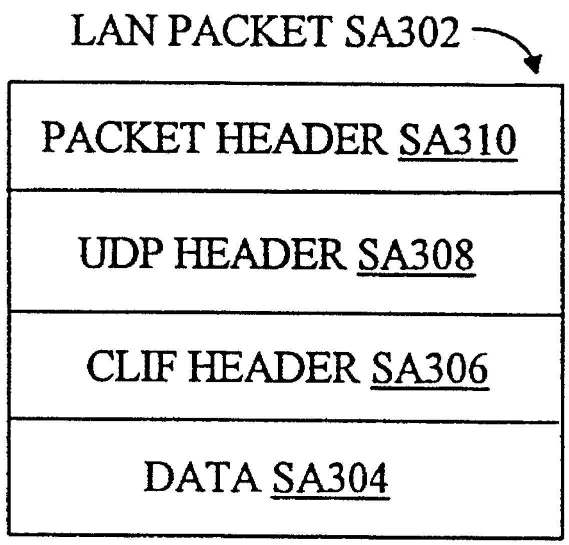

FIG. 134 is a diagram illustrating the configuration of a packet sent across a LAN according to one embodiment of the invention.

Figure 135:
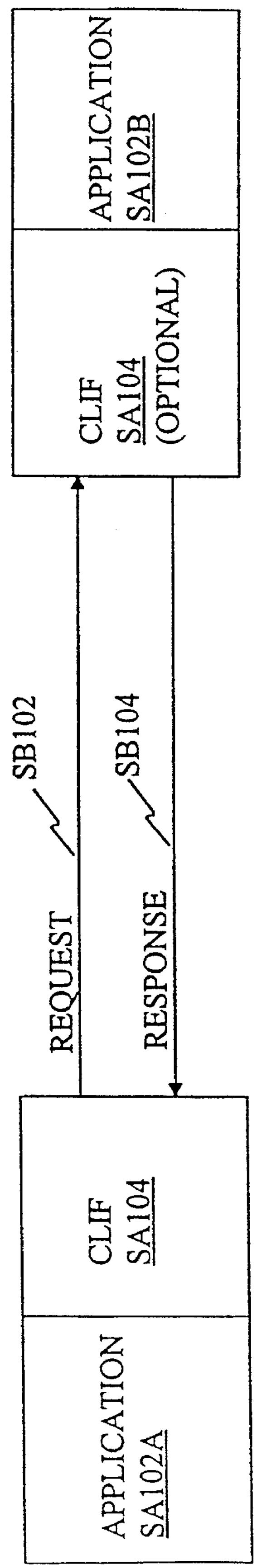

FIG. 135 is a data flow diagram illustrating transmission of messages using a CLIF according to one embodiment of the invention.

Figure 136:
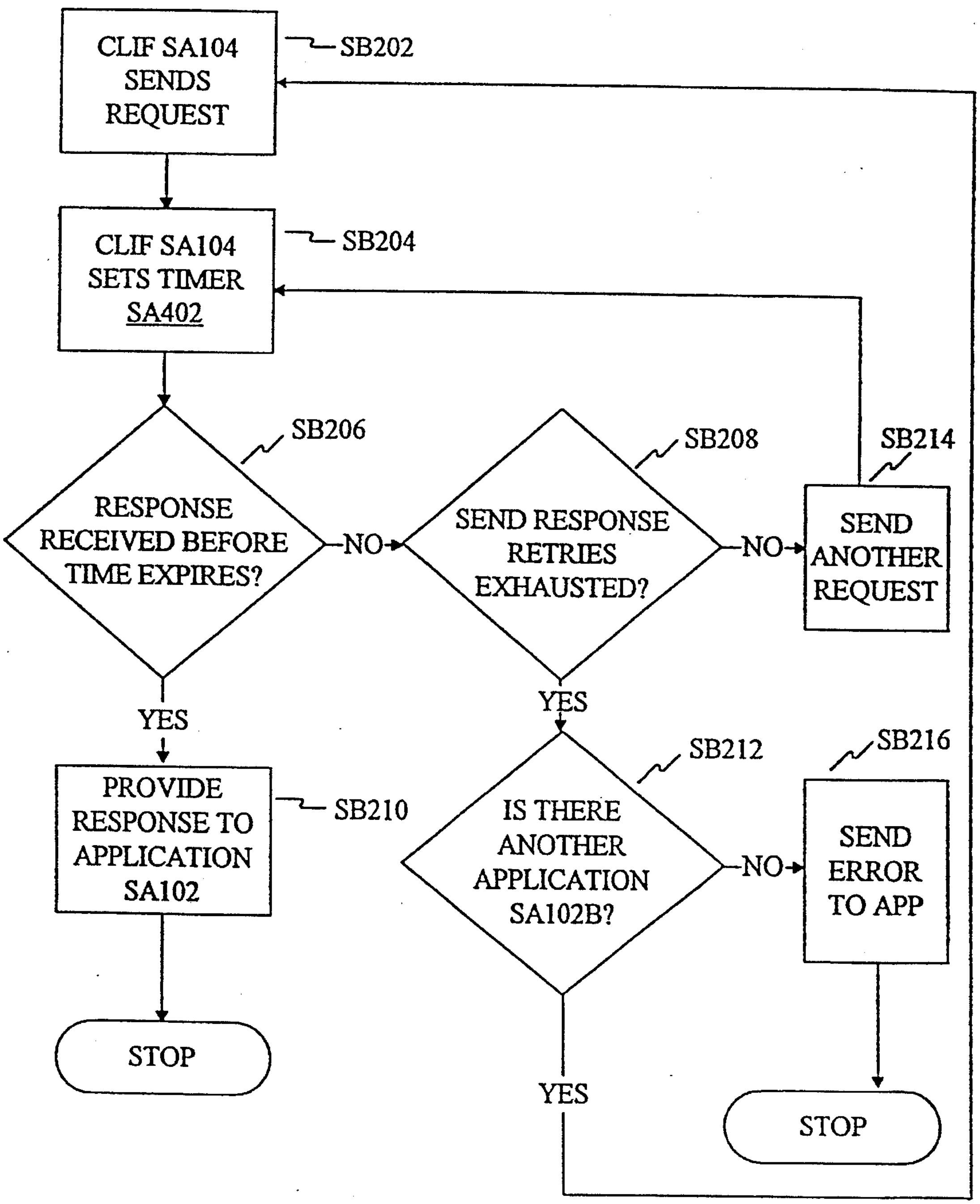

FIG. 136 is a high-level operational flow diagram illustrating the process followed by a CLIF in handling messages according to one embodiment of the invention.

Figure 137:
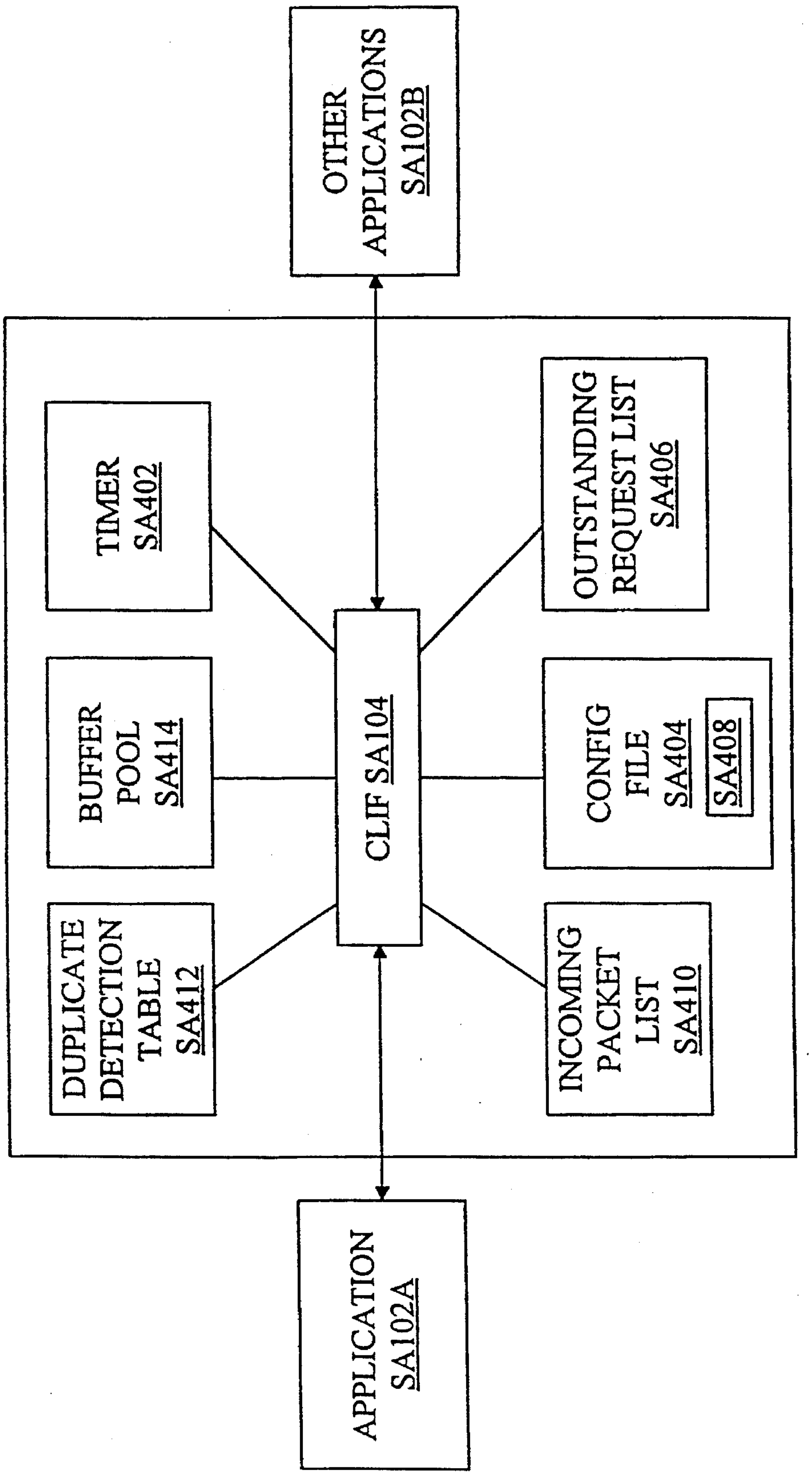

FIG. 137 is a block diagram illustrating files and tables used by a CLIF according to one embodiment of the invention.

Figure 138:
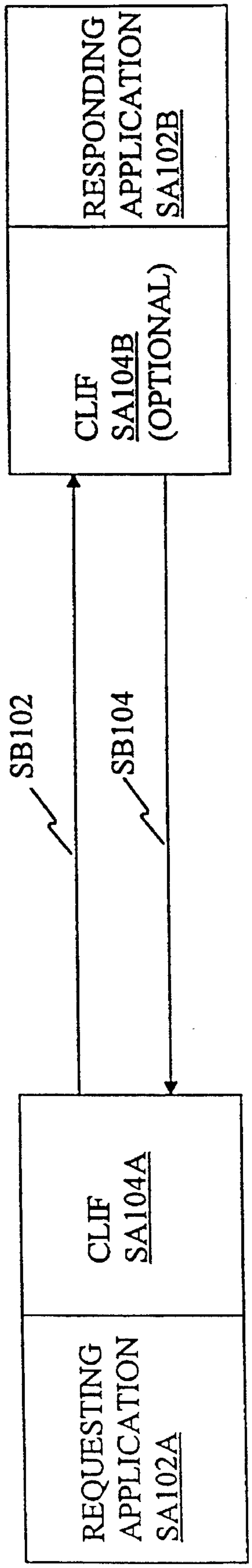

FIG. 138 is a block diagram illustrating a request being sent SB102 and a response received by a CLIF according to one embodiment of the invention.

Figure 139:
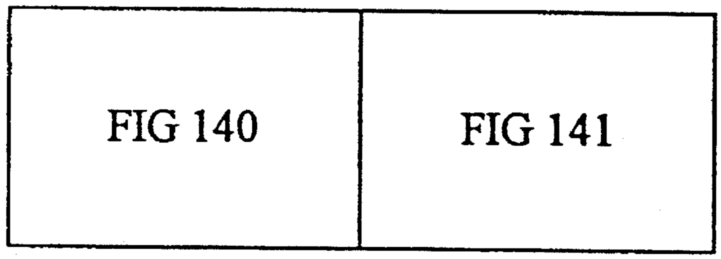
Figure 140:
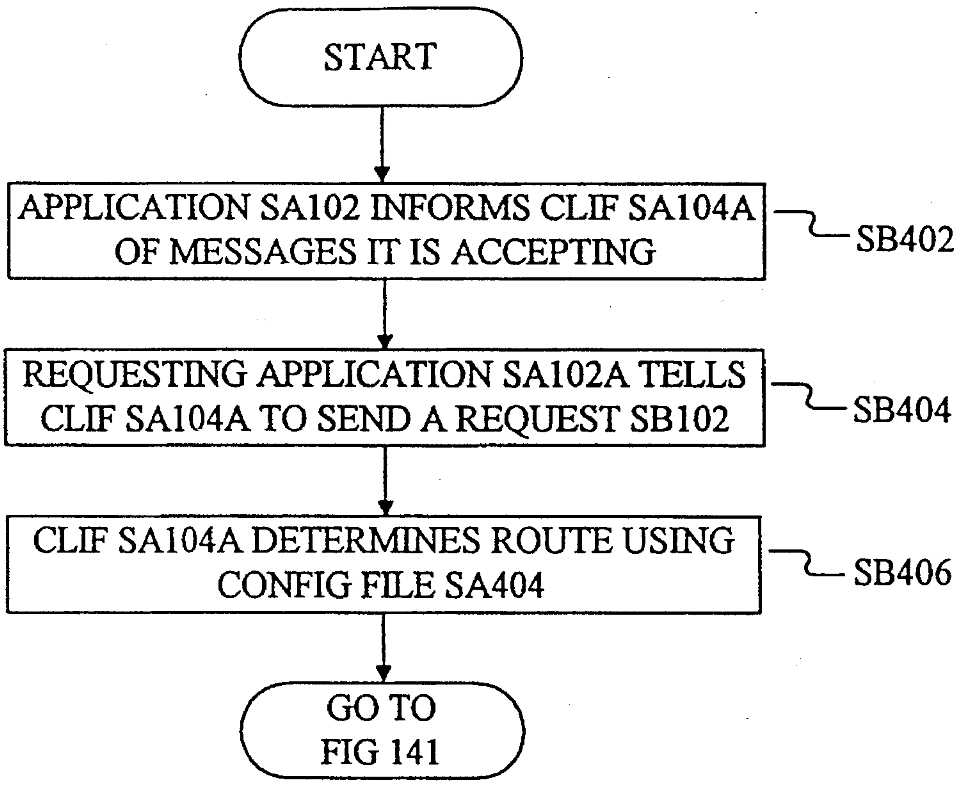
Figure 141:
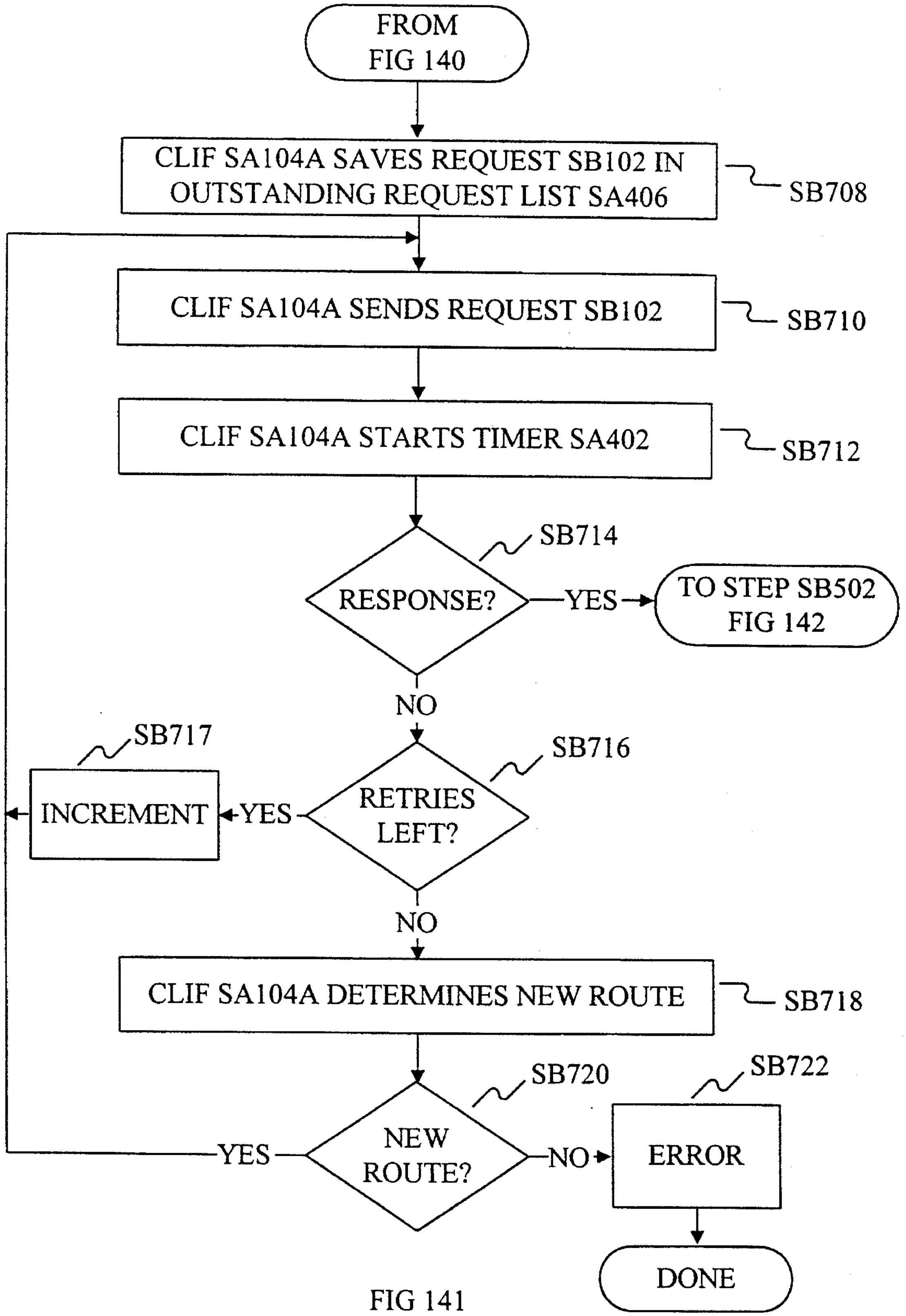

FIG. 139, which comprises FIGS. 140 and 141, is an operational flow diagram illustrating the process by which a CLIF sends and receives messages according to one embodiment of the invention.

FIG. 140 is an operational flow diagram illustrating the process by which a CLIF sends and receives messages according to one embodiment of the invention.

FIG. 141, which is a continuation of FIG. 140, is an operational flow diagram illustrating the process by which a CLIF sends and receives messages according to one embodiment of the invention.

Figure 142:
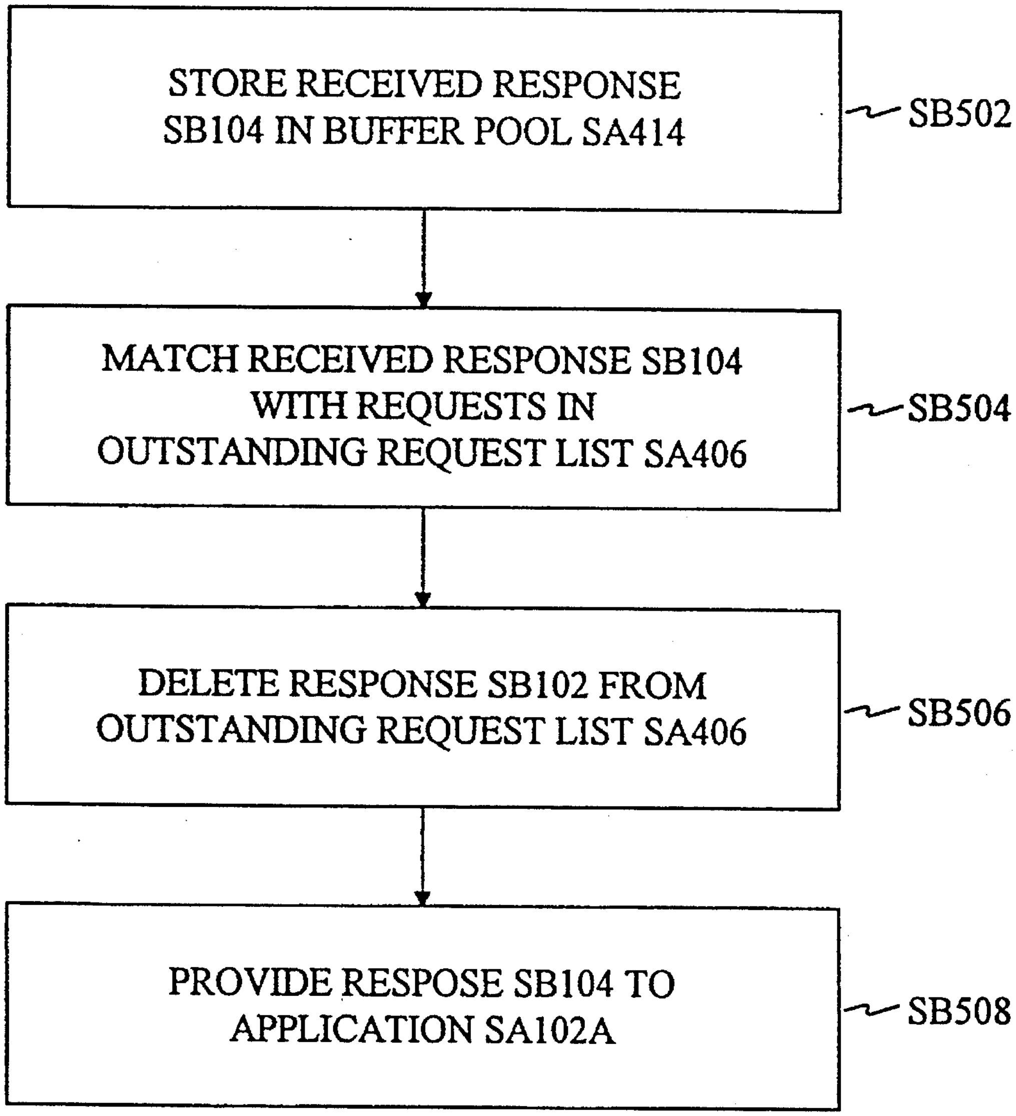

FIG. 142 is an operational flow diagram illustrating what occurs when a response is received by a CLIF according to one embodiment of the invention.

Figure 143:
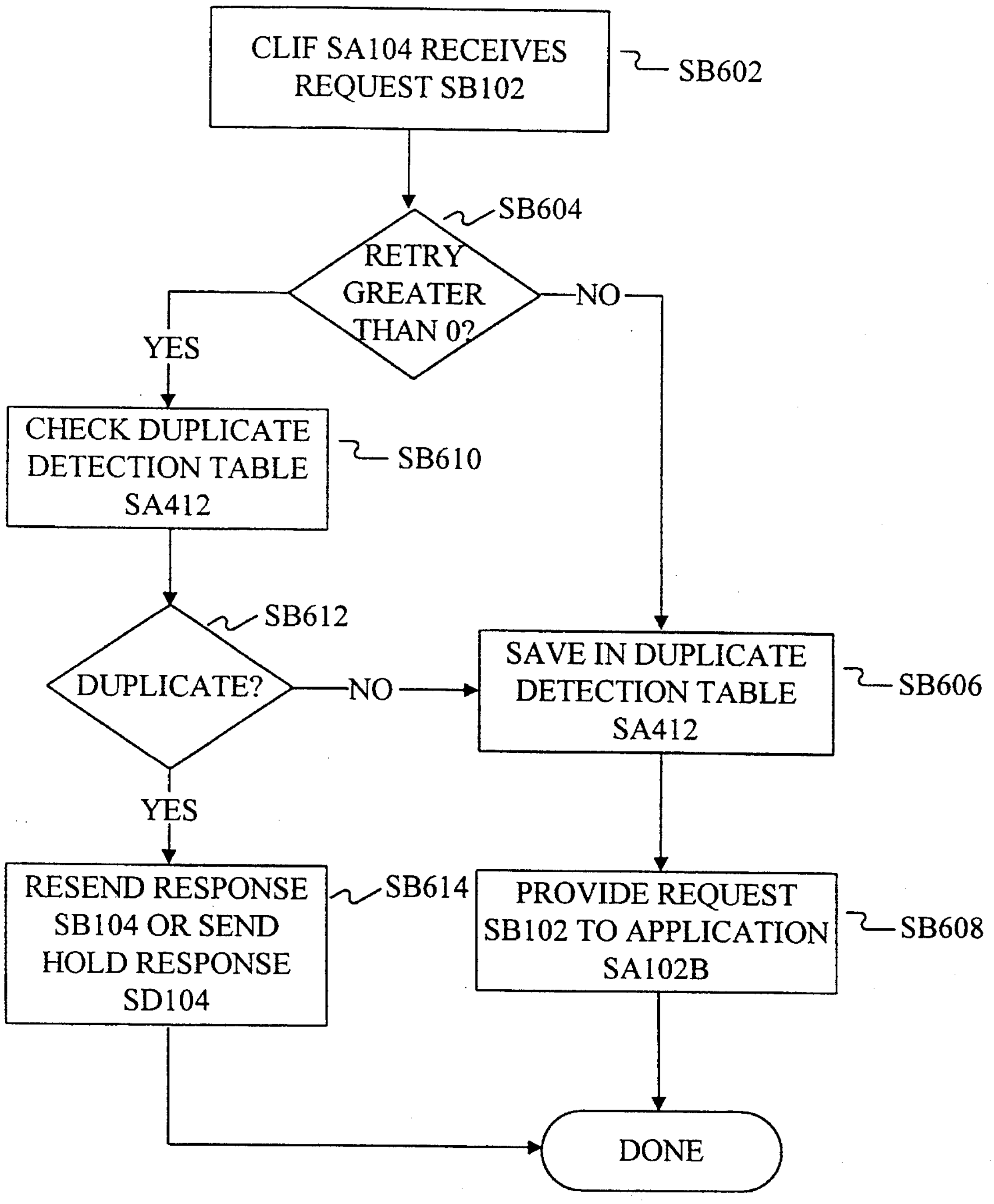

FIG. 143 is an operational flow diagram illustrating the process that occurs when a CLIF receives a request according to one embodiment of the invention.

Figure 144:
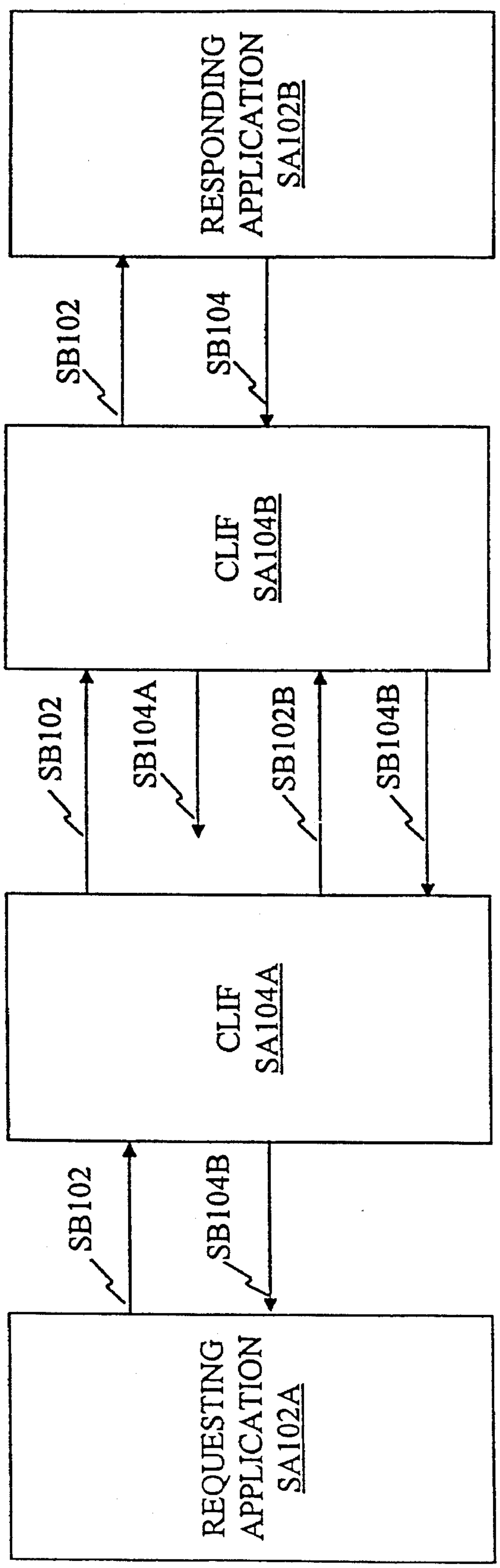

FIG. 144 is a data flow diagram illustrating messages sent between a requesting application and a responding application using CLIFs according to one embodiment of the invention.

Figure 145:
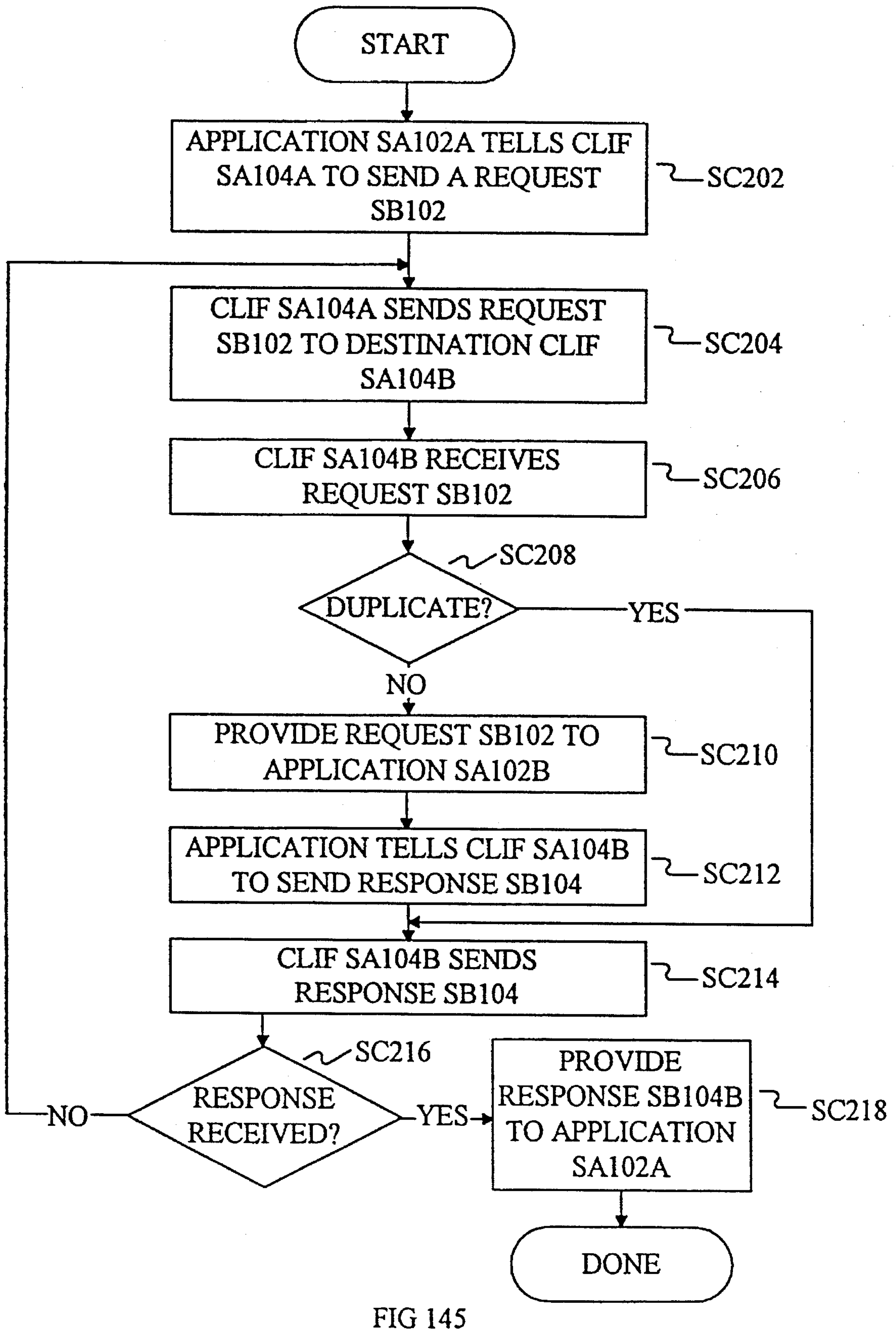

FIG. 145 is a derailed operational flow diagram illustrating the process by which a CLIF detects the presence of a duplicate request and prevents the responding application from having to respond more than once according to one embodiment of the invention.

Figure 146:
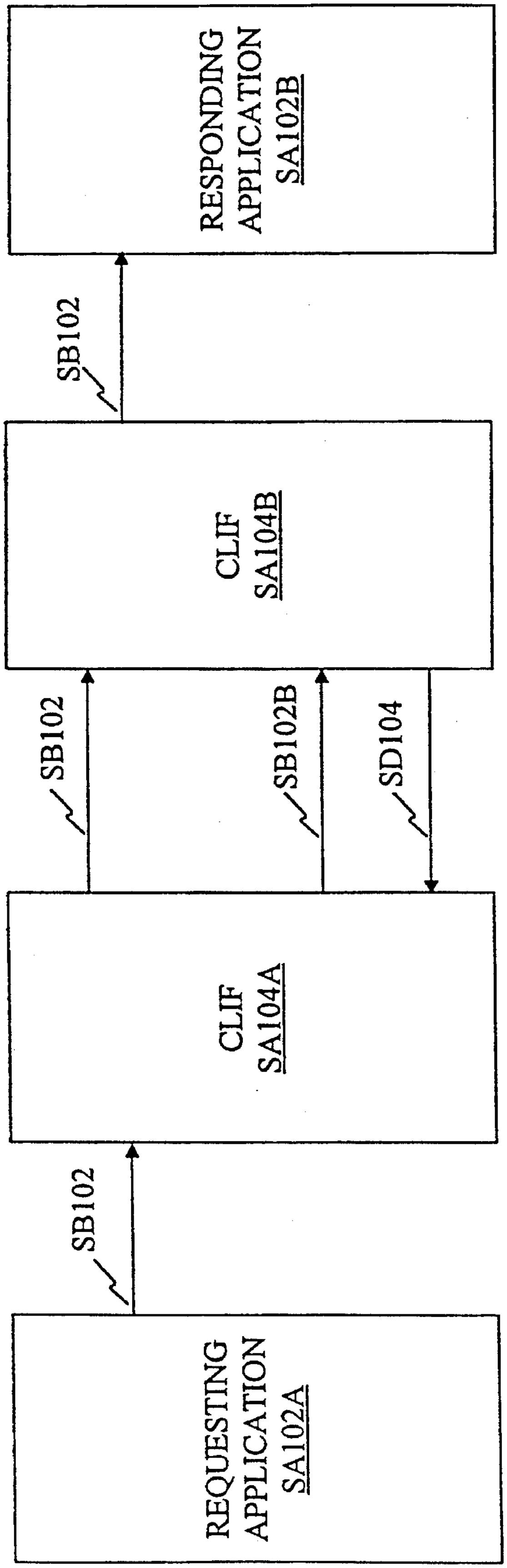

FIG. 146 is a data flow diagram illustrating the manner in which one CLIF can increase the time interval between retries of a second CLIF according to one embodiment of the invention.

Figure 147:
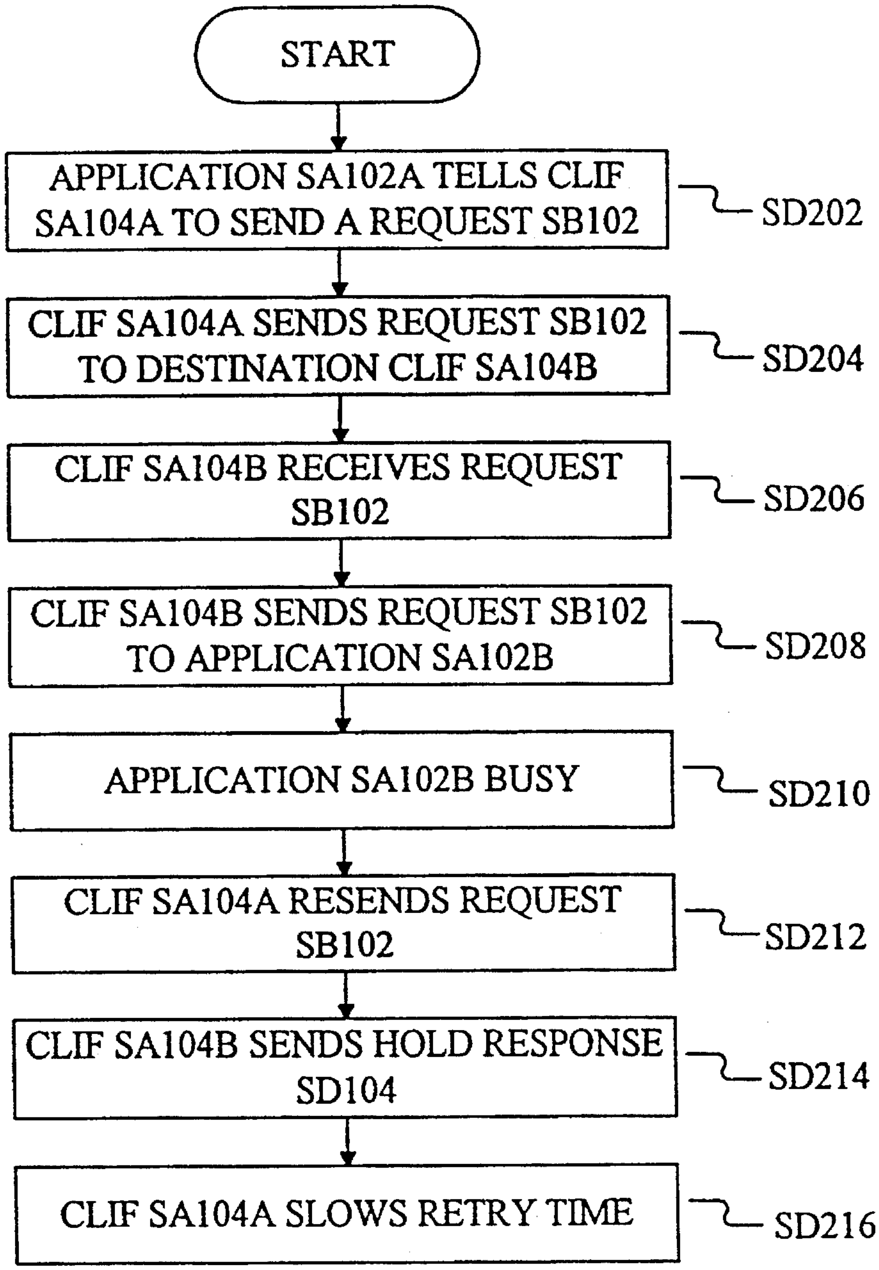

FIG. 147 is a derailed operational flow diagram illustrating the process by which a first CLIF increases the time interval between retries of a second CLIF according to one embodiment of the invention.

Figure 148:
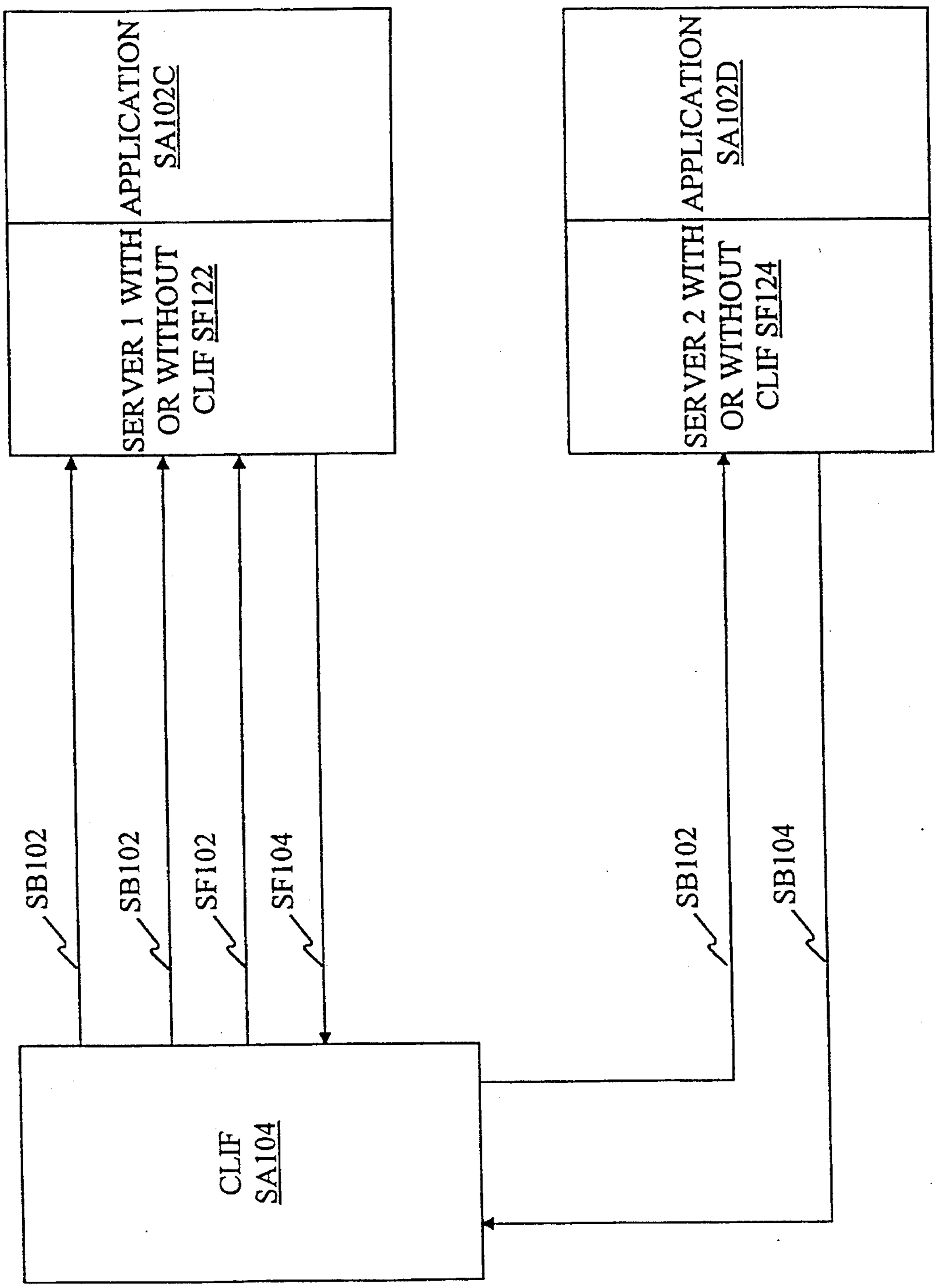

FIG. 148 is a data flow diagram illustrating the manner in which a CLIF sends messages to an application with a highest priority according to one embodiment of the invention.

Figure 149:
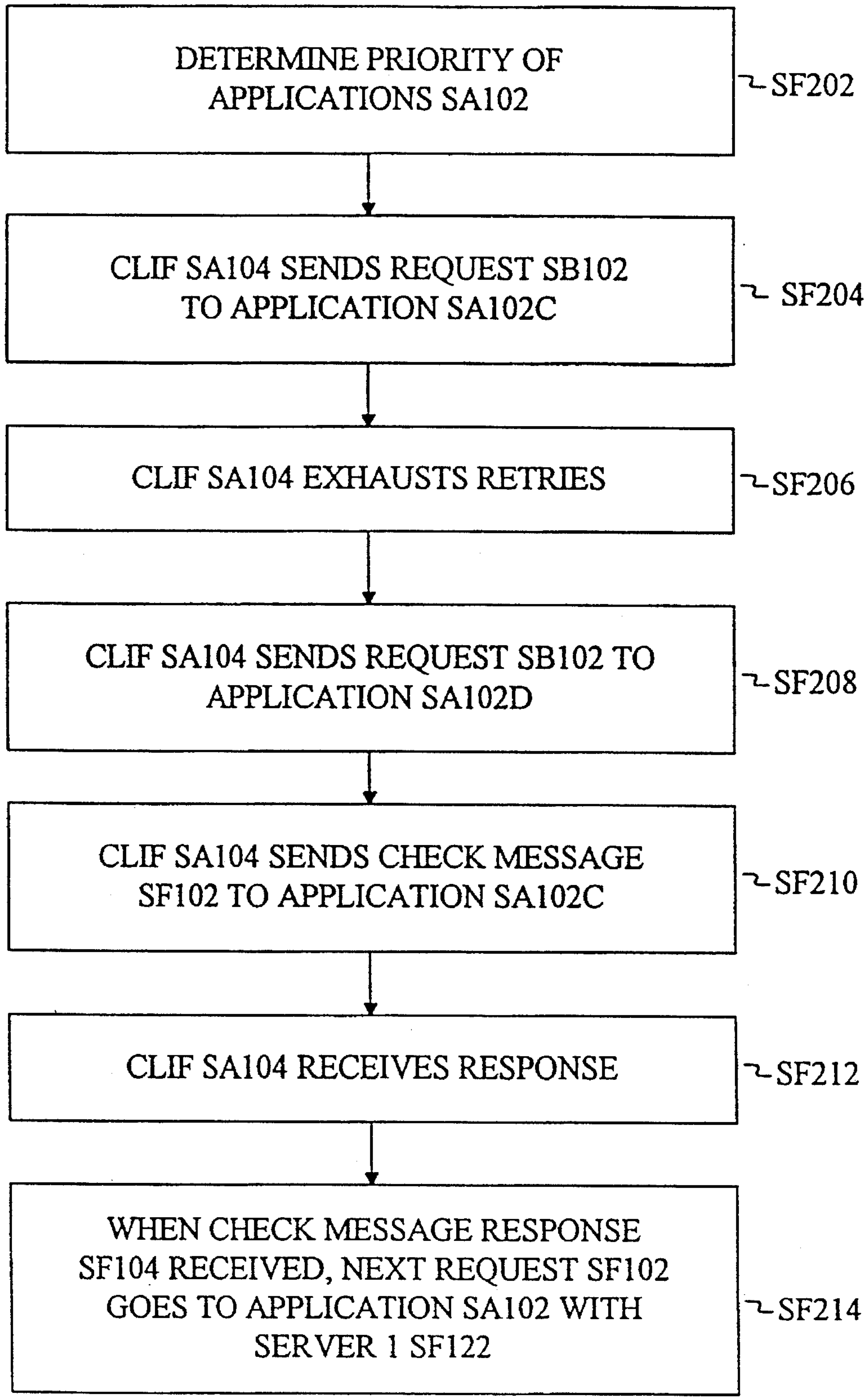

FIG. 149 is an operational flow diagram illustrating the process by which a CLIF sends messages to an application having the highest priority according to one embodiment of the invention.

Figure 150:
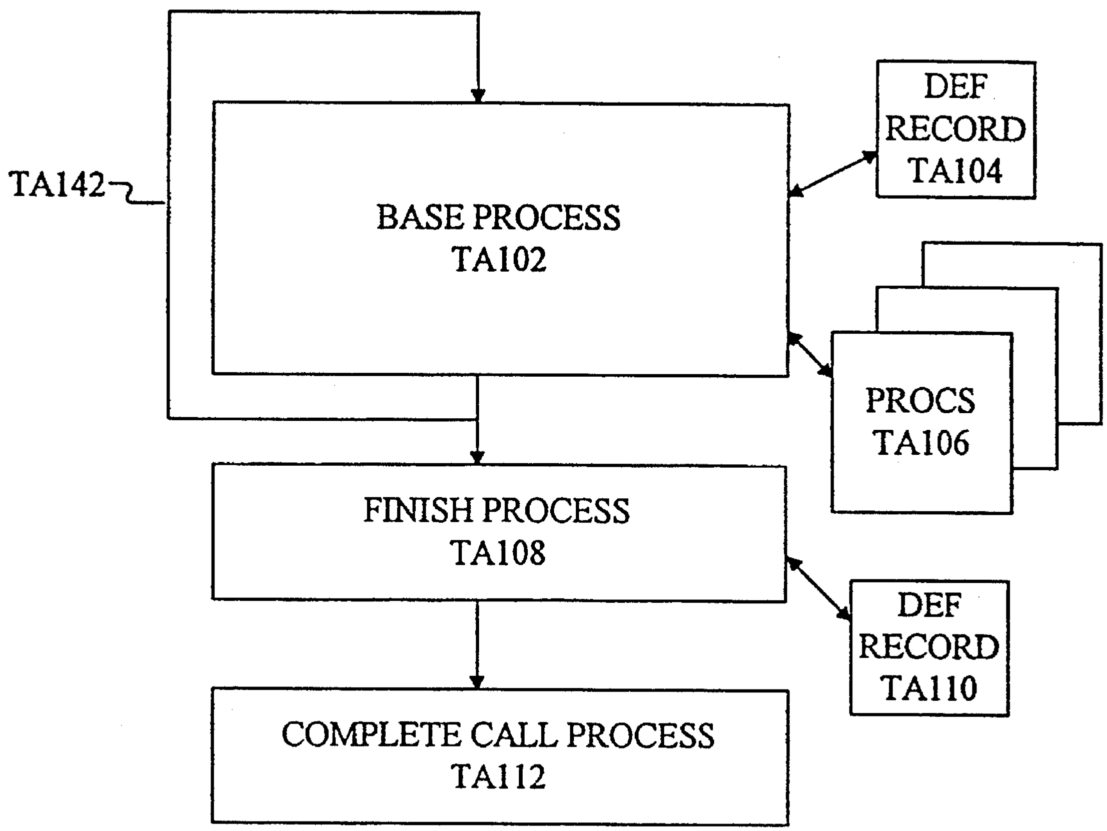

FIG. 150 is a high level block diagram illustrating the processes and DEF records used by a call processing system to process calls according to one embodiment of the invention.

Figure 151:
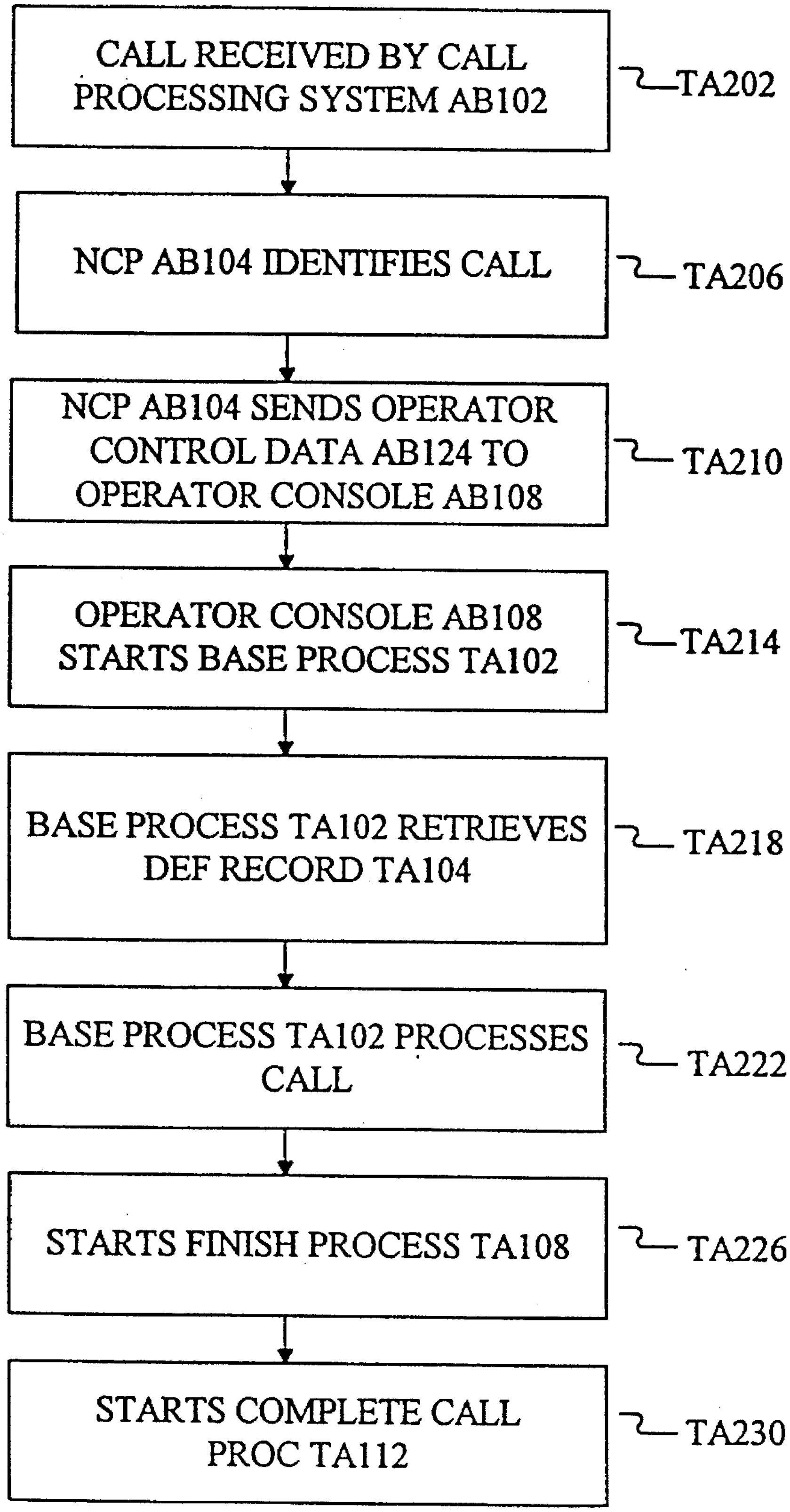

FIG. 151 is an operational flow diagram illustrating the manner in which a call processing system uses DEF records and processes to handle calls according to one embodiment of the invention.

Figure 152:
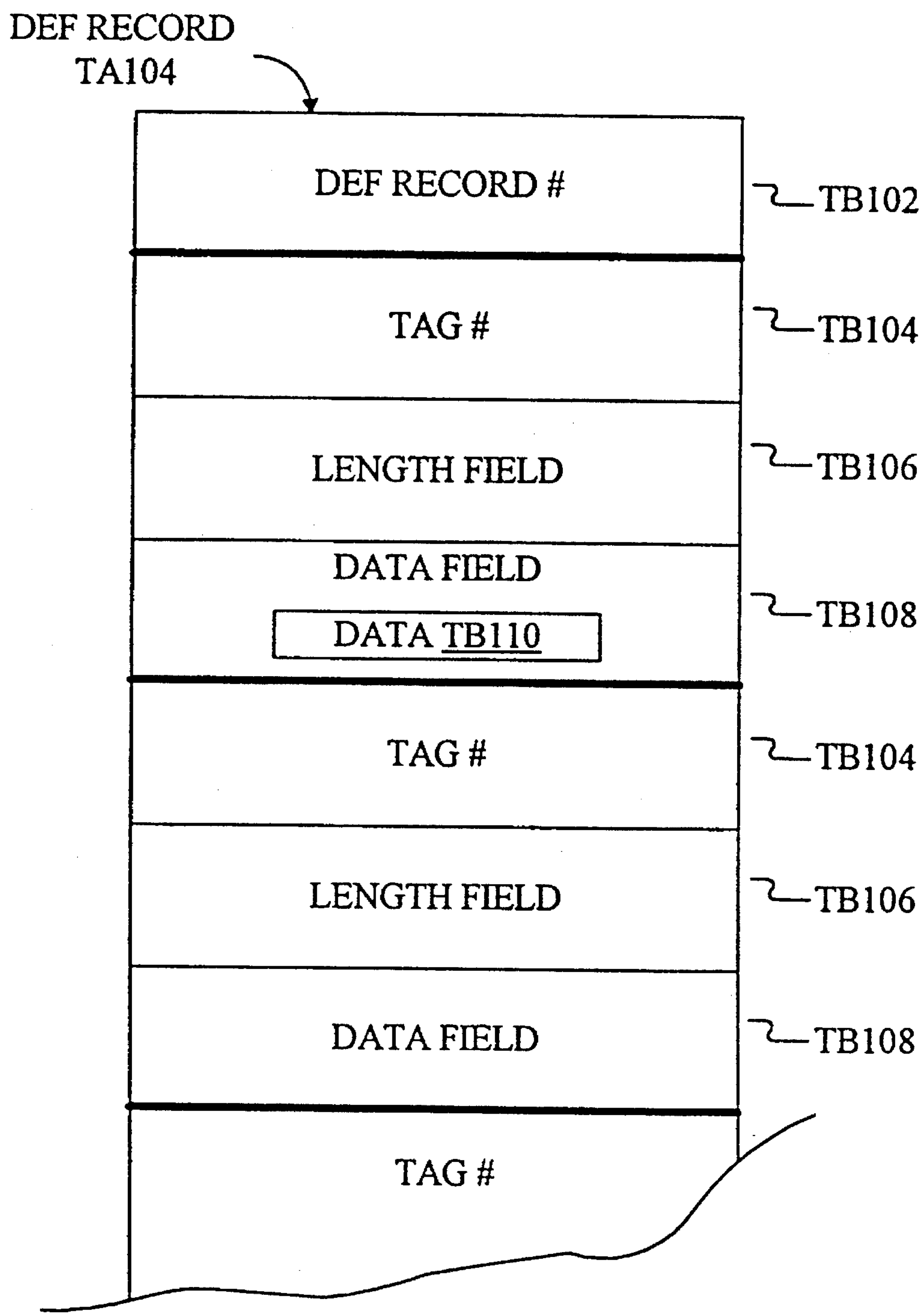

FIG. 152 is a diagram illustrating the structure of a DEF record according to one embodiment according to one embodiment of the invention.

Figure 153:
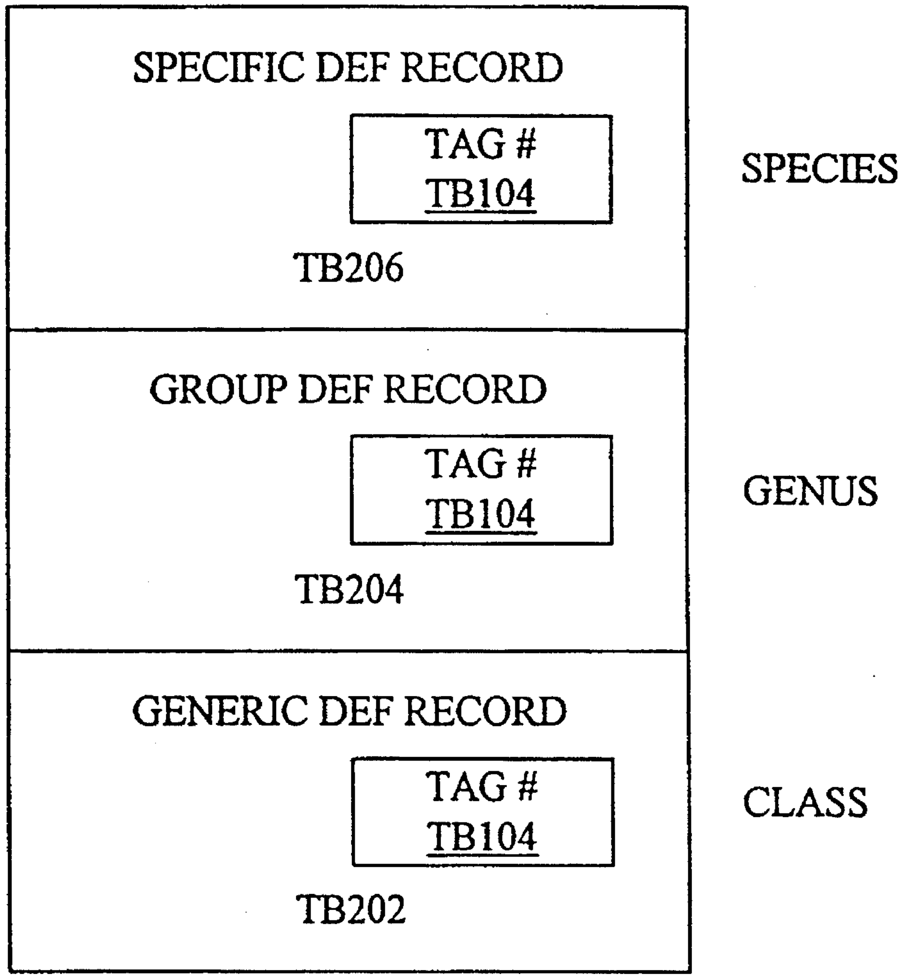

FIG. 153 is a diagram illustrating how different levels of DEF records can be used to optimize data storage according to one embodiment of the invention.

Figure 154:
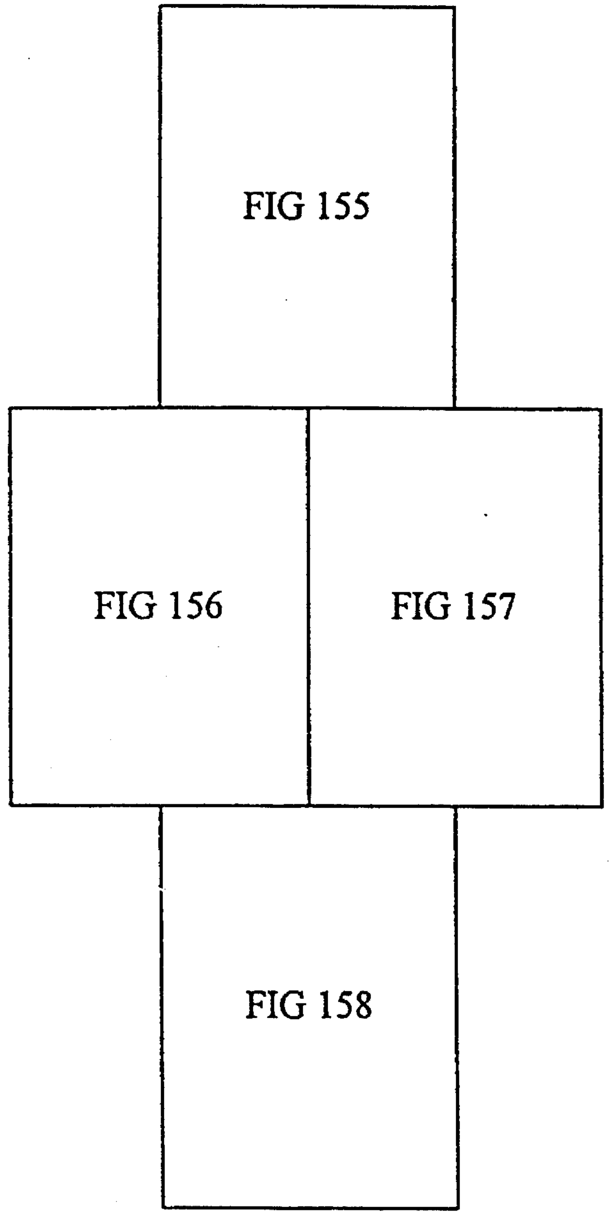

FIG. 154, which comprises FIGS. 155, 156, 157, and 158, is an operational flow diagram illustrating the high level operator services scenario according to one embodiment of the invention.

Figure 155:
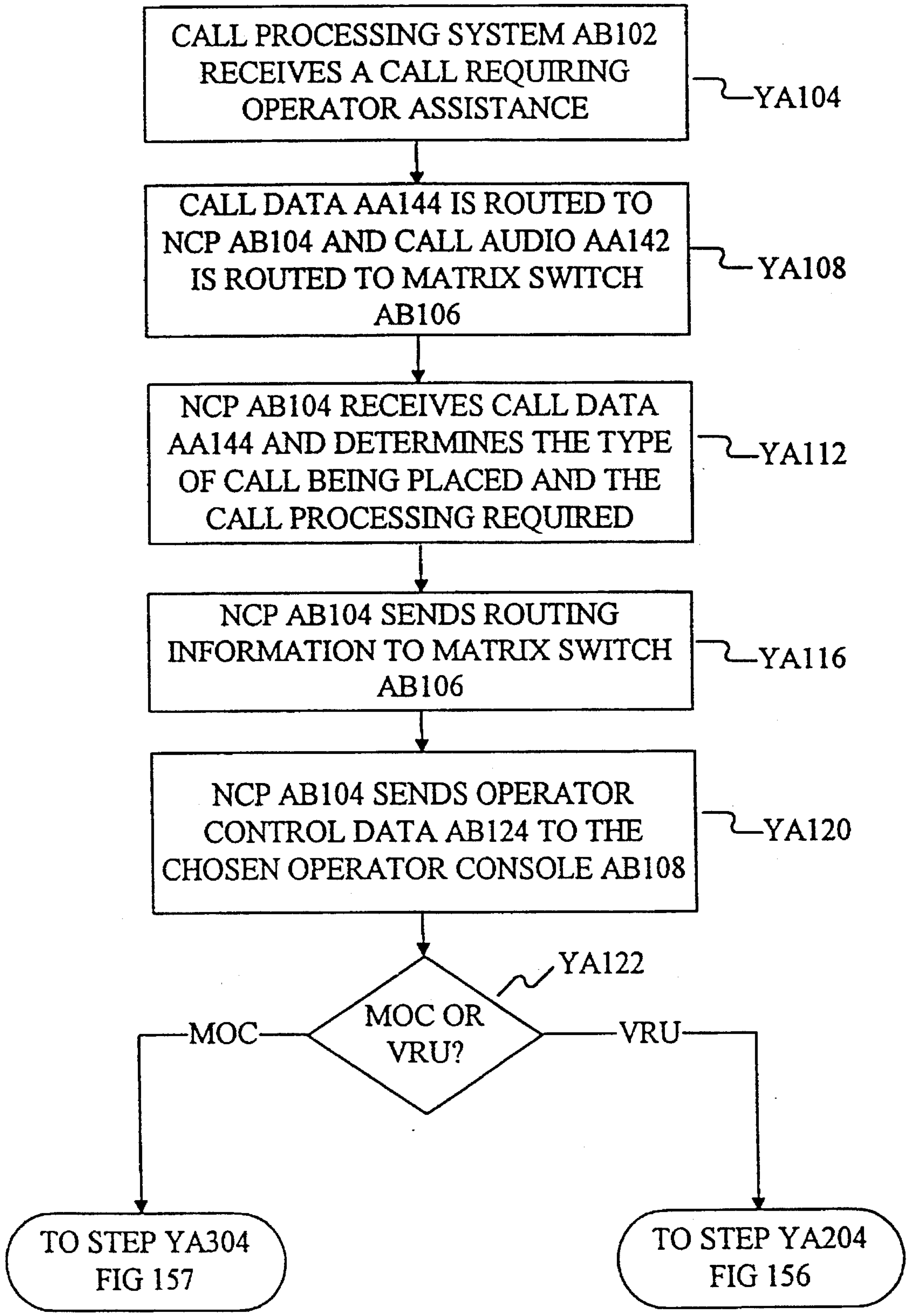

FIG. 155 is an operational flow diagram illustrating the high level operator services scenario according to one embodiment of the invention.

Figure 156:
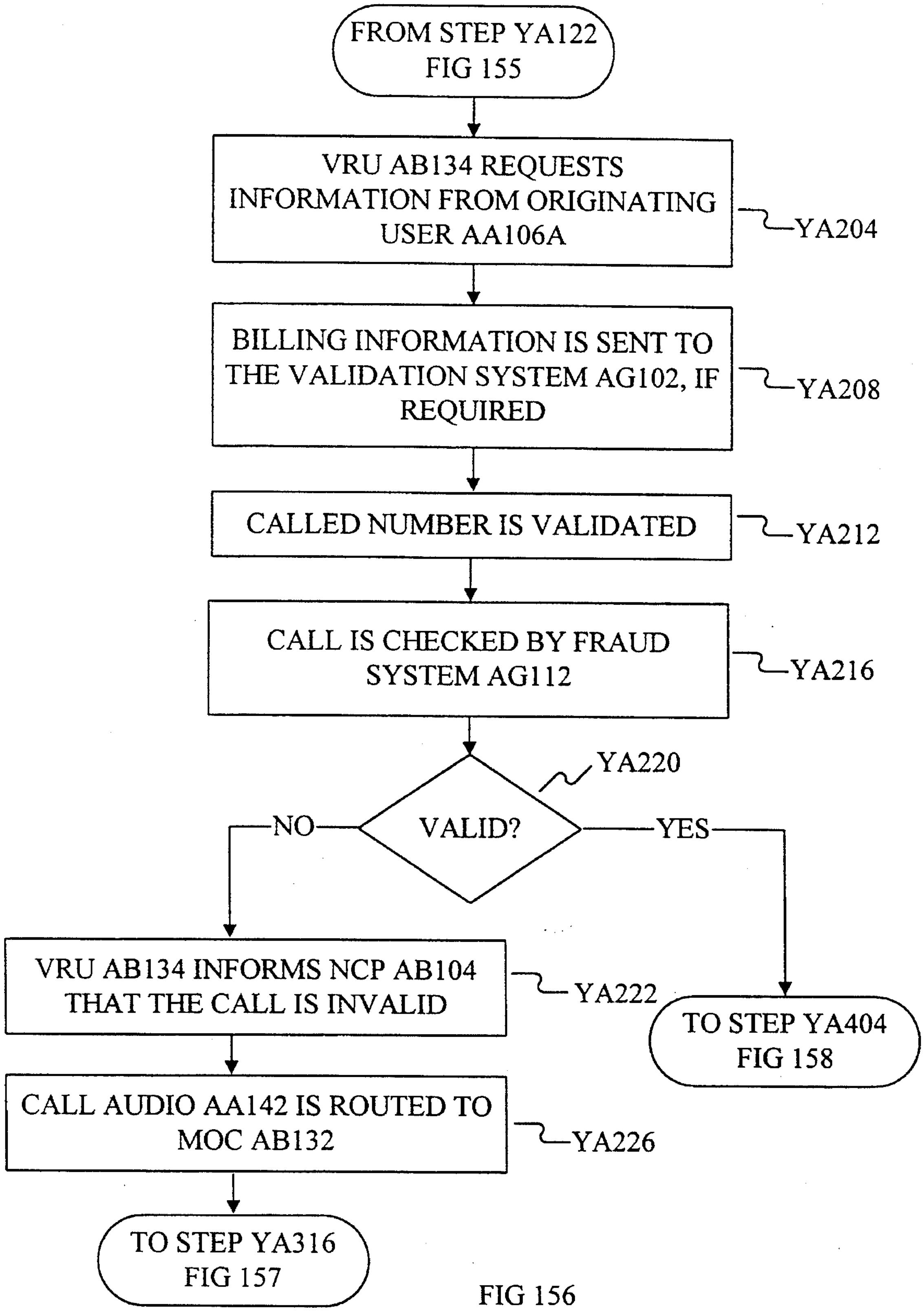

FIG. 156, which is a continuation of FIG. 155, is an operational flow diagram illustrating the high level operator services scenario according to one embodiment of the invention.

Figure 157:
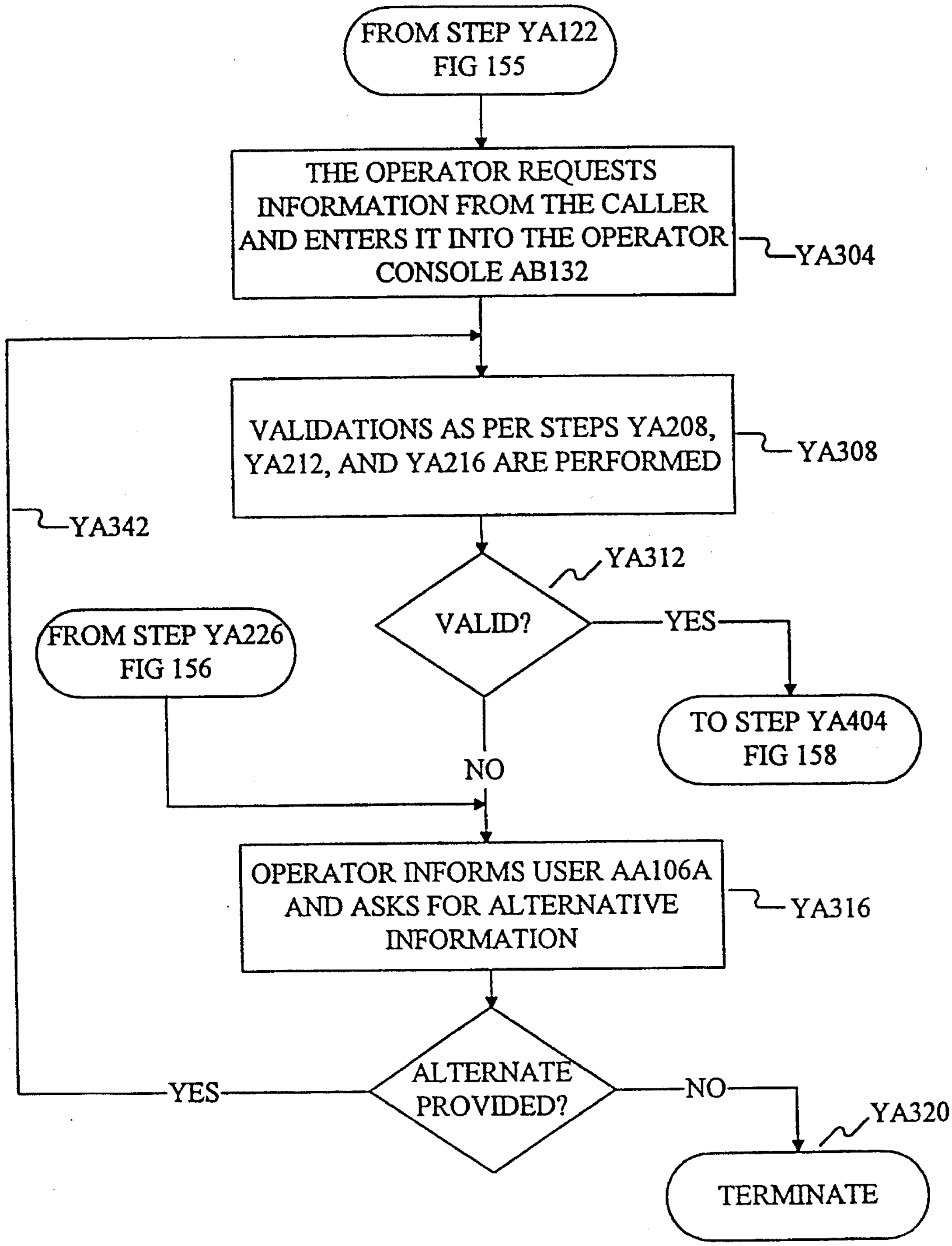

FIG. 157, which is a continuation of FIGS. 155 and 156 is an operational flow diagram illustrating the high level operator services scenario according to one embodiment of the invention.

Figure 158:
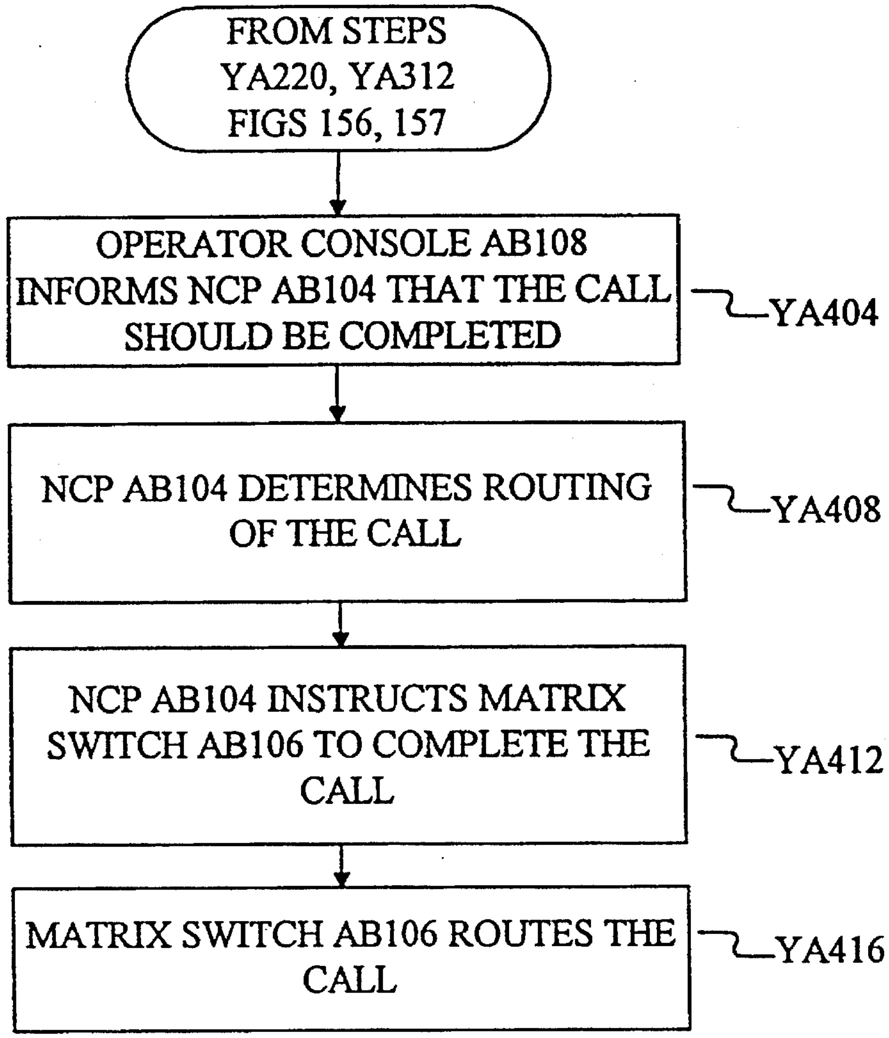

FIG. 158, which is a continuation of FIGS. 156 and 157, is an operational flow diagram illustrating the high level operator services scenario according to one embodiment of the invention.

Figure 159:
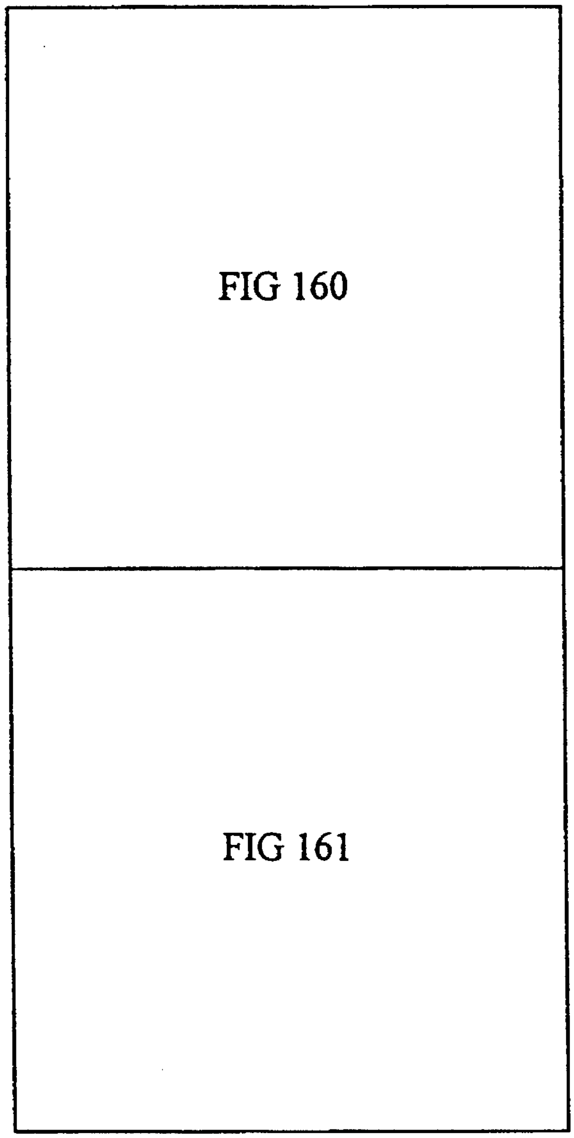
Figure 160:
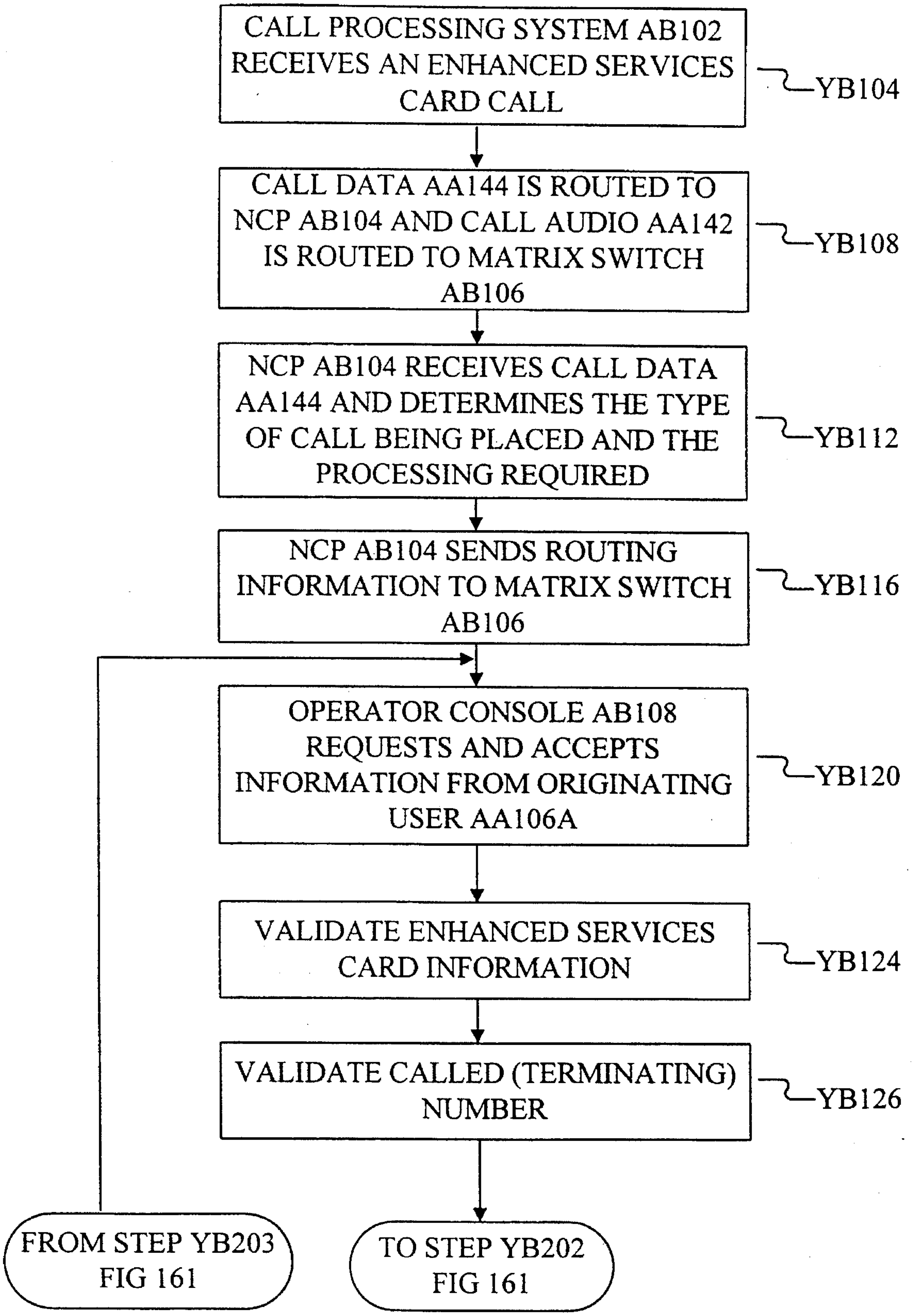
Figure 161:
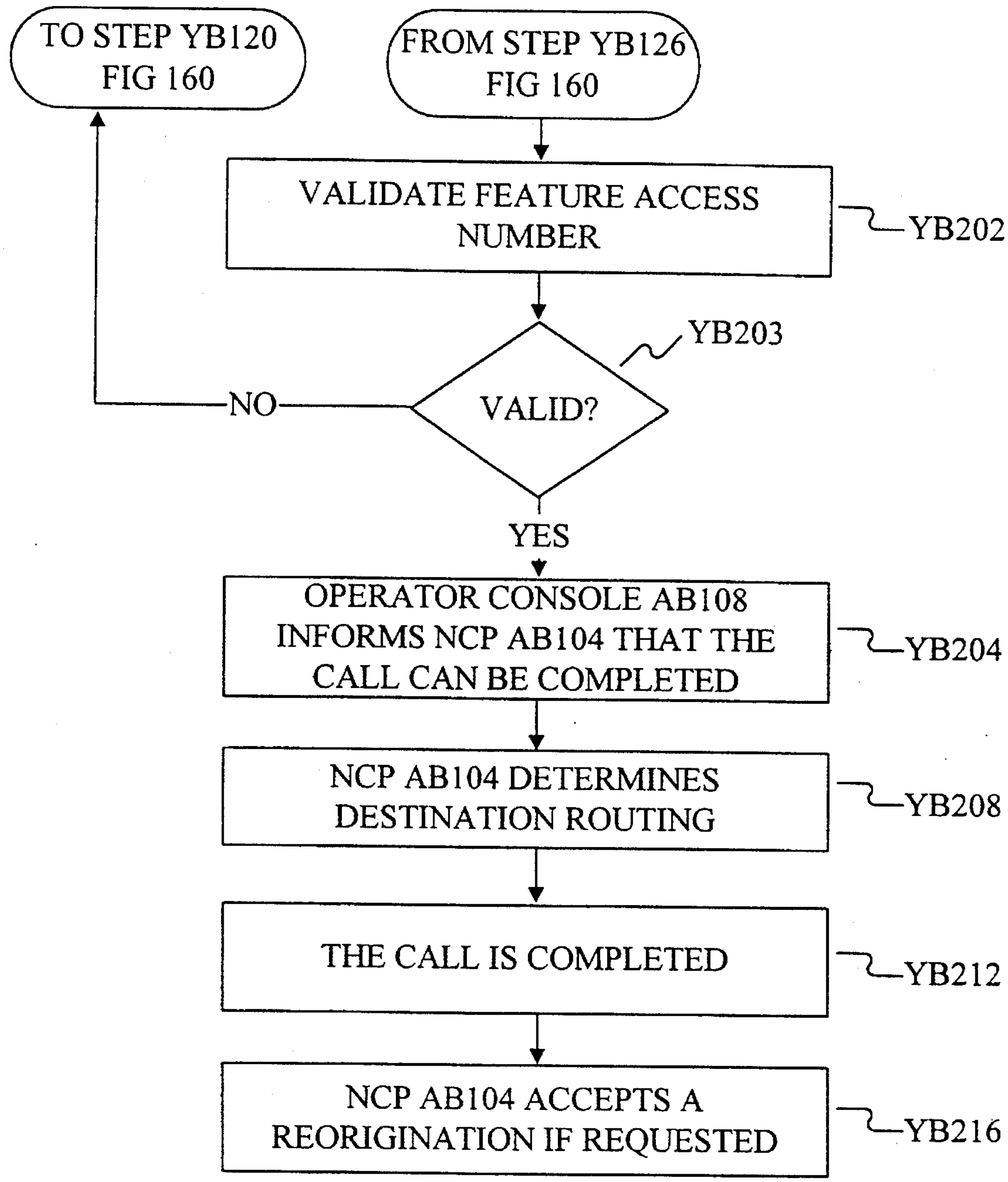

FIG. 159, which comprises FIGS. 160 and 161, is an operational flow diagram illustrating the manner in which the call processing system processes an enhanced services card call according to one embodiment of the invention.

FIG. 160 is an operational flow diagram illustrating the manner in which the call processing system processes an enhanced services card call according to one embodiment of the invention.

FIG. 161, which is a continuation of FIG. 160, is an operational flow diagram illustrating the manner in which the call processing system processes an enhanced services card call according to one embodiment of the invention.

Figure 162:
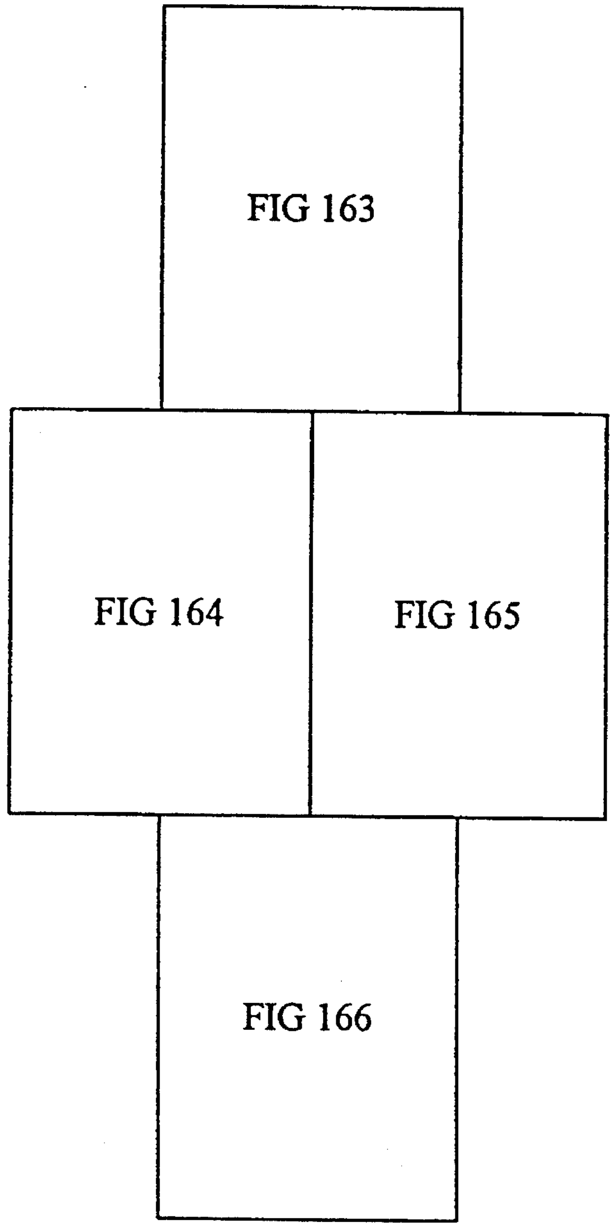

FIG. 162, which comprises FIGS. 163, 164, 165, and 166, is an operational flow diagram illustrating a debit card calling scenario according to one embodiment of the invention.

Figure 163:
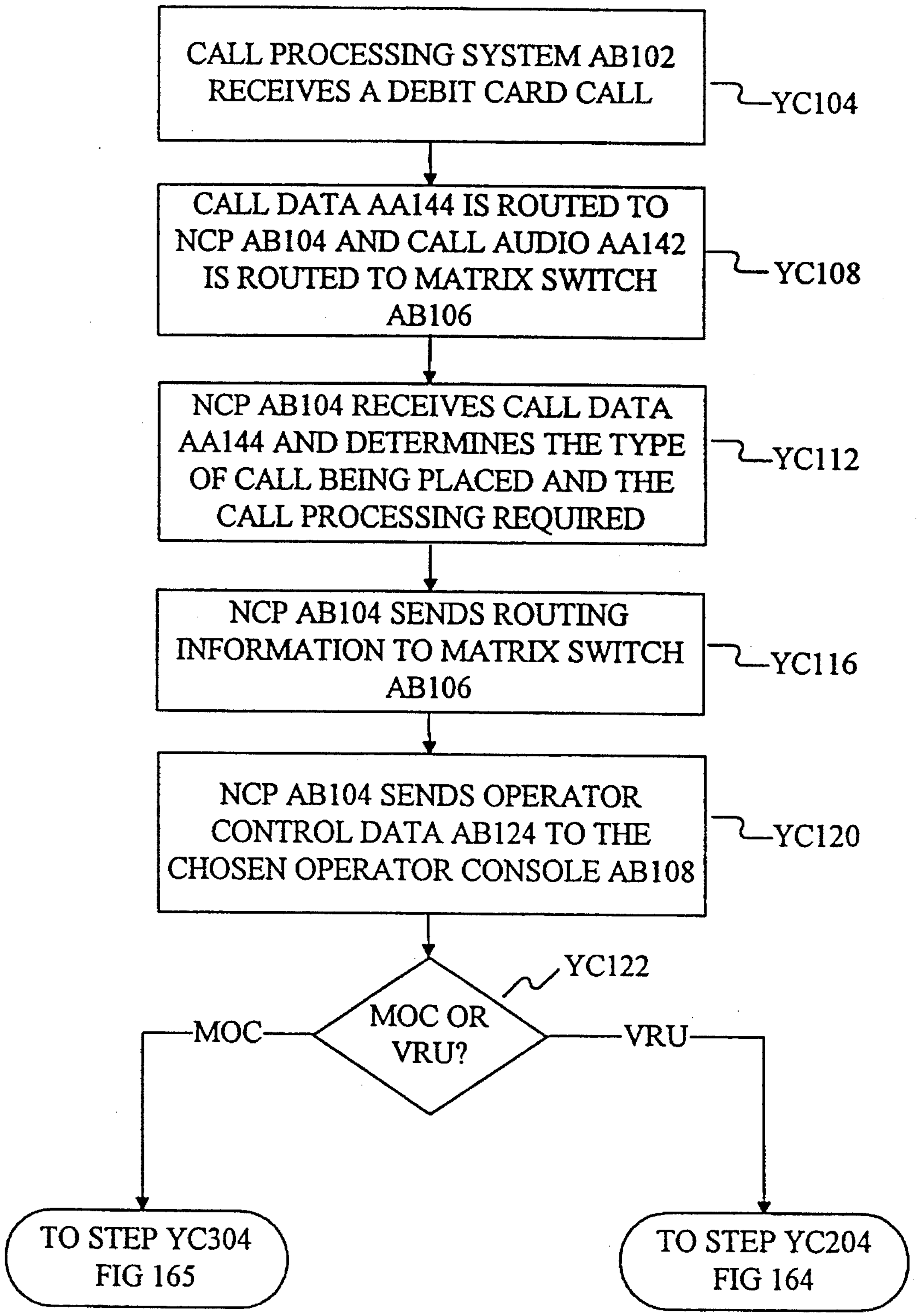

FIG. 163 is an operational flow diagram illustrating a debit card calling scenario according to one embodiment of the invention.

Figure 164:
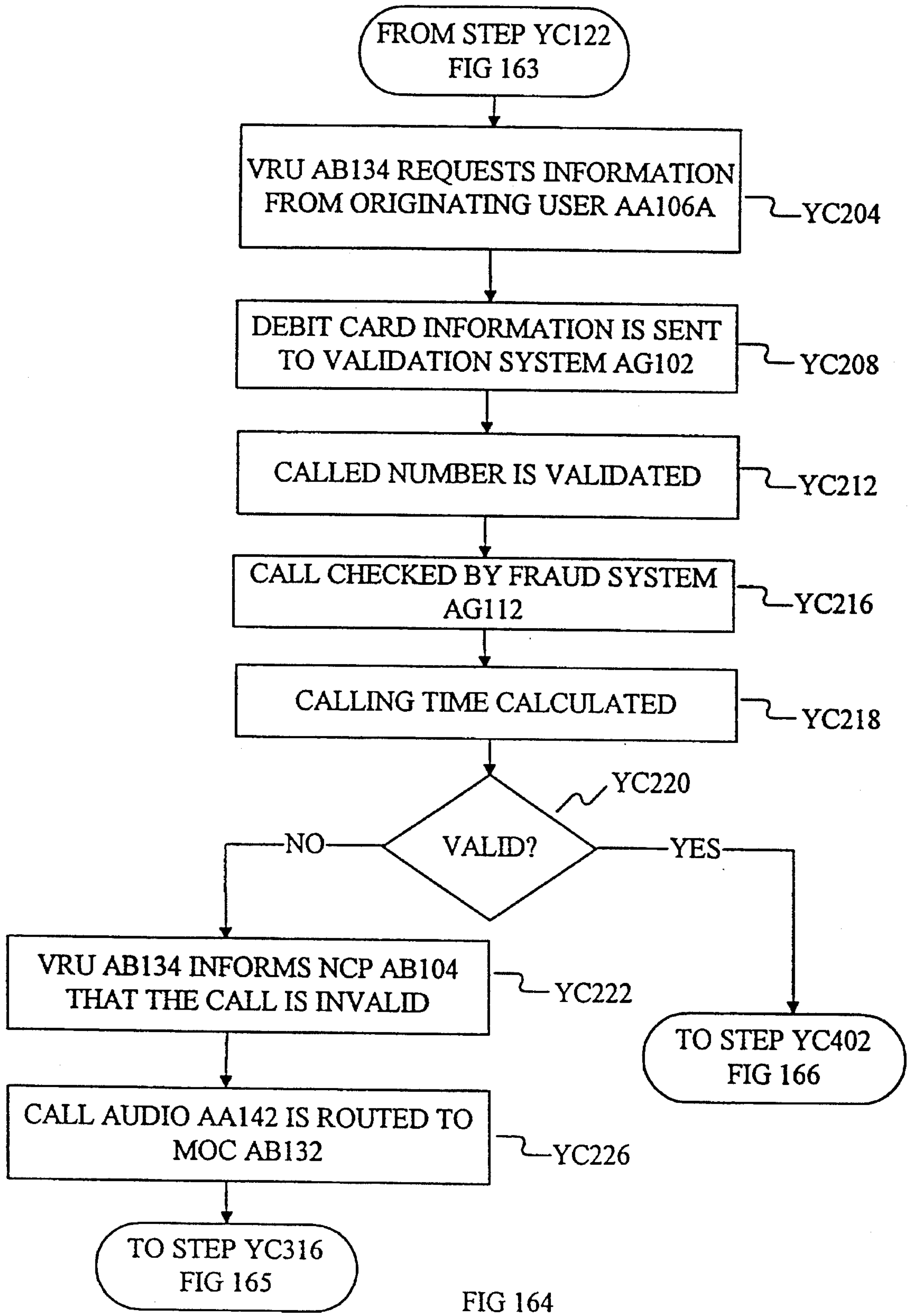

FIG. 164, which is a continuation of FIG. 163, is an operational flow diagram illustrating a debit card calling scenario according to one embodiment of the invention.

Figure 165:
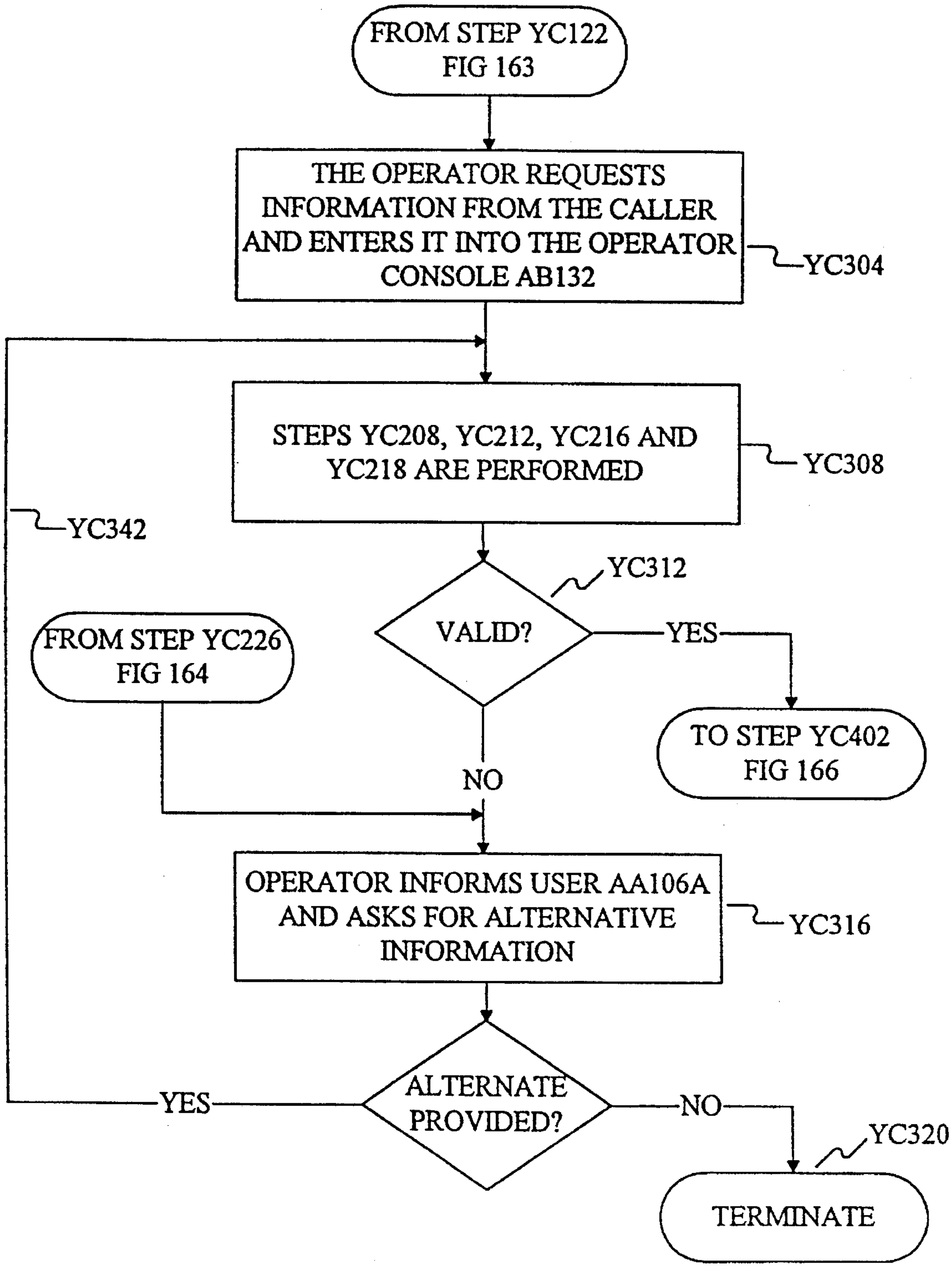

FIG. 165, which is a continuation of FIG. 163, is an operational flow diagram illustrating a debit card calling scenario according to one embodiment of the invention.

Figure 166:
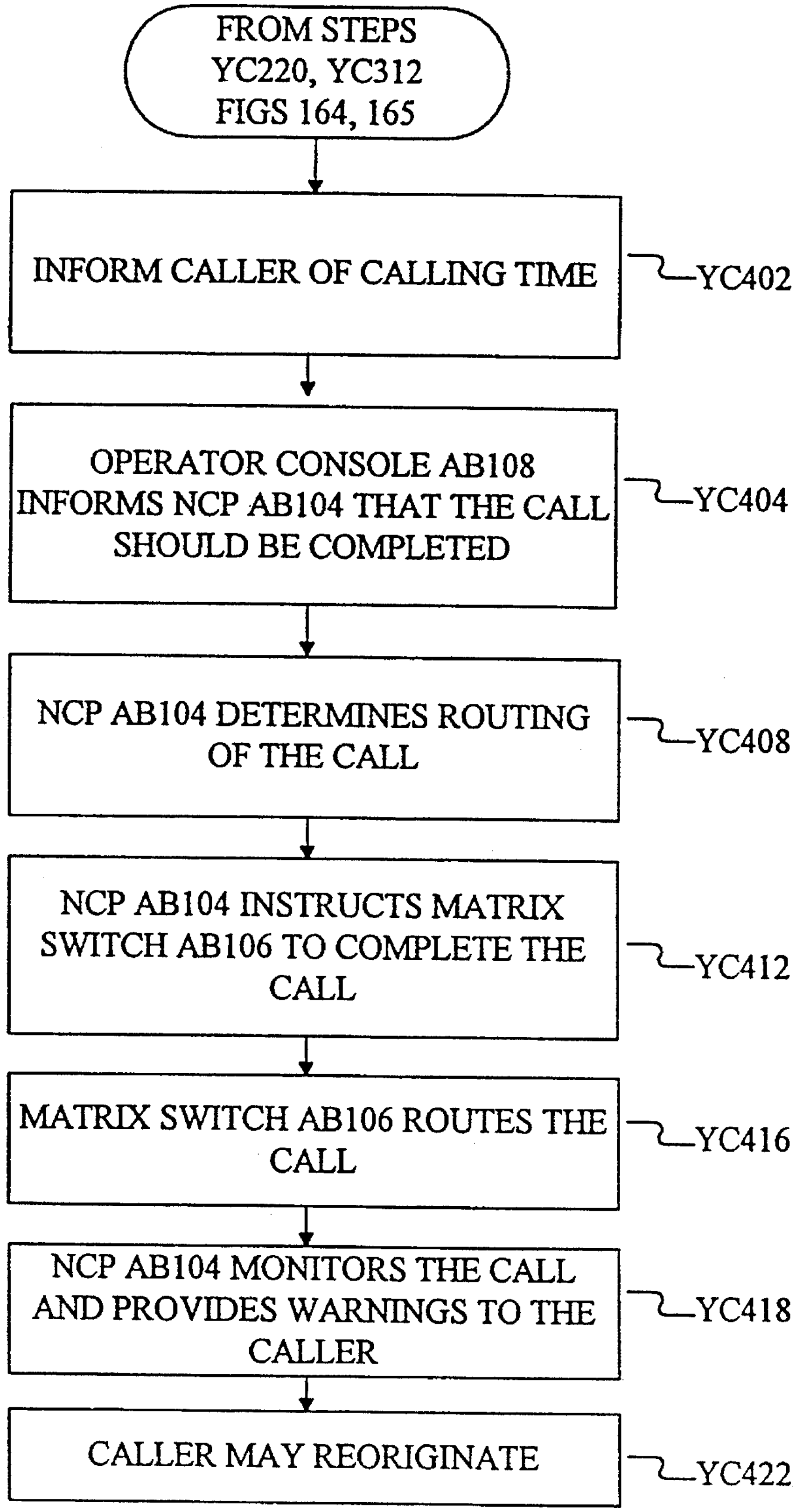

FIG. 166, which is a continuation of FIGS. 164 and 165, is an operational flow diagram illustrating a debit card calling scenario according to one embodiment of the invention.

Figure 167:
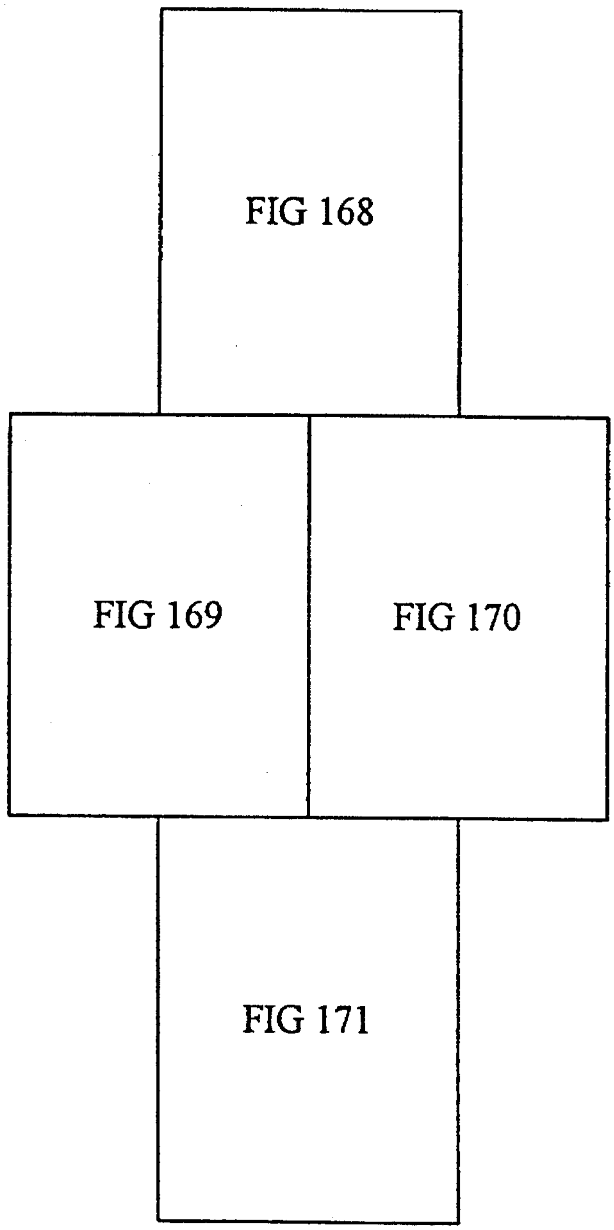

FIG. 167, which comprises FIGS. 168, 169, 170, and 171, is an operational flow diagram illustrating the manner in which a subscriber re-routes an 800 number according to one embodiment of the invention.

Figure 168:
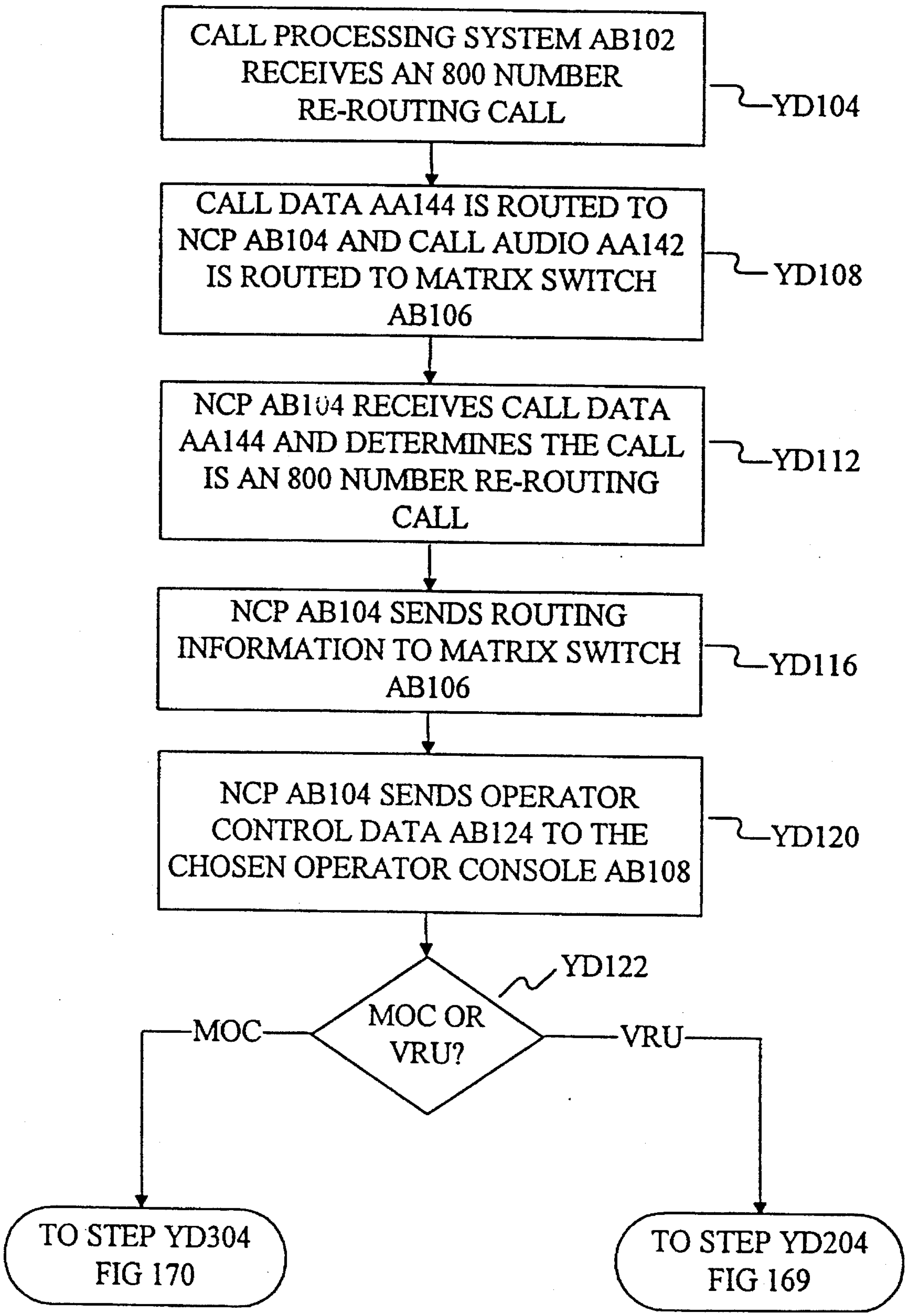

FIG. 168 is an operational flow diagram illustrating the manner in which a subscriber re-routes an 800 number according to one embodiment of the invention.

Figure 169:
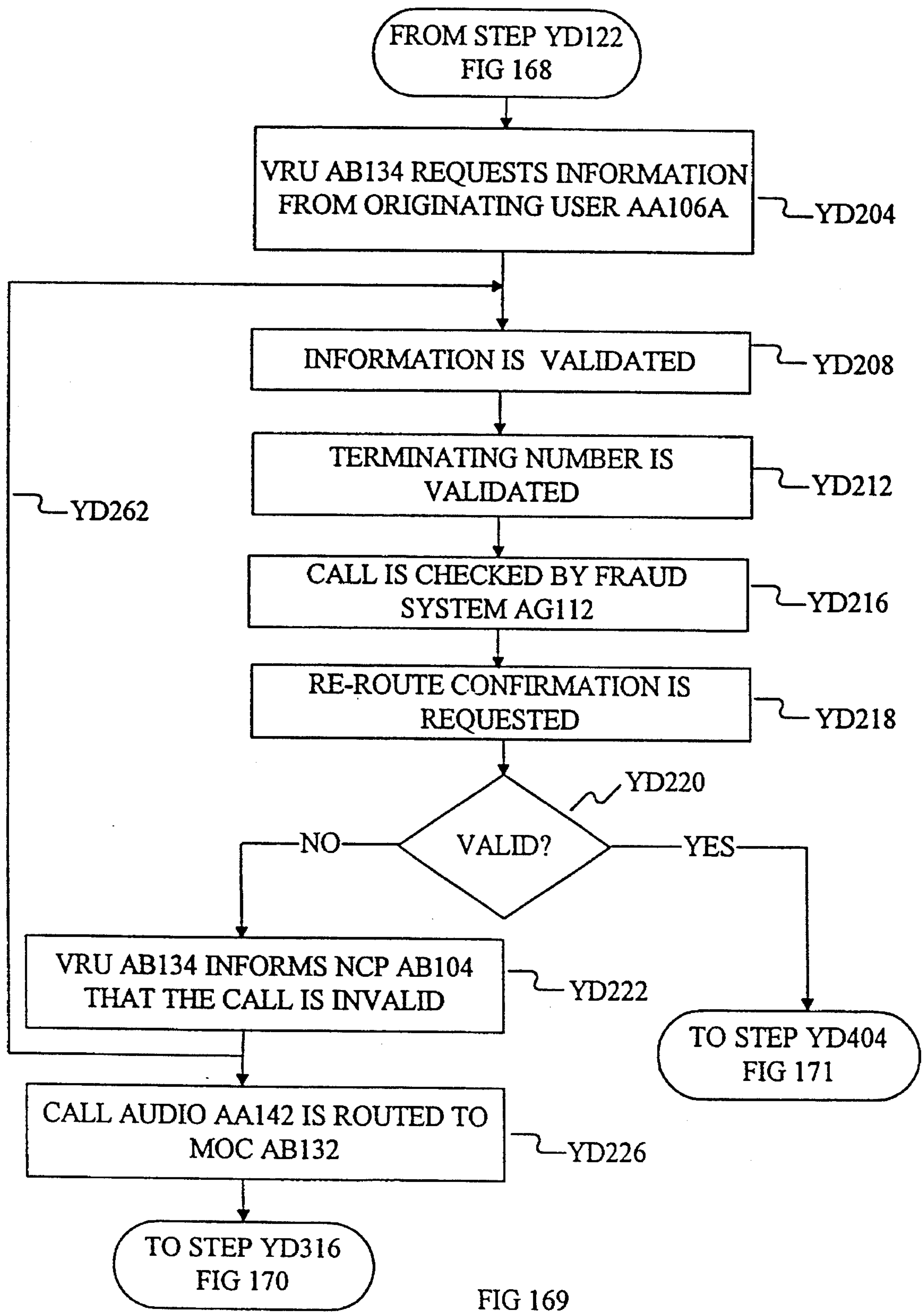

FIG. 169, which is a continuation of FIG. 168, is an operational flow diagram illustrating the manner in which a subscriber re-routes an 800 number according to one embodiment of the invention.

Figure 170:
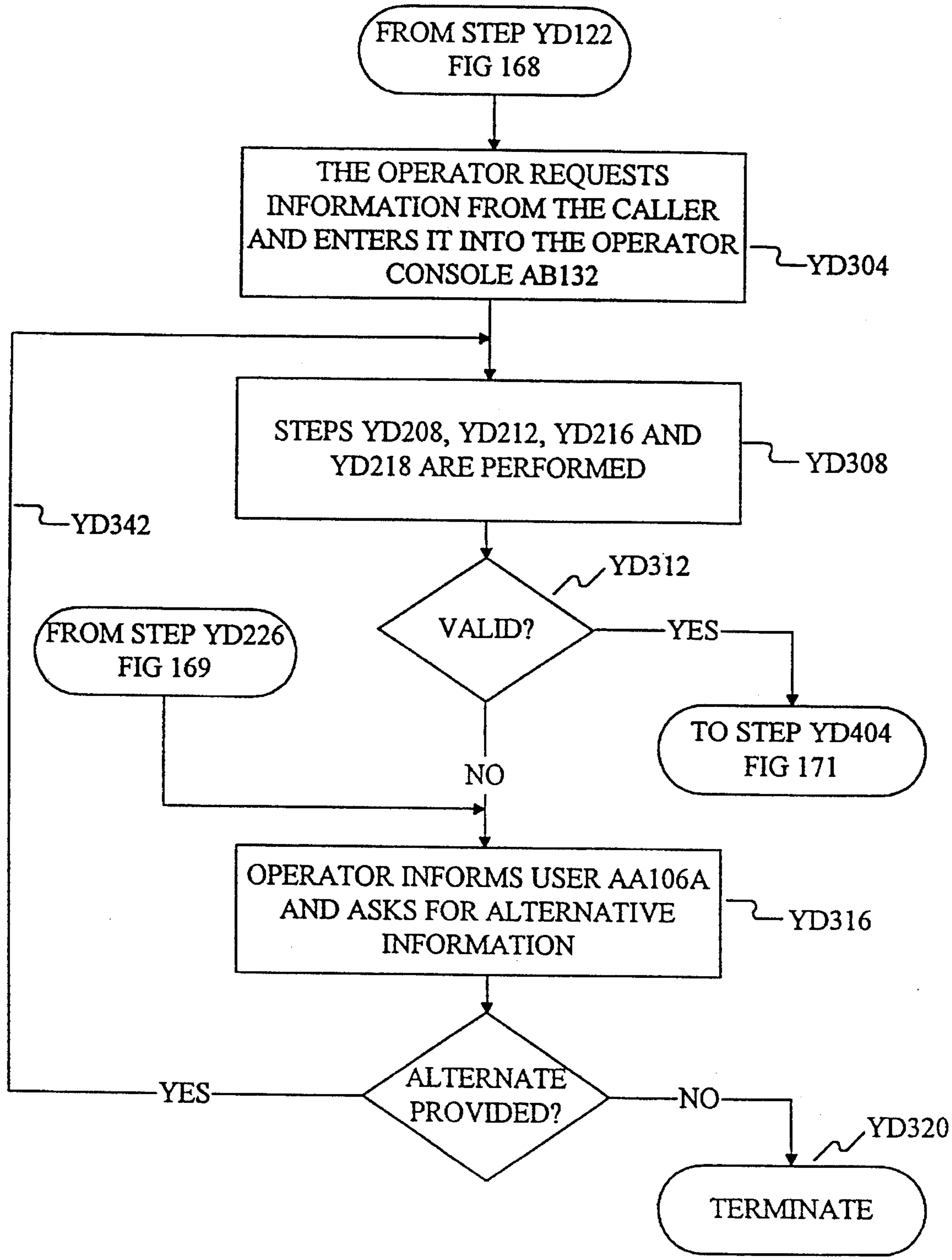

FIG. 170, which is a continuation of FIG. 168, is an operational flow diagram illustrating the manner in which a subscriber re-routes an 800 number according to one embodiment of the invention.

Figure 171:
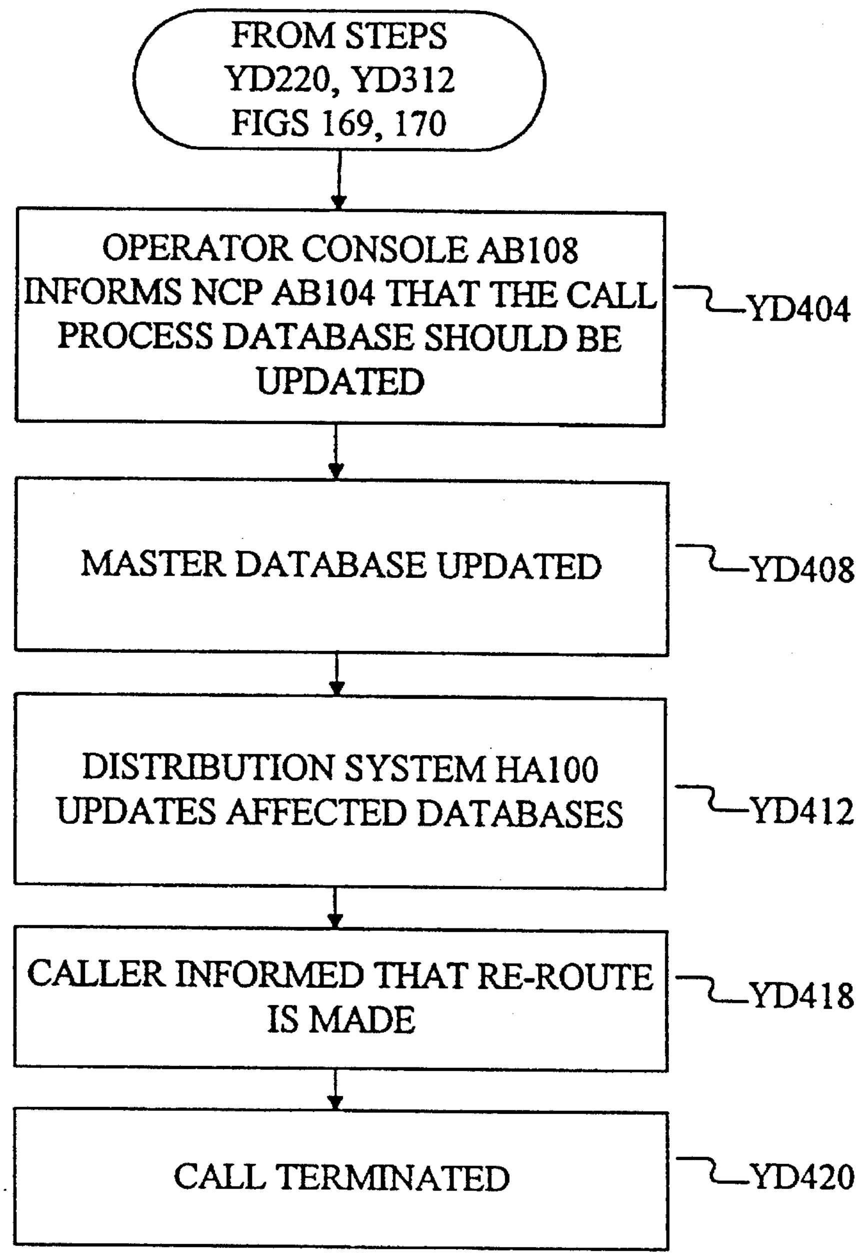

FIG. 171, which is a continuation of FIGS. 169 and 170, is an operational flow diagram illustrating the manner in which a subscriber re-routes an 800 number according to one embodiment of the invention.

Figure 172:
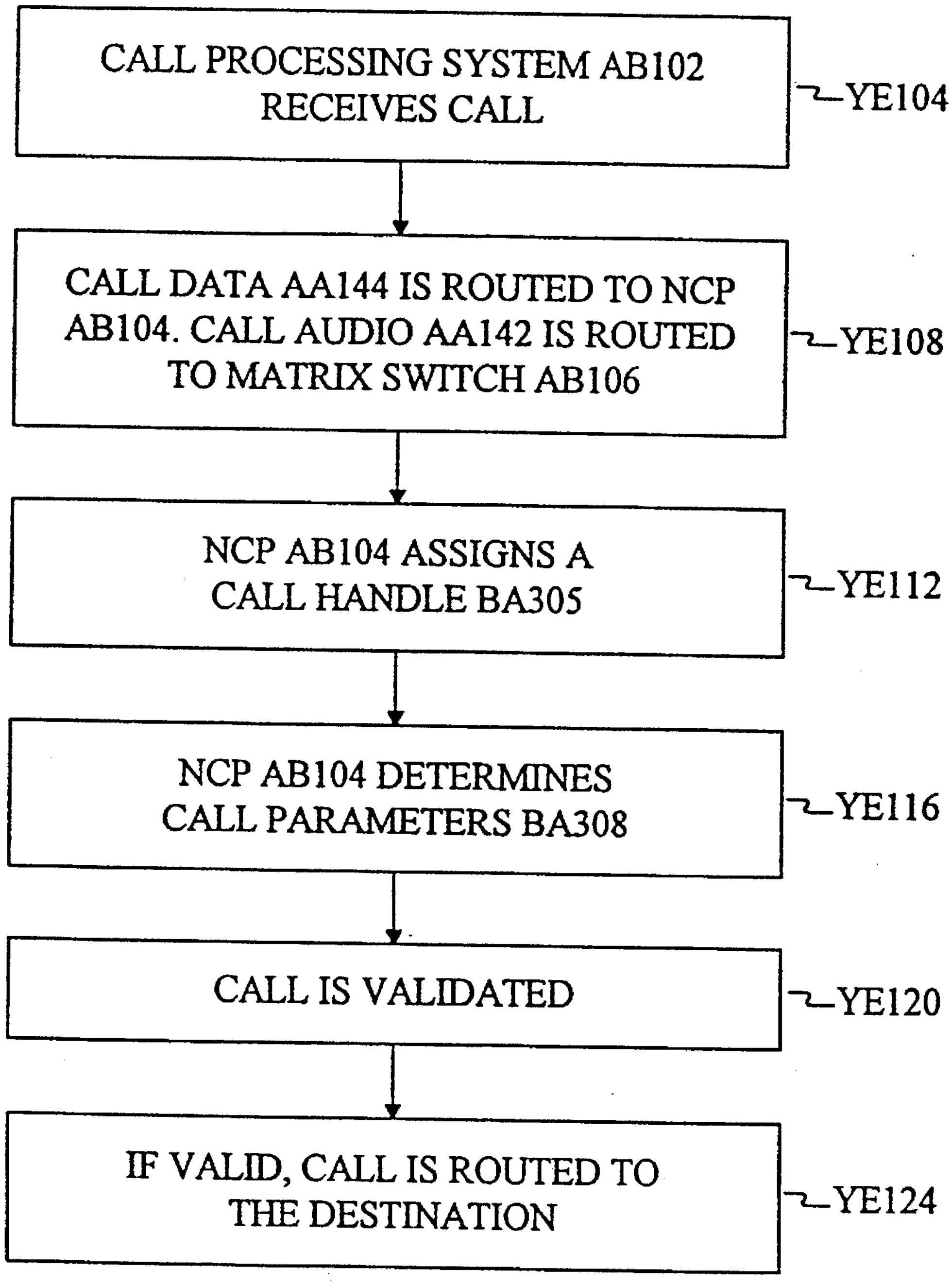

FIG. 172, is an operational flow diagram illustrating the placement of a direct-dial long-distance call.

Figure 173:
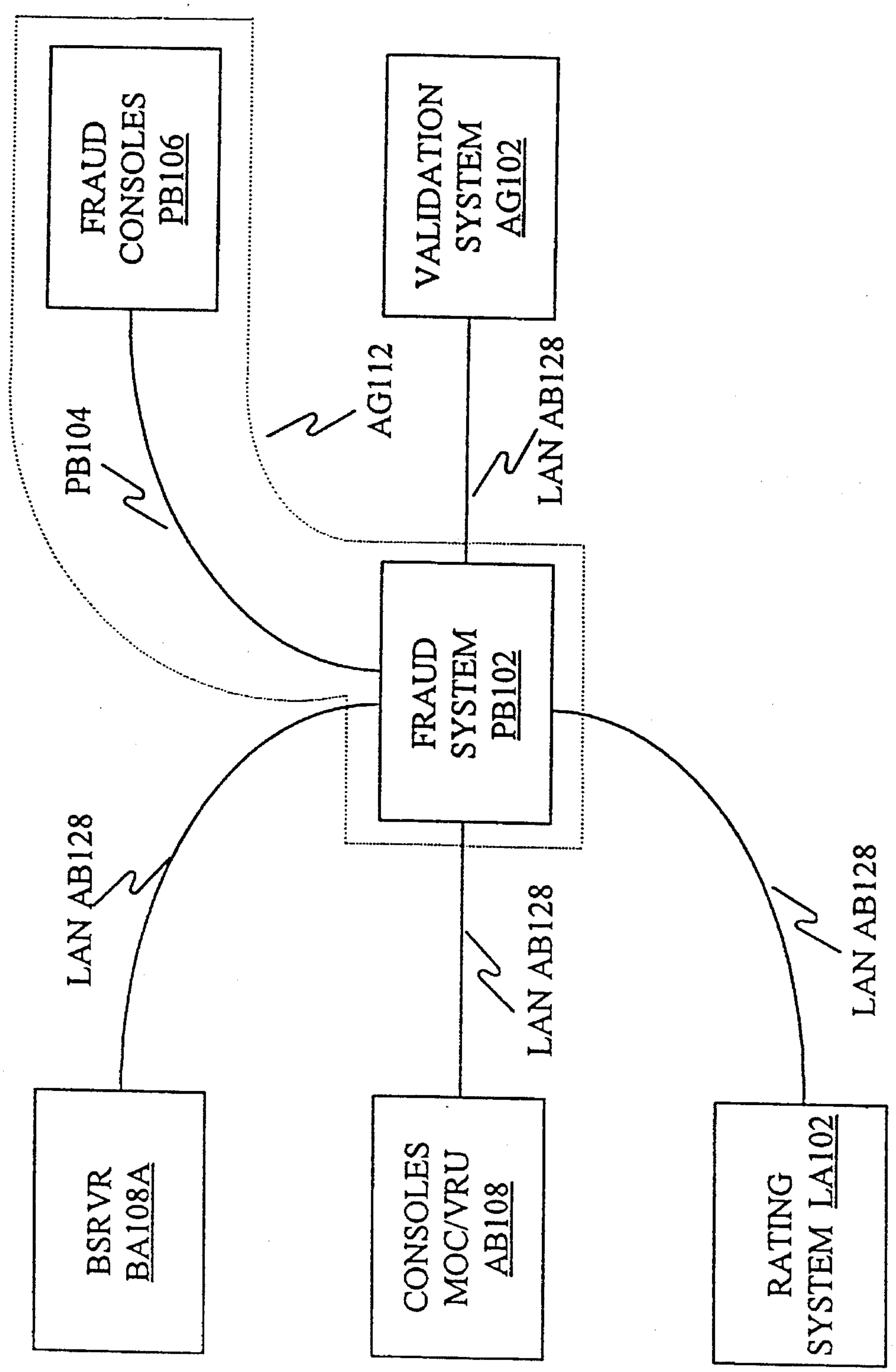

FIG. 173 is a high-level architectural block diagram showing the relationship and interfaces of the fraud detection and prevention system with regard to the other relevant systems (components) and showing the communications pathways between the same.

Figure 174:
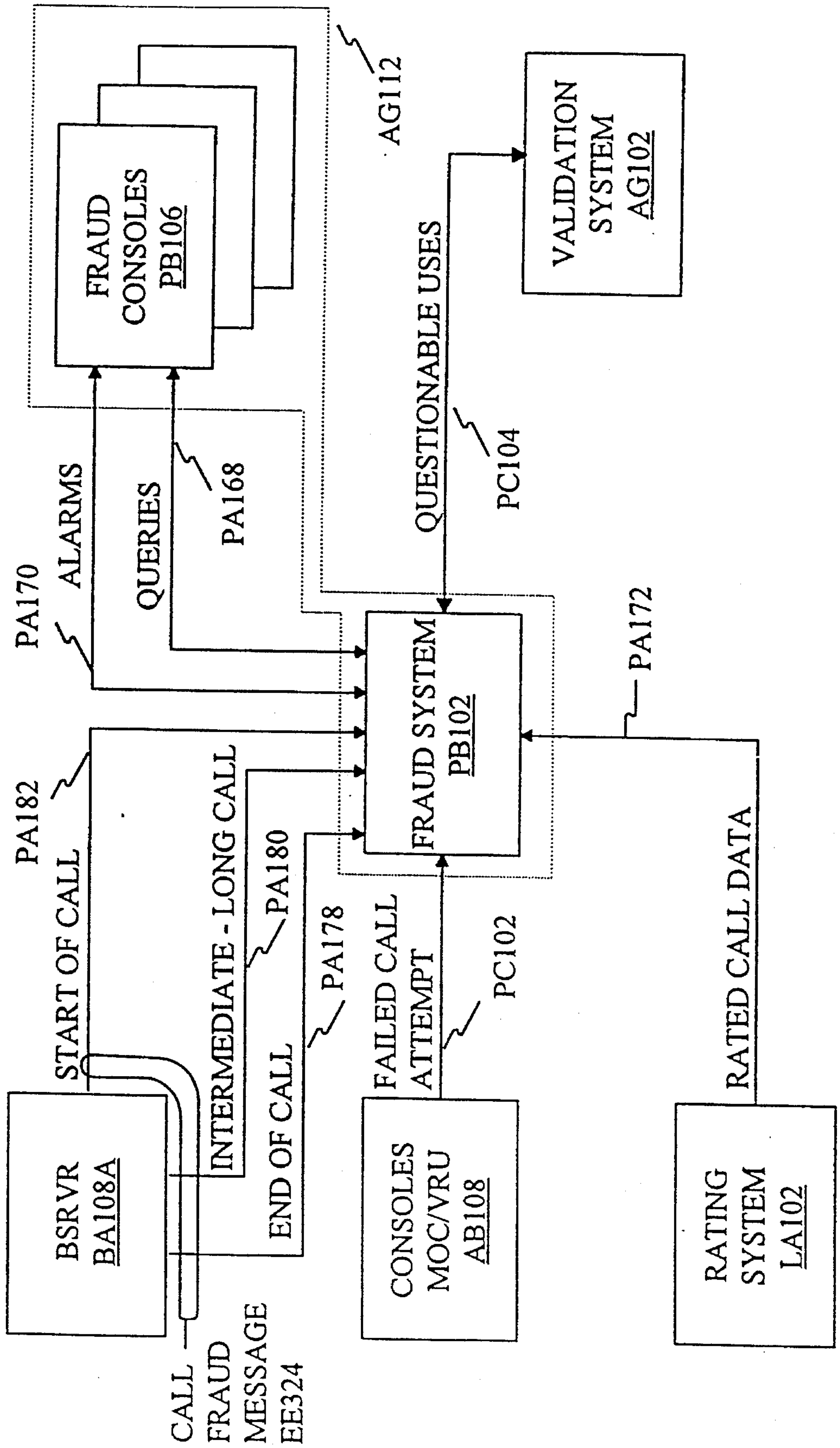

FIG. 174 is a data flow diagram showing the flow of the important commands (messages) to and from the fraud detection and the prevention system and the other systems (components) of the present invention.

Figure 175:
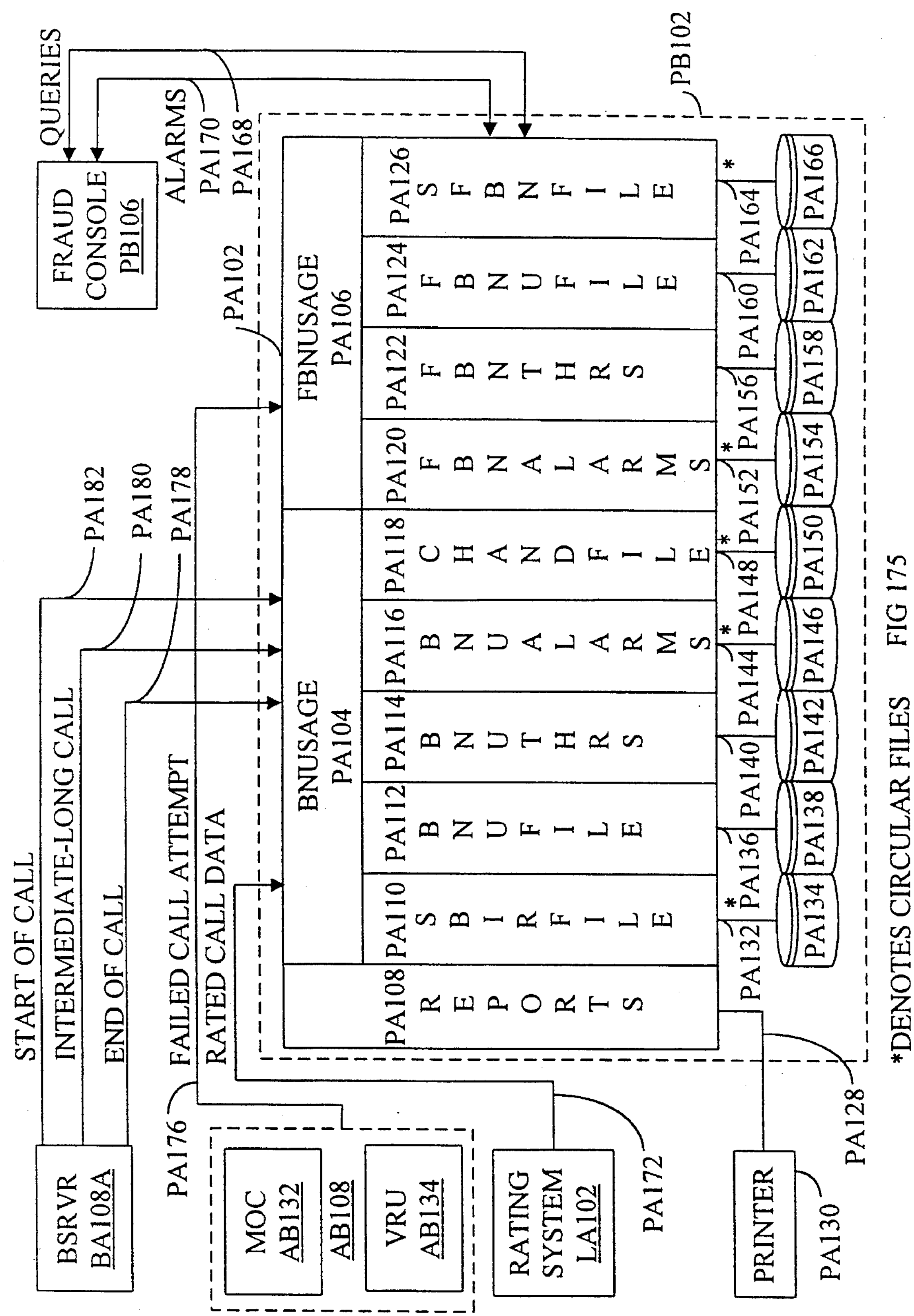

FIG. 175 is a high-level block diagram illustrating a representative architecture of the fraud system according to one embodiment of the invention.

Figure 176:
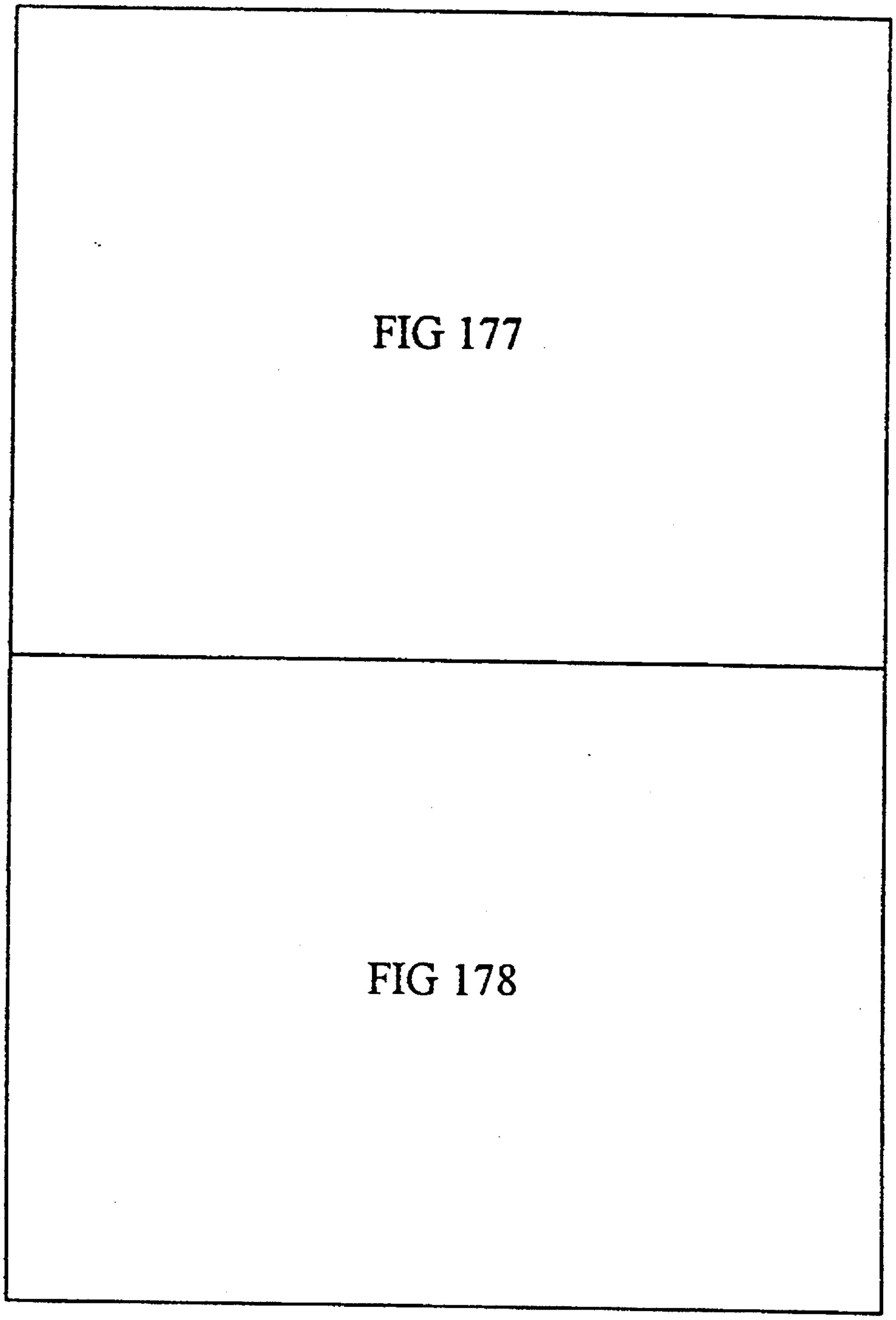
Figure 177:
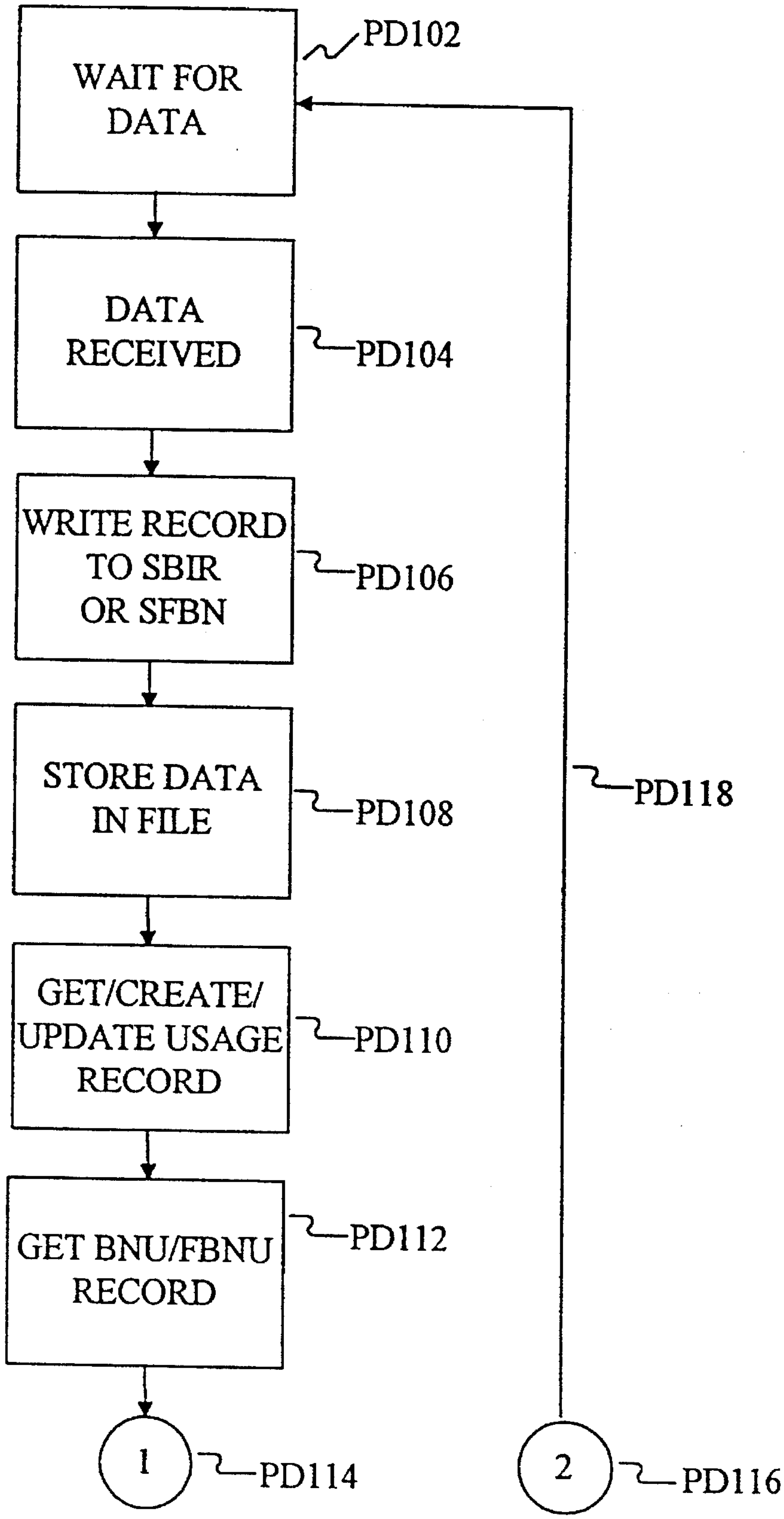
Figure 178:
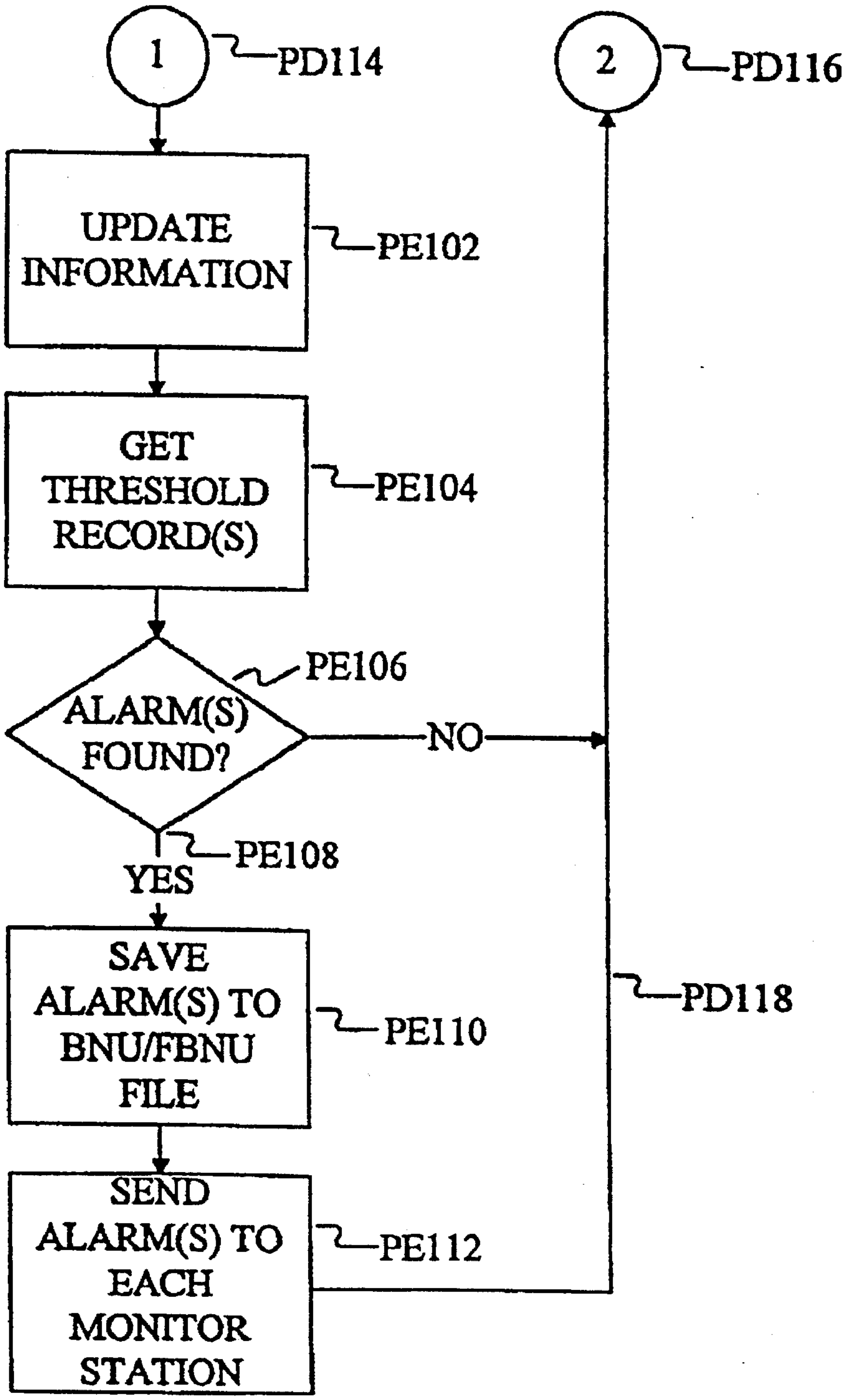

FIG. 176, which comprises a FIGS. 177 and 178, is a high-level operational flow diagram illustrating the steps of a generalized version of the fraud detection and/or scenario according to one embodiment of the invention.

Figure 179:
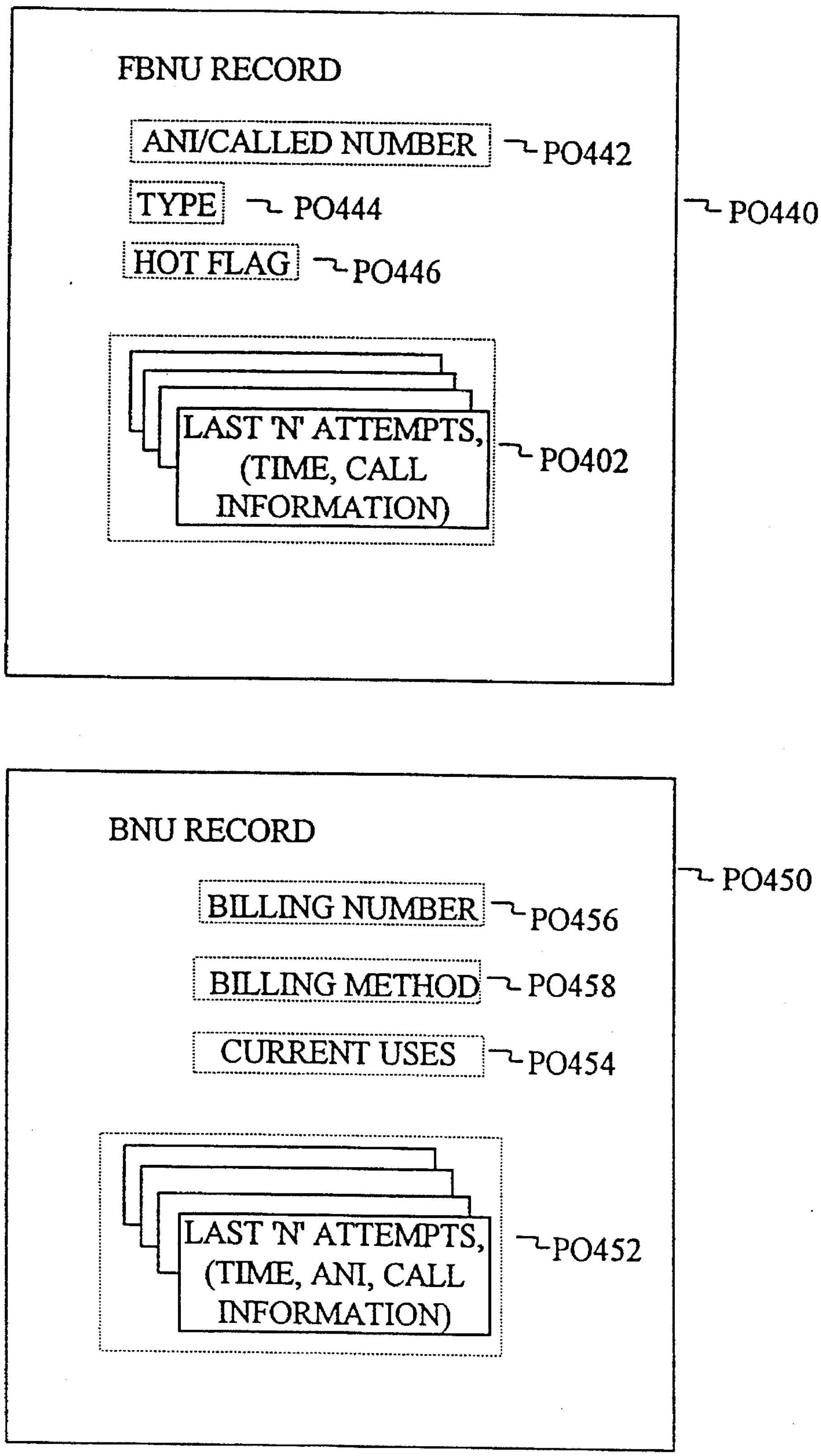

FIG. 179 is a diagram illustrating a failed billing number usage record and a billing number usage record according to one embodiment of the invention.

Figure 180:
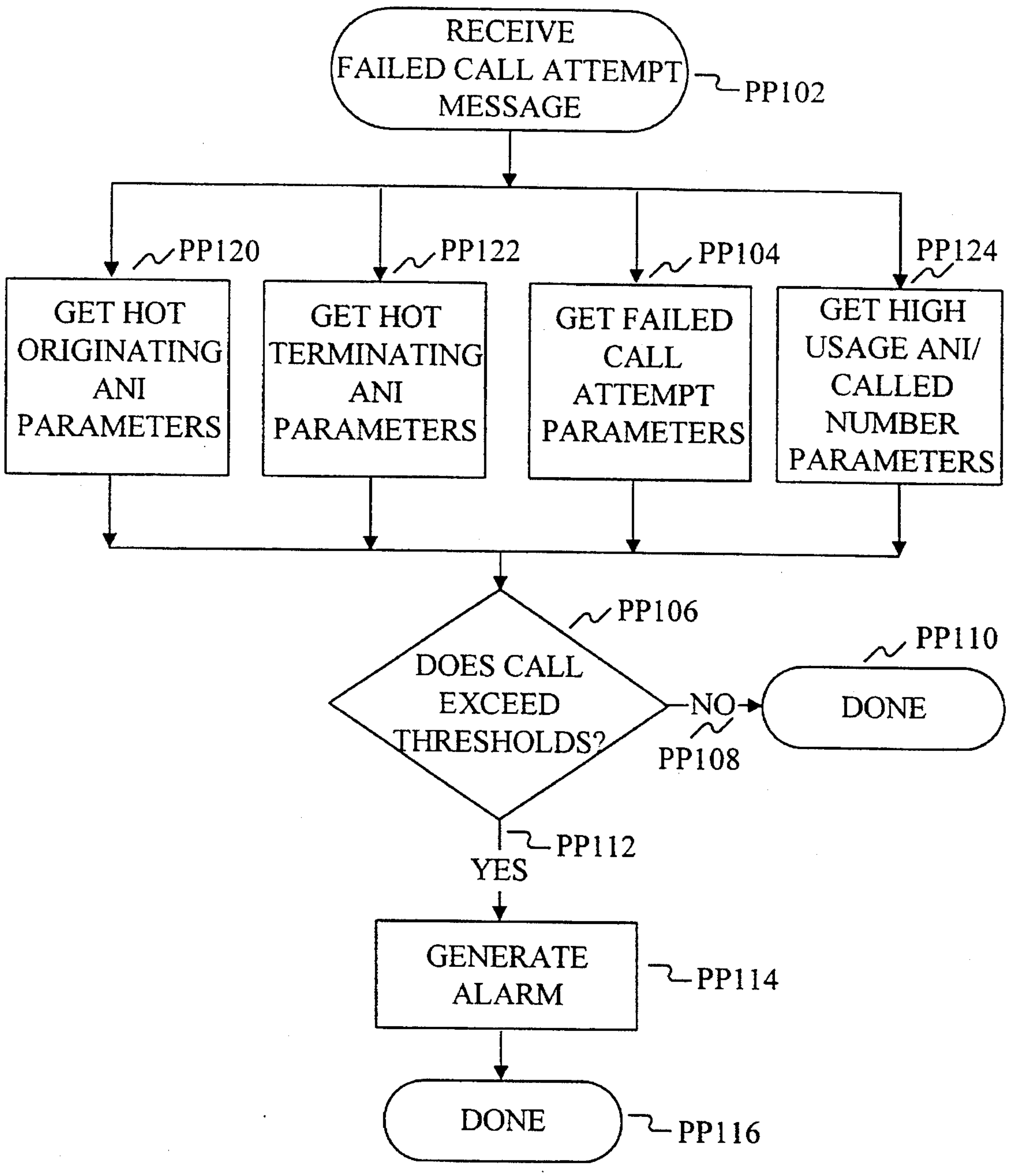
Figure 181:
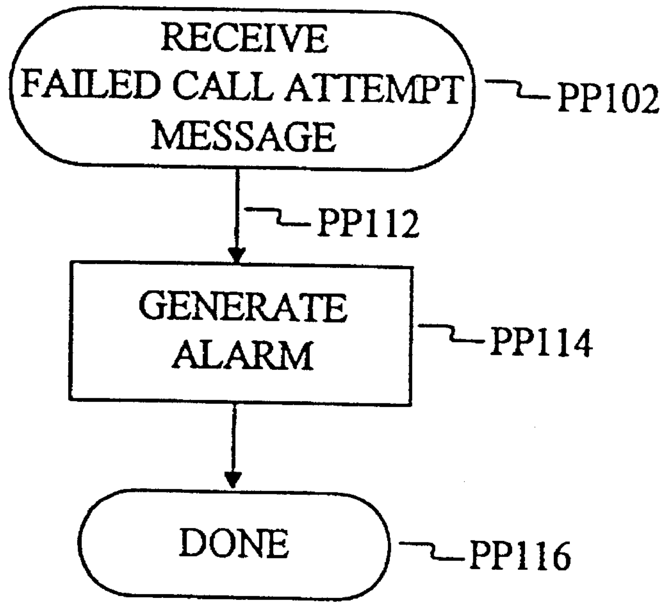
Figure 182:
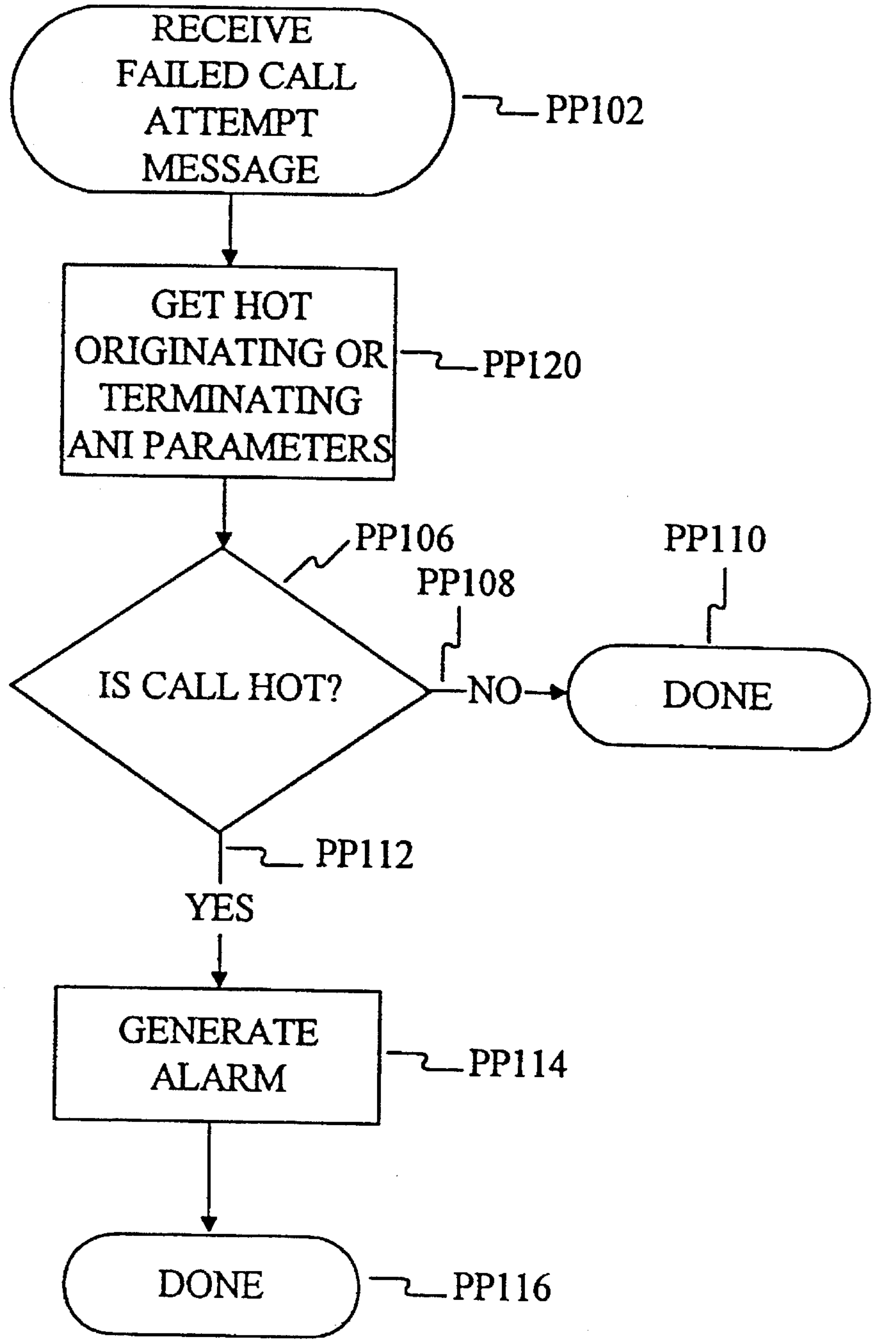
Figure 183:
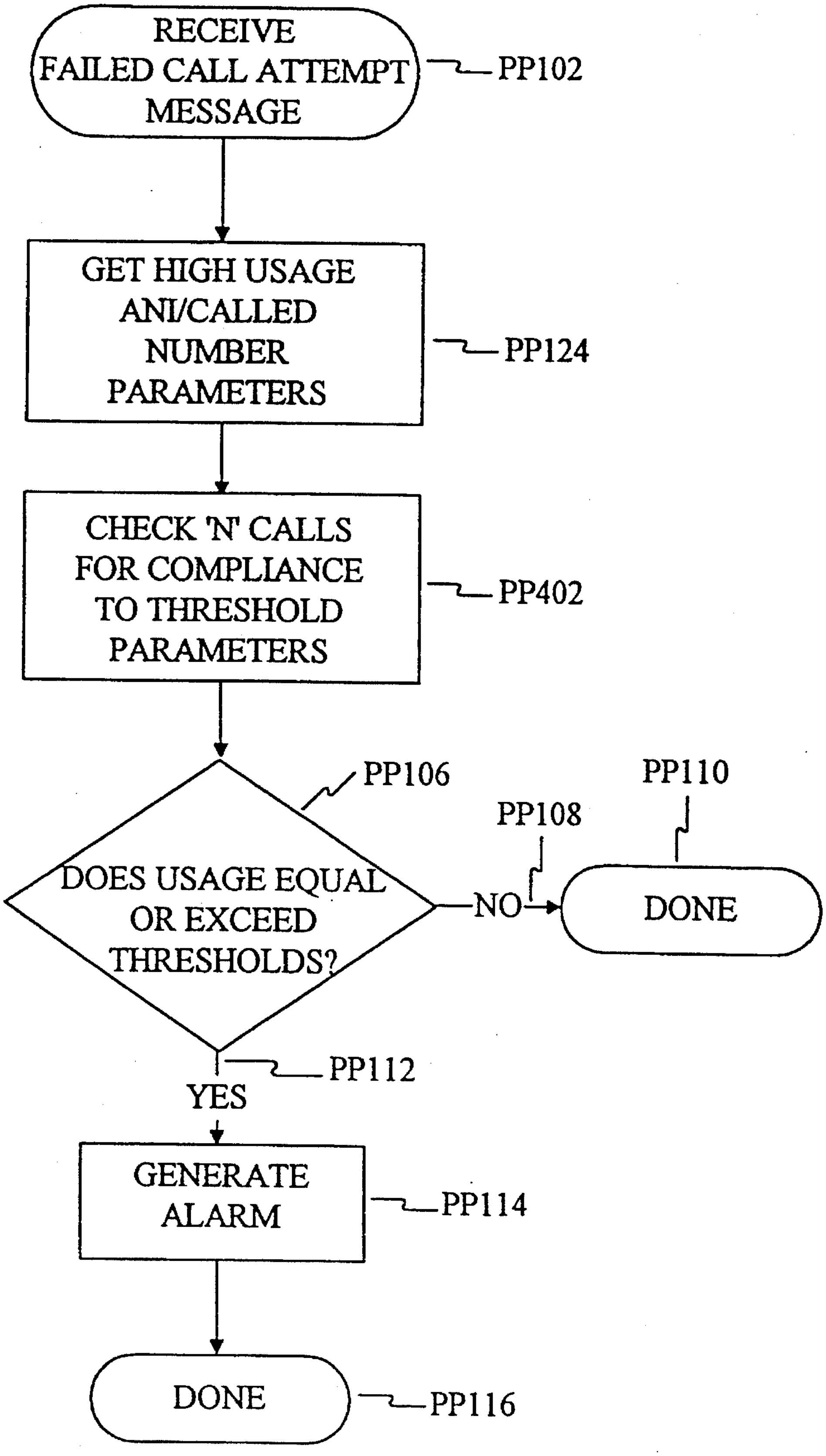

FIG. 180 is a high-level operational flow diagram illustrating the manner in which four fraud scenarios for a failed call, as shown in FIGS. 181, 182, and 183, can be detected and/or prevented according to one embodiment of the invention.

FIG. 181 is an operational flow diagram illustrating the manner in which a failed call attempt fraud scenario is detected and/or prevented according to one embodiment of the invention.

FIG. 182 is an operational flow diagram illustrating the manner in which a hot originating and/or terminating ANI fraud scenario is detected and/or prevented according to one embodiment of the invention.

FIG. 183 is an operational flow diagram illustrating the manner in which a high usage ANI and/or high usage terminating number fraud scenario is detected and/or prevented according to one embodiment of the invention.

Figure 184:
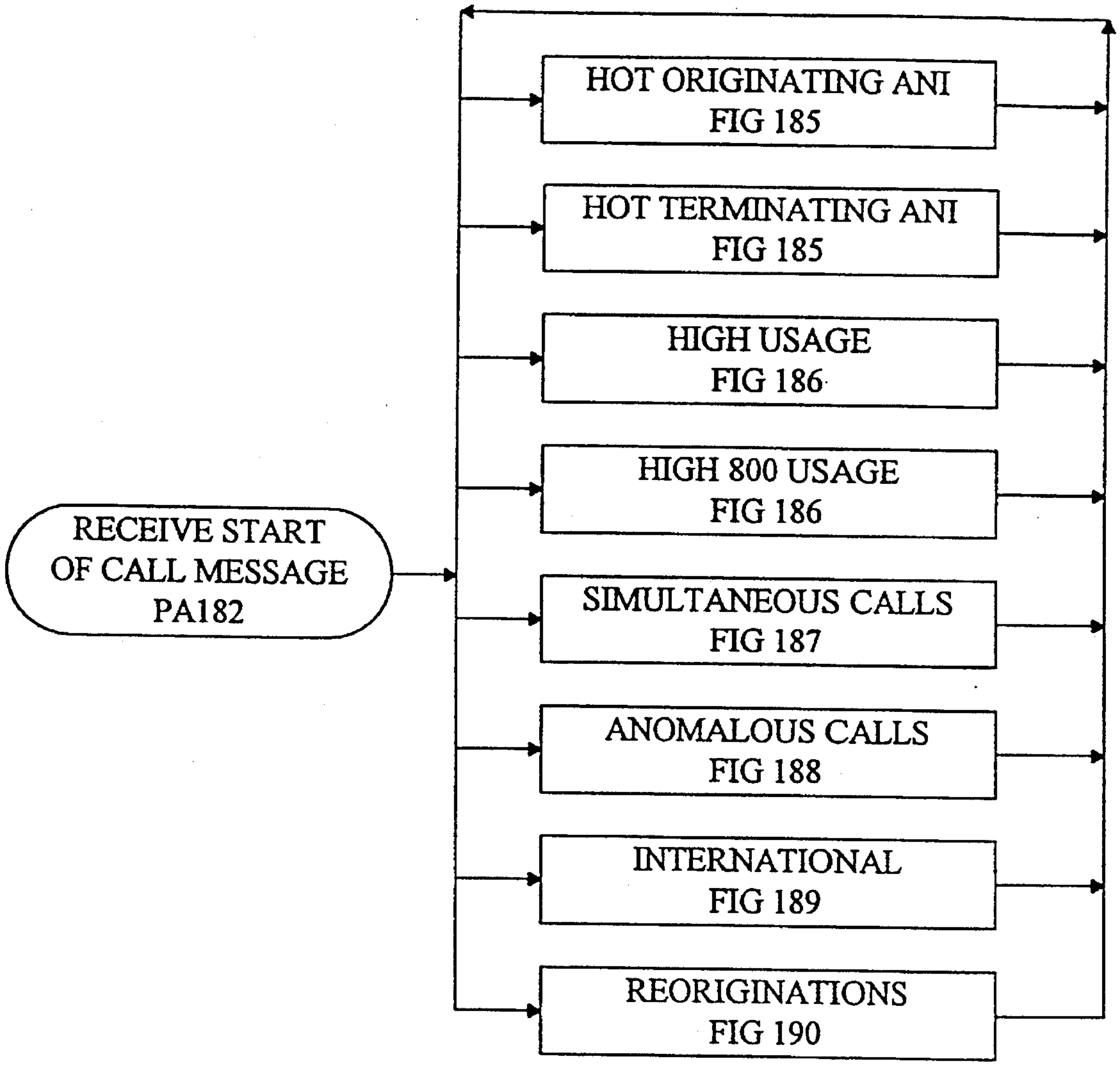

FIG. 184 is a high-level operational flow diagram illustrating the manner in which eight fraud scenarios for a completed call, as shown in FIGS. 185–190, can be detected and/or prevented according to one embodiment of the invention.

Figure 185:
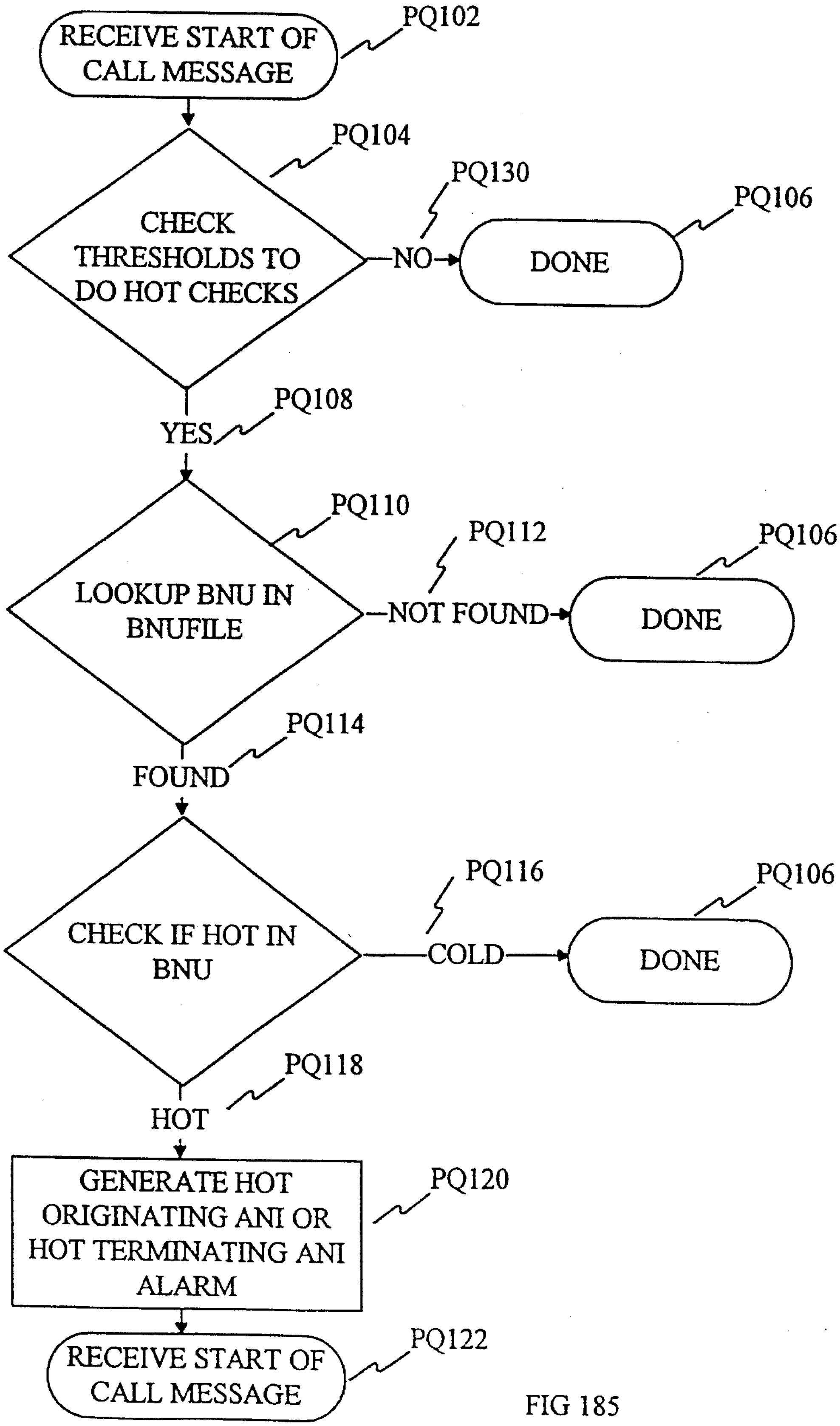

FIG. 185, is an operational flow diagram illustrating the manner in which a hot originating ANI fraud scenario and a hot terminating fraud scenario are detected and/or prevented according to one embodiment of the invention.

Figure 186:
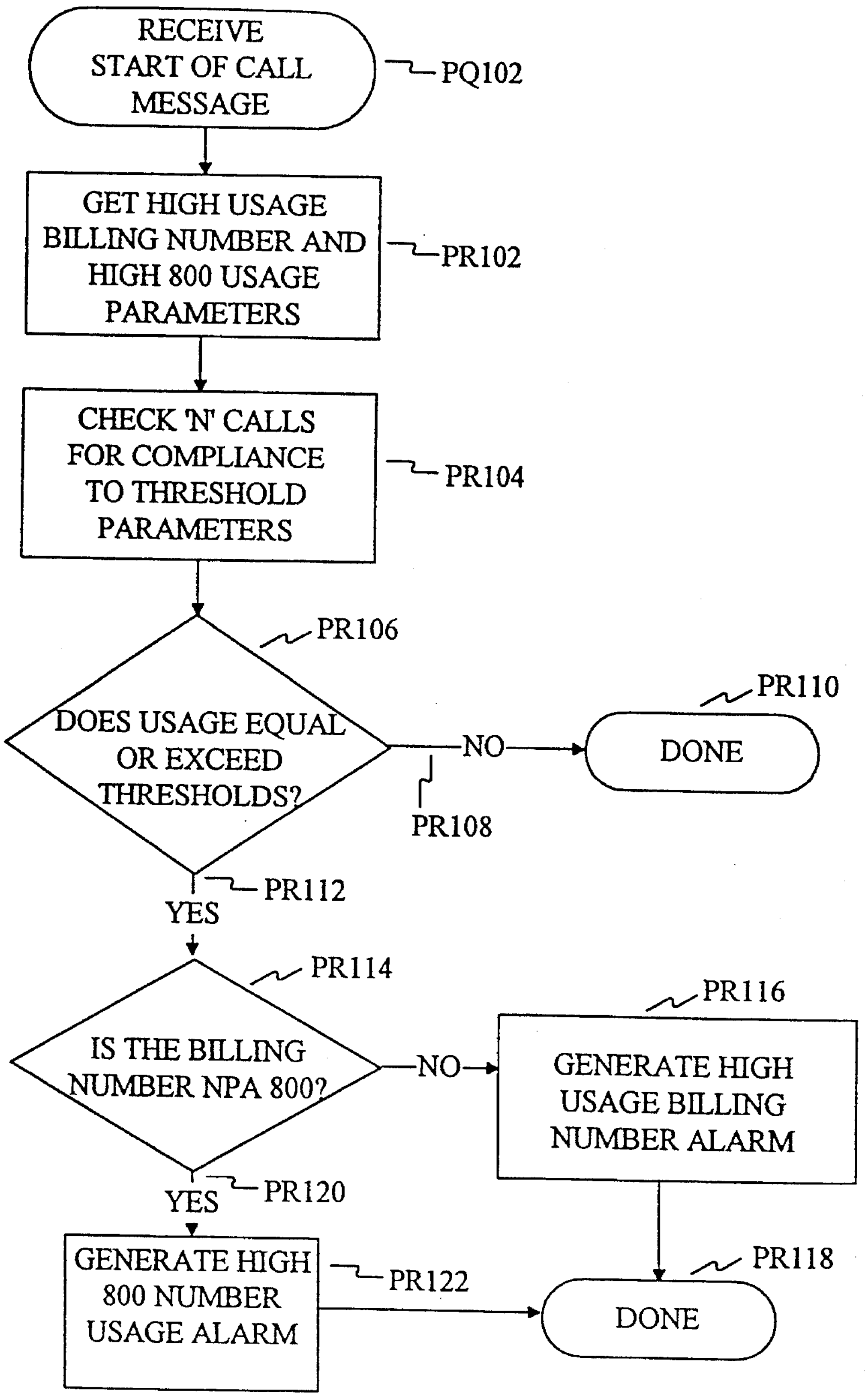

FIG. 186 is an operational flow diagram illustrating the manner in which a high usage billing number fraud scenario and high 800 usage fraud scenario is detected and/or prevented according to one embodiment of the invention.

Figure 187:
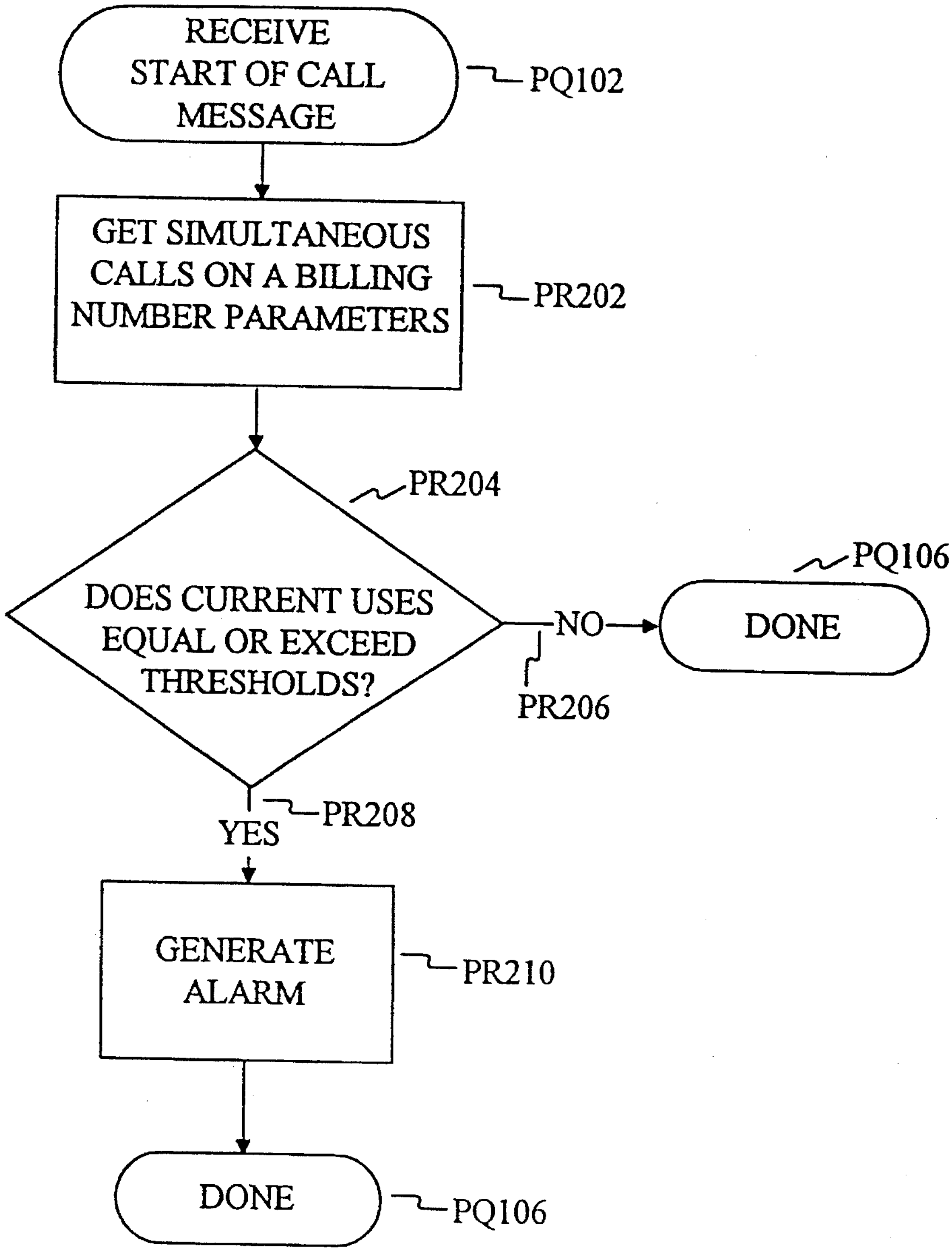

FIG. 187, is an operational flow diagram illustrating the manner in which a simultaneous calls on a billing number fraud scenario is detected and/or prevented according to one embodiment of the invention.

Figure 188:
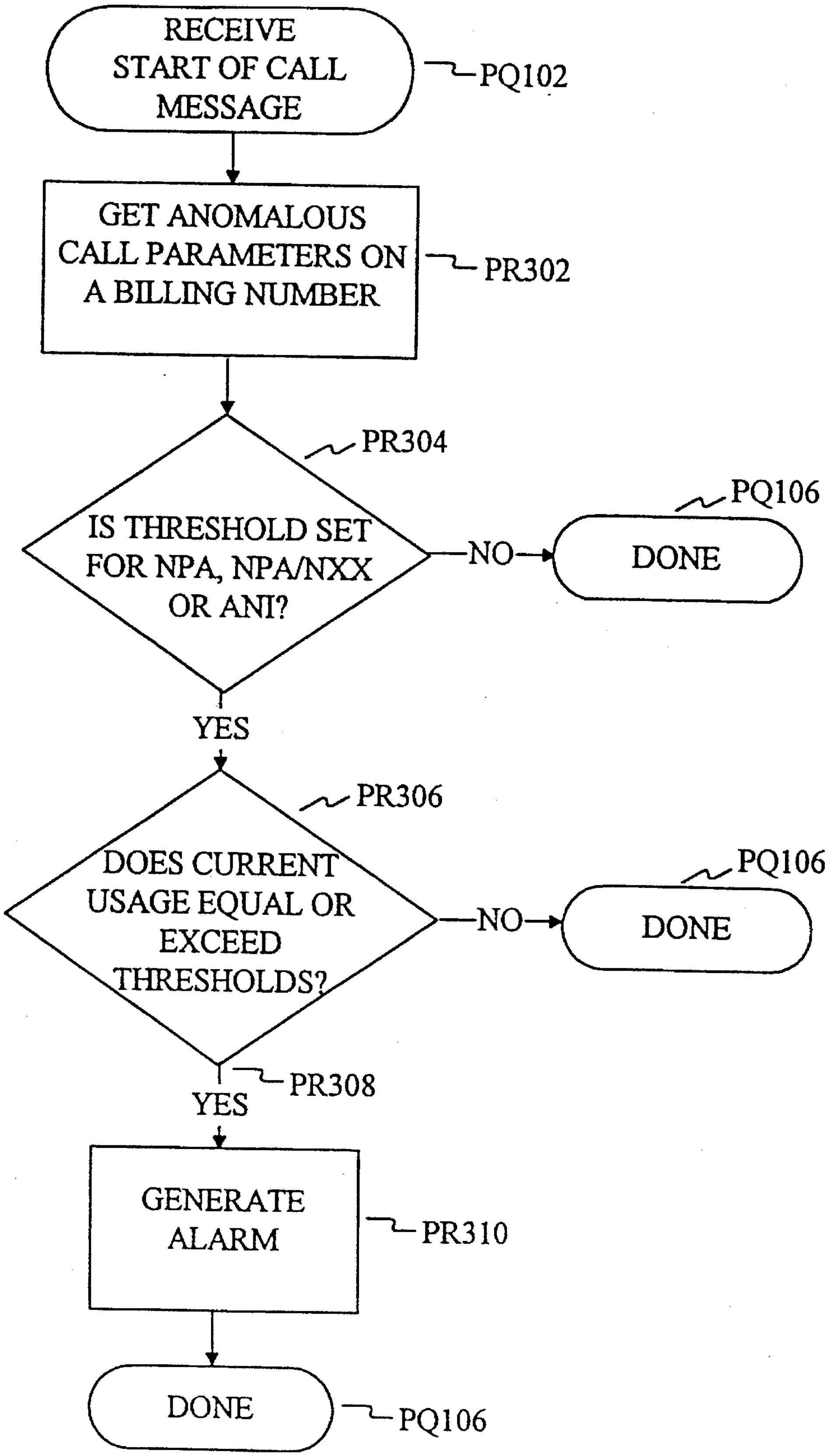

FIG. 188 is an operational flow diagram illustrating the manner in which an anomalous calls fraud scenario is detected and/or prevented according to one embodiment of the invention.

Figure 189:
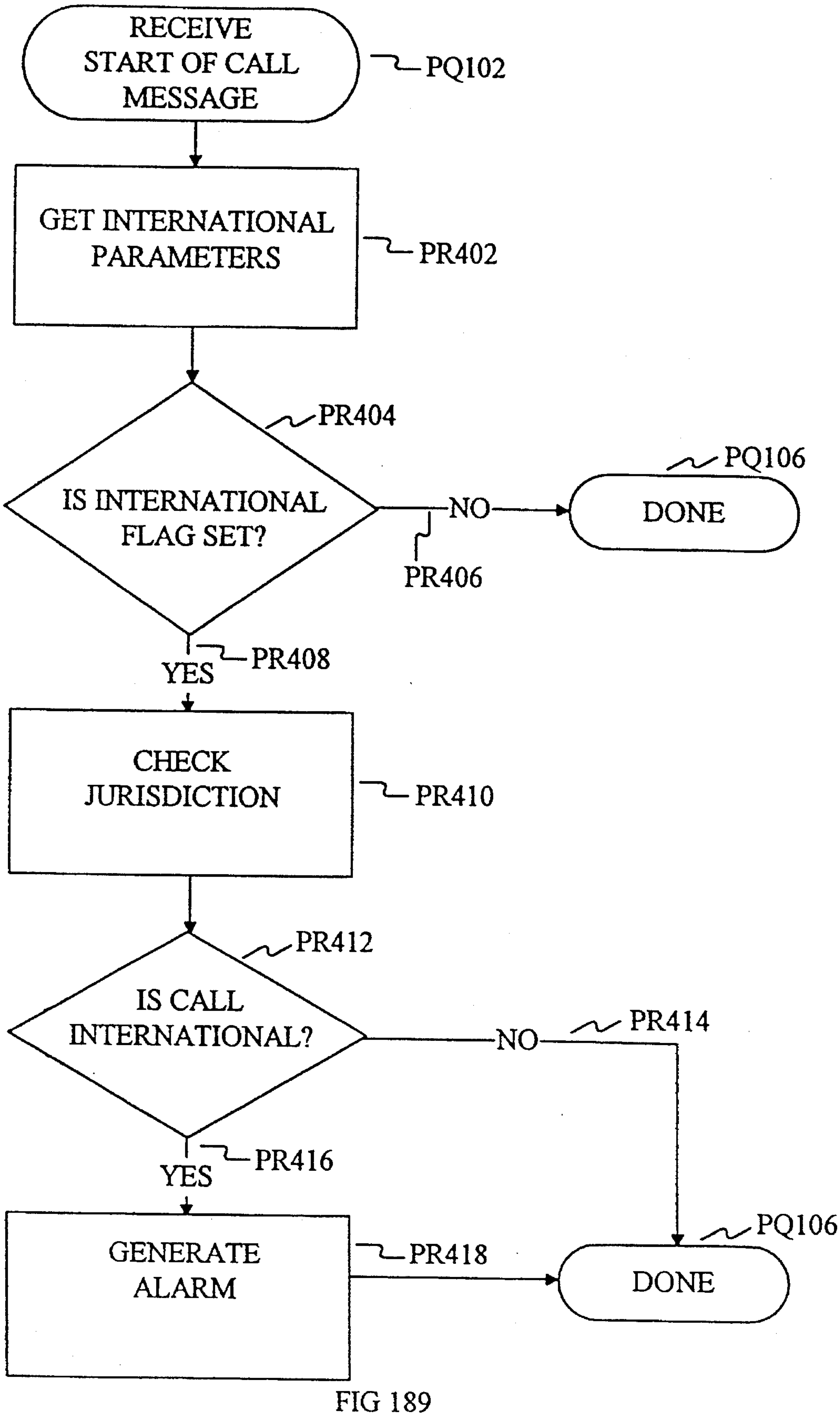

FIG. 189 is an operational flow diagram illustrating the manner in which an international fraud scenario is detected and/or prevented according to one embodiment of the invention.

Figure 190:
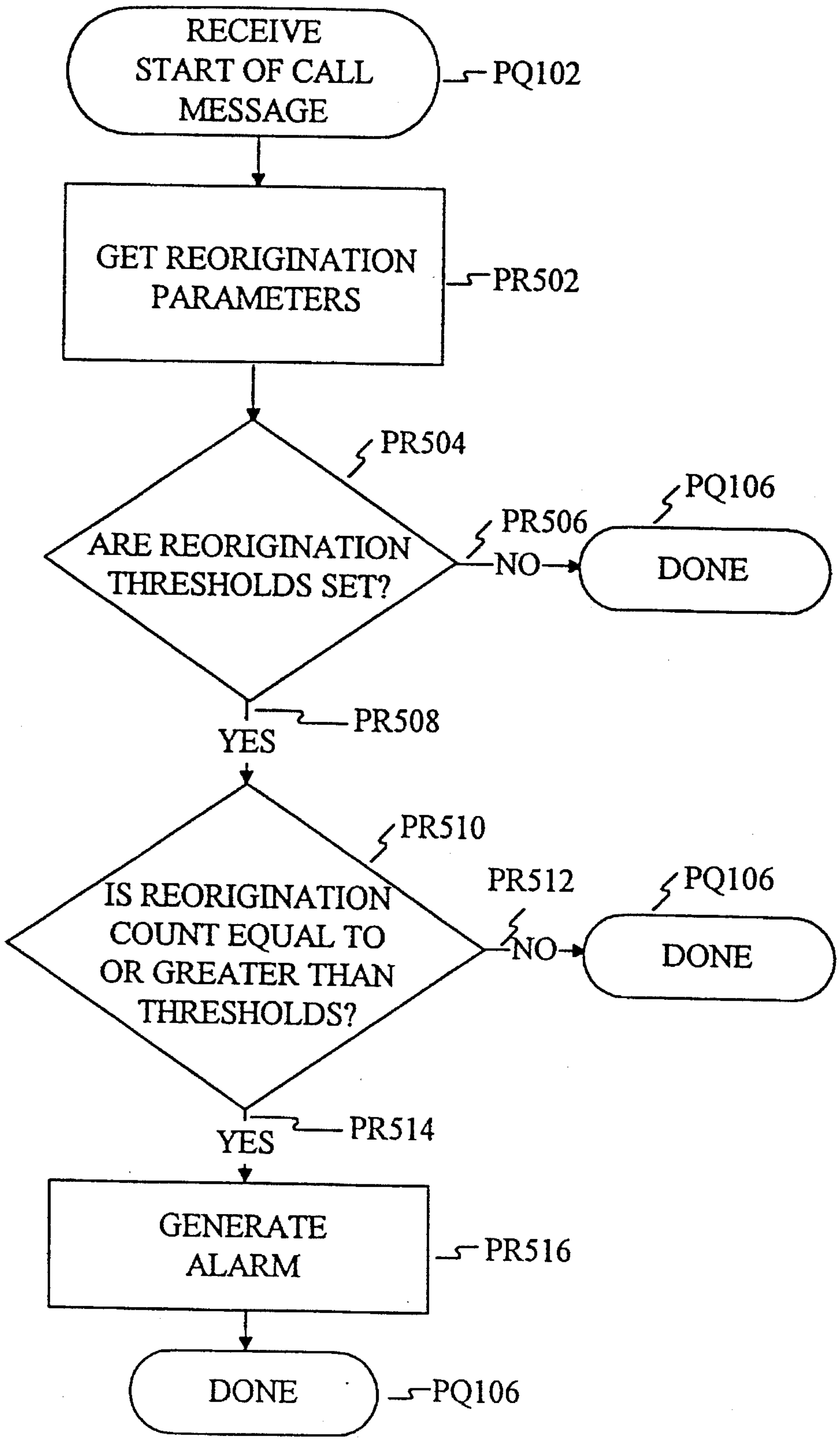

FIG. 190 is an operational flow diagram illustrating the manner in which a reorigination fraud scenario is detected and/or prevented according to one embodiment of the invention.

Figure 191:
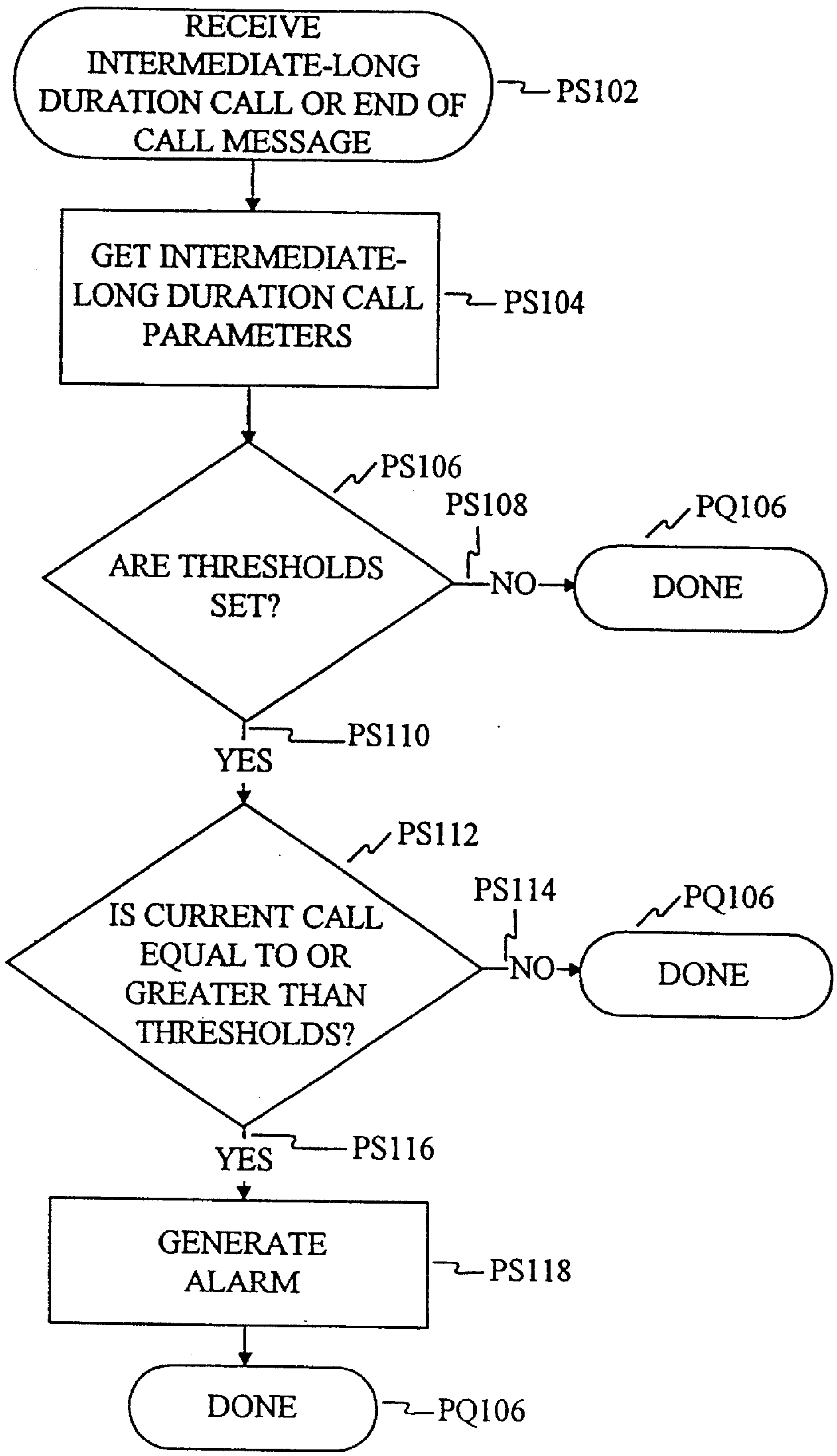

FIG. 191 is an operational flow diagram illustrating the manner in which a intermediate-long duration call fraud scenario is detected and/or prevented according to one embodiment of the invention.

Figure 192:
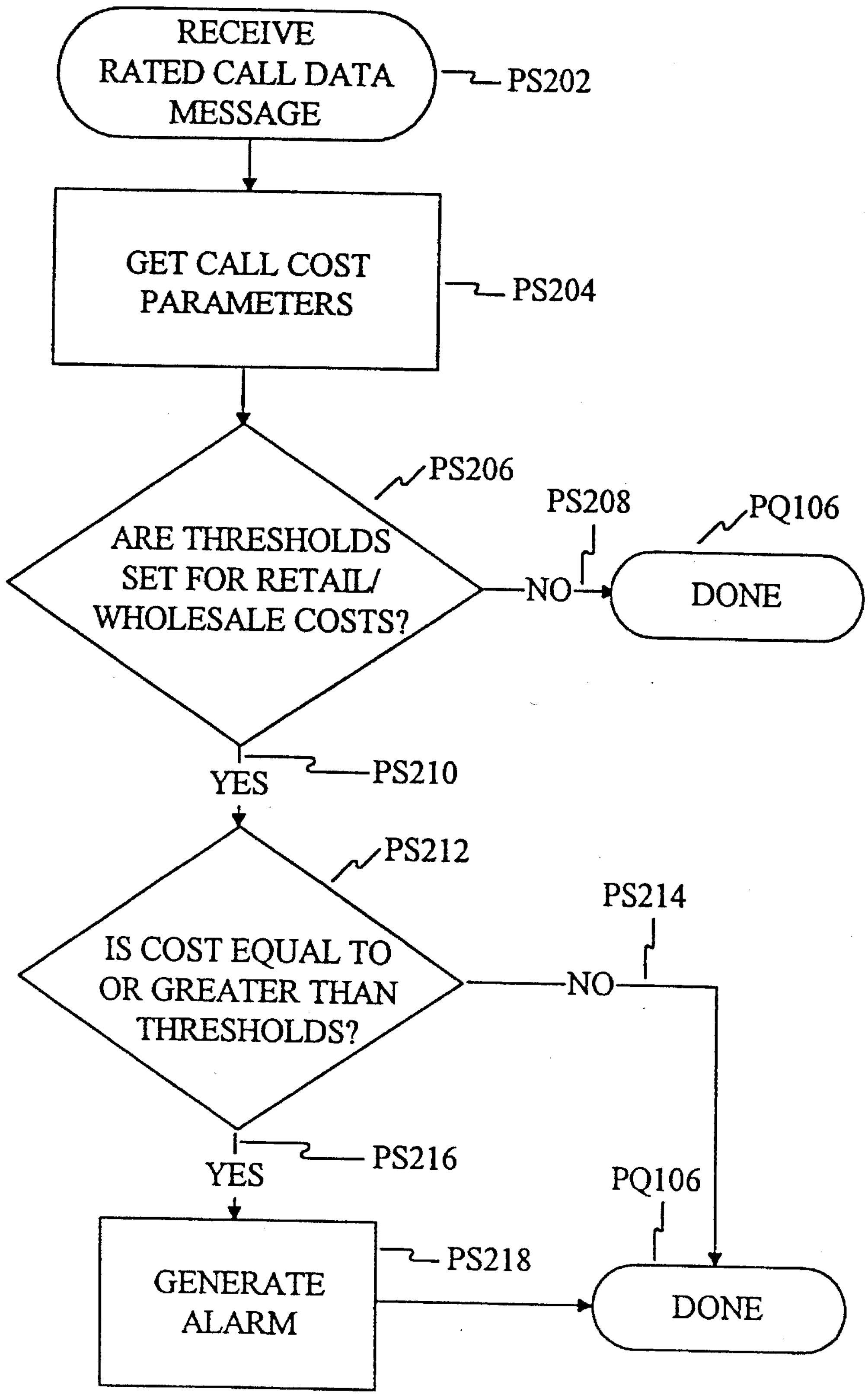

FIG. 192 is an operational flow diagram illustrating the manner in which a call cost retail fraud scenario and call cost wholesale fraud scenario are detected and/or prevented according to one embodiment of the invention.

Figure 193:
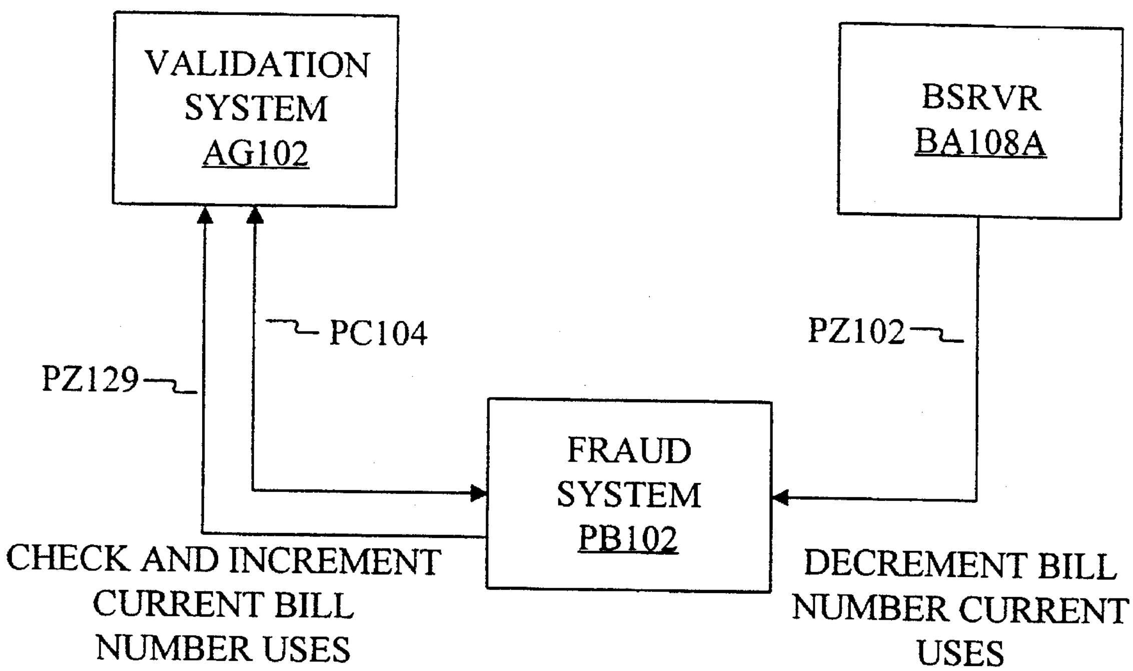

FIG. 193 is a data flow diagram illustrating the data flow between the fraud system, the validation system, and the billing server used for the simultaneous calls on a billing number fraud scenario according to one embodiment of the invention.

Figure 194:
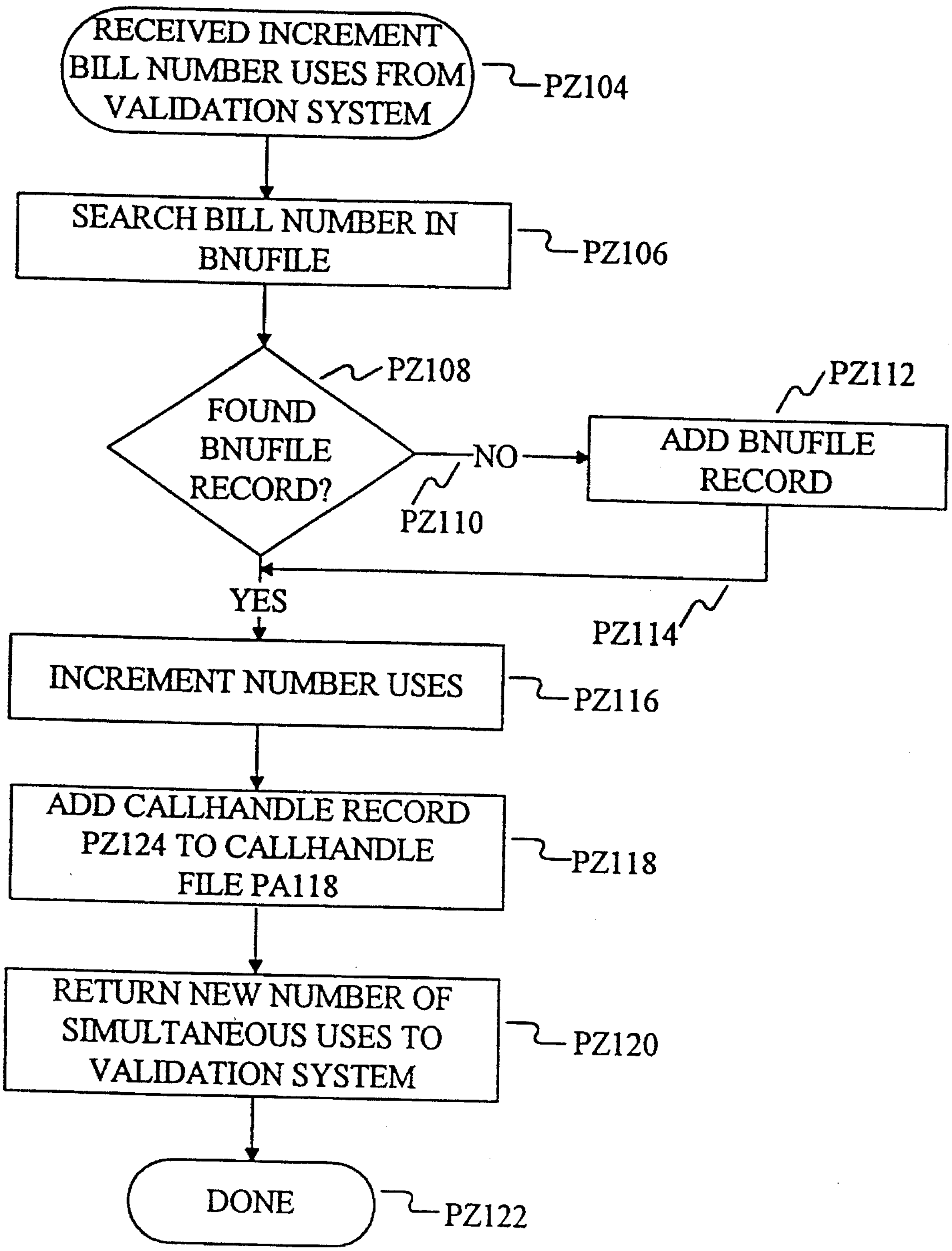

FIG. 194 is an operational flow diagram illustrating the manner in which the validation system interacts with the fraud system to detect and/or prevent fraud according to the simultaneous calls on a billing number fraud scenario.

Figure 195:
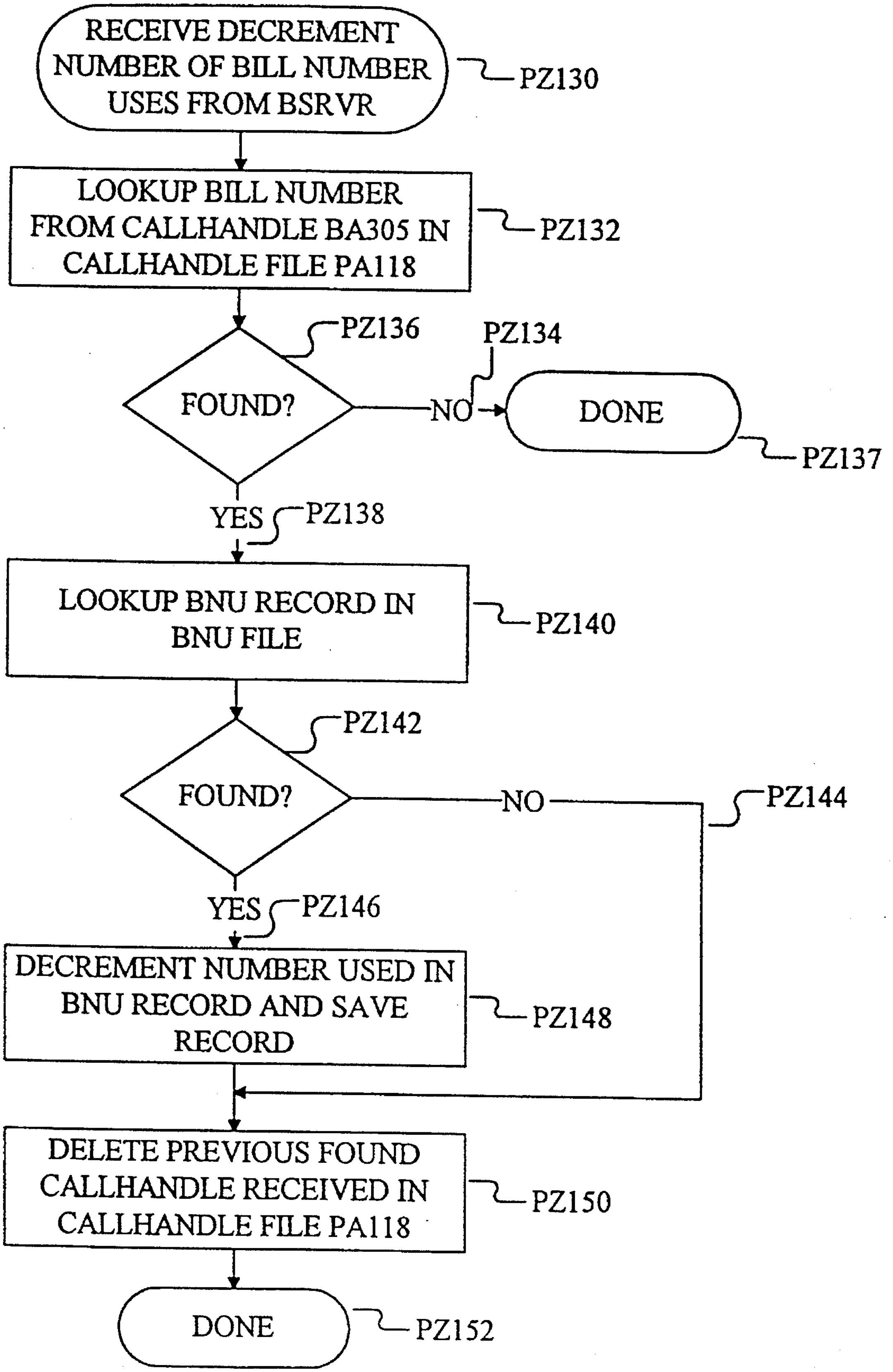

FIG. 195 is an operational flow diagram illustrating the manner in which the validation system interacts with the billing server to detect and/or prevent fraud according to the simultaneous calls on a billing number fraud scenario.

FIG. 196 illustrates a fraud system screen that displays alarm thresholds detail information for compeleted calls according to one embodiment of the invention.

FIG. 196*a* illustrates a fraud system screen that displays alarm thresholds detail information for failed calls according to one embodiment of the invention.

FIG. 197 illustrates a fraud system screen that displays billing number detail information according to one embodiment of the invention.

Figure 198:
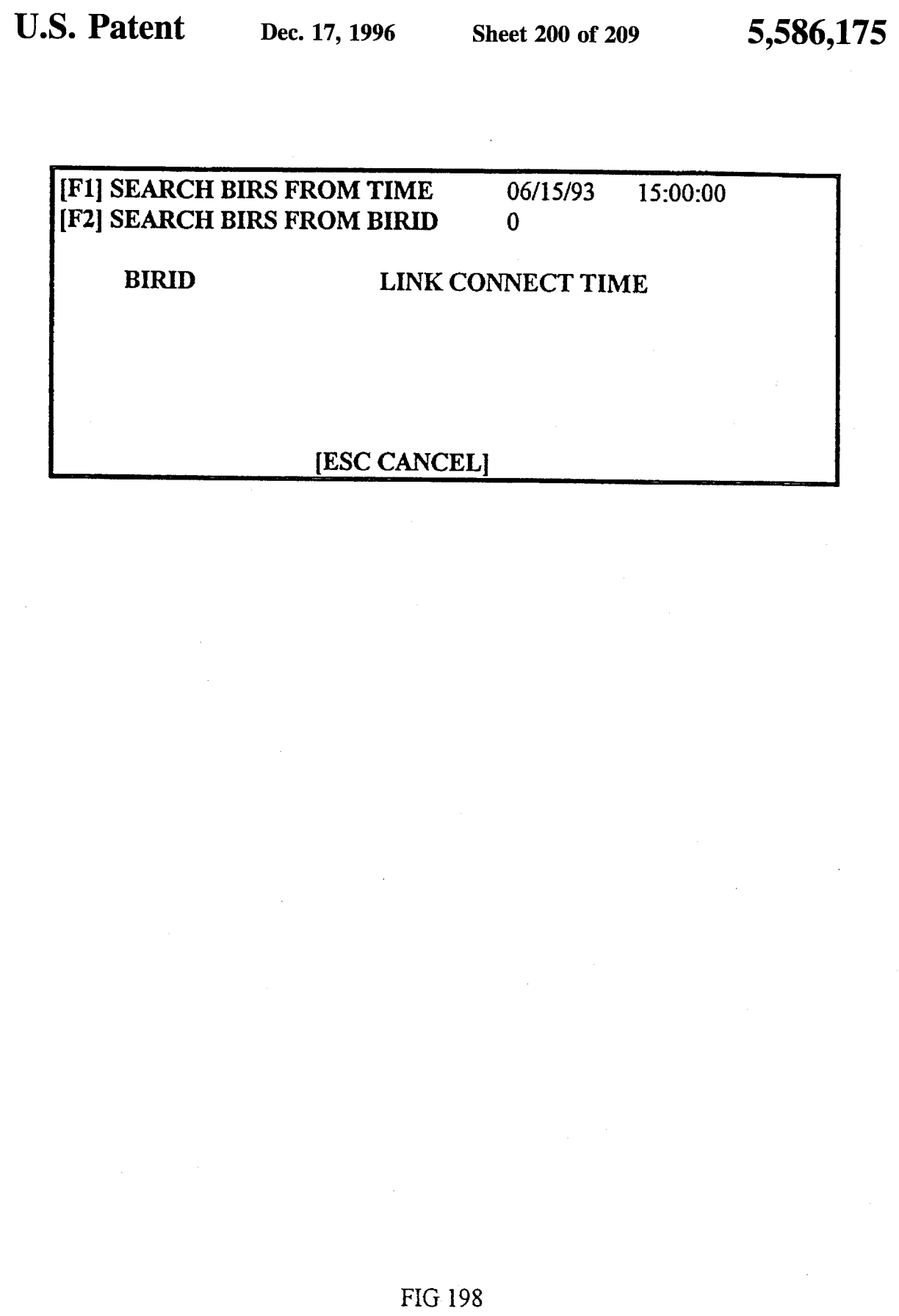

FIG. 198 illustrates a fraud system screen that displays BIR information according to one embodiment of the invention.

Figure 199:
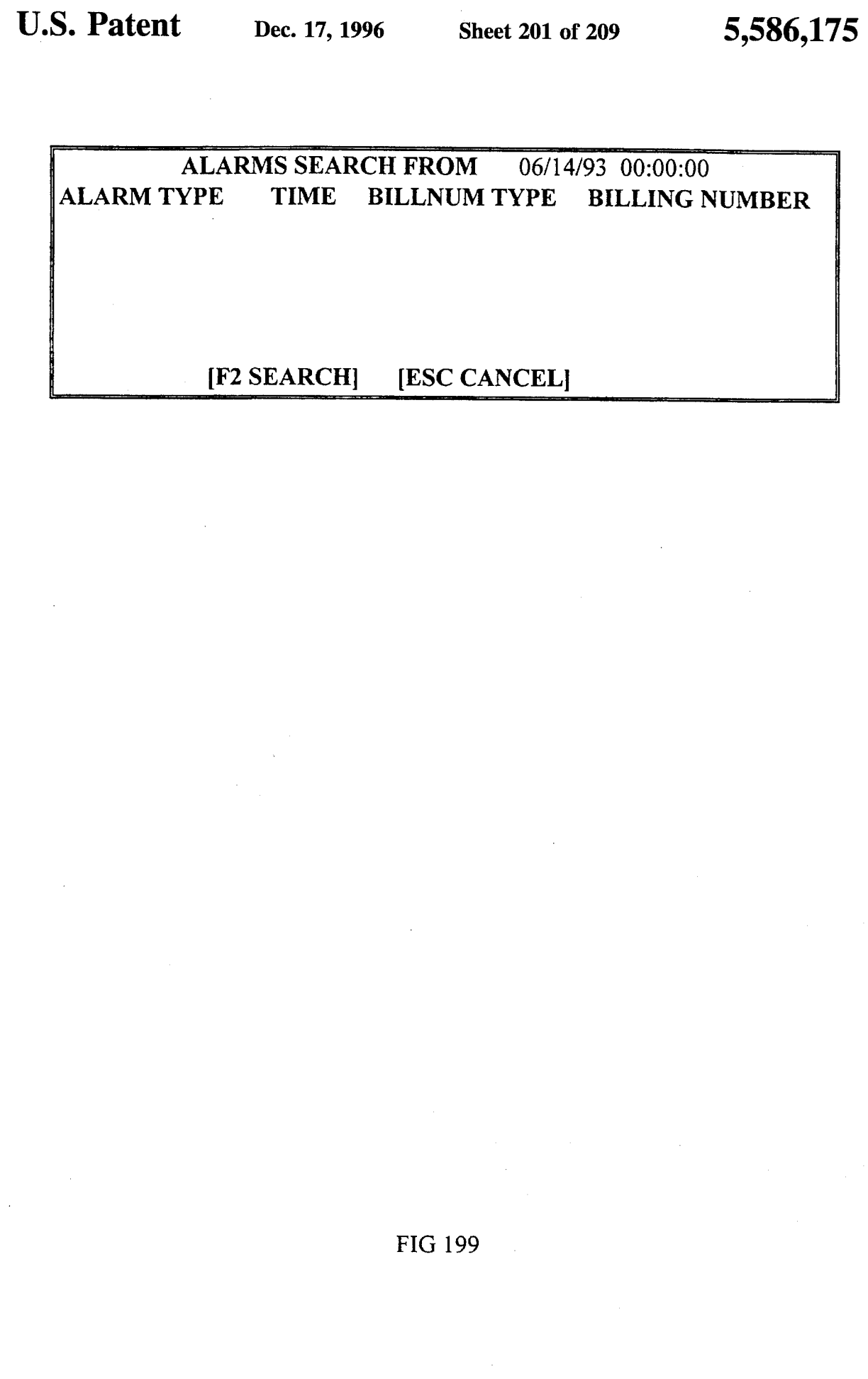

FIG. 199 illustrates a fraud system screen that displays alarm search information according to one embodiment of the invention.

Figure 200:
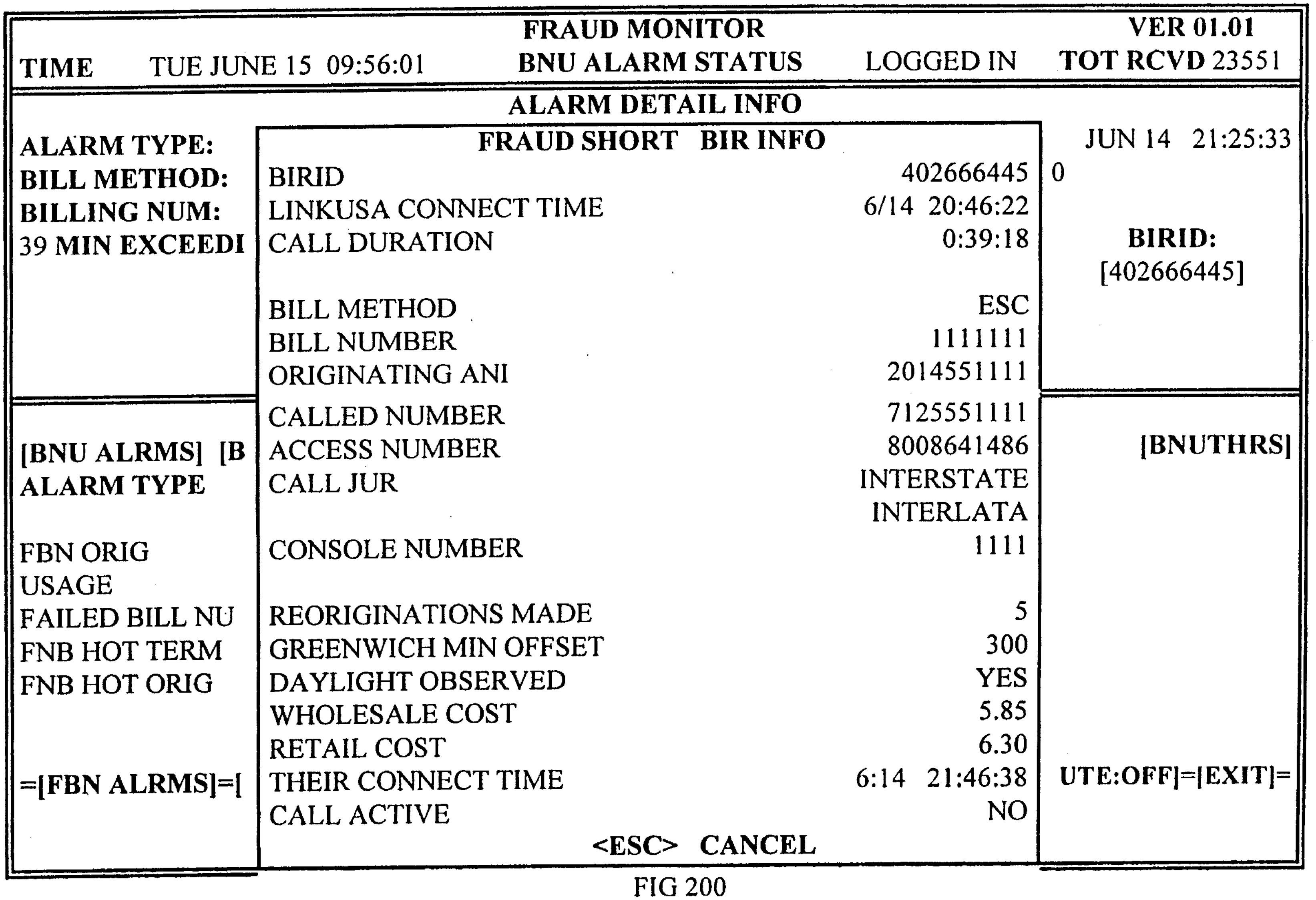

FIG. 200 illustrates a fraud system screen that displays BNU alarm status information with an open window showing fraud short BIR information according to one embodiment of the invention.

FIG. 201 illustrates a fraud system screen that displays alarm detail information according to one embodiment of the invention.

FIG. 202 illustrates a fraud system screen that displays short BIR information according to one embodiment of the invention.

FIG. 203 illustrates a fraud system screen that displays billing number usage and failed billed number alarms according to one embodiment of the invention.

Figure 204:
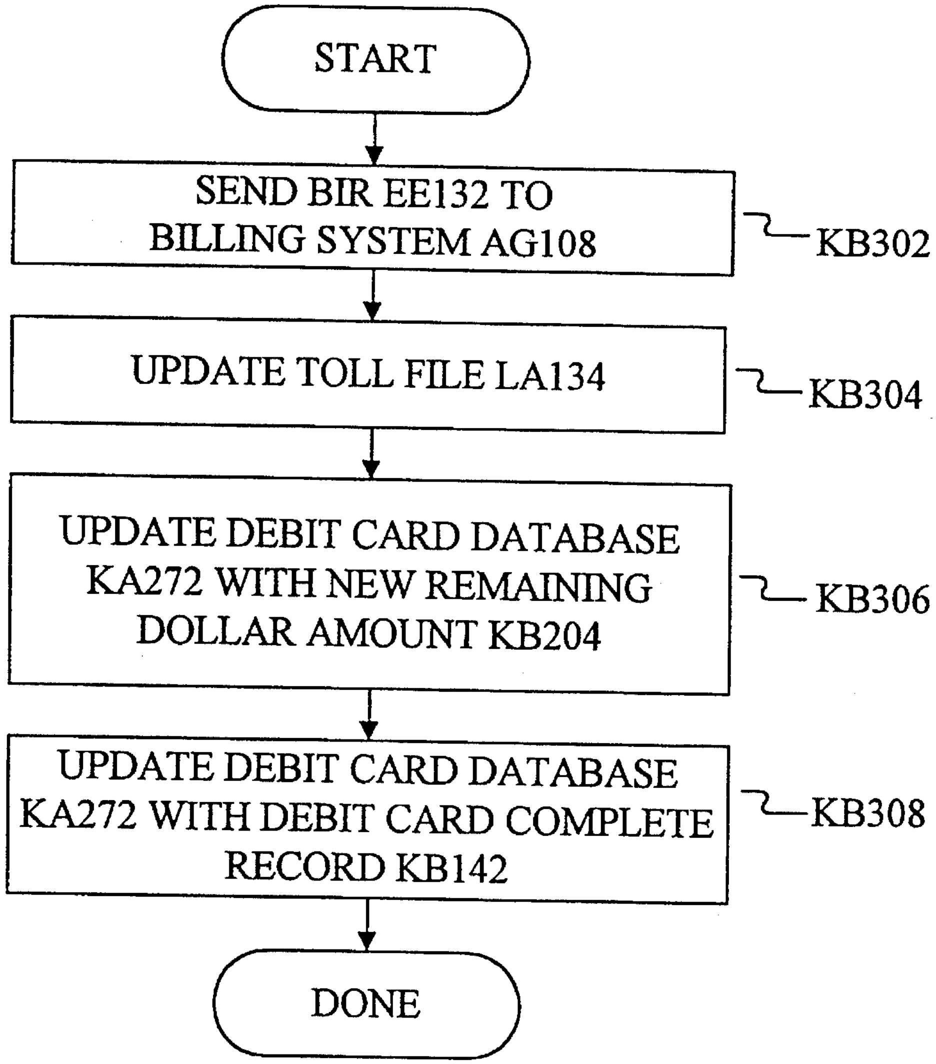

FIG. 204 is an operational flow diagram illustrating the process involved with updating the accounting records according to one embodiment of the invention.

Figure 205:
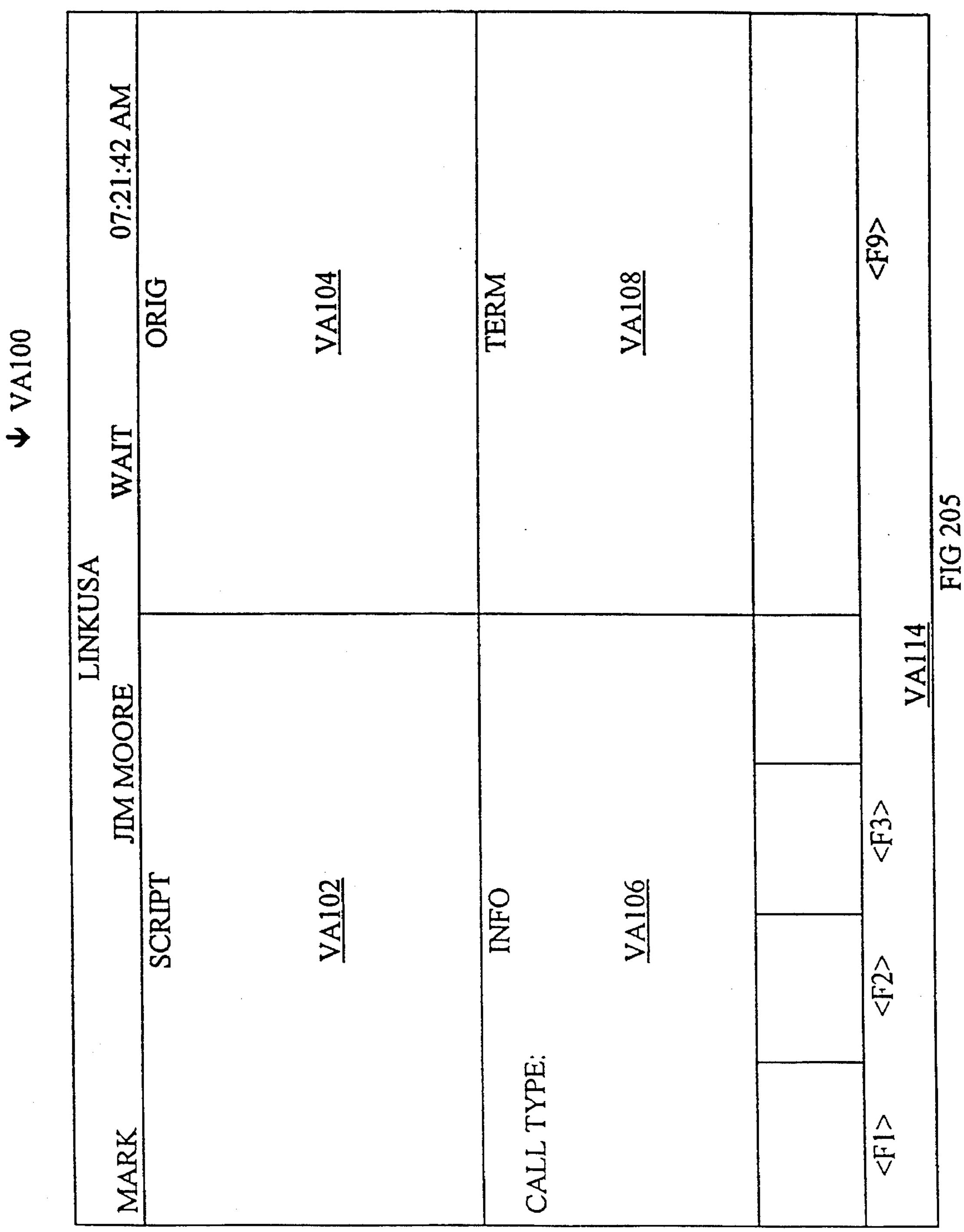

FIG. 205 illustrates an example implementation of an operator display screen according to one embodiment of the invention according to one embodiment of the invention.

Figure 206:
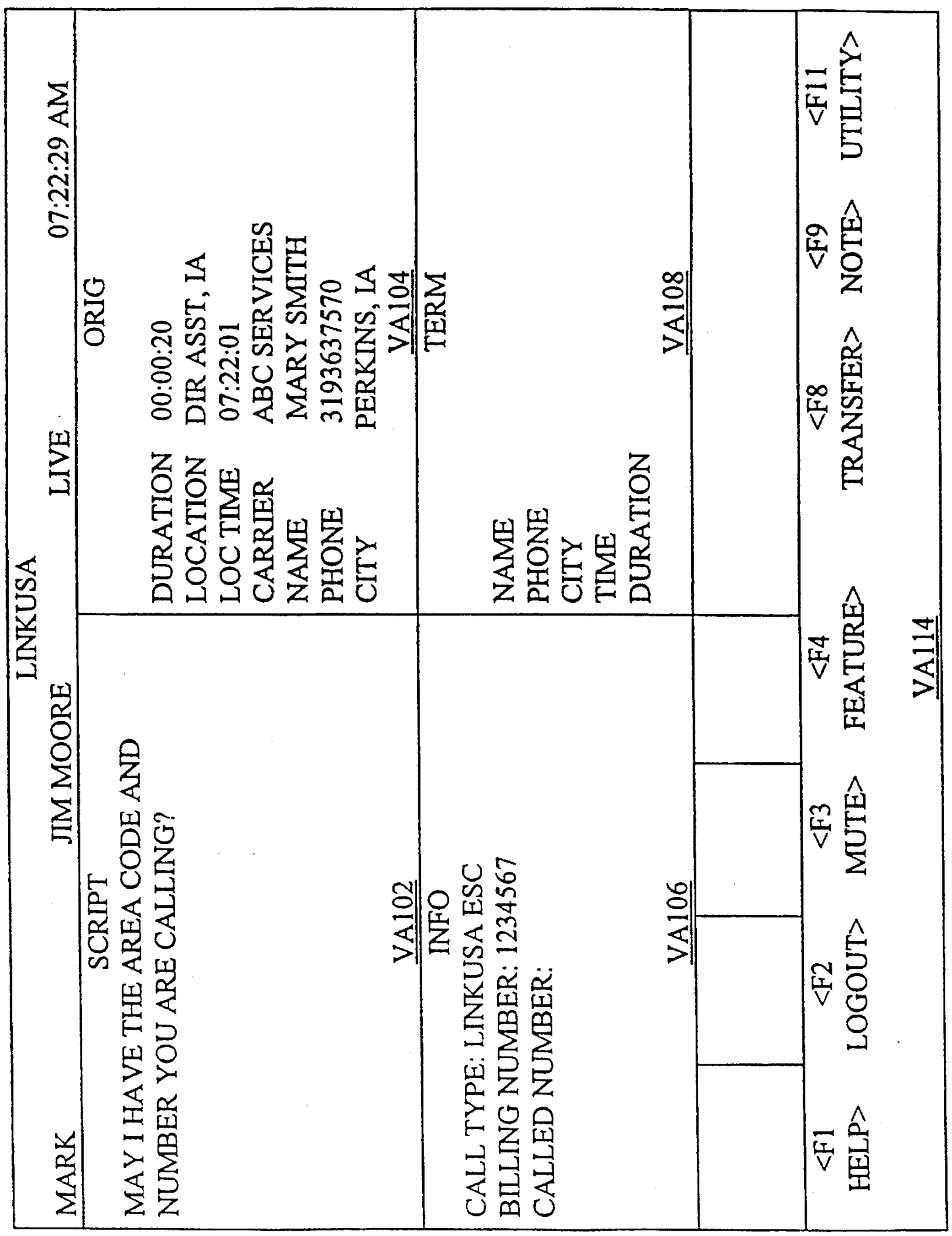

FIG. 206 illustrates an example of the operator display screen illustrated in FIG. 205 with call information displayed thereon according to one embodiment of the invention.

Figure 207:
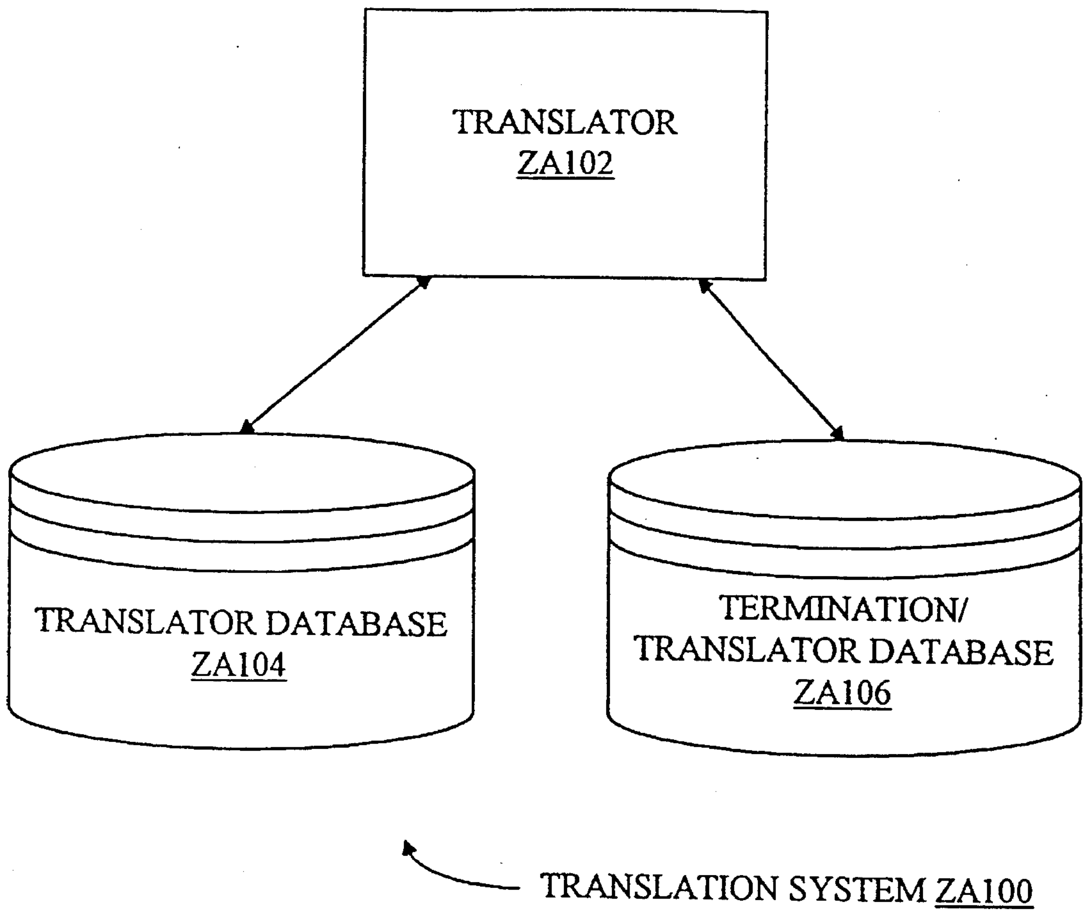

FIG. 207 is a high-level block diagram illustrating a translation system according to one embodiment of the invention.

DETAILED DESCRIPTION OF THE PREFERRED EMBODIMENTS

Table of Contents 1.0 High-Level Overview of the Invention
1.1 The Present Invention: A Simple and Elegant Solution
2.0 Network Control Processor (NCP)
2.0.1 Network Control Processor
2.0.2 Call Setup Using the Network Control Processor
2.0.3 Call Completion for a Calling Card, Credit Card, or Debit Card Call
2.0.4 Call Completion for a Collect Call
2.0.5 Specific Language Operator Handling
2.1 Network Control Processor Call Route Distributor (CRD)
2.1.1 CRD Introduction and CRD Redundancy
2.2 Central Message Processor (CMP)
2.2.1 CMP Introduction and High-Level Description
2.2.2 CMP Detailed Description
2.2.3 Action Records
2.2.4 Number Translation or Direct-Dial Long-Distance call
2.2.5 Call Release From an Operator Console AB108
2.2.6 Call Release From A Switch
2.2.7 Call Set-up For an Operator-Console-Originated Call
2.2.8 Call Completion From an Operator Console
2.2.9 Call Transfer From an Operator Console
2.3 Billing Server
2.3.1 Billing Server Introduction
2.3.2 Billing Server Architecture
2.3.2.1 Billing Server Files
2.3.2.1.1 Callhandle File
2.3.2.1.2 BIR File
2.3.2.1.3 BIR Stack File
2.3.2.1.4 Fraud Queue File
2.3.2.2 Procedures
2.3.2.2.1 Main Root Procedure Kernel
2.3.2.2.2 Client Interface (CLIF) Procedure
2.3.2.2.3 Update Mirror Procedure
2.3.2.2.4 Receive Procedure
2.3.2.2.5 Send BIR Procedure
2.3.2.2.5 BIR Stack Procedure
2.3.3.3 Billing Server Tables
2.3.3.3.1 Callhandle Hash Table
2.3.3.3.2 Console Tables
2.3.3.3.3 Debit Tables
2.3.3.3.4 Call Tracking Table
2.3.4 Redundancy
2.3.5 Timing of Calls
2.4 Database Server(DBS)
2.4.1 Database Server Introduction
2.4.2 Deleting a Database Service
2.4.3 Searches Using Database Server BA104
2.4.3.1 Call ID Look-up Using Database Server
2.4.3.2 Number Translation Look-up Using Database Server
2.4.4 Number Translation
3.0 Validation System
4.0 Distribution System
5.0 Real-Time Reconfiguration
6.0 Billing System
6.1 Introduction to Billing System
6.2 Wholesale and Retail Timing
6.3 Billing System Methodologies
6.4 Operational and Data Flow Description of Real-Time Billing With a Debit Card
7.0 Fraud Detection and Prevention
7.1 Overview of the Fraud Problem in the Telephone Industry
7.2 Specific Fraudulent Method Scenarios
7.3 Representative Fraud Detection and Prevention System and Method
7.4 Specific Fraud Detection and Prevention Capabilities
7.4.1 Failed Call
7.4.1.1 Failed Call Attempt
7.4.1.2 Hot Originating ANI
7.4.1.3 Hot Terminating ANI
7.4.1.4 High Usage On Billing Number
7.4.2 A Completed Call
7.4.2.1 Hot Originating ANI
7.4.2.2 Hot Terminating ANI
7.4.2.3 High Usage Billing Number
7.4.2.4 800 Calls With High Usage
7.4.2.5 Simultaneous Calls on a Billing Number
7.4.2.6 Anomalous Calls on a Billing Number
7.4.2.7 International Incoming or Outgoing Calls
7.4.2.8 Reoriginations
7.4.2.9 Long Duration Calls
7.4.2.10 Call Cost (Wholesale and Retail)
7.4.3 Simultaneous Uses of a Billing Number
7.5 Graphical User Interface For Fraud Console
7.5.1 Thresholds
7.5.2 Search
7.5.3 Failed Billed Number Screens
7.5.4 To View An Alarm
7.5.5 Exiting The System
7.6 Reports
7.6.1 Excessive Usage
7.6.2 Excessive Duration 8.0 Gateways
9.0 Client Server Interface (CLIF)
10.0 DEF
12.0 High-Level Operational Scenarios
12.1 Operator Services
12.2 Enhanced Services Card Call
12.3 Debit Card Calls
12.4 800 Number Forwarding
12.5 Direct-Dial Long-Distance calling
13.0 Operator Console Display
14.0 Conclusion 1.0 High-Level Overview of the Invention As discussed in the Background Section, telecommunications carriers are limited in the flexibility with which their services can be provided because conventional switching systems do not address the need for introducing flexible control into the telephone network. An examination of a conventional telephone switching system and how it operates illustrates some of the reasons for this situation.

Figure 1:
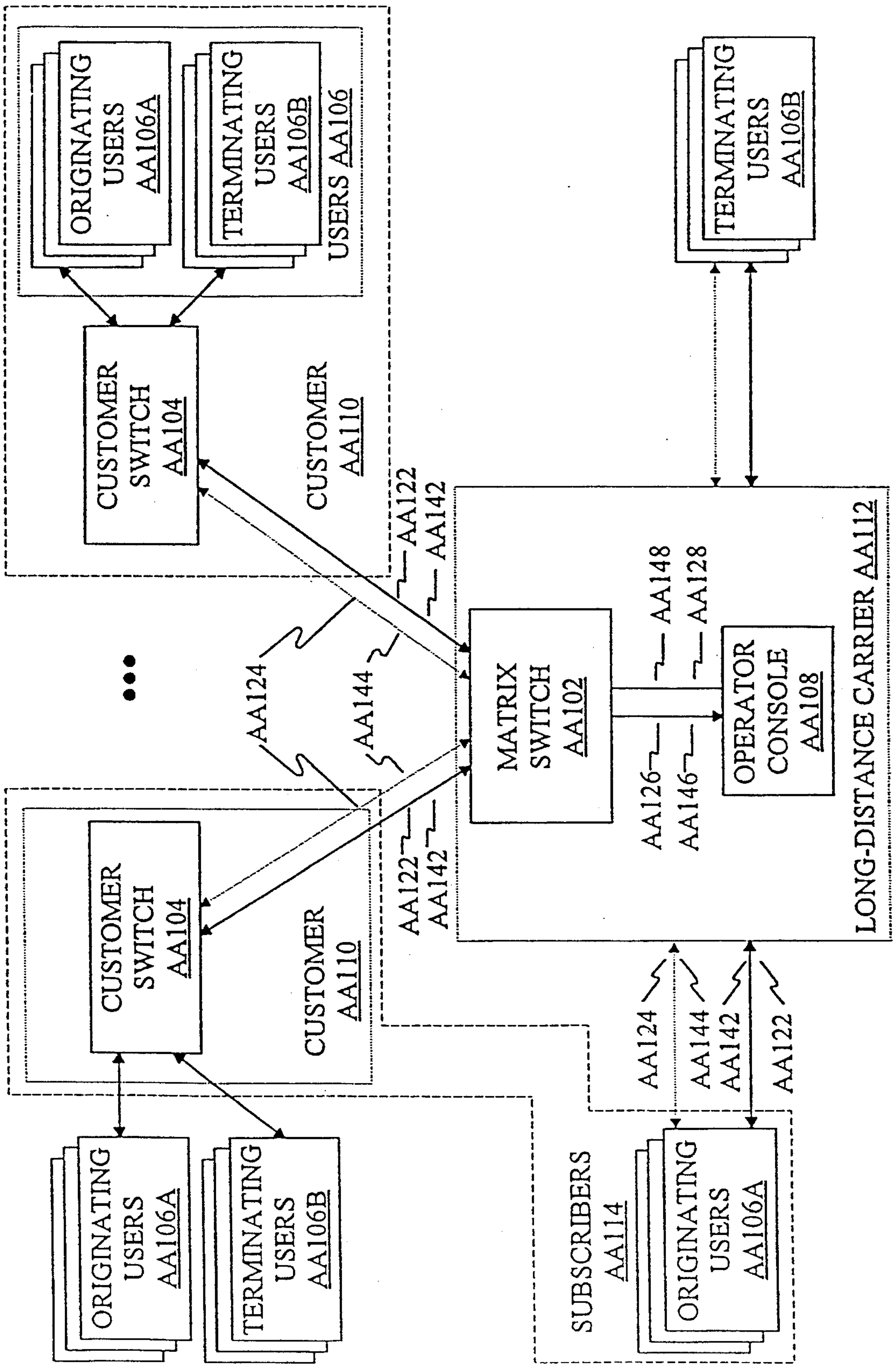
FIG. 1 is a high-level block diagram illustrating the architecture of a conventional telephone switching configuration.

An example of a conventional telephone switching configuration is illustrated in FIG. 1. FIG. 1 is a high-level block diagram illustrating the architecture of a conventional telephone switching configuration. Referring now to FIG. 1, the configuration includes a matrix switch AA102 and an operator console AA108. A typical subscriber AA114 to a long-distance carrier AA112 may be a business, another carrier, or an individual user AA106. Customer AA110 may, for example, be a business or it may be a carrier that is procuring enhanced services from a competitor long-distance carrier AA112. Customer AA110 may have its own customer switch AA104 for routing calls between outside trunks and inside lines or instruments.

Users AA106 (for example, humans talking on the telephone) place long-distance calls using long-distance carrier AA112. The user AA106 who places the call (calling party) is termed an originating user AA106A. The user AA106 to whom the call is placed (called party) is termed a terminating user AA106B.

Originating user AA106A may place the call directly with long-distance carrier AA112 where originating user AA106A is a customer of long-distance carrier AA112. Where originating user AA106A subscribes to another carrier that is a customer AA110 of long-distance carrier AA112, the call is routed through customer AA110. Where originating user AA106A is an end-user at a business that is a customer AA110 of long-distance carrier AA112 and that has its own switch AA104, that originating user's call also gets routed through customer switch AA104. In the latter two cases, originating user AA106A is deemed a "client" of customer AA110.

Matrix switch AA102 is provided as a switch to route calls between users AA106. A call is routed from originating user AA106A to terminating user AA106B. Matrix switch AA102 typically can route thousands of telephone calls simultaneously. An example of matrix switch AA102 is the commercially-available switch model DMS 250, manufactured by Northern Telecom, Inc. in Richardson, Tex., USA. "DMS" is a registered trademark of Northern Telecom, Inc.

Figure 2:
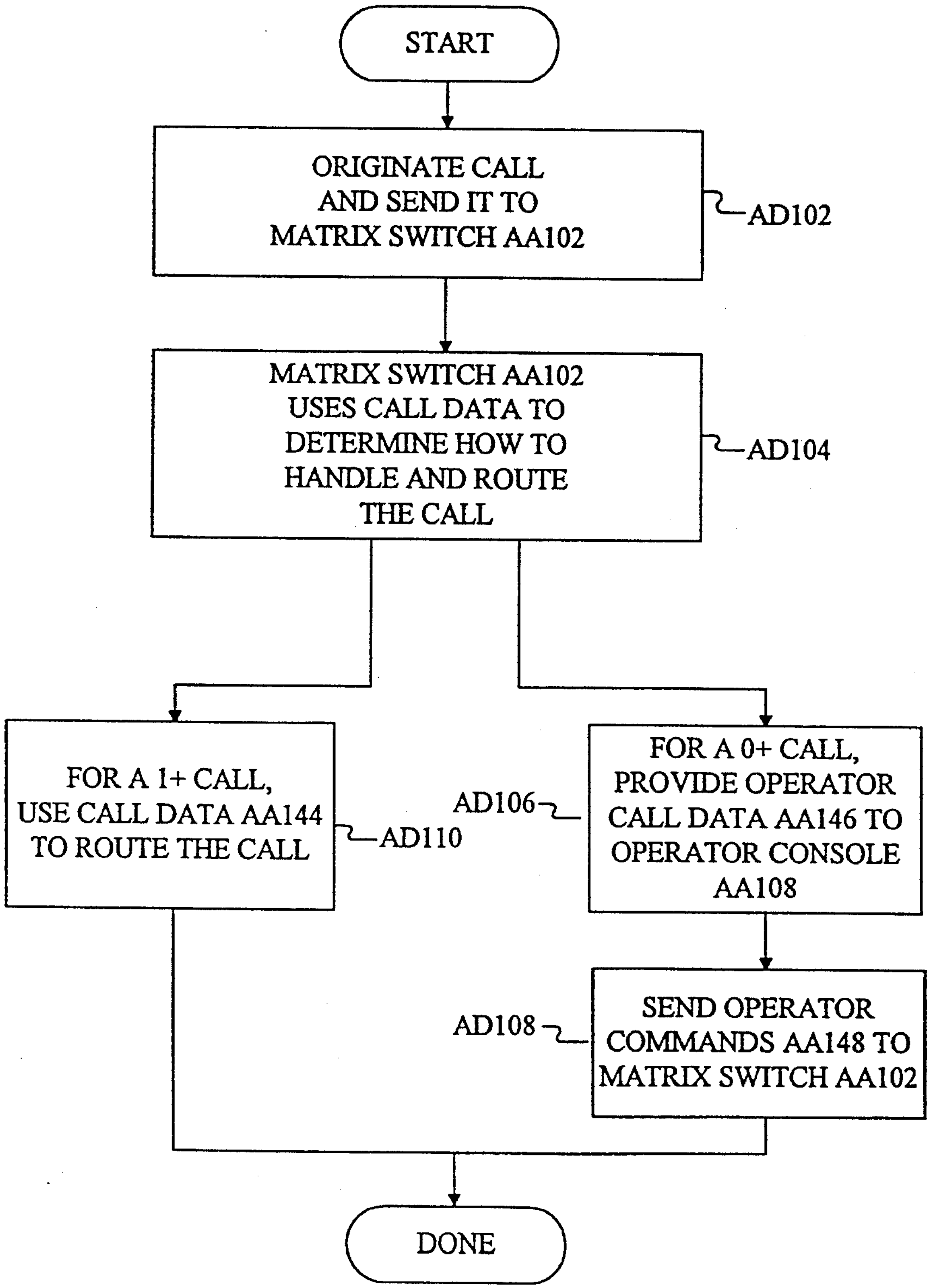
FIG. 2 is a high-level operational flow diagram illustrating the manner in which a conventional long-distance carrier provides long-distance telephone services to a long-distance carrier customer.

The manner in which long-distance carrier AA112 provides long-distances services is now described. FIG. 2 is a high-level operational flow diagram illustrating the manner in which long-distance carrier AA112 provides long-distance telephone services to its subscribers AA114. FIGS. 1 and 2 are now referred to in order to illustrate how long-distance carrier AA112 provides direct-dial long-distance service and operator-assisted calling for users AA106. Long-distance direct dialing is accomplished by dialing one plus (1+) the called number. Operator-assisted calling can be placed by dialing zero plus (0+) the called number or by simply dialing zero (0).

The long-distance call is originated by user AA106 and sent to matrix switch AA102. This occurs in a step AD102. The call is sent over two channels. These channels are an audio channel AA122 and a signalling channel AA124. Audio channel AA122 carries the audio portion of the call. The audio portion of the call is referred to as call audio AA142. It is over audio channel AA122 that the caller's voice (in other words, call audio AA142) can be heard. Call audio AA142 can be analog audio, digital audio, or other information transferred among users AA106 in analog or digital form (for example, fax or modem signals).

Signalling channel AA124 is used to transmit call data AA144. Call data AA144 includes information regarding the type of telephone call being made and other call handling parameters including called number, originating number (e.g., an automatic number identification, or ANI), how the call was dialed (1+, 0+, 0), and the like. Call data AA144 also provides call setup parameters to matrix switch AA102.

An example of a signalling channel AA124 is the industry standard common channel signalling system 7 (SS7) out-of-band signalling channel. SS7 is typically a 56 kilobit (kbit) link, and is commonly transmitted over a T-1 carrier. Typically, call data AA144 is a data packet comprising 30–40 bytes of data.

Matrix switch AA102 accepts call data AA144 to determine how to handle and route the call. This occurs in a step AD104.

If the call requires operator assistance (for example, a collect call), operator call data AA146 is provided to an operator console AA108. This occurs in a step AD106. Typically, operator call data AA146 is transferred to operator console AA108 over a data link AA126. Operator call data AA146 includes information regarding the type of call and other information which matrix switch AA102 knows regarding the call such as originating number, how the call was dialed, and the like.

Operator console AA108 is typically a manual operator console which requires a human operator. The human operator answers the incoming call. The human operator then sends operator commands AA128 to matrix switch AA102 to complete the call so the operator can verify that the called party will accept the charges for the call. This occurs in a step AD108.

If the call was instead a direct-dial call, matrix switch AA102 uses call data AA144 provided over signalling channel AA124 to determine where to route the call. Matrix switch AA102 then routes the call to the destination number. This occurs in a step AD110.

There are several problems associated with this system used by the conventional long distance carrier. First, data link AA126 over which operator call data AA146 are transferred is often slower than desired and introduces unwanted delays in handling the call.

A second problem is that the human operator at operator console AA108 only gets the information that matrix switch AA102 decides to send. In other words, call handling is limited to the features and capabilities that are provided by the particular matrix switch AA102 that was purchased by the carrier.

Note, other manufacturers may provide matrix switches AA102 with different features from those of the DMS 250. For example, other switches AA102 may have a higher data rate link AA126. However, long-distance carrier AA112 is still limited to the choices of matrix switches AA102 that are commercially available, because it would be prohibitively expensive to design, develop and manufacture a custom matrix AA102. Thus, the functionality and capabilities that can be provided by a long distance carrier in this conventional system are limited to the functionality and characteristics provided by available matrix switches AA102.

Because matrix switches AA102 are costly to develop, they are typically designed to provide only those basic functions that all long-distance carriers are likely to desire. In this manner, the development costs of matrix switch AA102 can be spread among numerous long-distance carriers. The cost of developing and manufacturing a unique matrix switch AA102 is too high to provide a custom switch for a single long-distance carrier, or for only a small group of long-distance carriers. As a result, customer-unique and carrier-unique calling features and services cannot be provided.

Additionally, most manufacturers of matrix switches AA102 are unable to modify existing matrix switches AA102 to meet unique needs of the various long-distance carriers without a significant cost and significant time to implement.

An additional problem is that it is typically expensive to provide operator positions to interface to matrix switch AA102. This is because operator consoles can only interface to conventional matrix switches AA102 via special operator ports. Most conventional matrix switches provide a limited number of such operator ports. For example, the DMS 250 matrix switch AA102 provides a capability of 384 operator console ports per switch. Thus, in this example, if more than 384 operator consoles AA108 are desired, at least one additional DMS 250 matrix switch must be purchased. At a cost of approximately $2 million per DMS 250 (1993 prices), the cost of additional operator positions is high.

This example serves to illustrate the underlying reason behind the problems discussed in the Background section. Due to the high cost of available matrix switches AA102, most, if not all, of the smaller long-distance carriers cannot afford to purchase or develop custom telecommunications switching equipment. As a result, these carriers cannot have their own operator positions. Therefore, these carriers must obtain high-end services such as operator-assisted calling through carriers AA112 who have such capabilities.

Additionally, for those long-distance carriers who do have matrix switches AA102, such switches AA102 cannot be easily (or cost-effectively) reconfigured, or customized, to meet unique call processing needs. Thus, the flexibility required to offer a wide range of customer services and call handling capabilities cannot be provided to the customers and users of these call processing systems AA112.

1.1 The Present Invention: A Simple and Elegant Solution

Figure 3:
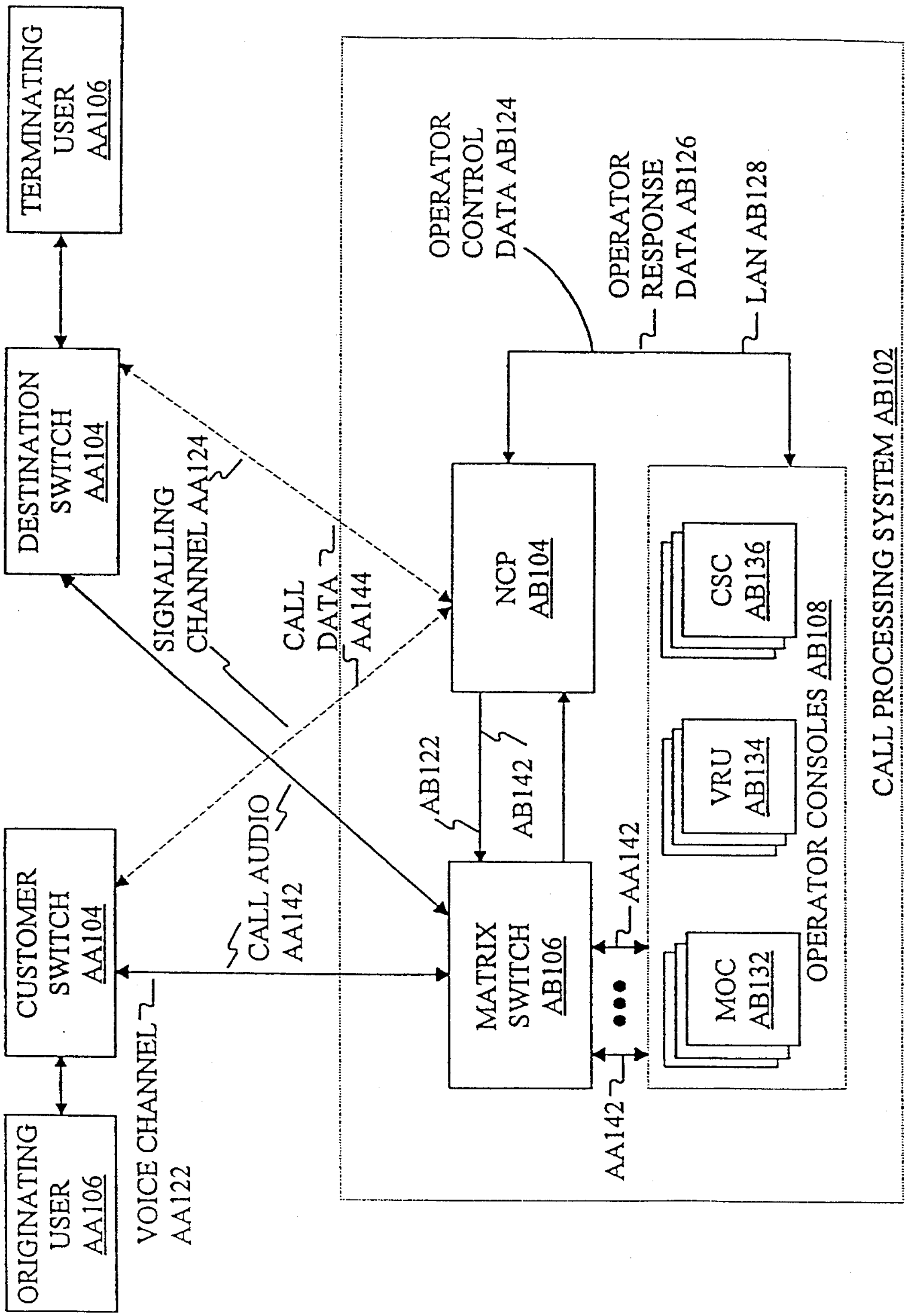
FIG. 3 is a high-level block diagram illustrating a call processing system according to the present invention.

Recognizing that there was a long-felt need for overcoming the above-discussed limitations of the matrix switch AA102, the inventors set forth to develop a simple and elegant solution for providing a flexible call processing system. FIG. 3 provides a high-level illustration of a call processing system AB102 according to the present invention.

As is described fully in this document, call processing system AB102 provides a wide range of enhanced calling products and features to carriers and individual users. One or more carriers can use call processing system AB102 to obtain carrier-unique and customer-unique, customized products and features for their customers.

Call processing system AB102 includes a network control processor (NCP) AB104 and a matrix switch AB106. Matrix switch AB106 could be the same as matrix switch AA102 (for example, a DMS 250). Alternatively, matrix switch AB106 could be a simpler type of switch as will be described below. NCP AB104 is a unique combination of hardware, software structure and programs designed and developed to control calls being handled by call processing system AB102. NCP AB104 is fully described in detail in the Network Control Processor Section of this patent document.

Call processing system AB102 can also include one or more operator consoles AB108. Operator console AB108 can be the same as operator console AA108 used in the conventional system. However, in a preferred embodiment, operator consoles AB108 provide additional features not found in conventional operator consoles AA108. For example, operator consoles AB108 provide the capability to use customized scripts to present a carrier-unique interface. Scripts and other features of operator consoles AB108 are discussed throughout this document.

Types of operator consoles AB108 can include a manual operator console MOC AB132 and an automated voice response unit (VRU) AB134. MOC AB132 provides the functionality required for a human operator to converse with the caller. Automated VRU AB134 does not require a human operator to handle operator-assisted calls. Automated VRU AB134 includes stored voice or synthesized voice responses (automated scripts) to provide automated voice instructions to the caller. For example, automated VRU AB134 may instruct a caller AA106A (originating user) to enter her calling card number.

An additional type of operator console AB108 includes a customer service console (CSC) AB136. Customer service console AB136 performs customer service related functions. These functions include giving credits for call problems and answering questions of users AA106 and long-distance carrier customers of call-processing system AB102.

When a call is originated by originating user AA106A, call audio AA142 and call data AA144 for the call are routed to call processing system AB102. A key feature of call processing system AB102 is that it enables call audio AA142 on audio channel AA122 to be handled separately from call data AA144.

Figure 4:
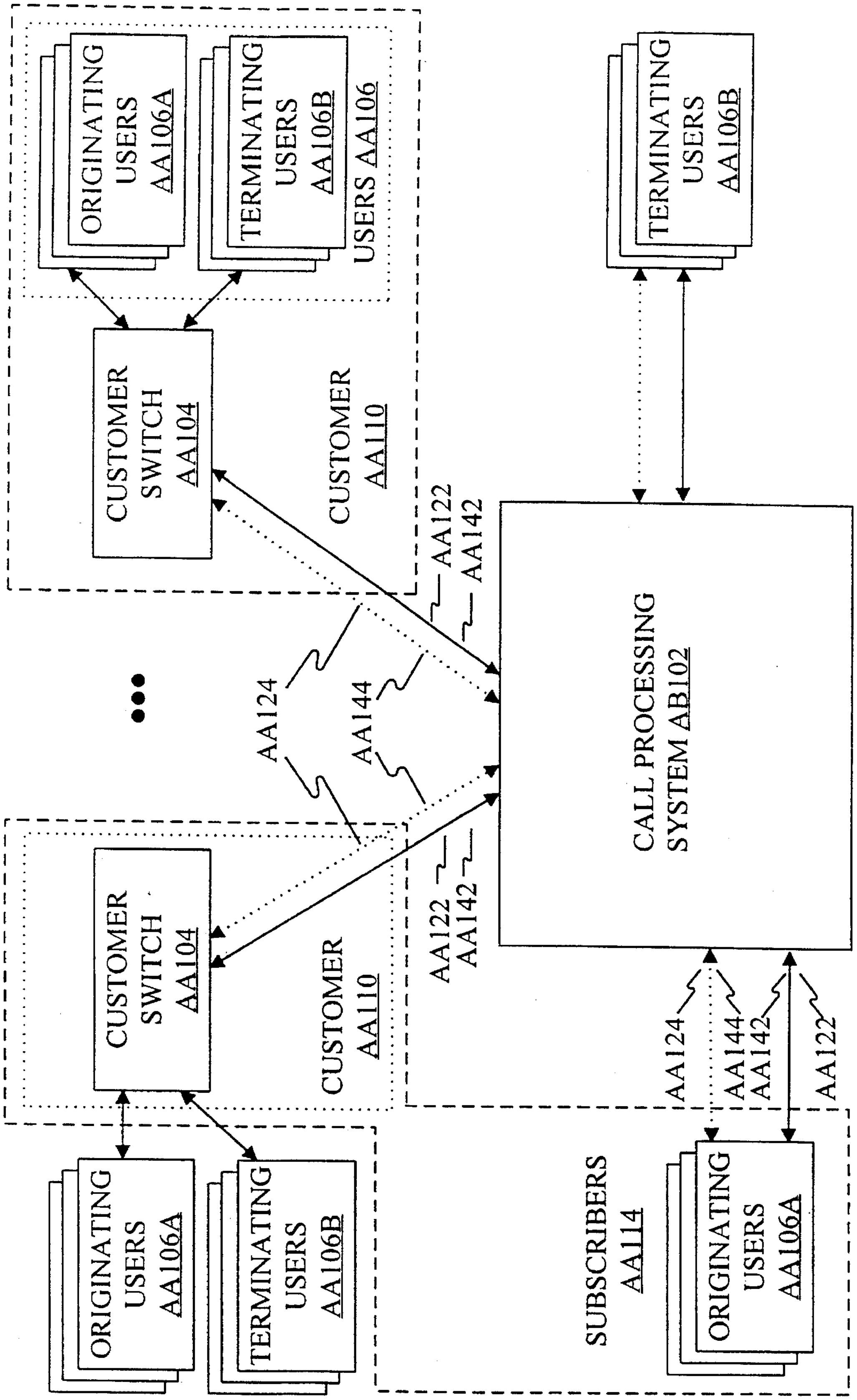
FIG. 4 is a high-level block diagram illustrating the interface of customers and users to the call processing system according to one embodiment of the present invention.

Originating user AA106A can be a client of a customer AA110 of call processing system AB102, or a direct subscriber AA114 of call processing system AB102. Customer AA110 can be a business or a carrier procuring enhanced services from call processing system AB102. Originating user AA106A may place a call directly to call processing system AB102 or through customer switch AA104. This is more clearly illustrated in FIG. 4. The detail of customer AA110 and users AA106 is illustrated separately in FIG. 4 for clarity. The term subscriber AA114 is used to generally refer to users AA106 who are direct clients of call processing system AB102 and/or to customers AA110.

Calls are placed to terminating users AA106B. Terminating users AA106B may be subscribers AA114, clients of customers AA110, or any other destination to which a call is placed.

NCP AB104 receives call data AA144 via signalling channel AA124. NCP AB104 uses call data AA144 to make call handling decisions. Examples of these decisions include whether operator assistance is required, whether a number translation is required, how to bill the call, where the call should be routed, and the like. Also, when the call is originated, matrix switch AB106 receives call audio AA142 from the user AA106 who placed the call.

NCP AB104 then sends switch control data AB122 to matrix switch AB106. Switch control data AB122 include data that controls call routing in matrix switch AB106. For calls requiring operator assistance, NCP AB104 sends operator control data AB124 to operator console AB108. Operator control data AB124 includes information on how to handle the operator-assisted call.

Figure 5:
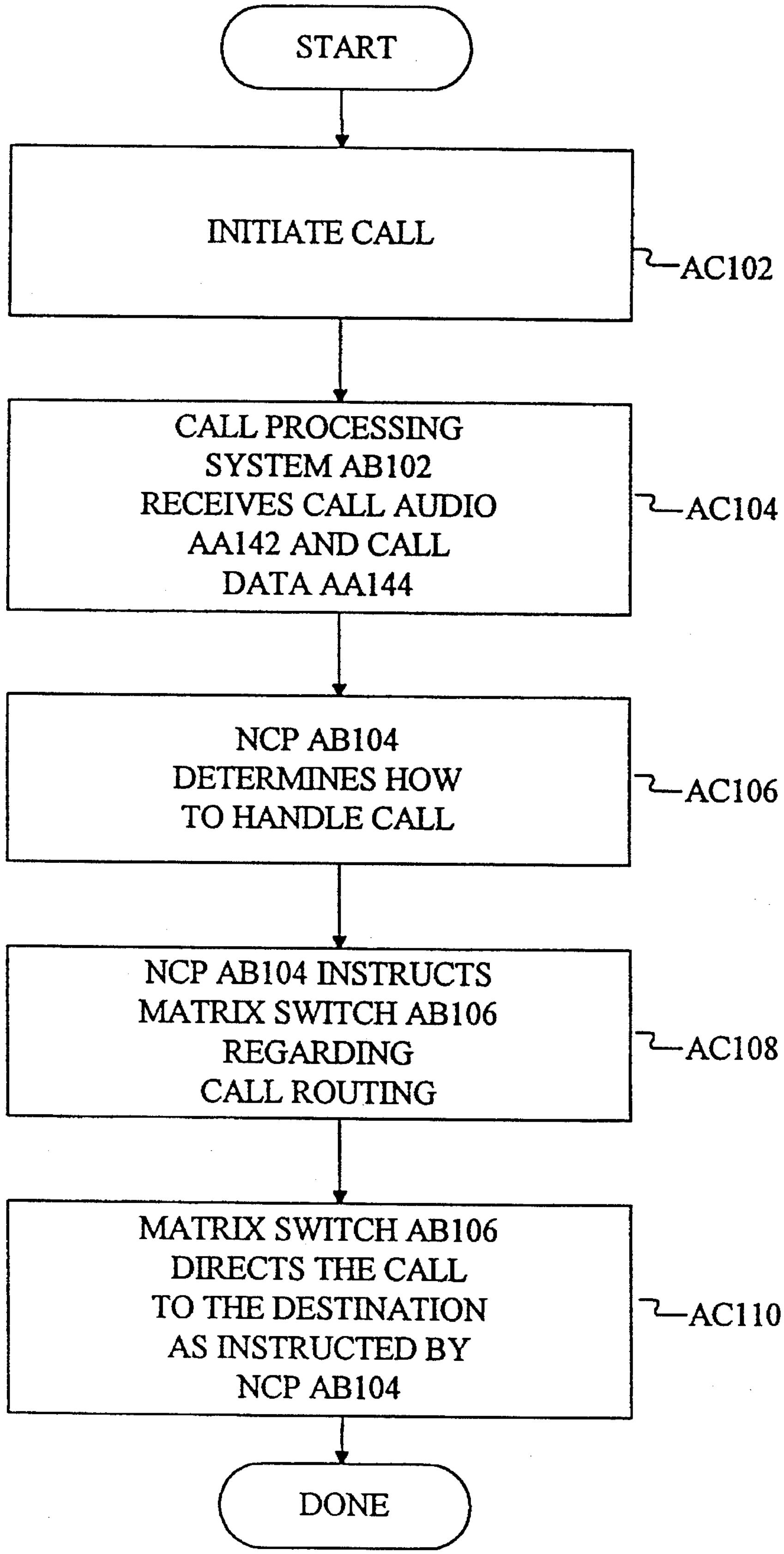
FIG. 5 is a high-level operational flow diagram illustrating the steps involved in placing and completing a call using the call processing system according to one embodiment of the present invention.

Call processing system AB102 is best described in conjunction with an example illustrating how calls are handled. FIG. 5 is an operational flow diagram illustrating the steps involved in placing and completing a call using call processing system AB102. Referring to FIGS. 3 and 5, these steps are now described.

In a step AC102, an originating user AA106A initiates a call. In other words, a caller picks up the telephone and dials a telephone number of a called party (terminating user AA106B). Examples of user AA106 can include a human communicating via a telephone instrument, a fax machine, or a modem. The only difference is that originating user AA106A originates the telephone call, while terminating user AA106B is the user to whom the call is placed.

The call can be routed directly to NCP AB104, or it could be routed to NCP AB104 via customer switch AA104. In the latter case, customer switch AA104 forwards call audio AA142 and call data AA144 associated with this call to call processing system AB102. If a customer switch AA104 is not in place, call audio AA142 goes directly to matrix switch AB106 at call processing system AB102 and call data AA144 to NCP AB104.

In a step AC104, call processing system AB102 receives call audio AA142 and call data AA144 for the call initiated in step AC102. More specifically, matrix switch AB106 receives call audio AA142, and NCP AB104 receives call data AA144.

In a step AC106, NCP AB104 uses call data AA144 to determine how to handle the call. Specific details regarding the manner in which NCP AB104 makes this determination are fully described in detail in the Network Control Processor Section of this patent document.

In a step AC108, NCP AB104 sends switch control data AB122 to matrix switch AB106. Switch control data AB122 commands matrix switch AB106 to route the call to the correct destination. For example, switch control signal AB122 may command matrix switch AB106 to route the call audio AA142 to customer switch AA104 at the terminating end and ultimately to terminating user AA106B.

The manner in which NCP AB104 commands matrix switch AB106 is through sending switch control data AB122 to matrix switch AB106. The format and content of switch control data AB122 depends on the type of matrix switch AB106 utilized. Note that in some cases, depending on the customer, a customer switch AA104 at the terminating end may not be used. In these cases, the call is routed directly to terminating user AA106B.

In a step AC110, matrix switch AB106 routes the call to terminating user AA106B as instructed by NCP AB104 in step AC108.

As a result of the functionality provided by NCP AB104, matrix switch AB106 no longer controls the call as was the case with matrix switch AA102 in the conventional system. Matrix switch AB106 now simply functions as a passive switch that is reconfigured based on switch control information AB122 sent by NCP AB104.

NCP AB104 receives all the call data AA144 associated with the telephone call. There is no filtering or screening performed before data AA144 is received by NCP AB104. Call data AA144 can include, among other call attributes, the originating number, the called number, and the route or circuits activated in customer switch AA104. Thus, full control of the call and all its call audio AA142 and call data AA144 can be provided by call processing system AB102.

Figure 6:
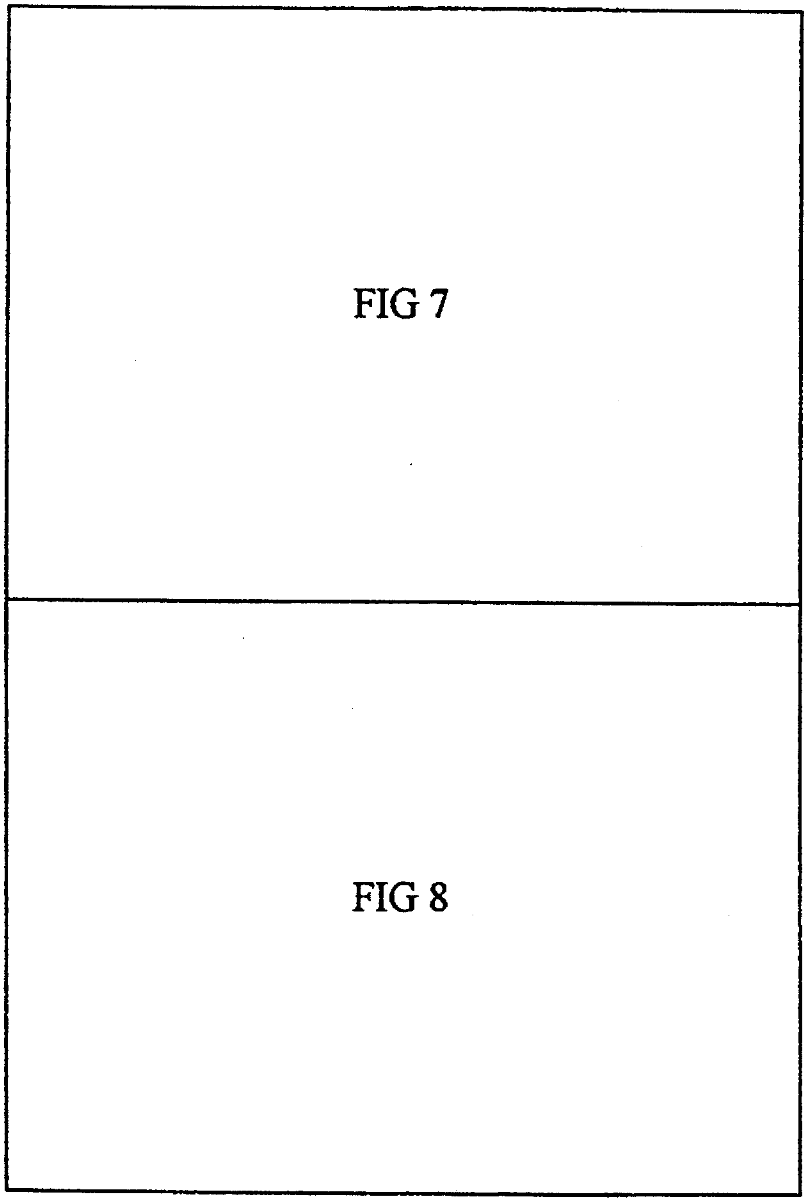
FIG. 6, which comprises
Figure 7:
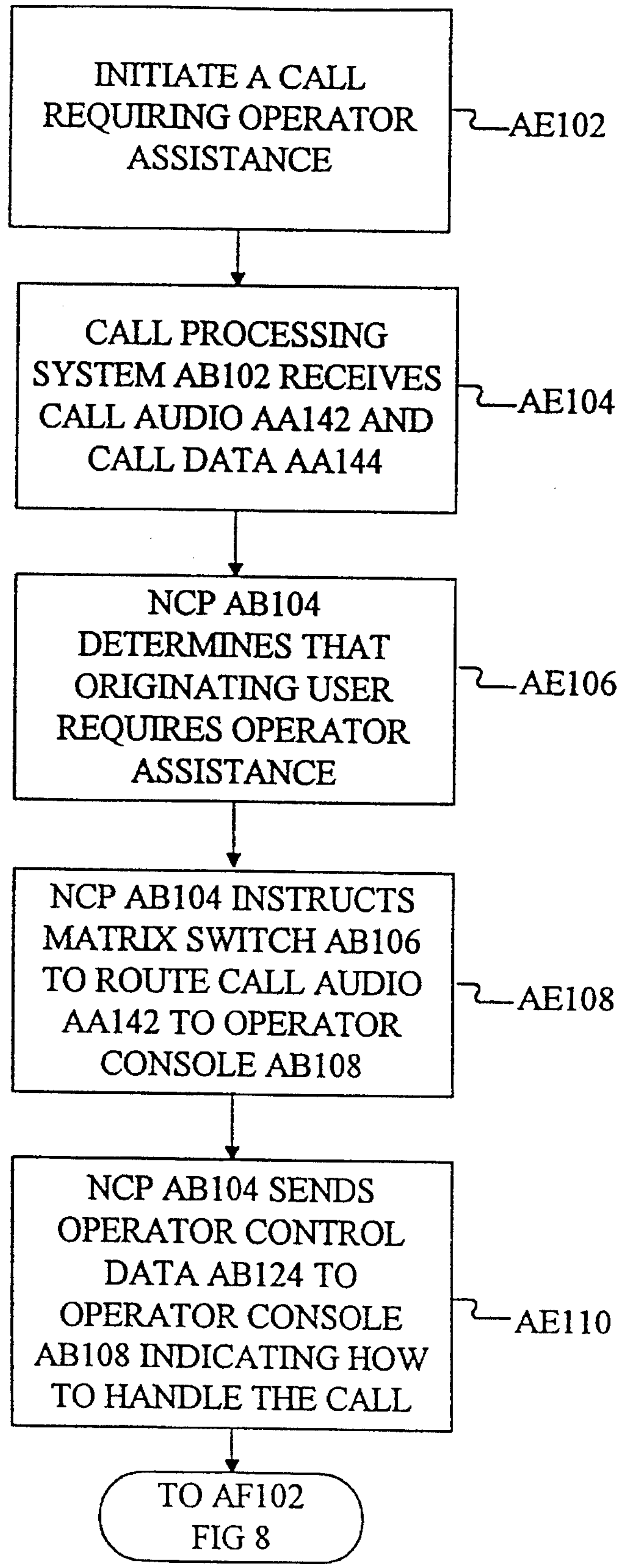
FIGS. 7 and 8, is a high-level operational flow diagram illustrating the process that the call processing system uses to process operator-assisted calls according to one embodiment of the invention.
Figure 8:
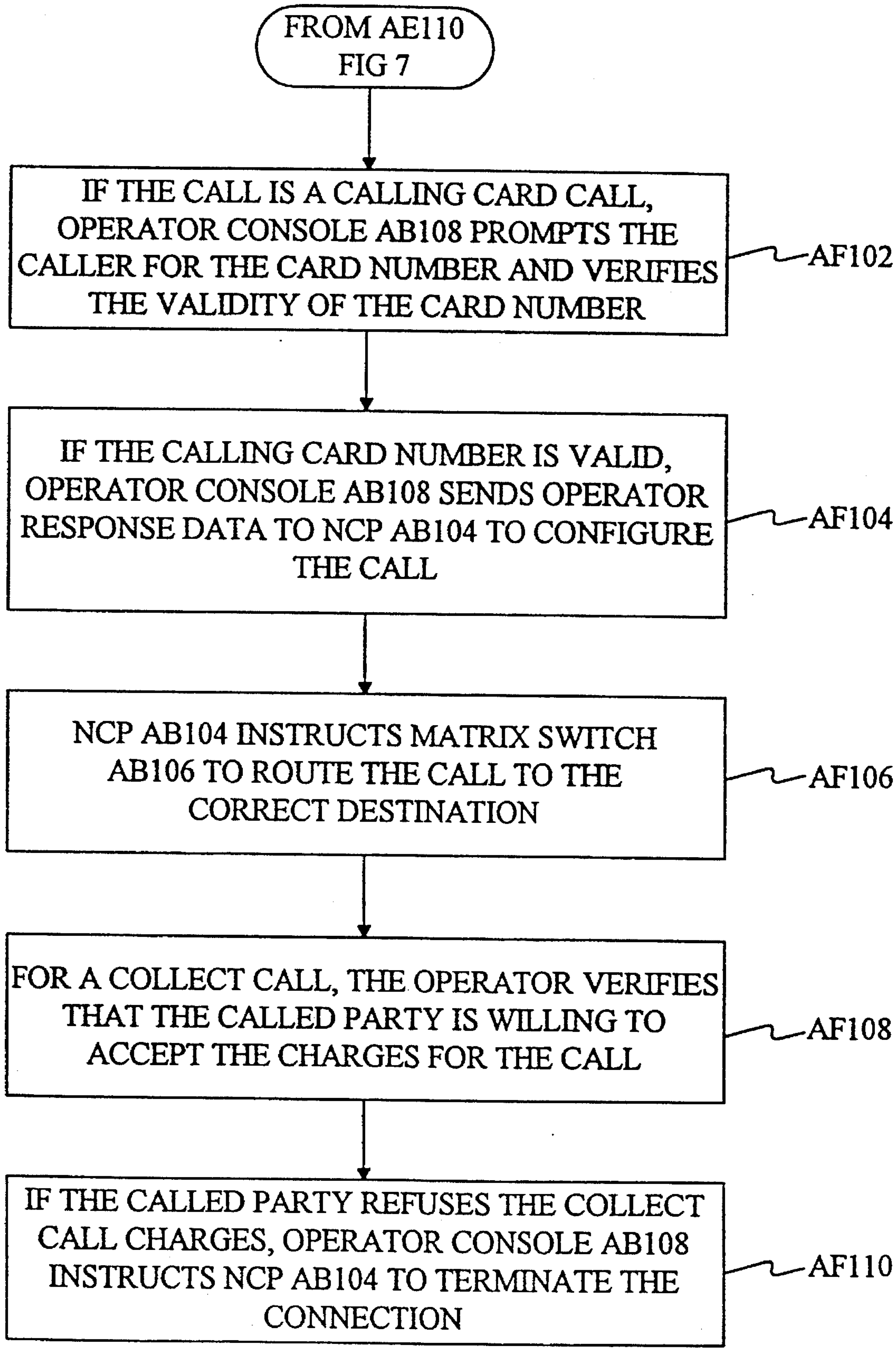

A further high-level illustration of the functionality of call processing system AB102 is now described with reference to the following example. In this example, an originating user AA106A initiates a call requiring operator assistance. FIG. 6, which comprises FIGS. 7 and 8, is a high-level operational flow diagram illustrating the process that call processing system AB102 uses to process operator-assisted calls. Referring now to FIGS. 3, 7, and 8, originating user AA106A initiates an operator assisted call as shown in a step AE102.

In a step AE104, call processing system AB102 receives call audio AA142 and call data AA144. More specifically, matrix switch AB106 receives call audio AA142 and NCP AB104 receives call data AA144.

In a step AE106, NCP AB104 interprets call data AA144 and determines that originating user AA106 originated a call requiring operator assistance. For example, in one embodiment NCP AB104 could examine the called number and determine that because the first number dialed is zero, the caller is requesting operator assistance.

In a step AE108, NCP AB104 instructs matrix switch AB106 to route call audio AA142 to an operator console AB108. If a human operator is not required, call audio AA142 can be routed to an automated operator console (for example, an automated voice response unit VRU AB134). In this case, the VRU AB134 instructs the caller on how to proceed. These instructions are typically telephone keypad button sequences to be pressed by the caller to complete the call. An example of this is where VRU AB134 instructs the caller to enter a calling card number.

If a human operator is required to handle the call, the call audio AA142 is routed to a manual operator console AB132. In this case, the caller can converse with the operator. An example of this case is where the caller is placing a collect call.

Where matrix switch is a DMS 250, NCP AB104 simply instructs the DMS 250 to route the call to the console position assigned to operator console AA108. Because operator console AB108 only gets call audio AA142, operator console AB108 is treated as any other destination and can be identified by a terminating number.

In a step AE110, NCP AB104 routes operator control data AB124 to operator console AB108 via a LAN AB128. Operator control data AB124 instructs operator console AB108 regarding the handling of the call. Operator control data AB124 is determined by NCP AB104 when NCP AB104 receives call data AA144.

There is a key distinction between call-processing system AB102 and the conventional system illustrated in FIG. 1. With the conventional system, special operator console ports are required to allow an operator console AA108 to be interfaced to matrix switch AA102. This is because control information had to be provided by matrix switch AA102 to operator console AA108.

However, according to call processing system AB102, matrix switch AB106 only has to transfer call audio AA142 to operator console AB108. The control information is provided by NCP AB104 in the form of operator control data AB124. Operator console AB108 only gets call audio AA142 from matrix switch AB106. Therefore, operator console AB108 can be treated as if it is any other terminating user AA106B or customer switch AA104. Thus operator console AB108 does not have to interface to matrix switch AB106 via a special operator console port. Therefore, the number of operator consoles AB108 that can interface to matrix switch AB106 is not limited to the number of operator console ports available on matrix switch AB106.

Operator console AB108 now has a connection with audio channel AA122. As noted above, operator console AB108 can be either an MOC AB132 for a human operator, or an automated VRU AB134.

If originating user AA106A is placing a calling card call, originating user AA106A is prompted by operator console AB108 to enter the calling card number. The number is received and verified to ensure that it is a valid number. If the number is invalid, the user is informed that the call cannot be completed. This occurs in a step AF102 (FIG. 8).

For valid calling card numbers and for collect calls, operator console AB108 initiates the connection to the terminating user AA106. This occurs as described in steps AF104–AF108 as follows.

In a step AF104, operator console AB108 sends operator response data AB126 to NCP AB104 via LAN AB128 indicating that the call can be placed as requested. In response, NCP AB104 sends switch control data AB122 to configure matrix switch AB106. This tells matrix switch AB106 how to route the call. This occurs in a step AF106.

In a step AF108, matrix switch AB106 is reconfigured to direct the call to the destination as instructed by NCP AB104.

For a collect call, the operator asks the called party whether they are willing to accept the charges. This occurs in a step AF108.

If the called party is not willing to accept the charges, operator console AB108 sends operator response data AB126 to NCP AB104 indicating that the call should be terminated. This occurs in a step AF110.

It should be understood that the two examples of placing a collect call and a calling card call are offered as examples only. These examples should not be interpreted to imply that the call processing system AB102 is limited to only these types of capabilities.

Call processing system AB102 provides additional value-added features to telephone services. As fully described in this document, call processing system AB102 can be configured to provide the capability for, among other things, operator assisted calling, calling card and credit card calling, number translation and forwarding, real-time call billing, and real-time call rating.

Figure 9:
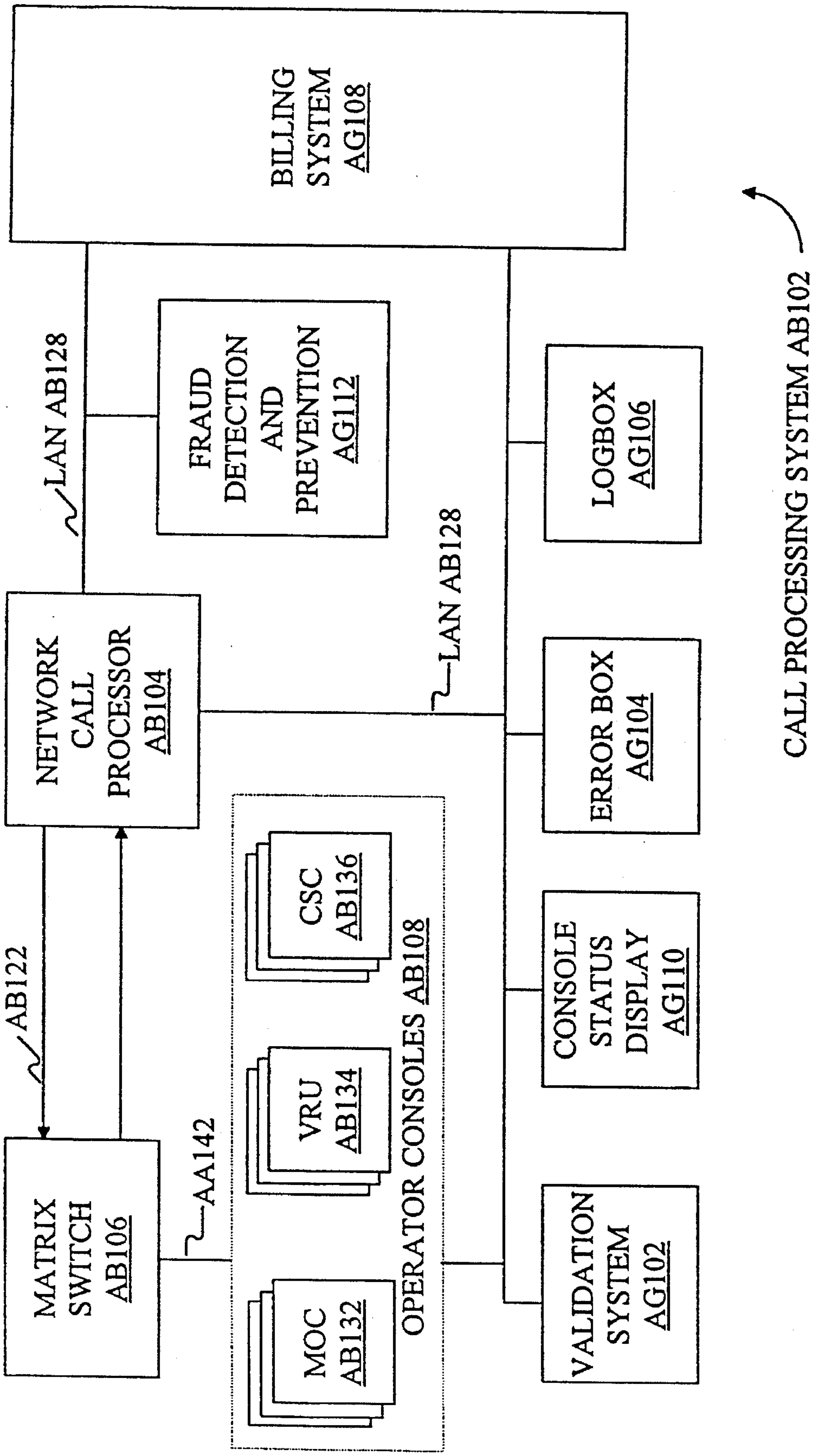
FIG. 9 is a high-level block diagram illustrating a representative architecture of one embodiment of the call processing system according to the present invention.

Call processing system AB102 can include additional systems, subsystems, and features not addressed in this high-level introduction. These systems, subsystems and features, discussed in detail in the sections of this document that follow, are now briefly introduced. FIG. 9 is a high-level block diagram illustrating a representative architecture of call processing system AB102 according to one embodiment. It should be noted that this architecture is presented by way of example only and is not intended to limit call processing system AB102 to this embodiment. Numerous alternative architectures can be chosen to implement call processing system AB102 in alternative embodiments.

Referring now to FIG. 9, in one embodiment, call processing system AB102 includes matrix switch AB106, network control processor AB104, and operator consoles AB108. Additionally, call processing system AB102 includes a validation system AG102, a console status display AG110, an error box AG104, a log box AG106, a fraud detection and prevention system AG112, and a billing system AG108.

Validation system AG102 is provided to validate certain pieces of call information before the call is completed. In this document, a call is completed by routing the call to its destination (to the called party). For example, validation system AG102 may be used to determine if a calling card number is valid for the call being placed, or if a credit card number is valid for credit card calls.

Error box AG104 receives problem and error information from other components in call processing system AB102. Error box AG104 logs this problem information for future reference.

Log box AG106 tracks events specific to start-up and termination of applications on LAN AB128. These include application log-ins and log-outs. Error messages recorded by error box AG104 and log messages recorded by log box AG106 can be tied together to aid in trouble shooting and error analysis.

Billing system AG108 performs billing services for call processing system AB102. These services are fully discussed in the Billing System Section of this patent document.

Fraud detection and prevention system AG112 is used to provide real-time fraud monitoring and detection. These capabilities facilitate detection and prevention of fraudulent use of call processing system AB102. Fraud detection and prevention system AG112 is further discussed in the fraud detection and prevention section of this patent document.

Console status display AG110 provides numerical and graphical information about current and past status of operator consoles AB108.

2.0 Network Control Processor (NCP)

The Overview Section of the Detailed Description provides a high-level description of how a Network Control Processor (NCP) AB104 is used to control call handling and perform call processing for long-distance carriers. This section of the Detailed Description describes NCP AB104 and its interfaces in greater detail.

2.0.1 Network Control Processor

Figure 10:
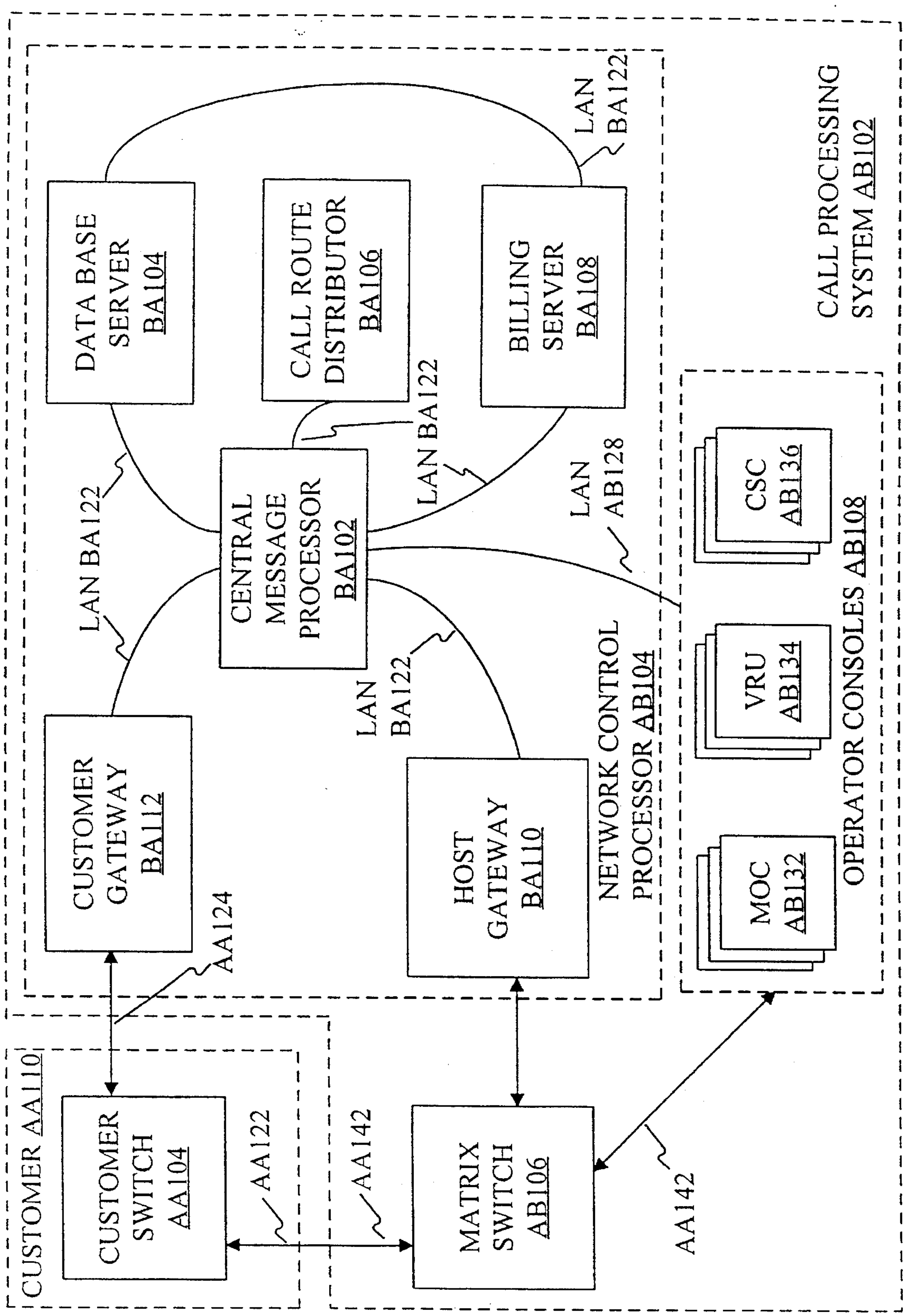
FIG. 10 is a block diagram illustrating a high-level architecture of the network control processor according to one embodiment of the invention.

FIG. 10 is a block diagram illustrating call processing system AB102 in greater detail. More specifically, FIG. 10 illustrates the components that comprise NCP AB104 in one embodiment. These components include a central message processor (CMP) BA102, a database server (DBS) BA104, a call route distributor (CRD) BA106, a billing server (BSRVR) BA108, a host gateway BA110 and a customer gateway BA112. Multiple host gateways BA110 may be provided to interface to multiple matrix switches AA106. Similarly, multiple customer gateways BA112 may be provided.

In one embodiment, these components communicate with one another via a local area network (LAN) BA122. CMP BA102 communicates with operator consoles AB108 via a LAN AB128. In one embodiment, LAN AB128 is an ethernet LAN using the TCP/IP protocol.

FIG. 10 depicts a logical (versus physical) architecture for NCP AB104 in terms of the illustrated processes. This architecture is chosen because it groups related functionality into separate processes. It should be noted that this is only one possible architecture for implementing NCP AB104. NCP AB104 can be implemented using numerous variations on this architecture.

The design of NCP AB104 is such that processes within NCP AB104 can all run on different computers and still communicate with one another.

NCP AB104 is part of call processing system AB102. Call processing system AB102 also includes at least one matrix switch AB106 and at least one operator console AB108.

NCP AB104 interfaces to matrix switch AB106 via host gateway BA110. Additional host gateways BA110 may be provided, when needed, to interface to additional matrix switches AB106. NCP AB104 also interfaces to a customer switch via customer gateway BA112. In actuality, numerous subscribers AA114 and customer gateways BA112 may interface to NCP AB104.

As discussed in the Overview Section, each customer AA110 may have a customer switch AA104 to tie in one or more end users AA106 (see FIG. 3). A customer AA110 of call processing system AB102 can be a business or a small, medium, or large telephone carrier.

The interface between subscribers AA114 and NCP AB104 is signalling channel AA124. As previously noted, in one embodiment signalling channel AA124 is an SS7 channel. Customer gateway BA112, which is connected to signalling channel AA124, serves several functions. One function is to provide communications and protocol conversions necessary so that NCP AB104 can communicate with customer AA110. More specifically, customer gateway BA112 provides protocol conversions so that NCP AB104 can communicate with customer switch AA104. For example, where SS7 messages are used with customer switch AA104, customer gateway BA112 converts the SS7 message to a message type compatible with LAN BA122.

Similarly, host gateway BA110 provides communications and protocol conversions necessary so that NCP AB104 can communicate with matrix switch AB106. Again, where SS7 messages are used, host gateway BA110 converts the SS7 message to the message type compatible with LAN BA122.

Gateways BA110, BA112 can also be implemented to convert other message types (such as a switch-vendor asynchronous protocol) into the message type compatible with LAN BA122.

In a preferred embodiment, the functionality provided by customer gateway BA112 and host gateway BA110 is part of NCP AB104. In alternative embodiments, this functionality could be provided in gateways that are physically separate from NCP AB104.

2.0.2 Call Setup Using the Network Control Processor

To illustrate the functionality of NCP AB104 and its processes, an example data flow is now described. This data flow illustrates what occurs when a call originated by a user AA106 is received by call processing system AB102. In this example, the call placed is one requiring operator assistance. Operator assistance is not required for every call. This example is chosen to illustrate the additional functionality used to provide operator assistance.

Figure 11:
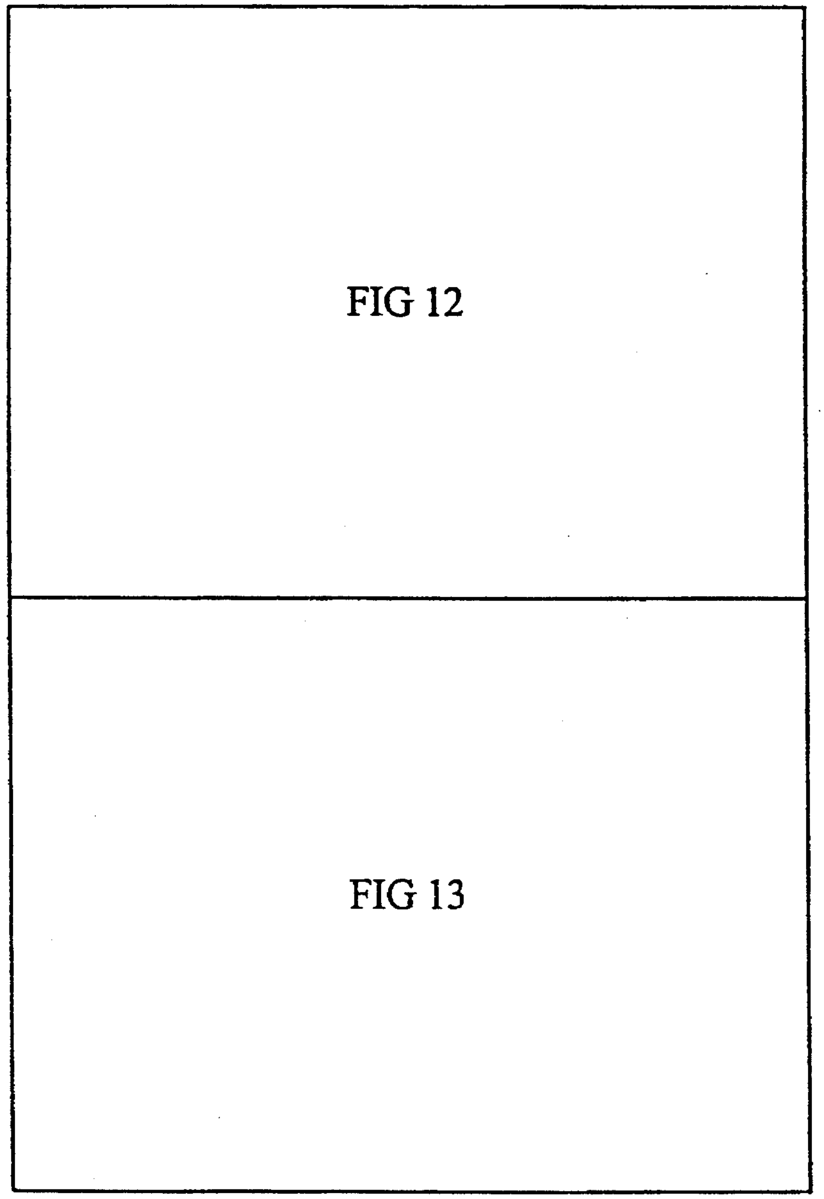
FIG. 11, which comprises
Figure 12:
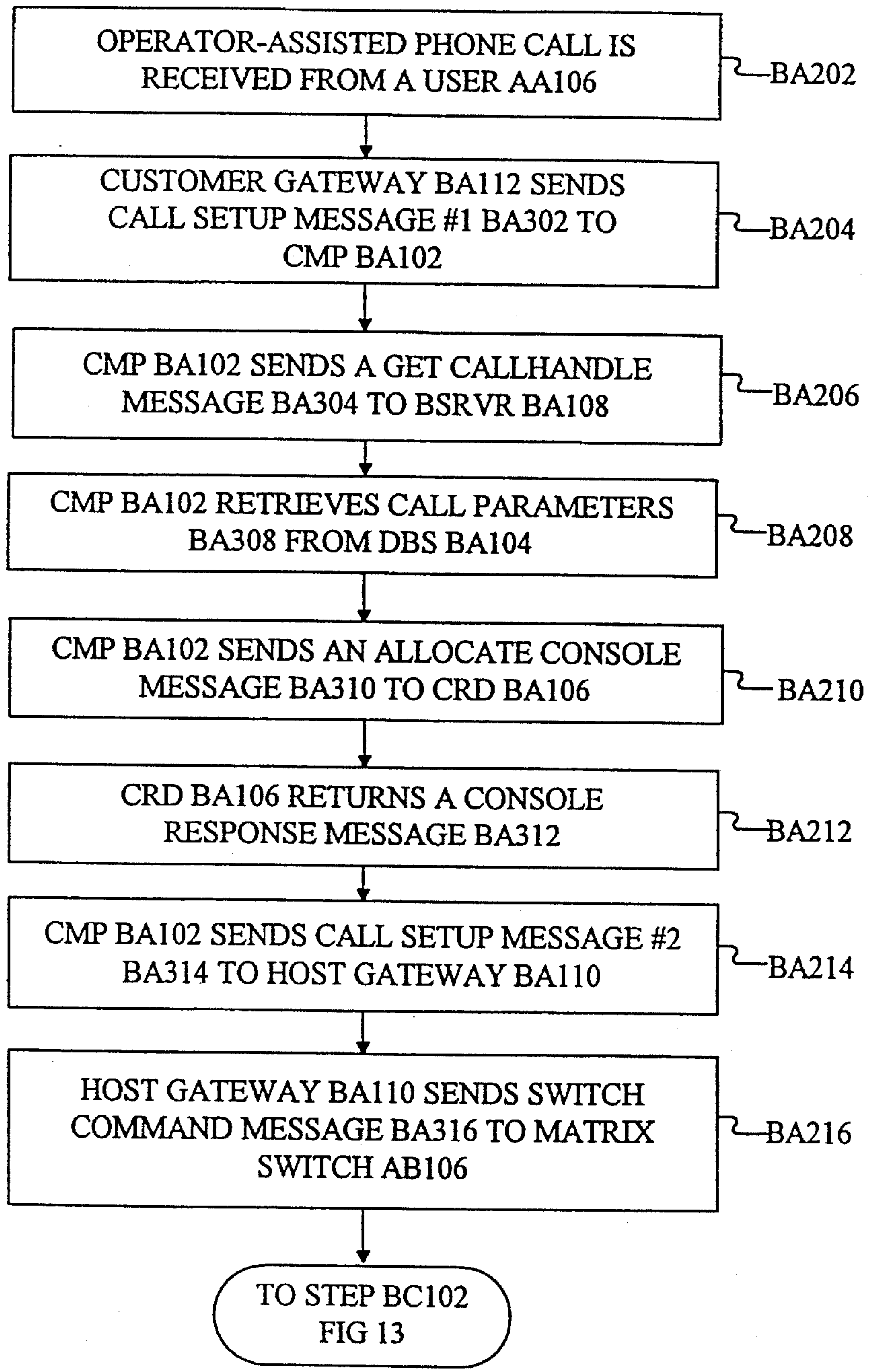
FIGS. 12 and 13, is an operational flow diagram illustrating the steps followed by the network call processor in handling a call requiring operator assistance according to one embodiment of the invention.
Figure 13:
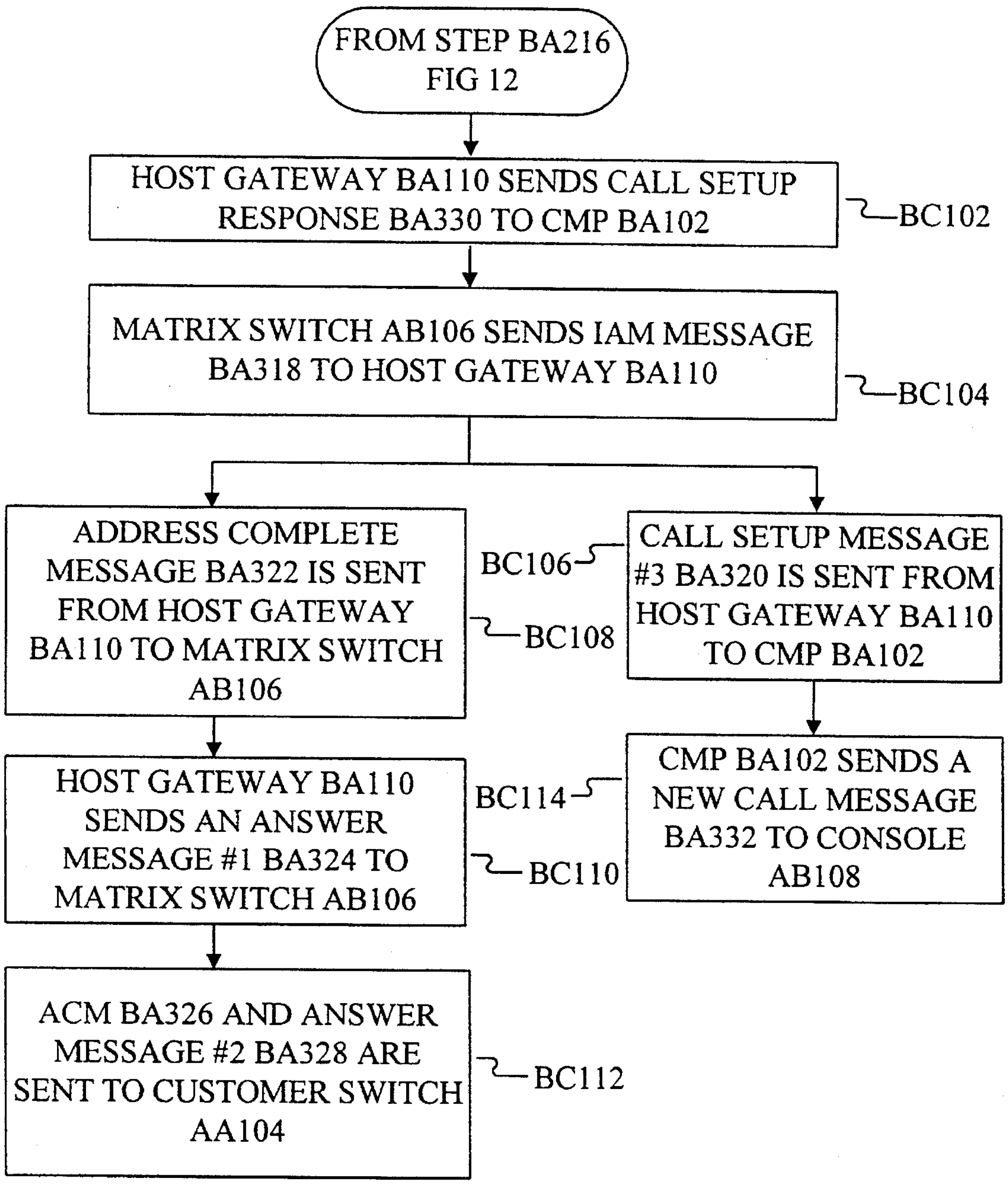
Figure 14:
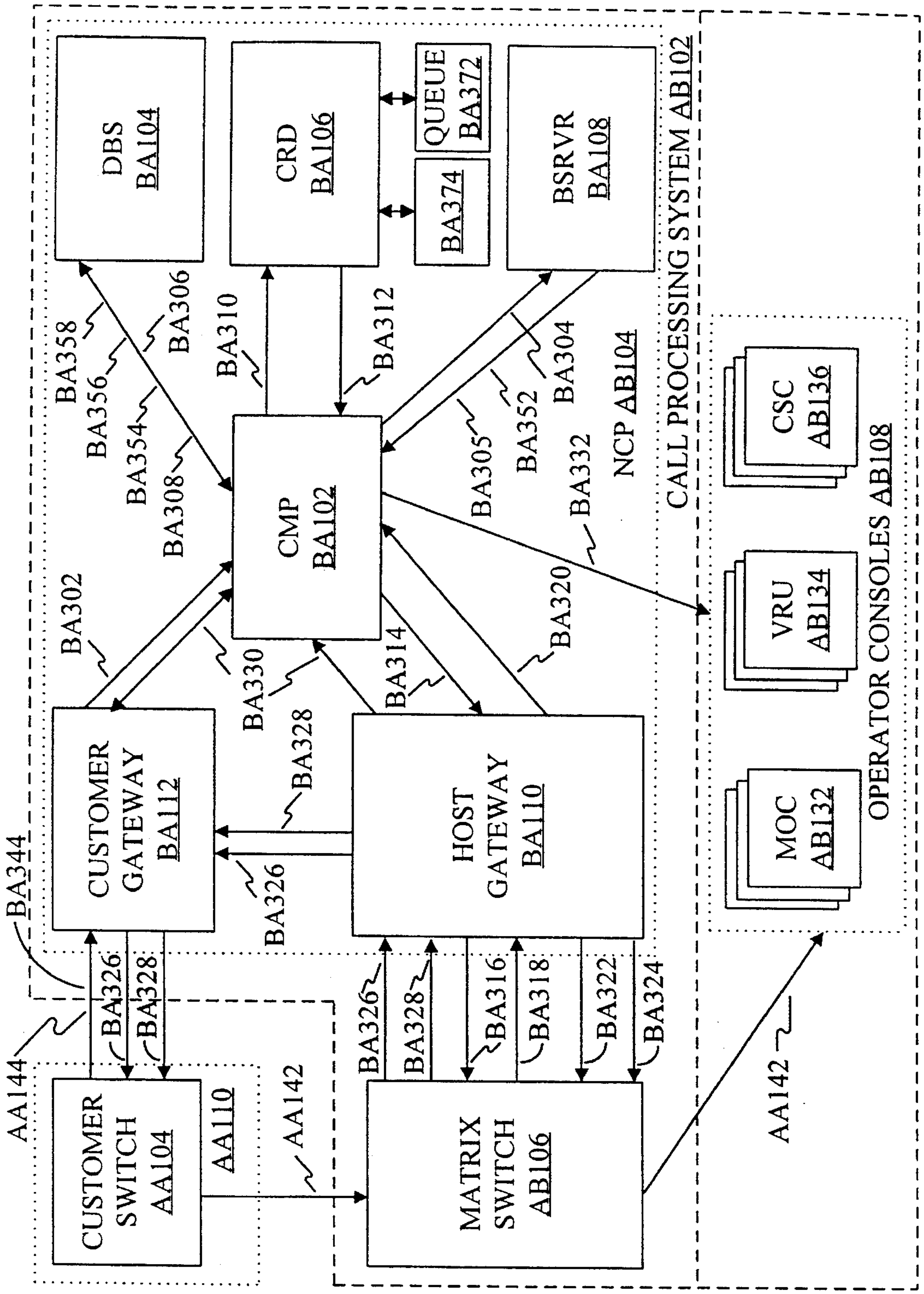
FIG. 14 is a data flow diagram illustrating the data flows that occur within and external to the network control processor when a call requiring operator assistance is received according to one embodiment of the invention.

FIG. 11 which comprises FIGS. 12 and 13, is an operational flow diagram illustrating the steps involved in handling a call requiring operator assistance. FIG. 14 is a data flow diagram illustrating the data flows that occur within NCP AB104 and external to NCP AB104 when the call is received. Referring now to FIGS. 12, 13, and 14, this data flow is now described.

In a step BA202, a phone call requiring operator assistance is received from a user AA106. User AA106 is using a long-distance carrier that is a customer AA110 of call processing system AB102. In this step, call data AA144 is received by NCP AB104. Although any of numerous signaling conventions may be used, this example is described in terms of an embodiment using SS7 messages. Therefore, in this embodiment, call data AA144 is an SS7 message. The SS7 message is an initial address message (IAM) BA344.

The call data AA144 can include information such as the called party number, the calling party number, an identification of the customer switch AA104 from which the SS7 message is received, an identification of the long-distance carrier customer AA110, an identification of the originating user AA106A placing the call, the digits dialed (for example, 0+, 0–, 800+, etc.), the circuit location of the audio connection in customer switch AA104, and other like information.

In a step BA204, customer gateway BA112 sends a CALL SETUP MESSAGE #1 BA302 to CMP BA102. In this step, customer gateway BA112 performs a conversion from a call data AA144 message type (in this example, an SS7 IAM message) to a LAN BA122 message type. CALL SETUP MESSAGE #1 BA302 includes all information (i.e., call data AA144) in IAM BA344. In the SS7 example, customer gateway BA112 encapsulates the SS7 message data into a packet for transfer over the LAN BA122. One manner in which messages are sent across LAN BA122 in a preferred embodiment is fully described in the Client/Server Section of this document.

In a step BA206, CMP BA102 sends a GET CALLHANDLE MESSAGE BA304 to BSRVR BA108. GET CALLHANDLE MESSAGE BA304 requests that a callhandle BA305 be assigned to the call by BSRVR BA108. Callhandle BA305 is a unique number used to identify the call. Callhandle BA305 is used to identify the call at each phase of processing within call processing system AB102. Callhandle BA305 is also used to identify the call for billing purposes.

All information gathered for the call is referenced to the unique callhandle BA305 assigned to that call. Upon assignment of callhandle BA305, BSRVR BA108 can create or allocate space within a callhandle table EB132 (illustrated in FIG. 54) to store parameters, attributes, or other call-related information gathered for that call. This call-related information is indexed by callhandle BA305. This information is used to make up a billing information record (BIR) EE322 (illustrated in FIG. 51).

Once callhandle BA305 is assigned by BSRVR BA108, BSRVR BA108 returns a CALLHANDLE RESPONSE MESSAGE BA352 indicating the assignment is made.

In a step BA208, CMP BA102 retrieves call parameters BA308 from DBS BA104. In this step, CMP BA102 sends a CALL ID REQUEST BA306 to DBS BA104 and waits for call parameters BA308 in response. Upon receipt of CALL ID REQUEST BA306, DBS BA104 performs a look-up in a call ID database (described in section 2.4 of this document, and in detail in Section 2.4.3.1). The look-up is performed based on the information included in call data AA144 (for example, ANI, called number, switch number, origin number, origin location, etc.). In one embodiment, call data AA144 for each call is used as a key to search for one or more records containing call parameters BA308. In this manner, the call processing that is defined by call parameters BA308 (as described below) can be customized based on call data AA144. Therefore, call processing can be customized on a per user AA106 or per customer AA110 basis. In fact, call processing can even be customized based on other data in call data AA144 including geographic area.

Call parameters BA308 include information pertaining to the manner in which the call is to be handled by call processing system AB102. Call parameters BA308 can be used to indicate whether the originating number (ANI) is valid, whether the call requires operator assistance, the type of operator assistance required, and other information pertaining to handling the call.

One specific call parameter BA308 that can be used is a device array list BA354. Device array list BA354 provides information used for routing the call to a specific one of the operator consoles AB108. Devices listed in device array list BA354 are types of devices that can be used to handle the call. These devices can include a voice response unit AB134, a manual operator console AB132, recorded message, a recording device, and the like. In one embodiment, the order in which the device types appear on the list indicates the priority in which those devices are to be selected for handling the call. In other words, if the device array list BA354 first lists a VRU AB134 type of operator console AB108 and then lists a manual operator console AB132 type, the call is first routed to an available VRU AB134. If all VRUs AB134 are busy, the call is next routed to an available manual operator console AB132. This process continues until all types on device array list are exhausted, or until a type with an available console is reached.

Also included in call parameters BA308 is a language field BA356. This is useful for calls that may require an operator (manual or automated) capable of responding in a certain language. The language field BA356 retrieved for an incoming call indicates whether the caller requires (or desires) an operator speaking a particular language. For example, one language field BA356 may indicate Spanish language operator assistance, while another indicates Chinese language operator assistance. The language may be designated based on any field in call data AA144. In other words, when language field BA356 is retrieved for a call, the retrieval may be keyed on the originating number, carrier identification, geographic area and/or other call data AA144.

Call parameters BA308 can also include a call type BA358. Call type BA358 provides an additional level of differentiation so that different call types can be routed to different types of operator consoles AB108. Call type BA358 can be used to distinguish calls for a variety of reasons. For example, call type BA358 can segment calls so that they can be routed to operators with different attributes and/or capabilities, or to different types of processing (for example, number translation).

In one embodiment, when each operator console AB108 logs in to the CRD BA106, it provides an operator profile. The profile contains information about the attributes and/or capabilities of that particular operator console AB108 or of a particular human operator. For example, the profile can include information such as the processing capabilities of a console AB108 and the language capabilities of a human operator. From this, it can be determined what types of calls can be handled by each operator console AB108.

The profile provided to CRD BA106 at login, can also include information pertaining to the level of operator expertise. This additional level of differentiation can be used to provide certain types of calls to certain types of operator consoles AB108. The call can even be directed to a specific human operator at a manual operator console AB132. Thus, some of the easier calls to handle, such as simple collect calls, can be routed to an operator with little experience. On the other hand, calls requiring a higher level of operator involvement can be directed to an operator with more experience.

It is important to note that call parameters BA308 can be retrieved based solely on the call information contained in call data AA144, such as user ID, carrier ID, originating number, called number, circuit number, et cetera. No additional user input is required. As described above, call parameters BA308 for a call can be determined uniquely based on call data AA144. The level of service, the type of operator console AB108 designated, or the type of call processing provided for each subscriber AA114 or client can be changed by updating call parameters BA308. These changes can be made by creating or updating the data records containing call parameters BA308. In most cases, no changes to operational code are required.

In a step BA210, CMP BA102 sends an ALLOCATE CONSOLE MESSAGE BA310 to CRD BA106. ALLOCATE CONSOLE MESSAGE BA310 can include device array list BA354, call type BA358, and language field BA356 received with call parameters BA308 for the call. As described, CRD BA106 uses device array list BA354 and other call parameters BA308 to determine which console type or which specific console AB108 is required to handle the call. CRD BA106 examines a console usage table BA374 to determine which operator consoles AB108 are available to handle this call. Console usage table BA374 indicates in real-time the availability of each specific console within the group of operator consoles AB108.

In other words, console usage table BA374 is a list indicating which operator consoles AB108 are available to handle a call, which operator consoles AB108 are currently in use handling other calls, and which operator consoles AB108 are otherwise unavailable (for example, are logged off). If an operator at one of the manual operator consoles AB132 takes a break, for example, that operator logs off the system and the console usage table is automatically updated to reflect the unavailability of that particular operator console AB132. VRUs AB134, and CSCs AB136, can also log on and off the call processing system AB102.

In response to ALLOCATE CONSOLE MESSAGE BA310, CRD BA106 returns a CONSOLE ALLOCATE RESPONSE message BA312. This occurs in a step BA212. CONSOLE ALLOCATE RESPONSE MESSAGE BA312 provides CMP BA102 with information such as the route number or console ID of the specific operator console AB108 assigned to handle the call. If no operator consoles AB108 are available for any of the device types listed on the device array list, the call is queued until an operator console AB108 which is able to take that type of call is available. More specifically, the call is placed in a queue BA372. Each call may be prioritized based on when the call was queued or based on call priority. This queue information is provided to CMP BA102. Music or other messages can be provided to the caller while the caller is waiting on queue BA372. The music and messages can be customized to a particular user AA106 or a particular customer AA110.

A console status display AG110 indicates how many calls are waiting on queue BA372 to logged-on manual operator consoles AB132. Alternative notification systems can be provided (such as audible alarms, for example), to inform the operators of a backlog of calls. In this manner, an indication is provided when calls are queuing up in the CRD BA106 as seen on the console status display AG110. If queue BA372 becomes too long, a supervisor or another operator can log on and handle some of the queued calls to alleviate the backlog. Additionally, for all operator consoles AB108, automatic alarms can be set to trigger where a specified number of calls are exceeded on the queue.

Similarly, queue information is provided regarding VRUs AB134. If a VRU AB134 queue BA372 becomes too long, an alarm or other signal can be used to indicate to a supervisor that a backlog is occurring. The supervisor, or other operator, can take appropriate action. Appropriate action can include handling the calls manually or bringing additional VRUs AB134 on line.

Referring again to FIG. 1, it is important to note that in most conventional systems, matrix switch AA102 controls the queuing. Typically, these conventional systems only provide a queue status at periodic intervals. For example, matrix switch AA102 may only provide queue information once every 30 seconds. However, during this 30-second interval, a situation could arise where a number of calls are placed on hold and then the callers hang up before the next 30-second interval occurs. In this case, the operators and the long-distance carrier AA112 may never know that these calls were queued to the consoles.

Turning again to FIGS. 3, 11, and 14 in call processing system AB102, when a call is received and queued, operators are informed in real time via a console status display. Thus, the operators of call processing system AB102 are provided with immediate notice when calls are queued. The reason NCP AB104 can provide this feature is that NCP AB104 controls the queuing rather than matrix switch AA102 (or matrix switch AB106). Thus, an advantage of NCP AB104 is the potential for increased customer satisfaction by providing the operators the ability to respond to call backlogs, where other systems may not even have an indication that a backlog of calls is occurring.

In a step BA214, CMP BA102 creates and sends a CALL SETUP MESSAGE #2 BA314 to host gateway BA110. CALL SETUP MESSAGE #2 BA314 provides instructions to matrix switch AB106 (via host gateway BA110, where required) regarding completion of the call. CMP BA102 uses call data AA144 to determine what to instruct matrix switch AB106 regarding call routing. In the case of an operator-assisted call, CMP BA102 also uses CONSOLE ALLOCATE RESPONSE MESSAGE BA312 to determine to which console the call is to be routed.

For the case of a direct dial call, CMP BA102 builds CALL SETUP MESSAGE #2 BA314 to instruct matrix switch AB106 to route the call to the destination. CMP BA102 determines the destination by the called number. For an operator-assisted call, once a console is assigned, CMP BA102 builds CALL SETUP MESSAGE #2 BA314 to instruct matrix switch AB106 (via host gateway BA110, where required) to route the call to the correct operator console AB108. Thus, CMP BA102 uses call data AA144 to determine how the call should be routed, and then builds CALL SETUP MESSAGE #2 BA314 to command matrix switch to route the call as determined.

In the case where the communications protocols used by matrix switch AB106 and NCP AB104 are different, a host gateway BA110 is used to provide the necessary protocol conversions. In this case, host gateway BA110 constructs a SWITCH COMMAND MESSAGE BA316. In keeping with the current example, SWITCH COMMAND MESSAGE BA316 in one embodiment is an SS7 IAM, and call SETUP MESSAGE #2 BA314 is one or more LAN packets containing the SS7 instructions for switch. Thus, host gateway BA110 constructs and sends SWITCH COMMAND MESSAGE BA316 to matrix switch AB106. This occurs in a step BA216. SWITCH COMMAND MESSAGE BA316 commands matrix switch AB106 to connect the call audio AA142 portion of the call to the operator console AB108 assigned by CRD BA106 in steps BA210 and BA212.

Note that because this is an operator-assisted call, SWITCH COMMAND MESSAGE BA316 commands matrix switch AB106 to route call audio AA142 to the designated operator console AB108. For the case of a direct-dial call, CALL SETUP MESSAGE #2 BA314, and hence SWITCH COMMAND MESSAGE BA316, commands matrix switch AB106 to route the call to the called number.

SWITCH COMMAND MESSAGE BA316 includes information such as the originating number and the number called. Matrix switch AB106 looks at the called number and determines the trunk group to which that call is to be routed based on the called number.

It should be noted that in conventional long-distance switching systems, call data AA144 sent by originating user AA106 is the same as SWITCH COMMAND MESSAGE BA316 sent to matrix switch AB106. In the present invention, these are actually two different messages. In the conventional system call data AA144 directs matrix switch AA102 to route the call to the destination and indicates that an operator console is to receive the call first. In call processing system AB102, switch command message BA316 commands matrix switch AB106 to route the audio to an operator console just as if the operator console is another customer switch AA104. Also, because NCP AB104 receives call data AA144, NCP AB104 can use call data AA144 to make processing determinations regarding the call, determine how to handle the call, and provide value-added features on a per-call basis.

As soon as host gateway BA110 sends SWITCH COMMAND MESSAGE BA316, it also sends a CALL SETUP RESPONSE BA330 to customer gateway BA112 via CMP BA102. This occurs in a step BC102, as shown in FIG. 13. CALL SETUP RESPONSE BA330 is an acknowledgement of CALL SETUP MESSAGE #2 BA314.

In a step BC104, matrix switch AB106 sends an INITIAL ADDRESS MESSAGE BA318 (in one embodiment, an IAM) to host gateway BA110. This message is automatically generated by matrix switch AB106 and is provided for operator consoles AB108.

As noted above in call processing system AB102, operator consoles AB108 appear to matrix switch AB106 as if they are simply another customer switch AA104. This is why matrix switch AB106 generates an IAM message BA318 for transmittal back to operator consoles AB108. IAM message BA318 is the message that matrix switch AB106 would normally generate to send to the terminating switch when it is routing a call thereto.

In a step BC106, a CALL SETUP MESSAGE #3 BA320 is sent from host gateway BA110 to CMP BA102.

At the same time, in a step BC108, an ADDRESS COMPLETE MESSAGE BA322 is sent from host gateway BA110 to matrix switch AB106. Address complete message BA322 is analogous to an acknowledgement of INITIAL ADDRESS MESSAGE BA318.

In a step BC110, host gateway BA110 sends an ANSWER MESSAGE #1 BA324 to matrix switch AB106. ANSWER MESSAGE #1 BA324 indicates that the destination to which call audio AA142 is to be routed is available. In this case, because the destination is an operator console AB108, ANSWER MESSAGE #1 BA324 can be generated and sent to matrix switch AB106 automatically.

If an operator console AB108 is not immediately available to handle a call, the call is placed on hold in a queue BA372. In this situation, ANSWER MESSAGE #1 BA324 is still sent, indicating the call is held at a stub on matrix switch AB106.

In a step BC112, a CALL ACCEPTED MESSAGE BA326 and an ANSWER MESSAGE #2 BA328 are sent from matrix switch AB106 via host gateway BA110 and customer gateway BA112 to customer switch AA104. CALL ACCEPTED MESSAGE BA326 and ANSWER MESSAGE #2 BA328 inform customer switch AA104 that routing of the call has been completed.

After CMP BA102 receives CALL SETUP MESSAGE #3 BA320 from host gateway BA110 in step BC104, CMP BA102 sends a NEW CALL MESSAGE BA332 to operator console AB108. This occurs in a step BC114. NEW CALL MESSAGE BA332 informs the specific operator console AB108 chosen to handle the call that it has a new call to handle. NEW CALL MESSAGE BA332 also includes call handling information from a call ID database in DBS BA104. This information, which can be part of operator control data AB124, tells console operator AB108 how to handle the call.

The call audio AA142 of the call is already routed to console AB108 as a result of IAM message BA316 previously sent from host gateway BA110. NEW CALL MESSAGE BA332 from CMP BA102 to operator console AB108 can include information such as the identity of subscriber AA114, originating and terminating telephone numbers, the identification of customer AA110, and the customer client.

One feature of the present invention is that this call information can be used to customize the call process for a particular subscriber AA114 (customer AA110, client of customer AA110, or user AA106). For example, for a manual operator console AB132, information such as the name of the customer AA110 through which the call is originated can be displayed on the operator console screen so that the operator can answer the call using that name. Thus, it appears to user AA106 that the operator is an operator working for customer AA110 to which that user subscribes. Other useful information can be displayed on the screen for the human operator's use, such as the caller's originating telephone number, the geographic location of the caller, the called telephone number, and the geographic location of the called telephone number.

Similarly, for an automated VRU AB134, the call information informs the VRU AB134 which type of call is being placed and its origin, among other information. For example, for a calling card call originated by an originating user AA106A who is a client of a specific customer AA110, VRU AB134 knows the identification of the specific customer AA110, and can play (or synthesize) the voice script corresponding to that customer AA110. Thus, VRUs AB134 and manual operator consoles AB132 can be time-shared among numerous customers AA110 and users AA106 while providing the appearance to user AA106 that these operator consoles AB108 are dedicated services of the customer AA110 to which that user AA106 subscribes. Thus, operator consoles AB108, both manual and automatic, can respond uniquely to different users AA106, based on who and where the user is and which customer AA110, if any, is being used.

The above example illustrates how call processing system AB102 routes operator-assisted calls to an operator console AB108. For calls requiring other types of service, the operation is somewhat different. For example, for requiring a number translation, CMP BA102 accesses a number translation database FA214B (see FIG. 69) in DBS BA104 to get the number to be called. In this situation, CMP BA102 then sends a message via host gateway BA110 indicating to matrix switch AB106 the actual destination number so that the call can be completed. Matrix switch AB106 routes call audio AA142 to the terminating number, and customer gateway BA112 routes call data AA144 to the terminating switch. These call routing determinations may be made at any time during call processing, or even several times during call processing. For example, once call processing system AB102 has routed calls to an operator console AB108 and/or VRU AB134, where a called number has been collected, number translation may be performed upon that number, causing the call to be routed to a destination number, or back to operator console AB108 or VRU AB134.

2.0.3 Call Completion for a Calling Card, Credit Card, or Debit Card Call

Figure 15:
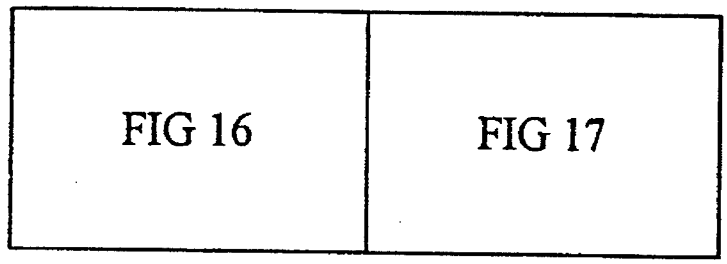
FIG. 15, which comprises
Figure 16:
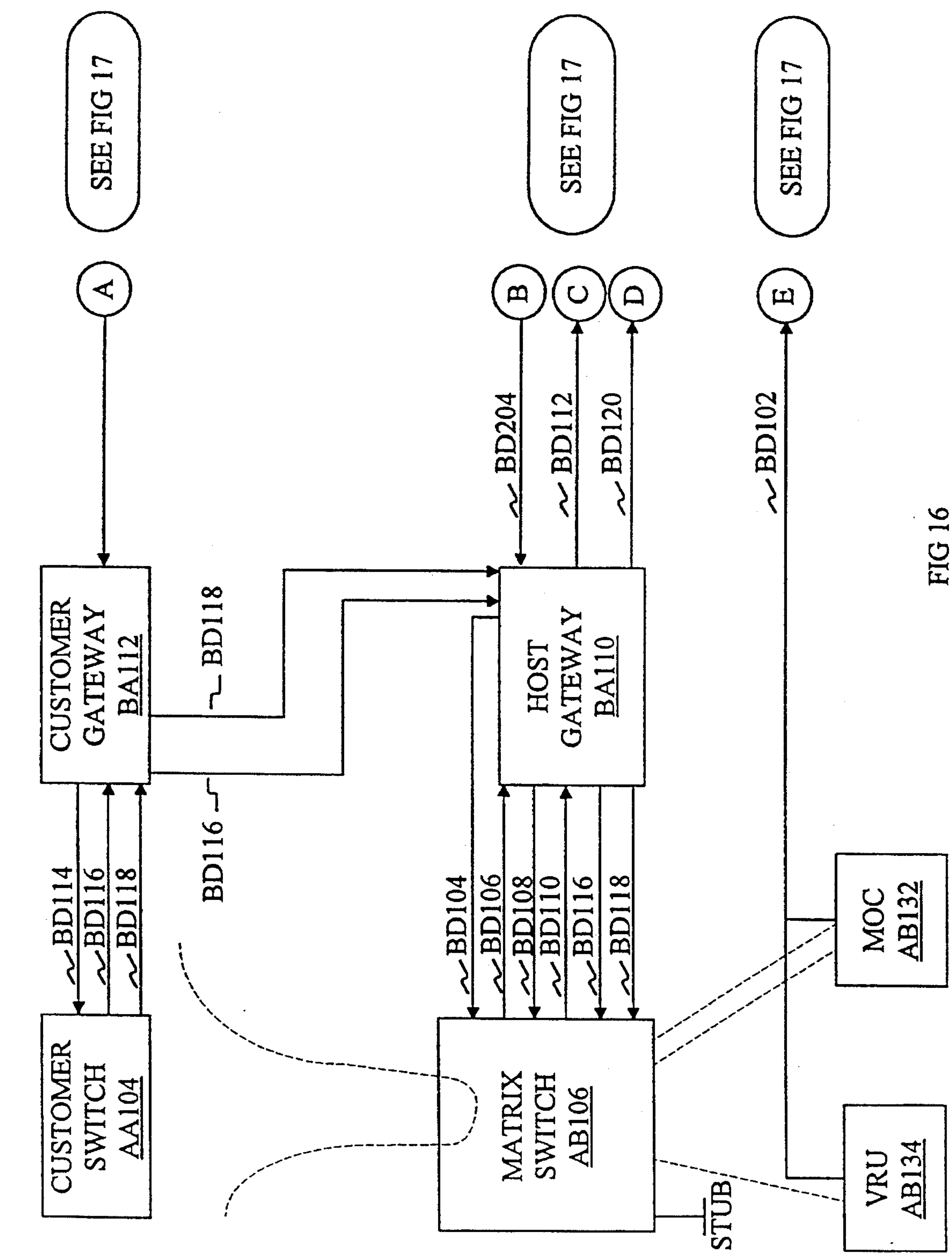
FIGS. 16 and 17, is a data flow diagram illustrating the data flows that occur within and external to the network control processor when a calling card, credit card, or debit card call is completed according to one embodiment.
Figure 17:
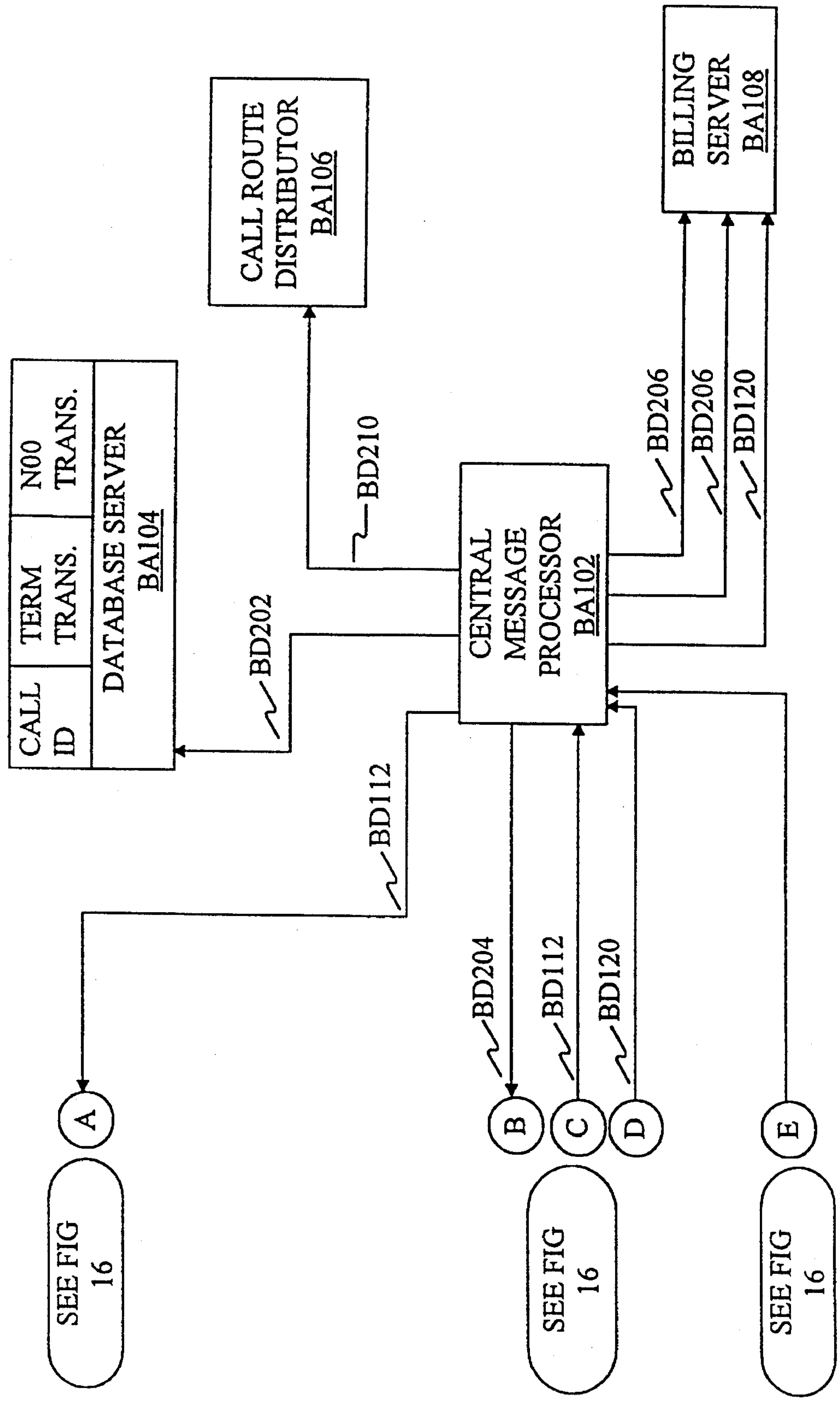
Figure 18:
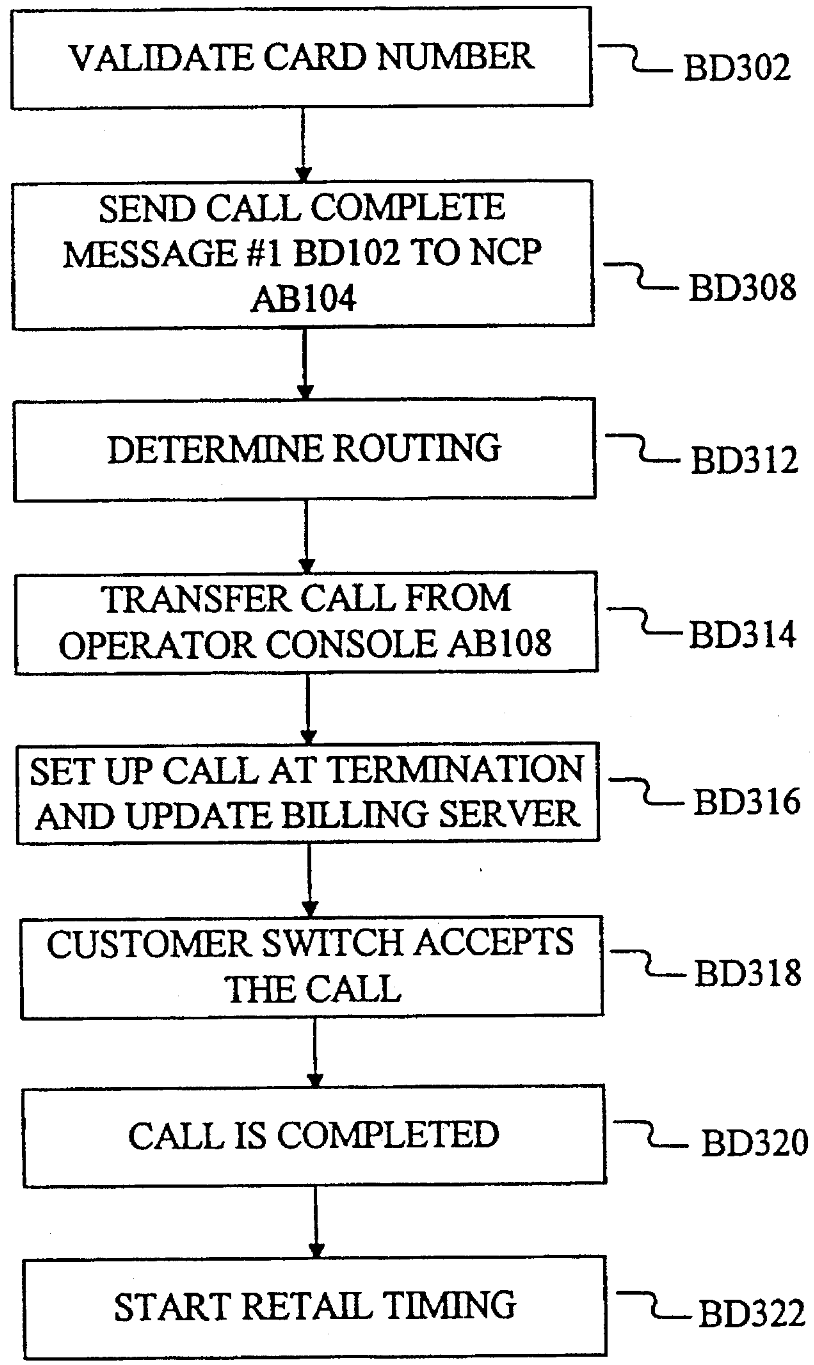
FIG. 18 is an operational flow diagram illustrating the operation of completing a calling card, debit card, or credit card call according to one embodiment.

The discussion above with reference to FIGS. 14 and 11 describes how an operator-assisted call is routed to an operator console AB108 to provide operator assistance (in other words, how the call is set up). The manner in which call processing system AB102 completes the call when it is placed using a credit card, debit card, or calling card is now described. FIG. 15, which comprises FIGS. 16 and 17, is a data flow diagram illustrating the data flows that occur within NCP AB104 and external to NCP AB104 when a calling card, credit card, or debit card call is completed according to one embodiment. FIG. 18, is an operational flow diagram illustrating the operation of completing a calling card, debit card, or credit card call according to one embodiment.

Referring now to FIGS. 16, 17, and 18, in a step BD302, operator console AB108 that is handling the call validates the card number to ensure that the card used is valid. In one embodiment, this is accomplished using validation system AG102 as described in the Validation System Section of this document. If the card number is validated, operator console AB108 may then rate the call. Call rating can be done in conjunction with debit cards to determine when to terminate the call based on the amount of dollars remaining in the debit card account. Rating of the call is accomplished as described in the billing system section of this document.

Once the call is validated and operator console AB108 determines that it can be completed, operator console AB108 sends a CALL COMPLETE MESSAGE #1 BD102 to NCP AB104. CALL COMPLETE MESSAGE #1 BD102, which can be part of operator response data AB126 is used on operator console AB108 to indicate that NCP AB104 can complete the call to the called number. This occurs in a step BD308.

In a step BD312, NCP AB104 determines the optimum routing for the call. In one embodiment, this is accomplished by sending a TERMINATION Look-up REQUEST BD202 to DBS BA104. In response, DBS BA104 looks up the optimum route for the call and provides this information to CMP BA102.

In a step BD314, NCP AB104 releases the call from operator console AB108. In one embodiment, this is accomplished by sending a message to matrix switch AB106. CMP BA102 sends a COMPLETE CALL MESSAGE BD204 to host gateway BA110. Host gateway BA110 converts COMPLETE CALL MESSAGE BD204 into a FAR MESSAGE BD104. FAR MESSAGE BD104 has the effect of transferring the call audio from the operator console AB108 that was handling the call, so it may be routed to the terminating destination. Continuing in this embodiment, matrix switch AB106 sends a RELEASE CONSOLE MESSAGE BD106 to the CMP via the gateway. This message is received by CMP BA102 which then sends a RELEASE CONSOLE MESSAGE BD210 to CRD BA106. CRD BA106 then releases the operator console AB108 and sends a CONSOLE RELEASE RESPONSE BD108 to matrix switch AB106 indicating that the operator console AB108 is released.

When the call is transferred from operator console AB108 in step BD314, CMP BA102 sends an UPDATE CIC MESSAGE BD206 to BSRVR BA108. UPDATE CIC MESSAGE BD206 updates a CIC (circuit identification code) status in BSRVR BA108 that is associated with the call by the callhandle BA305. The CIC status indicates the status of the audio circuit used in the call. In this step, the CIC status is updated to show a call in process.

In a step BD316, matrix switch AB106 sets up the call at the terminating number. One embodiment of step BD316 is now described. In this embodiment, matrix switch AB106 first sends an IAM BD110 to NCP AB104. If required, host gateway BA110 converts IAM BD110 to a CALL SETUP MESSAGE BD112. In response to CALL SETUP MESSAGE BD112, CMP BA102 sends a second UPDATE CIC MESSAGE BD206 to BSRVR BA108. This adds a CIC status to the callhandle BA305 for the terminating audio circuit. CALL SETUP MESSAGE BD112 is passed on to customer switch AA104 at the terminating end. Where required, customer gateway BA112 converts CALL SETUP MESSAGE BD112 to an IAM BD114. This informs customer switch AA104 that a call is being routed.

In a step BD318, customer switch AA104 at the terminating end accepts the call. This is accomplished by customer switch AA104 sending an ADDRESS COMPLETE MESSAGE BD116. ADDRESS COMPLETE MESSAGE BD116 verifies that the circuit is set up and starts ringing the call. ADDRESS COMPLETE MESSAGE BD116 is forwarded to matrix switch AB106 by NCP AB104. Again, where required, customer gateway BA112 and host gateway BA110 perform the necessary conversions to accept the message and pass it on to matrix switch AB106.

In a step BD320, when the terminating (called) party answers, an ANSWER MESSAGE BD118 is sent to NCP AB104 from customer switch AA104 at the terminating end. This message is forwarded by NCP AB104 to matrix switch AB106. ANSWER MESSAGE BD118 indicates that the called party has answered the call and the parties are connected in the call. In one embodiment, the ANSWER MESSAGE BA118 is sent from customer switch AA104 to matrix switch AB106 by way of customer gateway BA112 and host gateway BA110. In this embodiment, host gateway BA110 provides a START TIMING MESSAGE BD120 to CMP BA102. CMP BA102 in turns sends START TIMING MESSAGE BD120 to BSRVR BA108 to start timing the call for retail billing. This occurs in a step BD322.

2.0.4 Call Completion for a Collect Call

Figure 19:
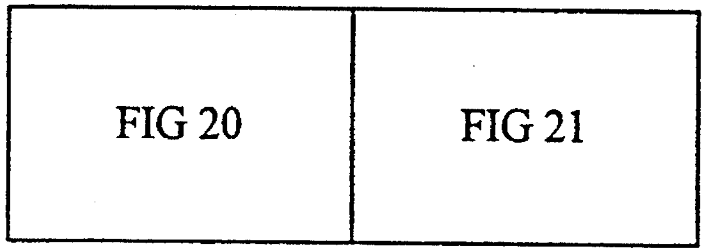
FIG. 19, which comprises
Figure 20:
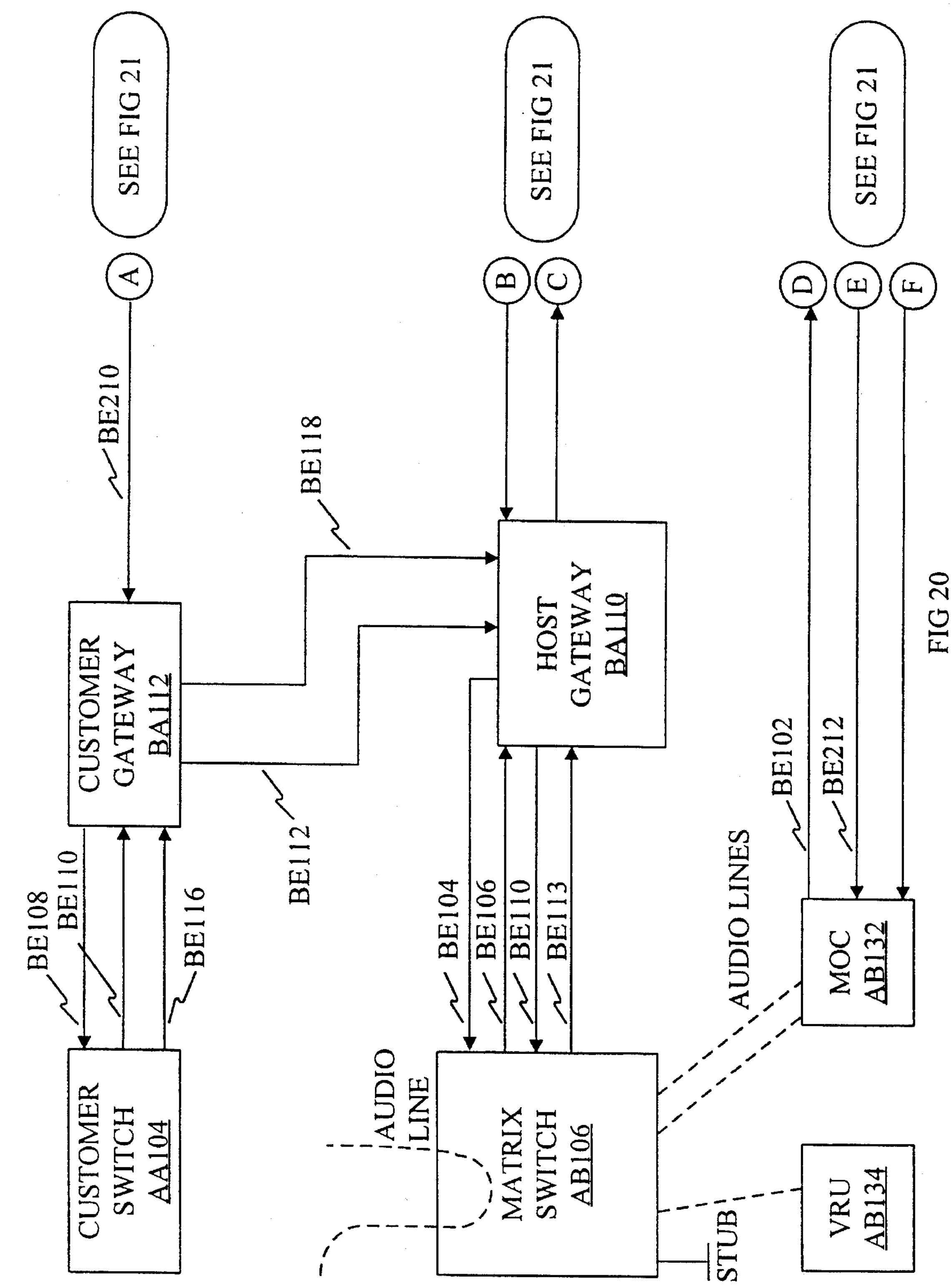
FIGS. 20 and 21, is a dataflow diagram illustrating the dataflows that occur within and external to the network control processor when a collect call is completed.
Figure 21:
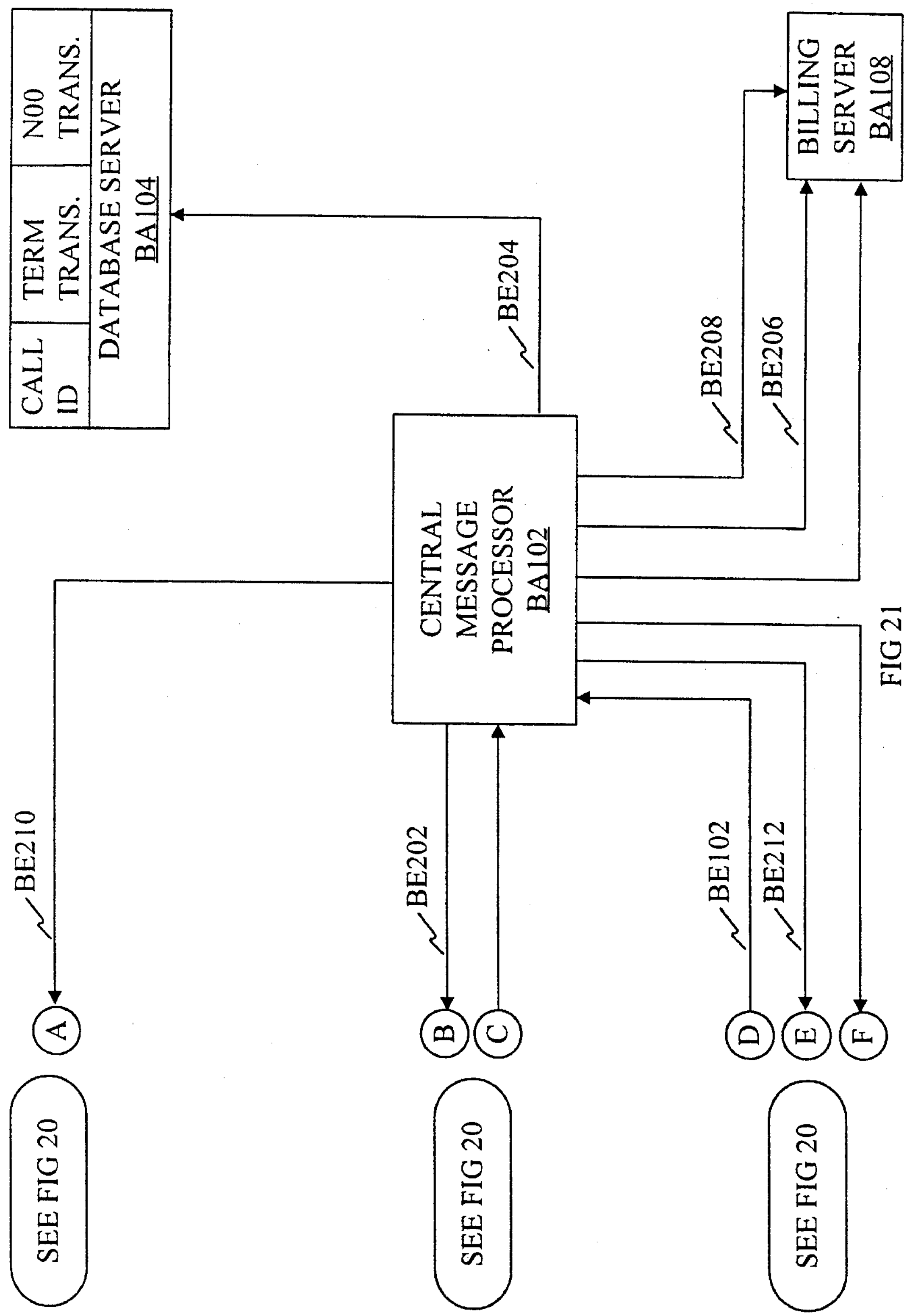
Figure 22:
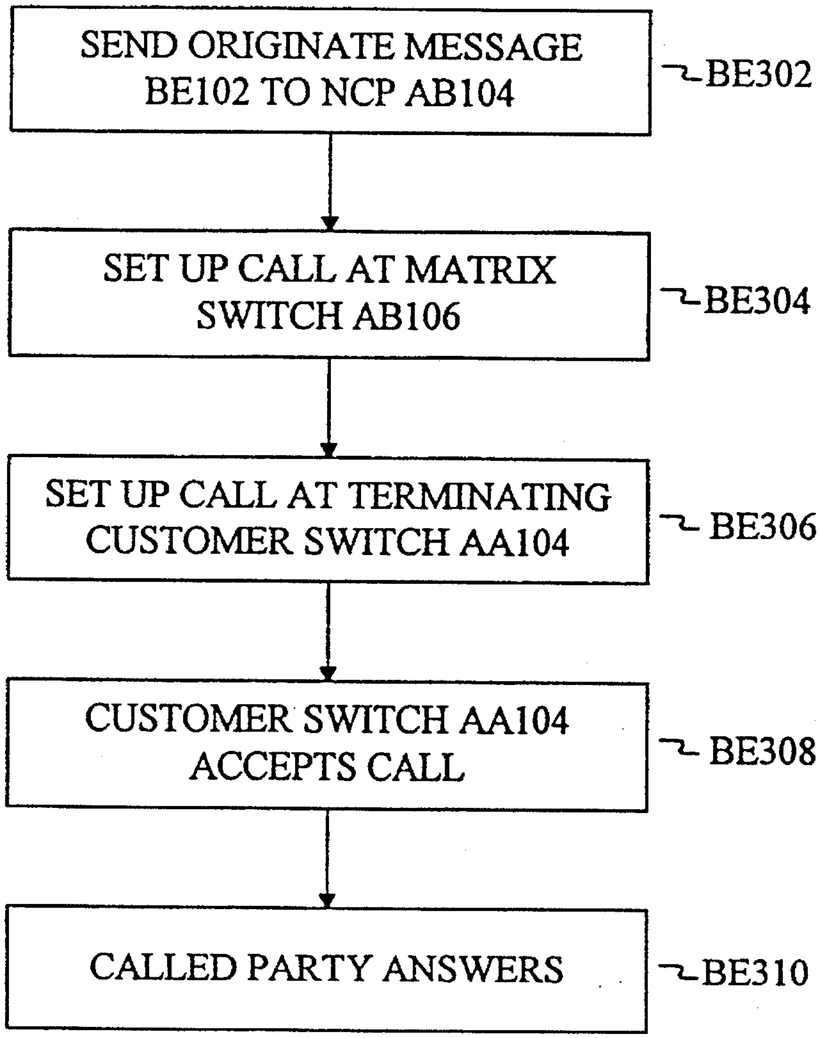
FIG. 22 is an operational flow diagram illustrating the operation of completing a collect call according to one embodiment of the invention.

The manner in which call processing system AB102 completes a collect call is now described. FIG. 19, which comprises FIGS. 20 and 21, is a dataflow diagram illustrating the data flows that occur within NCP AB104 and external to NCP AB104 when a collect call is completed. FIG. 22 is an operational flow diagram illustrating the operation of completing a collect call. In completing a collect call, the operator determines the identification of the calling party and that the calling party wishes to place a collect call. The operator then calls the called party to verify that they will accept the charges. In most cases, this is accomplished using a human operator at a manual operator console AB132. Alternatively, the process could be automated so that an automated VRU AB134 is used to verify that the charges will be accepted. This may require that originating user AA106A enter requested information via the telephone keypad and the automated console uses synthesized scripts to obtain approval from the called party (also via keypad entry). For the purposes of brevity, the completion scenario is discussed with reference to a human operator at a manual operator console AB132.

Referring now to FIGS. 20, 21, and 22, the operator at manual operator console AB132 must first verify that the called party will accept the charges. Therefore, operator console AB132 must place a call to the terminating party to obtain this information. To do this, the operator at manual operator console AB132 sends an ORIGINATE MESSAGE BE102 to NCP AB104. This occurs in a step BE302. The purpose of ORIGINATE MESSAGE B302 is to place the calling party on hold while the operator contacts the called party. This is different from the scenario discussed above with reference to FIGS. 16, 17, and 18. In that scenario, COMPLETE MESSAGE BD102 had the effect of completing the call while terminating the involvement of operator console AB108.

In a step BD304, NCP AB104 sets up the call at matrix switch AB106 to route operator console AB108 audio to the customer switch AA104 (where used) at the terminating end. In one embodiment, this is accomplished by sending a CALL SETUP MESSAGE BE202 to matrix switch AB106 (IAM BE104 in one embodiment) to instruct matrix switch AB106 to route the call. Matrix switch AB106 responds with a message (IAM BE106 in one embodiment telling NCP AB104 that the call is set up. An UPDATE CIC MESSAGE BE206 is sent to BSRVR BA108 to update the CIC to indicate that another audio circuit is in use for that call.

In a step BE306, the call is set up at customer switch AA104 at the terminating end. In one embodiment, this is accomplished by sending an IAM BE108 to customer switch AA104. Again, IAM BE108 can be a CALL SETUP MESSAGE BE210 sent via customer gateway BA112.

Customer switch AA104 accepts the call. This is accomplished in one embodiment by sending an ADDRESS COMPLETE MESSAGE BE110 to NCP AB104. ADDRESS COMPLETE MESSAGE BE110 indicates that the call is accepted and starts ringing. ADDRESS COMPLETE MESSAGE BE110 is forwarded to matrix switch AB106 via NCP AB104 with any protocol conversions necessary. This is done by sending a CALL ACCEPT MESSAGE BE112 from customer gateway BA112 to host gateway BA110. Matrix switch AB106 responds with an ACM MESSAGE BE113. This occurs in a step BE308.

In a step BE310, and CMP BA102 creates an ORIGINATE STAT MESSAGE BE212 which provides an indication to manual operator console AB132 that the called party's line is ringing.

In a step BE310, when the called party answers the call, a CALL ANSWER MESSAGE is sent to NCP AB104 and forwarded to matrix switch AB106. Matrix switch AB106 in turn generates an answer message and forwards it to NCP AB104. NCP AB104 provides this answer message to manual operator console AB132 indicating that the called party has answered and the operator can request the required information. At the same time, NCP AB104 starts wholesale outbound timing of the call for rating purposes. In one embodiment, step BD310 is accomplished by customer switch AA104 sending an answer message BE116 to NCP AB104. Customer gateway BA112 sends a call answer message BE118 to host gateway BA110 which in turn sends an answer message (identical to answer message BE116) to matrix switch AB106.

Once the operator has verified the called party will accept the charges, the operator then completes the call. The CMP BA102 sends a start timing message to BSRVR BA108 to start retail timing.

2.0.5 Specific Language Operator Handling

Figure 23:
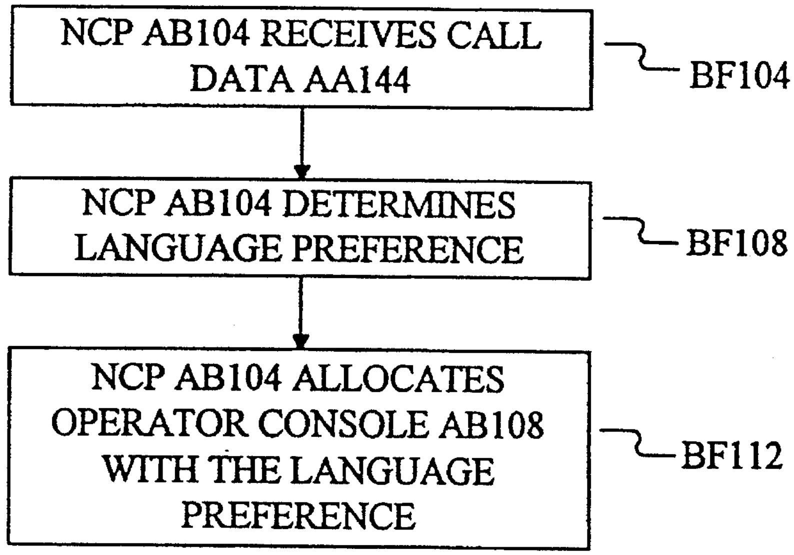
FIG. 23 is a high-level operational flow diagram illustrating the manner by which call processing system provides language-specific operator services according to one embodiment of the invention.

As introduced above, operator consoles AB108 can be assigned to a call to provide foreign language operator services where required or desired. This feature is now described. FIG. 23 is a high-level operational flow diagram illustrating the manner by which call processing system AB102 provides language-specific operator services. Referring now to FIG. 23, in a step BF104, NCP AB104 receives a call from an originating user AA106A. More specifically, NCP AB104 receives call data AA144 for the call.

In a step BF108, NCP AB104 determines the language preference (or requirement) of originating user AA106A. In one embodiment, this is accomplished by using call data AA144 to retrieve a data record containing a language field BA356 that indicates the language preference.

In a step BF112, NCP AB104 allocates an operator console AB108 that can provide the language indicated by language field BA356. In one embodiment using an automated VRU AB134, the script played or synthesized by the automated VRU AB134 designated to handle the call is in the specified language.

In one embodiment using a manual operator console AB132, a script that appears on the screen of the manual operator console AB132 for the human operator to read appears in the designated language. Alternatively, an indication on the operator's screen tells the human operator that the script should be read in a specific language.

To ensure that the human operator is fluent in the requested language, the operator provides this information when logging in to the CRD BA106. Thus the language becomes a part of the operator profile. When CMP BA102 retrieves call parameters BA308 and determines that the call requires a specific language, the call is routed to the operator console AB132 whose profile indicates that it can provide the language.

An Alternative, less desirable method is to allocate certain consoles out of a group of manual operator consoles AB132 for certain languages. A collection of one or more manual operator consoles AB132 can be defined in an allocation table as having the capability to handle a specific language. Thus if a call is placed requiring a Spanish-speaking human operator, when CRD BA106 allocates the manual operator console AB134, it will only allocate one of the collection of consoles that is designated to have a Spanish-speaking operator. In one embodiment, the language allocation tables are maintained by CRD BA106. CMP BA102 specifies the language preference for the call based on call parameters BA308 and CRD BA106 uses this information in allocating the call to the appropriate console.

2.1 Network Control Processor Call Route Distributor (CRD)

2.1.1 CRD Introduction and CRD Redundancy

As discussed, NCP AB104 includes a call route distributor (CRD) BA106. The primary function of CRD BA106 is to allocate an operator console AB108 to each incoming call. CRD BA106 queues the incoming call to a console queue BA372 when all operator consoles AB108 are utilized. The allocation of a particular operator console AB108 to an incoming call is based on the device type listed in device array list BA354, language field BA356, and other information contained in call parameters BA308.

CRD BA106 keeps track of the amount of time each call is in console queue BA372 and provides information to a console status display AG110 indicating that calls are queued. For manual operator consoles AB132 this information may be displayed on a console status display screen.

So that CRD BA106 can keep track of the number of operator consoles AB108 available to handle calls, each operator console AB108 is required to log on to CRD BA106. The logon procedure is now described.

Figure 24:
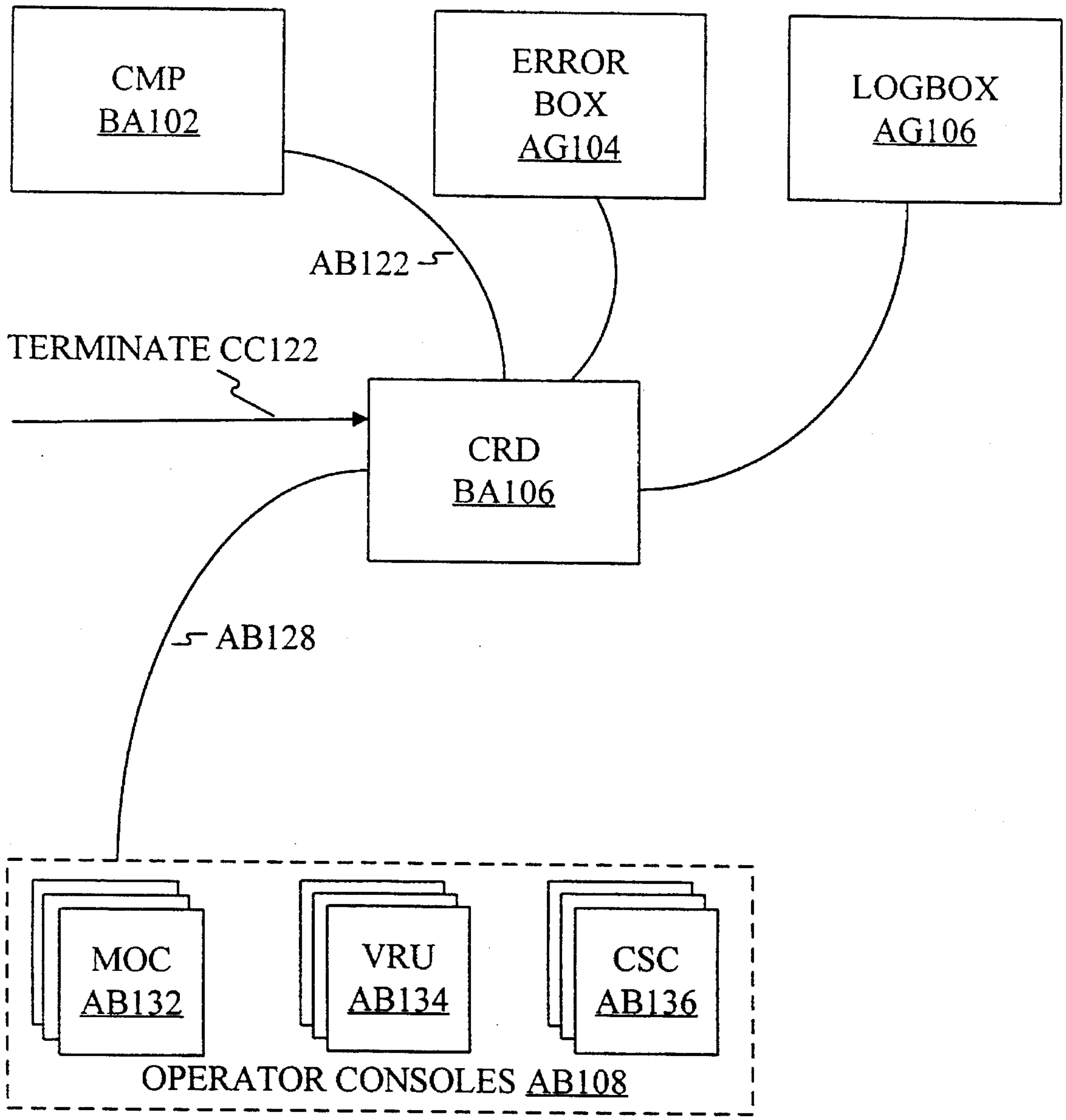
FIG. 24 is a block diagram illustrating a call route distributor and its interfaces according to one embodiment of the invention.

FIG. 24 is a block diagram illustrating CRD BA106 and its interfaces. Referring to FIG. 24, as discussed with referenced to NCP AB104, CRD BA106 interfaces via LAN BA122 to CMP BA102. CRD BA106 also interfaces via LAN AB128 to operator consoles AB108. CRD BA106 also interfaces to error box AG104 and log box AG106.

Log box AG106 is communicated with at the start-up and shutdown of the CRD BA106. When CRD BA106 is started, it sends a message to log box AG106 indicating that it is logged onto LAN BA122 and operational. Log box AG106 keeps track of all current processes and components logged onto LAN AB128, and their current states. Login messages include the time at which the application was started, the name of the application, the version number, the address of the application on LAN AB128, and its service name. Logout messages include the time at which the application terminated, the name of the application, and the version number.

Unexpected results and errors are reported to error box AG104.

Figure 25:
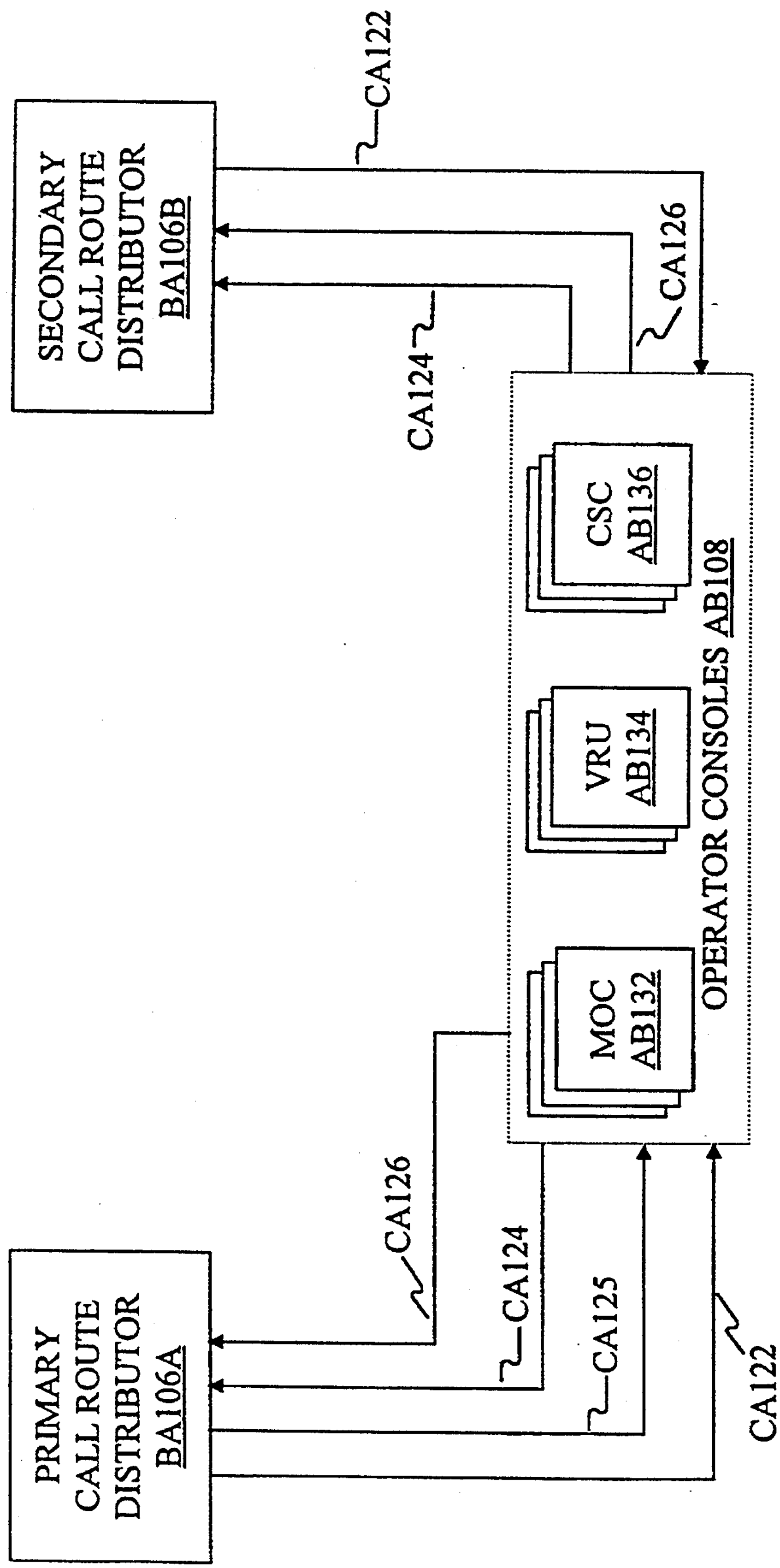
FIG. 25 is a high-level block diagram illustrating primary and secondary call route distributors and their interface to operator consoles according to one embodiment of the invention.

FIG. 25 is a block diagram illustrating redundant CRDs BA106, and their interface to operator consoles AB108. FIG. 25 illustrates the interface in terms of data flows. It should be noted that in a preferred embodiment, CRDs BA106 interface to operator console AB108 via LAN BA122 as illustrated in FIG. 10.

Figure 26:
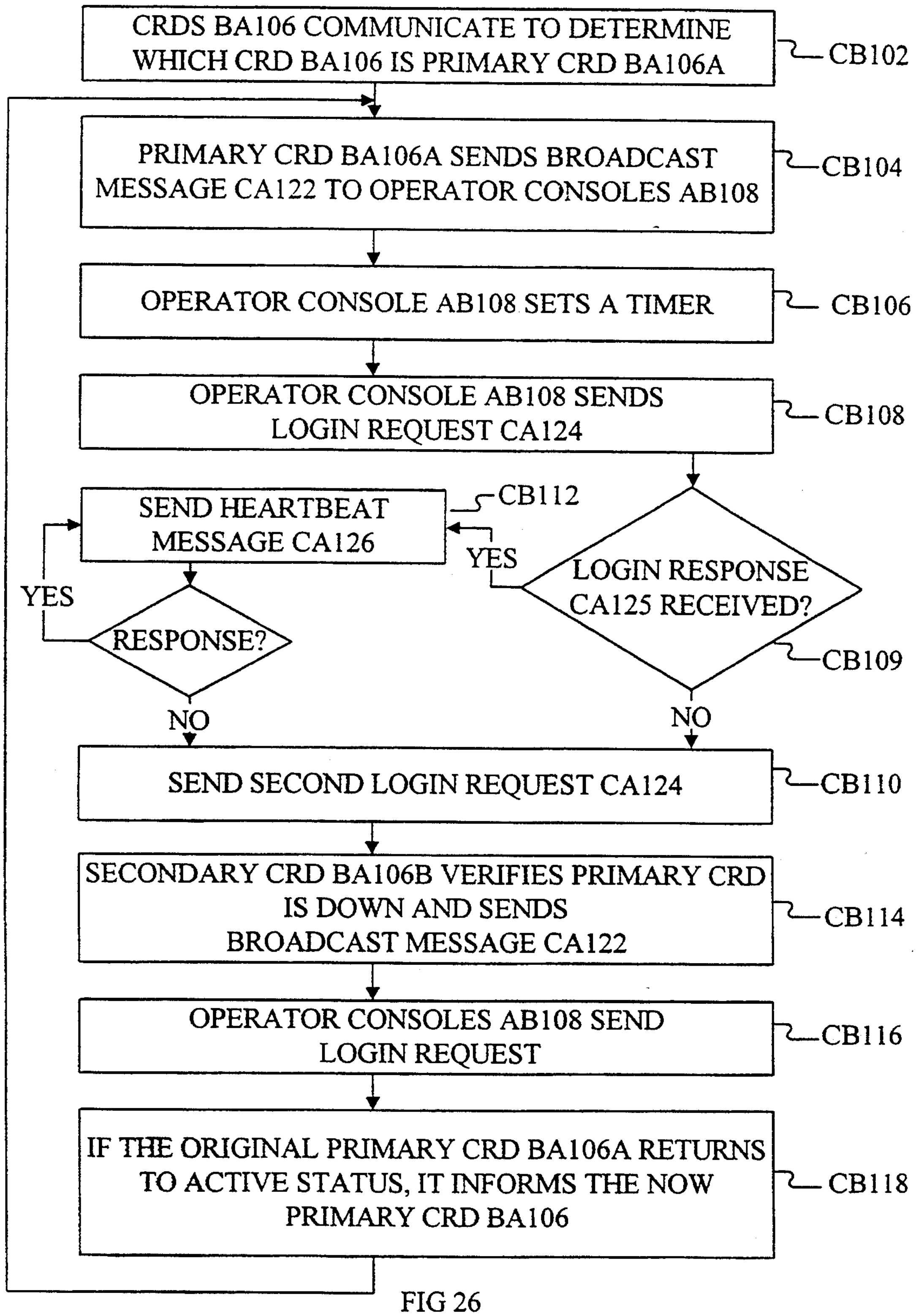
FIG. 26 is an operational flow diagram illustrating the process by which call route distributors determine which call route distributor is primary, and the process by which operator consoles log on to the primary call route distributor according to one embodiment of the invention.

FIG. 26 is an operational flow diagram illustrating the steps followed by CRDs BA106 and operator consoles AB108 when the CRDs are initialized.

Referring now to FIGS. 25 and 26, in a step CB102, upon initialization, both CRDs BA106 communicate with each other to determine which CRD BA106 is to be considered a primary CRD BA106A and which CRD BA106 is to be a secondary CRD BA106B. This determination is made based on information contained in a CLIF configuration file (illustrated in FIG. 137). If there is only one CRD BA106 available in a particular installation of call processing system AB102, that CRD BA106 will always be primary CRD BA106A.

In a step CB104, primary CRD BA106A sends a BROADCAST MESSAGE CA122 to operator consoles AB108. BROADCAST MESSAGE CA122 contains information for operator consoles AB108 indicating which CRD BA106 is primary CRD BA106A. BROADCAST MESSAGE CA122 also indicates to operator consoles AB108 that they should log on to primary CRD BA106A.

When a console AB108 receives a BROADCAST MESSAGE CA122, it sets a timer. This occurs in a step CB106. In one embodiment, the amount of time set on the tinier for each console AB108 is based on its address on LAN BA122. The amount of time in the timer indicates to each operator console AB108 how long to wait before responding with LOGON REQUEST CA124. This timer function is used so that CRD BA106 is not overburdened with numerous simultaneous LOGON REQUESTS CA124 from operator consoles AB108.

In a step CB108, each console AB108 responds with a LOGON REQUEST CA124 at a time determined by the timer set in step CD106. Only consoles AB108 available to handle calls will respond with LOGON REQUEST CA124. If a console AB108 is non-operational for any reason, it will not respond with a LOGON REQUEST CA124. Similarly, for a manual operator console AB132, a human operator must perform, or at least authorize, the initial login. If a manual operator console AB132 is logged in to a primary CRD BA106A and it goes down, the manual operator console AB132 can log on to the secondary CRD BA106B (now primary) without human operator action. Thus, if a manual operator console AB132 is not staffed by a human operator, that manual operator console AB132 cannot send the LOGON REQUEST CA124 to primary CRD BA106A.

After sending LOGON REQUEST CA124, operator console AB108 expects a LOGON RESPONSE CA125 from primary CRD BA106A as shown in a step CB109.

If operator console AB108 does not receive LOGON RESPONSE CA125 after a designated timeout period, it attempts to log on to secondary CRD BA106B by sending a LOGON REQUEST CA124 to secondary CRD BA106B. This occurs in a step CB110.

Operator consoles AB108 provide a MONITOR SIGNAL CA126 to the primary CRD BA106A onto which they are logged. This occurs in a step CB112. MONITOR SIGNAL CA126 is used by logged-on operator consoles AB108 to determine whether the CRD AB106A that they have logged on to is still active. If operator consoles AB108 do not get a response to MONITOR SIGNAL CA126 from the CRD BA106, this indicates that CRD BA106 is no longer active.

If operator consoles AB108 are logged on to primary CRD BA106A, and no response is provided to MONITOR SIGNAL CA126, those consoles send a second LOGON REQUEST CA124 to secondary CRD BA106B in a step CB110. In this step CB110, operator console AB108 is requesting to log on to secondary CRD BA106B.

When secondary CRD BA106B receives a LOGON REQUEST CA124 from an operator console AB108, it verifies that primary CRD BA106A is not available by sending a message to primary CRD BA106A. If primary CRD BA106A is unavailable, secondary CRD BA106B sends broadcast message CA122 to consoles AB108 identifying itself as the new primary CRD BA106A. This occurs in a step CB114.

All operator consoles AB108 logged on to original secondary CRD BA106B (now primary CRD BA106A) send a MONITOR SIGNAL CA126 to the new primary CRD BA106A to insure that it is still active. This occurs in a step CB116.

Consoles AB108 again set and utilize the timers for sending LOGON REQUEST CA124 to the new primary CRD BA106A.

If the original primary CRD BA106A returns to active status, it tells secondary CRD BA106B (now primary CRD BA106) that primary CRD BA106A is active and now to be considered primary. This occurs in a step CB118.

The operation resumes at step CB104. Here, primary CRD BA106A sends BROADCAST MESSAGE CA122 to operator consoles AB108. BROADCAST MESSAGE CA122 informs operator consoles AB108 that primary CRD BA106A is now active and primary. BROADCAST MESSAGE CA122 commands operator consoles AB108 to now log on to primary CRD BA106A.

Operator consoles respond by setting their timers and sending a LOGON REQUEST CA124 to primary CRD BA106A as occurred above in steps CB106 and CB108.

The process continues at step CB110 wherein the consoles AB108 send MONITOR SIGNAL CA126 to primary CRD BA106A if LOGIN RESPONSE CA125 is received. This automatic reconfiguration feature is beneficial in that it builds a degree of fault-tolerance into the system.

It should be noted that if there is only one CRD BA106, then the processes of logging on to secondary CRD BA106B when primary CRD BA106A fails do not apply. In this case, if primary CRD BA106A fails, there is no backup and NCP AB104 fails the call setup process and releases the call.

2.2 Central Message Processor (CMP)

2.2.1 CMP Introduction and High-Level Description

The central message processor (CMP) BA102 determines how a call is to be processed based on the call data AA144 received for the call. Based on this determination, CMP BA102 sends messages to other components to achieve the necessary call handling functionality. For example, when a call requiring operator assistance is received, CMP BA102 determines that operator assistance is required. In this case, CMP BA102 sends messages to DBS BA104 and CRD BA106 to determine what the call parameters BA308 are and to have an operator console AB108 allocated to the call. CMP BA102 then sends a command to matrix switch AB106 (via host gateway BA110, if needed) to instruct it to complete the call to the destination (See, FIG. 12). Thus, CMP BA102 provides the essential call handling functionality of call processing system AB102.

To coordinate the activities of the other components of call processing system AB102, CMP BA102 performs message handling and message routing in conjunction with processing a call. CMP BA102 generates, handles and routes messages within NCP AB104. CMP BA102 also generates, handles, and routes messages between NCP BA104 and operator consoles AB108, and other components such as log box AG106, and error box AG104.

In one embodiment, CMP BA102 processes could be coded to make call processing determinations based solely on the call data AA144 received for the call. However, in such a situation, a change to the manner in which a call is to be processed requires software modification and re-compilation. Thus, in a preferred embodiment, CMP BA102 uses call data AA144 as a key to retrieve one or more data records containing call parameters BA308.

Call parameters BA308 provide the information indicating how the call is to be processed. Because the information about the call found in call data AA144 is used to retrieve call parameters BA308, call processing can be defined uniquely for each call. A record containing a unique set of call parameters BA308 could be provided for each different combination of call data AA144. For example, different combinations of ANI, carrier-customer identification, called number, geographic area, et cetera, could each result in different call parameters BA308 being retrieved. Therefore, call parameters BA308, and the type of processing provided, can be defined on a per carrier-customer AA110, or per-user AA106 basis.

Figure 27:
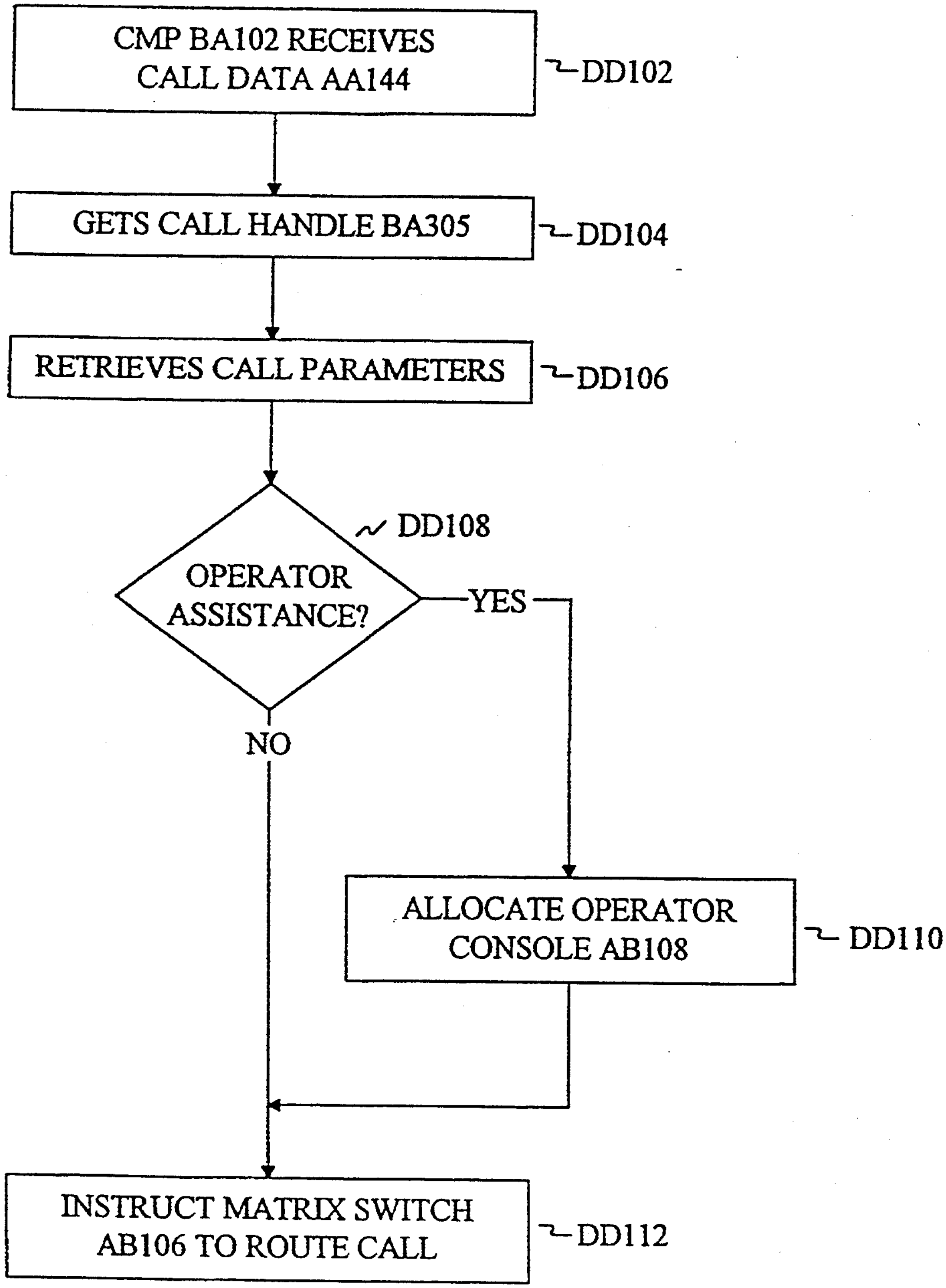
FIG. 27 is a high-level operational flow diagram illustrating what occurs when a call is received from a subscriber by the call processing system according to one embodiment of the invention.

The functionality of CMP BA102 is now described with reference to a high-level operational flow diagram. FIG. 27 is a high-level operational flow diagram illustrating what occurs when a call is received from a subscriber AA114 by call processing system AB102.

Referring now to FIGS. 10 and 27, in the step DD102, CMP BA102 receives call data AA144. In one embodiment, CMP BA102 has a callhandle BA305 assigned to identify the call. In one embodiment, CMP BA102 accomplishes this as discussed above with reference to step BA206 in FIG. 12. This occurs in step DD104. Callhandle BA305 is used to identify the call in call processing system AB102.

In a step DD106, CMP BA102 retrieves call parameters BA308 to determine what type of treatment is to be given to the call. In one embodiment, CMP BA102 uses the information in call data AA144 to perform a call ID and look up call parameters BA308 in a database. As discussed above, call parameters BA308 can be used to indicate how the call is to be processed. Call parameters can indicate, among other things, whether operator assistance is required, whether the call is to be processed, the preferred type of operator console AB108 to handle the call.

If the call does not require operator assistance (illustrated by box DD108), CMP BA102 commands matrix switch AB106 to route the call to its destination. This occurs in a step DD112. If necessary, communications with matrix switch AB106 can be made through host gateway BA110 as discussed above with reference to FIG. 10.

If CMP BA102 determines that operator assistance is required based on call parameters BA308, CMP BA102 allocates an operator console AB108 to handle the call. This occurs in a step DD110. In one embodiment, CRD BA106 is used to allocate operator AB108. This embodiment is discussed above with reference to FIGS. 10 and 12.

Once the operator console AB108 is allocated to handle the call requiring operator assistance, CMP BA102 commands matrix switch AB106 to mute the call to that operator console. This occurs in step DD112.

2.2.2 CMP Detailed Description

Figure 28:
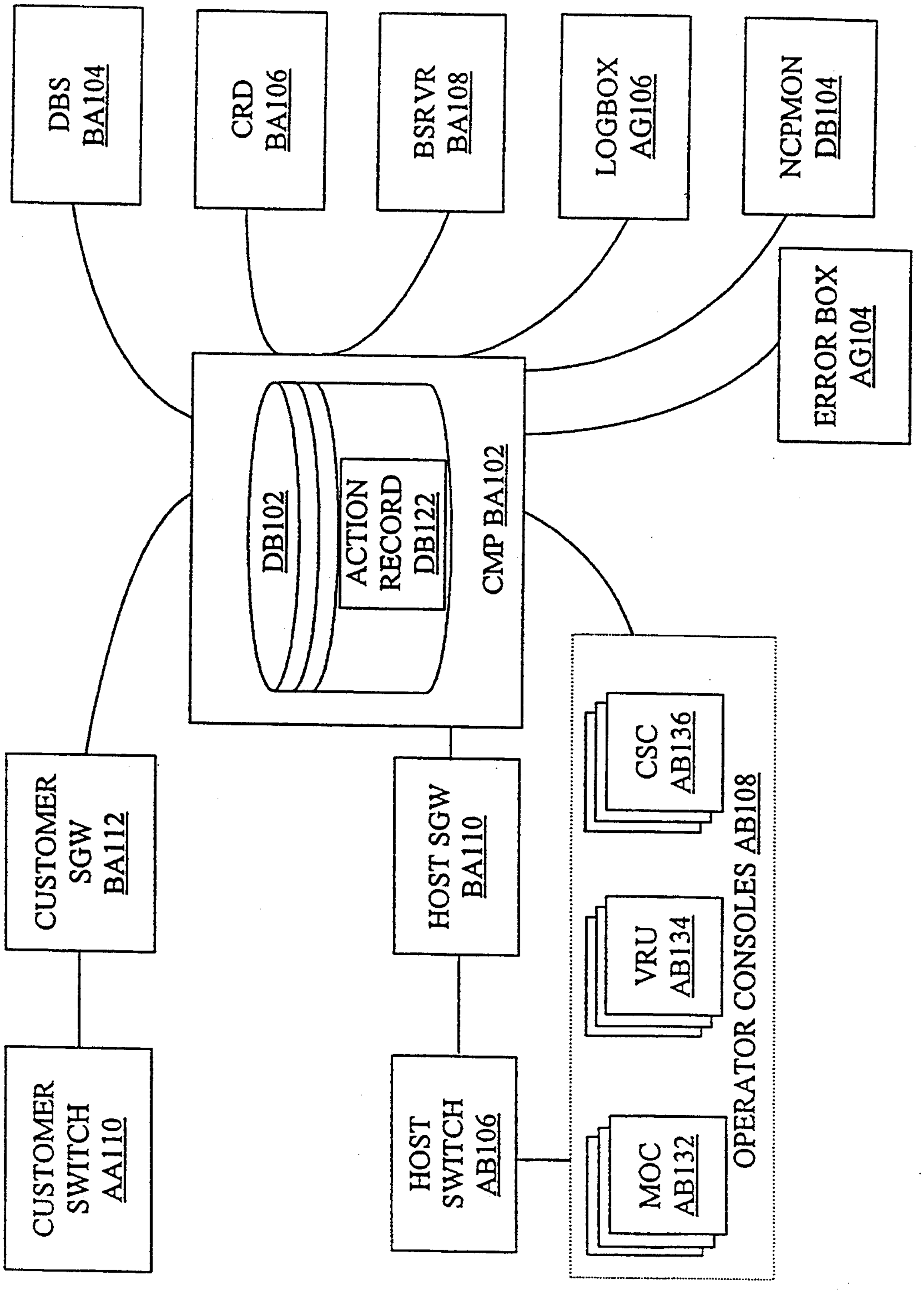
FIG. 28 is a block diagram illustrating an example architecture of a central message processor of the NCP and its interfaces to external processes according to one embodiment of the invention.

FIG. 28 is a block diagram illustrating CMP BA102 and its interfaces. Referring to DB1, as discussed with reference to NCP AB104, CMP BA102 interfaces via LAN BA122 to the components within NCP AB104. CMP BA102 also interfaces to an NCP monitor DB104, an error box AG104, a log box AG106, and operator consoles AB108.

In one embodiment CMP BA102 uses a message manager library DB102. Message manager library DB102 is a list of action records used to provide instructions regarding how CMP BA102 processes calls. Message manager library DB102 is fully described below with reference to FIGS. 34, 35, and 36.

Figure 29:
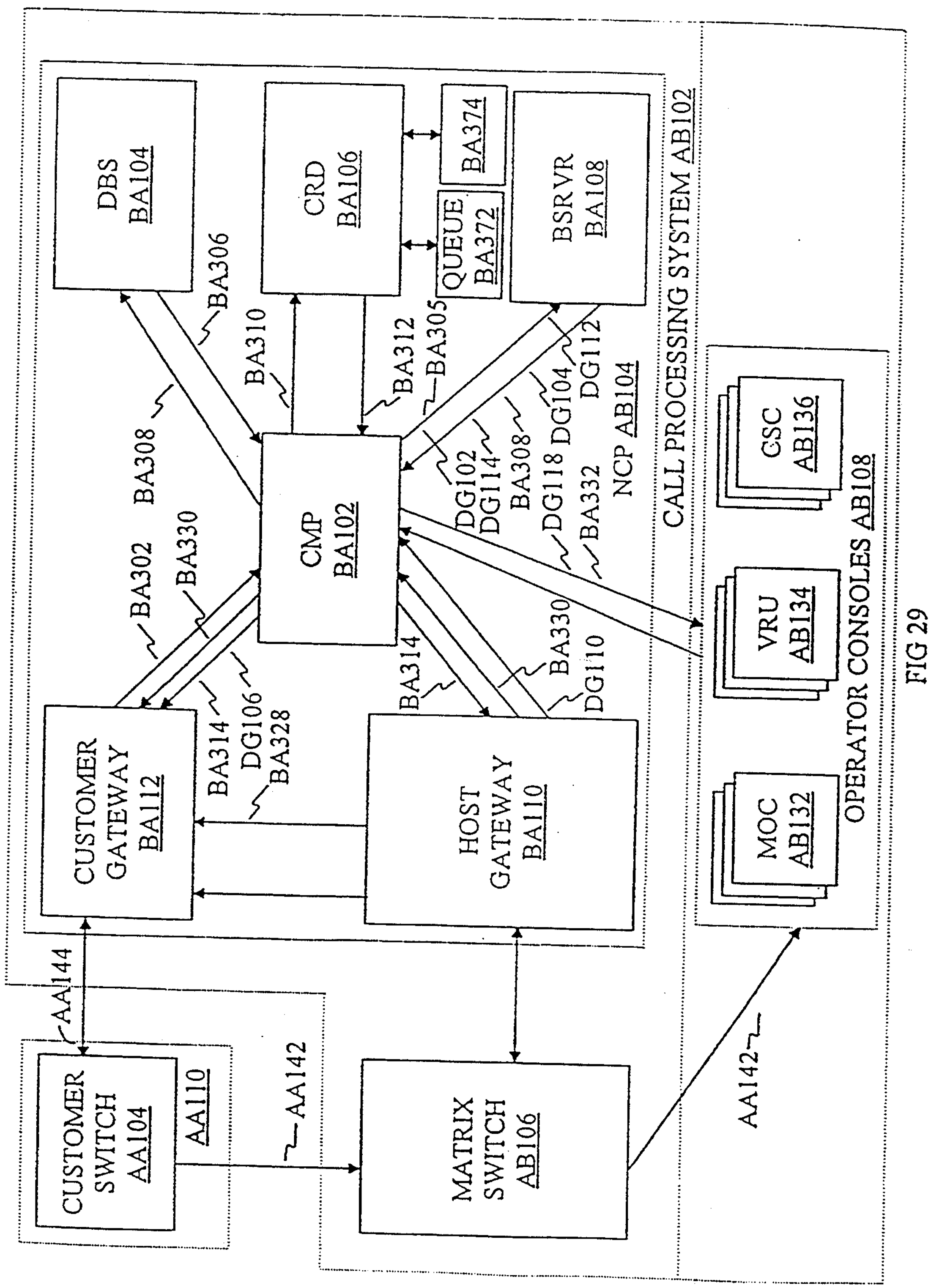
FIG. 29 is a message flow diagram illustrating the flow of messages between the central message processor and the other processes within the network control processor according to one embodiment of the invention.
Figure 30:
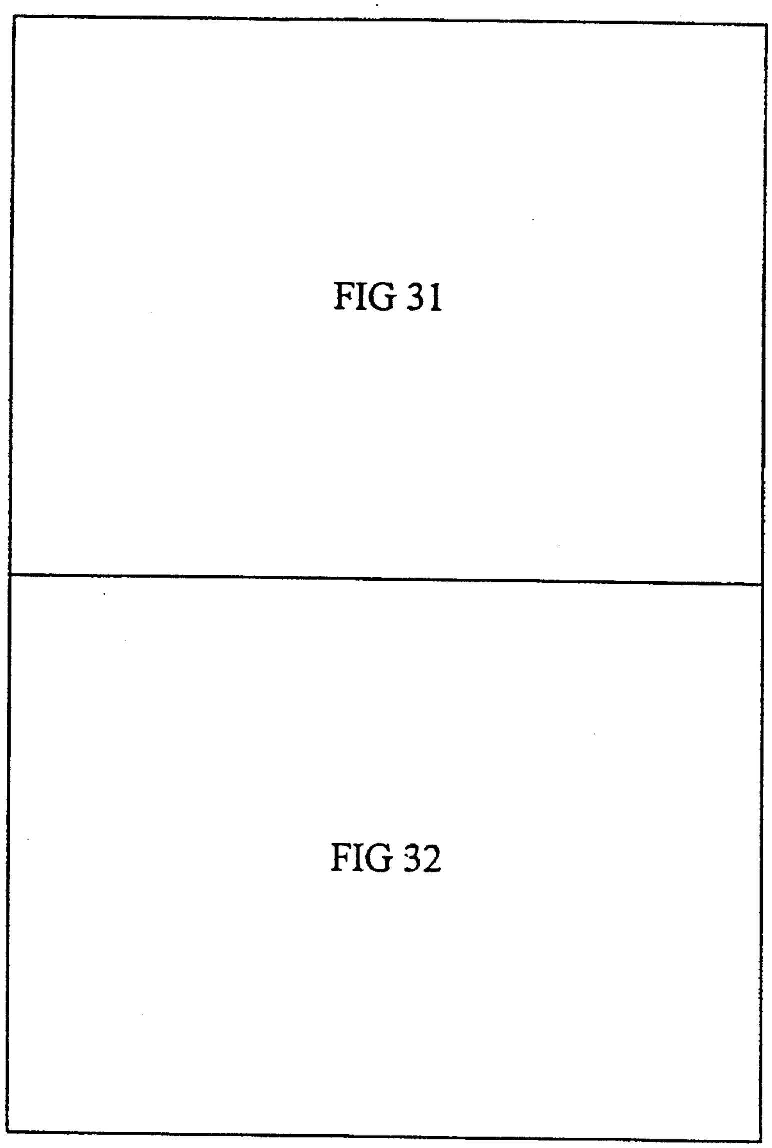
FIG. 30, which comprises
Figure 31:
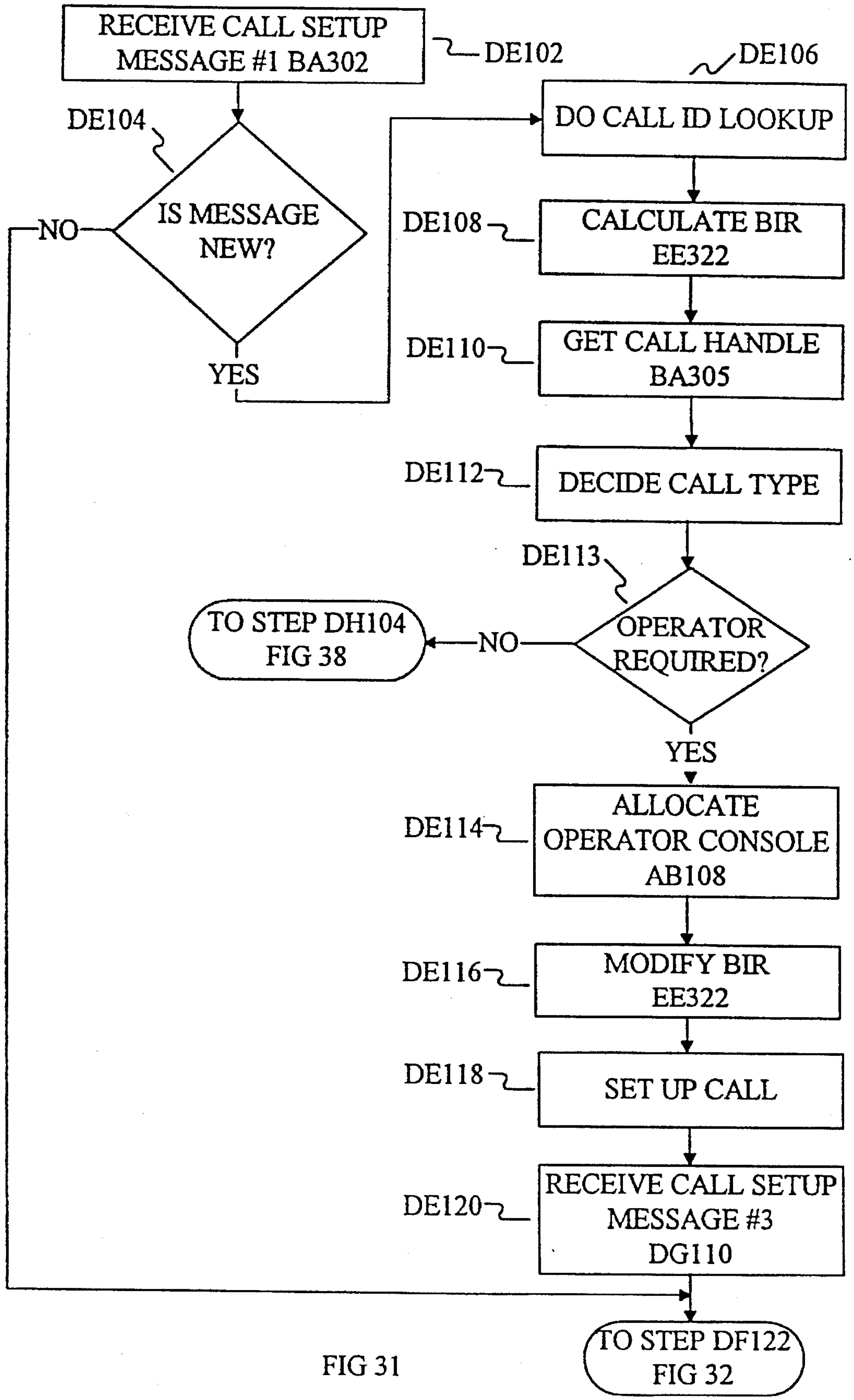
FIGS. 31 and 32, is an operational flow diagram illustrating the operations performed by the central message processor in sending and receiving the messages illustrated in FIG. 29 according to one embodiment of the invention.
Figure 32:
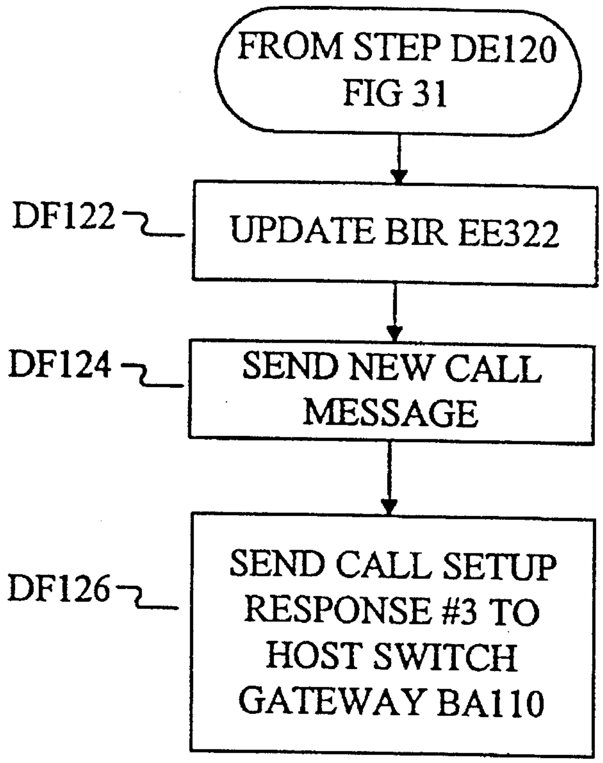

CMP BA102 is now described in more detail. FIG. 29 is a message flow diagram illustrating the flow of messages between CMP BA102 and the other processes within NCP AB104. FIG. 30, which comprises FIGS. 31 and 32, is an operational flow chart illustrating the operations performed by CMP BA102 in sending and receiving the messages illustrated in FIG. 29. In one embodiment, the actions taken by CMP BA102 are determined using action records DB122 as described below. The manner in which CMP BA102 handles calls is now described with reference to FIGS. 12, 14, 29, and 30.

In a step DE102, CMP BA102 receives CALL SETUP MESSAGE #1 BA302. CALL SETUP MESSAGE #1 BA302 includes call data AA144 pertaining to a call to be processed by call processing system AB102. CALL SETUP MESSAGE #1 BA302 can be received directly from a subscriber AA114, or can be sent via a customer Gateway BA112 to perform any necessary protocol conversions. This is described above in step BA204.

Based on the information contained in CALL SETUP MESSAGE #1 BA302, CMP BA102 determines whether the call is a new telephone call or a call already existing in call processing system AB102. This determination is made based on whether there is a callhandle BA305 for the call. This occurs in a step DE104. If CALL SETUP MESSAGE #1 BA302 references a new call, CMP BA102 determines whether the call requires operator assistance.

For a new call, CMP BA102 performs a call ID look-up in a step DE106. Call ID look-up provides call parameters BA308 to CMP BA102. In one embodiment, this is performed as discussed above with reference to step BA208 in FIG. 12.

Figure 51:
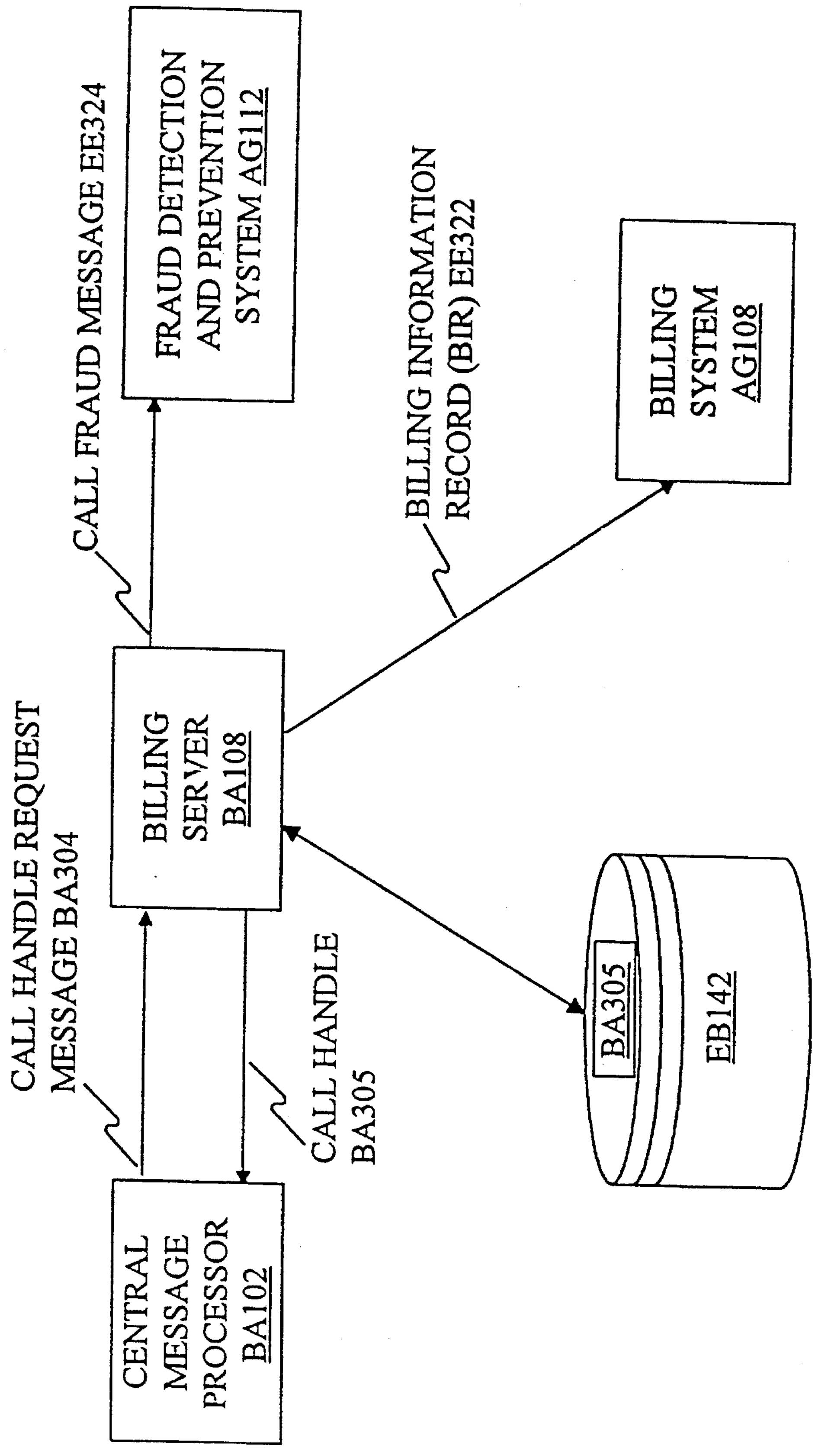
FIG. 51 is a data flow diagram illustrating messages sent during billing server operation according to one embodiment of the invention.

In a step DE108, when call parameters BA308 are received by CMP BA102, CMP BA102 creates an initial BIR EE322 (illustrated in FIG. 51). BIR EE322 is used to store call information that can be used for billing purposes.

In a step DE110, CMP BA102 determines a callhandle BA305 for the call. In one embodiment, to determine callhandle BA305, CMP BA102 sends GET CALLHANDLE REQUEST BA304 to BSRVR BA108 as discussed above with reference to FIG. 12. When GET CALLHANDLE REQUEST BA304 is sent to BSRVR BA108, CMP BA102 also sends part of BIR EE322 to BSRVR BA108. In this embodiment, BSRVR BA108 creates callhandle BA305 in response to GET CALLHANDLE MESSAGE BA304, stores BIR EE322 (referenced by callhandle BA305) and sends callhandle BA305 to CMP BA102 in a callhandle message BA306.

In a step DE112, CMP BA102 determines a call type based on call parameters BA308. CMP BA102 then determines whether an operator console AB108 is required, as illustrated by decision block DE113.

In a step DE114, if the call requires operator assistance, CMP BA102 allocates an operator console AB108 to handle the call. In one embodiment, this allocation is performed using CRD BA106. This embodiment is discussed above with reference to FIG. 12 in steps BA210 and BA212.

In a step BA210, CMP BA102 sends an ALLOCATE CONSOLE MESSAGE BA310 to CRD BA106. This message includes the call type and device type as determined from call parameters BA308. This information is used by CRD BA106 to allocate a specific console AB108 to handle the call.

In a step BA212, CONSOLE ALLOCATE RESPONSE MESSAGE BA312 returned frown CRD BA106 provides CMP BA102 with the identity of the console AB108 chosen to handle the call.

In a step DE116, CMP BA102 modifies BIR EE322 for the call. In one embodiment, this is accomplished by CMP BA102 sending a MODIFY BIR MESSAGE DD102 to BSRVR BA108. MODIFY BIR MESSAGE DG102 instructs BSRVR BA108 to modify the BIR EE322 for that call (identified by callhandle BA305) to include the identification of the operator console AB108 allocated to the call. In this manner, BSRVR BA108 can handle multiple calls, each having an individual callhandle BA305, and each assigned to an individual operator console AB108.

In one embodiment, CMP BA102 receives a MODIFY BIR MESSAGE RESPONSE DG104 from BSRVR BA108. MODIFY BIR MESSAGE RESPONSE DG104 indicates that BIR EE322 for that call has been modified.

In a step DE118, CMP BA102 sets up the call. One embodiment of this call setup process is discussed above with reference to steps BA214 through steps BC112 in FIGS. 12 and 13. In this embodiment, a series of call setup messages are generated by CMP BA102 and sent to configure matrix switch AB106 to route the call to the destination. In the case of an operator-assisted call, the destination is the operator console allocated in step DE114. Call setup can also include informing customer switch AA104 as to the status of the call.

In one embodiment, matrix switch AB106 generates and provides to CMP BA102 a message indicating that the call is routed to the terminating number (in this case to the allocated operator console AB108). For systems using SS7 signalling, this message is an IAM message. Host gateway BA110 can be used to convert the IAM message into a CALL SETUP MESSAGE #3 DG110 for CMP BA102. In a step DE120, CMP BA102 receives CALL SETUP MESSAGE #3 DG110 for the call in transit. Call setup message DG110 includes a circuit ID code indicating the call route is set up in matrix switch AB106. In a step DE104 CMP BA102 determines that CALL SETUP MESSAGE #3 DG110 is for an existing call.

In a step DF122, CMP BA102 updates BIR EE322 with the circuit identification. In one embodiment, this is accomplished by sending a GET CALL TYPE MESSAGE DG112 to BSRVR BA108. In this embodiment, CMP BA102 provides BSRVR BA108 with the circuit identification code in matrix switch AB106 and the callhandle BA305 for the call. BSRVR BA108 updates the BIR EE322 for the call to include this new information. In response, CMP BA102 receives a GET CALL TYPE RESPONSE DG114 from BSRVR BA108. DG114 includes the updated BIR EE322 with all the changes.

In a step DF124, CMP BA102 sends a NEW CALL MESSAGE DG116 to the operator console AB108 allocated to handle the call. In this step, the allocated operator console is informed that it may accept the call from matrix switch AB106 for processing. In one embodiment, the allocated operator console AB108 sends a response back to CMP BA102 indicating that NEW CALL MESSAGE DG118 and the call are received by the operator console AB108.

Finally, in a step DF126, CMP BA102 sends CALL SETUP #3 response DG118 to host switch gateway BA110 indicating that operator console AB108 can start processing the call.

2.2.3 Action Records

In one embodiment, CMP BA102 processes messages using message manager DB102 and a set of action records DB122. Message manager DB102 maintains a table of all network requests or messages the CMP BA102 could receive and a Callback Initialization Function that initiates the processing of each network message. Each function call is accomplished using an action record which indicates the actual code to execute to begin processing the network message. In addition, CMP BA102 maintains a list of action records. These action records define a single task and can be chained together to perform a series of tasks that must be executed to fulfill the network request. When an action record chain is initialized, message manager DB102 takes control of executing the sequence of actions until the end of the sequence is reached. The next action to be performed in the sequence is based on a Return Type and a Return Code received in the current action record.

Return type can be either a Function Return or a Network Return. A Function Return indicates an action that can be executed immediately because the next action record in the sequence contains a function call. A Network Return indicates an action that is delayed because a response must be received over the LAN. An action record may contain any number of possible Function Returns or Network Returns. Each Function Return and Network Return is further identified with a Return Code. For each function Return Code and network Return Code there is a pointer to indicate the next action record to move to when the current action is completed. The application will move to the next action record in the chain based on the Return Type and Return Code received in the current action.

Default Network Return Code DM114 and its nest action pointer DM116 define the next action record in the sequence for this network Return Code.

Figure 33:
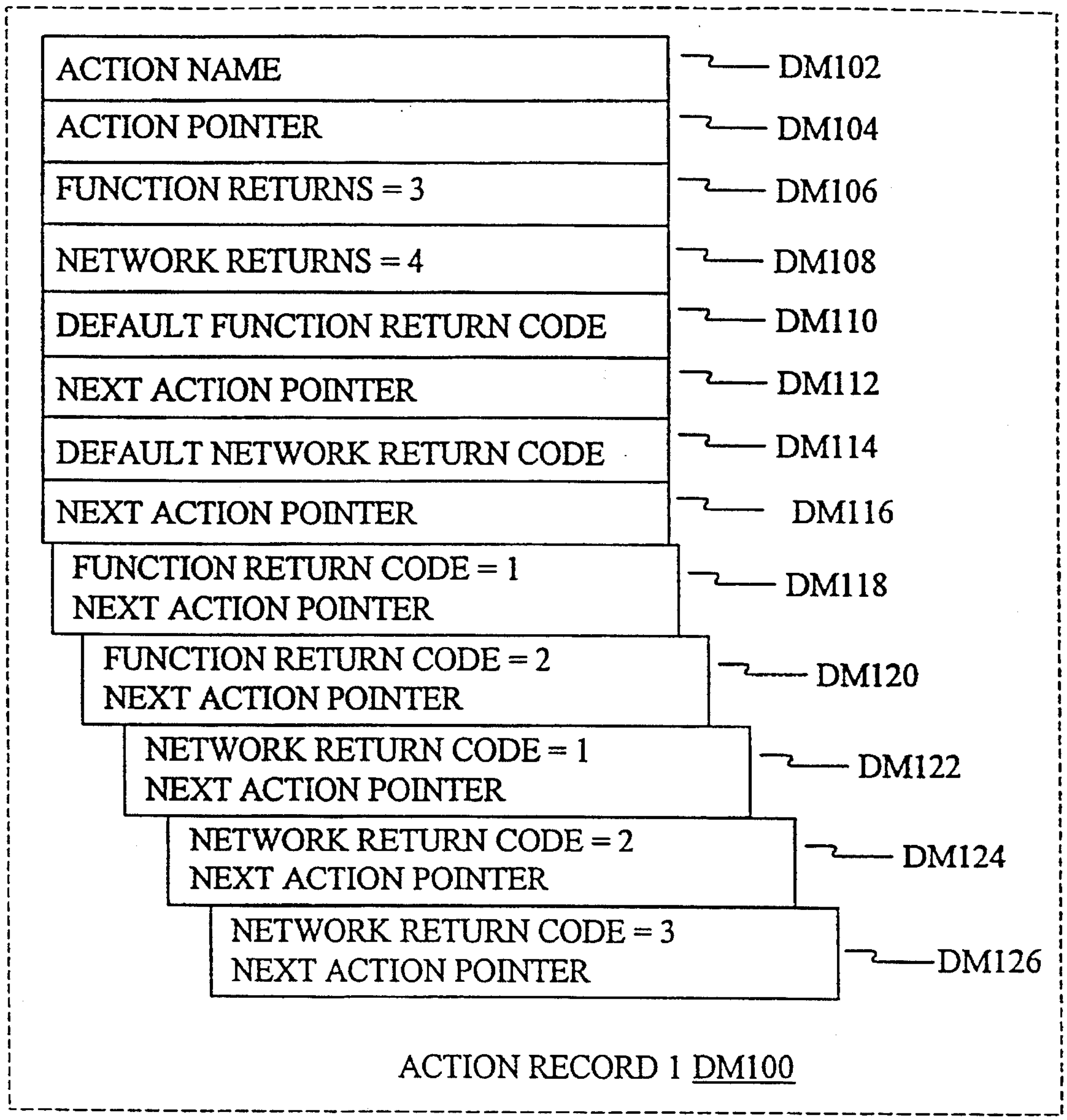
FIG. 33 is a diagram illustrating an example action record according to one embodiment of the invention.

FIG. 33 is a diagram illustrating an example of an action record. Referring now to FIG. 33, in this action record DM100, a Number of Function Returns DM106 indicates that there are three possible Function Return codes, including the Default DM110 contained in this action record. DM118 and DM120 indicate the two possible Function Return Codes and their Next Action Pointer. Action Record DM108 indicates that there are four possible Network Return Codes, including the Default DM114 contained in this action record. DM122, DM124,and DM126 indicate the three possible Network Return Codes and their Net Action Pointer.

Figure 34:
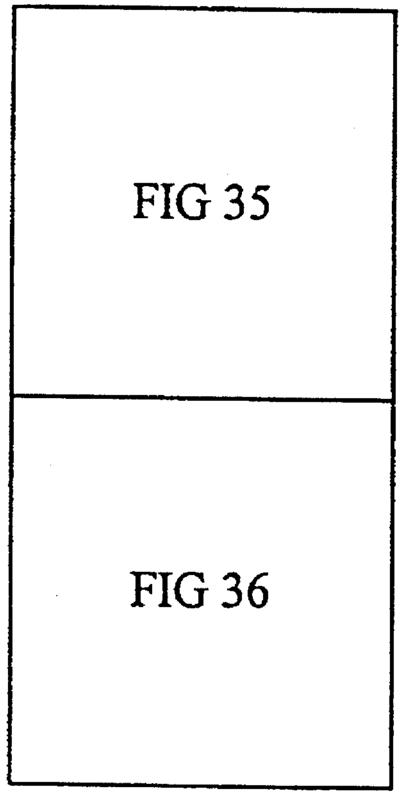
FIG. 34, which comprises

The manner in which Message Manager DB102 uses Action Records to fulfill network requests is now described. FIG. 34, which comprises FIGS. 35 and 36, is an operational flow diagram illustrating the process by which Message Manager DB102 uses Action Records DM100 to process a network request.

Figure 35:
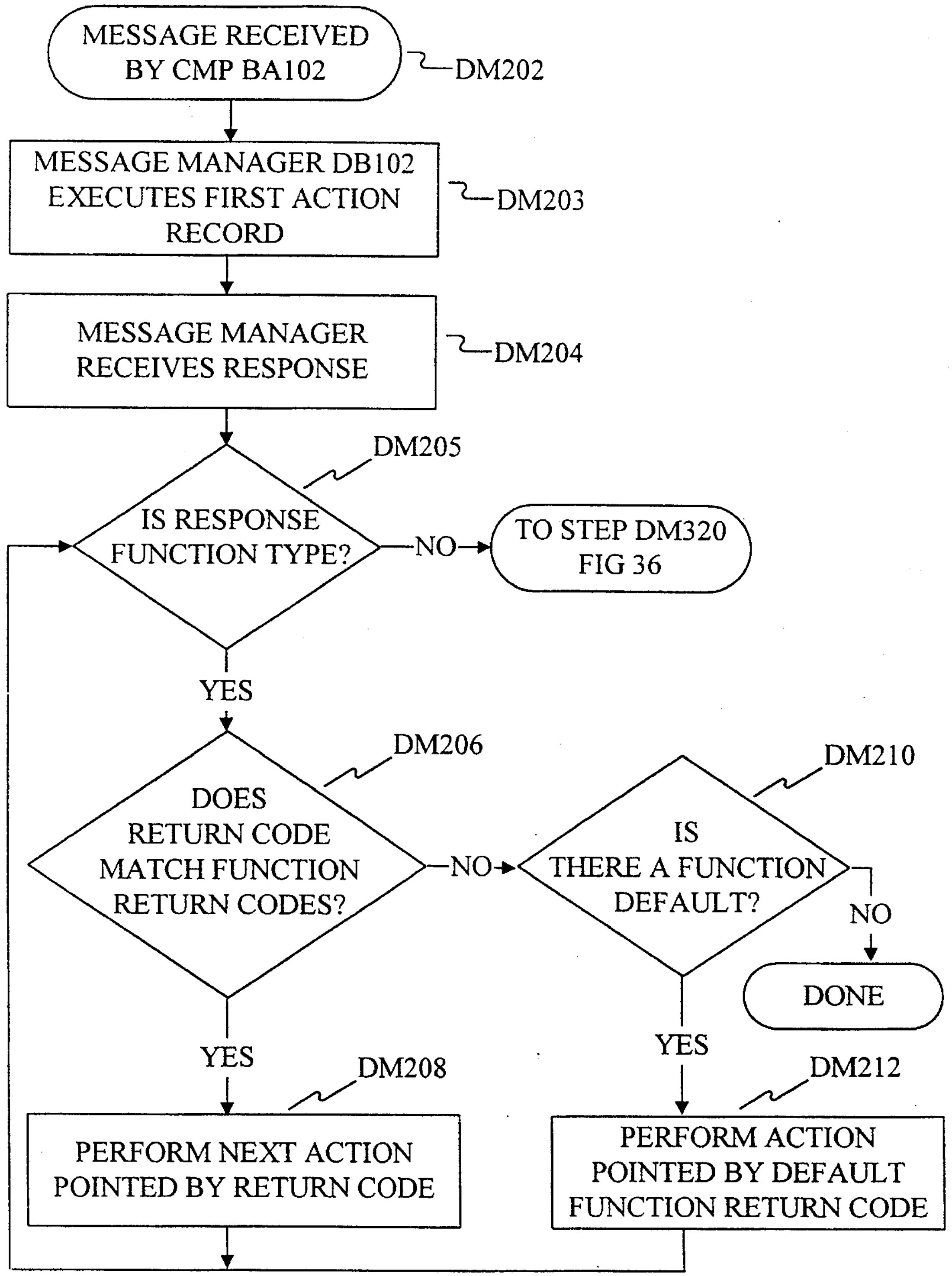
FIGS. 35 and 36, is an operational flow diagram illustrating the manner by which a message manager of the central message processor uses action records to process a network request according to one embodiment of the invention.
Figure 36:
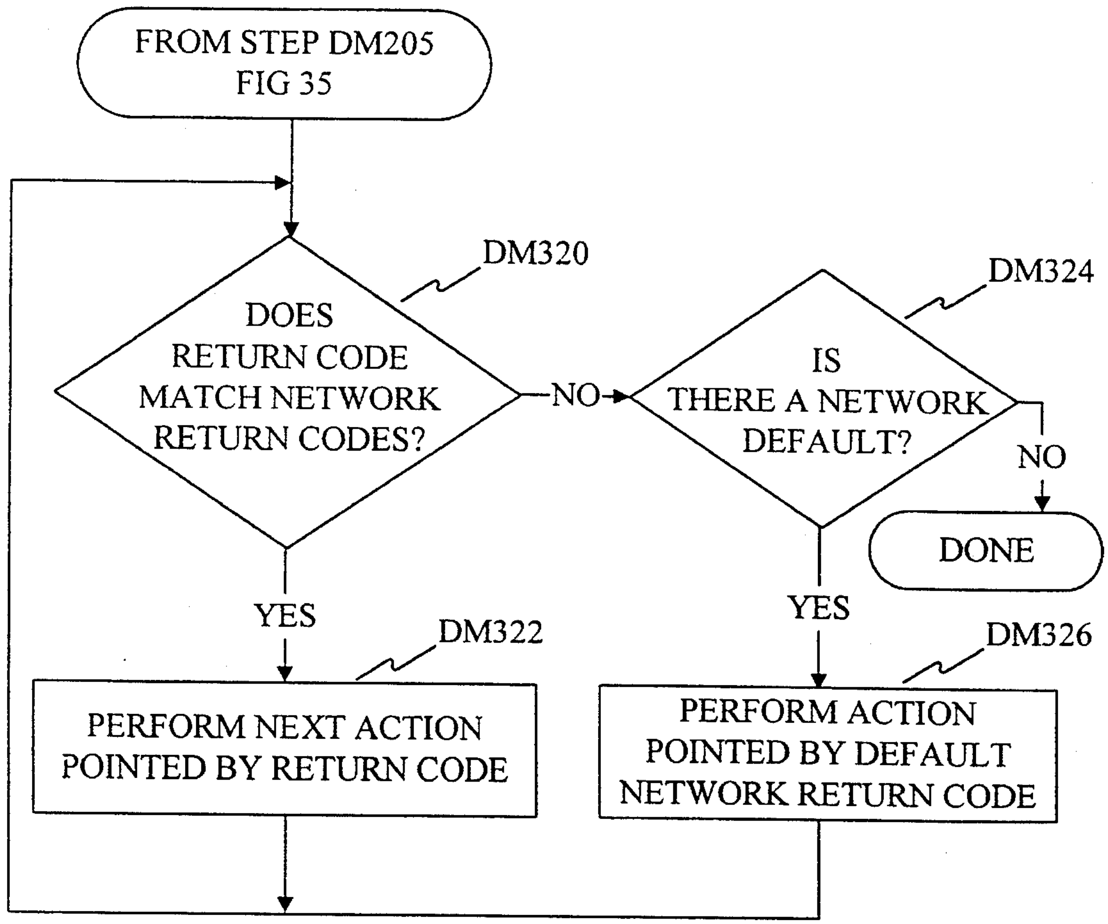

Referring now to FIG. 35 CMP BA102 receives a network request in a step DM202. Message Manager DB102 looks in its table to find the Callback Initialization Function that initiates the processing of the network message received and the Action Record DM100 at which to begin processing the message. In a step DM203, Message Manager DB102 executes the action pointed to by the current Action Record.

In a step DM204 Message Manager DB102 receives a response containing an action Return Type and an action Return Code. Depending upon the action Return Type and the action Return Code received when the current action is completed, Message Manager DB102 moves to the next action record as determined by the Next Action Pointer DM112. Message Manager DB102 looks at the response to determine if the response is a Function or a Network type in step DM205.

If the response received is a Function response, in a step DM206, Message Manager DB102 looks at the Return Code received to determine if it matches any of the Return Codes contained in the current Action Record DM100. If a match is found, Message Manager DB102 moves to step DM208 and executes the next action record indicated by the Next Action Pointer DM118 associated with the Return Code found. Message Manager DB102 continues with this process of executing the current Action Record DM100, reading the Return Type and Return Code and moving to the next Action Record DM100 until no more records can be found.

If no match is found for the Return Code DM100 in step DM206, Message Manager DB102 looks at the current action record for a Default Function Return Code DM110 in a step DM210. If the Default exists, Message Manager DB102 moves to step DM212 and executes the next action record indicated by the Next Action Pointer DM112 associated with the Default Function Return Code DM110. If in a step DM210 the Action Record does not contain any Function Returns, the Number Function Returns DM108 value in the action record DM100 is equal to zero and processing of the network message received by CMP BA102 is completed.

If step DM205 indicates that the response received upon execution of the Action Record DM100 was not a function Response Type it is a Network Response Type, and the operation continues at a step DM320. Because all response types will always be either a Function or Network Response Type, FIG. 35 details processing of a Network Response Type.

Referring now to FIG. 36, in step DM320, the response received is a Network response so Message Manager DB102 looks at the Return Code received to determine if it matches any of the Return Codes contained in the current action record DM100. If a match is found, message manager DB102 moves to step DM322 and executes the next action record DM100 indicated by the Next Action Pointer associated with the Return Code found. Message manager DB102 continues with this process of executing the current action record DM100, reading the Return Type and Return Code and moving to the next action record DM100 until no more records are found.

If no match is found for the Return Code received in step DM320, (i.e. if no more action records DM100 are found), Message Manager DB102 looks at the current Action Record in a step DM324 for a Default Network Return Code DM114. If the Default Network Return Code DM114 exists, Message Manager DB102 moves to step DM326 and executes the next action record DM100 indicated by the Next Action Pointer DM116 associated with the Default Return Code. If the Action Record does not contain any Network Returns, the Number of Network Returns DM108 value in the action record is equal to zero and processing of the network message received by CMP BA102 is completed.

Using Action Records to process network requests allows that application to be easily reconfigured to incorporate new network messages and features. Action Records are also easily read for trouble shooting of the code itself. By looking at the action record chain or sequence a reader can quickly understand the working of the network request that invokes it.

2.2.4 Number Translation or Direct-Dial Long-Distance call

As discussed above with reference to FIG. 31, CMP BA102 determines whether the call received by call processing system AB102 requires operator assistance. As indicated by decision block DE113 (illustrated in FIG. 31) if the call does requires operator assistance, an operator console AB108 is allocated to handle the call in step DE114. However, if the call does not require operator assistance, it can be completed without the assistance of an operator console AB108. Two examples of when this may occur is when the call requires an 800 translation, or when the call is simple a direct-dial long-distance (1+) call. The manner in which these types of calls are completed is now described with reference to FIG. 37.

Figure 37:
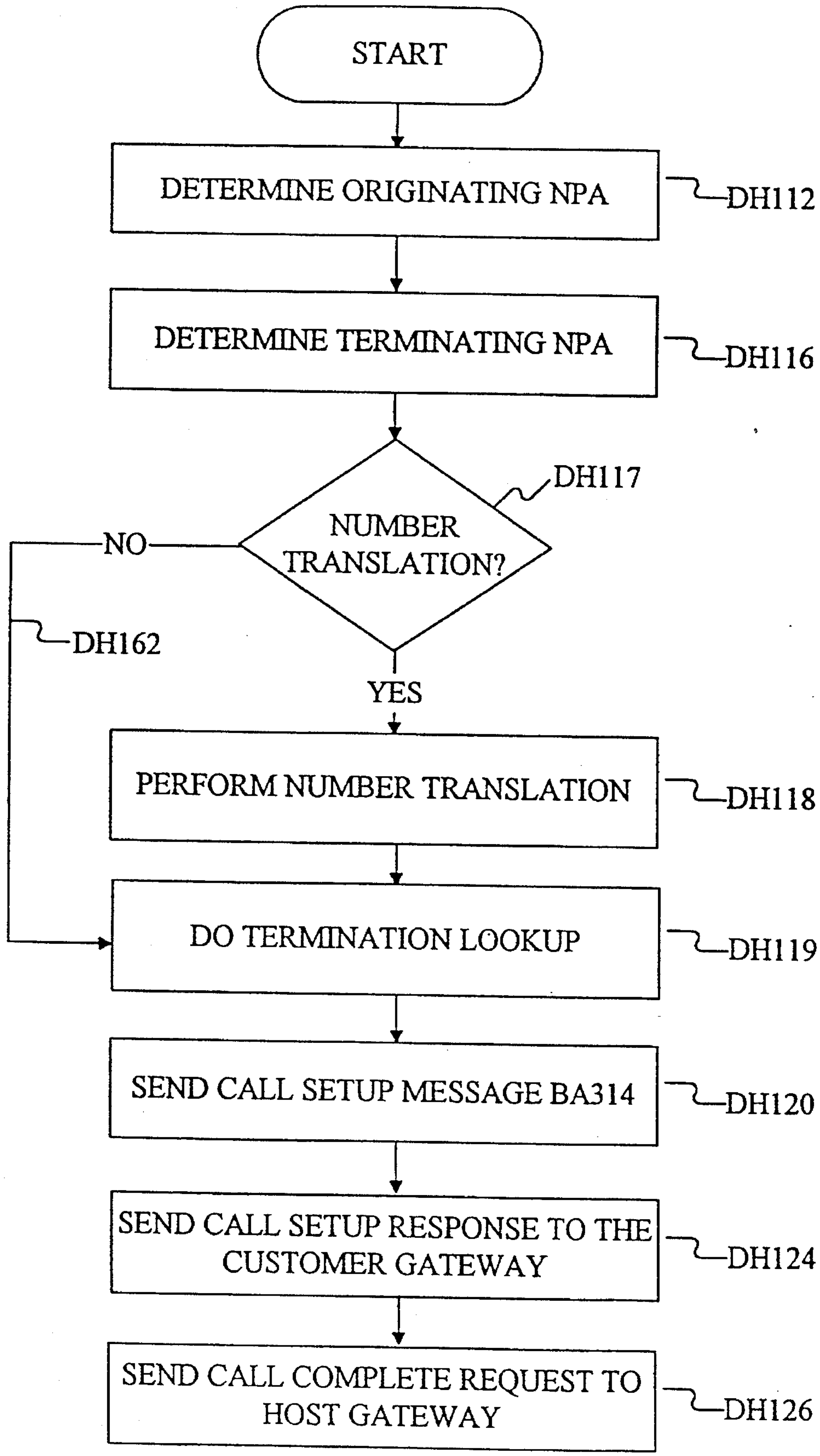
FIG. 37 is an operational flow diagram illustrating the manner in which calls that do not require operator assistance are completed according to one embodiment of the invention.

FIG. 37 is an operational flow diagram illustrating the manner in which calls that do not require operator assistance are completed. Referring now to FIG. 37, in a step DH112, CMP BA102 determines the correct number plan area (NPA) for the call. An NPA is commonly known as an area code that designates a toll center within the United States, Canada and Mexico. In some embodiments, it may not be necessary to determine the NPA depending on where call processing system AB102 is implemented and the types of calls it is designed to handle.

In one embodiment, the NPA is determined by sending an NPA look up request to DBS BA104. In response, DBS BA104 determines the correct NPA and returns a response to CMP BA102 indicating the NPA.

In a step DH116, the terminating NPA is determined by CMP BA102. This is accomplished in a manner similar to the manner in which CMP BA102 determined the originating NPA in step DH112. CMP BA102 uses the originating and the terminating NPAs to determine the routing for the call. At this time the call can be set up. Additionally the NPAs can be used to determine time offsets between the origin and termination, to determine whether daylight-savings time is in effect, to determine the geographic location of the origin and termination, and to determine a local access transport area (LATA). These items correspond to fields in the BIR EE322 (Billing Information Record).

In a step DH117, CMP BA102 determines whether the call requires a number translation. An example of a number translation is a 800 number translation or a 900 number translation.

If the call requires a number translation, the translation is performed in step DH118. In one embodiment a translation look-up request is sent to DBS BA104. DBS BA104 receives the request and looks up the correct number in a translation database. This translated number is provided to CMP BA102 as the correct terminating number for the call. If the call is a direct-dial long-distance call that does not require operator assistance, step DH118 is bypassed as indicated by flow line DH162.

In a step DH119, CMP BA102 does a termination look-up to determine the routing of the call and verify the terminating numbers.

In a step DH120, CMP BA102 sends CALL SET UP MESSAGE BA314 to set up the call in matrix switch AB106. As discussed above, in one embodiment, CALL SET UP MESSAGE BA314 is sent via host gateway BA110 which converts it to a message type compatible with that of matrix switch AB106. The effect of this step DH120 is to set up the routing of the call in matrix switch AB106.

When matrix switch AB106 acknowledges that it has received the message and is set up for the call, CMP BA102 sends a CALL SET UP RESPONSE BA330 to customer switch AA104. Again, in one embodiment, this message is sent via customer gateway BA112. At this time, the call is set up to be completed to the terminating party.

In a step DH126, CMP BA102 sends a request to matrix switch AB106 to complete the call to the terminating party. This request can be sent via host gateway BA110.

2.2.5 Call Release From an Operator Console AB108

When a call is being processed by an operator console AB108, it could have more than one audio leg. For example, a collect call has two audio channels AB122: one for the originating party and one for the terminating party (to verify that charges are accepted). If the console has to release a call during processing, it first releases the terminator, and then the originator.

Figure 38:
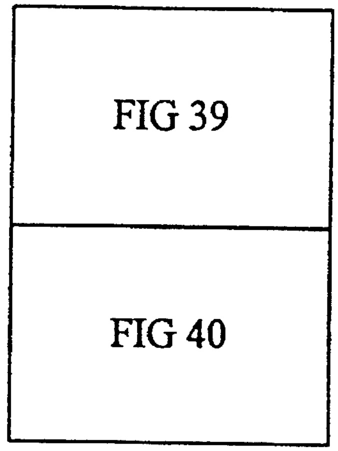
FIG. 38, which comprises
Figure 39:
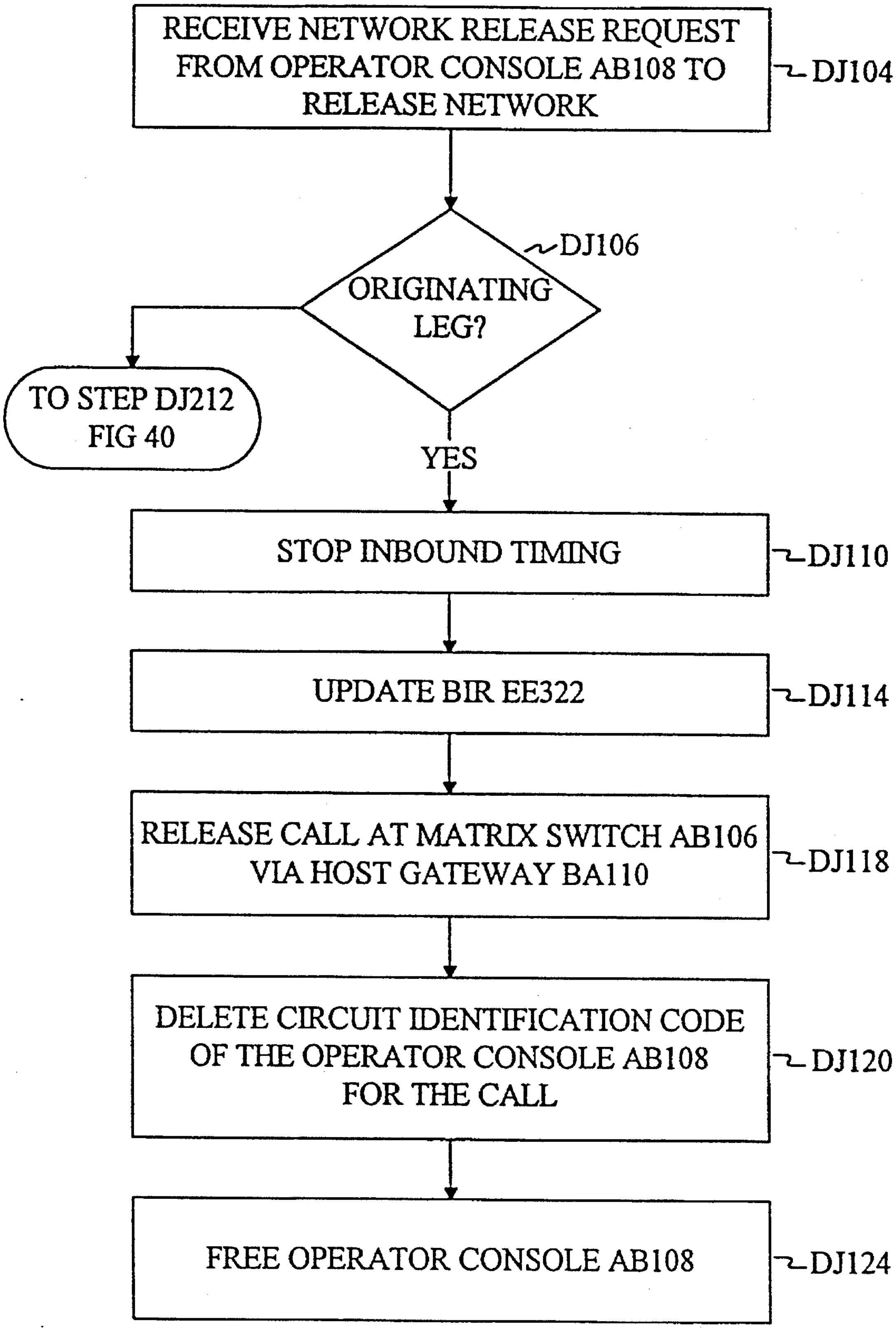
FIGS. 39 and 40, is an operational flow diagram illustrating the manner in which the central message processor releases a call from an operator console according to one embodiment of the invention.
Figure 40:
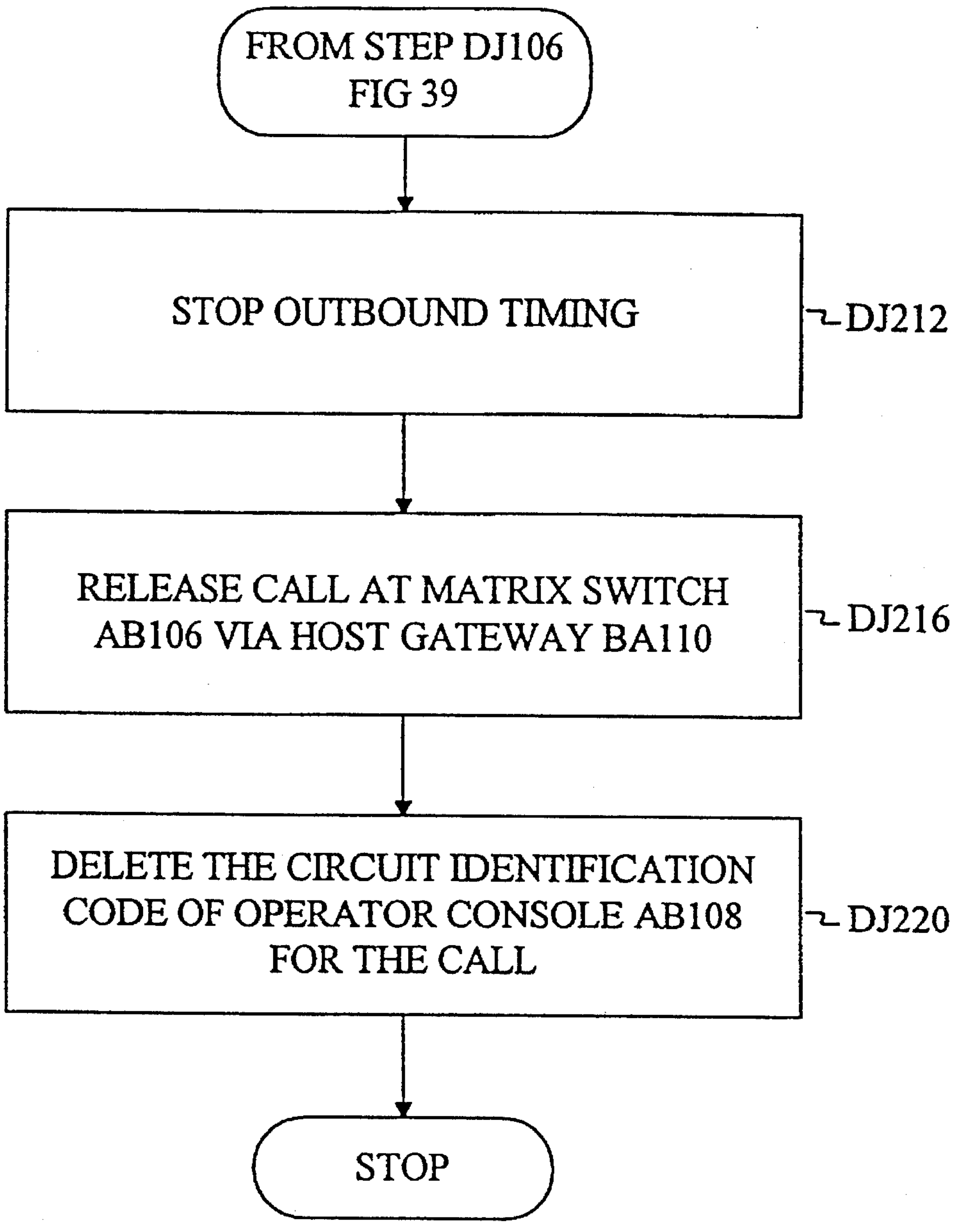

The manner in which a call is released from a console is now described. FIG. 38, which comprises FIGS. 39 and 40, is an operational flow diagram illustrating the manner in which CMP BA102 releases a call from an operator console AB108. Referring now to FIG. 39, when operator console AB108 determines that it is to release a call it sends a release network request message to CMP BA102. This message is received by CMP BA102 in a step DJ104.

In a step DJ106, CMP BA102 determines whether the call leg being released is in an originating leg, or whether it is a terminating or auxiliary leg. If it is an originating leg the operation continues in a step DJ110. If the call leg is a terminating or auxiliary leg, the operation continues in a step DJ212.

For calls in the originating leg, in a step DJ110, CMP BA102 stops the inbound timing of the call. In one embodiment this is accomplished by sending a request to stop the inbound timing to BSRVR BA108. Upon receipt of this message, BSRVR BA108 stops the inbound wholesale network timing. BSRVR BA108 also sends a response to CMP BA102 indicating that the inbound wholesale timing has been stopped.

In a step DJ114, when CMP BA102 receives the response from BSRVR BA108 indicating that the inbound timing is stopped, CMP BA102 updates the BIR EE322 for the call. This is accomplished by sending in a request to BSRVR BA108 to update the BIR EE322. BSRVR BA108 indicates that the BIR is updated by sending a response to CMP BA102.

Upon receipt of this response, CMP BA102 releases the call in a step DJ118. In one embodiment, this is accomplished by sending a call release request to the host gateway informing the host gateway that the operator console AB108 is releasing the call. Host gateway BA110 reformats this message where necessary and forwards it to matrix switch AB106 indicating that the console AB108 is releasing the call.

In a step DJ120, the CIC is deleted from BSRVR BA108. In one embodiment, this is accomplished by CMP BA102 sending a request to BSRVR BA108 to delete the CIC. For every call, BSRVR BA108 maintains callhandle BA305, CICs (audio circuits identifiers), a BIR EE322, and call and network tinning information. One condition is that BSRVR BA108 ship BIR EE322 to billing system AG108 for rating when the billing server has no more CICs associated with a call. For this reason, BSRVR BA108 is informed by CMP BA102 when an audio circuit is added or deleted. Circuits are added upon call set up and origination and deleted upon call releases and completes. Because operator console AB108 is releasing the call in this scenario, CMP BA102 deletes the CIC in step DJ120.

In a step DJ124, CMP BA102 frees operator console AB108 from the call. In one embodiment, this is accomplished by sending a request to CRD BA106 to free the console. In response, CRD BA106 releases the console AB108 from the call. Freeing operator console AB108 with CRD BA108 makes that particular console AB108 available for handling another call. As discussed above, CRD BA108 keeps track of available operator consoles AB108. In a step DJ208, CMP BA102 releases operator console AB108.

If the call being released is for a terminating or auxiliary leg, in a step JD212 the outbound timing of the call is stopped. This is accomplished by notifying BSRVR BA108 to stop outbound timing for the call. BSRVR BA108 in response, stops outbound wholesale network timing and provides a response to CMP BA102 indicating such.

When CMP BA102 receives the response from BSRVR BA108 indicating that the inbound timing is stopped, CMP BA102 updates the BIR EE322 for the call. This is accomplished by sending a request to BSRVR BA108 to update the BIR EE322. BSRVR BA108 indicates that the BIR is updated by sending a response to CMP BA102.

Upon receipt of this response, CMP BA102 releases the call in a step DJ216. In one embodiment, this is accomplished by sending a call release request to the host gateway informing the host gateway that the call is being released. Host gateway BA110 reformats this message where necessary and forwards it to matrix switch AB106 indicating that the console AB108 is releasing the call.

In a step DJ220, the CIC is deleted from BSRVR BA108. In one embodiment, this is accomplished by CMP BA102 sending a request to BSRVR BA108 to delete the CIC.

2.2.6 Call Release From A Switch

Figure 41:
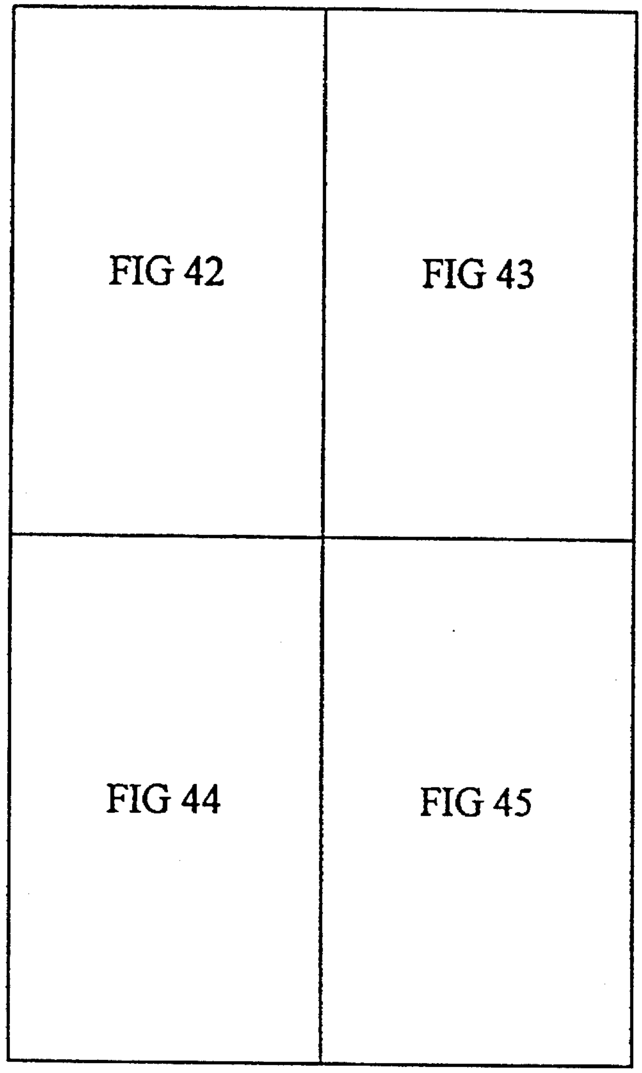
FIG. 41, which comprises
Figure 42:
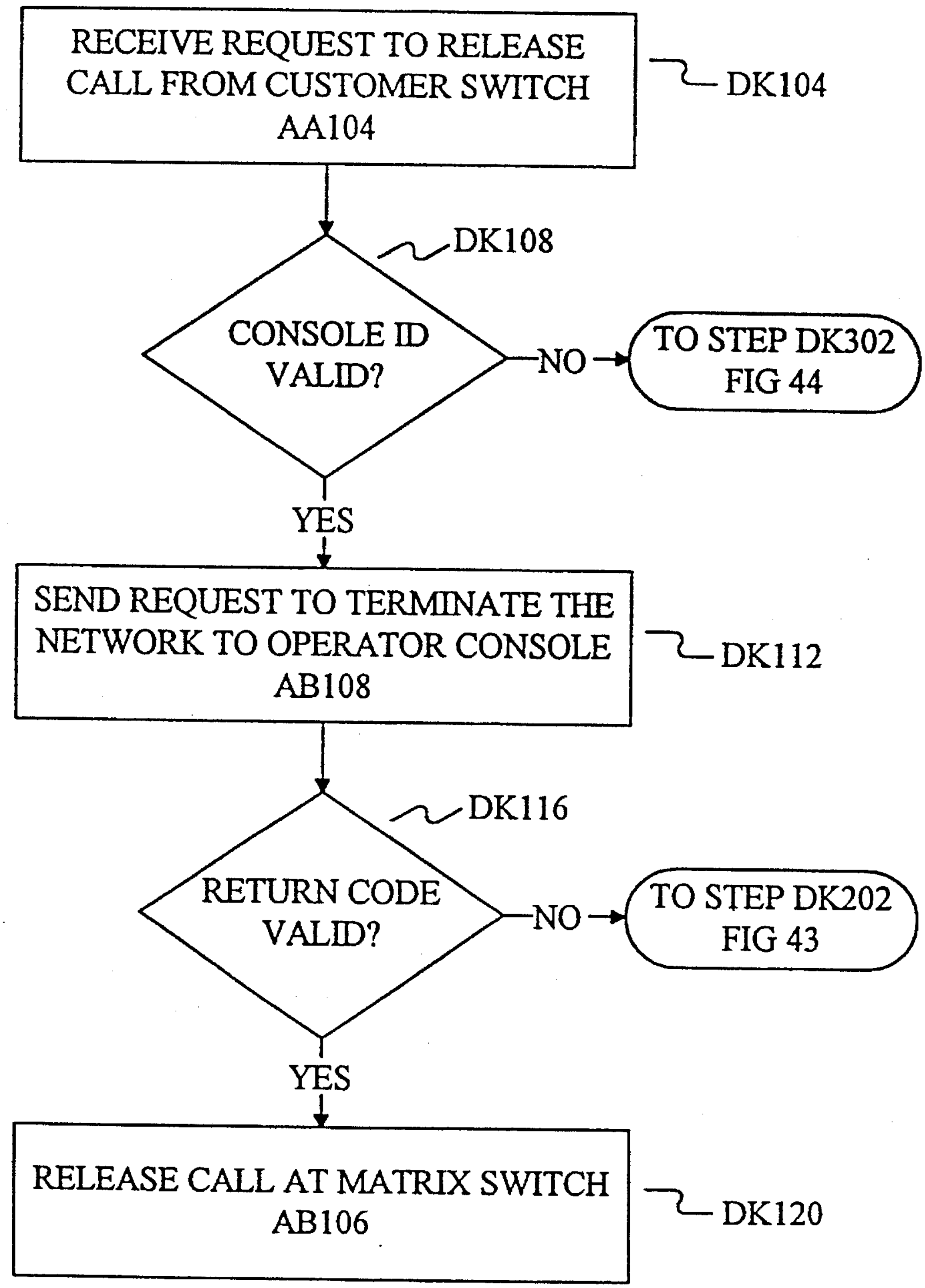
FIGS. 42 through 45 is an operational flow diagram illustrating the process of releasing a call when a user terminates the call according to one embodiment of the invention.
Figure 43:
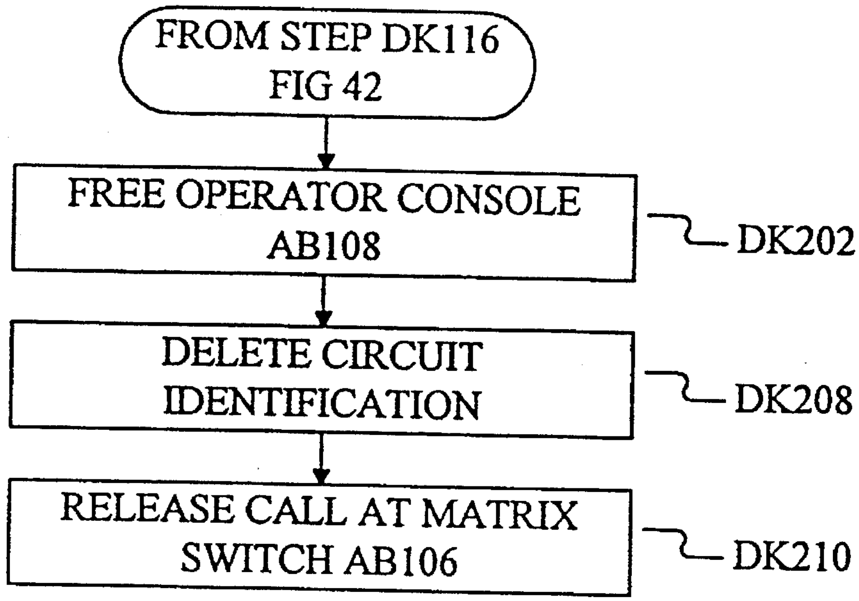
Figure 44:
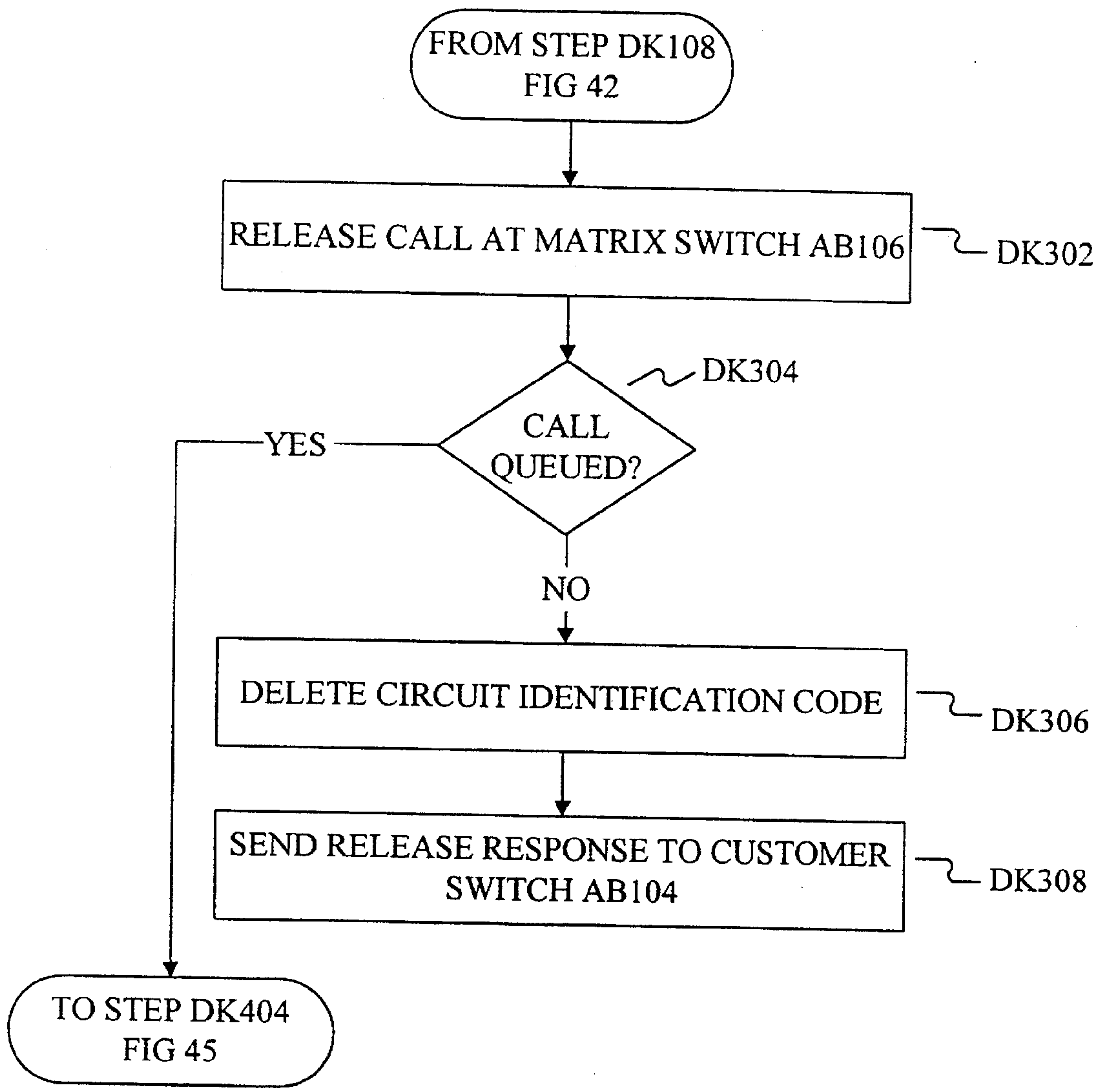
Figure 45:
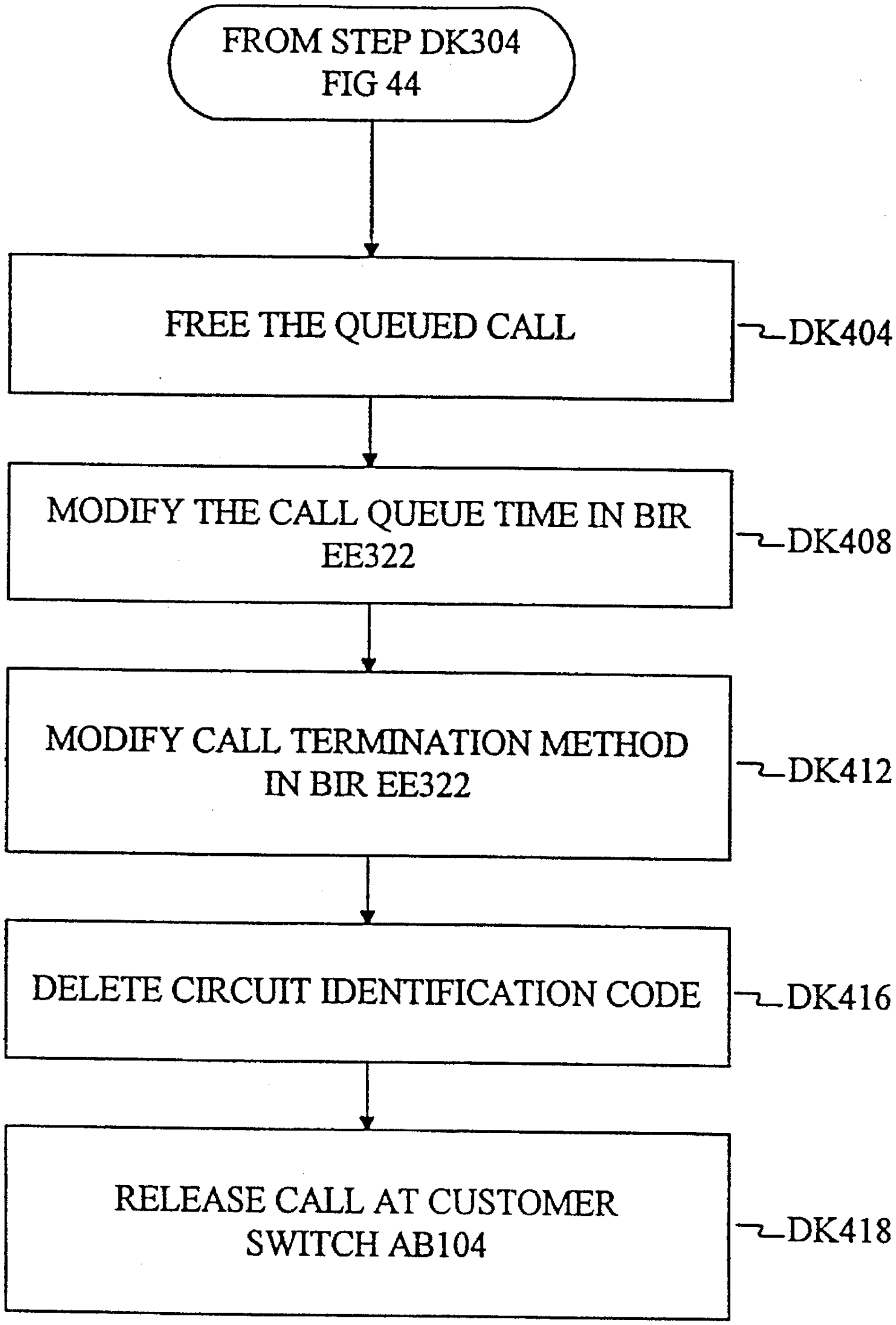

FIG. 41, which comprises FIGS. 42 through 45 is an operational flow diagram illustrating the process of releasing a call when a user AA106 terminates the call. Referring now to FIG. 42, if originating user AA106A or terminating user AA106B terminates the call (for example hangs up the phone) customer switch AA104 sends a request to release the call to NCP AB104. In one embodiment, this is received by customer gateway BA112. Customer gateway BA112 converts this message to the format recognized by CMP BA102 and forwards it to CMP BA102. This is illustrated in the step DK104.

In a step DK108, CMP BA102 determines whether the console identifier is valid. In one embodiment CMP BA102 determines whether an INET address and socket number are valid. If they are not valid, in a step DK302 the call is released at customer switch AA104.

If, on the other hand, the console identification is valid this indicates that the request to release the call came from the matrix switch AB106 via host gateway BA110. In this case, in the step DK112, the network is terminating via operator console AB108. To accomplish this, CMP BA102 sends a terminating request to operator console AB108.

If, in a step DK116, a return code received by operator console AB108 in response to the terminate request is valid, the call is released at matrix switch AB106. This is accomplished by sending a call release response to matrix switch AB106 via host gateway BA110. This is illustrated in a step DK120. A response is then sent to customer switch AA104 via customer gateway BA112 indicating the call is released.

If, on the other hand, the return code is invalid, CMP BA102 frees operator console AB108 in a step DK202. This is accomplished in one embodiment by sending a request to CRD BA106, to free the operator console AB108 and make it available to handle other calls.

In a step DK208, the CIC is deleted at the BSRVR BA108 and in a step DK210 the call release response is sent to the matrix switch AB106. A response is then sent to customer switch AA104 via customer gateway BA112 indicating the call is released.

If console address identification was invalid in step DK108 the call release request was received from customer switch AA104. In this case, the call is released in step DK302. In one embodiment, this is accomplished by sending a request to matrix switch AB106 (via host gateway BA110, if required) to release the call.

In a step DK304, CMP BA102 determines whether the call being released is queued at CRD BA106. If it is not being queued at CRD BA106, the CIC is deleted at BSRVR BA108 and a call release response is sent to customer switch AA104 via customer gateway BA112. This is illustrated in steps DK306 and DK308.

If, on the other hand, the call being released is queued at CRD BA106, the call is freed from the queue. In one embodiment, this is accomplished by sending a request to CRD BA106 to free the queued call. This occurs in a step DK404.

In a step DK408, BIR EE322 is modified at BSRVR BA108 to change the call queue time. CRD BA106 maintains the duration of queued calls.

In a step DK412, BIR EE322 is modified at BSRVR BA108 to modify the termination method of the call. This is accomplished by sending a request to BSRVR BA108.

In a step DK416 CMP BA102 deletes the CIC in BSRVR BA108 and in a step DK418 sent CMP BA102 releases the call by sending a call release response to customer switch AA104 via customer gateway BA112.

2.2.7 Call Set-up For an Operator-Console-Originated Call

Figure 46:
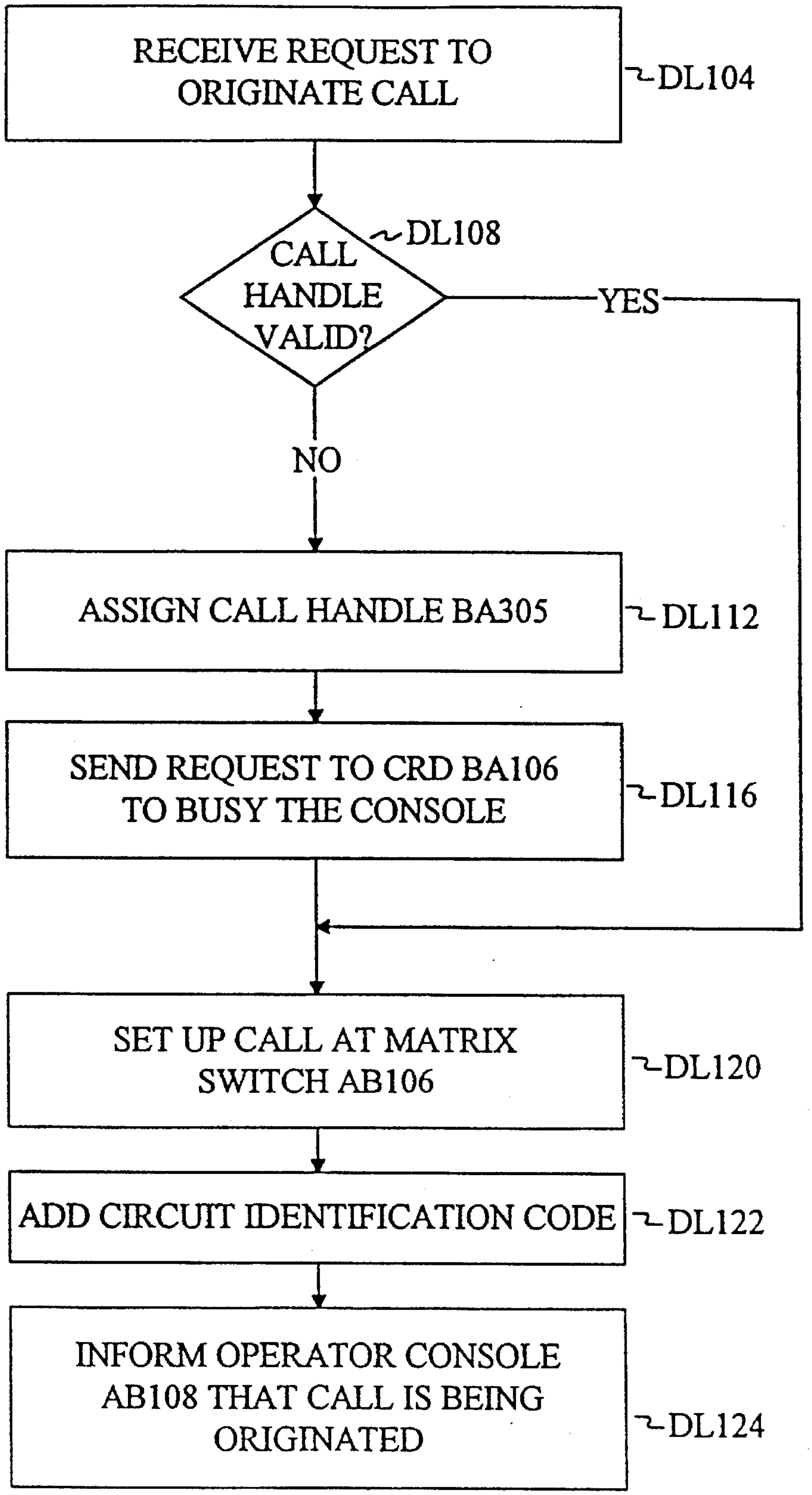
FIG. 46 is an operational flow diagram illustrating the manner in which the central message processor sets up a call originated from an operator console according to one embodiment of the invention.

The manner in which CMP BA102 sets up a call when an operator console originates a call is now described. FIG. 46 is an operational flow diagram illustrating the manner in which CMP BA102 sets up a call originated from an operator console AB108. Referring now to FIG. 46, when an operator console AB108 originates a call, it sends an originate request to CMP BA102. Operator console AB108 may originate a call, when making a collect call to verify that the called party will accept the charges, or when calling a customer to tell the time and charges of a call. In a step DL104, the request to originate the call is received by CMP BA102.

In a step DL108, CMP BA102 determines whether callhandle BA305 is valid for the call. If it is valid, the operation continues in a step DL120. If callhandle BA305 is not valid, in a step DL112, CMP BA102 sends a GET CALLHANDLE REQUEST BA304 to BSRVR BA108 to assign a valid callhandle BA305 to the call.

In a step DL116, when CMP BA102 receives callhandle BA305 from BSRVR BA108, it sends a request to CRD BA106 to originate the call. Upon receipt of this request, CRD BA106 marks the console AB108 as busy.

In a step DL120, CMP BA102 sets up the call at matrix switch AB106. In a step DL122 CMP BA102 adds a CIC in BSRVR BA108. In one embodiment, this is accomplished by sending a request to BSRVR BA108 to add the CIC for the call.

In a step DL124, CMP BA102 informs operator console AB108 that the call is being originated.

Figure 47:
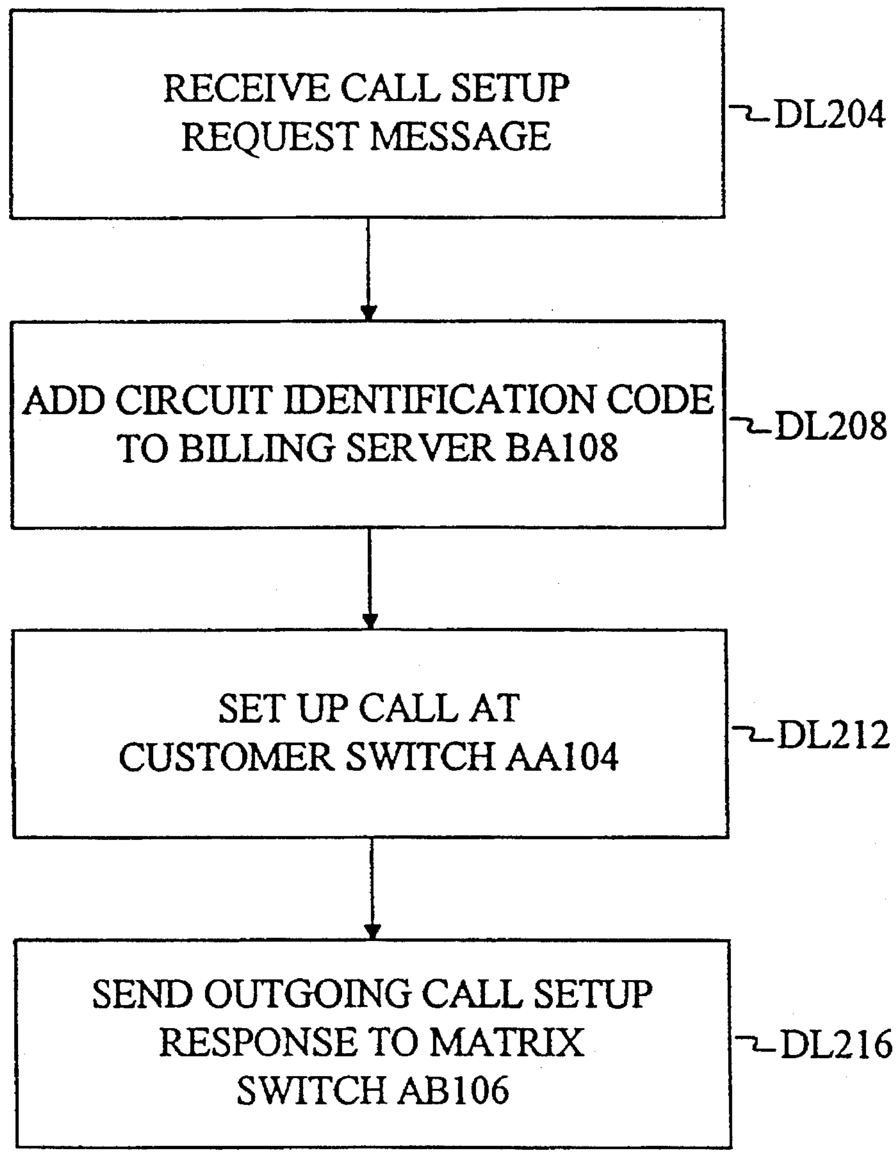
FIG. 47 is an operational flow diagram illustrating what occurs when an operator console originates a call according to one embodiment of the invention.

FIG. 47 is an operational flow diagram illustrating what occurs when an operator console originates a call. When an operator console AB108 originates a call, a command is sent to matrix switch AB106 to route the call. Matrix switch AB106 provides a response to CMP BA102. In one embodiment, this response is translated by host gateway BA110 to a CALL SET UP REQUEST message to CMP BA102. CMP BA102 receives CALL SET UP REQUEST message in a step DL204.

In a step DL208, CMP BA102 sends an add CIC request to BSRVR BA108. This request contains the switch and circuit ID information to be contained in the CIC. In a step DL212, CMP BA102 sets up the call at customer switch AA104. This is accomplished by sending a call set up request via customer gateway BA112. In a step DL216, a call set up response is received from customer switch AA104 via customer gateway BA112. A response is forwarded by CMP BA102 to matrix switch AB106 via host gateway BA110 where required.

2.2.8 Call Completion From an Operator Console

Figure 48:
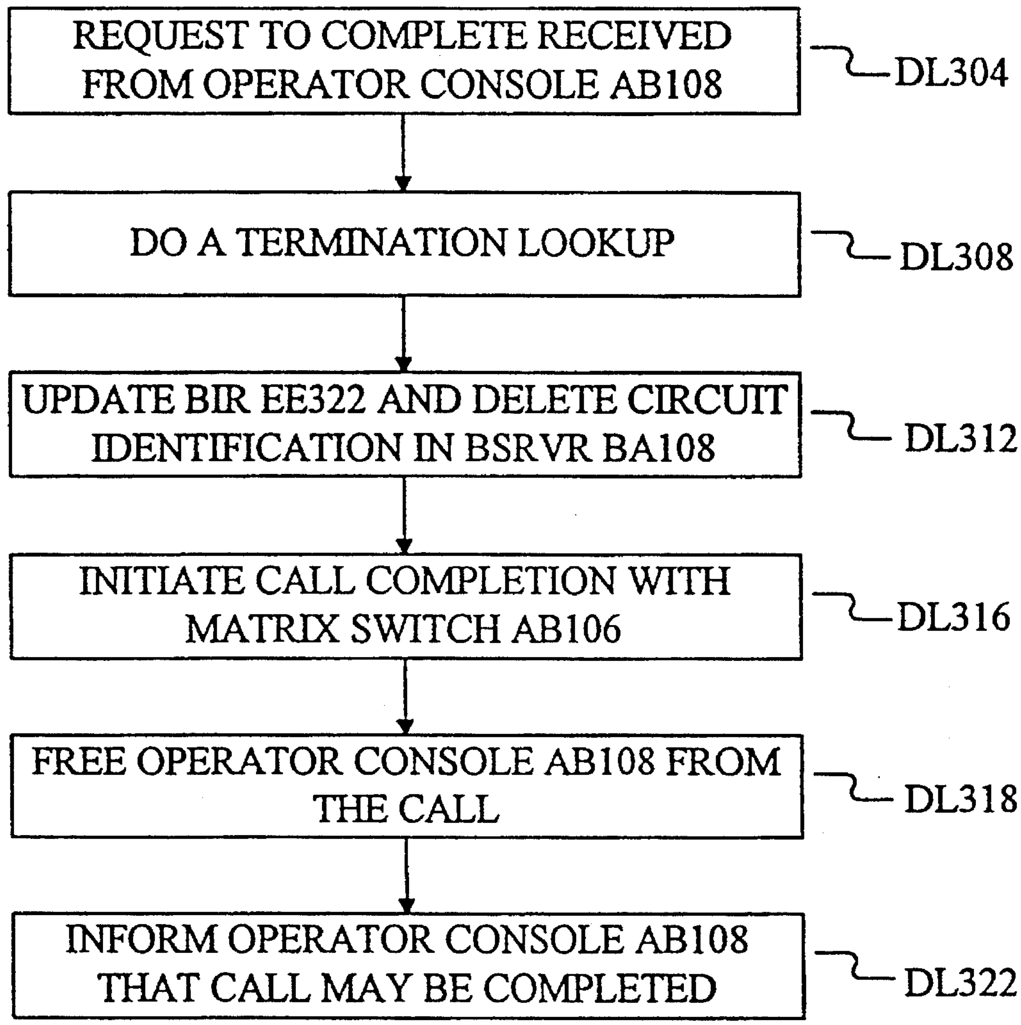
FIG. 48 is an operational flow diagram illustrating the completion of a call from an operator console according to one embodiment of the invention.

The manner in which a call is completed from an operator console AB108 is now described. FIG. 48 is an operational flow diagram illustrating the completion of a call from an operator console AB108. Referring now to FIG. 48, in a step DL304, operator console AB108 sends a request to CMP BA102 that the call be completed through the network. CMP BA102 receives this request from the operator console AB108.

To determine routing for the call, CMP BA102 performs a termination look up. In one embodiment, this is accomplished by sending the request to a termination database via a database server (such as DBS BA104). In this step, optimum routing for the call is determined.

In a step DL312, CMP BA104 sends a request to billing server BA108 to update the BIR EE322 for the call. Additionally, CMP BA102 instructs billing server BA108 to delete the CIC for the call in the console AB108.

In a step DL316, CMP BA102 initiates call completion with matrix switch AB106. In one embodiment, this is accomplished by sending a request to complete the call to matrix switch AB106 via host gateway BA110 where required. Also, in a step DL318, CMP BA102 instructs CRD BA106 to free the operator console AB108 from the call. This allows that operator console AB108 to handle other calls.

In a step DL322, CMP BA102 sends a response to the operator console AB108 indicating that the call can be completed.

2.2.9 Call Transfer From an Operator Console

Figure 49:
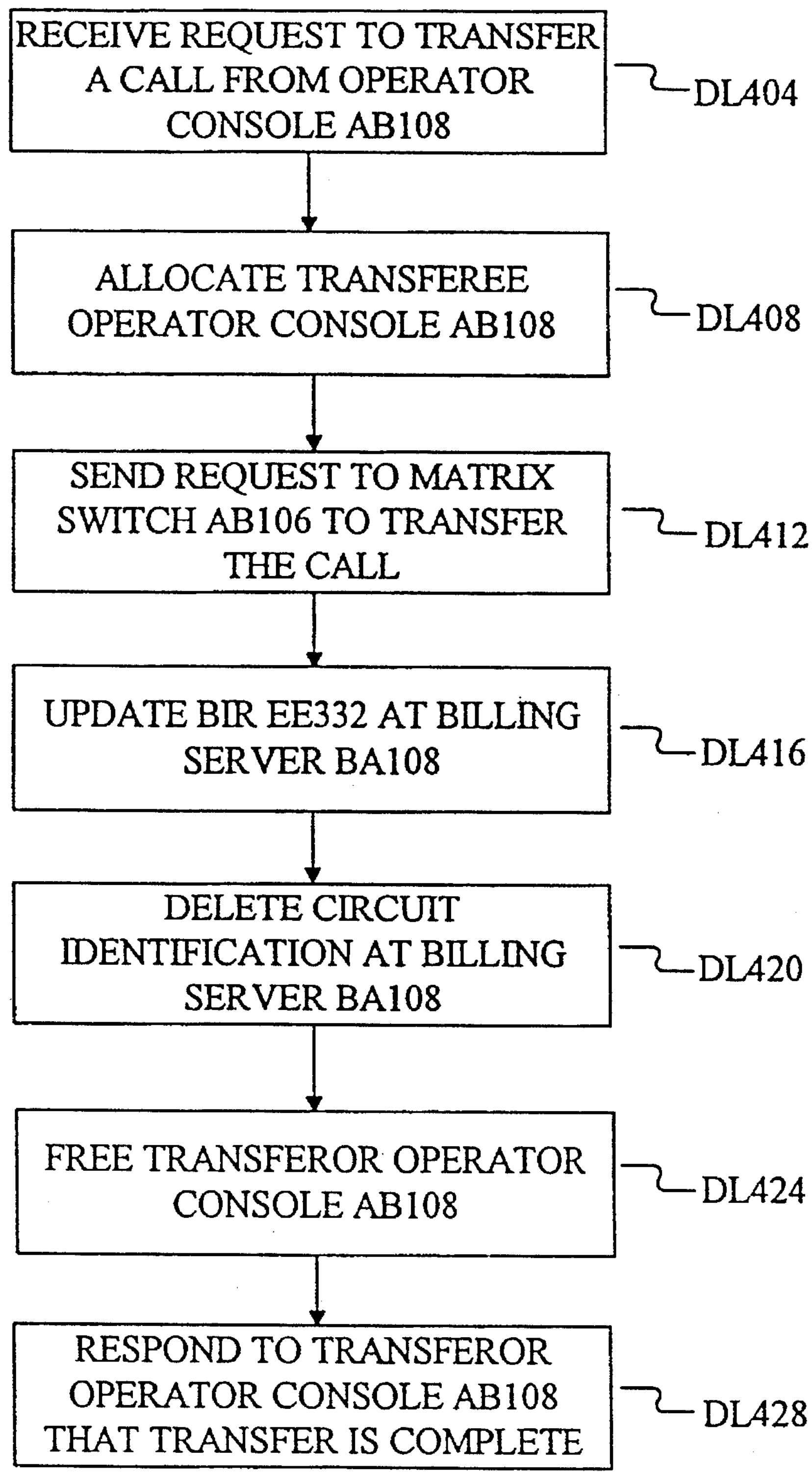
FIG. 49 is an operational flow diagram illustrating a call transfer from an operator console according to one embodiment of the invention.

The manner in which a call is transferred from an operator console AB108 is now described. FIG. 49 is an operational flow diagram illustrating call transfer from an operator AP108. Referring now to FIG. 49, when an operator AB108 transfers a call, it sends a request to CMP BA102. Situations in which a call is transferred could be a transfer from a VRU AB134 to a manual operator console AB132, or a transfer from a manual operator console AB132 to a customer service console AB136. In a step DL404, CMP BA102 receives the request to transfer the call from operator console AB108.

Because the call is being transferred to another operator console AB108, a new operator console AB108 must be allocated. Therefore, in a step DL408, CMP BA102 sends an allocate console message BA310 to CRD BA106. In response, CRD BA106 examines a console usage table BA374 to determine which operator consoles AB108 are available to handle the transferred call. When allocated, in a step DL412, CMP BA102 sends a request to matrix switch AB106 to transfer the call. In one embodiment, this is accomplished by sending a message to host gateway BA110 which in turn sends an FAR message to matrix switch AB106 to transfer the call.

In a step DL416, CMP BA102 updates BIR EE322 in billing server BA108. In a step DL420, CMP BA102 deletes the CIC in billing server BA108 for the circuit to the requesting operator console AB108.

In a step DL424, CMP BA102 sends a message to CRD BA106 to free the operator console AB108 originally allocated to handle the call. In a step DL428, CMP BA104 responds to the requesting console AB108 the transfer is completed.

2.3 Billing Server 2.3.1 Billing Server Introduction

The BSRVR BA108 has five main functions. The first function of BSRVR BA108 is to hold all information on a call currently in progress. This is accomplished by assigning every new call a unique callhandle to identify the call.

The second main function of BSRVR BA108 is to time the connected call while it is in progress.

The third main function of BSRVR BA108 is to inform the Real Time Fraud Detection and Prevention System (AG112) the time at which a call is started and the time at which retail timing is stopped. The real time fraud detection and prevention system (AG112) is also periodically updated on calls which last an unusually long time.

The fourth main function of BSRVR BA108 is to keep track of the call duration for all usage cap type calls, such as debit card calls, which are currently being timed for retail billing. When a warning period or maximum time is reached, CMP BA102 is notified.

The fifth main function of BSRVR BA108 is to transfer a BIR (EE322) of the completed call to the Billing System AG108.

Measures can be implemented to insure that no loss of data occurs. These measures include multiple Billing Servers and locally kept BIR files for redundancy.

Figure 50:
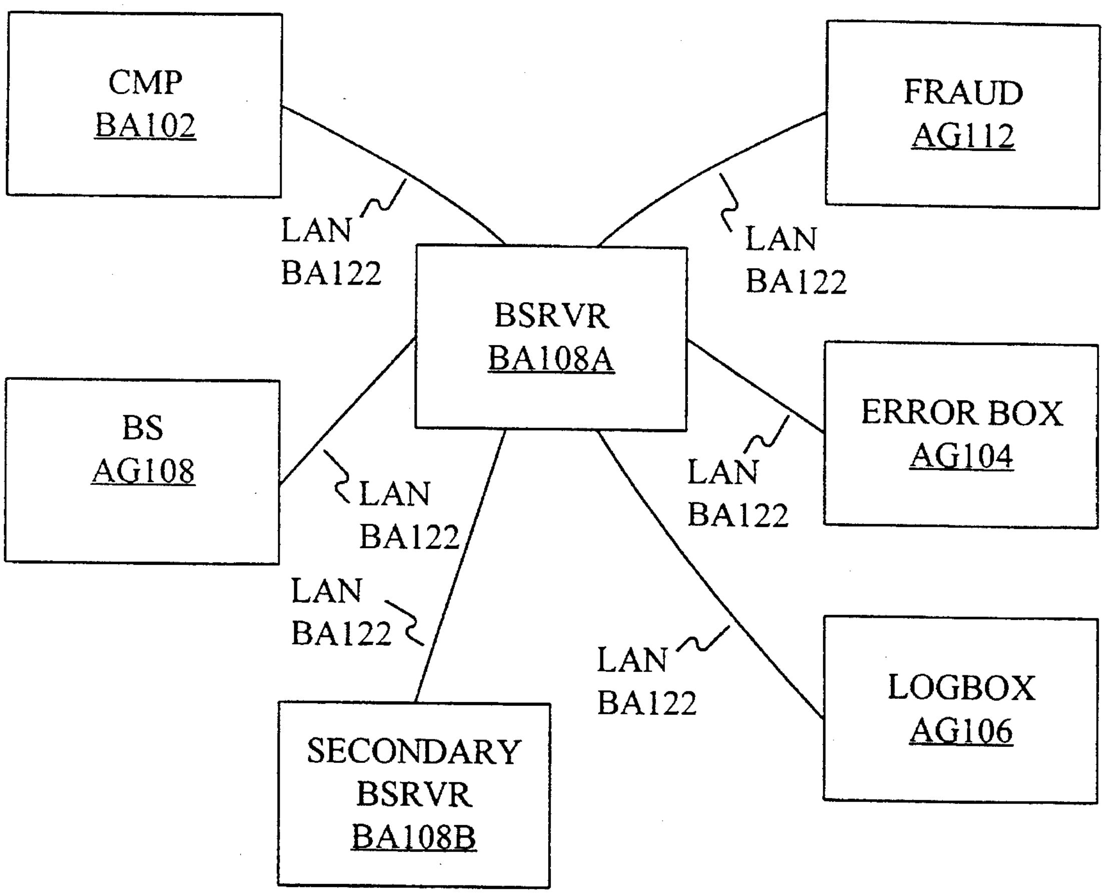
FIG. 50 is a block diagram illustrating the components that communicate with one another during billing server operations.

BSRVR BA108 is now described with reference to the components with which it interfaces. FIG. 50 is a block diagram illustrating the components that communicate with one another in normal operation of BSRVR BA108.

Referring now to FIG. 50, A secondary BSRVR BA108B is provided as a backup to a primary BSRVR BA108A. This provides redundancy. In one embodiment, the result of every message sent to primary BSRVR BA108A is mirrored in secondary BSRVR BA108B. Additionally, the result of message traffic internal to primary BSRVR BA108A, and all writes to files and tables internal to primary BSRVR BA108A are mirrored in secondary BSRVR BA108B.

Figure 52:
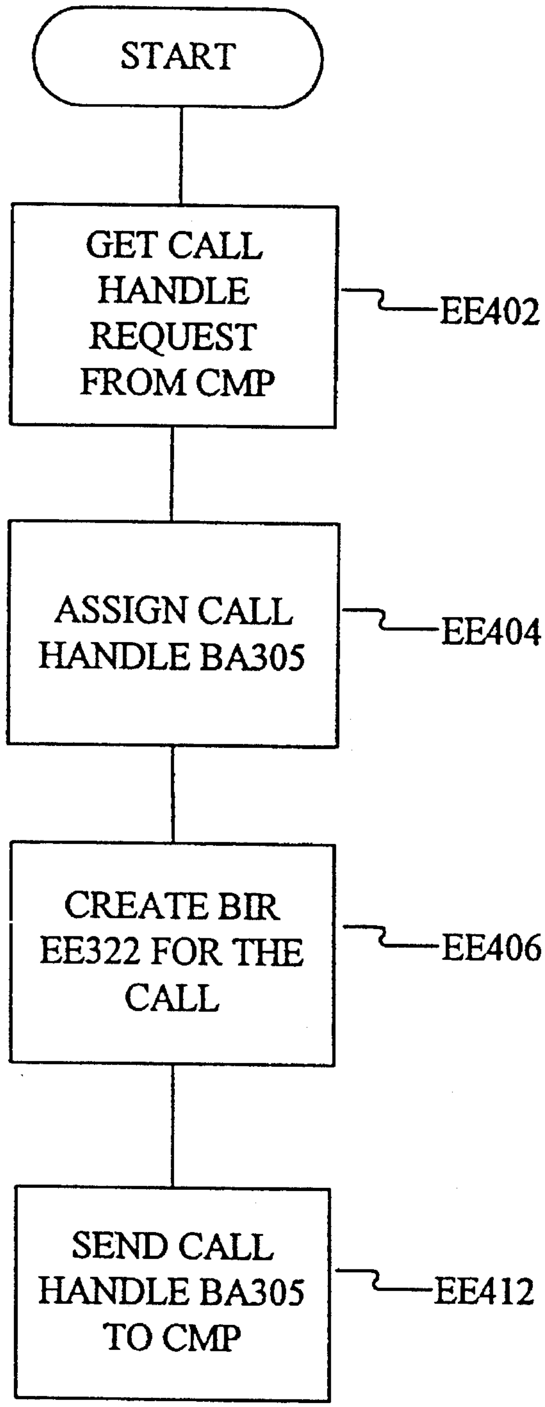
FIG. 52 is an operational flow diagram illustrating the process followed by the billing server when a call is received by the call processing system according to one embodiment of the invention.

A high-level operational concept of BSRVR BA108 is now described. FIG. 51 is a data flow diagram illustrating messages sent during BSRVR BA108 operations. FIG. 52 is an operational flow diagram illustrating the process followed by BSRVR BA108 when a call is received by call processing system AB102. Referring now to FIGS. 51 and 52, in a step EE402, BSRVR BA108 receives a callhandle request message BA304 from CMP BA102.

In a step EE404, BSRVR BA108 assigns a callhandle BA305 to the call. In one embodiment, this is accomplished by incrementing the last call ID by one and ORing (Boolean) this value with the value of an NCPID EG126 and the BSRVRID EG124 (illustrated in FIG. 55).

In a step EE406, BSRVR BA108 creates a BIR EE322 for the call. BIR EE322 is used to facilitate the real-time rating service and real-time billing service discussed in their two respective sections of this document.

In a step EE412, BSRVR BA108 sends callhandle BA305 to CMP BA102.

2.3.2 Billing Server Architecture

A representative architecture of BSRVR BA108 will now be presented and described. It should be noted that this architecture is presented by way of example only and is not intended to limit BSRVR BA108 to this embodiment. Numerous alternative architectures could be chosen to implement BSRVR BA108.

Figure 53:
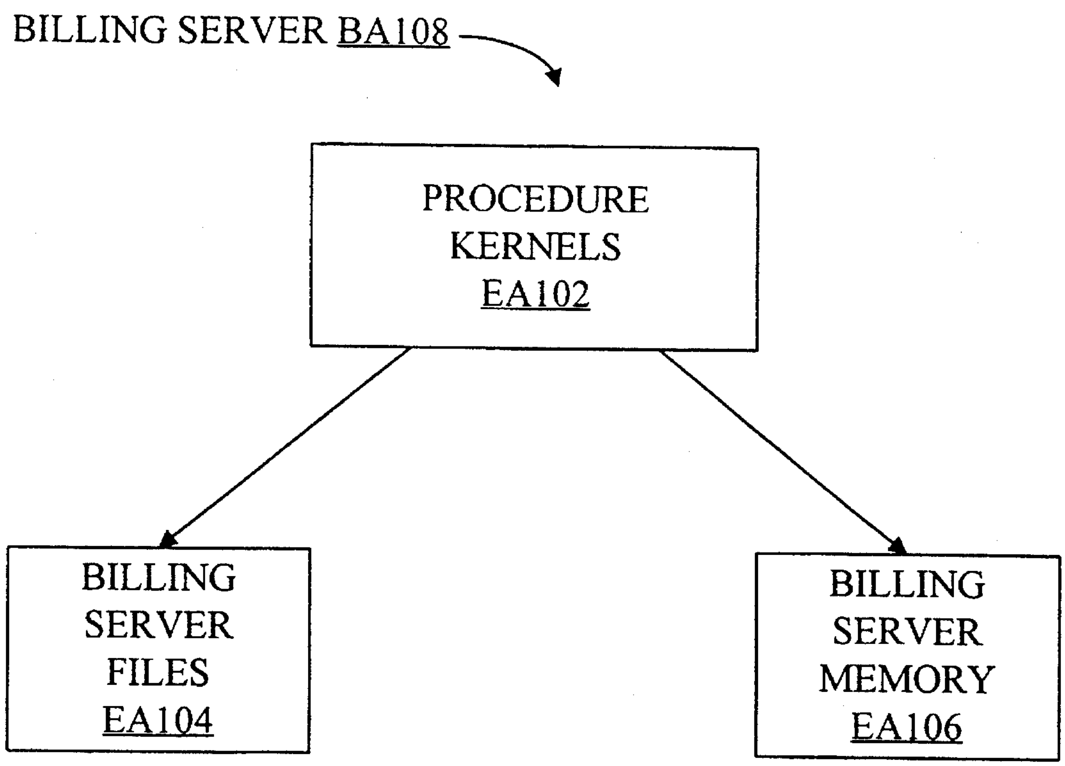
FIG. 53 is a block diagram illustrating the three major components of the billing server according to one embodiment of the invention.
Figure 54:
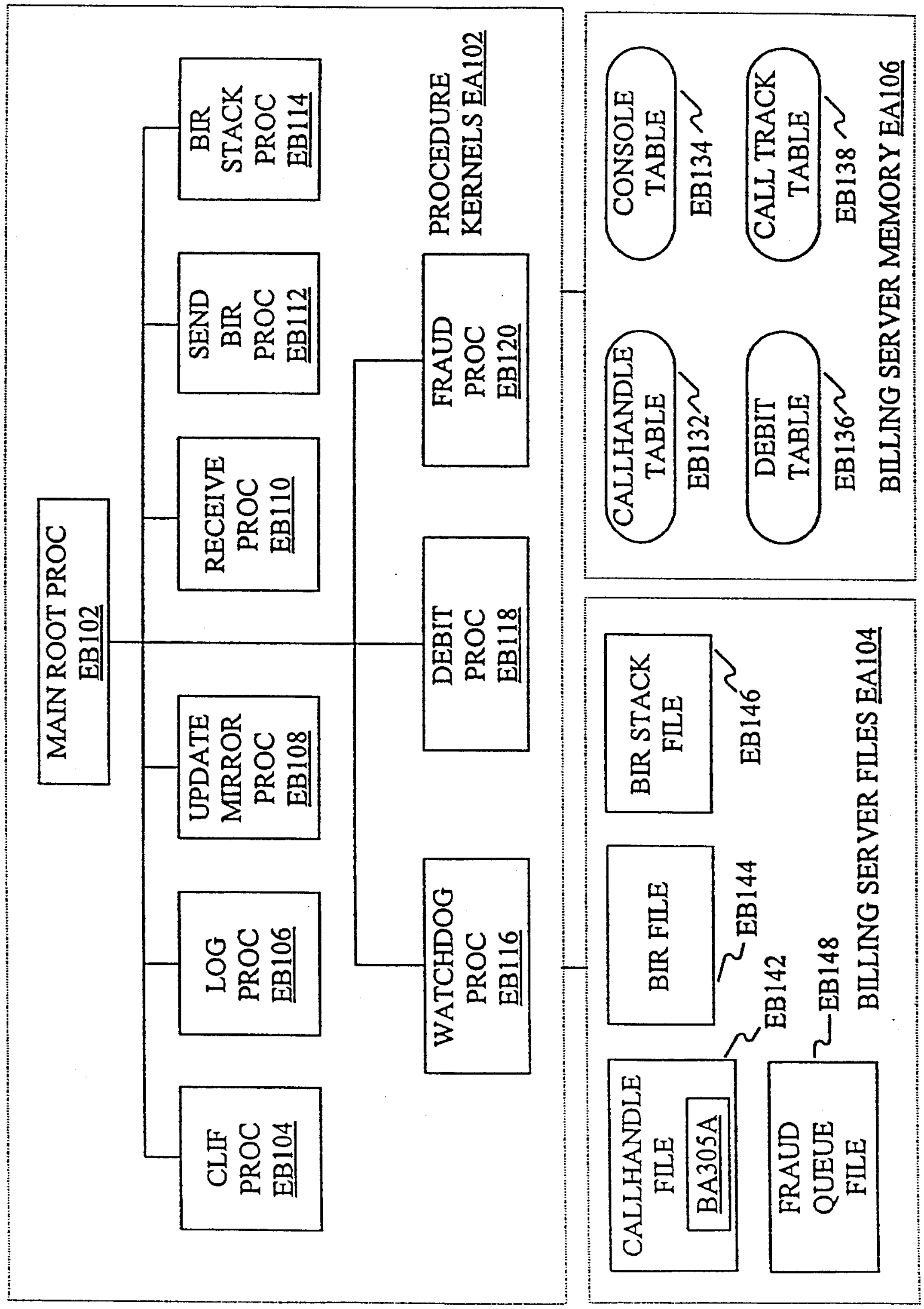
FIG. 54 is a block diagram illustrating the architecture of the billing server according to one embodiment of the invention.

FIG. 53 is a block diagram illustrating the three major components of BSRVR BA108 according to one embodiment. FIG. 54 is a block diagram illustrating the billing architecture of BSRVR BA108 in one embodiment. Referring now to FIGS. 53 and 54, BSRVR BA108 comprises three main components. These are procedure kernels EA102, BSRVR files EA104, and BSRVR memory EA106.

In one embodiment there are ten procedure kernels EA102, four billing server files EA104, and four billing server memories EA106, as illustrated in FIG. 54.

2.3.2.1 Billing Server Files

Turning now to FIG. 54, billing server files EA104 are now briefly described.

2.3.2.1.1 Callhandle File

Callhandle file EB142 is used to store a single instance of the most recently assigned callhandle BA305. Callhandle file EB142 is maintained so that each BSRVR BA108 can assign a unique callhandle BA305 to each call. To guarantee that callhandles assigned are unique, the most recently assigned callhandle BA305 is maintained in callhandle file EB142. Callhandle file EB142 is updated when each new callhandle BA305 is assigned and when BSRVR BA108 is shut down. Upon restart of BSRVR BA108, the most recently assigned callhandle BA305 is read from callhandle file EB142.

Figure 55:
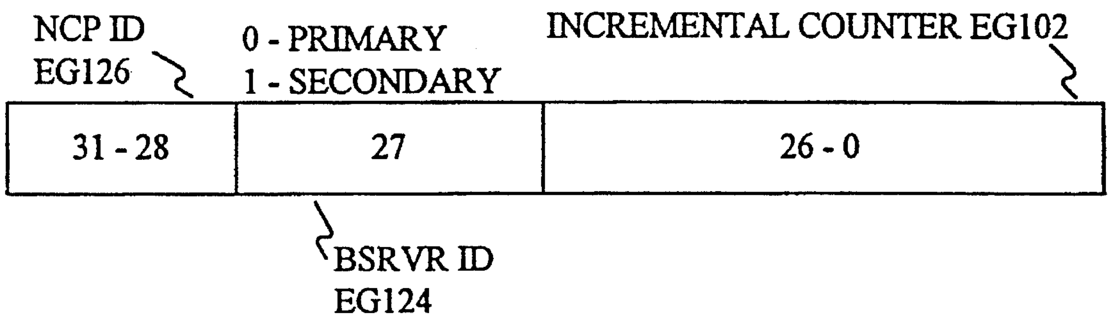
FIG. 55 illustrates the structure of a callhandle according to one embodiment of the invention.

Callhandle BA305 is a unique data tag given to every new call that is started. No two calls ever have the same callhandle BA305. In one embodiment, callhandle BA305 is 32-bits in length. FIG. 55 illustrates the structure of callhandle BA305 in this embodiment. Referring now to FIG. 55, callhandle BA305 comprises three fields. A first field is a 27-bit incremental counter EG102 that is used to uniquely identify callhandle BA305. For each new callhandle BA305 assigned, incremental counter EG102 is incremented by one. In this manner, each callhandle BA305 assigned is unique.

One bit of callhandle BA305 is designated as a billing server ID EG124. Billing server ID EG124 indicates which BSRVR BA108 (for example, primary BSRVR BA108A or redundant BSRVR BA108B) assigned this particular callhandle BA305 to the call.

An NCP ID field EG126 is used to identify the NCP AB102 that assigned the callhandle BA305. Thus in call processing systems implemented with multiple NCPs AB102, the origination of each callhandle BA305 can be traced to a single NCP AB102.

2.3.2.1.2 BIR File

The purpose of BIR file EB144 is to act as a buffer for all BIRs EE322 sent to billing system AG108.

Figure 56:
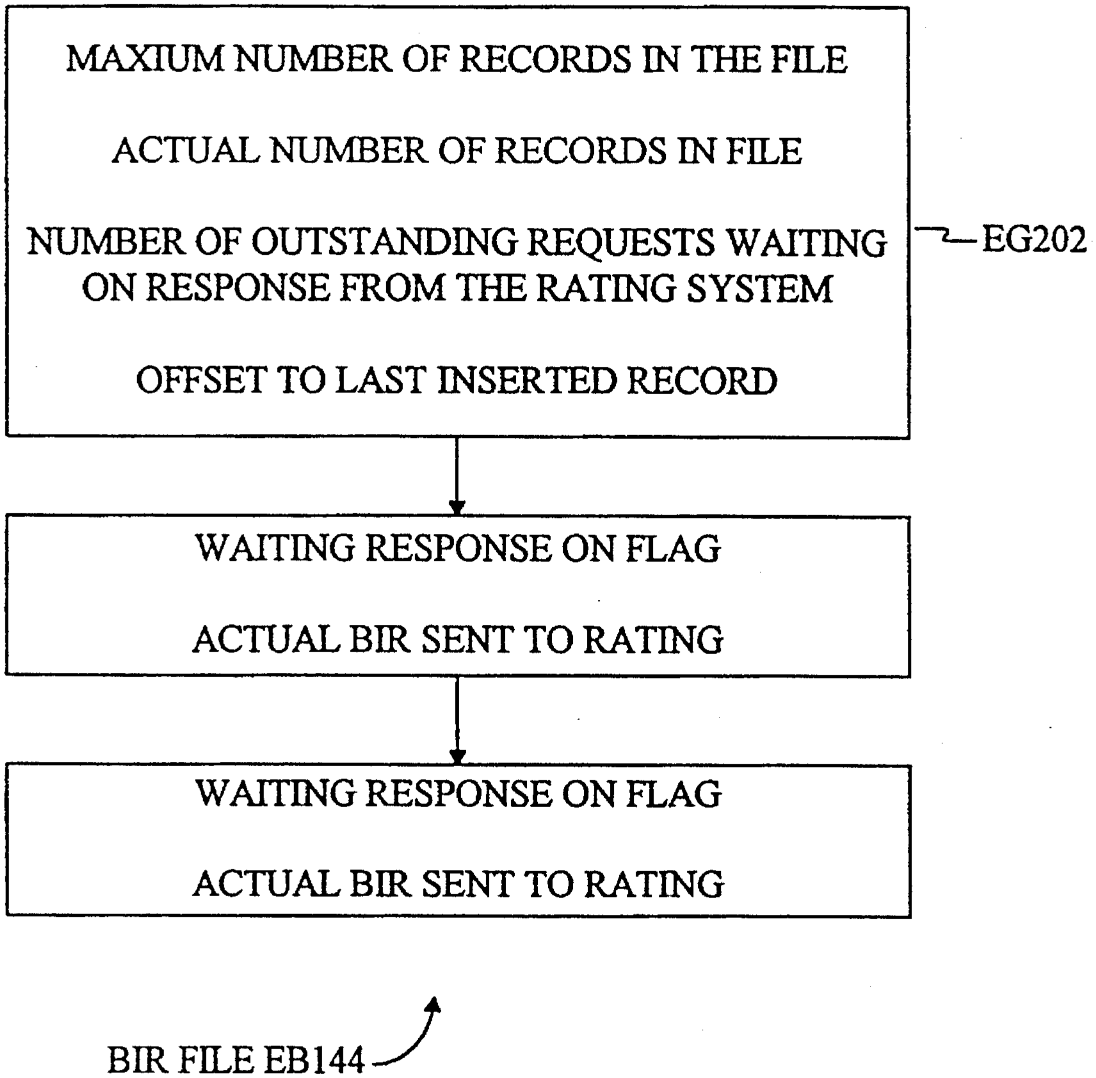
FIG. 56 is a diagram illustrating the structure of a billing information record according to one embodiment of the invention.
Figure 57:
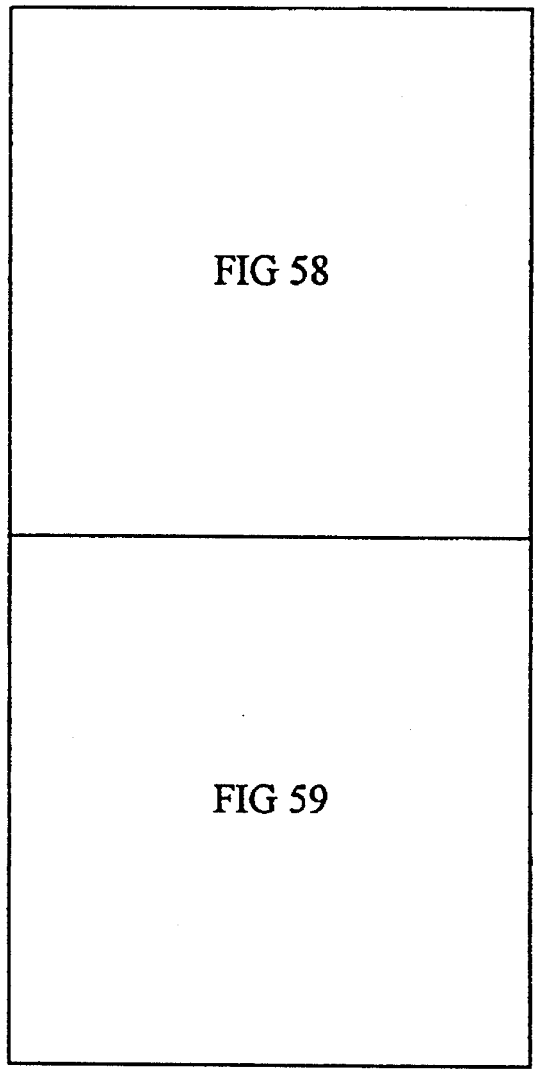
FIG. 57, which comprises

A representative structure of BIR file EB144 in one embodiment is now described. FIG. 56 is a diagram illustrating the structure of BIR file EB144 in one embodiment.

Turning now to FIG. 56, the first record of the BIR File EB144 contains a header EG202 containing information such as how many records can be kept in BIR file EB144, current number in the file, the position to last one inserted, and the number of records currently waiting for responses from billing system AC108. BIR File EB144 is a circular file and older BIRs are eventually overwritten by new BIRs.

When the Billing Server is started, the BIR File is scanned and all records that are marked waiting for responses are copied into the BIR Stack file for retry to billing system AG108. This is to insure that all BIRs will be rated and the call billed.

2.3.2.1.3 BIR Stack File

BIR stack file EB146 is a temporary storage location for all BIRs EE322 that were unsuccessfully sent to billing system AG108.

2.3.2.1.4 Fraud Queue File

Fraud queue file EB148 temporarily holds all fraud requests when they are unsuccessfully sent to fraud detection and prevention system (AG112).

2.3.2.2 Procedures

The important procedures EA102 of BSRVR BA108 are now described.

2.3.2.2.1 Main Root Procedure Kernel

Figure 58:
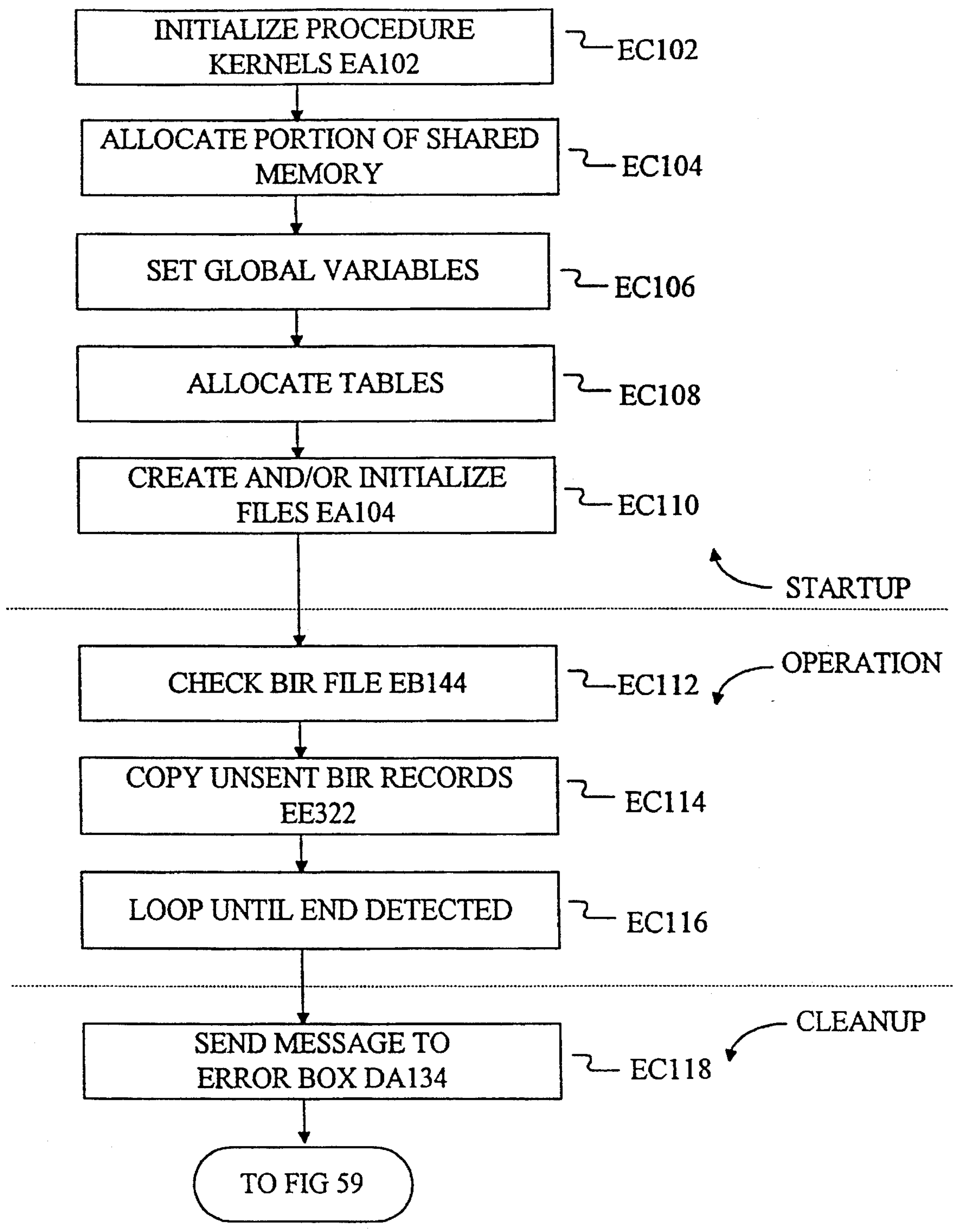
FIGS. 58 and 59, is an operational flow diagram illustrating the steps followed by a main root procedure kernel during start-up, operation and cleanup of the billing server according to one embodiment of the invention.
Figure 59:
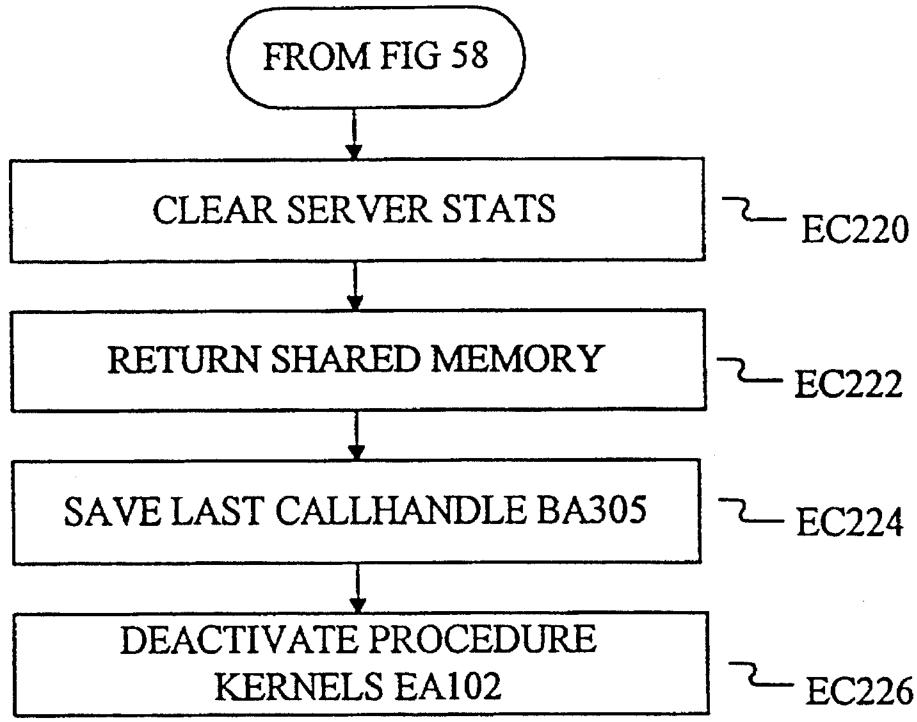

Main root procedure kernel EB102 is responsible for starting BSRVR BA108. The operation followed by main root procedure kernel EB102 is now described. FIG. 58 is an operational flow diagram illustrating the steps followed by main root procedure kernel EB102 during start-up, operation and cleanup of BSRVR BA108.

Referring now to FIGS. 54 and 58, in a step EC102, main root procedure kernel EB102 initializes the remaining procedure kernels EA102. The procedure kernels EA102 initialized are a client interface (CLIF) procedure kernel EB104, a log procedure kernel EB106, an update mirror procedure kernel EB108, a Receive Procedure kernel EB110, a send BIR procedure kernel EB112, a BIR stack procedure kernel EB114, a watchdog procedure kernel EB116, a debit procedure kernel EB118, and a fraud procedure kernel EB120.

In a step EC104, main root procedure kernel EA102 allocates a portion of shared memory (reference number) for itself as billing server memory EA106. In this step, main root procedure kernel EB102 also initializes BSRVR BA108 call stats. In one embodiment, call statistics are initialized to zero. Several call statistics are kept in shared memory. These can include the total number of BIRs EE322 successfully sent to billing system AG108, the current number of BIRs EE322 in BIR stack file EB106, the total number of reoriginations, and the number of calls currently being timed.

In a step EC106, main root procedure kernel EB102 sets global time variables to show the current time zone and any offset from Greenwich Mean Time (GMT).

In a step EC108, main root procedure kernel EB102 creates and initializes the needed tables in billing server memory EA106. These tables include a callhandle table EB132, a console table EB134, a debit table EB136, and a call track table EB138.

In a step EC110, main root procedure kernel EB102 creates and/or initializes billing server files EA104. These files include a callhandle file EB142, a BIR file EB144, a BIR stack file EB146, and a fraud queue file EB148.

The above-described steps EB102 through EC110 are the steps that main root procedure kernel EB102 follows in creating BSRVR BA108. In operation, main root procedure kernel EB102 checks BIR file EB144 for any records to which there has not been a response. This occurs in a step EC112. If any BIR records EE322 have not been responded to, these BIR records are copied to BIR stack file EB146 for later transmission to billing system AG108. This occurs in a step EC114.

In a step EC116, main root procedure kernel EB102 continues until a request to end the program is received from a user or from the system. The most important function during this looping is to check a message queue in the procedure kernel. If a message is in message queue, it is passed to the appropriate procedure kernel for processing.

When a request to end the program is detected, main root procedure kernel EB102 is responsible for cleanup operations. These are illustrated in steps EC118 through EC226. In a step EC118, main root procedure kernel EB102 posts a message to error box AG104 indicating the reason the application was terminated. In a step EC220, main root procedure kernel EB102 clears a server slat memory. Server slat memory is shared system memory which can be accessed by both BSRVR BA108 and server monitor FA212 and used to communicate process status (illustrated in FIG. 69).

In a step EC222, main root procedure kernel EB102 returns shared memory to call processing system AB102 for use by other processes.

In a step EC224, main root procedure kernel EB102 saves the most recent callhandle BA305 to callhandle file EB142. This is done so that when BSRVR BA108 is restarted, assignment of a unique callhandle BA305 to an incoming call can be performed in sequence from where the last assignment was made.

In a step EC226, procedure kernels EA102 are deactivated.

2.3.2.2.2 Client Interface (CLIF) Procedure

CLIF procedure EB104 is created by main root procedure kernel EB102. When created, CLIF procedure EB104 searches for a configuration file SA404 (illustrated on FIG. 137). If this configuration is not found, BSRVR BA108 logs an error to error box AG104 and exits. Otherwise, CLIF procedure EB104 runs in the background. CLIF EB104 enables other procedure kernels EA102 to send requests over LAN BA122 and receive responses from LAN BA122. CLIF procedure EB104 is described in more detail in the Client Interface Section of this document. CLIF procedure EB104 is not necessarily unique to BSRVR BA108.

Log procedure EB106 sends a login message to log box AG106. This occurs when log procedure EB106 is created.

Also at initialization, log procedure EB106 registers with CLIF procedure EB104 to receive a billing server terminate message.

When log procedure EB106 receives terminate message, a logout request is sent to log box AG106 on LAN BA122.

The login message contains the time at which the application was started, the name of the application, and the version number. The logout message contains the time at which the application was terminated, the name of the application, and the version number.

2.3.2.2.3 Update Mirror Procedure

Update mirror procedure EB108 is used to help keep both primary billing server EB108 and secondary billing server EB108 redundancy information and statuses identical. Upon initialization, update mirror procedure EB108 registers with CLIF procedure EB104 to receive a PUT message ED128, a mirror message, and a UP message.

UP message indicates to update mirror procedure EB108 that the redundant BSRVR BA108B is running and requesting all current call status information. When update mirror procedure EB108 receives UP message, it searches callhandle table EB132. For every current status found in callhandle table EB132, update mirror procedure EB108 sends a PUT message to redundant BSRVR BA108B to update mirror procedure EB108 in the redundant BSRVR BA108B. This action ensures that data in both BSRVRs BA108A and BA108B are redundant.

When update mirror procedure EB108 of redundant BSRVR BA108B receives PUT message, it searches callhandle table EB132 of redundant BSRVR BA108B to see if the status information is there. If the status information is there, it is updated. If the status information is not in callhandle table EB132, it is added.

During normal operations, the mirror message is sent from primary BSRVR BA108A to redundant BSRVR BA108B. Mirror message causes redundant BSRVR BA108B to perform the same updates to billing server files EA104 and billing server memory EA106 as is performed by primary BSRVR BA108A. This ensures that redundant BSRVR BA108B is completely redundant with primary BSRVR BA108A during normal operations.

2.3.2.2.4 Receive Procedure

Figure 60:
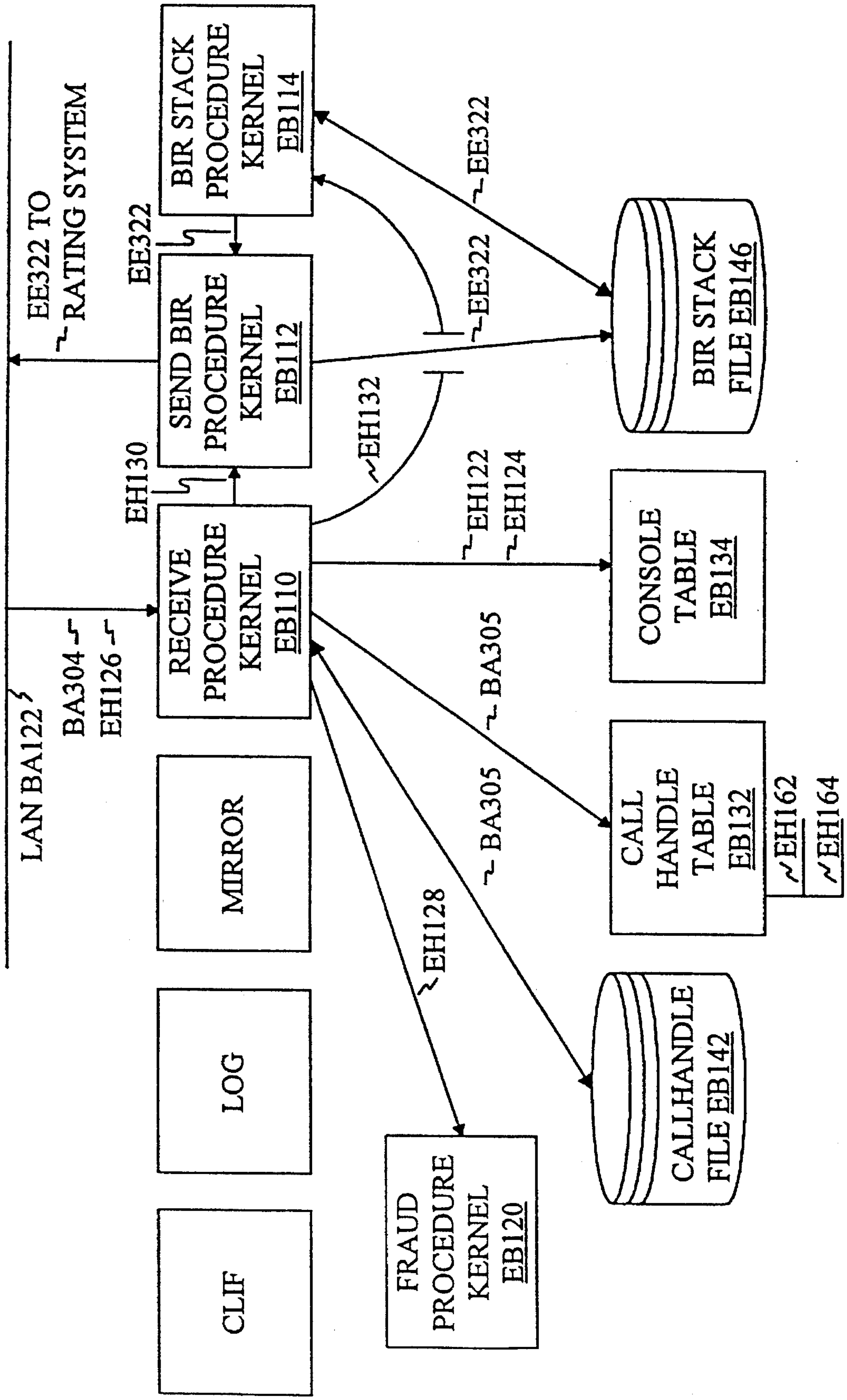
FIG. 60 is a data flow diagram illustrating data flow between a receive procedure kernel, the other procedure kernels, billing server files, and billing server memory of the billing server according to one embodiment of the invention.

Receive Procedure EB110 receives all messages coming from CMP BA102. The manner in which Receive Procedure EB110 operates will now be described. FIG. 60 is a data flow diagram illustrating data flow between Receive Procedure EB110, procedure kernels EA102, billing server files EA104, and billing server memory EA106.

Figure 61:
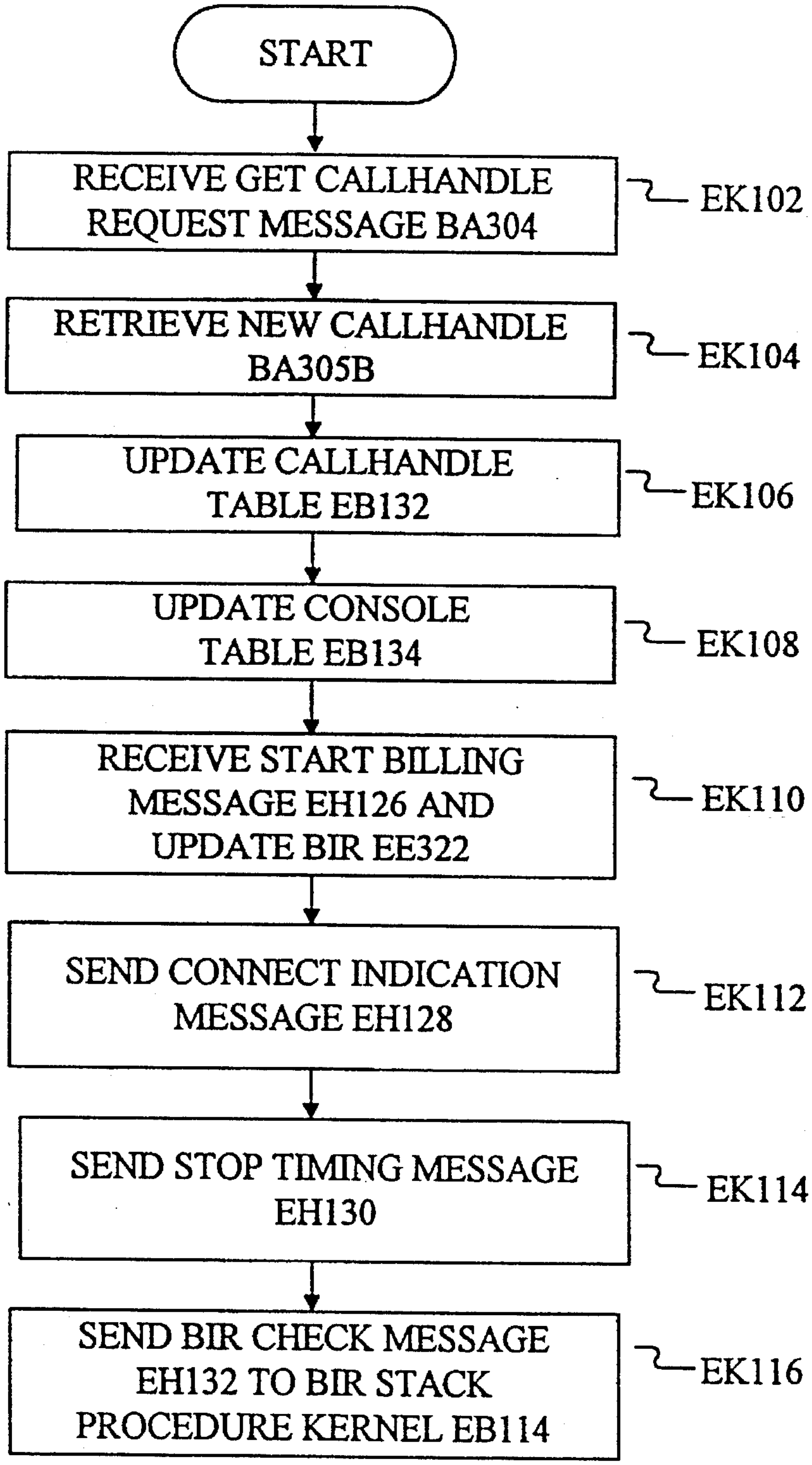
FIG. 61 is an operational flow diagram illustrating the manner in which a receive process responds to a get callhandle request message from the central message processor according to one embodiment of the invention.

Referring now to FIGS. 60, 54, and 14, the operation of Receive Procedure EB110 will now be described. This description is provided in terms of an example. This is an example of the operations performed when BSRVR BA108 receives a GET CALLHANDLE REQUEST MESSAGE BA304 from CMP BA102. FIG. 61 is an operational flow diagram illustrating the manner in which a receive process responds to a GET CALLHANDLE REQUEST MESSAGE BA304 from CMP BA102.

In a step EK102, BSRVR BA108 receives GET CALLHANDLE REQUEST MESSAGE BA304 from CMP BA102. More specifically, Receive Procedure EB110 receives GET CALLHANDLE REQUEST MESSAGE BA304. As described above, GET CALLHANDLE REQUEST MESSAGE BA304 is a request from CMP BA102 to assign a new callhandle BA305 to a new call.

In a step EK104, Receive Procedure EB110 accesses callhandle file EB142 to build a new callhandle BA305.

In a step EK106, Receive Procedure EB110 updates callhandle memory EB132 with the latest callhandle BA305 retrieved. Request messages received by BSRVR BA108 may include a callhandle BA305 referencing the call for which the request is made. To enable handling a high number of messages and to provide speed when looking up call information using a callhandle BA305, callhandle table EB132 is utilized.

Callhandle table EB132 is a table that stores callhandles BA305 for each call. Callhandle BA305 stored in callhandle table EB132 is a pointer to a storage location for information about the call. Callhandle BA305 is stored in callhandle table EB132 as illustrated in FIG. 54. Each callhandle BA305 points to storage locations for call information, the BIR EE322 of the call, the call circuits, and a device array for the call. When it is desired to find such information for a call, the callhandle BA305 for that call is found in callhandle table EB132. When a request for call information is made, the callhandle BA305 for that call is found in callhandle table EB132. When the callhandle BA305 for the call is found, the pointer to the call data (for example, the pointer to the BIR EE322 for that call) is found and returned.

In a step EK108, Receive Procedure EB110 updates console table EB134 with a CONSOLE UPDATE MESSAGE EH122. Console table EB134 stores call status information indexed by console number versus callhandle BA305. Because valid console number ranges are known, simple variable arrays can be used. When a console number EH124 is received, it is entered into console table EB134. Console table EB134 can be updated every time a MODIFY BIR MESSAGE DG102 is received from CMP BA102. This occurs when a call is routed to an operator console AB108.

Figure 62:
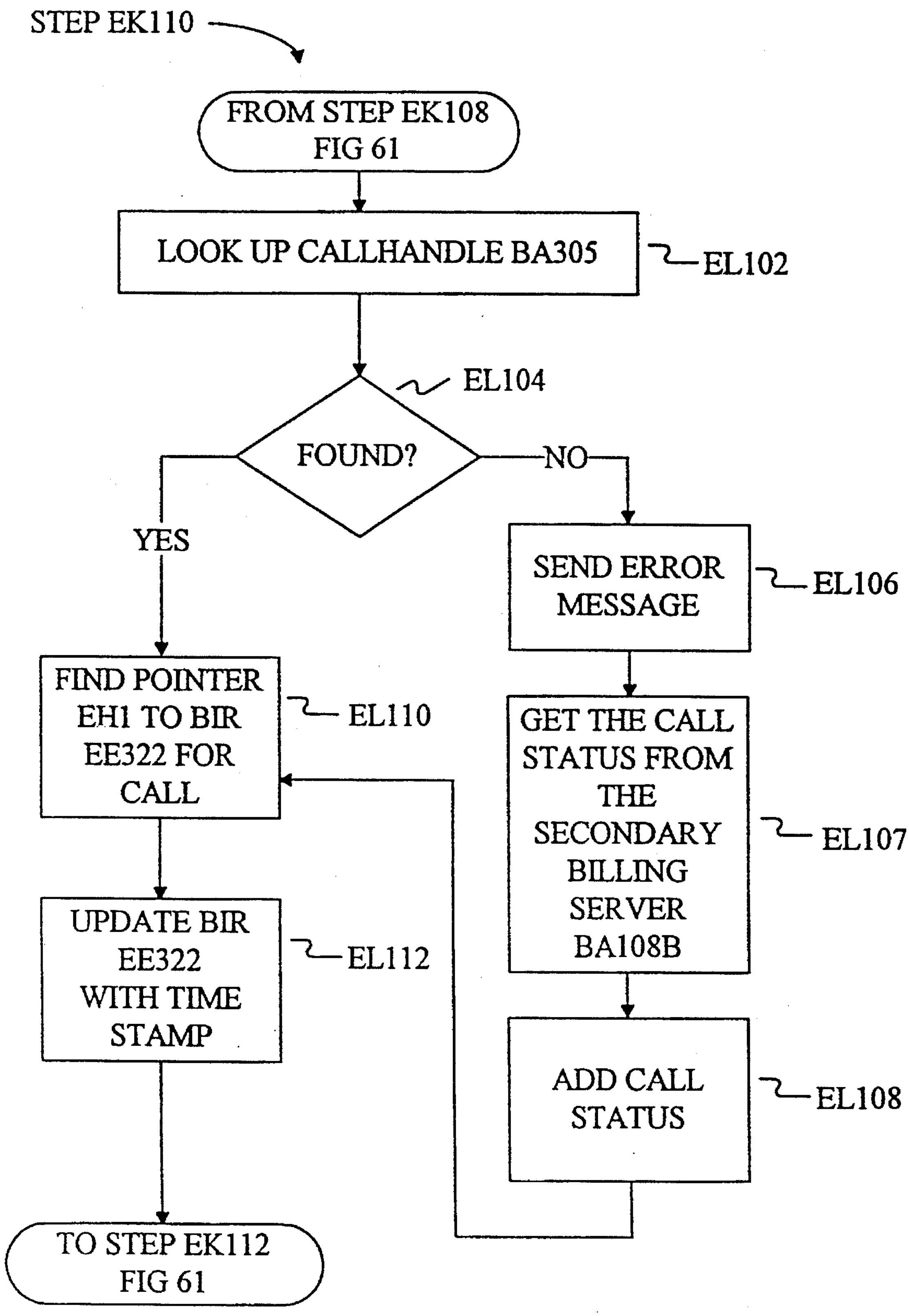
FIG. 62 is an operational flow diagram illustrating what occurs when the receive procedure kernel receives a start billing message in step EK110 of FIG. 61.

When a call is routed to the terminating user AA106, a START BILLING MESSAGE EH126 is sent from CMP BA102 to BSRVR BA108. In a step EK110, Receive Procedure EB110 receives START BILLING MESSAGE EH126. START BILLING MESSAGE EH126 contains the callhandle BA305 of the call to be timed. FIG. 62 is an operational flow diagram illustrating what occurs when Receive Procedure receives START BILLING MESSAGE EH126 in step EK110 of FIG. 61. Referring now to FIG. 62, in a step EL102, callhandle BA305 for the call is looked up in callhandle table EB132. If callhandle BA305 is not found (decision block EL104), an error message is sent to error box AG104 indicating that callhandle BA305 does not exist for the call. This occurs in a step EL106. The partner (secondary billing server BA 108B) is then asked if it has the call status related to the callhandle BA305 in question. If so, the information is passed back to the primary BSRVR BA108A. This occurs in a step EL107.

In a step EL108, a call status is added. A call status is a structure containing the BIR EE322 as an element along with other call information such as current console number, number of circuits being used, device types, and circuits being used. When a BIR EE322 is allocated for a call, a call status (i.e., a circuit identification code) is also allocated.

If, on the other hand, callhandle BA305 is found for the call (decision block EL104), a BIR pointer EH162 corresponding to the callhandle BA305 for the call, is read to indicate which BIR (EE322) belongs to the call. This occurs in a step EL110.

In a step EL112, BIR EE322 for the call is time-stamped. The time stamp signifies when a call has been connected and billing of user AA106 is to begin.

Referring again to FIG. 61, in a step EK112, Receive Procedure EB110 sends a START-OF-CALL MESSAGE (illustrated in FIG. 175) to the fraud detection and prevention system AG112. The purpose of START-OF-CALL MESSAGE is fully discussed in the Fraud System Section of this document.

When the call is finished (when one of users AA106 hangs up), Receive Procedure Kernel receives a STOP TIMING MESSAGE EH130 which initiates the send BIR procedure kernel EB112 to send the BIR EE322 associated with the call. The Receive Procedure Kernel sends a STOP CALL MESSAGE EH128 to the fraud system with the response being handled by the fraud procedure.

Figure 63:
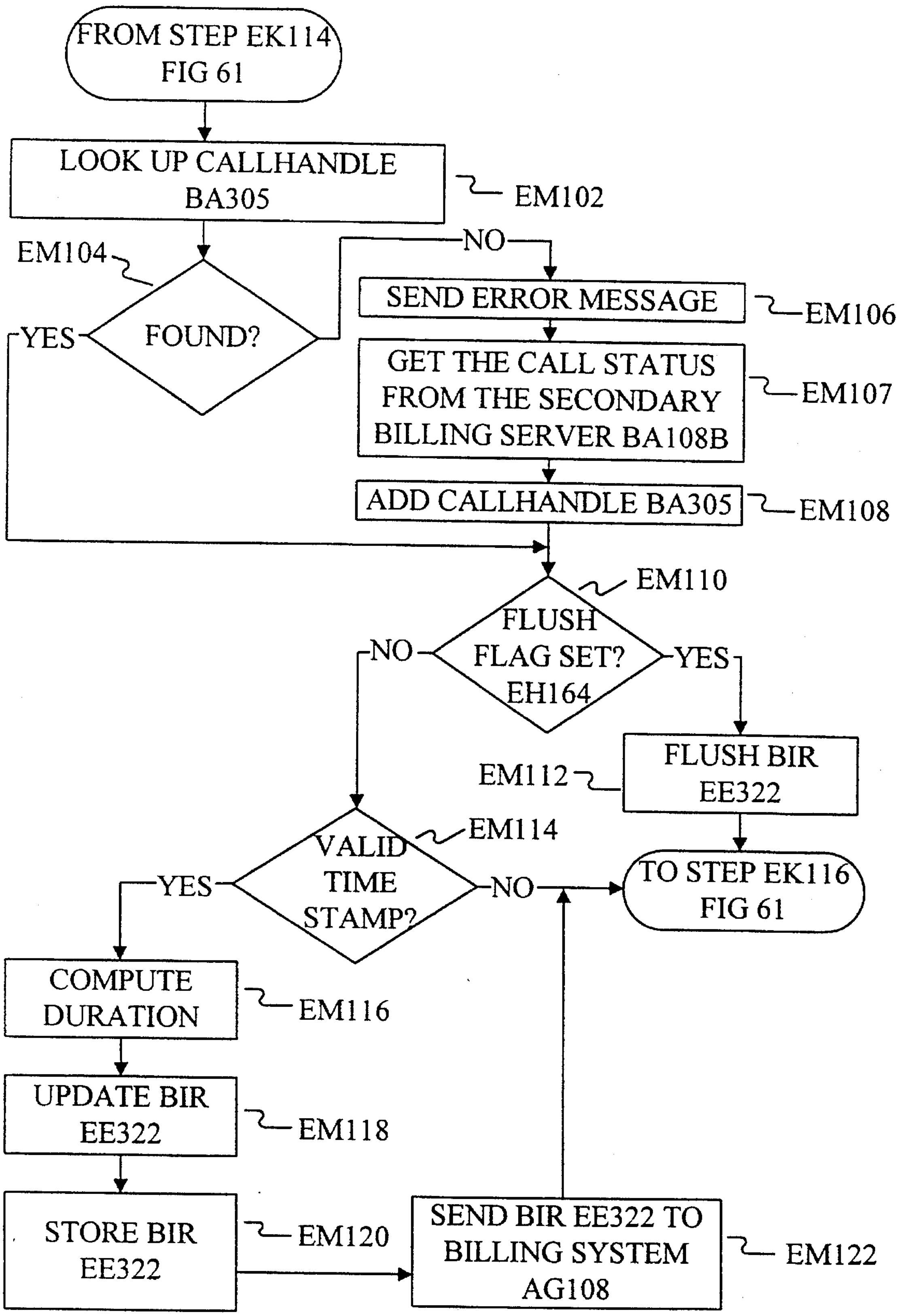
FIG. 63 is an operational flow diagram illustrating the process that occurs when a send BIR procedure kernel receives the stop timing message sent in step EK114 of FIG. 61.

The process followed by send BIR Procedure Kernel EB112 will now be described. FIG. 63 is an operational flow diagram illustrating the process that occurs when send BIR Procedure Kernel EB112 receives stop timing message EH130 sent in step EK114 of FIG. 61. Referring now to FIG. 63, in a step EM102, callhandle BA305 for the call is looked up in callhandle table EB132.

If callhandle BA305 is found (decision block EM104), the operation continues at step EM110. If, on the other hand, callhandle BA305 is not found for the call (decision block EM104), send BIR procedure kernel EB112 sends an error message to error box AG104. This occurs in a step EM106. Once the error message is dispatched, a request is made to the secondary BSRVR BA108 for all the information it has passed regarding the callhandle BA305. This occurs in a step EM107. In a step EM108, if callhandle BA305 is not found for the call, a callhandle BA305 is added in a step EM108.

In a step EM110, send BIR procedure kernel EB112 determines whether a flush flag EH164 is set. If flush flag EH164 is set, in a step EM112, BIR EE322 is flushed.

If flush flag EH164 is not set, send BIR procedure kernel EB112 next checks in a step EM114 for a valid time stamp. If the time stamp is valid, a duration for the call is computed in a step EM116. In a step EM118, BIR EE322 is updated to reflect the duration of the call as computed in step EM116.

In a step EM120, the updated BIR EE322 is stored in a BIR file EB146.

In a step EM122, BIR EE322 is sent to billing system AG108.

Figure 64:
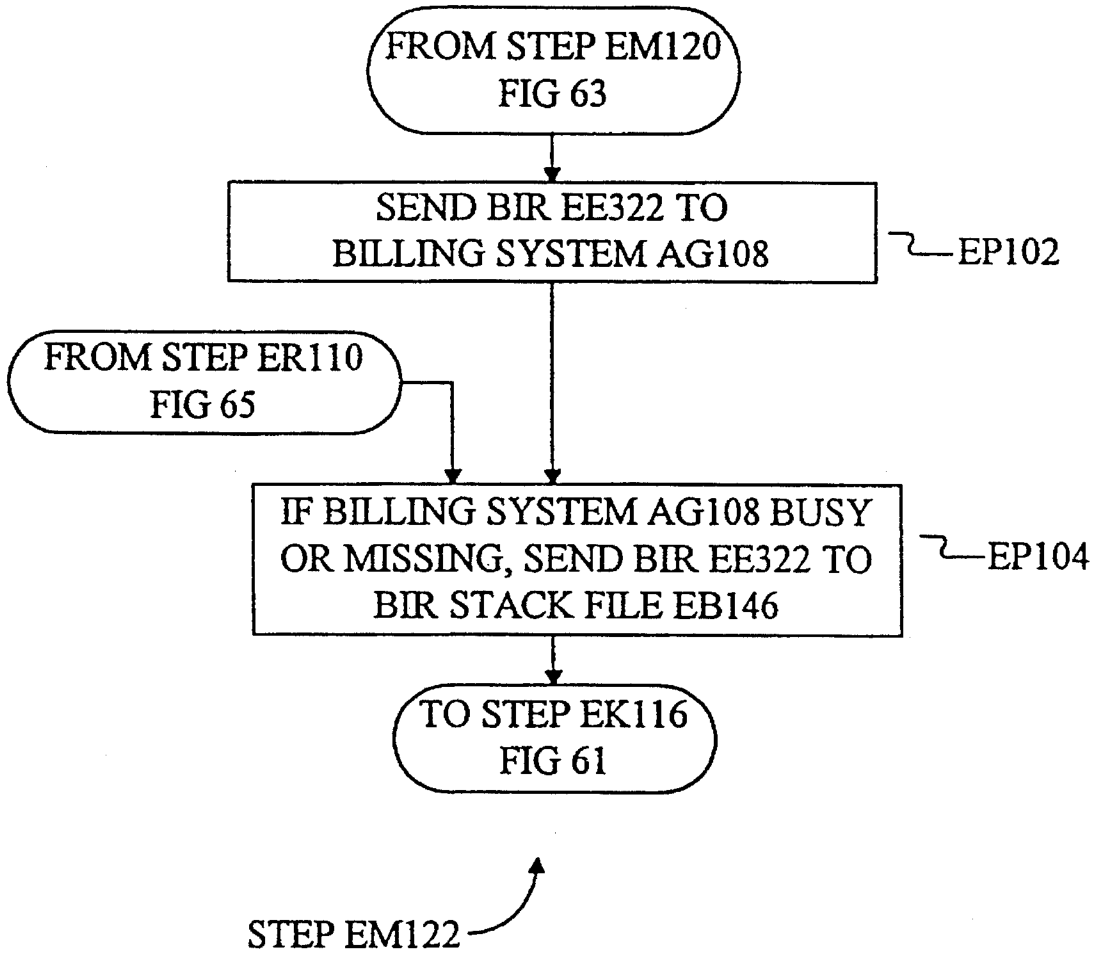
FIG. 64 is an operational flow diagram illustrating the process of sending the BIR to the billing system according to one embodiment of the invention.

The process of step EM122 is further described with reference to FIG. 64. FIG. 64 is an operational flow diagram illustrating the process of sending BIR EE322 to billing system AG108. Referring now to FIG. 64, in a step EP102, BIR EE322 is sent to billing system AG108.

If the billing system AG108 is busy or inactive, BIR EE322 is stored in BIR stack file EB146. BIR stack file EB146 is a flat file used to store BIRs EE322 that could not be sent to billing system AG108.

In a step EK116, once the stack timer has expired, Receive Procedure kernel EB110 sends a BIR CHECK MESSAGE EH132 to BIR stack procedure kernel EB114. In response, BIR stack procedure kernel EB114 checks BIR stack file EB146 to determine whether there are any BIRs EE322 that have not been sent to billing system AG108. This occurs as described below in a step ER102.

Figure 65:
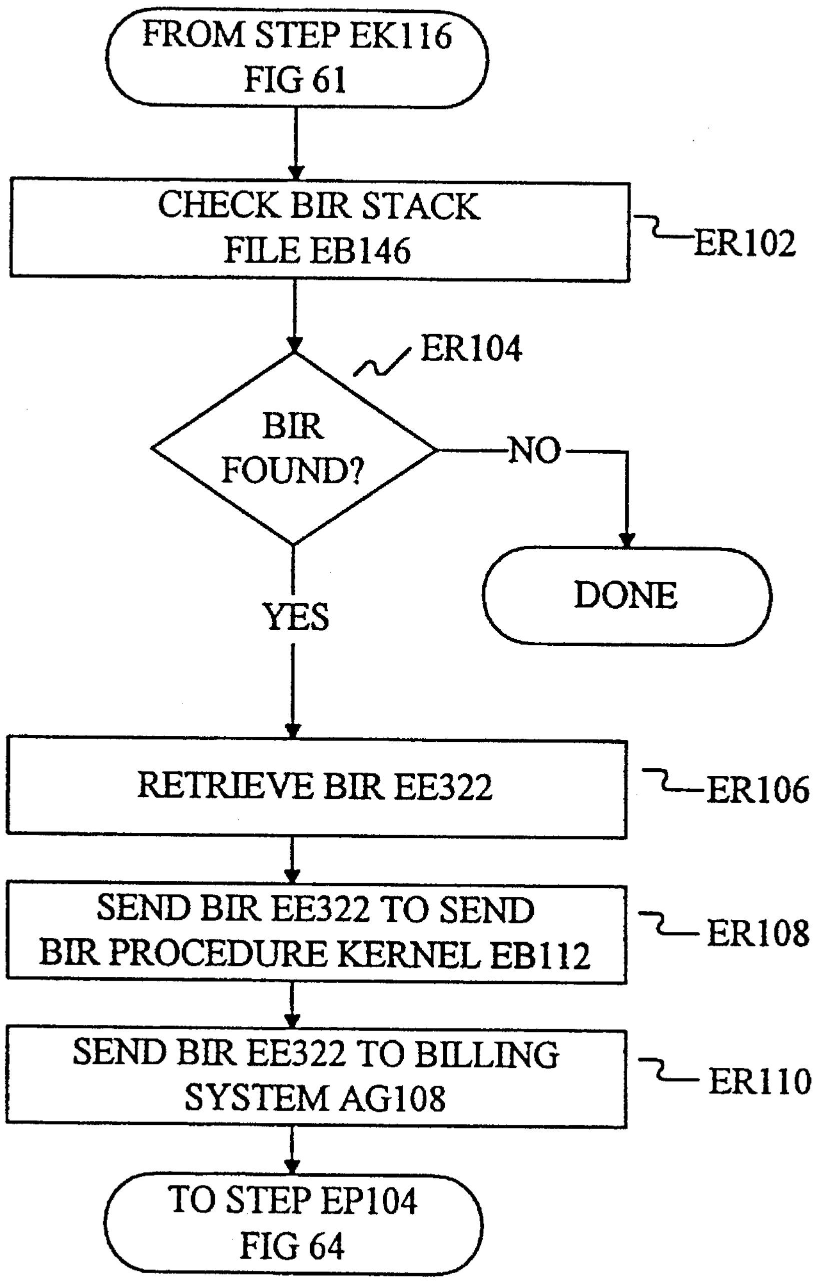
FIG. 65 is an operational flow diagram illustrating the process that occurs in response to the receipt of a BIR check message according to one embodiment of the invention.

The process that occurs when BIR CHECK MESSAGE EH132 is received by BIR stack procedure kernel EB114 will now be described. FIG. 65 is an operational flow diagram illustrating the process that occurs in response to BIR CHECK MESSAGE EH132.

In a step ER102, BIR stack procedure kernel EB114 checks BIR stack file EB146 to determine whether there are any BIRs EE322 stored therein. In other words, BIR stack procedure kernel EB114 checks to see if there are any BIRs EE322 that send BIR procedure kernel EB112 previously tried to send to billing system AG108.

If a BIR EE322 is found (decision block ER104), it is retrieved from BIR stack file EB146 in a step ER106.

In a step ER108, BIR EE322 retrieved in step ER106 is sent to send BIR procedure kernel EB112. In a step ER110, send BIR procedure kernel EB112 attempts to resend BIR EE322 to billing system AG108.

2.3.2.2.5 Send BIR Procedure

The Send BIR procedure is where all responses to requests to the billing system AG108 are processed. During operation of the Billing Server, many requests are made to the billing system AG108. Each request is marked to determine if all callhandle information can be removed when the request comes back. If a request to the billing system AG108 fails, the BIR will be written to the BIR Stack file for retrying later.

2.3.2.2.5 BIR Stack Procedure

The BIR Stack procedure is responsible for re-sending BIRs to billing system AG108. This procedure makes use of the BIR Stack file described in earlier sections. At initialization, a timer is started. Each time the timer goes off, the BIR Stack file is checked for BIRs to be re-sent to the Billing system AG108.

If a BIR is found in the file, it is re-sent. When a successful response comes back, the file is checked for the next one to send. If there are no further BIRs to re-send, the file is truncated.

2.3.3.3 Billing Server Tables

BSRVR BA108 has numerous tables associated with it. Some of these tables are now described.

2.3.3.3.1 Callhandle Hash Table

Figure 66:
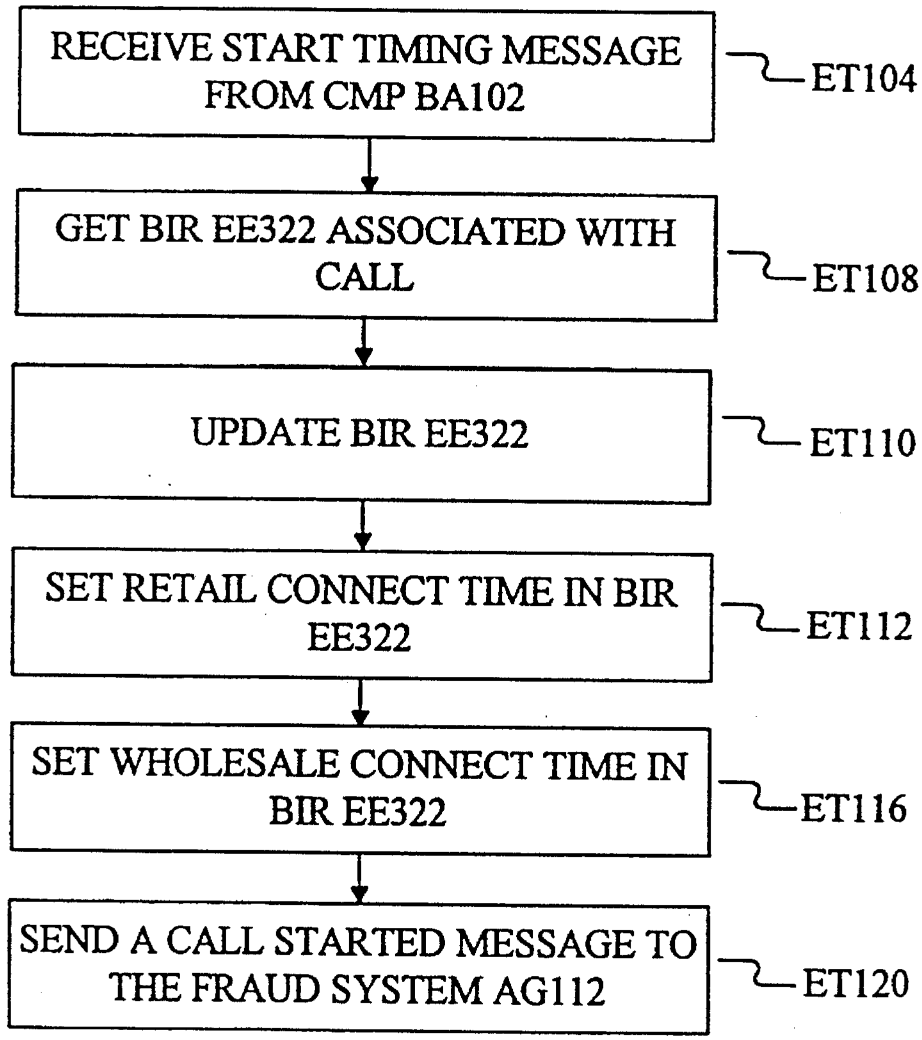
FIG. 66 is an operational flow diagram illustrating the process by which the billing server tracks the start time of a call according to one embodiment of the invention.

As described below with reference to FIGS. 66 and 67, most requests come to the Billing Server with the callhandle BA305 of the call. Because of the potential high number of call statuses and the speed desired in performing look-ups based on callhandle BA305, a hash table is utilized in one embodiment. All information on a call is kept in a record in memory. A pointer to this memory is then kept in the callhandle hash table.

During a search for callhandle information, the callhandle BA305 is sorted and the link list is traversed to find the matching callhandle BA305. When found, the pointer to the call status structure is returned.

2.3.3.3.2 Console Tables

Although most requests involve finding call status information for a call identified by a callhandle BA305, some requests require that the information be found using a console number. Because valid VRU AB134 and MOC AB132 number ranges are known, simple variable arrays can be used for this table. When a console number is received and needs to be tied to a callhandle BA305 for later use, an entry in one of two tables is made.

From the known console ranges, the correct table is determined. Next, if the console number is beyond the array, the table is increased to allow indexing. Only a pointer to the Callhandle Hash table is kept.

2.3.3.3.3 Debit Tables

With debit card calls, it is desirable that the call in progress be constantly monitored for two reasons. First, it is desirable to warn originating user AA106A when the length of the call has almost exceeded the balance of the card. The second reason is so the call can be terminated when the call has met or exceeded the balance of the card. In one embodiment, this is functionality is accomplished for multiple debit cards which are simultaneously in use by placing the specific debit card information in a separate linked list from the actual BIR EE322 in the callhandle hash table for the call. Scanning this list once every second allows the system to notify the originator whenever required in a timely manner. The debit table entries are linked to the BIR EE322 for the specific call by the callhandle BA305 and BIR identification number.

2.3.3.3.4 Call Tracking Table

All calls, whether connected to a particular device (VRU AB134, Manual Operator Console AB132, Voice Mail, etc.) or completed to a terminating number, have an associated BIR EE322 and an entry in a Call Tracking table. This table helps the BSRVR BA108 to identify BIRs which should be sent to billing system AG108 but have not been sent for some reason.

2.3.4 Redundancy

Redundancy is an extremely important criteria of the Billing Server. If calls are in progress and the billing information for the calls is lost, revenue is lost also. To prevent this potential problem, the Billing Server is actually a pair of identical programs. One is the primary; the other is the secondary. They are referred to in this document as "partners." Any time one partner adds a callhandle, updates any information dealing with it, the identical information is updated to the partner. At any time both partners should have identical tables in memory.

2.3.5 Timing of Calls

One function of BSRVR BA108 is to perform wholesale and retail timing of a call for billing purposes. BSRVR BA108 uses BIR EE322 to keep track of start and stop times so that call durations can be computed and forwarded to billing system AG108 for billing purposes.

The manner in which BSRVR BA108 determines start and stop times for a call is now described. FIG. 66 is an operational flow diagram illustrating the process by which BSRVR BA108 tracks the start time of a call. Referring now to FIG. 66, in a step ET104, BSRVR BA108 receives a start timing message from CMP BA102. CMP BA102 generates and sends this message to BSRVR BA108 when the call is answered by the called party.

In a step ET108, when BSRVR BA108 receives the start timing message from CMP BA102, BSRVR BA108 retrieves the BIR EE322 associated with the call. The identification of the correct BIR EE322 is made using the callhandle BA305 assigned to the call when it first entered call processing system AB102. When BIR EE322 associated with the call is located, it is updated to indicate that the call is connected to the destination. This occurs in step ET110.

In a step ET112, a retail connect time field in the BIR EE322 for the call is set to the current system time. Similarly, in a step ET116, the wholesale connect time field in the BIR EE322 associated with the call is set to the current system time.

Upon performing these steps, BSRVR BA108 updates the BIR EE322 associated with the call to include the actual times that the call was connected to the terminating user AA106B. In a step ET120, a call started message is sent to fraud detection and prevention system AG112. This message is used by fraud detection and prevention system AG112 to monitor calls for the purpose of detecting possible fraudulent use of call processing system AB102.

To determine the duration of the call, the system must also know when the call was terminated. The process by which the termination time of a call is determined and tracked is now described. FIG. 67 is an operational flow diagram illustrating the process by which BSRVR BA108 updates the BIR EE322 for the call with the termination time of the call.

Figure 67:
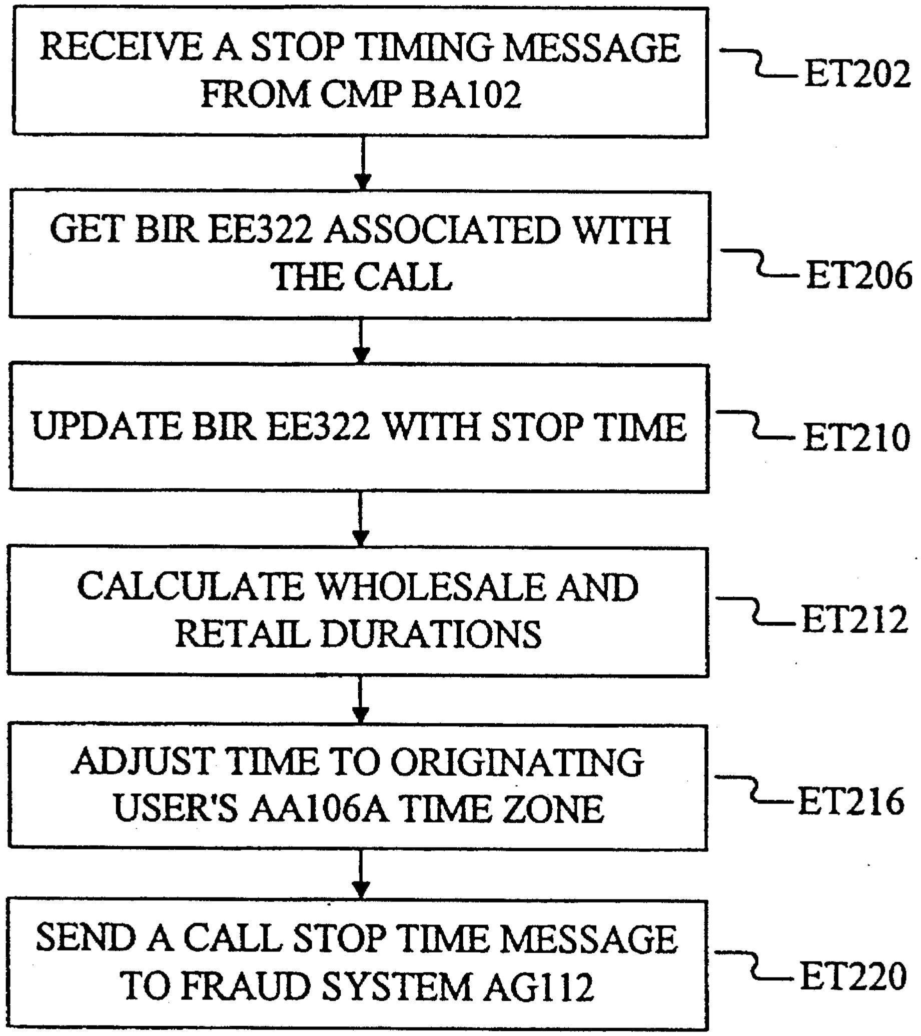
FIG. 67 is an operational flow diagram illustrating the process by which the billing server updates the BIR for the call with the termination time of the call according to one embodiment of the invention.

Referring now to FIG. 67, in a step ET202, BSRVR BA108 receives a stop timing message from CMP BA102. CMP BA102 generates the stop timing message when either party hangs up the phone or the call is otherwise terminated. Upon receipt of the stop timing message, BSRVR BA108 retrieves the BIR EE322 associated with the call. This occurs in a step ET206. BSRVR BA108 retrieves the BIR EE322 based on the callhandle BA305 that was sent with the stop timing message from CMP BA102. The callhandle BA305 identifies the call and is used to identify the appropriate BIR EE322 that corresponds to the call.

In a step ET210, BSRVR BA108 updates the BIR EE322 with the current system time. Thus, BIR EE322 now includes the time at which the call was terminated.

For calls that were billed on a per-unit time basis, it is important to calculate the duration of the call so that the proper billing amount can be determined. Thus, in a step ET212, BSRVR BA108 calculates the wholesale and retail durations of the call. The wholesale and retail durations can be calculated by subtracting the wholesale and retail start times from the stop time, respectively.

In order to have the correct start time appear on the subscriber's AA114 bill, it may be necessary to adjust the start time to a different time zone. If this is the case, this is done in a step ET216. Now, the BIR EE322 associated with the call is complete with wholesale and retail start time and stop times for the call, and the wholesale and retail durations of the call. Thus, when BSRVR BA108 sends BIR EE322 to billing system AG108, an appropriate bill can be generated and sent to the correct subscriber AA114.

In a step ET220, BSRVR BA108 sends a call stop time message to fraud detection and prevention system AG112. Fraud detection and prevention system AG112 uses the stop time in conjunction with the start time (sent in step ET120) to monitor the network for potential fraudulent uses. The fraud detection and prevention system AG112 is discussed in detail in the Fraud System Section of this document.

In one embodiment, BSRVR BA108 sends a response to CMP BA102 indicating that the timing of the call has been completed.

Figure 68:
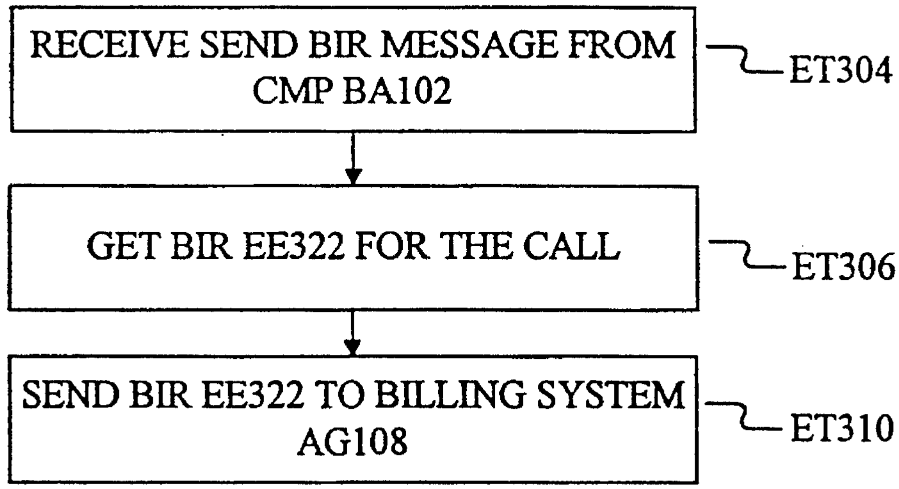
FIG. 68 is an operational flow diagram illustrating the process by which the billing server sends a BIR to the billing system according to one embodiment of the invention.

Once the timing information for the call is completed, as noted above, the BIR EE322 for the call is sent to billing system AG108 so that the call can be billed. In one embodiment, this is coordinated by CMP BA102. When BIR EE322 is fully updated, CMP BA102 sends a send BIR message to BSRVR BA108. This is received by BSRVR BA108 in a step ET304. FIG. 68 is an operational flow diagram illustrating the process by which BSRVR BA108 sends a BIR EE322 to billing system AG108.

In a step ET306, BSRVR BA108 retrieves the BIR EE322 for the call. Once again, this is accomplished using a callhandle BA305 associated with the call. Callhandle BA305 is sent by CMP BA102 with the send BIR message.

In a step ET310, once BSRVR BA108 has retrieved the BIR EE322 for the call, it sends the BIR EE322 to billing system AG108.

2.4 Database Server(DBS)

2.4.1 Database Server Introduction

NCP AB104 uses a DBS BA104 to access several databases. DBS BA104 performs functions, or services, for NCP AB104 in response to messages received over LAN BA122. For example, DBS BA104 retrieves call parameters BA308 in response to a GET CALL ID MESSAGE BA306 received from CMP BA102.

The functionality of DBS BA104 is described at a high level in the Network Control Processor Section of this document. DBS BA104, its configuration in a preferred embodiment, and its operation is now described in greater detail.

Figure 69:
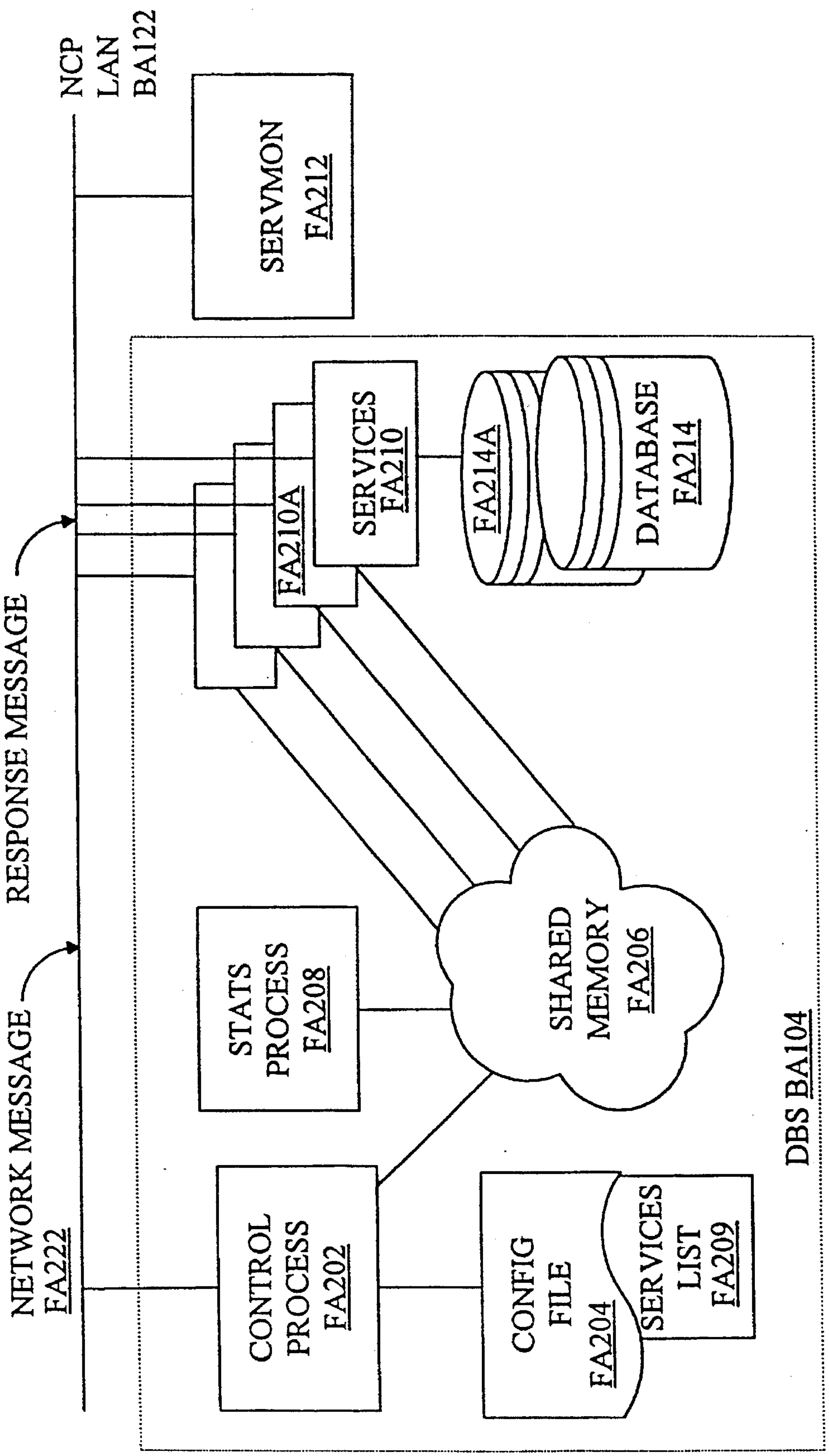
FIG. 69 is a block diagram illustrating a database server of the call processing system according to one embodiment of the invention.
Figure 70:
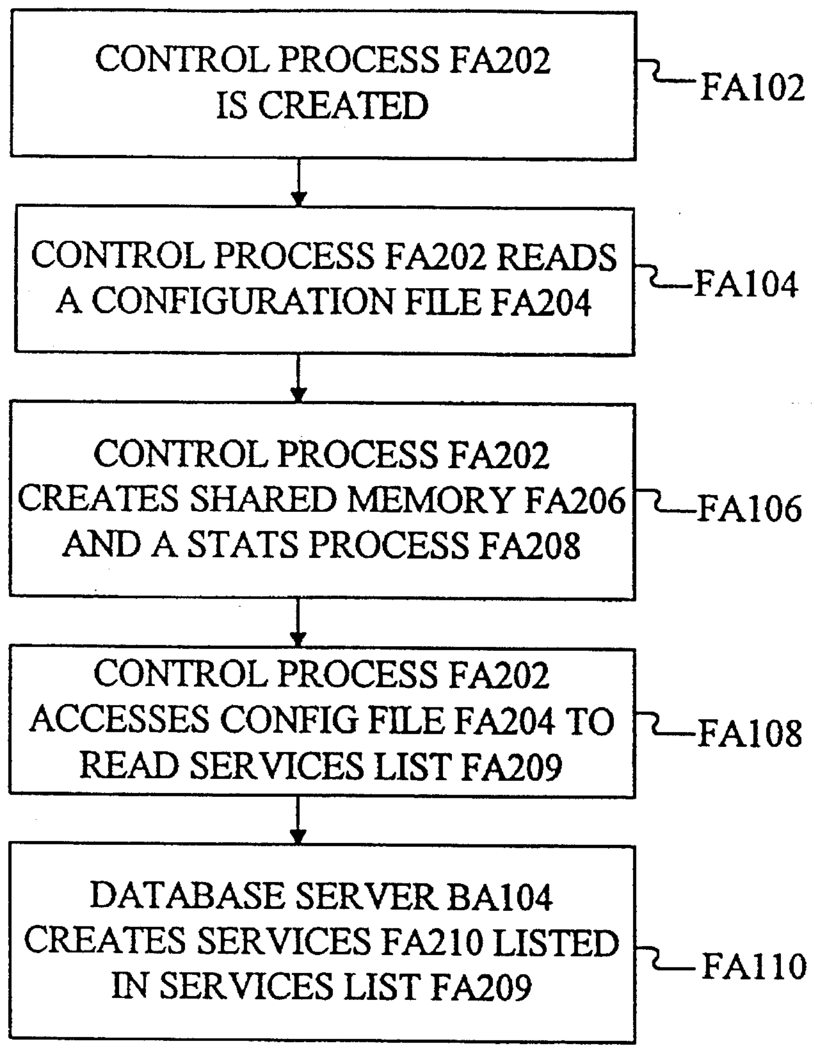
FIG. 70 is an operational flow diagram illustrating a process by which the database server is created according to one embodiment of the invention.

FIG. 69 is a block diagram illustrating DBS BA104. FIG. 70 is an operational flow diagram illustrating a process by which DBS BA104 is created. Referring now to FIGS. 70 and 69, DBS BA104 interfaces to the other processes within NCP AB104 via LAN BA122. In a step FA102, a control process FA202 is created. Control process FA202 interfaces to LAN BA122.

In a step FA104, control process FA202 reads a configuration file FA204.

In a step FA106, control process FA202 creates a shared memory FA206. At the same time, control process FA202 creates a stats process FA208. Stats process FA208 does not communicate via LAN BA122. Both stats process FA208 and control process FA202 can write data to shared memory FA206 and read data from shared memory FA206.

These elements, control process FA202, configuration file FA204, shared memory FA206, and stats process FA208, make up a basic database server. In a preferred embodiment, whenever a DBS BA104 is created, it always has these basic components. These components are present regardless of the file structure that DBS BA104 may have, or whether any files exist at all.

Configuration file FA204 includes a services list FA209. This services list FA209 includes a list of services FA210 that perform the functions required of DBS BA104. Services list FA209 also includes a list of the databases FA214 that DBS BA104 can access when responding to a message.

A service FA210 is simply a program or process started by DBS BA104. In a preferred embodiment, most services FA210 have one or more databases FA214 associated with them. However, there is no requirement that each service FA210 have a database FA214 associated therewith.

In a step FA108, control process FA202 accesses configuration file FA204 to read services list FA209.

In a step FA110, DBS BA104 creates all of the services FA210 listed in list of services FA208. Services FA210 communicate via LAN BA122. Services FA210 all access shared memory FA206.

A server monitor FA212 interfaces via LAN BA122, and is used to monitor the DBSs BA104 operating. Server monitor FA212 is started independently of control process FA202 and the balance of DBS BA104. Server monitor FA212 monitors the entire DBS BA104 by communicating with control process FA202. Server monitor FA212 does not communicate directly with any one service FA210. Server monitor FA212 can monitor each of these services through control process FA202. DBS BA104 can be used to start up and shut down NCP BA104.

As noted above, services FA210 can have an associated database FA214. Whether database FA214 exists for a service FA210 depends on the particular service FA210. Examples of services FA210 include a CALL ID SERVICE FA210A and a NUMBER TRANSLATION SERVICE FA210B.

The DBS BA104 illustrated ill FIG. 69 is a server that can run in a UNIX or an OS/2 environment, for example. In these environments, multiple services FA210 can each run as multiple applications. In a DOS environment, multiple applications cannot be run simultaneously; however, services FA210 can perform multiple functions simultaneously.

An example of a service FA210 in DBS BA104 is where DBS BA104 retrieves call parameters BA308 from a call ID database FA214A in response to GET CALL ID REQUEST MESSAGE BA306 from CMP BA102. In this example, GET CALL ID REQUEST MESSAGE BA306 has information in a header portion indicating the identification of the specific service FA210 required. In this case, a CALL ID SERVICE FA210A is identified.

When GET CALL ID REQUEST MESSAGE BA306 is received by DBS BA104, CALL ID SERVICE FA210A accesses the call ID database to retrieve call parameters BA308. CALL ID SERVICE FA210A then places call parameters BA308 on LAN BA122 for transmission to CMP BA102.

An additional example of a service FA210 is a number translation service FA210B. In this example, CMP BA102 sends a message requesting that DBS BA104 translate a number. For example, CMP BA102 may request DBS BA104 to translate an 800 number into a terminating telephone number. In this example, service FA210B reads the 800 number, and accesses an appropriate 800 translation database FA214B to retrieve the translated number. The translated number is then sent to CMP BA102 over LAN BA122 as a response message. Number translation is discussed fully in the Number Translation Section of this document.

The following Table of Database Services illustrates by way of example a number of services FA210 that can be provided by DBS BA104.

| TABLE OF DATABASE SERVICES |
|---|
| DB_OP_PROFILE |
| DB_SCRIPT |
| DB_HELP |
| DB_SUBSCRIBER |
| DB_NPA_CITY |
| DB_DEF |
| DB_VALID |
| DB_CALLID |
| DB_SPEED_DIAL |
| DB_LINKCARD |
| DB_ACCOUNT |
| DB_COUNTRY |
| DB_800_TRANSLATION |
| DB_800_TERMINATION |
| DB_HOT/COLD |
| DB_VALINDEX |
| DB_VALBLOCK |
| DB_VSCRIPT |
| DB_DEBIT |
| DB_DEBITBAT |
| DB_ACCOUNT_CODE |
| DB_CII_CARD |
| DB_VM56 |
| DB_VMBOX |
| DB_VMACCESS |
| DB_BNID |

-continued

| TABLE OF DATABASE SERVICES |
| --- |
| VALIDATOR<br>CRD<br>BS |

Figure 87:
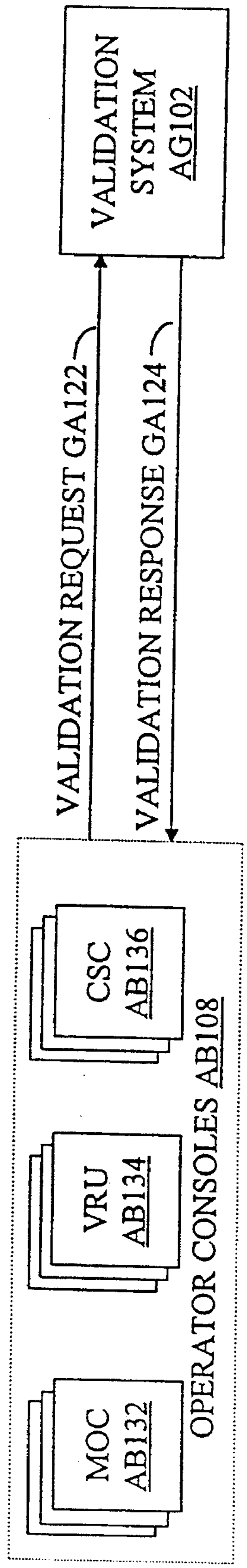
FIG. 87 is a high-level block diagram illustrating an interface between operator consoles and the validation system according to one embodiment of the invention.

An example of a service FA210 without a database FA214 is a validation system AG102 (illustrated in FIG. 87). Validation system AG102 does not have its own database FA214 but communicates with other services FA210 in validating calls. These other services FA210 may have their own databases to perform database look-ups where required. For example, an internal calling card verification service may have an associated database for valid calling card numbers.

Figure 71:
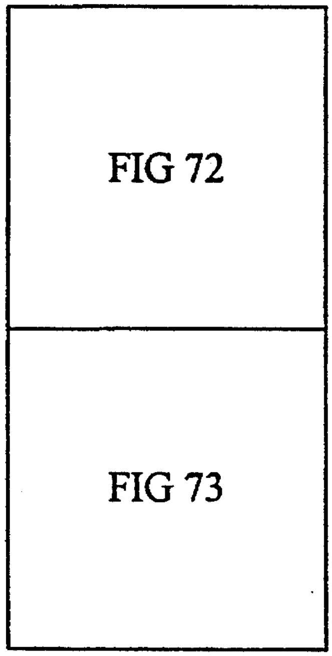
FIG. 71, which comprises
Figure 72:
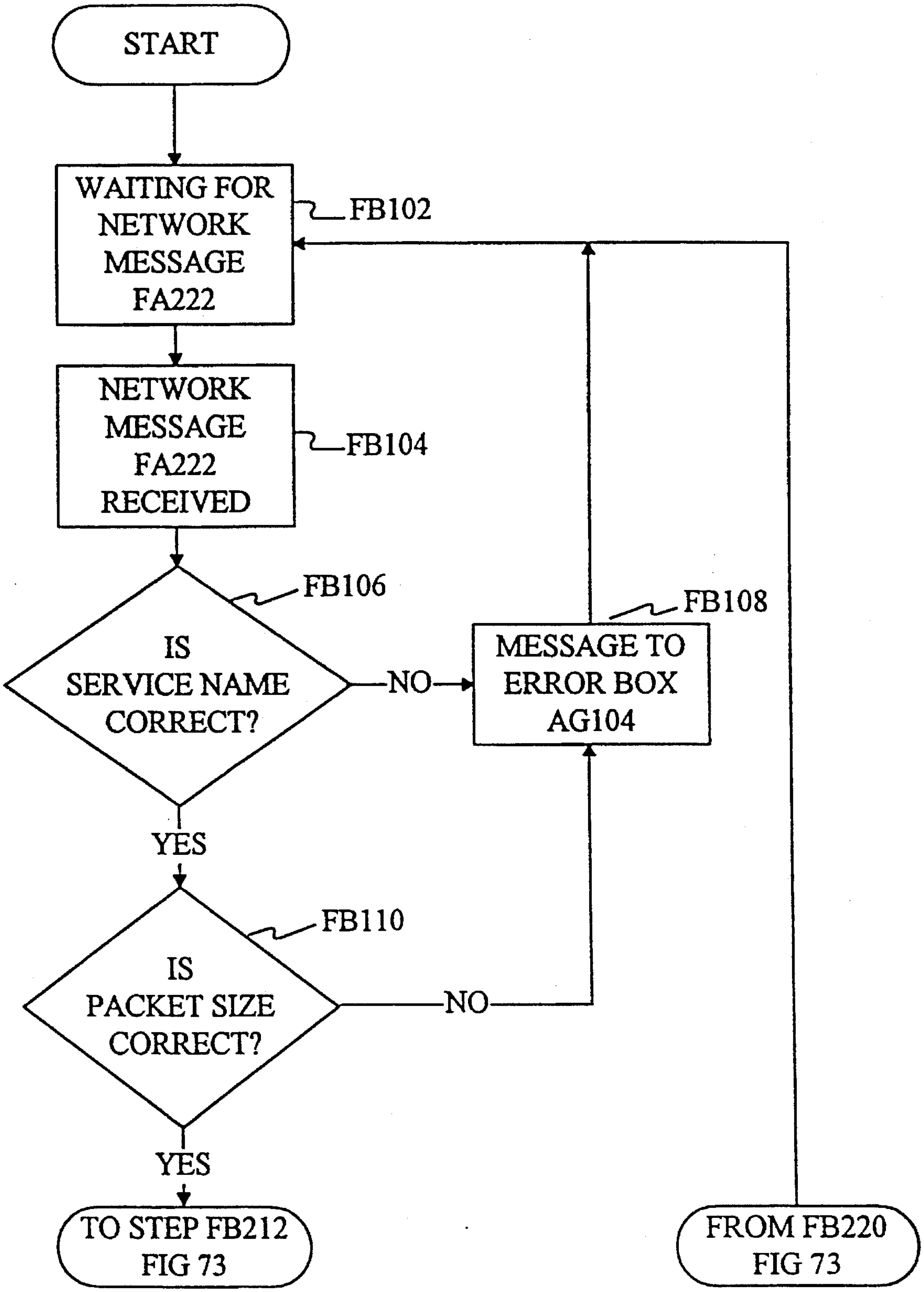
FIGS. 72 and 73, is an operational flow diagram illustrating the steps performed by the database server when a network message is received according to one embodiment of the invention.
Figure 73:
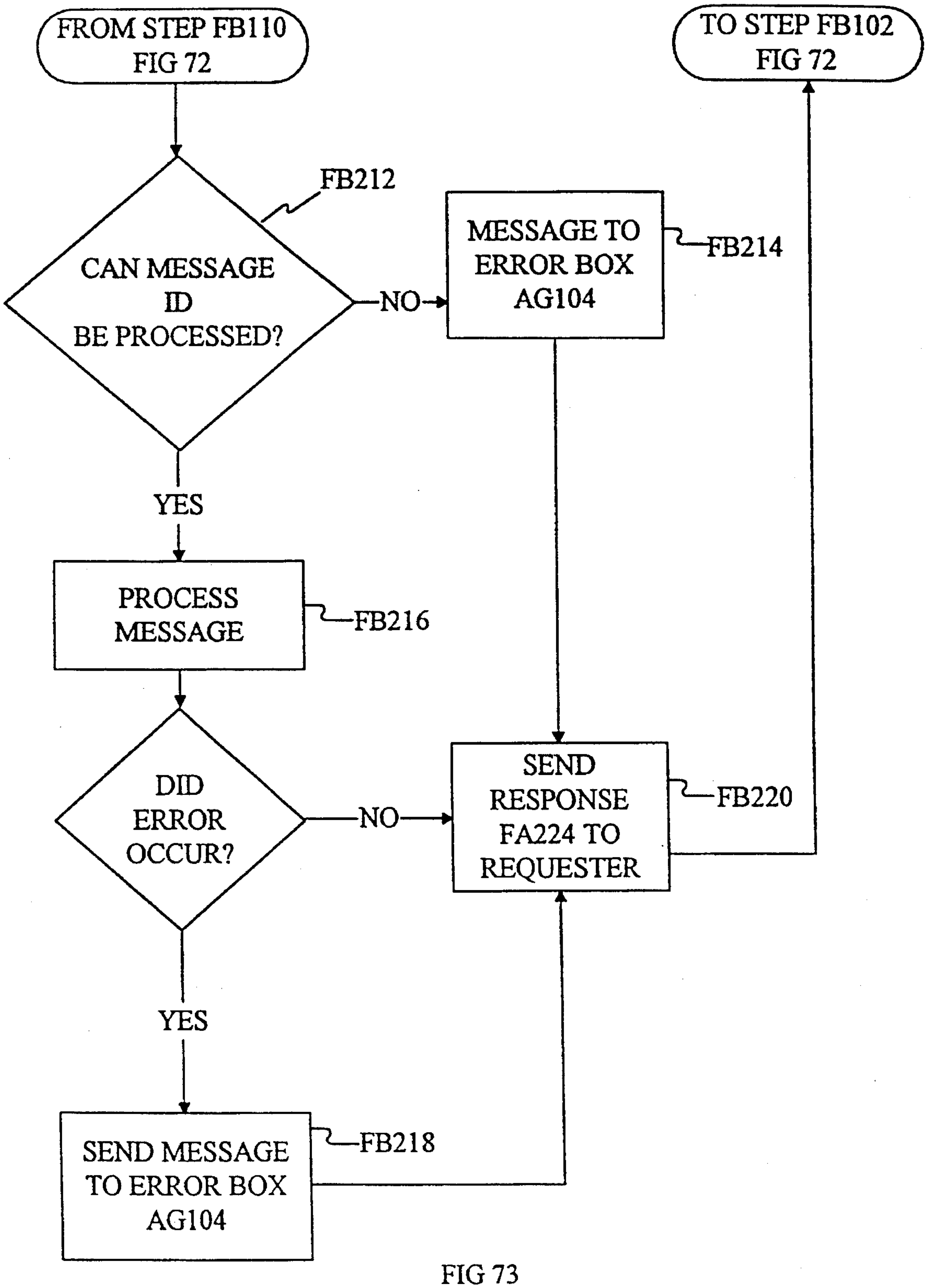
Figure 74:
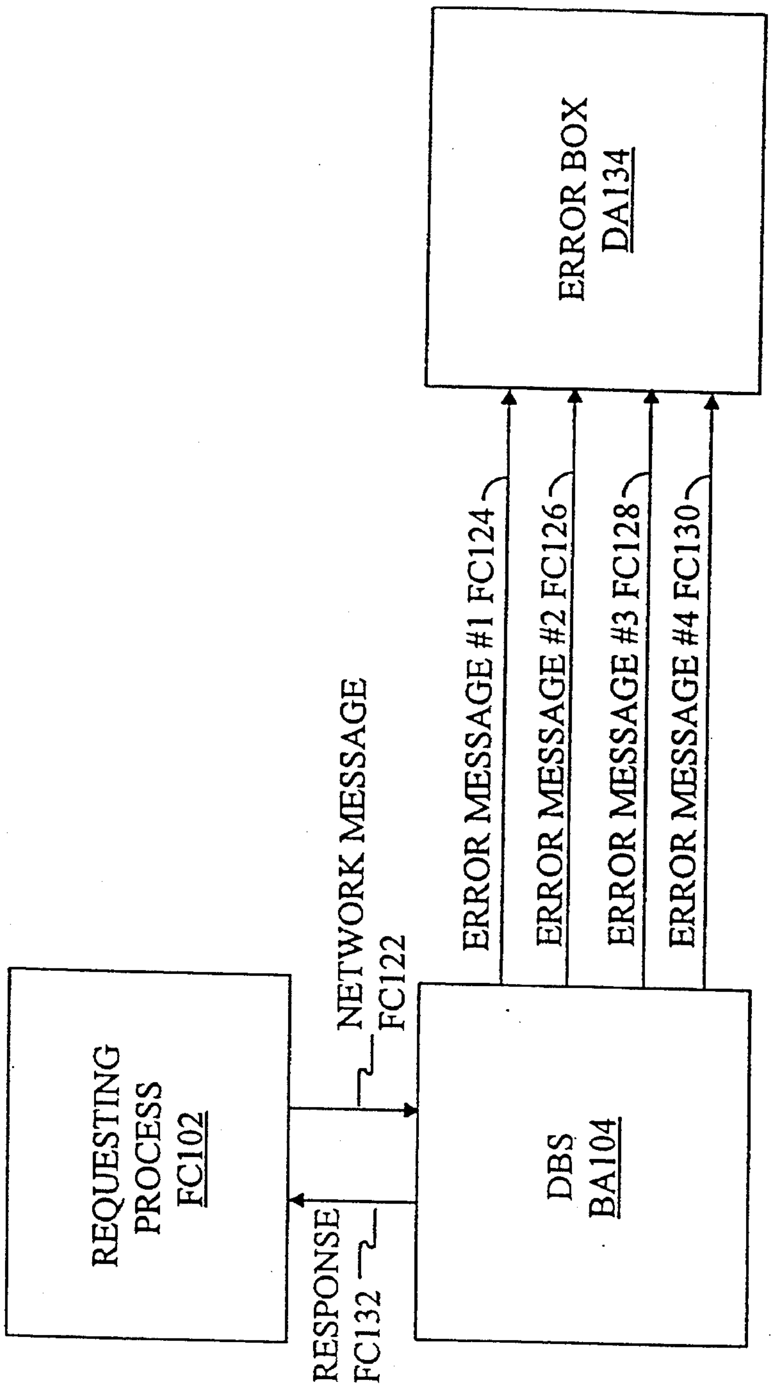
FIG. 74 is a data flow diagram illustrating the messages that flow to and from the database server when processing a network message according to one embodiment of the invention.

The operational process by which DBS BA104 processes a message received over LAN BA122 is now described. FIG. 71, which comprises FIGS. 72 and 73, is an operational flow diagram illustrating the steps performed by DBS BA104 when a network message is received over LAN BA122. FIG. 74 is a data flow diagram illustrating the messages that flow to and from DBS BA104 when processing a message.

Referring now to FIGS. 69, 72, and 74, in a step FB102, DBS BA104 is active and monitoring LAN BA122. In this step, DBS BA104 is waiting for a network message FA222. An example of a network message FA222 is a GET CALL ID REQUEST MESSAGE BA306 sent from CMP BA102 to DBS BA104.

In a step FB104, DBS BA104 receives network message FC122. In a preferred embodiment, network message FC122 is a packet of data received over LAN BA122.

When NETWORK MESSAGE FC122 is received, DBS BA104 first verifies the service name contained in a header of NETWORK MESSAGE FC122 to determine whether the service name is correct. This occurs in a step FB106.

If it is determined in step FB106 that the service name is incorrect, DBS BA104 sends an ERROR MESSAGE #1 FEC224 to error box AG104 in a step FB108. ERROR MESSAGE #1 FEC224 indicates that a NETWORK MESSAGE FC122 was received with an incorrect service name.

If the service name is correct, DBS BA104 next determines whether the size of the packet received is correct. This occurs in a step FB110. In step FB110, DBS BA104 compares the actual size of the received network message FC122 to the size that received network message FC122 is supposed to be, as indicated in the message header. If the size is incorrect, in a step FB108 an ERROR MESSAGE #2 FC126 is sent to error box AG104. ERROR MESSAGE #2 FC126 indicates that the packet size of the received message is incorrect.

An example of when a packet size error may occur is when DBS BA104 does not receive the entire packet.

It should be noted that these validations performed in steps FB106 and FB110 are optional steps that are performed in a preferred embodiment. It is not mandatory that validation steps FB106 and FB110 be performed. Further, validation steps FB106 and FB110 can be performed in any chronological order. They do not have to be performed in the order illustrated in FIG. 72.

For validation steps FB106 and FB110, if an error has occurred, the operation resumes at step FB102, where DBS BA104 is waiting for a network message FC122.

If the packet size is correct as determined in step FB110, and the service name is correct as determined in step FB106, DBS BA104 continues at a step FB112. In step FB212, the service FA210 to which NETWORK MESSAGE FC122 is addressed, determines whether the message ID can be processed. In other words, the designated service FA210 determines whether the action that NETWORK MESSAGE FC122 is requesting can be performed by that service FA210. If the message ID cannot be processed, an ERROR MESSAGE #3 FC128 is sent to error box AG104 in a step FB214. ERROR MESSAGE #3 FC128 indicates that the requested function cannot be performed.

If the function can be performed (in other words, if the message ID can be processed), the designated service FA210 processes the message in step FB216. The received network message FC122 may command the designated service FA210 to perform functions such as write to a record, delete a record, add a record. Additionally, received NETWORK MESSAGE FC122 may simply be requesting a response from the service FA210 to determine whether service FA210 is active.

If an error occurs in step FB216, an ERROR MESSAGE #4 FC130 is sent to error box AG104 indicating that such an error occurred. ERROR MESSAGE #4 FC130 is sent to error box AG104 in a step FB218. Additionally, if an error occurred in step FB216, a response is sent to the process that originated the received network message FC122, indicating that an error has occurred. This response is sent in a step FB216.

If no errors occur in processing received NETWORK MESSAGE FC122, the appropriate RESPONSE FC132 is sent to requesting process FC102 that sent received NETWORK MESSAGE FC122 to DBS BA104.

Additionally, received NETWORK MESSAGE FC122 may be addressed to control process FA202. In this case, control process FA202 performs steps FB212, FB214, and FB216 to process RECEIVED MESSAGE FC122. Examples of functions that could be requested of control process FA202 with received message FC122 are adding a new service FA210 or deleting an existing service FA210.

To better illustrate the functionality of DBS BA104, these operational steps will be described with reference to an example received NETWORK MESSAGE FC122 and RESPONSE MESSAGE FC132. In this example, CMP BA102 sends a GET CALL ID REQUEST MESSAGE BA306 to DBS BA104. DBS BA104 receives the GET CALL ID REQUEST MESSAGE BA306 in step FB104.

DBS BA104 verifies that the service name is valid in step FB106. In this step, DBS BA104 verifies that a CALL ID SERVICE FA210A is an active service FA210 within DBS BA104. This validation is performed by control process FA202.

DBS BA104 next determines whether the size of the GET CALL ID REQUEST MESSAGE BA306 received conforms to the size indicated in the message header. This is performed in step FB110.

If either of these validations (steps FB106, FB110) indicate that there is an error, DBS BA104 sends the appropriate error message (ERROR MESSAGE #1 FEC224, or ERROR MESSAGE #2 FC126) to error box AG104 in step FB108. DBS BA104 then continues to monitor the network in step FB102.

If these validations do not indicate an error, DBS BA104 next determines in step FB112 whether the GET CALL ID MESSAGE BA306 can be processed. In this step, CALL ID SERVICE FA210A looks at the function requested by GET CALL ID MESSAGE BA306 to determine whether it can be performed.

If the function requested by GET CALL ID MESSAGE BA306 cannot be performed by CALL ID SERVICE FA210A, ERROR MESSAGE #3 FC128 is sent to error box AG104 in step FB214. DBS BA104 then sends a response FA224 to CMP BA102, indicating that the function requested by GET CALL ID REQUEST MESSAGE BA306 cannot be performed. DBS BA104 then monitors the network in step FB102 waiting for a new NETWORK MESSAGE FC122 to be received.

If, in step FB212, CALL ID SERVICE FA210A determines that the function can be performed, the operation continues at step FB216. In step FB216, call ID service FA210A accesses call ID database FA214A to retrieve call parameters BA308 requested by GET CALL ID MESSAGE BA306.

If no errors occurred in this process, DBS BA104 sends call parameters BA308 to CMP BA102 in step FB216. If an error did occur in step FB216, DBS BA104 sends a response FA224 to CMP BA102 indicating that the call parameters BA308 cannot be retrieved. DBS BA104 additionally sends ERROR MESSAGE #4 FC130 to error box AG104.

2.4.2 Deleting a Database Service

To ensure efficient operation of DBS BA104, the capability is provided to delete a service FA210 if is it no longer required. This allows unwanted services to be removed from DBS BA104. Deleting service FA210 further allows the portion of shared memory FA206 that service FA210 uses to be made available for other uses.

Figure 75:
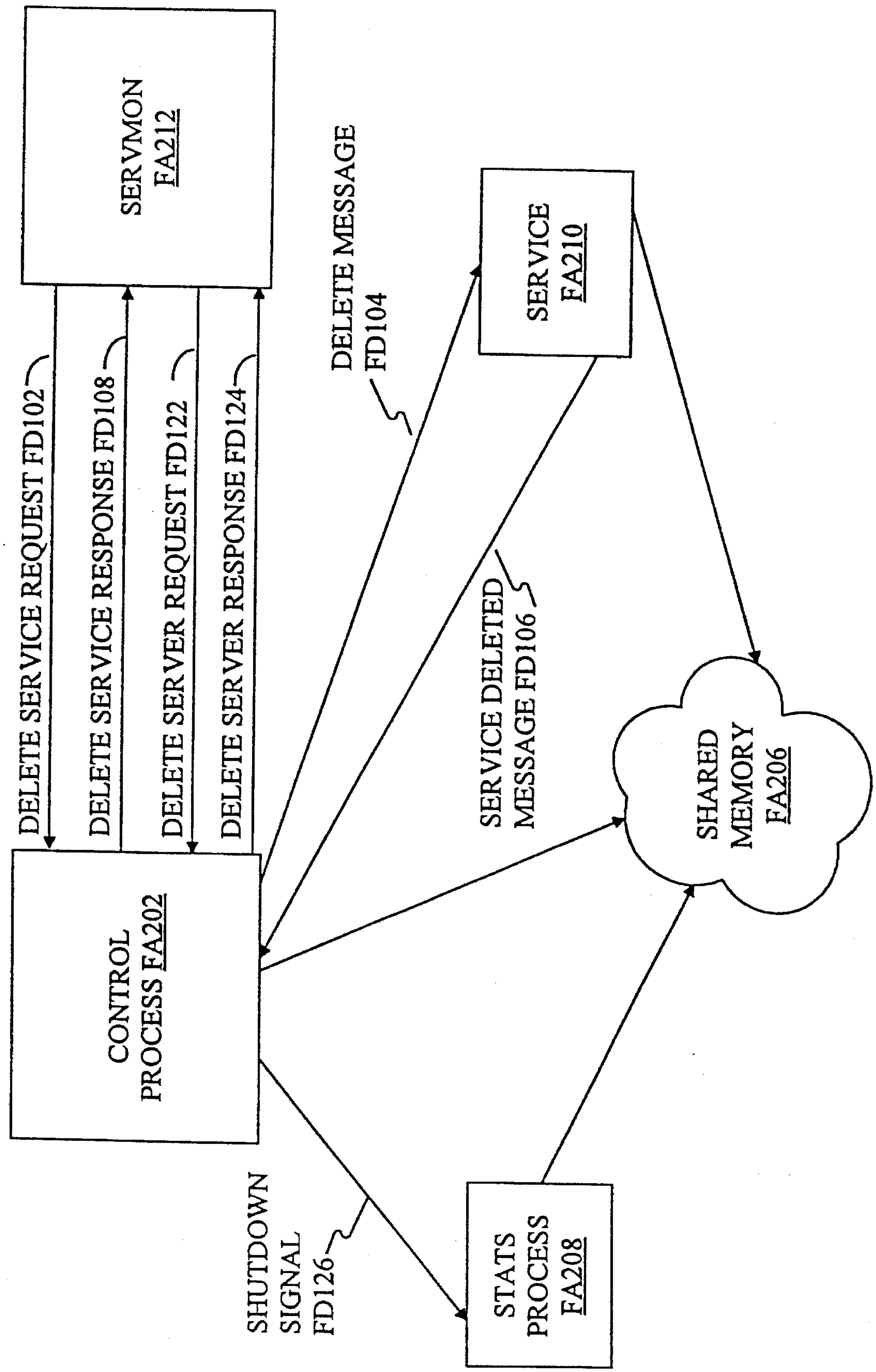
FIG. 75 is a data flow diagram illustrating the messages involved in deleting a service in the database server according to one embodiment of the invention.
Figure 76:
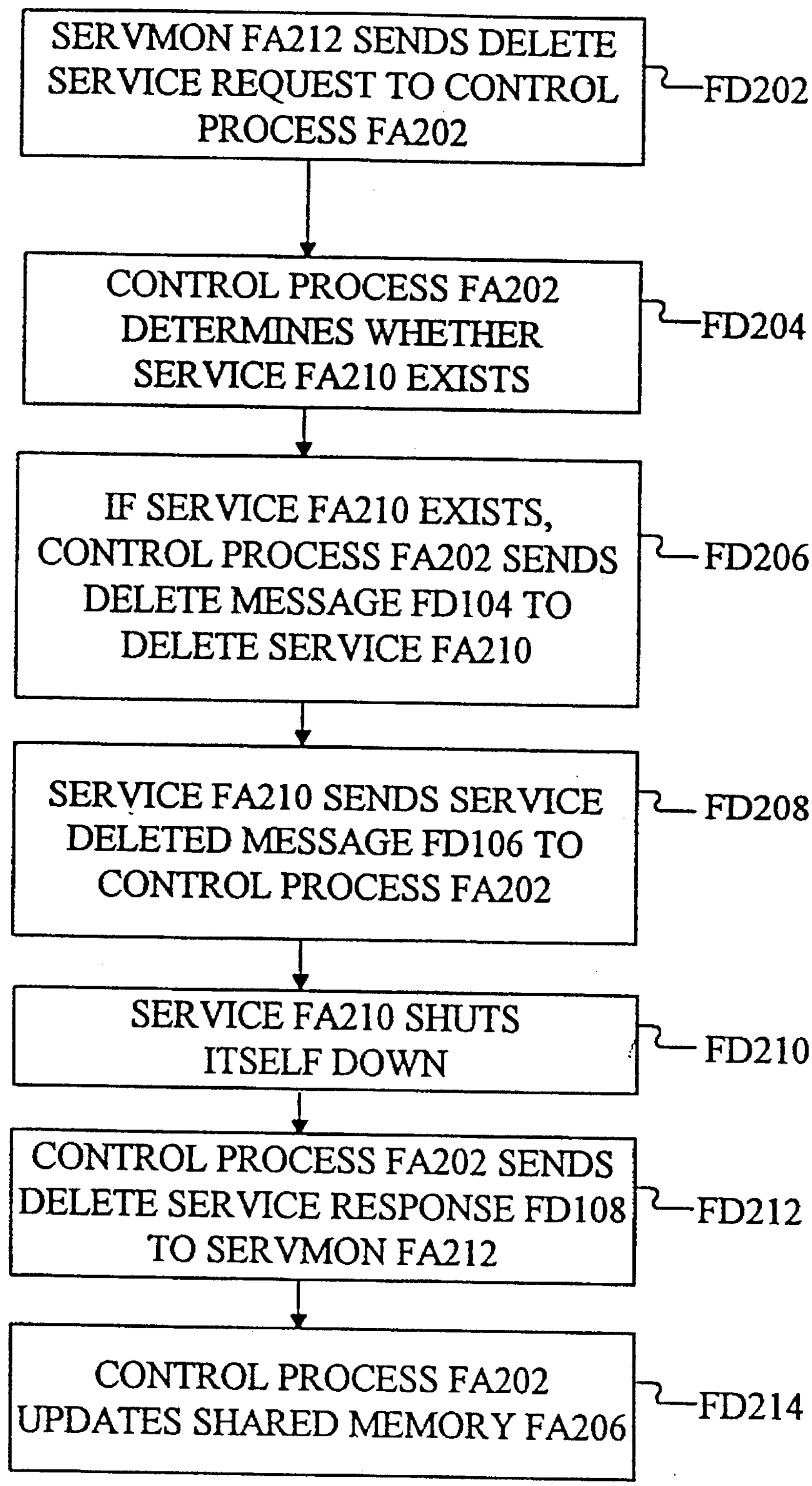
FIG. 76 is an operational flow diagram illustrating the steps involved with deleting a service in the database server according to one embodiment of the invention.

The process by which a service FA210 is deleted is now described. FIG. 75 is a data flow diagram illustrating the messages involved in deleting a service FA210. FIG. 76 is an operational flow chart illustrating the steps involved with deleting a service FA210. Referring now to FIGS. 75 and 76, in a step FD202 server monitor FA212 sends a DELETE SERVICE REQUEST FD102 to control process FA202. DELETE SERVICE REQUEST FD102 is a request that a particular service FA210 be deleted from DBS BA104. The service FA210 being deleted is referred to as cancelled service FA210C.

In a step FD204, control process FA202 determines whether that cancelled service FA210C exists.

If cancelled service FA210C does exist, control process FA202 sends a DELETE MESSAGE FD104 to delete cancelled service FA210C. This occurs in a step FD206.

In a step FD208, cancelled service FA210C sends a SERVICE DELETED MESSAGE FD106 to control process FA202. SERVICE DELETED MESSAGE FD106 informs control process FA202 that cancelled service FA210C has performed all the necessary functions in step FD208 to shut itself down.

In a step FD210, cancelled service FA210C shuts itself down. In this step, cancelled service FA210C closes any databases that were associated with it, cancelled service FA210C breaks its connection to the network (it closes its network socket), and cancelled service FA210C erases its portion of shared memory FA206. Cancelled service FA210C then returns this portion of shared memory FA206 for other uses.

In a step FD212, control process FA202 sends a DELETE SERVICE RESPONSE FD108 to server monitor FA212. DELETE SERVICE RESPONSE FD108 informs server monitor FA212 that cancelled service FA210C has been deleted.

In a step FD214, control process FA202 updates shared memory FA206 to indicate that cancelled service FA210C will no longer be utilizing its portion of shared memory FA206.

Figure 77:
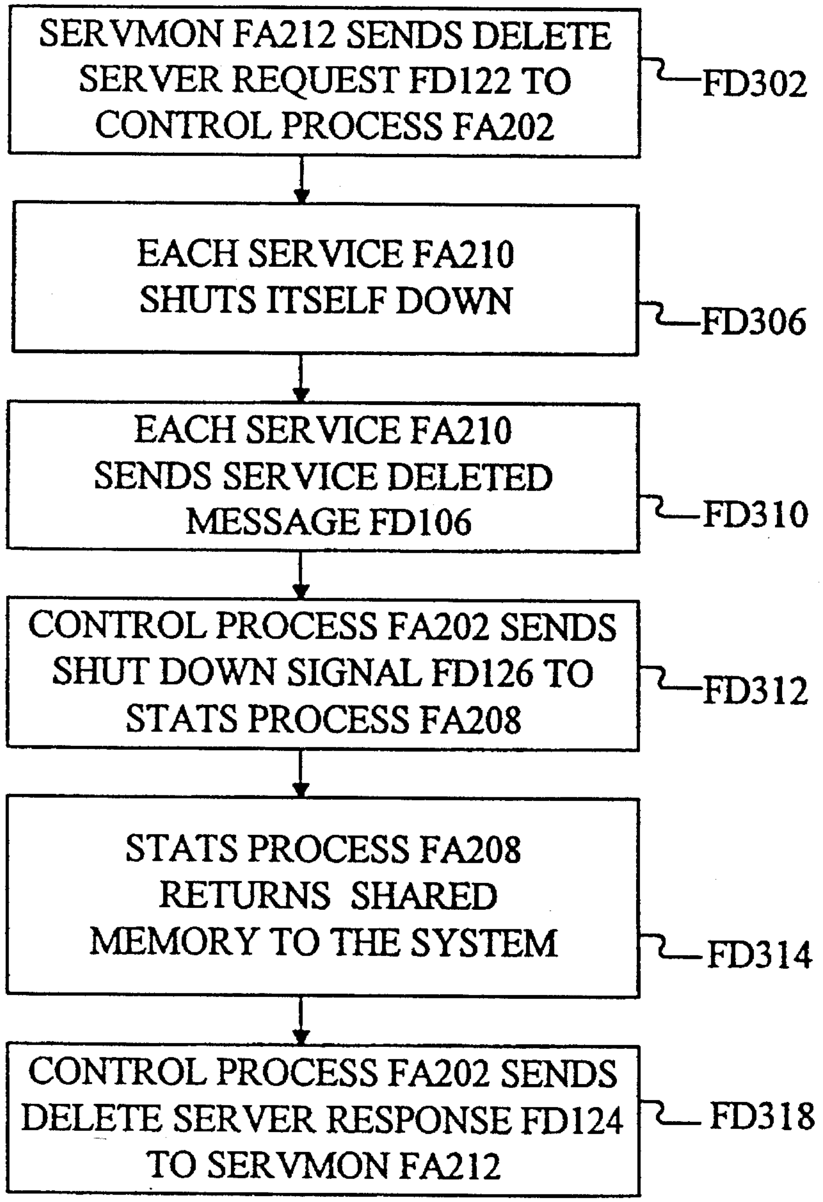
FIG. 77 is an operational flow diagram illustrating the steps involved in shutting down the database server according to one embodiment of the invention.

The above discussion describes how an individual service FA210 is shut down. The process by which the entire DBS BA104 is shut down is now described. FIG. 77 is an operational flow diagram illustrating the steps involved in shutting down DBS BA104. Referring now to FIGS. 75, 76, and 77, to shut down DBS BA104, server monitor FA212 sends a DELETE SERVER REQUEST FD122 to control process FA202. This occurs in a step FD302. Upon receipt of DELETE SERVER REQUEST FD122, control process FA202 sends a DELETE SERVICE MESSAGE FD104 to each service FA210 that is operational.

In a step FD306, each service FA210 shuts itself down as described above with reference to step FD208.

In a step FD310, each service FA210 sends a SERVICE DELETED MESSAGE FD106, indicating to control process FA202 that service FA210 is shut down.

In a step FD312, control process FA202 sends a SHUT DOWN SIGNAL FD126 to stats process FA208. In a preferred embodiment, stats process FA208 does not communicate via LAN BA122. Instead, in the preferred embodiment, stats process FA208 is a Unix™ process that communicates via Unix™ signals to control process FA202.

In a step FD314, upon receipt of SHUT DOWN SIGNAL FD126, stats process FA208 returns its portion of shared memory FA206 to the system for use by other processes.

In a step FD318, control process FA202 sends a DELETE SERVER RESPONSE FD124 to server monitor FA212. Delete server response FD124 informs server monitor FA212 that the DBS BA104 has been shut down.

2.4.3 Searches Using Database Server BA104

Conventional database servers search for requested data in a highly software-intensive manner. With these conventional servers, database searches are coded in software. Therefore, if a change is made to the desired search, the search code has to modified, recompiled, and released. This is time consuming and affects service.

One technique used by DBS BA104 is a data-driven approach to searches. In this approach, the search is made based on records in the database. DBS BA104 searches through a series of records to find a correct record having the desired data. The search is performed by using a key to find an initial, or root, record. Data found in various fields in the root record are used to find a next record in the series. Similarly, data found in fields in this next record are used to find a subsequent next record. This search continues until a last record is found.

An advantage of this data-driven approach is that searches are less software-intensive. The search is driven by the data contained in each record found in a series. Therefore, the search strategy can be changed simply by updating fields (data) in some or all of the records.

Additionally, most conventional database servers require that connections between clients and servers be established before any requests can be made. This means that the client and server must first communicate with each other to exchange information about each other. This must be done before any data is retrieved. The conventional database server is then responsible for managing each client's use of the database. For example, the database server is responsible for knowing whether the client is still active and what that client's current position is in the file. This management overhead takes away from the performance of the database.

The DBS BA104 according to the present invention does not require a session to be established before information can be exchanged between the client and server. With DBS BA104, it is the responsibility of each client using DBS BA104 to maintain track of its position in the file. By shifting this responsibility to the client, DBS BA104 can concentrate more on the task of doing the actual look-ups, and less on management overhead. Thus look-ups using DBS BA104 are extremely fast.

To illustrate the manner in which DBS BA104 performs searches for data records, a data search is now described in terms of two examples. The first example is a search performed by DBS BA104 when it receives a GET CALL ID MESSAGE BA306 from CMP BA102. The second example is how DBS BA104 performs a search when it receives a request for a called number translation, such as an 800 number translation.

2.4.3.1 Call ID Look-up Using Database Server

Figure 78A:
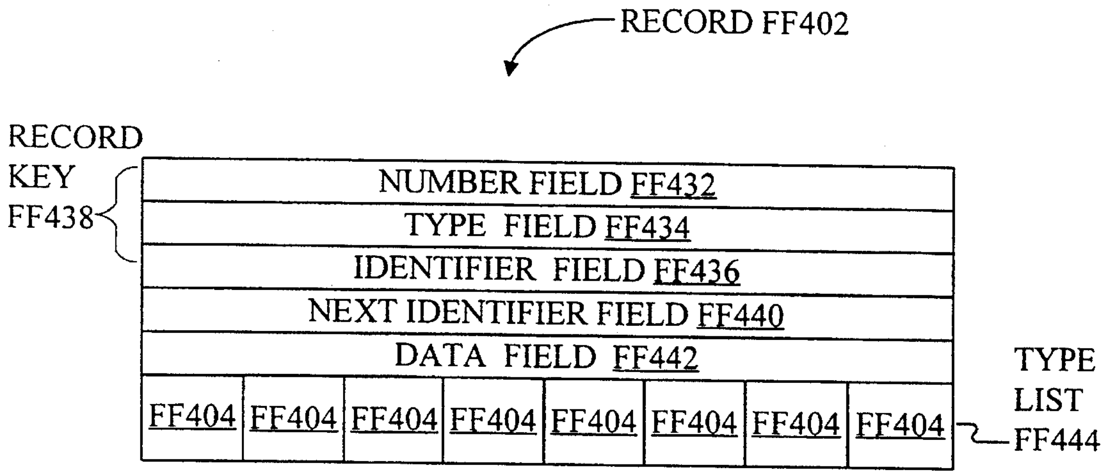
FIG. 78A is a diagram illustrating the configuration of a call ID record in call ID database according to one embodiment of the invention.

A data search in response to a CALL ID LOOK-UP MESSAGE BA306 is now described. FIG. 78A is a diagram illustrating the configuration of a call ID record in CALL ID DATABASE FA214A. Referring now to FIG. 78A, the search of CALL ID DATABASE FA214A is a search performed using CALL ID RECORDS FF402. CALL ID RECORD FF402 includes several fields. These fields include a NUMBER FIELD FF432, a TYPE FIELD FF434, an IDENTIFIER HELD FF436, a NEXT IDENTIFIER FIELD FF440, DATA FIELD FF442, and a TYPE LIST FF444.

NUMBER FIELD FF432 can include information such as ANI, time of day, day of week, called number, originating number, and the like. TYPE FIELD FF434 can contain information such as switch circuit, called number, types of called number, authorization code, time of day, day of week, type of ANI, and the like. IDENTIFIER FIELD FF436 is used to identify a level within CALL ID DATABASE FA214A at which CALL ID RECORD FF402 resides.

NEXT IDENTIFIER FIELD FF440 indicates the level in CALL ID DATABASE FA214A at which the search will continue.

DATA FIELD FF442 contains the call parameters, and optionally additional information, for that CALL ID RECORD FF402.

TYPE LIST FIELD FF444 is used to indicate how to search for the next CALL ID RECORD FF402 within CALL ID DATABASE FA214A.

Searches through CALL ID DATABASE FA214A are performed using a record key FF438. Record key FF438 comprises NUMBER FIELD FF432, TYPE FIELD FF434, and IDENTIFIER FIELD FF436.

Figure 79:
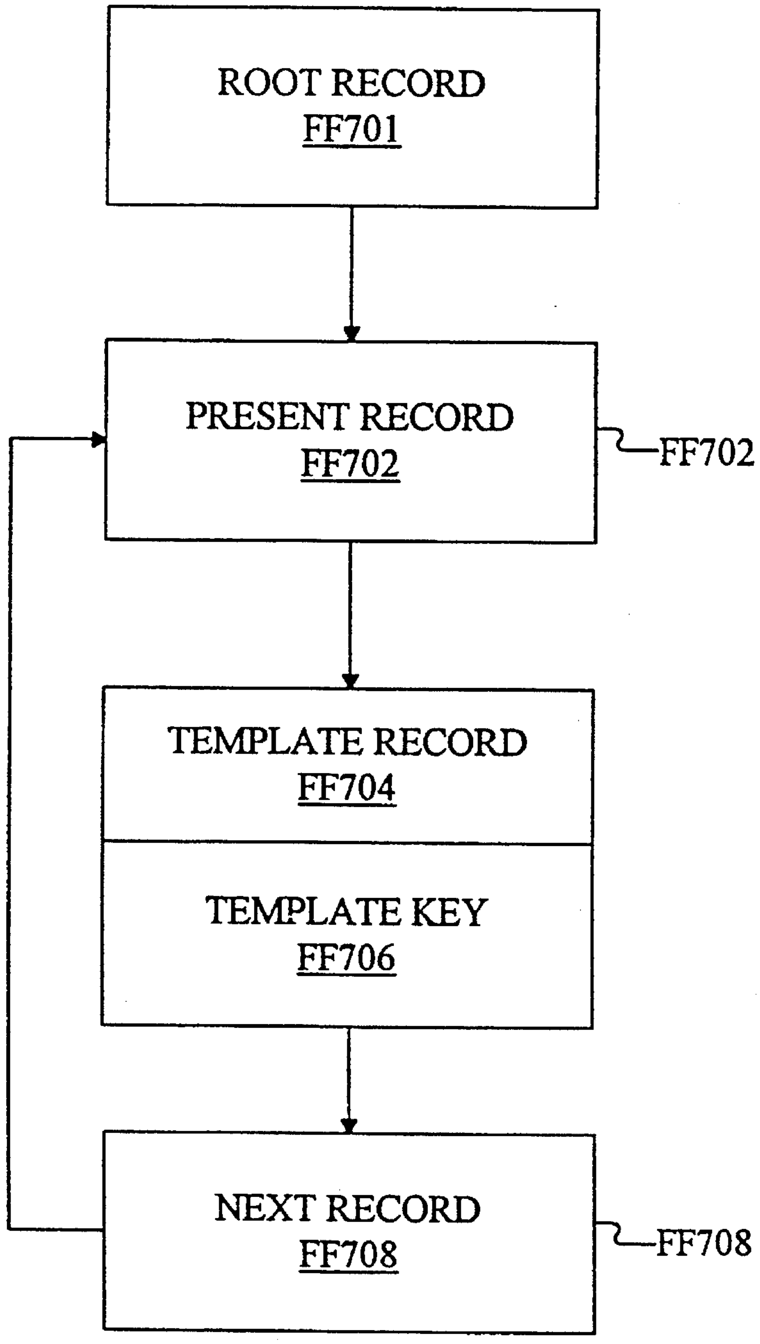
FIG. 79 is a block diagram illustrating a high-level concept of how a data search is performed in response to a get call ID message according to one embodiment of the invention.

FIG. 79 is a block diagram illustrating a high-level concept of how a data search in response to a get call ID message BA306 is performed.

Referring now to FIG. 79, this high-level concept is now described. The search first finds a root record FF701 and uses root record FF701 as a present record FF702. Present record FF702 is used to construct a template record FF704 having a template key FF706. Template key FF706 and template record FF704 are used to search for the next record in the search. This record is referred to as "next record FF708". Root record FF701, present record FF702, template record FF704, and next record FF708 each have the same data structure as call ID database call ID record FF402.

Figure 80:
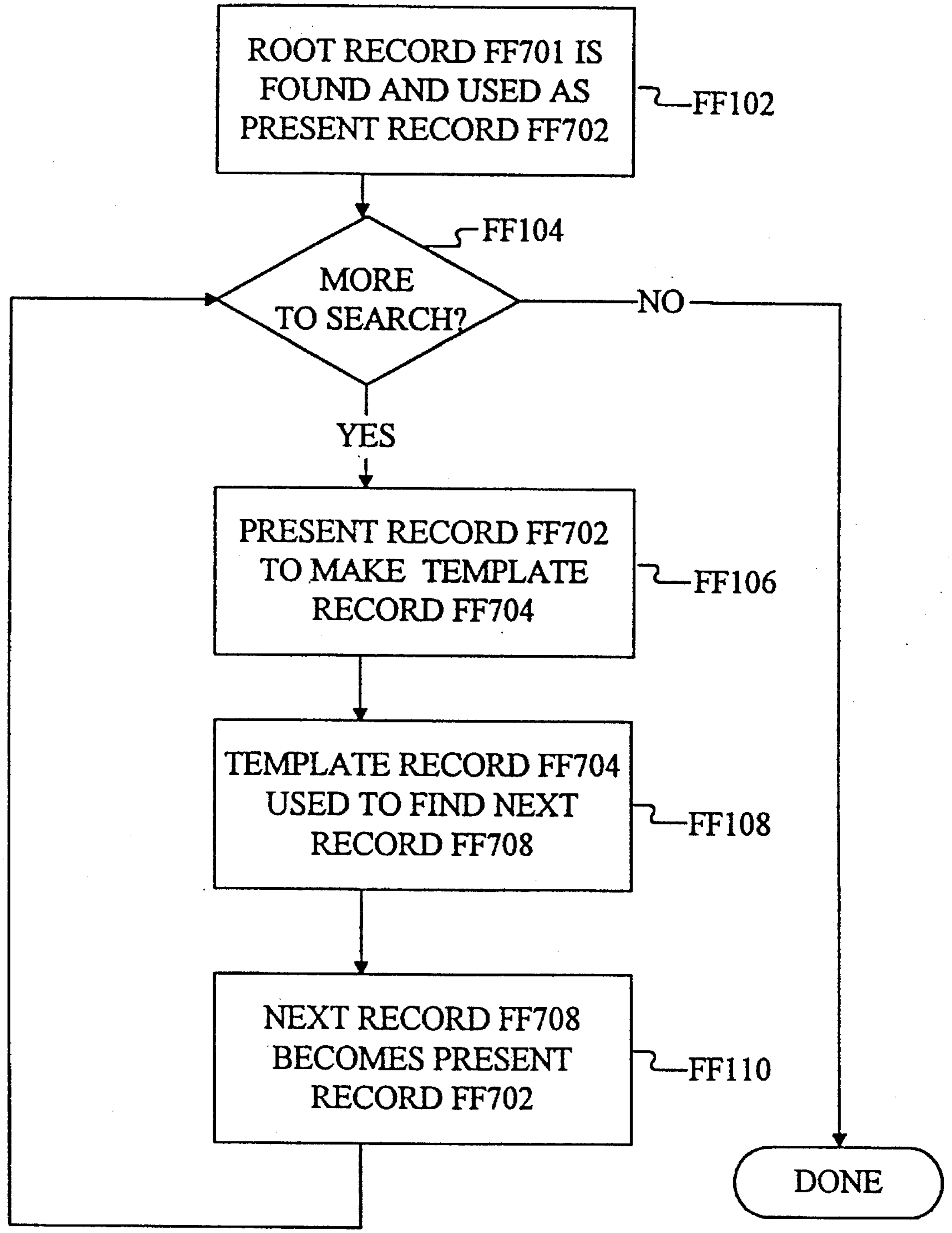
FIG. 80 is a high-level operational flow diagram illustrating the high-level concept of how a data search in response to a get call ID message is performed according to one embodiment of the invention.

FIG. 80 is a high-level operational flow diagram illustrating the high-level concept of how a data search in response to a GET CALL ID REQUEST MESSAGE BA306 is performed. Referring now to FIGS. 79, 80, and 78A, in a step FF102, call ID service FA210A locates a root record FF701 in call ID database FA214A (described in FIG. 83, below). Call ID service FA210A uses root record FF701 as present record FF702.

In a step FF104, if type list FF444 in present record FF702 indicates there are no more records to search, the search is done. In this case call parameters BA308 are retrieved from data field FF442 of present record FF702 and sent to CMP BA102.

If type list FF444 in present record FF702 indicates there are more records to search, in a step FF106, present record FF702 is used to make a template record FF704 for the search. Present record FF702 also defines the portion of the database in which to confine the search.

In a step FF108, the template record FF704 is used to search for and find the next record FF708. When next record FF708 is found, in a step FF110, next record FF708 becomes the new present record FF702, and the search process continues at step FF104.

Figure 81:
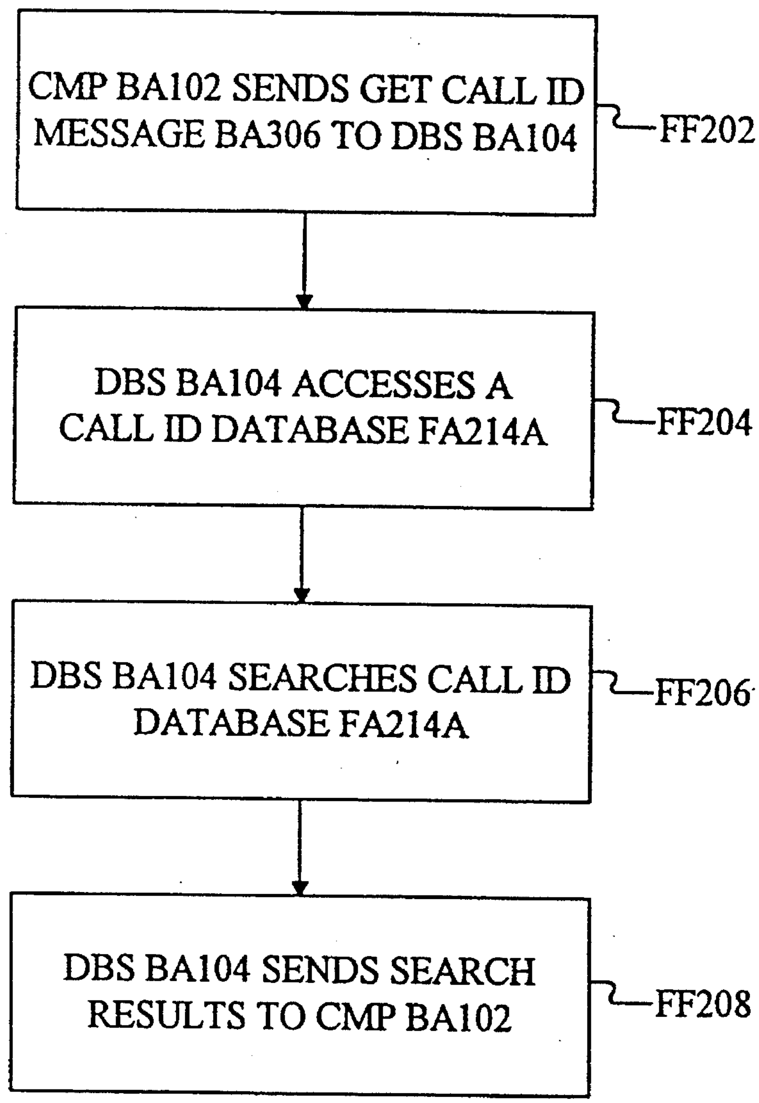
FIG. 81 is a high-level operational flow diagram illustrating the basic steps performed when database server receives a get call ID request from the central message processor according to one embodiment of the invention.
Figure 82:
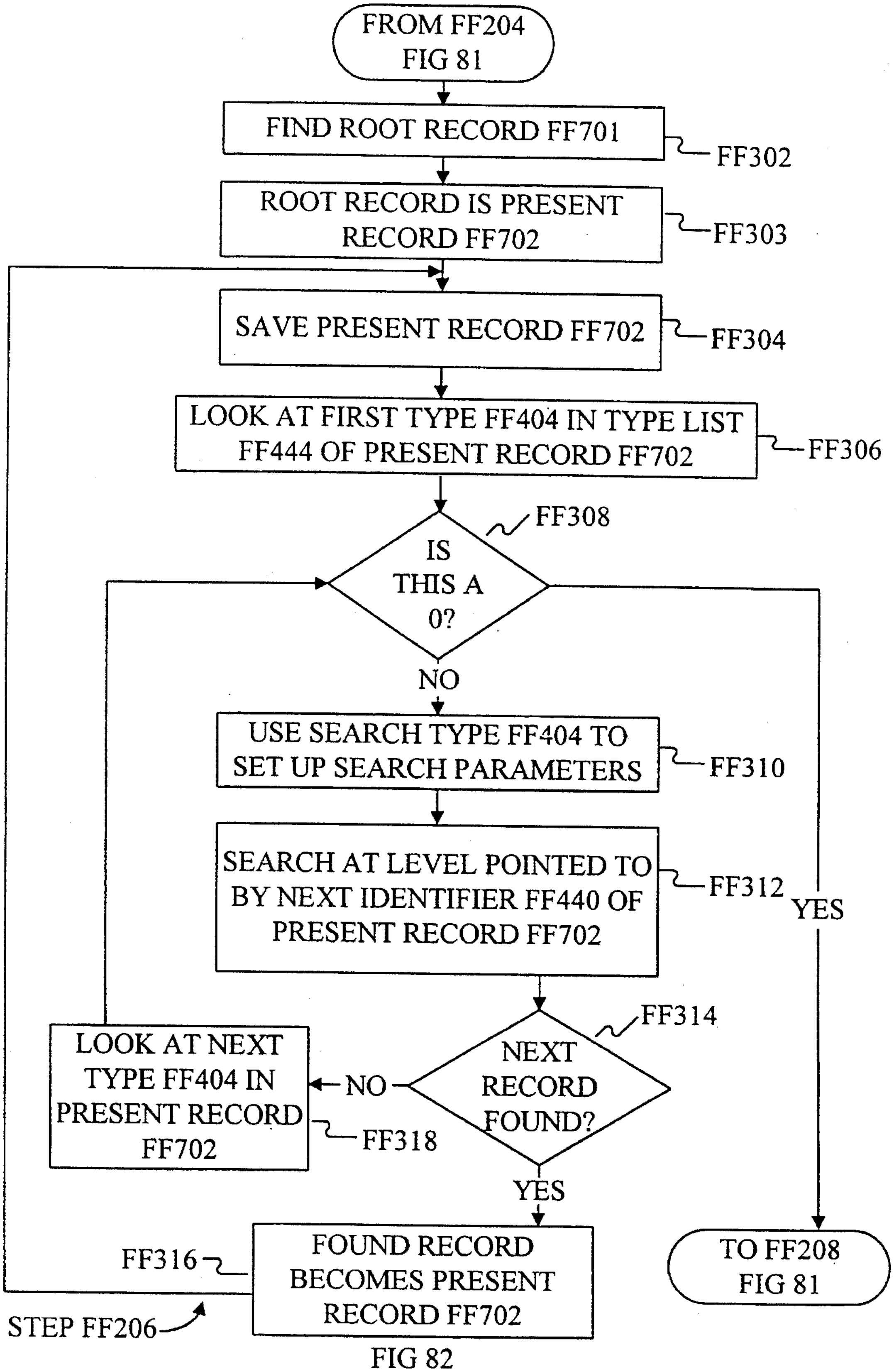
FIG. 82 is a detailed operational flow diagram illustrating the manner in which database server searches for the appropriate data record in response to a get call ID message according to one embodiment of the invention.
Figure 83:
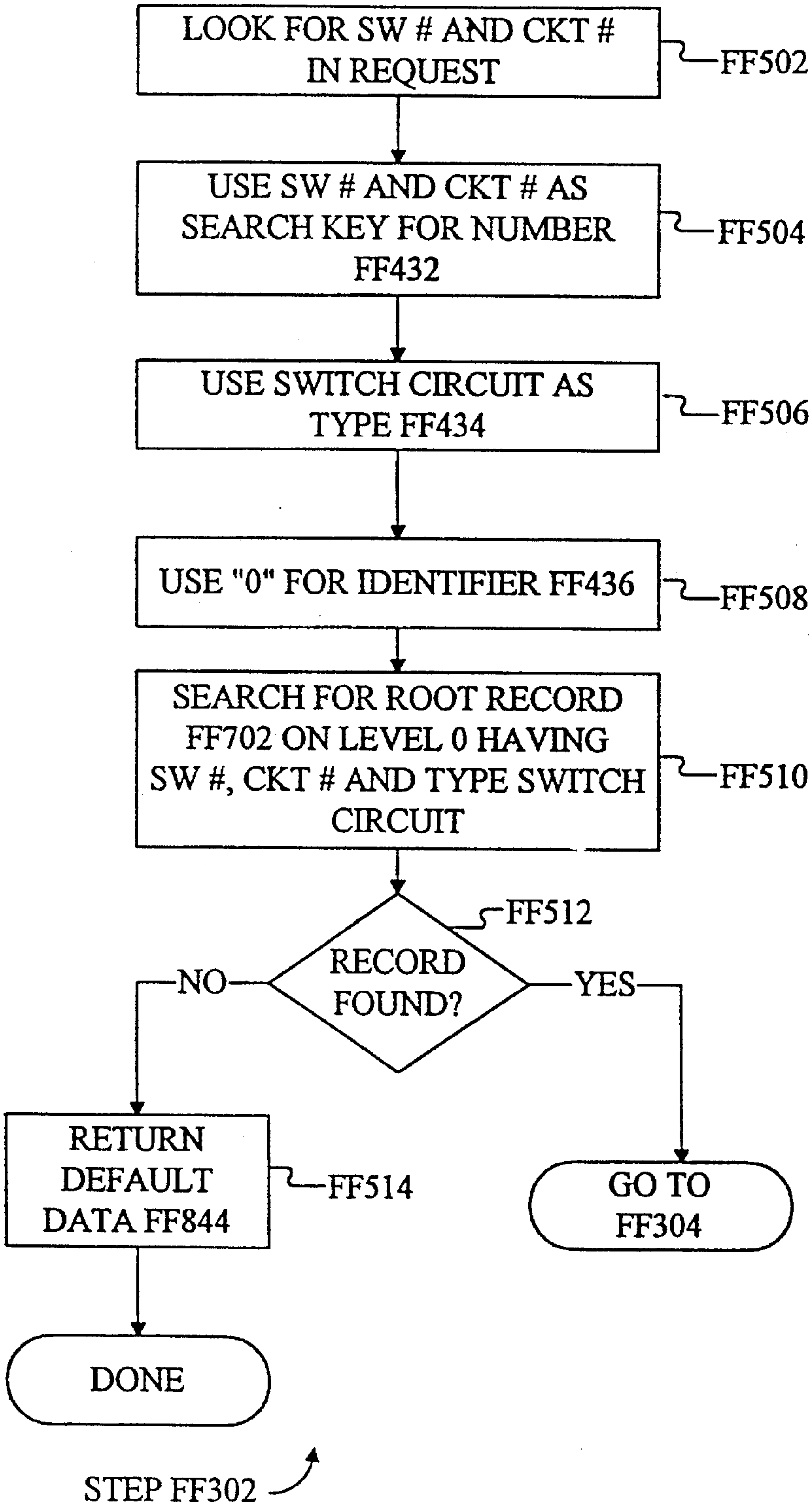
FIG. 83 is a detailed operational flow diagram illustrating the manner in which the database server finds a root record when performing the search according to one embodiment of the invention.

A more detailed description of the process by which call ID database FF214A is searched is now be described. FIG. 81 is a high-level operational flow diagram illustrating the basic steps performed when DBS BA104 receives a GET CALLID REQUEST BA306 from CMP BA102. FIG. 82 is a detailed operational flow diagram illustrating the manner in which DBS BA104 searches for the appropriate data record in response to a get call ID message BA306. FIG. 83, described below, is a detailed operational flow diagram illustrating the manner in which DBS BA104 finds a root record when performing the search.

Referring now to FIGS. 14 and 81, in a step FF202, CMP BA102 sends a GET CALLID REQUEST BA306 to DBS BA104.

In response to GET CALL ID REQUEST BA306, DBS BA104 accesses a call ID database FA214A. This access is performed using call ID database service FA210A. This access is performed in a step FF204.

In a step FF206, DBS BA104 searches for call parameters BA308 requested by get call ID message BA306. This occurs in a step FF206. More specifically, in step FF206, call ID database service FA210A searches call ID database FA214A for the correct call ID record FF402 that contains the data (call parameters BA308) requested by get call ID message BA306.

FIG. 82 is an operational flow diagram illustrating the manner in which this search in step FF206 is performed. Turning now to FIG. 82, in a step FF302, call ID database service FA210A first locates root record FF701. Root record FF701 is the record used to begin the search for call parameters BA308. The manner in which DBS BA104 finds root record FF701 is fully described with reference to FIG. 83 below.

In a step FF303, root record FF701 found in step FF302 is designated as present record FF702 for the purpose of performing the search operation.

In a step FF304, present record FF702 is saved. As will be described below, if no subsequent call ID record FF402 is found in the search, data FF442 within present record FF702 are returned as call parameters BA308.

In a step FF306, call ID database service FA210A examines type list FF444. Type list FF444 includes several search types FF404. Search types FF404 are listed in type list FF444 in the order in which they are to be used for the search. In other words, they are prioritized. The search is performed at step FF306 using the highest priority search type FF404 in type list FF444.

In a step FF308, if the highest priority search type FF404 of present record FF702 indicates the search is completed, (in a preferred embodiment, is a '0'), present record FF702 is the record that contains call parameters BA308 within its data field FF442. In this case, the operation continues at step FF208 (FIG. 81).

On the other hand, if in step FF308 it is determined that the first type FF404 in type list FF444 does not indicate that the search is done (is not a 0 in a preferred embodiment), the search continues in a step FF310.

In step FF310, call ID database service FA210A uses the search type FF404 examined in step FF308 to set up template record FF704. Template record is used to search for next call ID record FF402 in the search. In this step, database service FA210 builds template record FF704 by putting the search type FF404 into type field FF434 of template record FF704. The type indicated by search type FF404 is put into the number field FF432 of template record FF704. The next identifier FF440 from present record FF702 is put in the identifier field of template record FF704.

These three fields in template call ID record FF402 comprise template record key FF706. It is this record key FF706 that is used to search for the next call ID record FF402 in the search. Call ID database service FA210A searches for next record FF708 by searching for a record whose record key FF438 matches the record key FF706 of template record FF704.

In a step FF312, the search using template record FF704 is performed. This search is performed at a level in call ID database FA214A identified by next identifier FF440 of present record FF702. This limits the search to the group of call ID records FF402 existing at that level within call ID database FA214A.

In a step FF314, if the next record FF708 in the search is found, the operation continues at step FF316. If, on the other hand, next record FF708 is not found, the operation continues at a step FF318.

In a step FF316, if next record FF708 is found, next record FF708 becomes present record FF702 and the search continues at step FF304. This new present record FF702 (previously next record FF708) becomes present record FF702 for the purpose of the search.

If next record FF708 is not found, in step FF318, call ID look-up service FA214A examines the next highest priority type FF404 in type list FF444 of present record FF702 to determine if any additional searches are to be performed. The operation now continues at step FF308, where it is determined whether this next highest priority search type FF404 indicates the search is completed. If the search is not completed, the search continues in step FF310 using this next highest priority search type FF404 and present record FF702 to set up search parameters.

If this next highest priority search type FF404 indicates the search is completed, the operation continues at step FF208 (FIG. 81).

Referring now to FIG. 81, in a step FF208, call ID look-up service FA210A sends data FF442 found in the last saved present record FF702 to CMP BA102. This data FF442 is data that makes up call parameters BA308.

Figure 78B:
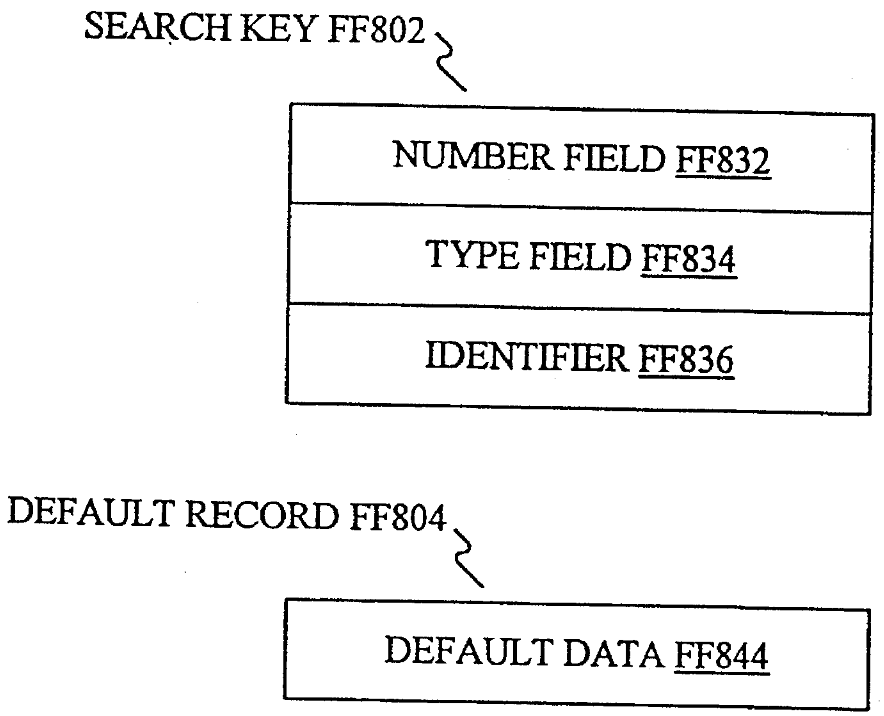
FIG. 78B is a diagram illustrating the structure of a search key used to search for a root record and further illustrating a default record having default data according to one embodiment of the invention.

The first step in performing the search of call ID database FA214A occurs in step FF302. The process by which call ID database service FA210A finds root record FF701 is now described. FIG. 83 is a block diagram illustrating the process by which call ID database service FA210A finds root record FF701. FIG. 78B is a diagram illustrating the structure of a search key used to search for root record FF701 and illustrating a default record FF804.

Referring now to FIG. 83, in a step FF502 call ID database service FA210A obtains a switch number and a circuit number in get call ID request message BA306. In a step FF504, this switch number and circuit number found in get call ID request message BA306 are used as a number field FF832 of a search key FF802.

In a step FF506, the switch circuit identification included in get call ID request message BA306 is inserted in type field FF834 of search key FF802.

In a step FF508, '0' is used as the identifier FF836 of search key FF802.

In a step FF510, call ID database service FA210A uses search key FF802 to search for root record FF701. In this step, call ID database service FA210A is using search key FF802 to find a root record FF701 having a number field FF832 and a type field FF834 matching those of search key FF802. Identifier FF836 indicates that a search will be performed on level 0. In a step FF512, if root record FF701 is found, the operation continues at step FF303 where root record FF701 becomes a present record FF702 and the search is performed as described with reference to FIGS. 82 and 81.

If root record FF701 is not found, in a step FF514, a default record is retrieved containing default data FF844. This default data FF844 is returned as call parameters BA308.

2.4.3.2 Number Translation Look-up Using Database Server

Figure 84:
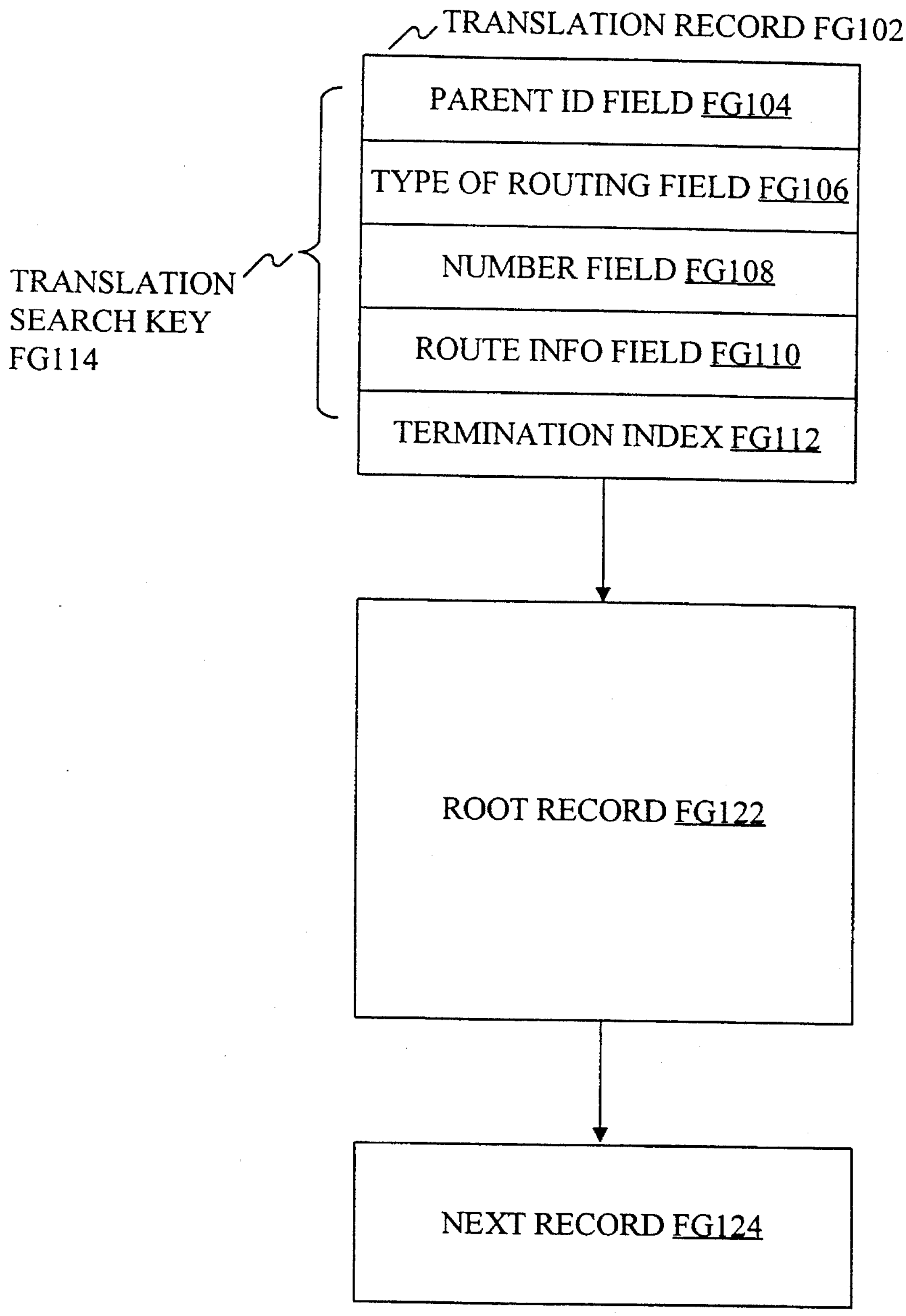
FIG. 84 is a diagram illustrating a translation record according to one embodiment of the invention.
Figure 85:
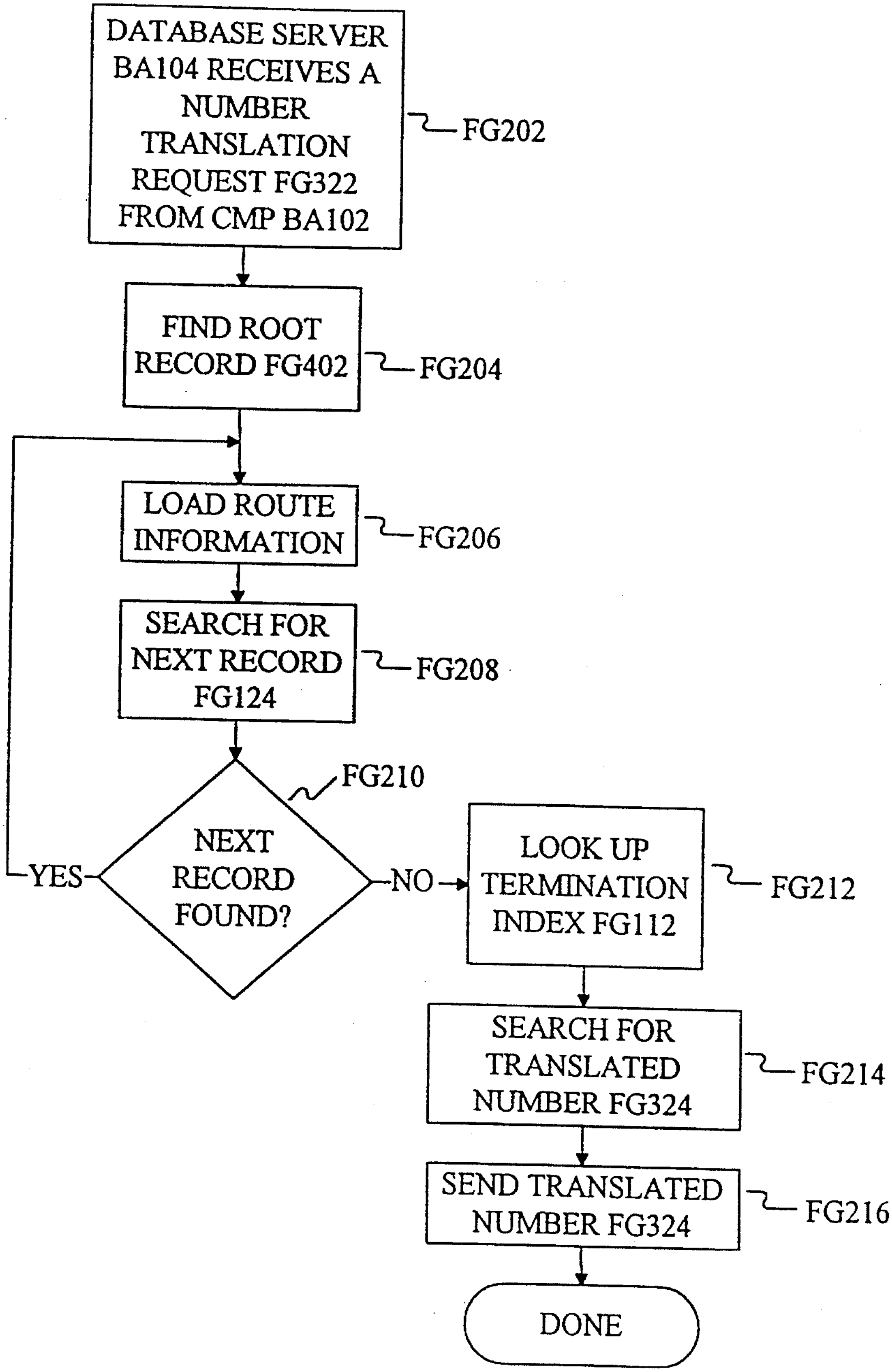
FIG. 85 is an operational flow diagram illustrating the process of performing a number translation look-up according to one embodiment of the invention.
Figure 86:
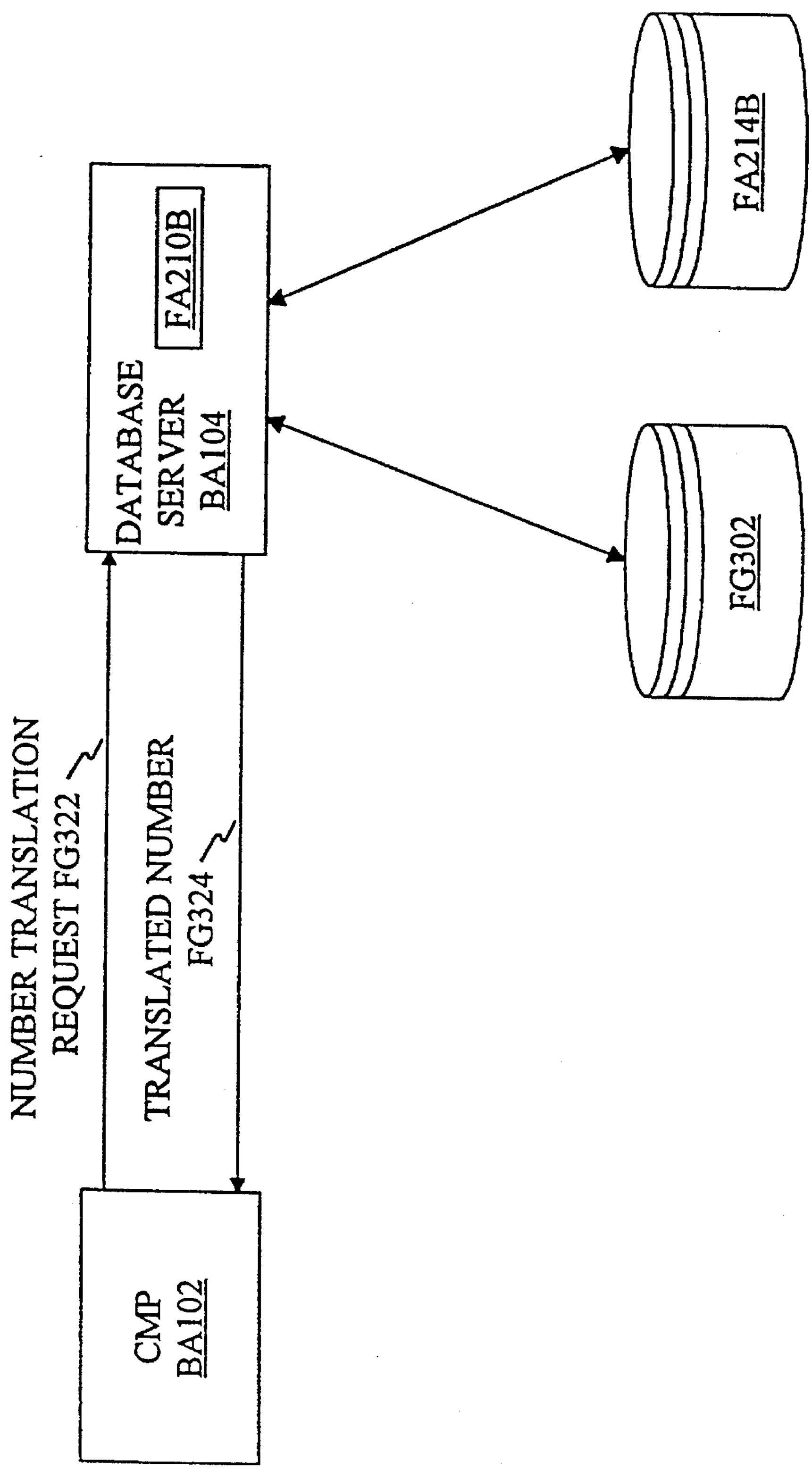
FIG. 86 is a data flow diagram illustrating the data flow that occurs when a number translation is requested according to one embodiment of the invention.

Another example illustrating the manner in which DBS BA104 performs searches is a search for a number translation. The manner in which DBS BA104 performs number translation searches is now described. FIG. 84 is a diagram illustrating a translation record FG102. FIG. 85 is an operational flow diagram illustrating the process of performing a number translation look-up. FIG. 86 is a data flow diagram illustrating the data flow that occurs when a number translation is requested.

Referring now to FIG. 84, number translations are performed using a translation record FG102. Translation records FG102 include a PARENT ID field FG104, a TYPE OF ROUTING field FG106, a NUMBER field FG108, a ROUTE INFO field FG110, and a TERMINATION INDEX field FG112. PARENT ID field FG104, TYPE OF ROUTING field FG106, NUMBER field FG108, and ROUTE INFO FIELD FG110 make up a translation search key FG114. Translation search key FG114 is used to search for the correct translation record FG102.

Referring now to FIGS. 84, 85 and 86, in a step FG202 DBS BA104 receives a NUMBER TRANSLATION REQUEST FG322 from CMP BA102. More specifically, number translation service FA210B receives number translation request FG322.

In a step FG204, number translation service FA210B locates a route record FG402 for the search. Root record FG402 is found simply by looking at the root level for a record having a number in the number field FG108 that is the number to be looked up.

In a step FG206, information in NUMBER TRANSLATION REQUEST FG322 is loaded into root record FG402 to continue the search. In the case of a root record FG402, the parent ID is '0' (indicating level 0). Route information contained in number translation request BA322 is loaded into ROUTE INFORMATION field FG110 of root record FG402. For example, if the type of routing in TYPE OF ROUTING FIELD FG106 of root record FG402 is originating state, then the state in which the call originated is loaded into ROUTE INFORMATION field FG110 of root record FG402. Thus, if the person placing the call originated the call in Tennessee, "Tennessee" will be the state loaded into route information field FG110. In a step FG208, number translation service FA210B accesses translation database FA214B to search for a record having fields that match root record FG122. In this step, number translation service FA210B is searching for the next record FG124 in the search.

If the next record FG124 is found (decision block FG210), the search continues at step FG206. In this and subsequent iterations, the type of routing listed in TYPE OF ROUTING field FG106 in the found record is used to direct the search.

In step FG206, the route information from number translation request BA322 is loaded into ROUTE INFORMATION field FG110. For example, this next level of search may indicate that the type of routing should be based on time of day that the call is placed. In this case, the time that the call was actually placed is loaded into ROUTE INFORMATION field FG110. The process continues at step FG208 to search for the next record, having a key that matches the record that was found in the previous iteration of FG208 with the matching route information in ROUTE INFORMATION field FG110.

If no new record is found (decision block FG210) or the next search type is normal translation, the search is completed. In this case, number translation service FA210B reads termination index FG112 from the last record found (i.e. the "next record" FG124).

In a step FG214, number translation service FA210B uses termination index FG112 to search for the translated number in a number translation database FG302.

In a step FG216, the translated number FG324 retrieved from termination database FG302 is sent to CMP BA102.

2.4.4 Number Translation

Many of the services of call processing system AB102 are based on the ability to translate a number into another number or, alternatively, into a call process definition. The number to be translated is generally an 800 number, but could be another number as well. A translation system, used to perform the number translations, is now described. FIG. 207 is a block diagram illustrating a representative architecture for a translation system. Referring now to FIG. 207, the translation system ZA100 includes a translator ZA102, a translator database ZA104, and a termination/translation database ZA106.

The main translator ZA102 is a service where translation requests are processed. Translator ZA102 can be a subsystem of another NCP AB104 such as DBS BA104 or CMP BA102, or could be a separate component (internal or external to NCP AB104). When translator ZA102 receives a request for translation it sends queries to translator database ZA104 and termination/translation database ZA106 to request look-ups. Translator ZA102 can also query other databases, such as an NPA database, if needed to obtain additional information.

The translator database ZA104 contains information required to perform searches vased on a call ANI, time, day, state, and LATA. In one embodiment, translator database ZA104 is a tree format with each called or dialed (into the switch network) number at the root (or base) of the tree. Each level of the tree comprises one search type and an optional default record.

When translator ZA102 commences a search, it is begun in translator database ZA104 at the root level. The root record, and each subsequent record contains instructions to allow searching for the next record at the next level. The search progresses through the tree from one record to the next, using information in the most recently found record to search for the next record. The search continues through as many levels as required until the last record in the search is found. This record contains a termination index.

The translation then continues by searching in termination/translation database ZA106. The search is based on the called number and the termination index retrieved from translator database ZA104. The search obtains the 10-digit terminating number or alternatively, callID information used to mute the call for additional operator handling.

The translation system ZA100 allows complex translations to be performed on any given called number, while using only a few termination records in the termination/translation database ZA106. Specifically, only one record is required for each 10-digit terminating number and for each console routing. When a specific called number is changed (for example with "800 On-the Go"), only the termination index record has to be changed to re-route the call.

3.0 Validation System

A validation system AG102 is provided to validate certain pieces of information before a call is routed to a terminating customer switch AA104 or a terminating user AA106B. For example, if originating user AA106A places a calling card call, validation system AG102 can be used to determine if the calling card number is valid. In other words, validation system AG102 validates the calling card number.

Other examples of call information that can be validated before a call is routed to a destination are whether a credit card number is valid for credit card calls, whether the originating user AA106A or customer AA110 is authorized to call a certain geographic destination. These are examples only, and should in no way be construed to limit the uses of validation system AG102 to these examples.

The interface between validation system AG102 and operator consoles AB108 is now described. FIG. 87 is a high-level block diagram illustrating an interface between operator consoles AB108 and validation system AG102. Referring to FIG. 87, when an operator console AB108 has a piece of information that must be validated, operator console AB108 sends a validation request GA122 to validation system AG102. Validation request GA122 includes information that operator console AB108 needs to have validated.

Upon receipt of validation request GA122, validation system AG102 evaluates the information to determine whether it is valid. The manner in which this is accomplished is fully described in this section of the document. Once the validation is performed, validation system AG102 sends a validation response GA124 to the operator console AB108 that sent validation request GA122. Validation response GA124 provides information to operator console AB108 regarding whether the information is valid.

For example, if a user places a call using a calling card, the operator console sends a validation request GA122 to validation system AG102 to validate the calling card number. Upon receipt of validation request GA122, validation system checks the calling card number against validation databases (discussed below) to determine whether the calling card number is valid. Once a determination has been made as to whether the calling card number given is valid, this information is provided to operator console AB108 in the form of validation response GA124. If the calling card number is valid, operator console AB108 sends operator response data AB126 to NCP AB104 with the information that the number is valid and the call can be completed. NCP AB104 then commands matrix switch AB106 to route the call to the destination.

Figure 88:
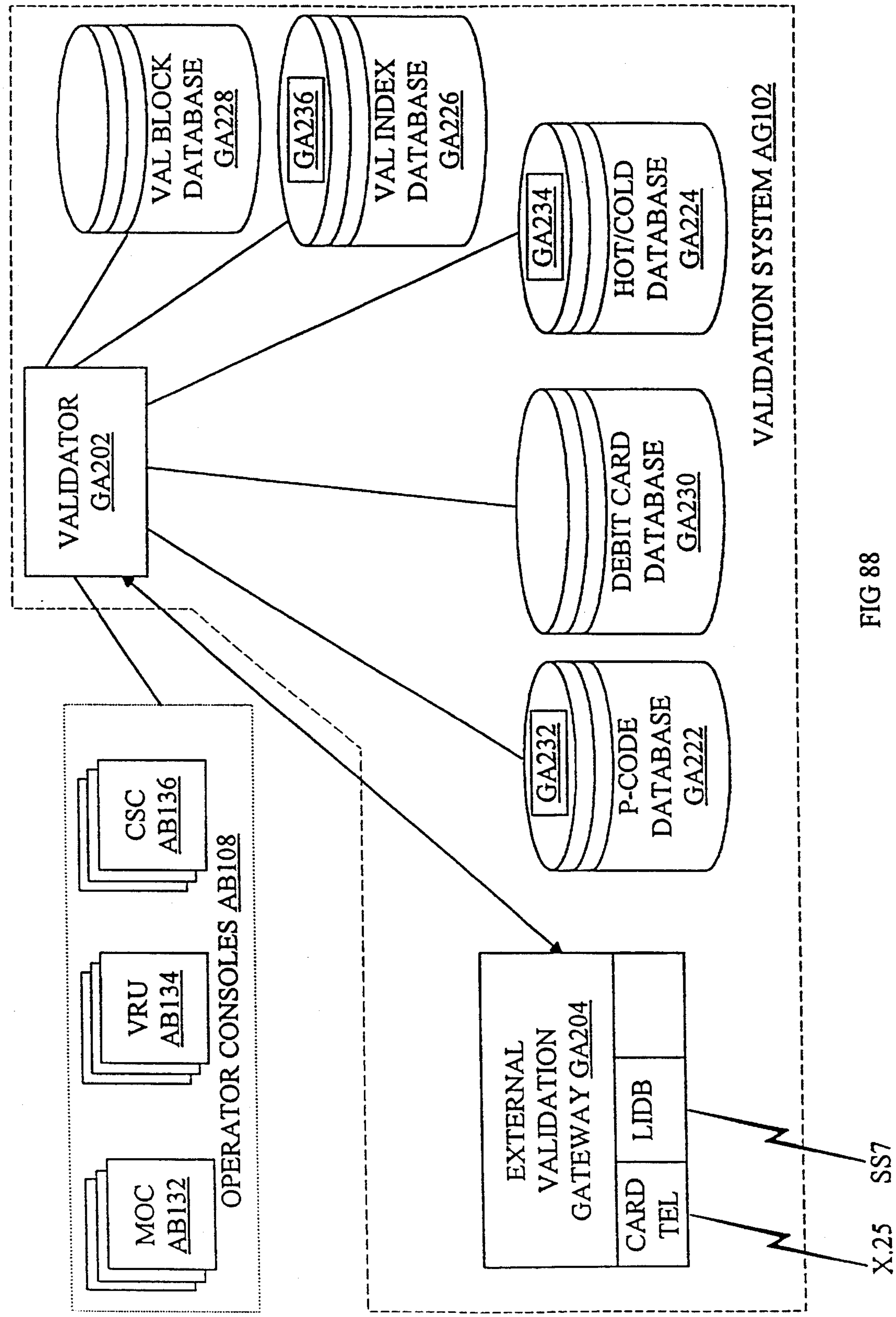
FIG. 88 is a block diagram illustrating the validation system illustrated in FIG. 87 in more detail.

FIG. 88 is a block diagram illustrating validation system AG102 in greater detail. Validation system AG102 includes a validator GA202 and an external validation gateway GA204. Validation system AG102 also includes several databases, or tables, wherein certain validation information can be found. These include a p-code database GA222, a hot/cold database GA224, a validation index database GA226, and a validation block database GA228.

Figure 89:
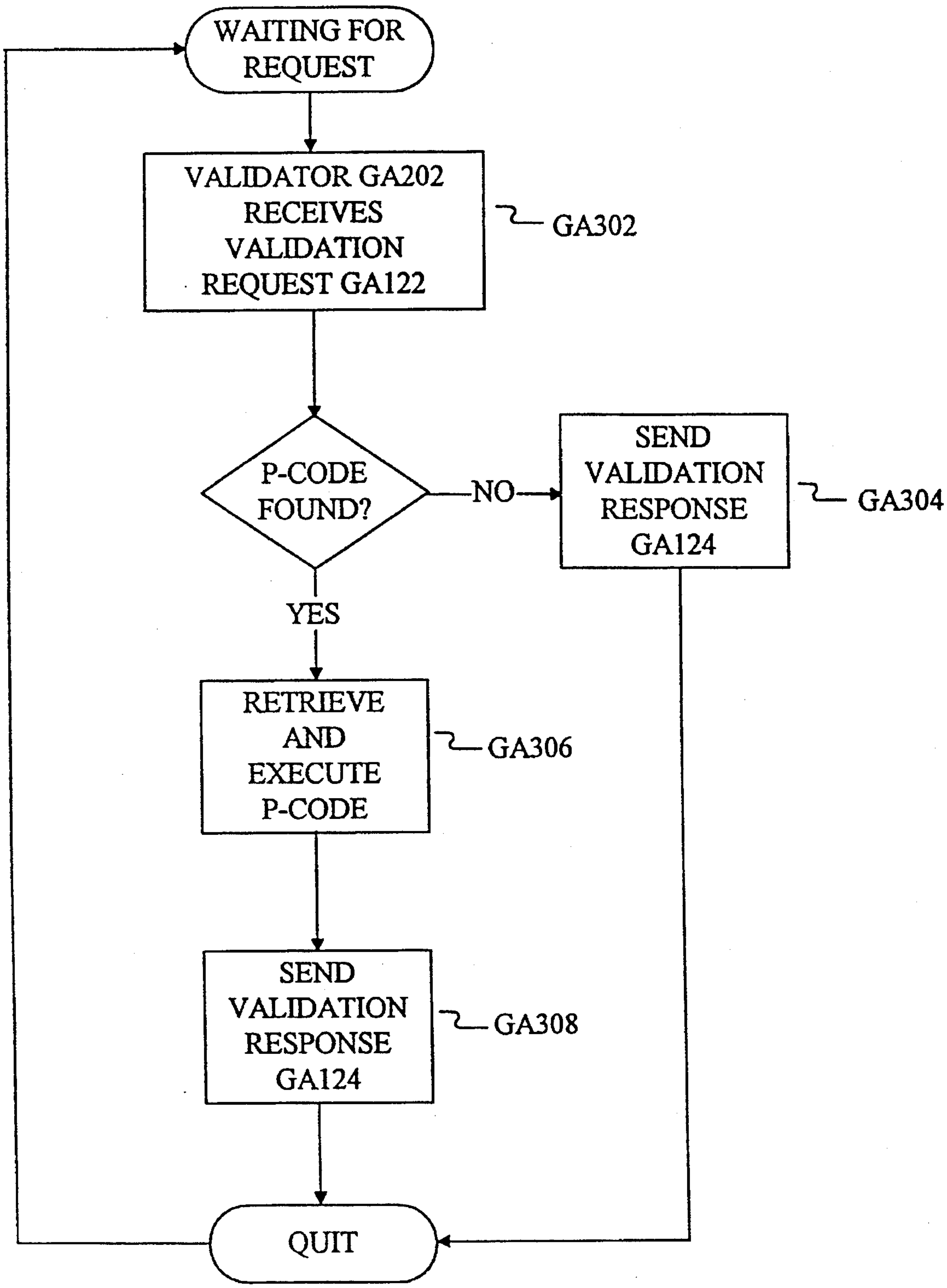
FIG. 89 is a high-level operational flow diagram illustrating the operation of the validation system according to one embodiment of the invention.

The operation of validation system AG102 is now described. FIG. 89 is a high-level operational flow diagram illustrating the operation of validation system AG102. Referring to FIGS. 88 and 89, in a step GA302, validator GA202 receives validation request GA122. Upon receipt of validation request GA122, validator GA202 accesses p-code database GA222 to retrieve p-code GA232 for the particular validation operation. P-code GA232 comprises a set of instructions to tell validator GA202 how to perform the validation necessary for the particular validation request GA122. The use of p-code GA232 allows the validation performed by validator GA202 to be customized for each customer AA110 or user AA106. Thus, different levels and types of validation can be performed based on the type of call placed, the customer AA110 through which the call was placed (if any), the particular user AA106, or other unique characteristics.

If there is no p-code for a particular validation request GA122, in a step GA304, validation system sends validation response GA124 to operator console AB108 informing operator console AB108 that the call cannot be validated.

Figure 91:
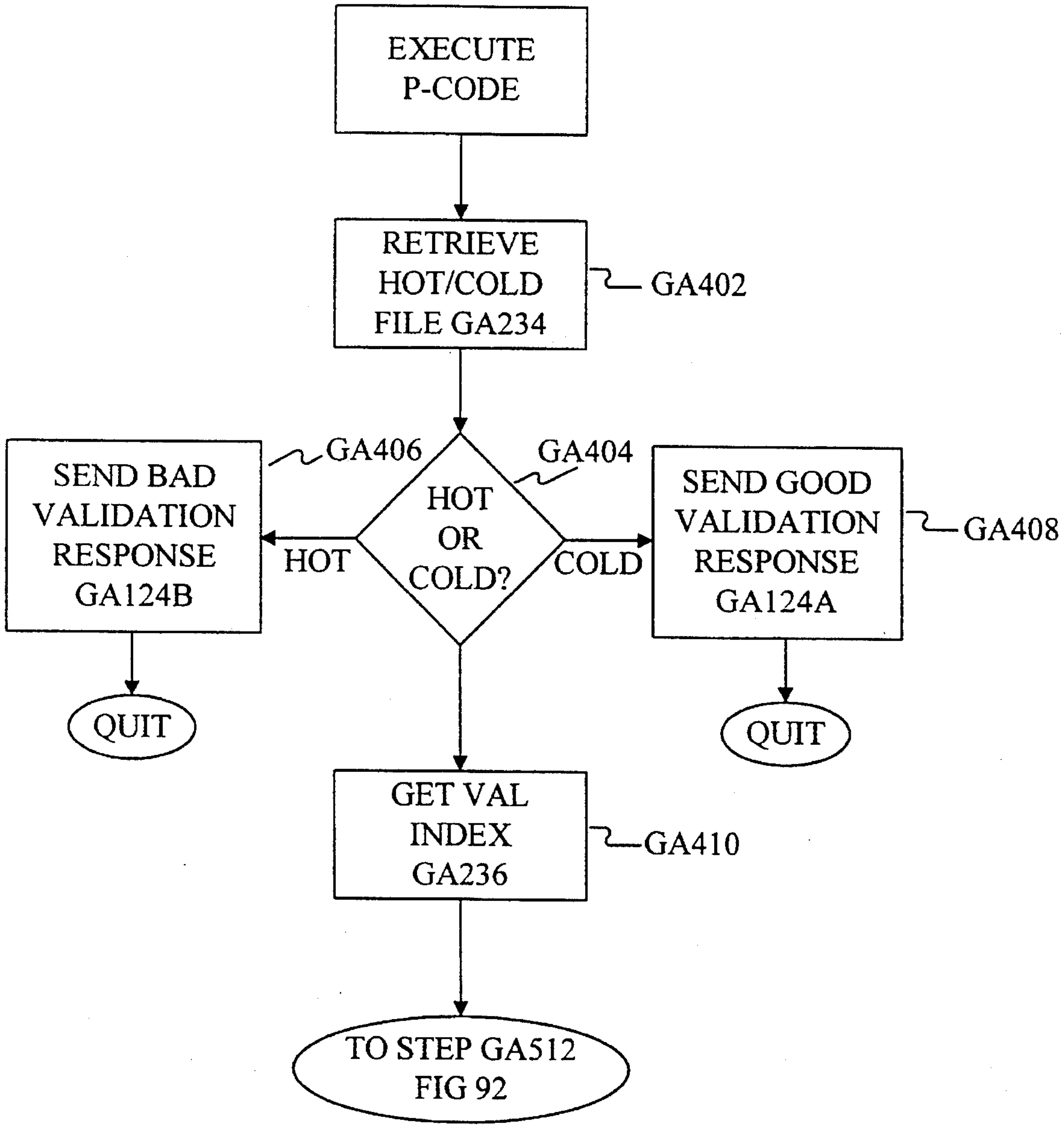
FIGS. 91 and 92, is an operational flow diagram illustrating the steps involved in executing the p-code in the validation system according to one embodiment of the invention.

If p-code GA232 is found for the validation request GA122, p-code GA232 is retrieved by validator GA202. The retrieved p-code GA232 is executed by validator GA202 to perform the validation. This occurs in a step GA306. To execute p-code GA232, validator GA202 follows the instructions found in p-code GA232. These instructions direct validator GA202 to perform specific validation operations. Step GA306 is now described in greater detail. FIG. 91 is an operational flow diagram illustrating the steps involved in executing the p-code.

Once the p-code is executed by validator GA202, validator GA202 sends validation response GA124 to operator console AB108. This occurs in a step GA 308.

Figure 90:
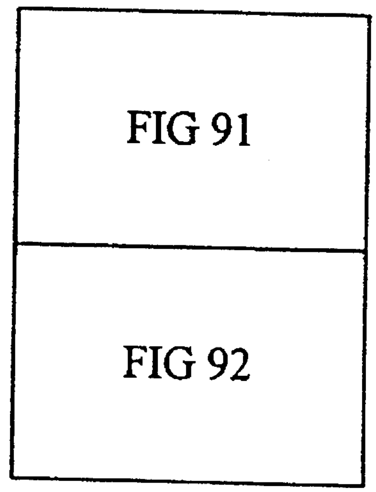
FIG. 90, which comprises
Figure 92:
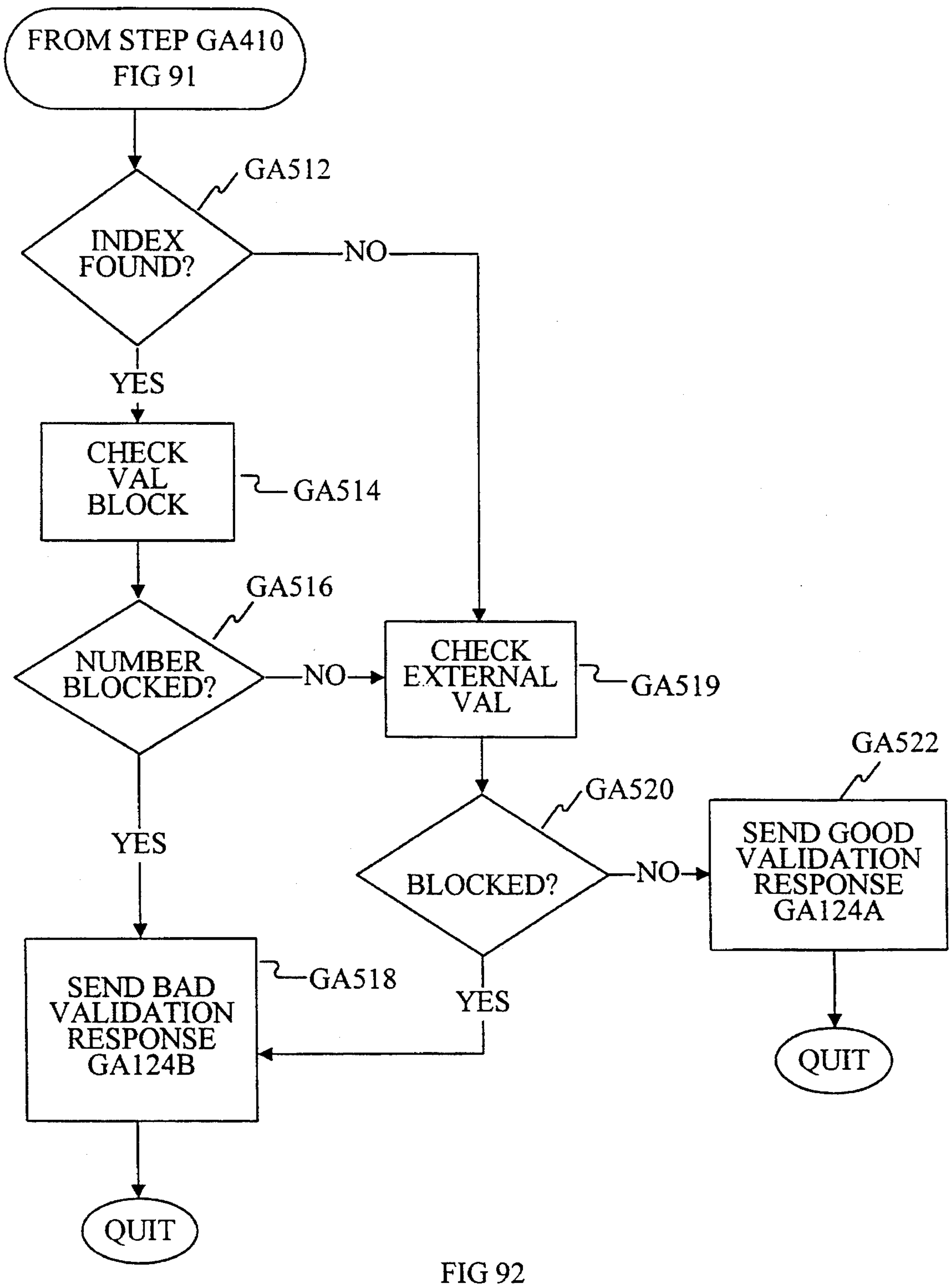

FIG. 90, which comprises FIGS. 91 and 92, is an operational flow chart illustrating an example of how validator GA202 executes p-code GA232 in step GA306. Referring now to FIGS. 88 and 91, some validations may require that a hot/cold file GA234 and hot/cold database GA224 be checked to determine if the call can be validated. In this case, validator GA202 retrieves hot/cold file GA234 for that particular call from hot/cold database GA224. This occurs in a step GA402. Hot/cold file GA234 may be indexed by calling card number, for example, to determine whether that calling card number is valid. Hot/cold file GA234 could also be indexed on credit card numbers, customer identification, user identification, and the like.

In a step GA404, validator GA202 checks hot/cold file GA234 to determine whether the parameter to be validated is hot or cold. For example, validator GA202 determines whether the calling card number for a calling card call is hot or cold.

If the number is hot, validation response GA124 is sent to operator console AB108 indicating that the call cannot be placed. This occurs in a step GA406. An example of when this might occur is when a calling card is reported stolen and the number entered in hot/cold file GA234 as hot, when a calling card is cancelled by a user AA106 or a customer AA110, or for any other reason that card should automatically be considered invalid.

As a second example, an originating telephone number may be listed as "hot" if for some reason calls are to be blocked from that number. One reason for listing an originating number as "hot" is where that number is used frequently to perpetrate fraud. For example, a particular originating telephone number may have been used in the past to place long-distance calls using stolen calling card numbers. In this case, this originating telephone number will be blocked from placing calling card calls.

If in step GA404 validator GA202 determines that the parameter checked is cold, validator GA202 sends a validation response GA124 indicating that the call is validated and should be routed to the destination. This occurs in a step GA408.

Use of hot/cold file GA234 is not limited to validating calling card numbers but can be used to validate numerous other call parameters such as subscriber AA114 identification, use of a feature by a user AA106, and the like.

If in step GA404 the parameter checked is not hot or cold, validator GA202 accesses validation index database GA226 to retrieve a validation index. This occurs in a step GA510. If validation index GA226 is found for the particular call (decision block GA512), validation index GA226 is checked in a step GA514 to determine if that call is blocked. Validation system AG102 is implemented to allow telephone calls to be blocked for numerous reasons. For example, a particular user AA106 may be blocked from calling certain cities, certain area codes, or at certain times of day. Additionally, certain users may be limited to calling only certain telephone numbers or certain cities and may be limited to using long distance services at certain times of day. These limitations, or blocks, can be placed on individual users, specific calling card numbers or debit cards, or on specific customers AA110 or subscribers AA114. This provides almost unlimited flexibility to customize the system in setting up the long distance capabilities provided to particular third-tier carriers or users. To check if a number is blocked in step GA514, a series of searches is done in the valblock database (GA288) to see if the call should be blocked. These searches are done until a record is found to be blocked or no further records are found. Each record found contains data on how to search for next record. All of these records form a tree which is traversed during these searches.

If the number is blocked (decision block GA516), validator GA202 sends validation response GA124, indicating that the call cannot be routed. This occurs in a step GA518. If, on the other hand, the number is not blocked (decision block GA516), validator GA202 proceeds to check internal validation where required. Additionally, if there is no validation index GA236, validator GA202 performs an external validation if required. The external validation is performed in a step GA518. External validations can include validating a credit card number, a third party collect call, a debit card number, a LEC calling card number, and numerous other parameters that may have to be validated in an external source.

In step GA518, validator GA202 sends a request to external validation gateway GA204 requesting that the parameter be validated. For example, validator GA202 may send a request to external validation gateway GA204 to obtain an external validation on a credit card number. In this example, external validation gateway then sends a request to an external source to validate the credit card number. One example of such an external source is the service company known as Card*Tel (located in Ft. Lauderdale, Fla., U.S.A.) which normally validates credit card numbers. When the positive or negative response is received from Card*Tel, external validation gateway GA204 provides this information to validator GA202. If external validation indicates that the call is blocked in a step GA520, a validation response GA124 is sent to operator console AB108 in a step GA518 indicating that the call should not be routed. If in step GA520 it is determined that the call is not blocked, validation response GA124 is sent to operator console AB108 indicating that the call can be routed.

It should be noted that external validation does not need to be performed on every call, i.e. those for which the card number record is resident within the DBS BA104. When external validation is not necessary, steps GA518 and GA520 can be skipped. Additionally, the other checks such as the check of hot/cold database GA224 and validation index GA226 can also be bypassed if these checks are not required for the particular call. The p-code database GA222 is what is used to provide this flexibility for different types of calls, different subscribers AA114, and different users AA106. Different instructions can be set up in p-code database GA222 to command validator GA202 to validate calls in different ways. For example, there may be a different p-code for calling cards and for debit cards and different customers and users may each have different validation procedures depending on the type of service they request from call processing system AB102. Thus, the use of different p-code file GA232 for each type of validation operation allows validations to be customized to a particular user AA106, or customer AA110. It should also be noted that additional databases could be provided to perform additional validations. For example, a debit card database GA230 could be provided to determine whether a particular debit card number is valid and whether there are sufficient funds in that card to permit the call to be routed. Debit cards could also be handled externally, via external validation gateway GA204.

The types of validation described with reference to validation system AG102 are shown by way of example to illustrate the manner in which validator GA202 performs a validation. These examples should not be construed to limit the use of validation system AG102 to only these examples.

In conventional systems, validation is typically performed by operator consoles AB108. In these cases, the consoles AB108 did the look-ups to determine whether the call was valid and should be routed. Any changes that had to be made to the validation process in these conventional system required that changes had to be made to each operator console AB108. A benefit provided by call processing system AB102 is that all of the validation function is moved to a single centralized location and validation system AG102. As a result, changes in the validation process need only be implemented to a single system instead of to each individual operator console AB108. Additionally, the use of p-code allows for customization and allows changes to be made quickly and efficiently by simply changing the instructions found in p-code database GA222.

A key feature provided by this architecture is that changes to the validation process can be made quickly and easily by simply updating p-code database GA222. Validator GA202 does not have to be recompiled to implement changes to the validation process. The manner in which p-code database is updated is discussed in detail below with reference to FIG. 93.

An additional feature provided by this architecture is that it allows customization. For example, customer A may wish to allow calls to Canada whereas customer B does not, or customer C may not wish to accept credit card calls. Thus, using p-code, third-tier carrier customers can request particular customized services from call processing system AB102, and customization can be done on a per-customer basis. Changes to the validation scheme for each customer can be made by simple changing the p-code records.

Validation is not limited to validation of the calling method such as credit card or calling card number, but also allows validation of originating and destination telephone numbers.

In the past, to update validation methods, operator consoles AB108 had to be removed from operations and recompiled with the new validation processes. With numerous operator consoles AB108, such an operation can take a long time and have an impact on services provided to customers. According to the current invention, changes in the way a call is validated can be made (even on a per subscriber AA114 basis) simply by changing the data in p-code database GA222.

4.0 Distribution System

As described in this document, call processing system AB102 is a highly data-driven system in one embodiment. Because of this, the manner in which data is handled and maintained is of paramount importance. Updates to databases must be made efficiently and in a timely fashion. Additionally, it is critical that the integrity of data within these databases is maintained at a high level.

One way to provide for a fault-tolerant operation is to use mirrored databases. This provides system redundancy that allows a system to continue to operate even if one of the redundant databases goes down.

One problem associated with redundant databases is that it can become too time-consuming to update all databases when changes are made. This can especially be a problem where a relational database is used because of the relatively slow access times associated with relational databases. However, it is important that all databases, both primary and redundant databases, are updated at or about the same time so that the data is current throughout the system.

To address this problem, the inventors have developed a distribution system intended to ensure that data integrity is maintained throughout the system. According to the inventors' concept, a primary database is updated with all data changes required. These can include updates, inserts, and deletions. A distribution system reads these updates and uses them to update all affected slave databases. In this manner, the distribution system ensures that all changes made to the primary database are incorporated into the affected slave databases.

The distribution system according to the present invention is now described within the call processing system environment. It should be noted that the distribution system could be used to effectuate updates to any system using redundant databases and is not limited to call processing applications or the embodiment described herein.

Figure 93:
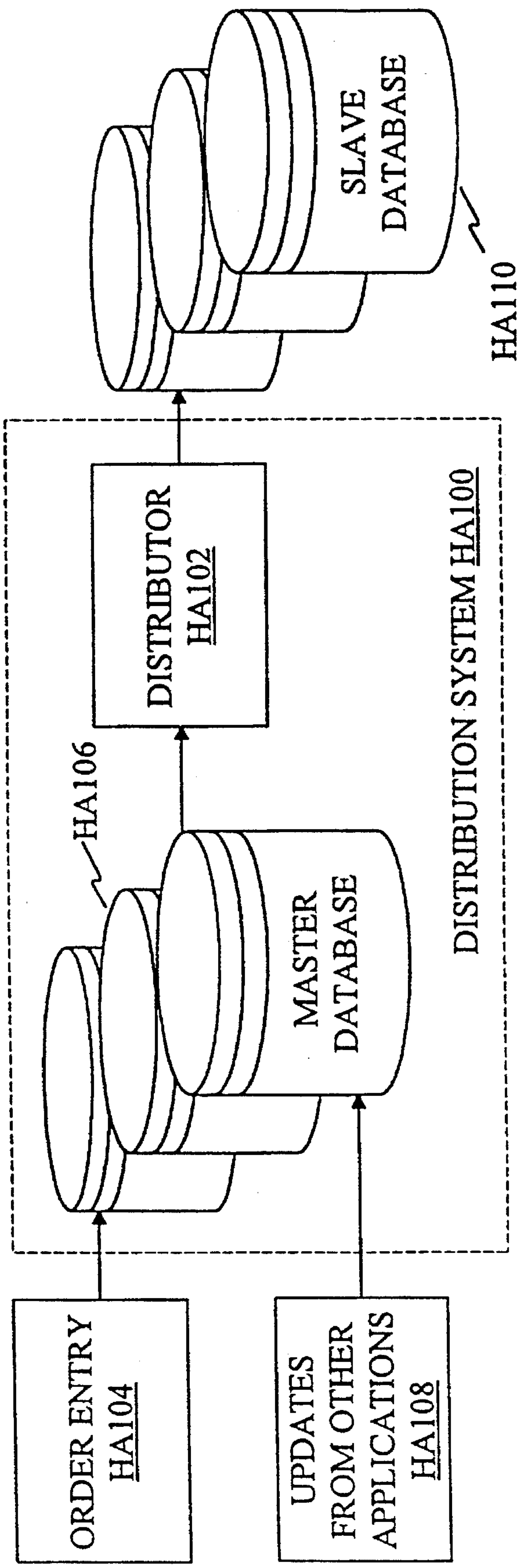
FIG. 93 is a high-level block diagram illustrating a distribution system according to one embodiment of the invention.
Figure 94:
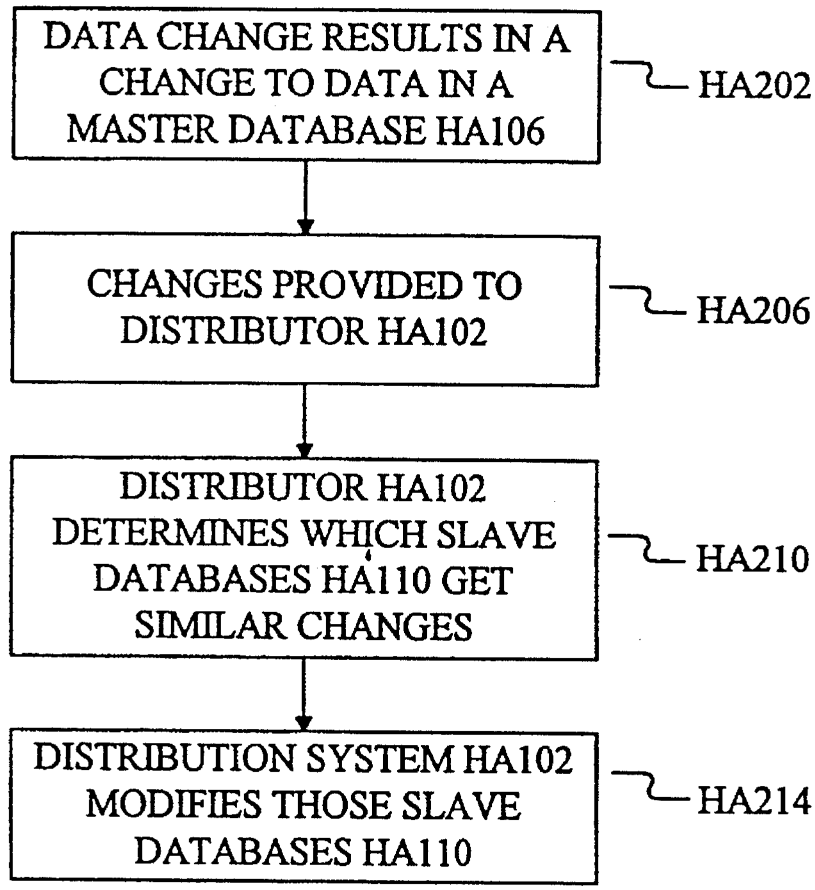
FIG. 94 is a high-level operational flow diagram illustrating the manner in which the distribution system updates slave databases to reflect updates to a primary database according to one embodiment of the invention.

FIG. 93 is a high-level block diagram illustrating the distribution system in one embodiment. FIG. 94 is a high-level operational flow diagram illustrating the manner in which the distribution system updates slave databases to reflect updates to a primary database. Referring now to FIGS. 93 and 94, in this embodiment, distribution system HA100 includes a distributor HA102 and master databases HA106. Master databases HA106 includes all databases used by call processing system AB102. Changes are made to master database HA106 by order entry HA104 or updates from other applications HA108. Distributor HA102 takes these changes and updates the slave databases HA110.

In this embodiment, slave databases HA110 comprise the call processing databases used to store data related to call processing. Master databases HA106 include additional information that is not necessarily related to call processing. For example, master databases HA106 include billing information which is not included in slave databases HA110 in this embodiment.

In a step HA202, a data change in call processing system AB102 results in a change to data in master database HA106. This data change can be a result of any of several actions. For example, when a call is received by call processing system AB102, a BIR EE322 (illustrated in FIG.

51) is built for the call. BIR EE322 is used by call processing system AB102 to maintain certain billing information. When BIR EE322 is created or updated, changes are made to any of several databases within call processing system AB102. These databases can be considered part of master database HA106 for the purpose of the discussion of distribution system HA100.

Once changes are made to master database HA106, it is important that these changes also be made to the slave databases HA110 within call processing database HA110. Therefore, the changes made within master database HA106 are provided to distributor HA102. Distributor HA102 determines which of the slave databases HA110 are to receive similar changes. This occurs in a step HA210.

In a step HA214, distribution system HA102 modifies those databases within call processing database HA110. Once this is done, slave databases contain information that mirrors information in master database HA106.

Figure 95:
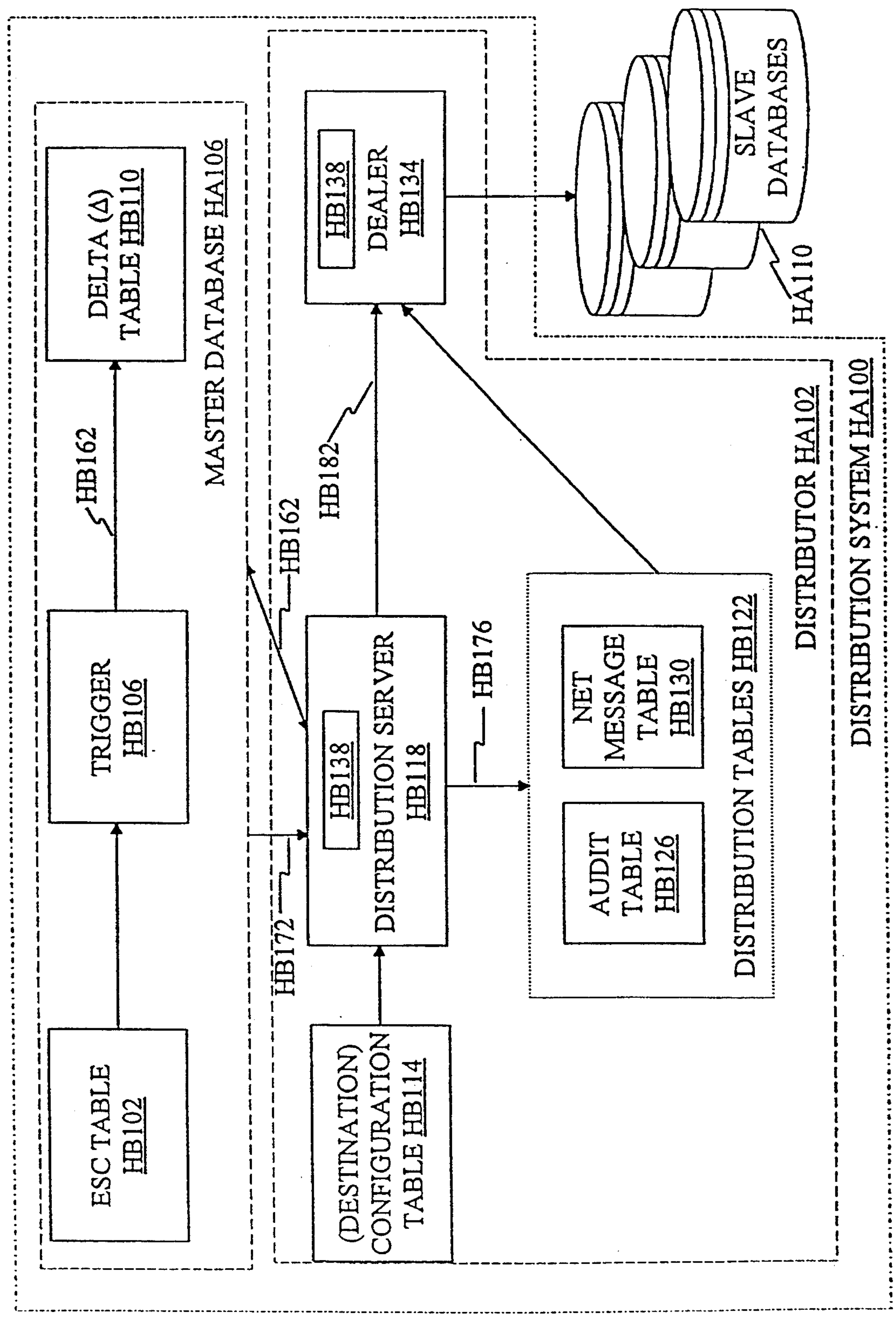
FIG. 95 is a block diagram illustrating a representative architecture of a distributor and a master database in one embodiment of the distribution system according to one embodiment of the invention.

FIG. 94 describes the operation of distribution system HA100 at a high level. Each of the steps within FIG. 94 are discussed in more detail below with reference to FIGS. 93, 94, 97, 99, 100, and 98. FIG. 95 is a block diagram illustrating a representative architecture of distributor HA102 and master database HA106 in one embodiment. Referring now to FIG. 95, master database HA106 comprises, among other tables and files, an ESC table HB102, a trigger HB106, and a delta (Δ) table HB110. For each table in master database HA106, there are three triggers (insert, delete, and update) HB106 and one delta table HB110. The distribution system is described with reference to changes to an ESC table HB102. This description applies to changes to all tables in master database HA106 that are mirrored in slave databases HA110.

Distributor HA102 comprises a distribution server HB118, a dealer HB134, a configuration table HB114, and distribution tables HB122. Distribution tables HB122 comprise an audit table HB126 and a net message table HB130. Queues HB138 can further be provided to distribution server HB118 and dealer HB134 to facilitate handling of message traffic. Queues HB138 can be used to queue messages to those components.

An example of a distribution server HB118 is the commercially available Open Server, available from Sybase, Inc., 6475 Christie Avenue, Emeryville, Calif. 94606.

Figure 96:
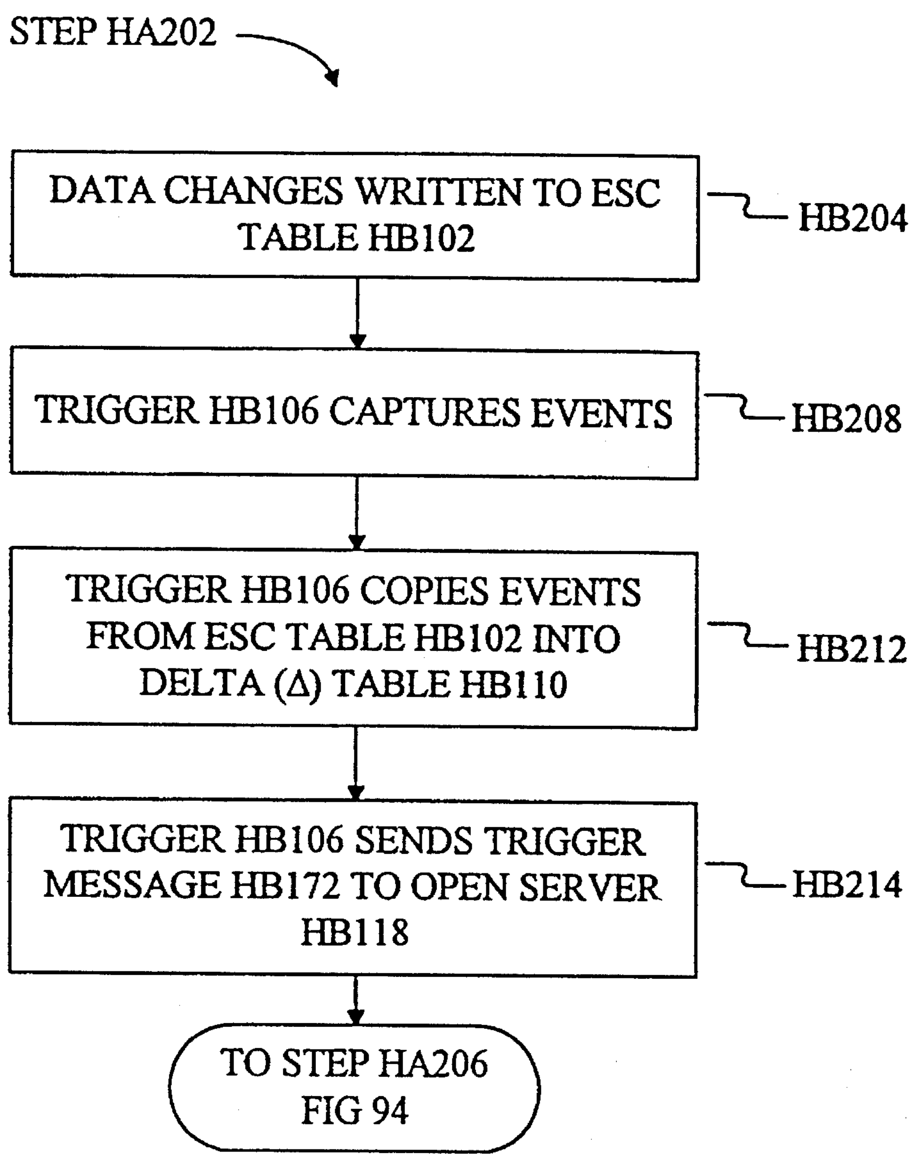
FIG. 96 is an operational flow diagram illustrating the manner in which changes are made to the master database according to one embodiment of the invention.

FIG. 96 is an operational flow diagram illustrating the manner in which changes are made to master database HA106. FIG. 96 further describes what occurs during step HA202 of FIG. 94. Referring now to FIGS. 95 and 96, in a step HB204, data changes for master database HA106 are written to ESC table HB102. These are the actual changes made to databases and files within master database HA106. These changes can include inserts, deletions, and updates to existing data. These changes are referred to as "events" for brevity.

The changes to master database HA106 are made by order entry HA104 or updates from other applications HA108. One example of order entry HA104 is the commercially-available Powerbuilder tool, available from Powersoft Corp., 70 Blanchard Road, Burlington, Mass. 01803.

In a step HB208, trigger HB106 captures events (changes made to ESC table HB102 within master database HA106). In a step HB212, trigger HB106 copies these events from ESC table HB102 into delta (Δ) table HB110. Thus, delta table HB110 is a table containing only the changes made to ESC table HB102 needed to update slave databases HA110. Delta table HB110 contains the inserts, updates, and deletions that were made to ESC table HB102.

In a step HB214, trigger HB106 sends a trigger message HB172 to distribution server HB118 in distributor HA102. Trigger message HB172 informs distribution server HB118 that events HB162 are copied into delta table HB110. This informs distribution server HB118 that there are changes that need to be made to slave databases within call processing database HA110. As a result of the operations described with reference to FIG. 96 (step HA202 of FIG. 94), master database HA106 is updated to reflect all changes by order entry HA104 and other applications HA108, and distributor HA102 is informed that there are changes to be made to slave databases HA110. The operation now continues at step HA206 of FIG. 94.

Figure 97:
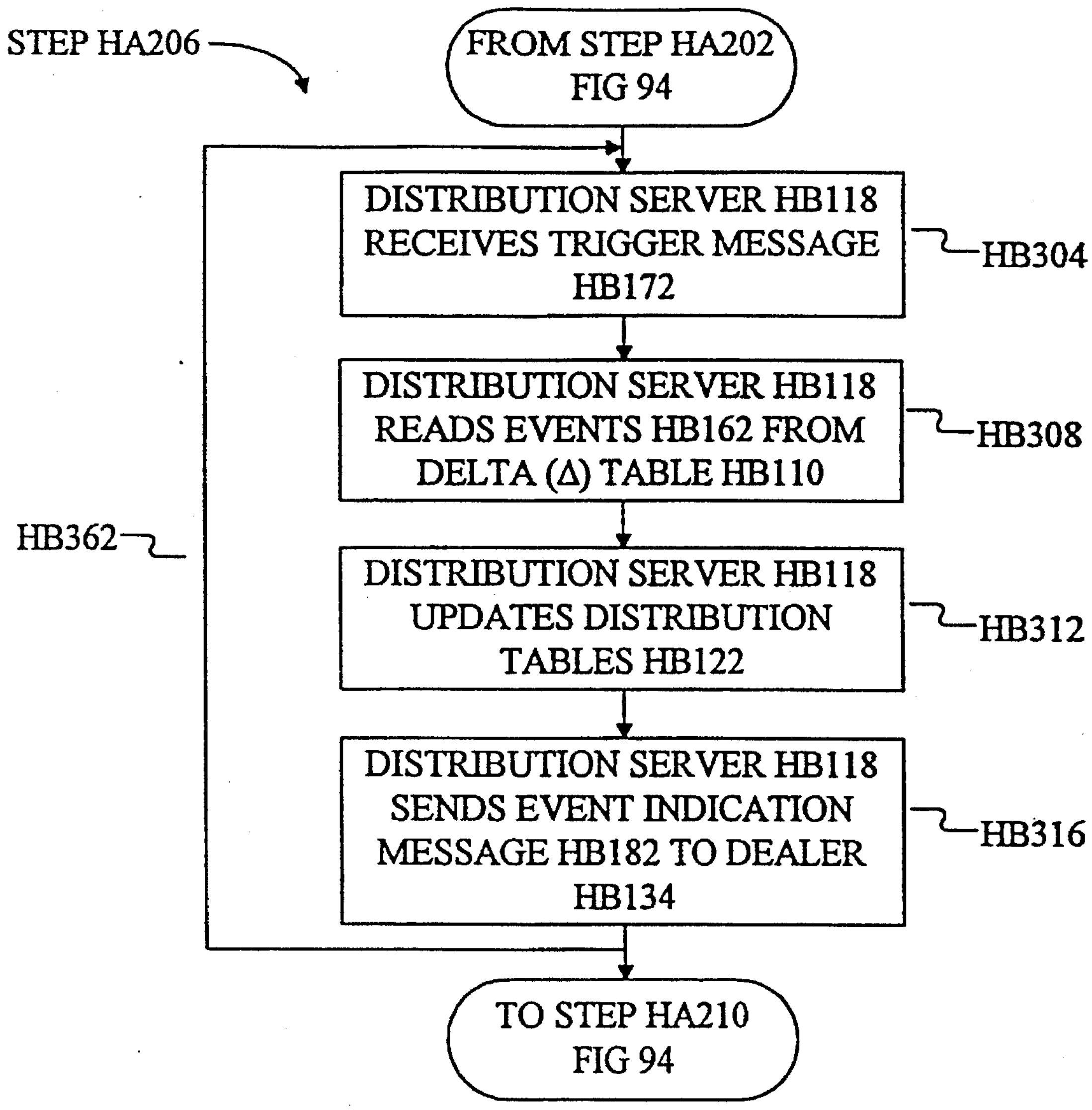
FIG. 97 is an operational flow diagram illustrating the manner in which the distributor receives events from the master database and updates distribution tables according to one embodiment of the invention.

Step HA206 of FIG. 94 is now further described with reference to FIGS. 97 and 95. FIG. 97 is an operational flow diagram illustrating the manner in which distributor HA102 receives events HB162 from master database HA106 and updates distribution tables HB122. Referring now to FIG. 97, in a step HB304, distribution server HB118 receives trigger message HB172 from trigger HB106. This indicates that changes to a table within master database HA106 are made and events HB162 representing those changes are stored in delta table HB110.

In a step HB308, distribution server HB118 reads events HB162 from delta table HB110. In a step HB312, distribution server HB118 updates distribution tables HB122 based on the information retrieved in step HB308. Step HB312 is described in greater detail below with reference to FIG. 99.

In a step HB316, distribution server HB118 sends an event indication message HB182 to dealer HB134. Event indication message HB182 indicates to dealer HB134 that events HB162 were received reflecting changes to a table in master database HA106, and these changes can now be made to slave databases HA110. Distribution server HB118 then continues to wait for additional trigger messages HB172 as illustrated by feedback loop HB362.

Figure 99:
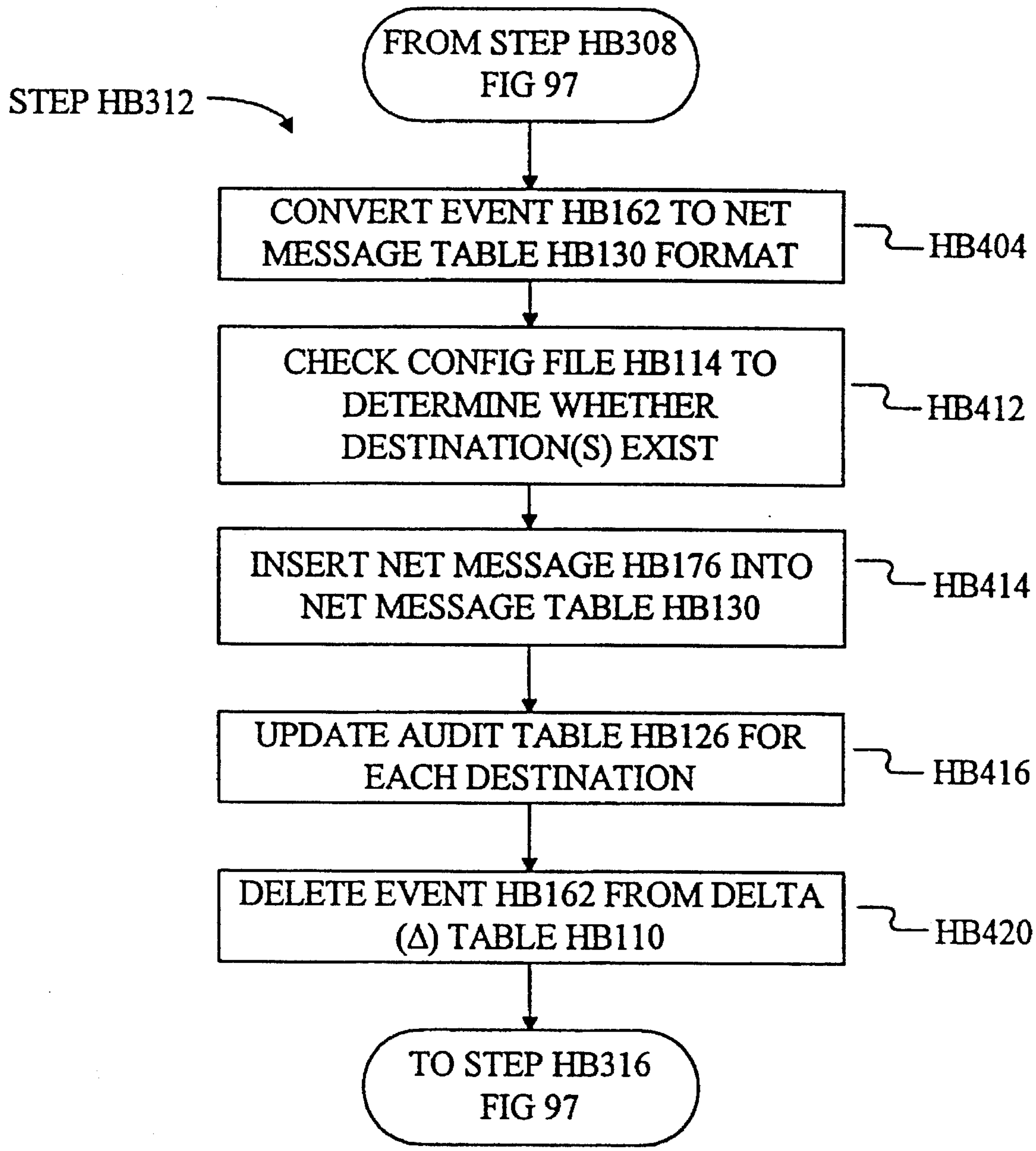
FIG. 99 is an operational flow diagram illustrating the manner in which a distribution server updates distribution tables according to one embodiment of the invention.

The manner in which distribution server HB118 updates distribution tables HB122 (step HB312) is now further described. FIG. 98 is a diagram illustrating a representative configuration for audit table HB126 in one embodiment. FIG. 99 is an operational flow diagram illustrating the manner in which distribution server HB118 updates distribution tables HB122 in one embodiment. Referring now to FIGS. 95, 98, and 99, distribution tables HB122 comprise an audit table 126 and net message table HB130. Audit table HB126 comprises a plurality of fields used to indicate which of the slave databases HA110 are to be modified, and with what information.

In one embodiment, audit table HB126 is made up of several rows, wherein each row indicates the change to be made and where (in what database) those changes are to be made. In this embodiment, each row of audit table HB126 can include a service number HC104, a server name HC108, a pointer HC112, an action HC116, and an update flag HC120. Service number HC104 and server name HC108 are used to identify the database to be modified. Pointer HC112 points to a net message HB126 within net message table HB130 that indicates the modifications to master database HA106. Action field HC116 indicates the action taken (for example, an insert, a delete, or an update), and update flag HC120 is used to indicate when an update according to that row has been made.

Referring now to FIGS. 95, 99, and 98, in a step HB404, distribution server HB118 converts event HB162 to the proper format to be used to update slave databases HA110. This step, if used, can convert events HB162 which reflect changes to master database HA106 to events that will reflect similar changes to slave database HA110. Thus, if master database HA106 is of one type (for example, a relational database) and slave database HA110 is of another type (for example, at tree type), a suitable conversion can be made.

In a step HB412, distribution server HB118 checks configuration table HB114 to determine whether the slave databases that are to be modified based on events HB172 (using net message HB176) exist within call processing system AB102. Configuration table HB114 maintains an active list of slave databases HB110 existing within call processing system AB102. Thus, if a database is not listed in configuration table HB114, it does not exist, and therefore cannot be updated.

In a step HB414, if the slave databases that are to be modified based n events HB172 exist within call processing system AB102 (as determined in step HB412), distribution server HB118 inserts net message HB176 into net message table HB130. Thus, net message table HB130 contains net message HB176 indicating the changes to be made to one or more slave databases HA110.

In a step HB416, distribution server HB118 updates audit table HB126 for each destination as determined by reading configuration table HB114. In the embodiment described above, in this step distribution server HB118 creates a new row in audit table HB126 for each destination. Each row in the audit table includes pointer HC112 which points to the net message HB176 and the name of the slave database HA110 that is to be modified using net message HB176.

In a step HB420 when no destinations exist, distribution server HB118 causes event HB162 to be deleted from delta table HB110. This is because no changes to slave databases HA110 are required. On the other hand, when destinations do exist, the net message table is updated in step HB414, and the audit table is updated in step HB416, distribution server HB118 causes event HB162 to be deleted from delta table HB110. In this case, it is now up to distributor HA102 to ensure that the proper changes are made to slave database HA110.

Figure 100:
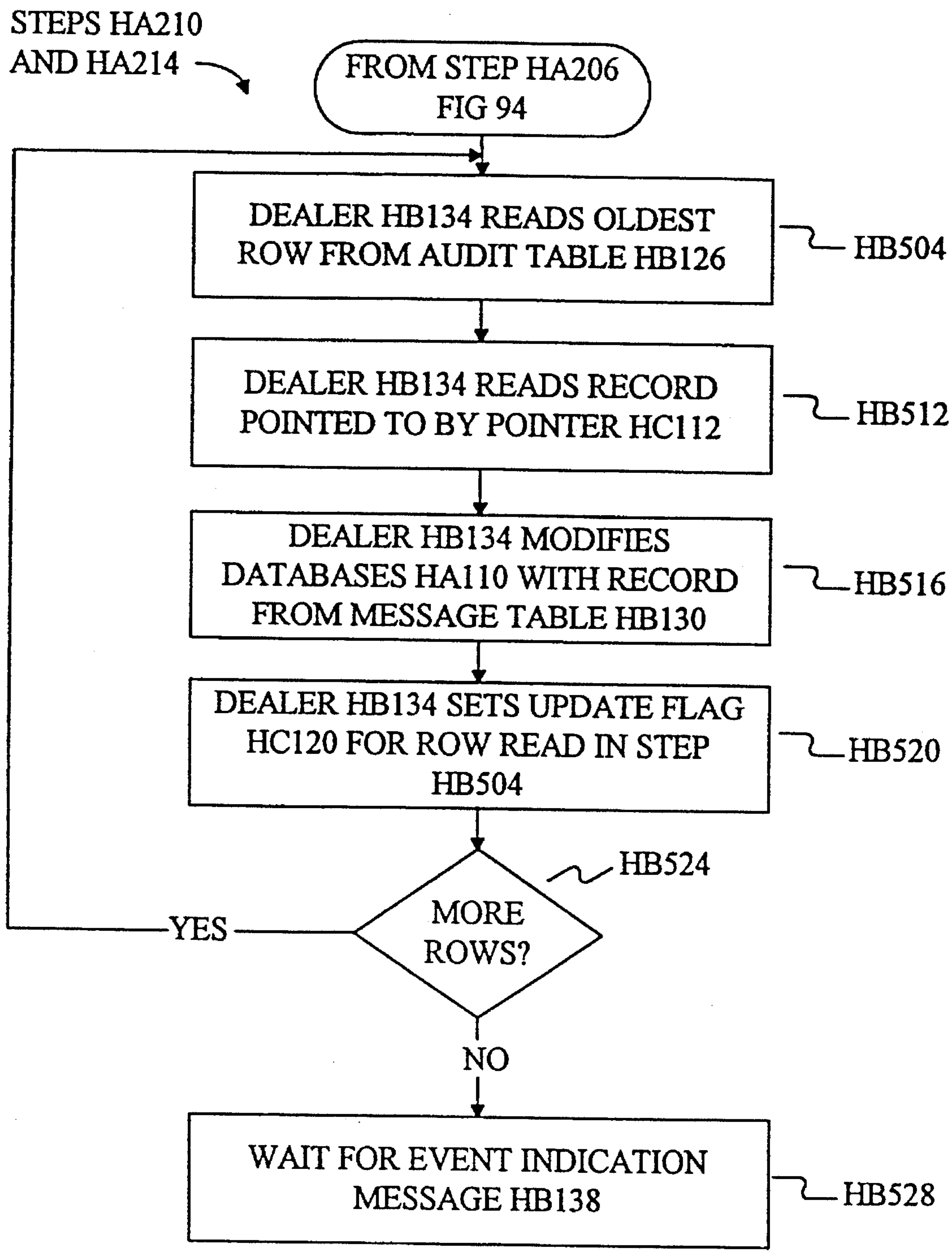
FIG. 100 is an operational flow diagram illustrating the manner in which slave databases are updated according to one embodiment of the invention.

The manner in which distributor HA102 modifies slave databases HA110 (steps HA210 and HA214) is now described. FIG. 100 is an operational flow diagram illustrating the manner in which slave databases HA110 are updated.

Referring now to FIGS. 95 and 100, in a step HB504, dealer HB134, after receiving event indication message HB182, reads the oldest row contained in audit table HB126. Dealer HB134 is looking for specific destination slave databases HA110.

In a step HB512, dealer HB134 reads the net message HB176 pointed to by pointer HC112 of the row retrieved from audit table HB126. Thus, dealer HB134 knows which net message HB176 to send to the destination slave database HA110.

In a step HB516, dealer HB134 modifies slave databases HA110 using net message HB176 as determined in step HB512. Once the modifications are made to the slave database HA110 as indicated by the row of audit table HB126, the update flag HC120 in that row is set to indicate that those changes have been made.

If more rows exist within audit table HB126 without update flags HC120 set, dealer HB134 continues at step HB504 reading the oldest row that has not yet been used to modify slave database HA110 (i.e., its update flag HC120 is not set). If no more rows exist, in a step HB528, dealer HB134 waits for the next event indication message HB138 to be received.

One advantage of distribution system HA110 is that triggers HB106 are used to simplify the operations performed and to ensure the integrity of slave databases HA110 throughout the entire call processing system. As discussed above, a trigger HB106 is called each time a change is made to a table (for example, ESC table HB102) within master database HA106. When this happens, distribution system HA100 captures the changes and distributes them to all the required slave (destination) databases HA110. Distribution system HA100 is transparent to the application making changes to master database HA106. The application making the changes to master database HA106 is not involved with the process of modifying the slave databases HA110 with the same changes.

Another advantage provided by distribution system HA100 is that a delta table HB110 is used. Conventional systems use remote procedure calls to send update data to slave databases HA110. This procedure is time-consuming. Conventional methods would mark each affected row in a table as changed, and then periodically query the table to determine which rows have changed. Thus all rows in the changed table had to be examined to find changes. Through the use of delta table HB110, only the data that is needed to update slave databases HA110 is provided to distributor HA102. Each delta table HB110 captures changes that are made to its associated table (for example, ESC table HB102). The changes are then read from the delta table HB110 to be applied to the appropriate slave databases HA110. This method allows the application performing the change to master database HA106 to continue performing any other activities required, while the distribution system makes the changes to the appropriate slave databases HA110.

Still another advantage of distribution system HA100 is that it does not require that updates to all databases be simultaneous. This feature allows slave databases HA110 to be updated at their own pace. If any one of the affected slave databases HA110 is down, the changes are queued until that database HA110 is ready to receive them. Meanwhile, the other affected slave databases HA110 can be updated.

5.0 Real-Time Reconfiguration

Most real-time processing systems rely on having their components operational at all times. System downtime may result in a diminution of services provided to customers or a reduction in the amount of product manufactured over a given time period. Call processing system AB102 is no different. When components of call processing system are non-operational for whatever reason, the capacity of the system is diminished. If enough systems are down, this may impact the level of service provided to subscribers AA114. For example, consider what would happen if operator consoles AB108 had to be disabled and reconfigured each time a change is made in the way a call is processed. For each console taken down, the system would have that much less capacity to handle operator-assisted calls. Additionally, for a system having numerous operator consoles AB108, such a change could take an undesirable length of time to implement.

One solution implemented by the inventors has been to provide systems that are highly data-driven. Thus, changes in the way a call is processed can be implemented by changing data contained in data files. As a result, operational code does not have to be recompiled to implement changes. For example, in the validation system the steps performed in validating a call are located in a data file in p-code database GA222. Thus, operator console simply notifies validator GA202 what type of validation to perform. Validation system AG102 performs the validation based on instructions for that type of validation found in p-code database GA222. If a change to the process followed when performing that (or any) type of validation is required, the change can be implemented simply by loading new data in p-code database GA222.

Conventional systems required operator consoles AA108 to perform the validation functions. The validation functions were not centrally located. If a change to the way in which a call is validated was required, that change had to be implemented in each operator console. This usually meant recompiling code in operator consoles AB108; a costly and time consuming task.

According to the present invention, simple changes to the data (p-code GA232) in p-code database GA222 can be made to implement the changes. Changes to database GA222 can be implemented in a number of different ways. In one embodiment, distribution system HA100, as described above, is used to implement changes to database GA222. In an alternative embodiment, changes can be made directly to p-code database GA222 without distribution system HA100.

Figure 101:
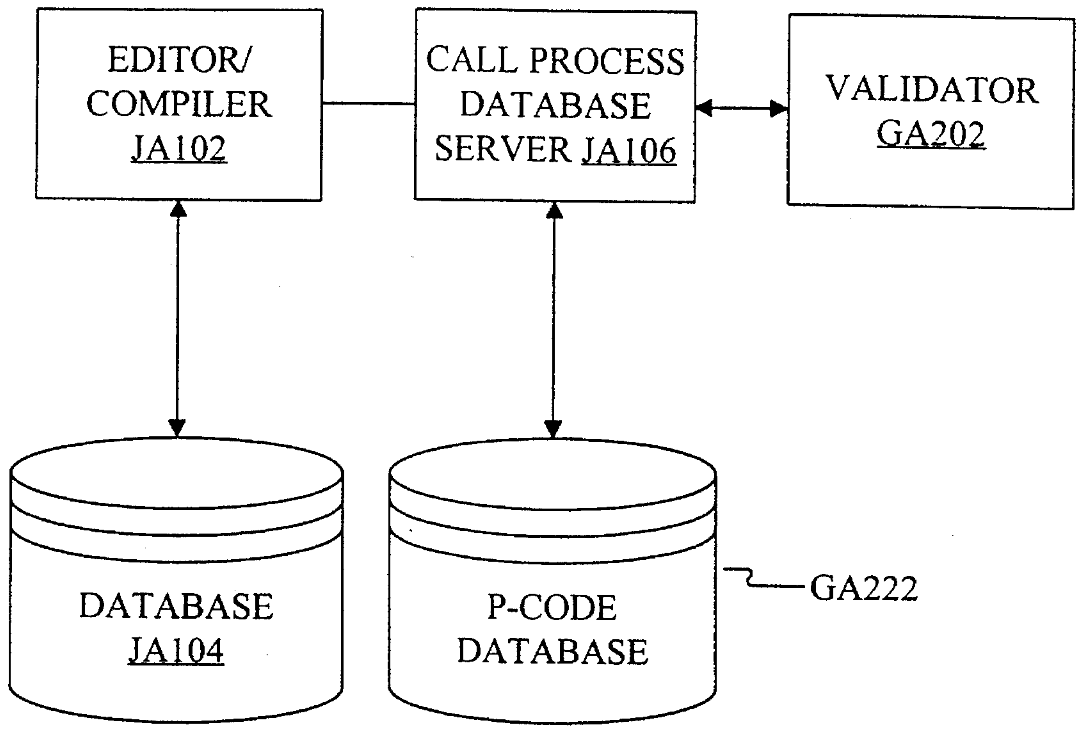
FIG. 101 is a block diagram illustrating a representative architecture used to update the p-code database according to one embodiment of the invention.
Figure 102:
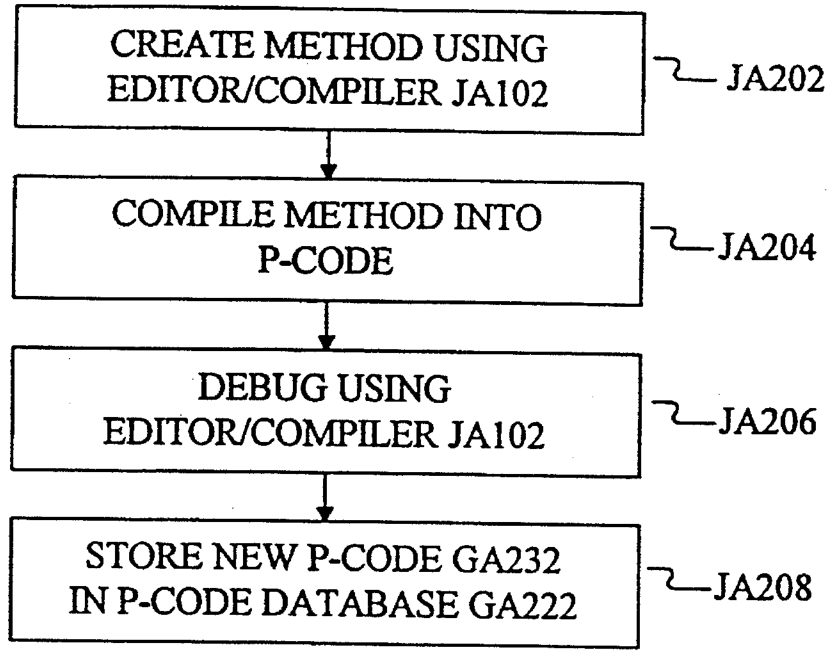
FIG. 102 is an operational flow chart illustrating the manner in which the p-code database is updated according to one embodiment of the invention.

The manner in which validation methods in p-code database GA222 are implemented and updated is now described. FIG. 101 is a block diagram illustrating a representative architecture used to update p-code database GA222. FIG. 102 is an operational flow chart illustrating the manner in which p-code database GA222 is updated. Referring now to FIGS. 101 and 102, and editor/compiler JA102 is used to create validation methods in p-code. These methods can be stored on database JA104 for later modification and are stored onto p-code database GA222 so they can be accessed by validator GA202. If desired, a call-process database server JA106 can be used as a server to access p-code database GA222.

The method in which p-code validation methods are developed and updated are now described. In the step JA202, an operator creates a validation method using editor/compiler JA102. The operator develops instructions in editor/compiler JA102 detailing how a particular validation is to be performed by a validator GA202. An example of editor/compiler JA102 is the commercially available Powerbuilder Package available from Powersoft Corp., 70 Blanchard Road, Burlington, Mass. 01803. Editor/compiler JA102 allows an operator to create methods using simple English language instructions.

In a step JA204, the method created using editor/compiler JA102 is compiled into p-code by editor/compiler JA102. In a step JA206 editor/compiler JA102 is used to debug decompiled p-code.

In a step JA208, once the p-code method is debugged, it can be loaded into p-code database GA222. Once in p-code database GA222 it can be accessed by validator GA202 as discussed above in the Validation Section of this document.

If desired, the method developed can be stored in database JA104 for redundancy, and/or later access. Database JA104 could be an independent database or file, or could be a database within master database HA106.

It should be noted that validation methods are not limited to being implemented using p-code and numerous other conventions could be adopted. In this light, editor/compiler JA102 is not limited to compiling the method into p-code, but could be used instead to compile the method into the type of instruction format expected by validator GA202.

Figure 103:
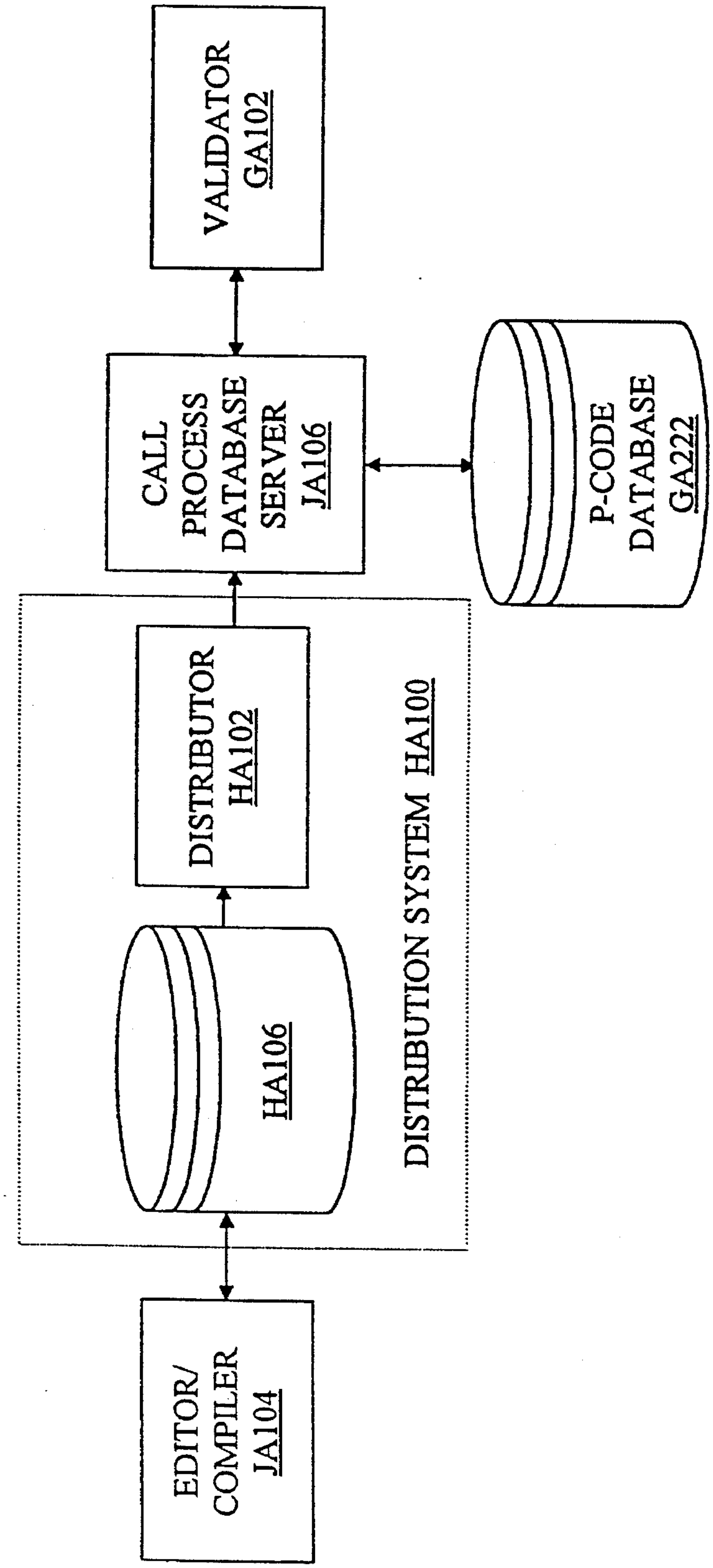
FIG. 103 is a block diagram illustrating a distribution system to update the p-code database according to one embodiment of the invention.

As noted above, in one embodiment, the new p-code methods created and/or updated by editor/compiler JA102 can be loaded into p-code database GA222 using distribution system HA100. This embodiment is now described. FIG. 103 is a block diagram illustrating a distribution system HA100 to update p-code database GA222. Referring now to FIG. 103 validation methods could be stored in a separate data file JA104 (illustrated in FIG. 101) or in master database HA106. Editor/compiler JA104 is used to create and/or update validation method as was discussed above with reference to steps to JA202 through JA206 (FIG. 102). However, in this embodiment, distribution system HA100 is responsible for making the updates to p-code database JA222.

Distribution system HA100 operates as discussed above in the Distribution Section of this document. Distribution system HA100 allows JA104 to update master database HA106. Changes to master database HA106 are provided to distributor HA102. Distributor HA102 then is responsible for distributing the changes to the appropriate databases; in this case, the database to receive the changes is p-code database GA222. Distributor HA102 performs the same change to p-code database GA222 as was made to master database HA106. These changes could be made to a call process database server JA106.

Because the methods are stored and maintained in p-code database GA222, changes to the manner in which calls are validated can be implemented simply by updating p-code database GA222. Changes in validation methods are transparent to operator consoles AB108. When operator console requests a validation be performed, validator GA202 retrieves the p-code and performs a validation as discussed above in the validation section of this document. If the method changes, the p-code is updated and the operator console need not change the way in which it requests the validation. Thus, changes in the validation methods do not require operational software in either the validation system or the operator consoles to be edited and recompiled. As a result, those systems do not have to be taken down to make validation method changes.

6.0 Billing System 6.1 Introduction to Billing System

Figure 104:
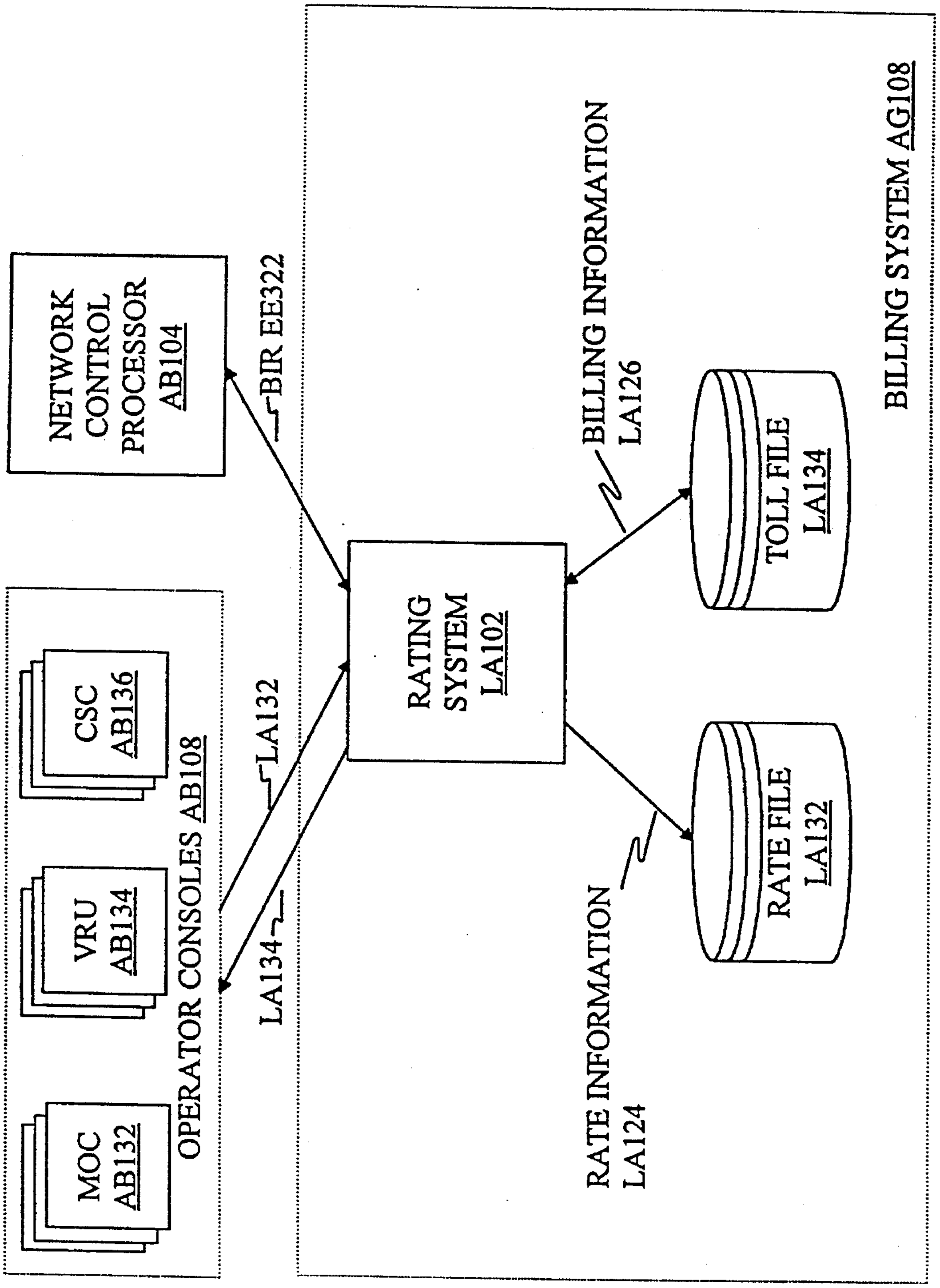
FIG. 104 is a high-level block diagram illustrating the billing system and its interfaces to the operator consoles and the network control processor according to one embodiment of the invention.

Call processing system AB102 includes a billing system AG108 for rating the cost of calls and services, and generating bills to bill subscribers AA114 of call processing system AB102. Billing system AG108 is now described. FIG. 104 is a high-level block diagram illustrating billing system AG108 and its interfaces to operator consoles AB108 and NCP AB104.

Referring now to FIG. 104, billing system AG108 includes a rating system, a rate file LA132, and a toll file LA134. Rate file LA132 stores rate information for long-distance calls and services. In one embodiment, rate file LA132 can store different rate structures for each user AA106 and/or customer AA110. Depending upon the type of rating used, rates can be stored in rate file LA132 based on the distance over which the call is being placed (in other words, the distance between originating user AA106A and terminating user AA106B), and the time of day the call is being placed. Rates are typically stored per unit time, thus, rates can be determined as the cost of the call per unit time (for example, cents per minute).

For other types of calls, flat rates may be established. As an example, consider "900" calls where an originating user AA106A dials a 900+ number. In this case, the user is typically billed at a flat rate (for example, 50¢ per call). The flat rate is fixed and can be independent of call distance, the time the call is placed, and the duration of the call.

Rate file LA132 also stores rates at both the wholesale level and the retail level. Wholesale rates are the rates charged to customer AA110. Retail rates are those rates that customer AA110 charges its subscribers (users AA106) and the rates that a direct subscriber user is charged. Thus, different rates can be established at the wholesale and retail level. Wholesale and retail timing is fully described below with reference to FIG. 112.

Toll file LA134 is used to store bill information for billing long-distance customer AA110. This bill information can include on a per-call basis the wholesale cost of the call, the retail cost of the call, and taxes levied on the call. Additional information stored in toll file LA134 can include information regarding how the stored rates were computed for each call. This aids in answering billing questions and troubleshooting anomalies.

Rating system LA102 accesses rate file LA132 to determine the rate information LA124 to rate a particular call. Rating system LA102 uses rate information LA124 to calculate billing information LA126. Rating system LA102 then sends billing information LA126 to toll file LA134 for subsequent billing to subscribers AA114.

There are two primary scenarios in which billing system AG108 rates a call. A first scenario is where billing system AG108 has requested it to provide a RATE QUOTE LA132. A second scenario is where billing system AG108 rates a completed call based on a BIR EE322.

Figure 105:
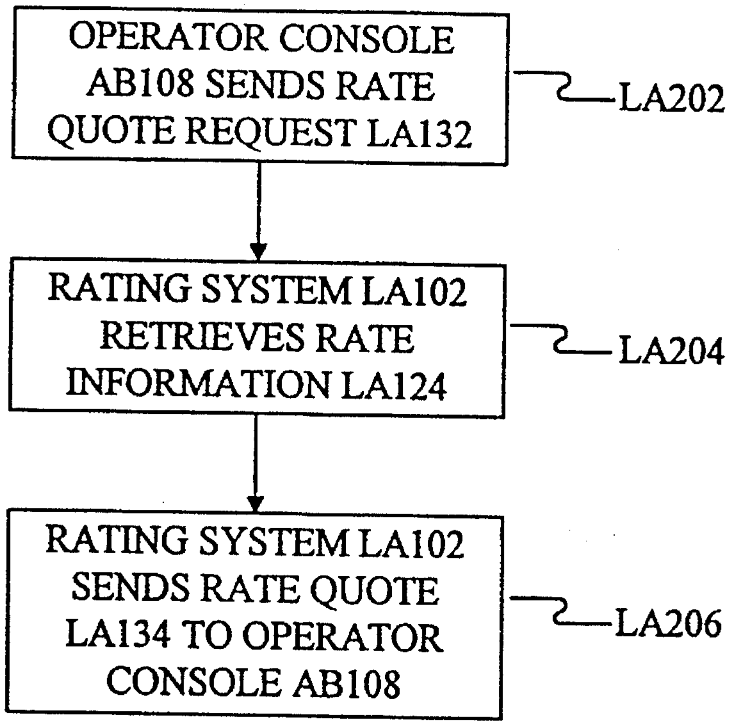
FIG. 105 is a high-level operational flow diagram illustrating the process of rating a call in the rate quote scenario according to one embodiment of the invention.

The first scenario of rating a call in response to a request for a rate quote is now described. FIG. 105 is a high-level operational flow diagram illustrating rating and call in the rate quote scenario. Referring now to FIGS. 104 and 105, in a step LA202, an operator console AB108 sends a RATE QUOTE REQUEST LA132 to rating system LA102. RATE QUOTE REQUEST LA132 includes information required to rate the call. This information can include information such as called party number, calling party number, customer AA110 identification, and other information. RATE QUOTE REQUEST LA132 is a message asking a rating system LA102 to rate the call as listed in the RATE QUOTE REQUEST LA132.

In a step LA204, rating system LA102 retrieves rate information LA124 based on the information provided in RATE QUOTE REQUEST LA132. For non-postalized rates, rating system LA102 computes the distance using the vertical and horizontal coordinates of the originating number location and the called number location. Non-postalized rates, inter alia, are discussed in the Billing System Methodologies Section of this document.

In a step LA206, rating system LA102 sends a RATE QUOTE LA134 to operator console AB108. RATE QUOTE LA134 is typically provided as a cost per unit time. In other words, RATE QUOTE LA134 is usually quoted in cents per minute.

Figure 106:
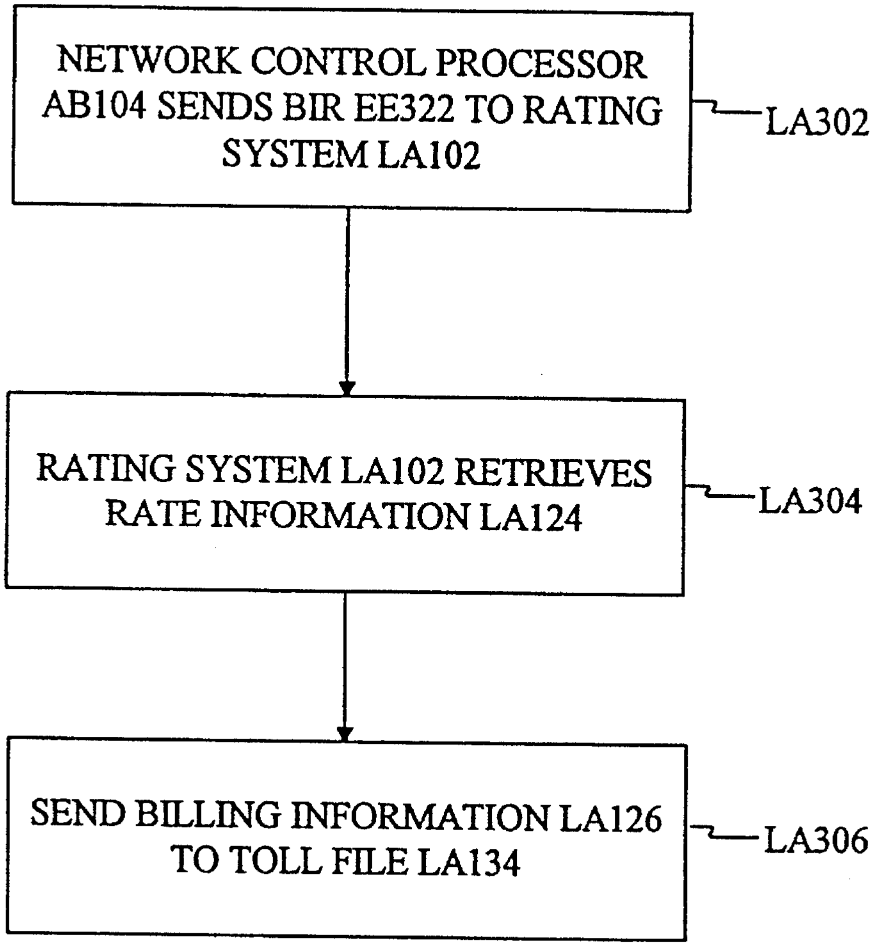
FIG. 106 is a high-level operational flow diagram illustrating the steps involved with rating a call in response to a billing information record according to one embodiment of the invention.

The second scenario wherein a call is rated in response to a BIR EE322 is now described. FIG. 106 is a high-level operational flow diagram illustrating the steps involved with rating a call in response to BIR EE322. Referring now to FIGS. 104 and 106, in a step LA302, NCP AB104 sends BIR EE322 to rating system to LA102. In one embodiment, this occurs when a call is terminated and BIR EE322 is updated with the time the call terminated. Thus, BIR EE322 includes all necessary information such as calling party number, called party number, start of the wholesale timing interval, start of the retail timing interval, and the time the call was terminated. In one embodiment, call duration, both wholesale and retail, is computed by NCP AB104. In one embodiment, this is accomplished by BSRVR BA108. In an alternative embodiment, call duration is computed by rating system LA102 based on the time wholesale timing started, retail timing started, and the call terminated as indicated in BIR EE322.

In a step LA304, rating system LA102 retrieves rate information LA124 for the call. Again, rate information LA124 can be based on the originating user AA106A, customer AA110, the distance over which the call was placed, the time of day, and the duration of the call.

In a step LA306, the cost of the call is completed based on the rate information, and the information in BIR EE322 (for example, start and stop times of the call). The cost can be computed at the wholesale and retail rates, and taxes can be included with the call. This information is included in billing information LA126. In a step LA304, billing information LA126 is sent to toll file LA134.

Figure 107:
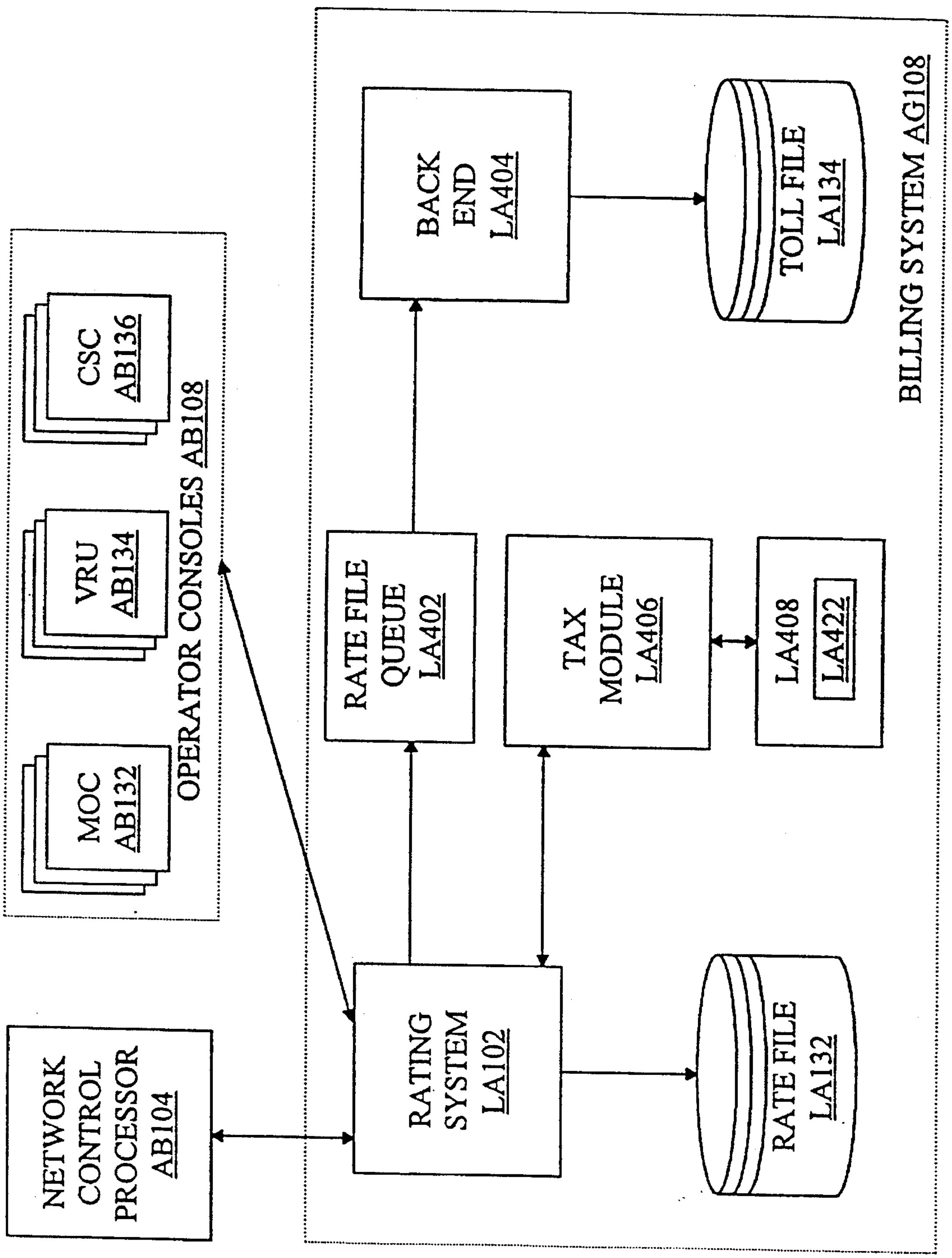
FIG. 107 is a block diagram illustrating the billing system with additional functionality according to one embodiment of the invention.

Additional features can be provided to billing system AG108 as is now discussed. FIG. 107 is a block diagram illustrating billing system AG108 with additional functionality. Referring now to FIG. 107, a rate file queue LA402 is used as a buffer to store billing information LA126 in the event toll file LA134 is busy or cannot accept billing information LA126 as quickly as it is sent from rating system LA102. A back-end LA404 monitors rate file queue to see whether billing information LA126 has been stored in rate file queue LA402. When billing information LA126 is stored in rate file queue LA402, back-end LA404 retrieves that billing information LA126 and stores it is the appropriate place in toll file LA134.

In one embodiment, it may not be optimum to include some or all of the tax information in rate file LA132. In this embodiment, a tax procedure LA406 is included to compute the tax information for the call. An example of tax procedure LA406 is the commercially available from Vertex system. The Vertex system is available from Vertex, Inc., Berwyn, Pa., USA. Tax procedure may have an associated database or datafile LA408 to store tax rate information LA422.

In the event that rate file queue LA402 is full and can no longer hold additional billing information LA126, this additional billing information LA126 is send back to NCP AB104. In this case, NCP AB104 retains this data until it can be later sent to toll file LA134.

One feature of call processing system AB102 is that it allows calls to be rated in real time. Thus, while a call is in progress, that call can be rated at any point during the call. Additionally, as soon as the call is terminated, the final rate, both wholesale and retail, for the call, can be computed. Now, the subscriber AA114 can be billed for the call as soon as it occurs. A high-level discussion of how calls can be rated in real time is described above with reference to FIGS. 104 and 106.

A detailed description of real-time rating in response to a BIR EE322 is now described. BIR EE322 can be sent from NCP AB104 to request a rate or from operator console AB108 to request a RATE QUOTE LA134. In the case of BIR EE322 sent from operator console AB108, BIR EE322 comprises a RATE QUOTE REQUEST LA132.

Figure 108:
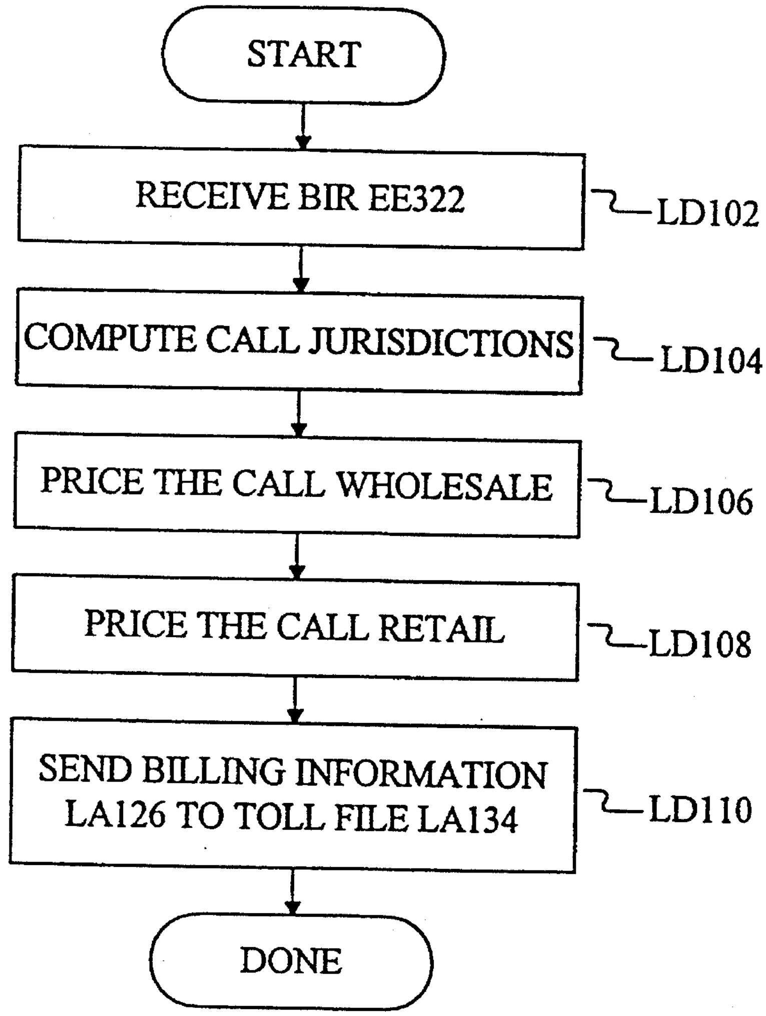
FIG. 108 is an operational flow diagram illustrating the manner in which the billing system prices a call when a BIR is received according to one embodiment of the invention.

FIG. 108 is an operational flow diagram illustrating the manner in which billing system AG108 prices a call when a BIR EE322 was received. Referring now to FIGS. 107 and 108, in a step LD102, rating system LA102 receives a BIR EE322. Receipt of BIR EE322 triggers rating system LA102 to rate the call. As mentioned above, BIR EE322 contains all the information necessary to rate the call.

In a step LD104, rating system LA102 computes the call jurisdictions. In step LD104, rating system LA102 looks at the location of originating user AA106A and the location of terminating user AA106B. This information is used to compute the distance over which the call is to be routed. This step is only performed where the rate is based on the distance of the call. In other words, this step is only performed where a non-postalized rate structure is used.

Figure 112:
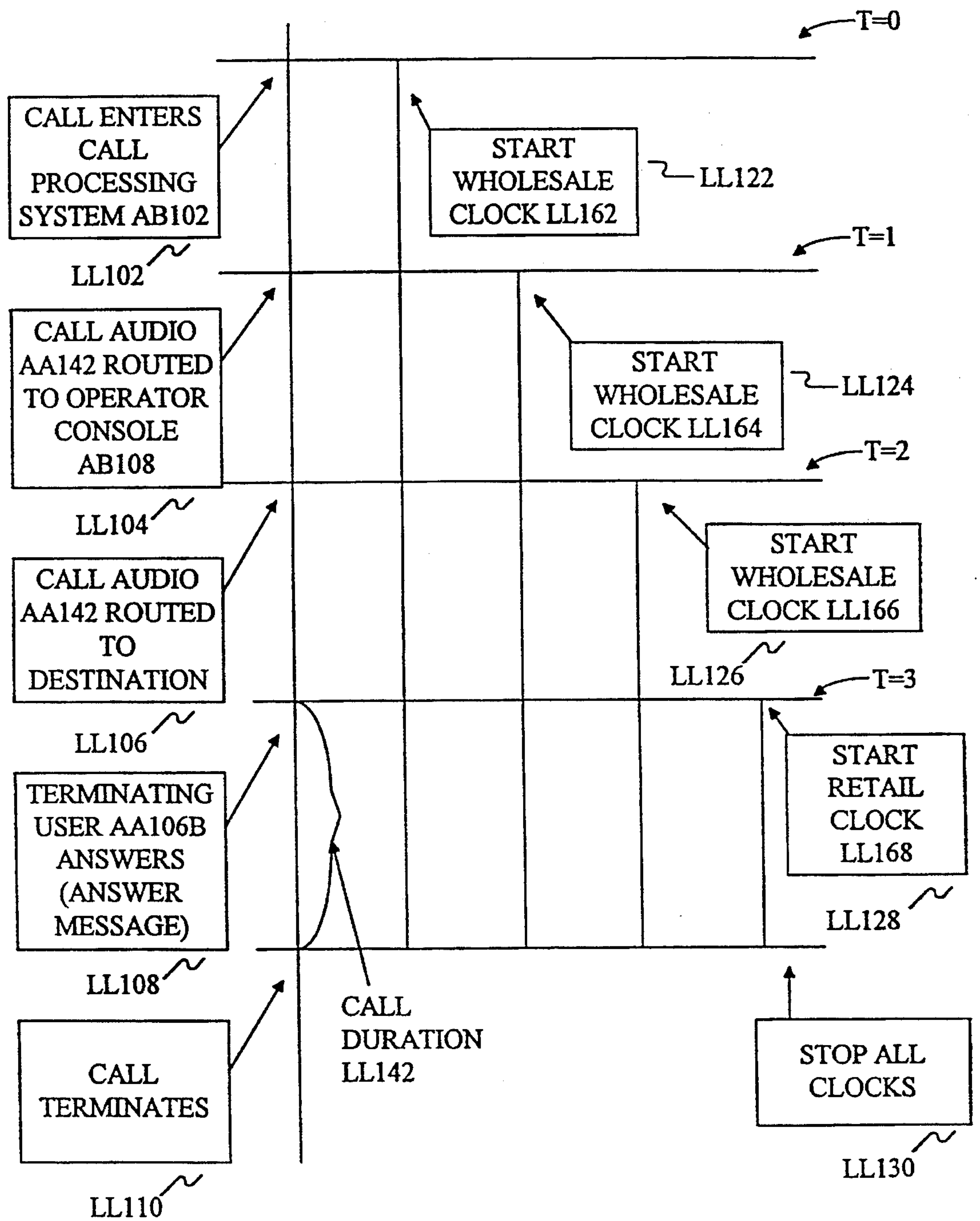
FIG. 112 is a diagram illustrating times for which wholesale and retail bills can be computed.

In a step LD106, rating system LA102 first determines the wholesale cost of the call. The wholesale cost can be determined from the time the call enters call processing system AB102, from the time call audio AA142 enters matrix switch AB106, the time audio AA142 enters operator console AB108, or any other time defined. This time can be defined uniquely for individual users for AA106 or individual customers AA110. An example is illustrated in FIG. 112. The manner in which the wholesale cost of the call is determined is described in more detail below with reference to FIG. 109.

In a step LD108, rating system determines the cost of the call at the retail level. In one embodiment, the retail rate is determined from the time the call is completed to terminating user AA106B until the time that either user AA106 hangs up the phone, or otherwise terminates the connection. The manner in which retail call rating is performed is described in more detail below with reference to FIG. 111.

In a step LD110, rating system LA102 sends billing information LA126 to toll file LA134. As discussed above, in alternative embodiments, billing information LA126 may be sent to toll file LA134 by way of a rate file queue LA402.

Rating system has completed the rating for that particular call and continues to monitor LAN LA128 to receive additional BIRs BIR EE322. If an additional BIR EE322 is received, the rating process begins again at step LD104.

Figure 109:
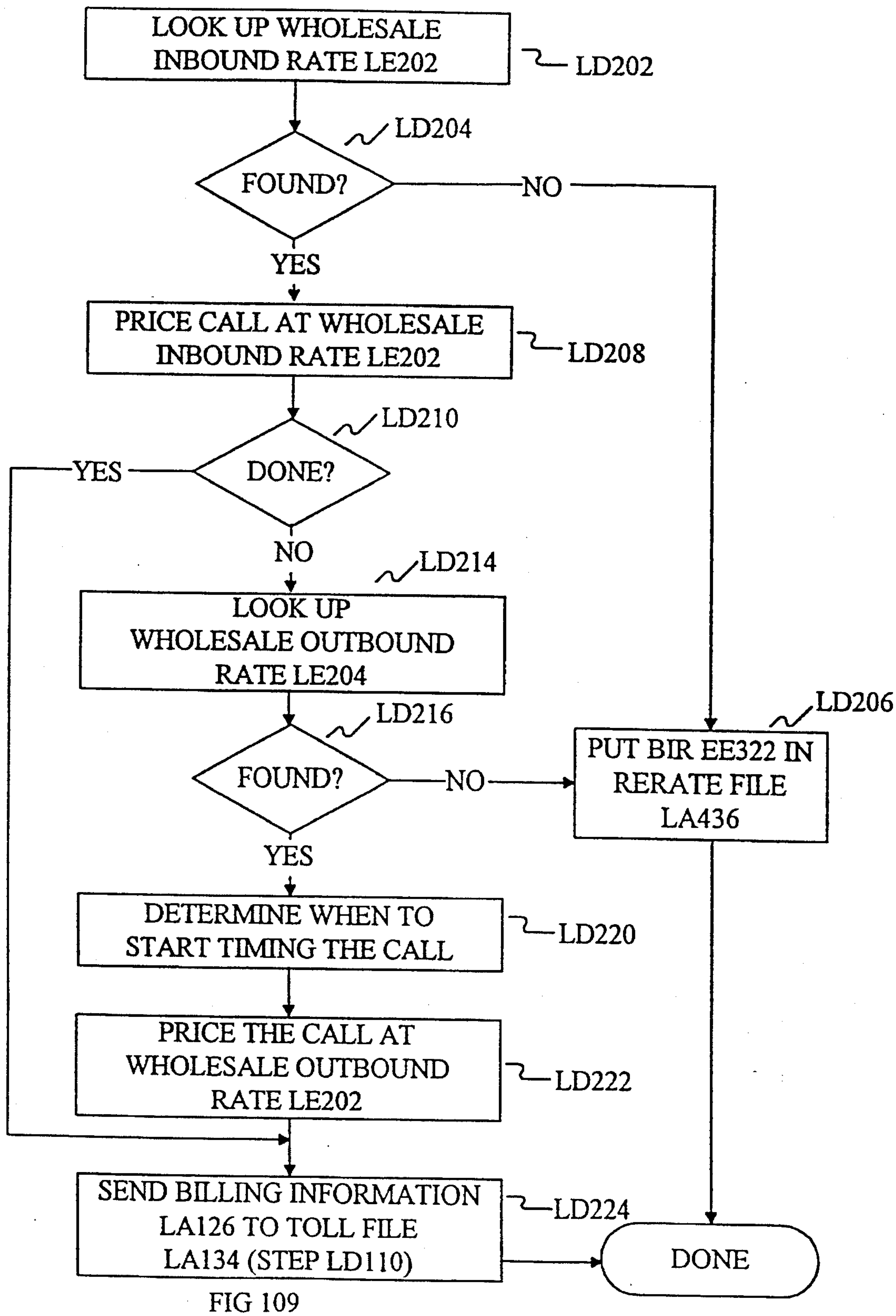
FIG. 109 is an operational flow diagram illustrating the manner in which the rating system determines the wholesale cost of the call according to one embodiment of the invention.
Figure 110:
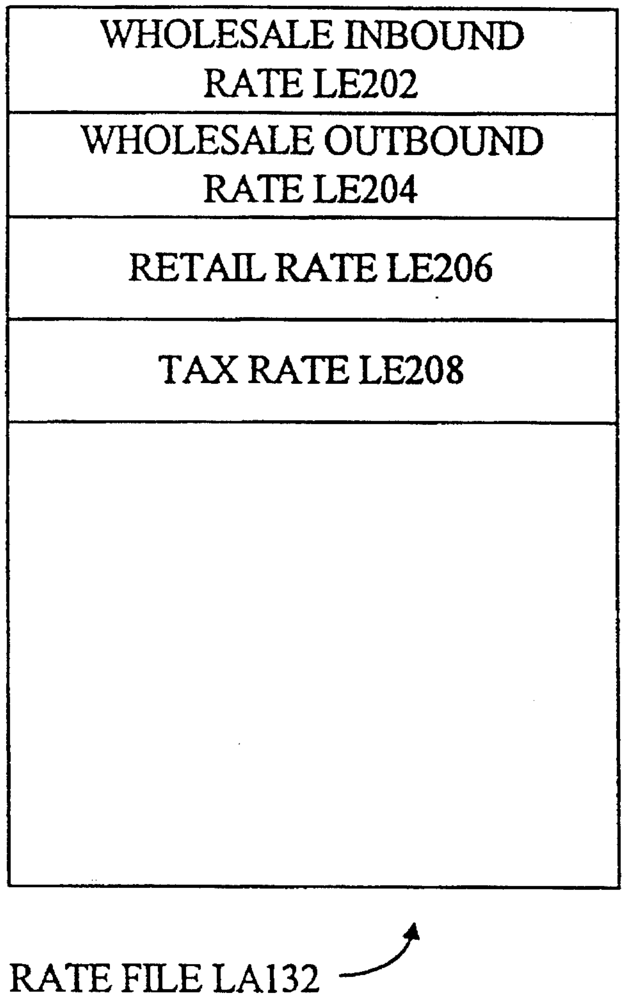
FIG. 110 is a diagram illustrating the rates for calls stored in a rate file according to one embodiment of the invention.

The manner at which rating system LA102 determines the wholesale rate for the call is now described. FIG. 109 is an operational flow diagram illustrating the manner in which rating system LA102 determines the wholesale rate of the call. FIG. 110 is a diagram illustrating the rates for calls stored in rate file LA132.

Referring now to FIGS. 109 and 110, in a step LD202, rating system LA102 retrieves a wholesale inbound rate LE202 (illustrated in FIG. 110) for the call. Wholesale inbound rate LE202 is the rate at which the call will be billed wholesale, to customer AA110, from the time the wholesale rating period begins (when the call reaches call-processing system AB102, operator console AB108, or terminating user AA106, as discussed above). If wholesale inbound rate LE202 is not found (decision block LD204), in a step LD206, BIR EE322 is put in a rerate file LA436 (illustrated in FIG. 104). BIRs EE322 stored in rerate file LA436 can later be processed again. In an alternative embodiment, rerate file LA436 is not used and a default rate is entered.

If wholesale inbound rate LE202 is found in rate file LA132, the call is rated at the wholesale inbound rate. The rate can be based on the inbound start and stop times included in BIR EE322. For example, the rate may be cheaper for calls made after 11 p.m. This occurs in a step LD208.

If BIR EE322 indicates that the call to be rated is completed (decision block LD210), billing information LA126 is written to toll file LA134 as discussed above with reference to FIG. 108. At this time, only wholesale information is included in billing information LA126, and therefore only the wholesale cost is included in toll file LA134. This occurs in a step LD224.

If BIR EE322 indicates that the call is completed (decision block LD210) the wholesale outbound cost for the call can be computed. This is now described with reference to steps LD214–LD224. In a step LD214, the wholesale outbound rate LE204 is retrieved from rate file LA132. This is the per unit rate the wholesale outbound call will use to determine the wholesale outbound cost of the call.

If wholesale outbound rate LE204 is in rate file LA132 (decision block LD216), in a step LD220, rating system LA102 determines what duration to use to rate the call. In a step LD222, the wholesale outbound cost of the call is computed using wholesale outbound cost LE204 and the duration of the call. In a step LD224, the wholesale outbound rate is included in billing information LA126 and sent to toll file LA134. This occurs as is discussed above with reference to step LD110.

If whole outbound rate LE204 was not in rate file LA132 (decision block LD216), in a step LD206, BIR EE322 is put in rerate file LA436.

Periodically, BIRs in rerate file LA436 are retrieved and the rating system LA102 attempts to rate the calls again. Although numerous types of errors may result in a rate not being computed and a BIR EE322 being stored in rerate file LA436, most commonly, BIRs EE322 end up in rerate file LA436 because rate information LA124 was not found in rate file LA132. In this case, when these BIRs EE322 are rerun through rating system LA102, a rate can often be successfully determined by entering the correct rate information LA124 in rate file LA132. In this manner, calls that were previously unratable (for example, due to the lack of rate information LA124 in rate file LA132) can be rated and long-distance carrier customer AA110 billed for the call. Otherwise, the call would have to go unbilled and a flat rate would have to be completed.

Figure 111:
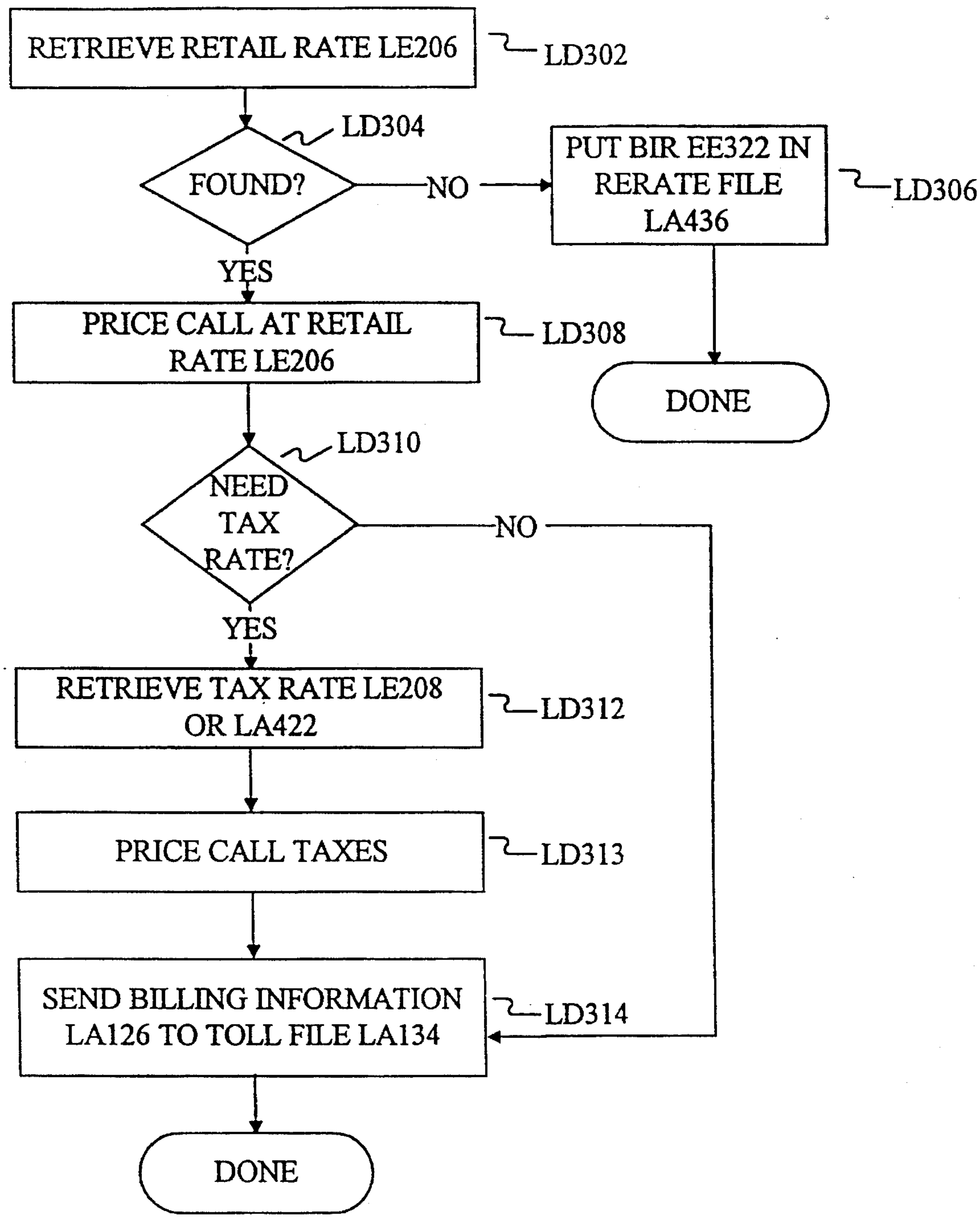
FIG. 111 is an operational flow diagram illustrating the manner in which the retail cost of a call is determined according to one embodiment of the invention.

The manner in which the cost of the call is determined at the retail level (step LD108 in FIG. 108) is now described. FIG. 111 is an operational flow diagram illustrating the manner in which the retail rate of a call is determined. Referring now to FIGS. 107 and 110, in a step LD302, rating system LA102 retrieves retail rate LE206 (FIG. 110) from rate file LA132. Retail rate LE206 is used to rate the call at the retail level. Typically, the retail rate is applied to the call from the time the call is completed (in other words, from the time originating user AA106A is connected to terminating AA106B) until the call is terminated. That is, until either user AA106A either hangs up or terminates the connection, or the connection is terminated for some other reason.

If retail rate LE206 for the call is not found in rate file LA132 (decision block LD304), BIR EE322 is written to rerate file LA436 in a step LD306. As was the case with the operation of computing wholesale costs, these BIRs EE322 in rerate file LA436 are saved and can be rerated later when retail rate LE206 for the call is entered into rate file LA132.

If, on the other hand, retail rate LE206 is found in rate file LA132 (decision block LD304), the retail cost of the call is rated. As with wholesale costs, retail rate LE206 can be set on a per-user AA106 and per-customer AA110 basis.

In one embodiment, taxes may need to be added to the retail rate of the call. Tax rate LE208 may be found in rate file LA132. However, in an alternative embodiment, tax rate LE208 is not included in rate file LA132 and must be obtained form another source. In this case, rating system LA102 accesses tax module LA406 to retrieve tax rate information LA422. This occurs in a step LD312.

Billing information LA126 which includes retail cost, and may include a tax, where applicable, is sent to toll file LA134 as described above with reference to step LD110. This occurs in a step LD314.

Thus, step LD110, wherein bill information LA126 is sent to toll file LA134 can actually occur in several separate instances for each call. In a preferred embodiment, billing information LA126 is simply a data record that includes the rating of the call. This rating can include a wholesale inbound rating, a wholesale outbound rating or a retail rating.

As discussed above, an additional scenario in which rating system LA102 rates a call is where operator console AB108 requests a rate quote by sending RATE QUOTE REQUEST LA132 to rating system LA102. In one embodiment, RATE QUOTE LA132 includes the same type of information in a BIR EE322. In other words, this includes information such as originating number, terminating number, originating user AA106A identification, customer AA110 identification, or any other information required depending on the parameters used to rate the call. Once RATE QUOTE LA132 is received by rating system LA102, the process by which rating system LA102 computes the rate quote is the same as the manner in which rating system LA102 computes the wholesale rate for a call in response to a BIR EE322 received from NCP AB104. This is fully described with reference to FIG. 111 in steps LD302–LD312. In the case of a RATE QUOTE REQUEST LA132, however, billing information LA126 is not sent to toll file LA134. This is because rating system LA102 is only providing a quote for a rate of a call to be placed, and is not rating a completed or terminated call. Thus, for quotes, in a step LD316, a rate quote response LA134 is returned to operator consoles AB108. The manner in which the RATE QUOTE LA134 may be used by call processing system AB102 to rate a debit card call is described in the Real-Time Billing System Examples Section of this document.

6.2 Wholesale and Retail Timing

Rating system LA102 uses numerous clocks to allow flexibility when computing bills for the calls. Because of this, rates can be computed for wholesale as well as for retail. Additionally, the times at which billing starts for wholesale and retail rates can be defined differently for individual users AA106 or for individual customers AA110.

A preferred embodiment is now described in which billing for the call at a wholesale rate can be started at three different times, and billing for the call at the retail rate is always started at one time. FIG. 112 is a diagram illustrating times for which wholesale and retail bills are computed in one embodiment.

Referring now to FIG. 112, when the call enters call processing system AB102 (box LL102), in other words, when call audio AA142 is routed to matrix switch AB106, a first wholesale clock LL162 is started. This is shown by a box LL122. If wholesale clock LL162 is used when billing the call, the wholesale rate for that call is applied from "time T equals zero" (T=0) until the call terminates, as shown in block LL110. The call terminates when either user AA106 hangs up, or otherwise terminates the connection, or when other factors force the connection to be broken.

A second wholesale clock LL164 is started when call audio AA142 is routed to an operator console AB108, as illustrated in block LL104. This occurs for operator-assisted calls. If the wholesale bill is to be completed using start wholesale clock 2, the wholesale rate is applied to the call from time T=1 until the call terminates, as illustrated by block LL110.

A third wholesale clock LL166 is started when call audio AA142 is routed to the destination as illustrated in box LL106. For calls to be billed wholesale from this time, the rate is applied to the call from time T=2 until the call terminates, as indicated by block LL110.

For computing the retail bill, a retail clock LL168 is started when terminating user AA106B answers the call and NCP AB104 receives an answer message BD118. This is illustrated by block LL108. In this case, the retail bill is computed by applying the retail rate from time T=3 until the call terminates at stops, as indicated by block LL110.

There are numerous ways the wholesale and retail clocks can be implemented. In one embodiment, the clocks are not timers per se, but the call is timed using time markers and computing the time between the markers. For example, for retail billing, when terminating user AA106B answers at time T=3, and NCP AB104 receives an answer message, NCP AB104 updates the BIR EE322 for the call to indicate the time at which the answer message is received. Similarly, when the call terminates, NCP AB104 notes this time in BIR EE322 for the call.

With these times noted in BIR EE322, rating system LA102 can compute call duration LL142. Rating system LA102 can know which clock to use based on information contained in rate file LA132. This information can be uniquely identified for different users AB106 and different customers AA110.

6.3 Billing System Methodologies

The various billing methodologies that can be provided by call processing system AB102 include:

Post-paid, postalized

Post-paid, non-postalized

Post-paid with credit limits, postalized

Post-paid with credit limits, nonpostalized

Pre-paid, postalized

Pre-paid, non-postalized

Post-paid implies that charges accumulated by the account are billed to the client after the charges were incurred; e.g., monthly, biweekly, etc.

Pre-paid implies that services are paid for in advance. As the service is used, it is charged against the pre-paid account's positive balance.

Using a postalized rate structure, billing is based upon a pre-set rate per unit of time (usually minutes) not varying by mileage; for example, 20 cents per minute, regardless of whether a call is from Cedar Rapids, Iowa to Iowa City, Iowa or from Cedar Rapids, Iowa to New York, N.Y.

Under a non-postalized rate structure, billing is based upon the dollar value of the service, which is variable by distance and time of day. This means that a call from Cedar Rapids, Iowa to Iowa City, Iowa is likely to be less expensive than one from Cedar Rapids, Iowa to New York, N.Y., even though the duration of both calls is identical. Non-postalized rate structures may incorporate combinations of distance charges and time of day charges.

Pre-paid cards allow callers to make long-distance calls or use enhanced services such as messaging, conference calling, speed dialing, or audiotext by charging the calls or services against a prepaid account's positive balance. Two basic types of cards are available—one that simply expires when its value is depleted, and one that is "rechargeable." The system has the ability to track calls in progress, interrupt calls to alert the caller of diminishing or remaining time or value, and allow callers to replenish the balance. The system also will provide a warning and terminate calls whose time or dollar value has been exhausted.

Both pre-paid cards and post-paid cards with credit limits are subject to caps on individual services and on certain destination numbers. A maximum amount of usage is allowed for either a specified period of time or a dollar value, as optioned by the card issuer.

Figure 113:
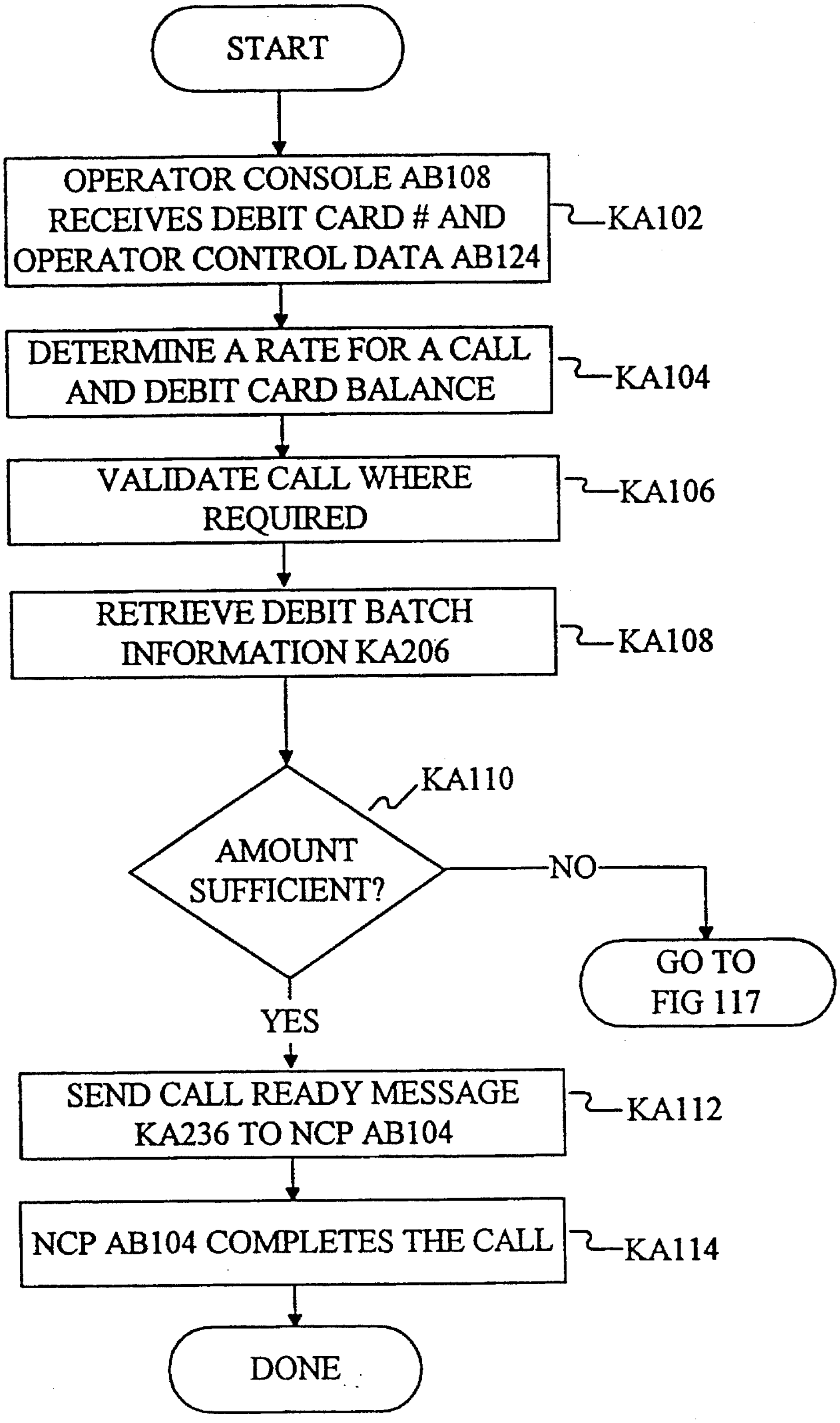
FIG. 113 is an operational flow diagram illustrating the steps involved in performing real-time billing for a debit card call according to one embodiment of the invention.
Figure 114:
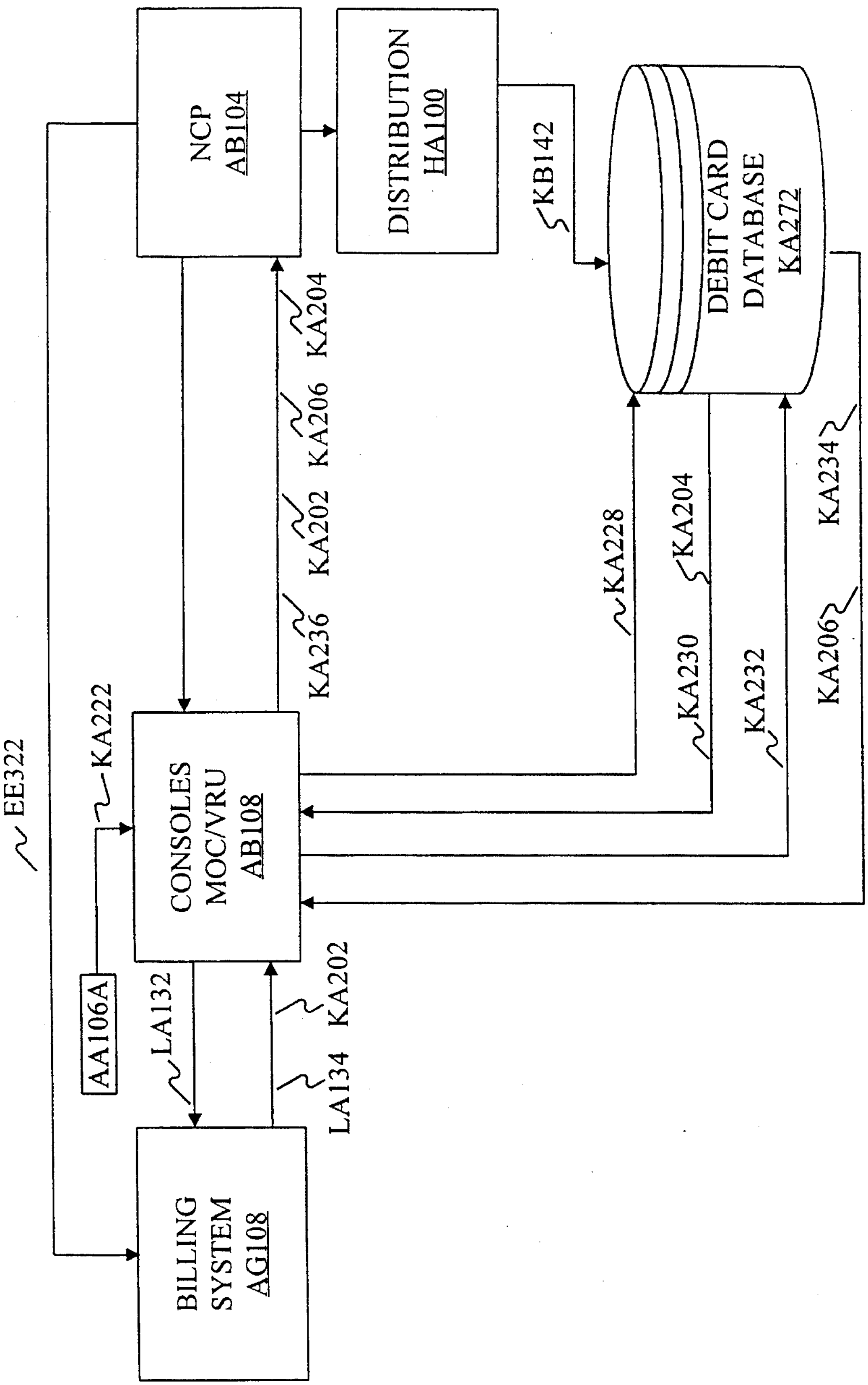
FIG. 114 is a data flow diagram illustrating the data flow that occurs during real-time billing of a call placed using a debit card according to one embodiment of the invention.

6.4 Operational and Data Flow Description of Real-Time Billing With a Debit Card FIG. 113 is an operational flow diagram illustrating the steps involved in performing real-time billing for a debit card call. FIG. 114 is a data flow diagram illustrating the data flow that occurs during real-time billing of a call placed using a debit card.

Referring now to FIGS. 113 and 114, in a step KA102, operator console AB108 receives the debit card number KA222 to which the call is to be charged and operator control data AB124. Operator control data AB124 is received from NCP AB104. Operator control data AB124 includes information about the call regarding the type of call being placed (operator-assisted), and the destination of the call.

Debit card number KA222 is typically provided by originating user AA106A to operator console AB108. This number can be entered using a touch-tone phone to a VRU AB134. Alternatively, the number can be provided to a manual operator console AB132 verbally.

In a step KA104, operator console AB108 determines the rate for the call and the dollar amount remaining on the debit card. Determining the rate is accomplished as described above with reference to FIGS. 104, 105, and 106. To reiterate, operator console AB108 sends a RATE QUOTE REQUEST LA132 to billing system AG108. RATE QUOTE REQUEST LA132 includes information needed by billing system AB108 in determining a rate for the call. Because call rating can be customized for specific customers AA110, or users AA106, the information needed by billing system AG108 in computing a rate quote will vary based on customer AA110 and user AA106. Typically, the information used to determine a rate can include the time of day that the call is being placed and, for distance-dependent rates, the origin and destination of the call.

Billing system AG108 then computes a rate for the call in terms of cost per unit time. This rate can be computed in a number of different manners depending on the embodiment of billing system AG108 implemented. For example, the rate can be computed by performing a simple table look-up using the time of day. This works well for a postalized rate structure that varies for different calling periods but not by mileage. The rate could also be computed using calculations to determine the distance of the call and multiplying this by the rate per distance established for that customer AA110 or user AA106. This works well for a non-postalized rate structure where billing is based on the distance and the time of day. Numerous alternative embodiments could be implemented, including one that uses a combination of table look-ups and calculations to compute the rate.

In a step KA104, billing system AG108 sends a rate quote response message KA134 to the operator console AB108 that requested the rate quote. Rate quote response message KA134 provides the rate at which the call is to be billed.

Figure 115:
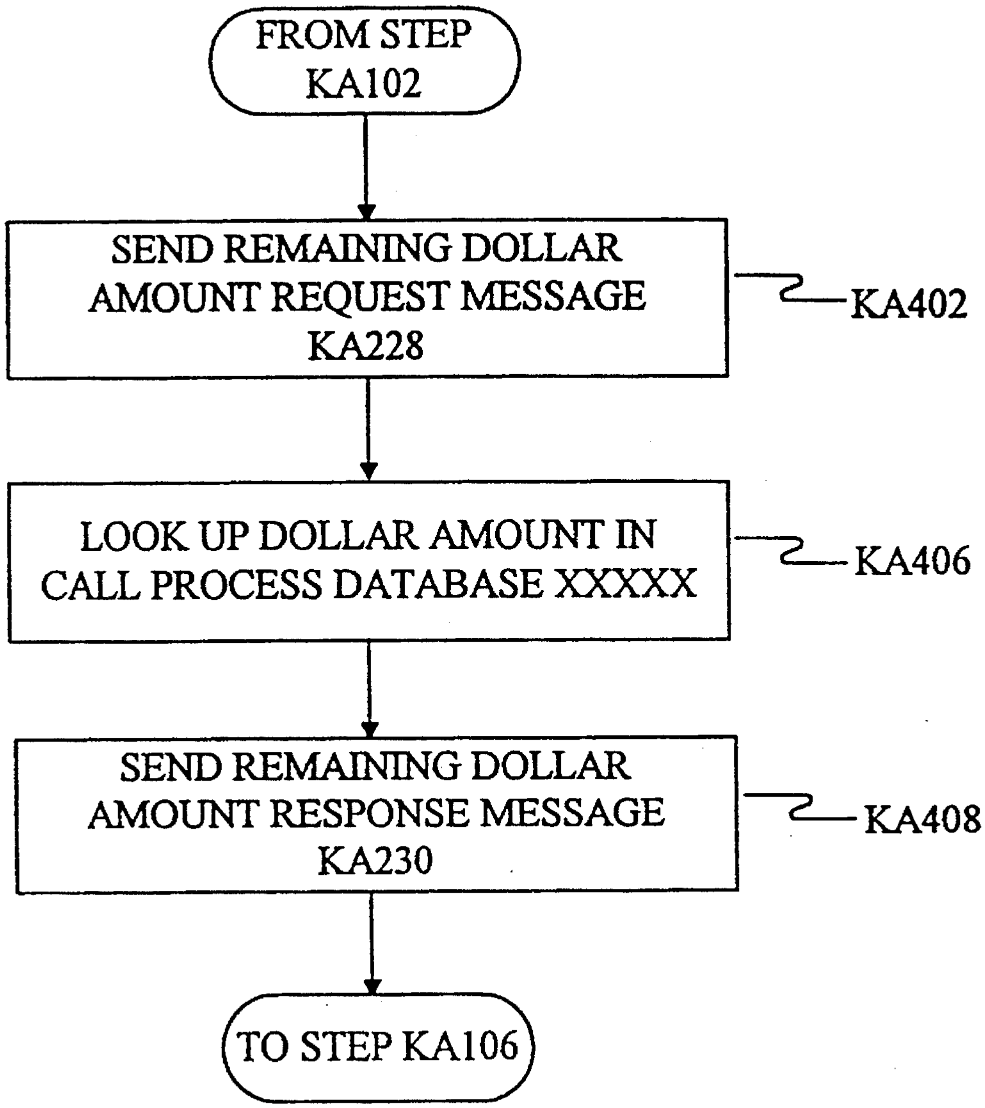
FIG. 115 is an operational flow diagram illustrating the steps involved with determining the remaining dollar amount on the debit card according to one embodiment of the invention.

FIG. 115 is an operational flow diagram illustrating the steps involved with determining the remaining dollar amount on the debit card. Referring now to FIG. 115, in a step KA402, a REMAINING DOLLAR AMOUNT REQUEST KA228 is sent to a debit card data base KA272.

In a step KA406, the dollar amount remaining on the debit card is retrieved from debit card database KA272.

In a step KA408, the dollar amount remaining on the debit card is sent to operator console AB108 in a REMAINING DOLLAR AMOUNT RESPONSE message KA230.

Returning now to FIG. 113, in a step KA106, the call is validated by validation system AG102 where required. For example, the particular debit card may be validated to determine whether it is valid for placing calls to the attempted destination, from the originating location, or other like call characteristics.

In a step KA108, debit batch information KA206 is retrieved from debit card database KA272. Debit batch information KA206 provides information regarding the debit card being used, such as what alerts to provide to originating user AA106 regarding the amount of time remaining in the call. Debit batch information KA206 can also includes information regarding how to alert (voice or tone), how to rate (flat or rate quote), how to expire, termination method, etc.

Figure 116:
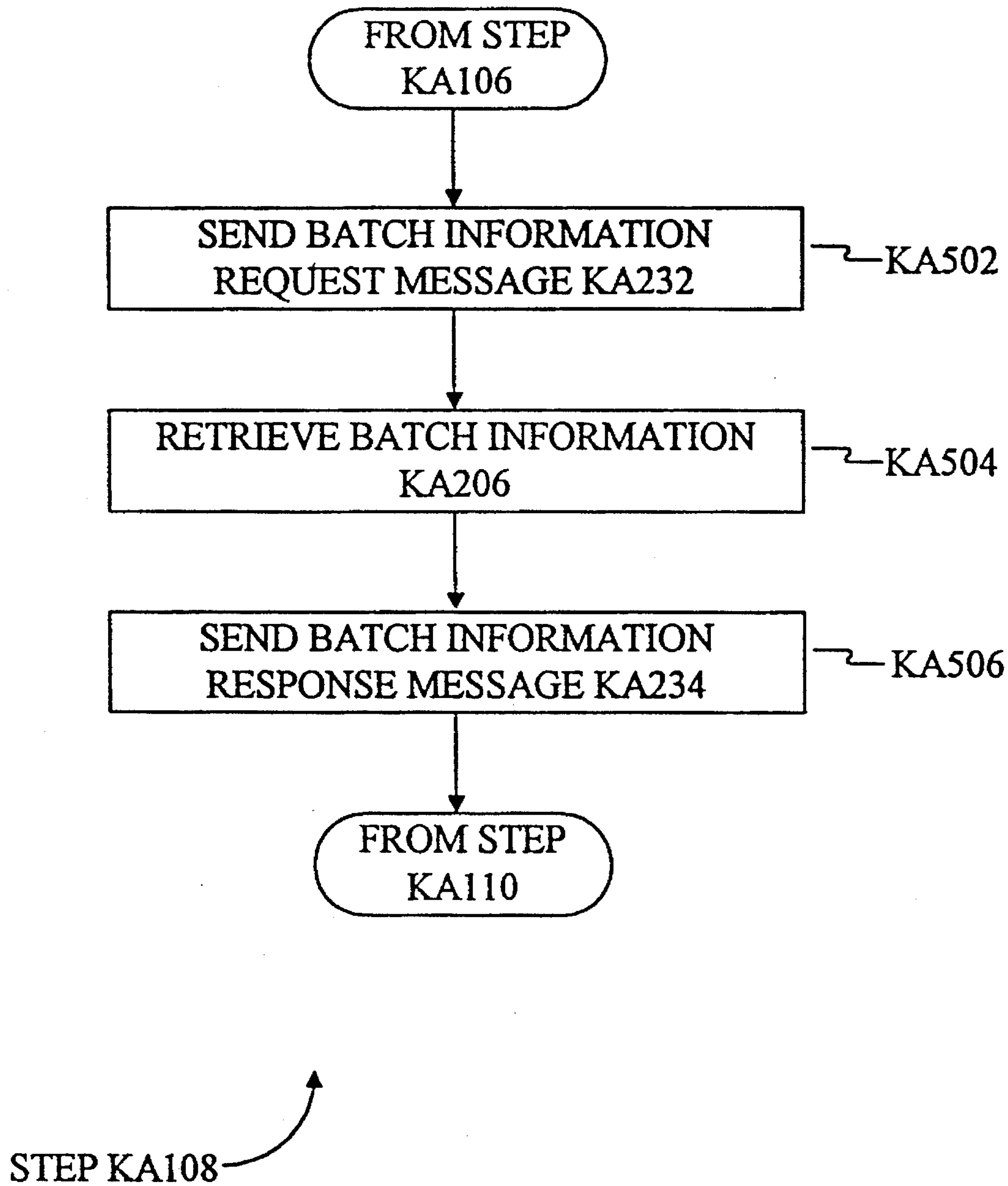
FIG. 116 is an operational flow diagram illustrating the steps involved with retrieving debit batch information according to one embodiment of the invention.

FIG. 116 is an operational flow diagram illustrating the steps involved with retrieving debit batch information KA206. Referring now to FIG. 116, in a step KA502, operator console AB108 sends a DEBIT BATCH INFORMATION REQUEST KA232 to debit card database KA272.

In a step KA504, batch information KA206 pertaining to the debit card used to place the call is retrieved from debit card database KA272.

In a step KA506, batch information KA206 is sent to operator console AB108 in a BATCH INFORMATION RESPONSE KA234.

Returning now to FIG. 113, in a step KA110, operator console AB108 determines whether the dollar amount KA206 remaining on the debit card is sufficient to complete the call. In one embodiment, operator console AB108 simply determines whether dollar amount KA206 is sufficient to pay for the call for a specified minimum call duration at the quoted rate KA202.

If dollar amount KA206 is sufficient, in a step KA112, operator console AB108 sends a CALL READY MESSAGE KA236 to NCP AB104. CALL READY MESSAGE KA236 instructs NCP AB104 that the call may be completed to the destination. In one embodiment, this is accomplished by operator console AB108 sending operator response data AB126 to NCP AB104, wherein operator response data AB126 comprises CALL READY MESSAGE KA236.

In a step KA114, NCP AB104 completes the call. In this step, NCP AB104 sends switch control data AB142 to matrix switch AB106, instructing matrix switch AB106 to route the call to the destination (in other words, to destination switch AA104 and/or terminating user AA106B). At this time, originating user AA106A can communicate with terminating user AA108B.

Figure 117:
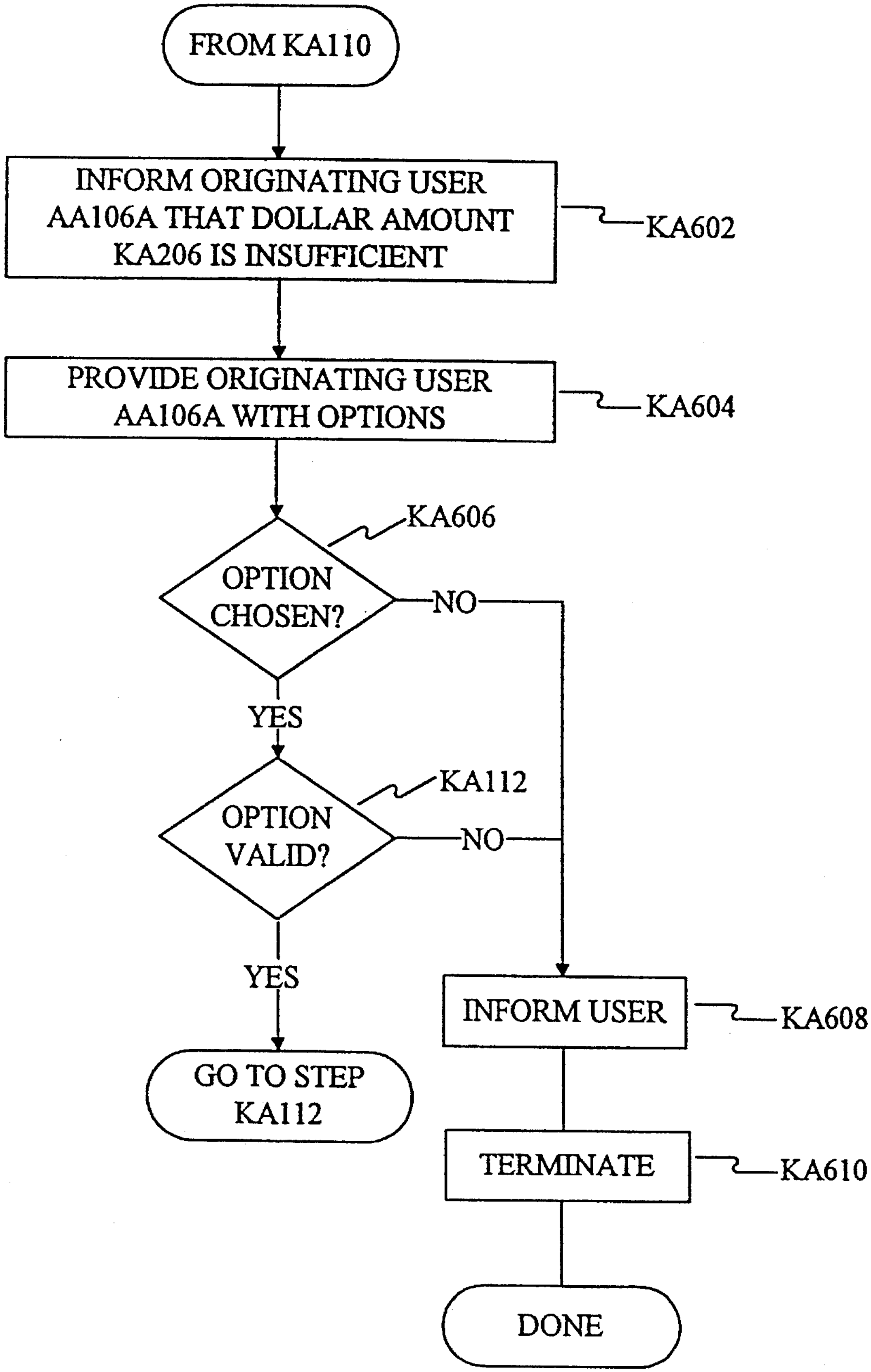
FIG. 117 is an operational flow diagram illustrating the steps taken by an operator console according to one embodiment of the invention when a dollar amount remaining on a debit card is insufficient to complete a debit card call.

If in step KA110 operator console AB108 had determined that dollar amount KA206 is not sufficient to complete the call, operator console AB108 takes the steps that are now described. FIG. 117 is an operational flow diagram illustrating the steps taken by operator console AB108 when dollar amount KA206 is insufficient to complete a debit card call. Referring now to FIG. 117, in a step KA602, operator console AB108 informs originating user AA106A that the dollar amount remaining on the debit card is insufficient to complete the call. This response can be provided to originating user AA106A by a human operator at a manual operator console AB132. Alternatively, the response can be a recorded or synthesized message played to originating user AA106A by a VRU AB134. Custom scripts may be used in generating the response so that originating user AA106A is provided with a customized response such as calling the user AA106 by name or identifying the name of carrier AA110 to which user AA106A subscribes, or identifying the name of the debit card.

In a step KA604, originating user AA106A is provided with alternative options that may be pursued in completing the call. These options can include recharging the debit card, where available, and placing the call by other means such as using a credit card, using another calling card, or placing a collect call. Again, the options provided to user AA106A may be customized for individual originating users AA106A or customers AA110. Scripts are used to provide this customization. For example, where a manual operator console AB132 is handling the call, a script appears on the operator screen. The operator reads the script to originating user AA106A. The script provides text to the operator outlining the options for that particular user AA106A or customer AA110.

In a step KA606, if originating user AA106A does not choose to complete the call using one of the provided options. In a step KA608, the operator informs the user that the call cannot be placed.

In a step KA610, operator console AB108 terminates the call. This occurs by sending operator response data AB126 to NCP AB104. NCP AB104 in turn sends switch control data AB142 to matrix switch AB106, terminating the call.

If, on the other hand, in step KA606 if an alternative option was chosen, the system may then proceed to validate the option in a step KA112. This step may include checking the validity of a calling card, a credit card, or contacting the called party to determine whether that party will accept the charges. If the option is validated, the operation continues at step KA112, and the call is completed in step KA114. If, on the other hand, the option is invalid, the user is informed in step KA608 and the call is terminated in step KA610.

The above text, with reference to FIGS. 113 and 114, described real-time billing to set up a call being placed with a debit card. Completion and termination of the debit card long-distance call is now described.

Completing the call should be differentiated from terminating the call. Completing the call means the call is routed from originating user AA106A to terminating user AA106B. Terminating the call means the call is no longer routed to terminating user AA106B and is ended.

Figure 118:
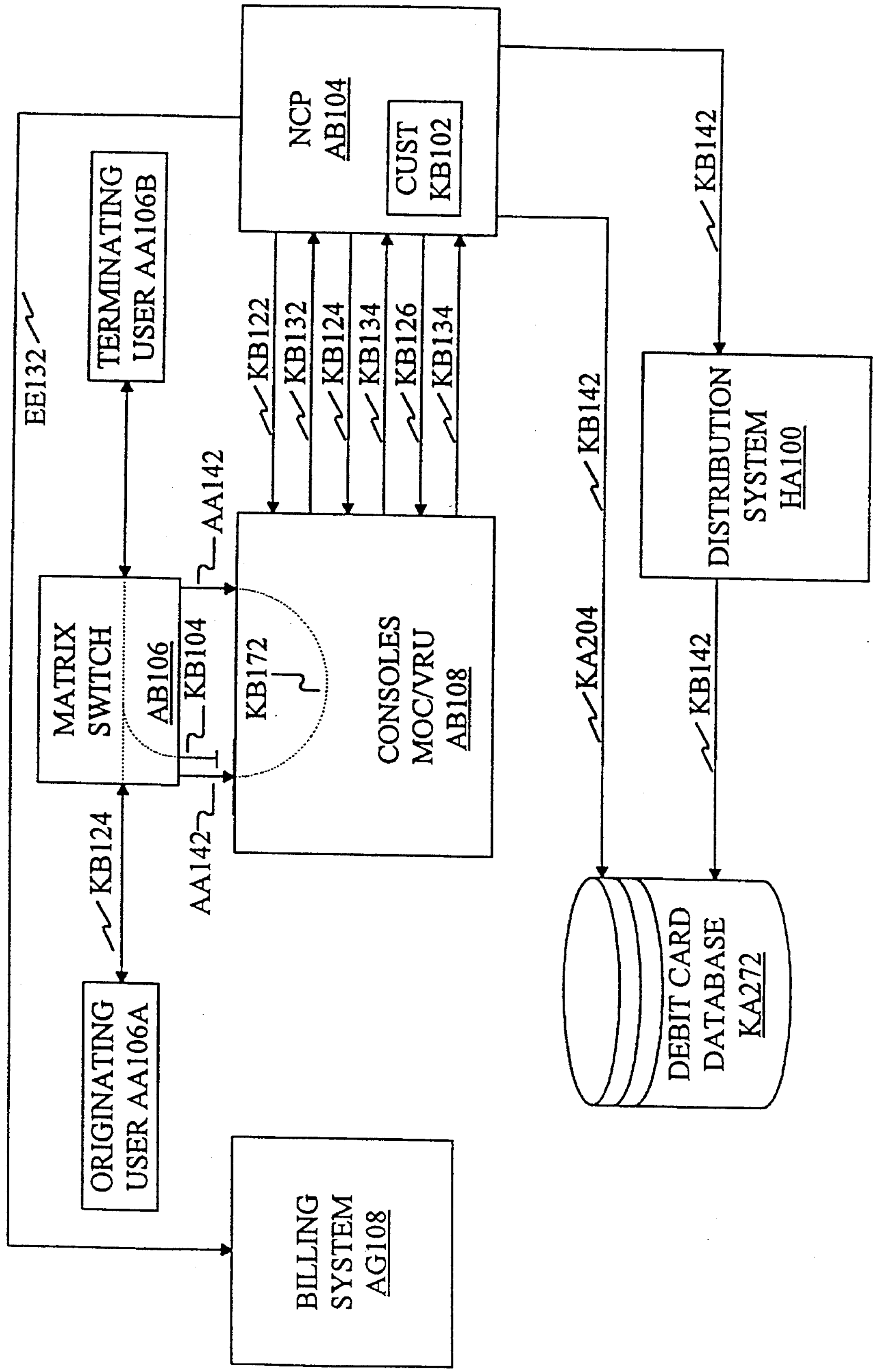

FIG. 118 is a data flow diagram illustrating the messages sent in completing and terminating the long-distance call placed using a debit card. FIG. 119, which comprises FIGS. 120 and 121, is an operational flow diagram illustrating the steps involved in completing and terminating a debit card call using real-time billing.

As discussed above with reference to FIG. 113, in steps KA112 and KA114, the NCP received a CALL READY MESSAGE KA236 and instructed matrix switch AB106 to route the call to the destination.

Along with CALL READY MESSAGE KA236, RATE QUOTE DATA KA202 is sent to NCP AB104 so that the call can be billed in real time.

Referring now to FIGS. 118 and 119, in completing the call, matrix switch AB106 signals the call to ring at the destination (at terminating user AA106B). When terminating user AA106B answers the call, an answer message AB134 is sent to NCP AB104 indicating that the call is completed. At this time, originating user AA106A, and terminating user AA106B can communicate via long distance and retail timing of the call begins. It is at this point that retail charges start accruing for the call. This is illustrated in step KB202.

In a step KB204, BSRVR BA108 uses rate quote KA202 and elapsed time since the call was completed to keep track of the cost of the call in real time. In one embodiment, BSRVR BA108 periodically uses rate quote KA202 and the duration of the call up to that point to determine the current cost of the call. In this manner, the cumulative cost of the call is tracked.

In a step KB206, BSRVR BA108 uses rate quote KA206 and remaining dollar amount KA204 to determine when dollar amount KA204 will be exhausted.

In a step KB208, BSRVR BA108 looks at batch info KA206 to determine when originating user AA106A is to be alerted that remaining dollar amount KA204 is almost exhausted. In one embodiment, only originating user AA106A is alerted. This is the embodiment described herein.

For the purpose of this discussion, we assume that in one embodiment, alerts are to be sent to the user indicating when there are 60 seconds remaining in the call and when there are 10 seconds remaining in the call. In alternative embodiments, alerts could be sent to warn the user at other times or could be sent based on dollar amount remaining. This feature is configurable on a per-subscriber or per-customer basis.

In a step KD210, when there are 60 seconds remaining in the call (in other words, when remaining dollar amount KA204 will be exhausted in 60 seconds), NCP BA104 sends an interrupt message (referred to as first interrupt message KB122) to operator console AB108. In one embodiment, BSRVR BA108 sends an interrupt message to CMP BA102. CMP BA102 sends the message to host gateway BA110 and to CRD BA106.

It should be noted that when the call was completed (routed by matrix switch AB106), operator console AB108 no longer handles the call. At this time, operator console AB108 is free to handle other calls, and call audio AB142 from the debit card call placed in this example is no longer routed to operator console AB108.

The effect of sending an interrupt message KB122 to CRD BA106 in step KB210 is that CRD BA106 now allocates an operator console AB108 to handle the call.

In a step KB212, matrix switch AB106 now routes call audio AA142 through operator console AB108. This is illustrated by dashed line KB172. In a step KB414, operator console AB108 provides a first alert message KB124 to originating user AA106A. In the embodiment described in this example, first alert message KB124 is to inform originating user AA106A that there are fewer than 60 seconds of time remaining on the debit card. In one embodiment, during this time, terminating user AA106B is routed to a stub KB104. In this manner, terminating user AA106B does not hear first alert message KB124. In an alternative embodiment, the call is routed through operator console AB108 so both parties can communicate via operator console AB108.

In a step KB416, the call is now routed through operator console AB108, and originating user AA106A is connected with terminating user AA106B, as illustrated by dashed line KB172.

In this document, when operator consoles AB108 are referred to in this manner, operator console AB108 can be either a manual operator console AB132, a VRU AB134, or a customer service console AB136.

In a step KB418, at the time for the second alert, in the example embodiment when 10 seconds are remaining, NCP AB104 sends a second interrupt message KB124 to operator console AB108. In a step KB420, operator console AB108 informs originating user AA106A that the call time is almost expired. In the example embodiment, operator console AB108 informs the user that 10 seconds are remaining.

In a step KB422, if users AA106A continue to talk, and neither one hangs up, BSRVR BA108A sends a terminate message KB126 to operator console AB108. In a step KB424, operator console AB108 hangs up terminating user AA106B. At this time, originating user AA106A is informed that the time has expired and the call was terminated. This announcement is made using scripts. Again, these scripts are either automated via a VRU AB134 or provided vocally by an operator on manual operator console AB132. The scripts can be customized to a particular user AA106 or to a particular customer AA110.

Alternatively, in step KB424, originating user AA106A may be given options other than automatic termination of the call. The script may indicate that originating user AA106A may enter another debit card number, or that originating user AA106A may choose to continue the call using a credit card or a calling card. Additionally, if these scripts are being sent by an automated VRU AB134, originating user AA106A may be given the option to press "0" to speak to an operator for alternative options.

This embodiment was presented with messages sent only to originating user AA106A. Alternative embodiments are contemplated wherein similar, alternative, or additional messages are sent to terminating user AA106B.

In response to first interrupt message KB122, operator console AB108 sends a debit complete message KB132 indicating that the call is now routed through operator console AB108 (step KB216) and that originating user AA106A was alerted (in step KB214). In response to second interrupt message KB124, operator console AB108 sends a second debit complete message KB134 to NCP AB104. Second debit complete message KB134 indicates that originating user AA106A was informed that call time is almost expired in step KB220.

In step KB224, operator console AB108 terminated the call. This is accomplished by sending a termination response KB134 to NCP AB104. Termination response KB134 causes NCP AB104 to send switch control data AB142 to matrix switch AB106 instructing matrix switch AB106 to terminate the call.

After the call is terminated, system accounting records must be updated. This process is now described. FIG. 204 is an operational flow diagram illustrating the process involved with updating the accounting records.

Referring now to FIGS. 118 and 204, in a step KB302, NCP AB104 sends a BIR EE322 to billing system AG108. Because billing server knows the rate KA202 at which the call is to be charged, BSRVR BA108 recalculates the charge for the call at periodic intervals. In one embodiment, this interval is every second. In this embodiment, the amount that the call costs is updated every second. This is nearly real time. BIR EE132 is sent after the call is completed and the total cost for the call has been calculated by BSRVR BA108.

In a step KB304, billing system AG108 uses BIR EE132 to update account records in a toll file LA134 (illustrated in FIG. 104) for originating user AA106A and customer AA110. BIR EE322 includes the cost for the call, the time the call was initiated by user AA106, the time the call was completed to terminating user AA106B, and the time the call was terminated. From this information, billing system AG108 can calculate wholesale and retail costs of the call.

In a step KB306, NCP AB104 updates debit card database KA272 with a new remaining dollar amount KA204. This is the amount of money left on the card, if any, after the call is terminated. If there is none left, debit card database KA272 is provided with information as to when the card expired.

In a step KB308, debit card database KA272 is updated with debit card complete record KB142 via distribution system HA100. This simply overwrites the record send directly to debit card database KA272 in step KB306. The update in step KB306 is performed so that debit card database KA272 is updated immediately in case distribution system HA100 goes down and does not update debit card database KA272 before originating user AA106A attempts to call back and reuse the debit card.

7.0 Fraud Detection and Prevention

Fraud detection and/or prevention is provided by the fraud system PB102 of the present invention based on messages and data received from the BSRVR BA108A, the consoles AB108, the billing system AG108, and the validation system AG102. Fraud alarms are provided to the fraud administrator on fraud console(s) PB106, and are stored in respective alarm files for failed calls in FBNALARMS PA120 and completed BNUALARMS PA116. Reports of fraud activity can be prepared. Real-time fraud detection and/or prevention is provided by the present invention.

7.1 Overview of the Fraud Problem in the Telephone Industry

Fraud in the use of the telephone system is a very significant problem today. Unauthorized users are able to use the telephone system without having to pay for such use. This constitutes fraud. The cost of such fraud is borne by the legitimate users either directly or indirectly. Where legal responsibility rests with the authorized user, the long distance carrier can charge the fraudulent calls to the authorized user. Where legal liability does not rest with the authorized user or where, for business reasons, the carrier decides not to assess the authorized user, the cost of the fraud must be borne by the carrier. Ultimately, since this fraud reduces the profitability of the carrier, the carrier must increase its rates to its authorized users to make up for losses incurred due to the fraud. The very real costs associated with such fraud in the telephone system results in substantial increases in rates that would not otherwise occur if such fraud could be prevented.

7.2 Specific Fraudulent Method Scenarios

For many years, telecommunications carriers have experienced problems with individuals stealing their services. With the advent of computers, theft of services became easier for the criminal, and carriers of all sizes began to realize higher monetary losses because of fraud.

The inventors have extensively investigated the fraudulent methods used by criminals to steal carrier services. A short tutorial on these methods is presented below. This tutorial facilitates an understanding of the systems and methods of the present invention designed to detect and prevent fraudulent activities.

Toll fraud is committed in a variety of ways, by a variety of people (also called criminals or fraudulent users). Fraud in its most basic form is perpetrated by the fraudulent user or individual who, when traveling, places a person-to-person collect operator-assisted call to his home to let his family know he reached his destination. This person, to avoid the toll charges of the long-distance call, will ask to speak to a prearranged fictitious person, or himself. The family has been instructed to deny the call (that is, not accept charges so the call is not allowed to go through) so no charge is incurred, but they know the family member has completed his travels. This scenario is perhaps the most common type of toll fraud committed in the U.S.A.

The more costly types of fraud of telecommunications services are committed by three principal groups; computer hackers, organized criminals, and "phone phreaks" (also called phone manipulators).

The computer "hacker" is an individual who uses a computer to break into another computer system or network in an unauthorized manner. This break-in is done to get information from the computer, such as: credit card account numbers; secret plans for manufacturers of computer games; and, sometimes even classified documents of government defense departments.

The term hacker has its origin in the early days of computer programming. The first computers were huge machines with very complicated computer programs. Companies would hire computer-literate people to "hack" the computer systems to find programming errors that could cost the company significant financial losses in down-time or lost revenue due to billing mix-ups and the like. Eventually, these paid computer professionals began to cross the borders looking for other people's computers and their mistakes just for "fun." In early computer espionage cases, data was sometimes destroyed or stolen and sold to the highest bidder by these original hackers.

Modern day hackers steal long-distance telecommunication services for three reasons:

(1) They do not want to pay long-distance charges to call into remote computer systems;

(2) They do not want to be caught. They know that if they place long-distance calls through their phone company, the call can be traced back to them. Theft of computer services is a serious crime in most states in the U.S.A. Consequently, the hackers want to avoid having the calls traced back to their computer via the phone lines; and/or (3) They know that there is a commercial market for the information they steal from computer systems and long distance carriers.

The second principal group consists of organized criminals. Organized crimes, such as drug running, gambling, boiler-room operations, and the like are made more profitable through the use of stolen credit cards and other billing devices. The criminals are able to complete their business without fear of being traced over phone lines by law enforcement authorities. Most organized crime members do not actively participate in the theft of billing devices, but they do employ a number of young computer hackers and "phone phreaks" who are willing and able to provide the needed information for a significant fee.

The third principal group consists of "phone phreaks." The "phone phreak" manipulates long-distance networks by a variety of methods. The goal is to place a call the furthest distance possible without paying for the call, and again, without getting caught.

These three groups and other criminals use several different types of criminal strategies to steal telecommunication services. Some of the strategies investigated by the inventors are as follows:

Many times hackers call into (also termed "ring up") the customer service department of a carrier and act as an employee of the carrier. The hacker then attempts to get information, such as card numbers, 800 numbers, or test loops. The hackers also may make extensive searches through a long-distance carrier's trash ("rubbish") bins in an effort to retrieve printed materials that would further their cause. Specifically, hackers look for training manuals, test maintenance schedules, phone directories, business cards, and the like that have been discarded. Using this purloined data, hackers are often able to fool legitimate employees into divulging proprietary information.

"Phone phreaks" sometimes use computers or other electronic devices to access the long-distance telecommunications networks. The most common devices used are electronic tone generators referred to as "Boxes." There are several types of "Boxes" in use worldwide. The most popular is the "Blue Box" which is a tone generator packaged inside either a calculator or some other small box or enclosure (the first one found was blue, which accounts for the name). The tones of the blue box resonate at 2600 Hz, which is the signal used by long distance switches in the U.S.A. to signal a disconnected call from the terminating end office to the originating calling office. Other types of "boxes" include "Black Boxes," "Red Boxes,"0 and "Cheese Boxes." "Black Boxes" prevent answer supervision from returning to the originating Calling Office (CO), and thus prevent billing of the call. "Red Boxes" emulate the sounds made by coins dropping through a pay phone and signal to the phone company to open the voice path for dialing and speaking. "Cheese Boxes" allow redirection of calls, or Call Forwarding as the term is used in the U.S.A.

Another form of telecommunications theft used frequently by hackers and by "phone phreaks" involves a computer program that, utilizing a speed dialer, allows them to dial into a long distance telecommunication network. Once in a telecommunications network, an authorization code and a target number (usually another computer) are attempted to determine if the code processes the call. If the code dialed is valid, the computer will receive answering modem tone from the target computer, and store the good code in its memory. The program then instructs the computer to hang up, redial the access number again, increment the authorization code in some manner, and redial the target computer. This process can be set to run automatically by setting a range of codes for the computer to try dialing, or by a specified length of time. The average program can gather one valid six-digit code for every eight to ten attempts. The longer the number of digits for the code, the longer it takes to hack. The codes are then shared or sold to other hackers.

Another frequently used method of obtaining authorization codes involves a confidence seam or game. The perpetrator calls a consumer late at night and identifies himself as a security investigator with one of the long-distance carriers, for example. He tells the consumer that her credit card is currently being used by someone to place large numbers of international calls. He explains that, in order to stop the calls, he must have the customer reveal her credit card number to the "investigator." Many customers do, in fact, give up the number, and the person posing as the investigator then takes the card number and sells it to people to place the illegal calls. There are several different variations of this seam currently being used in the U.S.A.

Many times these confidence games are used to provide free calling for illegal telemarketing ventures. The criminal sets up a fraudulent "front" company and begins telemarketing to areas of the country, offering expensive appliances, vacations and the like for minimal fees. The purchases must be made with credit cards, and, when they get the card number from the customer, they sell the number to others, or charge thousands of dollars of equipment that is then delivered to remote locations and resole.

Hackers have also been known to spend time at major metropolitan airports or train stations observing customers placing calls and copying down their credit card numbers for later sale or personal use. For example, suspects in New York City's Union Station have been arrested for using video cameras with powerful zoom lenses to pick up people's calling card numbers from across the waiting room.

Subscription fraud, which is defined as the intentional application for services for supplying fraudulent information, is a fast growing problem in the U.S.A. This type of fraud can easily cost a telecommunications carrier large sums of money in bad debt. Few states in the U.S.A. have laws against this type of activity, and so there is maximum gain for minimum risk and output on the part of the criminal. The most common case of subscription fraud occurs when people set up accounts in a residence for multiple telephone lines, then sell the services to people on the streets of the city. When the bill for the services arrives, the perpetrators of the subscription fraud move to another location, and the telecommunications carrier does not know a problem exists until 90 days or later when they try to collect on the account.

As carriers have tightened their defenses against hackers and phone phreaks, these individuals have directed their attention toward easier fraudulent activities. These fraudulent activities involve Private Business Exchanges (PBX's) and Customer Premise Equipment (CPE), which have become the target of massive fraudulent campaigns by the criminal community. Many PBX's for example, have 800 numbers for incoming Direct Inward System Access (DISA), which allows the owners of the PBX to make long-distance calls from remote locations, with billing to occur from the customer's PBX. The criminals have discovered how to access these DISA trunks, almost undetected, and have placed millions of dollars (U.S.A.) worth of fraudulent long-distance calls. The long-distance carriers are holding the equipment owners responsible for the charges, and the equipment owners often have no recourse for recovery of their losses from the criminals.

Many equipment owners are not even aware that they have the DISA function in their equipment, and so are caught completely unaware when their phone bill is received from the long-distance carrier. Equipment owners have been billed for as much as U.S. $1 million for fraudulent calls made through their PBXs. First tier carriers are now launching major campaigns to educate the business community on the dangers of PBX fraud, and are even offering "insurance" plans of service in case of an occurrence of fraud.

Voice mail systems (VMS) are also a common target of "phreaks" and hackers. They take over a company's voice mail system, and change all the user boxes into "code lines." The criminals post stolen authorization codes and credit cards on the VMS, and hackers call in and retrieve the information for their own criminal use.

The research of the inventors reveals that the most common perpetrators of telecommunications fraud are usually found in one of three groups:

(1) College students;

(2) Prisoners in prisons, and inmates of mental institutions; or, (3) Military personnel.

These three groups of perpetrators of telecommunications fraud have a number of things in common:

(1) Limited access to money to pay large phone bills;

(2) Far from home and family;

(3) Ready access to information and personnel to further scams and schemes; and/or (4) The desire to circumvent the system.

College students usually are involved in schemes to defraud phone companies through operator-assisted calls. College students illegally use calling cards belonging to others to place their calls, and often post the cards on pay phones around the college campus. Their goal is to have so many users on the cards that the phone company will not be able to trace them all. They are also often guilty of placing third party-billed calls without permission or authorization.

Prisoners have perfected the art of manipulating the phone service to suit their needs. While most prisons restrict the numbers available to inmates to call, the prisoners have myriad methods to evade these restrictions. The most common method of getting around restrictions to called numbers is for the prisoner to call an allowed party, such as a spouse or friend, who will conference the call onto third and fourth parties to whom the prisoner wishes to speak.

Another common method is for the prisoner to place a collect call to a company, such as a telephone company, and ask the switchboard operator for the accounting department. When they are connected, the prisoner tells accounting to switch him back to the switchboard, as she gave him the wrong extension. The accounting person complies, and now the switchboard operator sees an internal extension on her console and thinks the caller is internal to the company. The prisoner asks for an outside line, which the operator gives him, and he places a long distance, often international, call which is billed to the company.

Military personnel most often abuse the calling cards belonging to the parents of another soldier who foolishly shows someone his or her card, or who places a call for someone as a favor. Thousands of dollars (U.S.) have been lost in this type of situation, and the carrier has great difficulty holding the parents responsible for the charges on their card. The military authorities see this problem as a civilian matter and often refuse to cooperate in pressing charges or recovering losses. For example, one large carrier recently attempted, unsuccessfully, to prosecute a number of soldiers from a foreign country who were training on a U.S. base and made U.S. $20,000 in calls on a stolen card.

7.3 Representative Fraud Detection and Prevention System and Method

This aspect of the present invention is a fraud system and method which detects and prevents fraudulent use of the telephone system by an unauthorized user. The inventors have carefully identified the typical scenarios where fraud takes place. The present invention detects, monitors, and prevents such frauds from taking place on a real-time basis so that the integrity of the telephone system can be maintained. In this way, significant cost savings can be obtained ultimately by the carrier using the present invention.

This explanation of the fraud detection and prevention system AG112, shown in relation to the other associated systems in FIGS. 173, 174 and 175, first presents the architecture, data flows, and method of operation of a generalized version of the fraud detection and prevention system AG112. In Section 7.4 below, fifteen specific fraud detection and prevention scenarios (functionalities) produced by the present invention are discussed in detail. It should be noted that the present invention is not limited to the specific fraud scenarios that are shown, and can be used in other fraud detection and prevention applications.

In summary, the fraud detection and prevention system AG112 allows for real-time detection and prevention of fraud. It handles both calls that successfully complete (go through), and calls that fail. The fraud system is an integrated system that monitors manual operator consoles AB132, automated VRU consoles AB134, as well as BSRVR BA108 and the billing system (AG108). Specific fraud consoles PB106 are provided to fraud administrators assigned to the task of fraud detection and prevention. These individuals can monitor the operation of any call in the system in real-time and take the necessary actions for fraud detection and prevention. Automatic database storage of critical data associated with detection and prevention is provided. The architecture of the system allows for specific fraud scenarios to be detected and prevented, as discussed below in detail with respect to fourteen specific identified scenarios. The present invention is robust enough to accommodate additional fraud scenarios in the future.

FIGS. 173, 174, 175, 179 and FIG. 176, which comprises 177 and 178, are the important figures for reference in connection with this explanation of a generalized version of fraud detection and prevention system AG112. In addition, FIGS. 179–203 show the specifics of the capability of the present invention to detect and prevent specific fraud scenarios discussed below.

Turning now to FIG. 173, a relationship of the fraud detection and prevention system AG112 to other relevant systems in the present invention is shown. FIG. 173 is a high-level architectural block diagram showing the relationship and interfaces of fraud detection and prevention system AG112 with regard to the other relevant systems (components) and showing the communications pathways between the same. Referring now to FIG. 173, fraud detection and prevention system AG112 comprises a fraud system PB102 which performs the fraud detection and prevention, and associated fraud consoles PB106 connected by a LAN communications link PB104. Fraud detection and prevention system AG112 via fraud consoles PB106 provides real-time and stored information to fraud administrators (not shown). This information allows the fraud administrators to interact with the fraud detection and prevention system AG112 on a real-time basis so as to effect the necessary action for fraud detection and prevention. The fraud detection and prevention system AG112 is connected via LAN AB128 to the other relevant systems (components) in the present invention. Specifically, fraud detection and prevention system AG112 is connected by LAN AB128 to the BSRVR BA108A. Fraud detection and prevention system AG112 is connected to the rating system LA102 by the communications link provided by LAN AB128, and also by this communications link to the validation system AG102. The human operators can communicate with users AA106 via manual operator consoles AB132 (see FIG. 175). In addition, the voice response units (VRUs) AB134 which automatically interact with the users AA106 are in communication with the fraud detection and prevention system AG112 by LAN AB128. As shown in FIG. 173, the manual operator consoles AB132 and VRUs AB134 are combined and represented in box AB108 for brevity.

In the fraud detection and prevention system shown in FIG. 174, specific commands (messages) are provided between specific systems (components) shown in FIG. 173. FIG. 174 is a data flow diagram showing the flow of the important commands (messages) to and from the fraud detection and prevention system AG112 and the other systems (components) of the present invention.

Referring now to FIG. 174, the BSRVR BA108A provides FRAUD MESSAGES EE324 to a fraud system PB102 of the fraud detection and prevention system AG112. Fraud messages EE324 comprise a start-of-call message PA182, an intermediate-long call message PA180, and an end-of-call message PA178. These three messages, as discussed below, are used by fraud system PB102 to monitor calls that do not fail and are completed.

In addition, fraud system PB102 sends messages to and receives messages from validation system AG102. These messages are denominated questionable uses PC104. These messages, as discussed below, are used to provide for validation of calls through the system.

After a call is terminated, fraud system PB102, as discussed below, needs to receive cost information associated with that call. This information is provided by the rating system LA102, and is called RATED CALL DATA PA172. RATED CALL DATA PA172 can include the retail cost and the wholesale cost of the call that is completed and is terminated. Unlike traditional systems in which call rating is performed at some time later in a batch process, the availability of real-time rating in the present invention means that an immediate notification is possible when a particularly expensive call has been made. Since these types of calls are more likely to be made by hackers, and since they are the most damaging to the carrier, it is extremely valuable to be able to monitor them as they occur.

The present invention also keeps track of failed calls, since failed calls provide data about fraudulent patterns that may be occurring. This information is critical for the detection and prevention of fraud in four specific scenarios, as discussed below. The data relating to failed calls are provided by the manual operator console AB132 and the VRUs AB134 (which together comprise CONSOLES MOC/VRU AB108), and are called FAILED CALL ATTEMPT PC102.

Fraud personnel, also called fraud administrators (not shown), who provide the fraud detection and correction interact with the system using fraud consoles PB106. Fraud consoles PB106 provide data visually and audibly on a monitor, and in hard copy form, to the fraud personnel. Fraud personnel provide input data for interaction with the fraud system PB102. The information concerning possible fraud activity is denominated ALARMS PA170, and the data providing interaction between the fraud personnel and the fraud system PD102 is denominated QUERIES PA168.

An example architecture of the fraud system PB102 is shown in block diagram form in FIG. 175. In summary, the architecture of the fraud system PB102 is divided into three parts: a first part for documentation which comprises the reports module PA108; a second part for completed calls which comprises billed number usage (BNUSAGE) PA104 and five associated data files (PA110 to PA118); and a third part for calls that have failed using a failed billing number usage module PA106 (FBNUSAGE) and four associated modules (PA120 to PA126).

Referring first to the services provided by fraud system PB102, the reports module PA108 provides log reports and special requests, as discussed below in Section 7.5. This information is provided to a printer PA130 by a data path PA128. This data can be provided upon command by fraud system PB102 via fraud console PB106, and also by operators at the manual operator console AB132. They can also be preset to run at specified intervals (for example, every 3 hours).

Calls that process go through the system are handled by the billed number usage module PA104 (BNUSAGE). BNUSAGE PA104 interacts with five modules, PA110 to PA118, as discussed below. Perhaps the most important of these modules is the short billing information record file module PA110 (labeled SBIRFILE). SBIRFILE module PA110 receives truncated billing information record data from the BSRVR BA108A. Specifically, BSRVR BA108A provides START-OF-CALL DATA PA182, INTERMEDIATE-LONG CALL DATA PA180, and END-OF-CALL DATA PA178. In addition, rating system LA102 provides RATED CALL DATA PA172.

The truncated BIR information is archived in a circular database PA134 (the circular aspect is indicated by the asterisk on FIG. 175, and this convention is used for the other circular databases shown in PA1). The data is provided to the circular databases PA134 via a datapath PA132.

The term "circular," as used with the database, means that information is automatically deleted in the order in which it was put onto the database when the database becomes full. In other words, the oldest information in the circular database is deleted first. In this way, the circular database is maintenance-tree, since no deletion is necessary by an operator or an external program. A suitable database used for PA134 and the other databases shown in FIG. 175 is a Sybase model. Sybase is available from Sybase, Inc., Emeryville, Calif. 94606.

A threshold file, called the billing number usage threshold file module PA114 (BNUTHRS), accesses specific parameters concerning billing numbers in the system. These parameters can either be global, which means that they apply to all billing numbers in the system, or can be specific to a billing number (called special). These parameters are also called thresholds. They are used to determine whether the data on a specific call indicates a possible fraud scenario.

Any particular parameter can be stored in BNUTHRS PA114. Representative of these are the following parameters, also called thresholds, as follows:

- 10 or more attempts on a single billed number in 15 minutes
- 2 or more calls per billed number with different ANI in 5 minutes
- 2 or more calls per billed number with different NXX in 5 minutes
- 2 or more calls per billed number with different NPA in 60 minutes (except geographical border NPAs)
- 10 or more current active calls with same billed number
- completed call exceed 60 minutes
- BSRVR warning on long call (every 30 minutes)
- call international
- call exceeds U.S. $5.00 wholesale cost
- call exceeds U.S. $5.00 retail cost
- number of reoriginations exceeds 10
- 800 POTS changes exceed 3 in 24 hours, with audible alarm It should be understood that these are merely representative and purely for purposes of illustration. The present invention contemplates any type of parameter/threshold. A database PA142 stores and provides this parameter or threshold data via a datapath PA140. In one embodiment, database PA142 is not circular.

When the present invention determines that a parameter/threshold has been exceeded, an alarm is activated or triggered. The information relating to this alarm is provided by BNUSAGE PA104 to a billing number usage alarms file module PA116 (BNUALARMS) for storage. A circular database PA146 is supplied with this alarm data by a data pathway PA144. The alarm data is provided as alarm data PA170 to the fraud console PB106 via BNUSAGE module PA104. Alarms are visual and audible according to specific frequency, time duration, and the like.

A callhandle file module PA118 (CHANDFILE) is provided with callhandle information by BNUSAGE PA104. A circular database PA150 stores and provides the call data by a data pathway PA148. Database PA150 provides a cross reference between the call handle and the billing number used in the file.

The billing number for each call is used by the fraud system PB102 to identify the call. This data is provided to a billing number usage file module PA112 (BNUFILE). PA112 creates a BNU record for each billed number. A representative BNU record for an ANI showing the data field is found in Fraud FIG. 179. It includes, for example, the billing number, the billing method, current uses, and a list of the last 'N' attempts of calls (including time, ANI, call information, and the like). If a billed number is not used for a particular time period, such as between 30 and 45 days, the billed number is deleted from the system so as to reallocate storage space in the database file PA138. Database file PA138 receives the data from a data via PA136. This database uses a billed number search strategy.

The fraud system PB102 also monitors and tracks calls that have failed. Failed calls provide critical information concerning fraudulent activities that may be occurring. It is therefore important that the fraud system PB102 analyze these failed calls and keep an historical record of them. This allows the fraud personnel (not shown) to detect and prevent fraud. Failed calls are analyzed by the failed billing number usage module PA106 (FBNUSAGE).

With respect to failed calls, perhaps the most important module is the short failed billing number file module PA126 (SFBNFIL), which is provided with a truncated failed billing number record. Specifically, operator consoles AB108 provide failed call attempt data PA176. The short failed billing number data is stored in and retrieved from a circular database PA166 via a data pathway PA164. A suitable database is Sybase, of Sybase, Inc., Emeryville, Calif. 94608.

The parameters or thresholds relating to failed billing numbers are stored in a failed billing number threshold module PA122 (FBNTHRS). The parameters or thresholds are stored in and provided from a database PA158 by a data path PA156. These parameters or thresholds are used for the fraud scenarios based on failed calls.

Whenever an alarm is triggered based on a parameter or threshold from FBNTHRS module PA122 being exceeded, this alarm information is provided to the failed billing number alarm module PA120 (FBNALARMS). The alarm data is stored in and provided by a circular database PA154 via a data path PA152. In turn, the alarm data PA170 concerning the tailed billing number is supplied by the FBNUSAGE PA106 to the fraud console PB106.

The information relating to each billing number having a failed billed call is supplied by FBNUSAGE module PA106 to a failed billing number usage file PA124 (FBNUFIL). Each failed call creates a record in the FBNUFIL PA124. A representative BFNU record showing failed call attempt data PA176 is shown in FIG. 179. Two FBNU records are created for each failed call: a first for the originating ANI, and a second for a terminating ANI (also called the "called number").

A suitable form for implementation of fraud system PB102 is a database server. The database server can be on a single platform or multiple platforms as required. Any type of operating system can be utilized. A suitable type is one using UNIX™ OS/2.

A data flow for a generalized fraud detection and prevention scenario in accordance with the present invention is shown in block diagram form in FIG. 176. FIG. 176 comprises a first FIG. 177 and a second FIG. 178. This flow applies to the completed call scenario and to the tailed call scenario.

Referring now to FIG. 177, a first step is a wait for data step as indicated by a block PD102. The data is then received, as indicated by a data received block PD104. If the data indicates a call has been terminated, a record needs to be written to the SBIRFIL module PA110, as indicated by a step PD106. Messages indicating that a call has been completed include: (1) START OF CALL PA182; (2) INTERMEDIATE-LONG CALL PA180; (3) END OF CALL PA178; (4) rated call data PA172; and, (5) questionable uses PC104. Alternately, if a call has failed to go through, a record needs to be written to the SFBNFILE module PA126, as indicated by step PD106. A message indicating that a call has failed is FAILED CALL ATTEMPT PA176.

The shortened billing information record (SBIR) is then stored in SBIRFILE PA110. The shortened failed billing number record (SFBN) is then stored in the SFBNFILE module PA126. This storage is indicated by a step PD108. The usage record then needs to be either or obtained and updated if it is in existence, as indicated by a step PD110. The SBIR is used to obtain the BNU, and the SFBN is used to obtain the FBNU.

With respect to a call that has been completed, the billing number usage (BNU) record for that number must be obtained from BNUFILE PA112, as indicated by a step PD112. Similarly, if a call fails to go through, the failed billing number usage (FBNU) record needs to be retrieved from the FBNUFILE module PA124, as indicated by step PD112. As an aside, Fraud FIG. 179 shows representative examples of BNU record (for a completed call), and a FBNU record (for a failed call).

The data flow diagram from FIG. 177 extends to FIG. 178, as indicated by the reference circle PD114. Referring now to FIG. 178, the BNU record for a completed call and the FBNU record for a failed call needs to be updated in the respective BNUFILE module PA112 or the BRNUFILE module PA124, as indicated by a block PE102.

With respect to a completed call, the parameter or threshold information for the billed number needs to be checked to determine if a fraud scenario has been detected and an associated fraud scenario alarm needs to be triggered. In this regard, the threshold record for the billed number of the completed call is obtained from the BNUTHRS module PA114, as indicated by a step PE104. Alternatively, for a failed call, the threshold record for the failed billed number is obtained from the FBNTHRS module PA122, as indicated by step PE104.

The next step is to determine whether a fraud scenario has been detected (which is also referred to as triggering an alarm). With respect to a completed call, the parameters (thresholds) for the billed number obtained from the BNUTHRS module PA114 are compared to the corresponding data from the BNU record in order to determine whether the fraud scenario (alarm) has been found. If no alarm is found, the data flow returns to wait for data step PD102, as indicated by the loop pathway PD118. Alternately, if an alarm has been found (fraud scenario detected), as indicated by the YES on data path PD108, the alarm (fraud scenario) data needs to be saved in the billing number usage file in the BNUALARMS module PA116, as indicated by a step PD110. Thereafter, an alarm indicator detection of the fraud scenario is sent to the fraud consoles PB106 indicating the alarm condition with respect to the completed call, as indicated by a step PD112. Thereafter, the generalized fraud detection and prevention scenario returns to wait for data step PD102.

Similarly, for a failed call, if fraud scenario (alarm) is determined to not have occurred, the data flow returns to wait for data step PD102. If a fraud scenario (alarm) has been determined to have occurred, however, this is indicated by the YES condition on data path PD108. The detection of the fraud scenario is performed by comparing the parameters (thresholds) for the failed number obtained from the FBNTHRS module PA122 with the corresponding data from the FBNU record for the failed number. The alarm is saved in the FBNALARMS module PA120, as indicated by step PD110. In addition, an alarm indicating detection of the fraud scenario sends an alarm to the fraud console PD106, indicating the condition of the failed call, as shown by step PD112. Thereafter, the generalized fraud detection and prevention scenario, via pathway PD118, waits for new data, as indicated by step PD102.

7.4 Specific Fraud Detection and Prevention Capabilities

The system and method of the present invention using the fraud system PB102 and the fraud consoles PB106 in connection with the other systems of the present invention as shown in FIG. 175, 173, and 174 allow the fraud administrator (not shown) to detect and/or prevent a significant number of specific fraud scenarios which have been identified by the inventors. FIGS. 180–195 show the fraud detection and prevention capability of the present invention against the specific fraud scenarios.

Referring now to FIGS. 180–195. There are fifteen different fraud detection and/or prevention scenarios in accordance with the present invention which are described below. At a high level they all utilize the architecture, method of operation, and data flow of the fraud system PB102 and fraud consoles PB106 described above in Section 7.3. These are representative of the present invention and should not be viewed as being the only detection and prevention scenarios that can be provided.

The fraud detection and/or prevention capability of the present invention can provide real-time alarms that can be grouped into two categories: (1) those alarms which occur with a failed call attempt; and (2) those alarms which occur with a completed call. With respect to completed calls, the present invention can provide certain alarms at the beginning (start) of the completed call, after the completed call has been in existence for a specified amount of time, and after the billing data has been determined for the completed call that is terminated. It should be understood that a specific failed call or completed call can cause one or more alarms to occur. It should also be understood that the present invention can be configured so that the alarms can be customized at any level of granularity from specific carrier, to specific end user, and all the way down to a particular billing number or originating ANI or called number, etc. This ability to configure the fraud system PB102 as well as real-time fraud detection and/or prevention greatly enhances the capability of the present invention to detect and/or prevent fraud.

7.4.1 Failed Call

Set forth below are descriptions for four fraud detection and/or prevention scenarios in connection with the present invention which occur with a failed call. A failed call is one where the validation system AG102 prevents a call from being completed because it fails one or more parameters. As discussed in section 7.4.1, these failed parameters, for example, can include a blocked originating ANI, a blocked terminating ANI, a blocked billing number, two or more simultaneous calls on a debit card where the second call is blocked until the first call is completed (see section 7.4.2.5), a blocked NPA, a blocked NPA/NXX, denied validation, invalid format of a card, invalid calling areas, or a customer fails to complete dialing all the necessary digits and disconnects, and the like.

One or more of the four fraud detection and/or prevention scenarios set forth below in accordance with the present invention can occur on a single failed call. The failed call attempt scenario of Section 7.4.1.1 will always occur for any failed call. However, in addition, the failed call can also result in one or more of the other three scenarios occurring. In some extreme situations, a failed call can result in all of the four scenarios occurring.

These four scenarios are particularly effective for detecting the activities of a hacker or phone phreak who is trying to gain unauthorized access to the telephone system to commit fraud. The detection and/or prevention of fraud for each failed call provides real-time information to the fraud personnel (administrator) on the fraud console(s) PB106 so that she can take appropriate action to protect the telephone system. Her actions can stop additional fraud from occurring because the attack on the telephone system can be immediately dealt with so that additional precautions can be taken. Failed calls provide the fraud administrator with extremely valuable information concerning attempted fraudulent activities that have not yet caused economic harm to the telephone system, but if not known and not acted on can and often will result in great financial loss after the hacker or phone phreak has achieved access into the telephone system.

7.4.1.1 Failed Call Attempt

The FAILED CALL ATTEMPT MESSAGE PA176 is provided by the operator consoles AB108 to the fraud system PB102, as shown in FIG. 175. Referring now to FIG. 179, FIG. 180, and FIG. 181, the failed call attempt scenario is discussed. FIG. 179 shows a representative FBNU record, which is stored in the FBNUFILE PA124. Each failed call results in a FBNU record being created, or updated if already in existence, for that failed call.

FIG. 180 shows a high level block diagram of the four fraud scenarios that can be detected and/or prevented in accordance with the present invention for a failed call. FIG. 181 breaks out the specific failed call attempt scenario of FIG. 180.

The FAILED CALL ATTEMPT MESSAGE PA176 is received from the consoles AB108 by fraud system PB102. The receipt of the FAILED CALL ATTEMPT MESSAGE PA176 is indicated by a PP102, as shown in FIG. 180 and FIG. 181. The SFBNFILE PA126 stores the failed call attempt message PA176. The SFBN is used to obtain the FBNU record for the failed call, and to update it. The failed call attempt parameters (thresholds) stored in the FBNTHRS module PA122 are obtained, as indicated by a box PP104. The FBNU data for the failed call from the FBNUFILE PA124 is compared with the thresholds (parameters) from FBNTHRS PA122 in a decision box PP106 to determine if one or more of the thresholds (parameters) have been exceeded. If no threshold has been exceeded, the failed call attempts scenario has not been detected as indicated by a NO flow line PP108. Thereafter as indicated by a DONE block PP110, the FBNU record for the originating ANI is updated and the FBNU record for the terminating ANI (also referred to as the called number in FIG. 180) is updated for the failed call. The records of the last 'N' attempts are updated in these two FBNU records in order to reflect the failed call.

In contrast, if one or more of the thresholds has been exceeded, as determined by decision block PP106, the failed call attempt scenario proceeds to a YES flow line PP112. A failed call attempt alarm is then generated, as indicated by a block PP114. The failed call attempt alarm is provided to two parts of the present invention. The first part is the failed fraud attempt alarm provided to fraud console(s) PB106, as indicated by an alarm line PA170. In addition, the alarm data is stored in the FBNALARMS module PA120, so that the failed call attempt alarm information can later be retrieved by fraud personnel. This alarm information is available for detection and/or fraud prevention activities and archival purposes. After these two activities have been completed, the failed call attempt scenario proceeds to a DONE block labeled PP116. This completes the failed call attempt scenario FRAUD500.

7.4.1.2 Hot Originating ANI

The fraud detection and/or prevention scenario in accordance with the present invention for a hot originating ANI is now described. As discussed elsewhere, the originating ANI is a ten-digit number indicating the number from where the call originated (it does not include the country code). "HOT" means that the number has been previously identified as being one from which or to which fraud is occurring. Reference is made to FIG. 180 and FIG. 182. FIG. 182 shows the steps of the scenario for both a hot originating ANI and the steps of the scenario for a hot terminating ANI (also referred to as a hot terminating number).

The hot originating ANI scenario is typically performed after the failed call attempt scenario is performed, as discussed above in Section 7.4.1.1.

Referring now to FIG. 175, FIG. 179, FIG. 180 and FIG. 182, the failed call attempt message PA176 is received by fraud system PB102 from consoles AB108, as indicated by block PP120. Failed call attempt message PA176 is stored in SFBNFILE PA126. The hot originating ANI parameters (thresholds), as indicated by a block P120, using the SFBN are obtained from FBNTHURS PA122. These parameters indicate whether the HOT FLAG in the FBNUFILE PA124 need to be checked. Next, in decision block PP106, the HOT FLAG field in the FBNU record is checked to determine whether the originating ANI of the failed call is hot.

If the failed call originating ANI is determined by decision block PP106 not to be hot, the hot originating ANI fraud scenario proceeds via a NO flow line PP102 to DONE block PP110. The FBNU record for the failed call originating ANI is updated to reflect this last call in the FBNU record PO402. Thus, it can be seen that all failed calls are examined by this fraud scenario to determine if the failed call was from a hot originating ANI.

Alternately, if decision block PP106 determines that the call is from a hot originating ANI, the fraud scenario proceeds along a YES line PP112. This indicates that the hot originating ANI scenario has been detected. A hot originating ANI alarm is generated by a P114 block. Two activities then occur. First, the hot originating ANI message PA170 is provided to the fraud administrators on the fraud console(s) PB106. In addition, the FBNALARMS file PA120 is updated to include this alarm information for subsequent use, as indicated by the DONE block PP116. In this way, a separate alarm is provided to the fraud administrator for a failed call which also is coming from a hot originating ANI. Thus, the fraud administrator can determine not only that a failed call occurred, but that the failed call came from a hot originating ANI. The fraud administrator can act accordingly.

7.4.1.3 Hot Terminating ANI

All failed calls are also checked to determine whether they are from a hot terminating ANI or number. The flow used for determining this fraud scenario and for taking the appropriate action is the same that is done for the hot originating ANI discussed above in Section 7.3.1.2. For purposes of brevity, only the differences between the hot originating ANI and the hot terminating ANI are discussed.

First, the order in which the hot originating ANI and the hot terminating ANI scenarios are performed does not matter in accordance with the present invention. They can be done sequentially in either order, or done in parallel. The hot terminating ANI parameters, as indicated by a block labeled FRAUD520, are obtained from FBNUFILE PA124. In addition, if the terminating ANI is determined not to be hot (called "cold"), the FBNU record for the terminating ANI is updated to reflect the failed call as discussed above in the FBNUFILE file PA122. This updating is indicated by DONE block PP110.

Similarly, if the terminating ANI is determined to be hot by decision block PP106, two activities occur. First, a hot terminating ANI alarm PA170 is provided to the fraud administrator on the fraud console PB106. Second, the fraud alarm data for the hot terminating ANI is stored in the FBNALARMS file PA120.

In this way, a separate alarm is provided to the fraud administrator indicating that the failed call has been directed to a hot terminating ANI. Thus, it can be appreciated that a failed call can also result in an alarm(s) indicating that it is from a hot originating ANI and/or is directed to a hot terminating ANI. This fraud information provides the fraud administrator with additional data so as to make appropriate action to prevent fraud occurring within the telecommunication system.

7.4.1.4 High Usage On Billing Number

This fraud scenario in accordance with the present invention provides the capability of detecting and/or preventing a number of calls from an originating ANI and/or to a terminating ANI which exceeds a specific number with a specific time. This fraud scenario typically occurs where a hacker is trying to discover the proper PIN for a billing number so as to gain access to that billing number. Presently, hackers use very sophisticated techniques to determine the proper PIN for a billing number by using, for example, computer programs that automatically generate possible PINs in successive calls so that within a short period of time the proper PIN is uncovered. The present invention can detect and/or prevent this fraud scenario from occurring by detecting in real time when a particular number of failed calls have occurred for a designated originating ANI or a terminating ANI within a predefined period of time.

This fraud detection and/or prevention scenario is best understood with reference to FIGS. 175, FIG. 179, FIG. 180 and FIG. 183. FIG. 183 is a block diagram of the representative steps of this fraud scenario.

It should be understood that the scenario described below applies both to an originating ANI and to a terminating ANI (also referred to as a called number). Either or both the originating ANI and the terminating ANI of a failed call can be evaluated to determine whether the alarm threshold has been exceeded. It should be understood that the present invention contemplates checking either or both the originating ANI and the terminating ANI of a failed call.

Referring now to the figures, the FAILED CALL ATTEMPT MESSAGE PA176 is received by the fraud system PB102 from the consoles AB108 as indicated by block PP102. FIG. 183 is a combined figure showing the flow of the fraud scenario for the originating ANI and the flow of the fraud scenario for the terminating ANI. It should be understood that the steps set forth in FIG. 183 are implemented separately for an originating ANI and a terminating ANI.

The FAILED CALL ATTEMPT MESSAGE PA176 is stored in the SFBNFILE PA126. The parameters or thresholds indicating the high usage value for the originating ANI are then obtained from the FBNTHRS PA122, as indicated by a block PP124. Thereafter, the FBNU record for the originating ANI is obtained from FBNUFILE PA124. The last 'N' number of failed calls for the originating ANI, as stored in this record of PP402 file, are reviewed to determine the number that have occurred within a 'Y' period of time, as specified by the parameters of step PP124. The review of the last 'N' calls for the originating ANI are indicated by a block PP402, as shown in FIG. 183. If the number of calls within the specified time frame is less than the value threshold for that originating ANI, the high usage fraud scenario has not been detected, and the flow proceeds along line PP108 to DONE block PP110. This state indicates that no excessive high use of the originating ANI of the failed call has occurred.

However, if the number of failed calls from the originating ANI within the specified time frame has been equal to or has exceeded the threshold, decision block PP106 detects the high usage ANI fraud scenario. The flow proceeds along the YES line PP112. A high usage originating ANI alarm is generated by alarm block PP114. Two activities then occur. First, the high usage originating ANI alarm PA170 is provided to the fraud console(s) PB106 so that the fraud administrator can take appropriate action. In addition, the FBNALARMS PA120 is provided with this alarm information for storage so that it can be obtained for later analysis and display.

Once these two activities have been completed, this fraud scenario proceeds to the DONE step labeled PP116.

As stated above, the evaluation of the terminating ANI for a failed call is done in similar fashion to determine if any threshold parameter for that terminating ANI has been exceeded within the specified 'Y' period of time. The present invention can check both the originating ANI and the terminating ANI for these high usage conditions, or can check only one depending on how the fraud system PB102 is configured.

In this way, the fraud administrator can use this information about failed calls that are repeatedly being made from or to a particular ANI so as to detect the hacking which typically occurs, for example, when a hacker is trying to determine the PIN for a billing number. This capability allows the present invention to be protected against typical hacking scenarios that presently occur.

7.4.2 A Completed Call

As discussed above in section 7.3.1, the present invention first analyzes all failed calls to determine whether a fraud scenario has been detected and/or needs to be prevented. In addition, the present invention, as described in this section, examines all completed calls (calls that go through) to determine whether each of these calls satisfies any of the fraud detection and/or prevention scenarios that have been customized for the fraud system PB102 in connection with the type of call, where the call originates from and goes to, type of billing, the cost of the call, the time duration of the call, and the like. These various parameters of the completed call are evaluated in accordance with how the fraud system PB102 is customized so that the present invention can produce an improved ability to detect and/or prevent fraudulent activities relating to completed calls. This is all done on a real-time basis, which results in cost savings because fraud detection and/or prevention can be accomplished much sooner than would be the case if it was only done after the completed call was terminated and had been billed.

It should be understood that the completed call fraud scenarios described below are not all required in accordance with the fraud system PB102 of the present invention. In fact, the fraud system PB102 can provide as few as one of these fraud scenarios and still produce significant fraud savings. Moreover, the fraud system PB102 can be customized to a granularity of a particular billing number, originating ANI, or terminating ANI, etc. In this way, enhanced fraud detection and/or prevention can be achieved by the present invention.

The fraud detection and/or prevention scenarios of the present invention for completed calls occur in real time. The point in time during completed call when a particular fraud scenario occurs can be broken down into three categories in accordance with the present invention. The first category of fraud scenarios is those which occur when the call is completed. Fraud scenarios outlined in Sections 7.4.2.1 to 7.4.2.8 fall within this start of call time frame category. The second group of fraud scenarios occurs after the completed call has been in existence for a predetermined amount of time. The fraud scenario in Section 7.4.2.9 falls within this second time frame category. The third time frame category is after the call has been terminated and billing information has been determined for that terminated call. This fraud scenario is set forth in Section 7.4.2.10.

Thus, it can be seen that the present invention provides real time fraud detection and/or prevention capability for completed calls. The present invention no longer requires the telecommunications carrier to wait until after the completed call is over or until after billing information has become available in order for fraud detection and/or prevention to take place. This improves cost savings associated with fraud detection and/or prevention of completed calls.

7.4.2.1 Hot Originating ANI

Referring now to FIG. 185, a block diagram of the steps in accordance with the present invention for determining whether an originating ANI is hot for a completed call is shown. It should be noted that the block diagram set forth in FIG. 185 is equally applicable for the hot terminating ANI fraud scenario discussed below in Section 7.4.2.2.

Referring now to FIGS. 175, FIG. 179, and FIG. 185, a START OF CALL MESSAGE PA182 is provided by the BSRVR BA108A to the fraud system PB102. This indicates that the call has been completed and has started. The start of call information PA182 is supplied to the SBIRFILE PA110 by the BNUSAGE PA104.

The START OF CALL MESSAGE PA182, as indicated by a block PQ102, begins the hot originating ANI scenario. Next, the thresholds in BNUTHRS PA114 are checked, as indicated by a box PQ104, to determine if a hot check of the originating ANI should be made. If no hot check is indicated by the BNUTHRS PA114, then the hot originating ANI fraud scenario is not implemented, as indicated by the DONE block PQ106. Note that for each originating ANI, a hot check can be customized by the fraud system PB102 the present invention. This equally applies to each terminating ANI.

If BNUTHRS PA114 indicates that a hot check is to be performed, as indicated by the YES on a flow line PQ108, the BNU record PO450 (see FIG. 179) for the originating ANI stored in the BNUFILE PA112 is checked (looked up), as indicated by a block PQ110. If no BNU record FRAUD450 is found for the originating ANI, as indicated by a line PQ112, the hot originating ANI fraud scenario is completed, as indicated by block PQ106. As an aside, a new BNU record is created for this originating ANI completed call in accordance with the creation of the BNU record as described elsewhere.

If a BNU record PO450 for the originating ANI is found in BNUFILE PA112, as indicated by a line PQ114, the BNU records PO450 are checked to determine if the hot field is set to "1", which indicates that the originating ANI has been designated as hot by the fraud administrator. If the hot field is set to "0", the originating ANI is designated cold, as indicated by a flow line PQ116. The hot originating ANI fraud scenario moves to block PQ106, and the BNU record PO450 for the originating ANI is updated to reflect the completed call in field PO452.

If the hot field is found to contain a "1", as indicated by a flow line PQ118, an alarm is generated, as shown by a block PQ120, indicating that a hot originating ANI fraud scenario has been detected. Two activities then occur. First, the hot origination ANI alarm PA170 is provided to the fraud administrator by fraud console(s) PB106. In addition, the alarm data is stored in the BNUALARMS PA116 for subsequent use and analysis. Thereafter, the hot originating ANI fraud scenario is completed, as indicated by block PQ122.

In this way, the present invention can detect when a completed call has originated from a hot originating ANI at the beginning of the call after it has been completed but before the call is over. This allows the fraud administrator to monitor the activity of the hot originating ANI. In this way, fraud detection and/or prevention activities can take place by the fraud administrator in connection with completed calls.

7.4.2.2 Hot Terminating ANI

The description set forth above in Section 7.4.2.1 is applicable here. The only major difference between the two is that a hot terminating ANI is checked by this fraud scenario, as opposed to the hot originating ANI that is checked in the fraud scenario set forth in 7.4.2.1.

The BNUTHRS PA114 indicates whether a hot check is to be performed by the terminating ANI. In addition, the BNU record for the terminating ANI is updated to reflect the completed call.

Under this scenario, the fraud administrator can detect at the beginning of a completed call that the call has been made to a hot terminating ANI so that suitable fraud detection and/or prevention can take place before the completed call is completed. In this way, significant savings can occur.

7.4.2.3 High Usage Billing Number

This fraud scenario in accordance with the present invention occurs when 'N' calls are completed for a particular billing number within 'Y' period of time. This potential fraud condition needs to be detected and/or prevented by the present invention so that a number of calls on a particular billing number do not exceed a set amount 'N' without the fraud administrator being made aware of the situation. This high usage can either indicate that the authorized customers are utilizing the billing number in a greater than normal degree, or that fraudulent activity may be occurring and needs to be stopped.

Reference is now made to FIG. 175, FIG. 179, and FIG. 186. FIG. 186 shows a block diagram of the steps that take place in this fraud detection and/or prevention scenario in accordance with the present invention. It should also be noted that FIG. 186 is equally applicable for the steps which occur in the high 800 usage fraud scenario described below in Section 7.4.2.4.

The start up call message PA182 is provided by the BSRVR BA108A via BNUSAGE PA104 to the SBIRFILE PA110, as indicated by block PQ102. The high usage parameters (thresholds) for the particular billing number are obtained from BNUTHRS PA114, as indicated by a block PR102. These usage parameters indicate the number of completed calls 'Z' that can occur within a period of time 'Y'. Any calls equal to or above that specified number 'Z' indicate that the high usage threshold or condition has been met.

The BNU record PO450 for the particular billing number, which is stored in BNUFILE PA112, is then checked. Specifically, the last 'N' calls found in field PO452 are checked to determine the number 'A' that have occurred within the time period 'Y'. This checking of field PO452 of BNU record PO450 for the particular billing number in order to determine the number 'A' of completed calls is indicated by a block PR104.

If the number 'A' of calls that have occurred within the time period 'Y' is less than the threshold value 'Z' provided by step PR102 for the particular billing number, then this fraud scenario determines that the high usage condition has not occurred, as indicated by the NO flow line PR108. The fraud scenario then updates the BNU record file PO450 to indicate this completed call. This is indicated by DONE block PR110.

Alternately, if the number of calls 'A' in time period 'Y' is equal to or greater than the threshold value 'Z' a decisional block PR106 indicates that the threshold has been equalled or exceeded, as indicated by the YES flow line PR112.

Thereafter, the particular billing number is examined to determine if it is an NPA 800 number. This is indicated by a decision block PR114. If decision block PR114 determines that the billing number is not an NPA 800 number, a high usage billing number alarm is generated, as indicated by a block PR116. Two activities then occur. The first activity is that the HIGH USAGE BILLING NUMBER ALARM PA170 is provided to the fraud administrator on the fraud console(s) PB106. In this way, the fraud administrator knows that the high usage billing number condition has occurred at the beginning of the completed call (and not after the call is terminated). This allows the billing administrator to take appropriate action. In addition, a high usage billing number alarm data is stored in the BNUALARMS PA116 for later use and analysis. This fraud scenario then proceeds to the DONE block PR118, which indicates that the scenario has been completed.

Thus, it can be seen that in this scenario a high usage billing number condition can be detected at the beginning of the call, and not after the call is terminated or after billing information is provided. In this way, the fraud administrator can take appropriate action to detect and/or prevent fraud.

7.4.2.4 800 Calls With High Usage

The fraud scenario in accordance with the present invention that determines if 800 usage parameters are exceeded is similar to that described above in Section 7.4.2.3 and discussed in connection with FIGS. 175, FIG. 179 and FIG. 186. Only the differences between these two fraud scenarios are discussed.

As shown in the block labeled PR102, the high 800 usage parameters 'Z' are obtained from the BNUTHRS PA114.

Similarly, if the number of 800 usage completed calls 'A' is equal to or exceeds the threshold 'Z', as indicated by decision block PR106, then the decision block PR114 determines if the billing number is a NPA800. If this NPA800 condition is determined by decisional block PR114, as indicated by YES flow line PR120, a high 800 number usage alarm is generated, as indicated by a block PR122. Two activities then take place. One is the high 800 number usage alarm PA170 is provided to the fraud administrator on the fraud console(s) PB106. This allows the fraud administrator to take appropriate action to detect and/or prevent the fraud before the completed 800 call is over. The other activity is that the high 800 number usage alarm data is stored in the BNUALARMS PA116. This allows this data to be subsequently used and analyzed by the fraud administrator.

Thereafter, the high 800 usage fraud scenario is completed, as indicated by the DONE box PR118.

7.4.2.5 Simultaneous Calls on a Billing Number

This fraud scenario in accordance with the present invention detects and/or prevents the condition where there are two or more active calls on a particular billing number. This fraud scenario typically occurs when a billing number (with its associated access PIN) is obtained by an unauthorized user and then used simultaneously by two or more unauthorized users to make overlapping (in time) unauthorized calls. The stolen billing number is often sold to many unauthorized users who typically use it as extensively as possible within a short time period so that the fraud, once it is detected, is difficult, if not impossible, to criminally prosecute. This simultaneous calls on a billing number fraud scenario in accordance with the present invention detects and/or prevents this from taking place.

Referring now to FIG. 187, a block diagram of the steps of this fraud scenario in accordance with the present invention are shown. References are also made to FIG. 179 and to FIG. 175.

Referring now to FIG. 187, the start of call message PA182, as indicated by block PQ102, is received from BSRVR BA108 by fraud system PB102. The start of call message PA182 is used to retrieve the BNU record PO450 for the billing number. Referring to FIG. 179, the BNU record PO450 includes a field called 'current uses', which is labeled PO454. This 'current uses' field PO454 indicates whether there is a completed call in progress, which means that there is a call using the billing number which has been completed but is not yet terminated. Any type of indicator can be used to show the state where there is a completed call in progress. For example, a 'zero' can show that there is no call in progress, and a '1' can show that there is a call in progress. This 'current uses' PO454 information is obtained from the BNU record PO450 found in BNU file PA112. This is indicated by a step PR202.

A decision step PR204 determines if the value of the 'current uses' from field PO454 is equal to or exceeds a value threshold obtained from BNUTHRS PA114. The value threshold specifies how many completed calls on a single billing number can be in progress at one time. It should be noted that the present invention can be configured so that the detected simultaneous calls on a single billing number condition can occur with one or more calls in progress. In other words, the present invention is not limited to detection of the situation where only one call is in progress. Two or more calls can be specified in the threshold as being required to be in progress for this fraud scenario to be detected.

If decision block PR204 determines that the threshold has not been equaled or exceeded, it proceeds along a NO flow line PR206 to DONE block PQ106. This indicates that the fraud scenario of simultaneous calls on a single billing number has not been detected.

In contrast, if decision block PR206 determines that the 'current uses' value (that is, the number of simultaneous calls) is equal to or exceeds the threshold value, it proceeds along a YES flow line PR208. A simultaneous calls on a single billing number alarm is then generated, as indicated by a block PR210. Two activities then take place. First, the simultaneous calls on a billing number fraud scenario alarm PA170 is presented to the fraud administrator on the fraud console(s) PB106. In addition, the simultaneous calls on a billing number alarm data is stored in the BNUALARMS PA116 file for later use and analysis. Thereafter, the flow proceeds to a DONE box PQ106.

In this way, this fraud scenario can detect and/or prevent a fraud scenario where there are simultaneous calls on a single billing number. This allows the fraud administrator to take necessary action against a typical fraud situation where a billing number is obtained by unauthorized users and is used illegally to make simultaneous calls.

7.4.2.6 Anomalous Calls on a Billing Number

This scenario involves a specified number of completed calls 'A' within a time period 'Y' having different originating NPA, or NPA/NXX and/or ANI. In other words, there are a series of completed calls that have occurred on a particular billing number within a specified time period which are from different originating locations that exceed thresholds set for originating locations. This fraud condition occurs typically where a billing number has been obtained by an unauthorized user and has been distributed geographically so that different unauthorized users in different locations use the billing number within a specified time period. The unauthorized users attempt not to make simultaneous calls so as to elude detection of that fraud scenario. Instead, the strategy is to utilize the billing number from different geographical locations in a sequential mode so as to avoid fraud detection and/or prevention. This fraud scenario in accordance with the present invention detects and/or prevents this fraud from taking place.

Referring now to FIG. 188, FIG. 175, and FIG. 179, this fraud scenario of anomalous calls on a billing number is described. FIG. 188 is a block diagram showing the representative steps of this fraud scenario. A start of call message PA182 is received from BSRVR BA108A. The fraud system PB102 stores the start up call message PA182 in SBIRFILE PA110. The anomalous call parameters for the billing number of the call are obtained from the BNU record FRAUD450 for that billing number in BNUFILE PA112. This is indicated by a box PO450. These parameters are obtained by looking at the originating numbers of the last 'N' calls found in field PO450 of BNU record PO450 for the billing number.

Any threshold for that billing number in connection with an originating call NPA, or NPA/NXX, and/or an ANI stored in the BNUTHRS PA114 is then obtained. A decision block determines if there are any thresholds for these originating call parameters, as indicated by decision block PR304. If BNUTHRS PA114 does not have any such parameters or thresholds for that billing number in connection with the originating number, this fraud detection scenario is completed, as indicated by DONE block PQ106.

Alternately, if decision block PR304 determines that there is a threshold for one or more of the originating number parameters, then the fraud scenario proceeds to a decision block PR306. Decision block PR306 determines whether the anomalous originating call parameters equal or exceed the thresholds from BNUTHRS PA114. If the current usage, as indicated by the parameters, does not equal or exceed the thresholds, then the fraud scenario has not been detected. This fraud scenario then proceeds to DONE block PQ106.

Alternatively, if decision block PR306 determines that the current usage parameters are equal to or have exceeded the thresholds, then the anomalous calls on a billing number scenario has been detected, as indicated by a YES flow line PR308. This anomalous calls on a billing number alarm is then generated, as indicated by a block PR310. Two activities then take place. First, the anomalous calls on a billing number alarm PA170 is presented to the fraud administrator at the fraud console(s) PB106. In addition, the anomalous calls on a billing number alarm data is stored in BNUALARMS PA116 for later use.

In this way, this fraud scenario can detect and/or prevent the condition where there are anomalous calls on a billing number within a specified period of time which exceed thresholds based on the originating numbers.

7.4.2.7 International Incoming or Outgoing Calls

This fraud scenario in accordance with the present invention detects all completed calls which are coming from an international originating number or are going to an international terminating number. 'International' as used here means that the call is outside of a specific geographical area that is defined as domestic to U.S.A. All calls outside of this geographical area are denominated as international. Typically, 'international' designation involves political boundaries, continental boundaries, or land boundaries.

This scenario in accordance with the present invention detects and/or prevents fraud that typically results in significant financial losses. These high losses are due to the fact that international calls are expensive. This fraud scenario detects the occurrence of an international call immediately after it has been completed, but before it is terminated. In this way, the fraud administrator can take whatever appropriate action is necessary.

It should be noted that the fraud scenario set forth in FIG. 189 is carried out to determine if an incoming call is from an international location. The fraud scenario is also separately carried out to determine whether an outgoing call is to an international location. Thus, all completed calls typically are reviewed by this fraud scenario in accordance with the present invention.

Reference is made to FIG. 189, FIG. 175, and FIG. 179. FIG. 189 is a block diagram showing the steps of this fraud scenario in accordance with the present invention. Referring now to the figures, a start of call message PA182 is provided BSRVR BA108A. The international parameters of the call are obtained, as indicated by a block PR405, from the entire originating number (including country code). A decision block PR404 determines whether an international flag has been set. This flag is stored in the BNUTHRS PA114. It allows the fraud system PB102 of the present invention to be configured to detect international calls.

If an international flag is not set, than fraud system PB102 has not been configured to detect international calls. This is indicated by the NO flow line PR406. The international incoming call fraud scenario then proceeds to DONE block PQ106.

Alternately, if decision block PR404 detects that an international flag has been set, it proceeds to YES flow line PR408. The jurisdiction of the incoming call is then checked, as indicated by a block PR410. The jurisdiction comes in the start of call message PA182. Next, a decision block PR412 determines if the call based on its jurisdiction is international. If the call is determined not to be international (also denominated domestic), then the fraud scenario proceeds along a NO flow line PR414 to DONE box PQ106. This indicates that the call has been determined not to be international, and thus the fraud scenario has not occurred.

Alternatively, if decision block PR414 determines that the call is international, the fraud scenario proceeds to a YES flow line PR416. This indicates that an international call has been detected. The international incoming alarm is then generated, as indicated by a block PR418. Two activities take place. First, the international incoming fraud alarm PA170 is provided to the fraud administrator at the fraud console(s) PB106. In addition, the international fraud alarm is stored in the BNUALARMS PA116 for later review and analysis.

The fraud scenario for outgoing international calls is the same with the exception that it is performed on the outgoing call.

In this way, the international incoming or outgoing call scenario of the present invention can provide information to the fraud administrator at the beginning of the call as to whether the call is coming from an international location or going to an international location. This information provides the fraud administrator with the ability to take appropriate action before the completed call is terminated. In this way, significant fraud savings can result.

7.4.2.8 Reoriginations

This scenario in accordance with the present invention is directed to fraud which occurs when an unauthorized user has gained access into the telephone system using an unauthorized billing number and is able to make repeated telephone calls without having to get out of the system. For authorized user convenience, telephone systems typically include a feature which allows for more than one call to be made once all of the billing information has been provided if the authorized user issues proper commands so as to originate the additional calls. This capability spares the authorized user from having to repeat the necessary billing information for each call. Instead, the billing information is provided by the authorized user at the beginning of the sequence of calls, and does not have to be repeated until the authorized user gets out of the system. Hackers and other unauthorized users prefer this mode of unauthorized use of the phone system because they only have to provide the billing information once and because, in many traditional systems, the information is only verified the first time. This fraud scenario in accordance with the present invention allows for detection and/or prevention of this fraud scenario by an unauthorized user.

Reference is now made to FIG. 190, FIG. 175, and FIG. 179. FIG. 190 is a block diagram showing the steps of this fraud scenario. Referring now to the figures, the start of call message PA182 is received from BSRVR BA108A by fraud system PB102. Thereafter, the reorigination parameters are obtained from the BNU record PO450 for the billing number in question, as indicated by a block PR502. The last 'N' calls contained in field PO452 are examined to determine these reorigination parameters of the calls.

A decision block PR504 determines whether reorigination thresholds are set. This threshold information is contained in BNUTHRS PA114. Typically, these thresholds are set for a certain number of calls which occur sequentially, without the caller having to hang up, re-dial the destination number and re-enter the billing number. A representative threshold is five calls. Thus, in accordance with this threshold value, every time five calls occur on a single origination, a fraud scenario is detected by the present invention. If no reorigination threshold is determined by decision blocks PR504, the fraud scenario proceeds to a NO flow line PR506. Thereafter, the fraud scenario is completed, as indicated by DONE box PQ106.

If reorigination thresholds have been set, this is indicated by a YES flow line PR508. Thereafter, a decision block PR510 determines whether the reorigination parameters (count) of block PR502 are equal to or greater than the thresholds of PR504 obtained from BNUTHRS PA114. If the reorigination count is not equal to or is less than the thresholds, this is indicated by a NO flow line PR512. The reorigination fraud scenario has not been detected, and the flow proceeds to DONE block PQ106.

Alternately, if decision block PR510 determines that the origination count is equal to or greater than the thresholds, this flow is indicated by a YES flow line PR514. Thereafter, the reorigination fraud scenario alarm is generated, as indicated by a block PR516. Two activities take place. The reorigination alarm PA170 is provided to the fraud administrator on the fraud console(s) PB106. In addition, the reorigination alarm data is stored in the BNUALARMS PA116 for later use and analysis. The flow then proceeds to DONE box PQ106.

In this way, a reorigination alarm is provided to the fraud administrator each time the number of reoriginations exceeds a value threshold. If the threshold is exceeded more than once, the reorigination alarm is sounded each time it is exceeded. In this way, the fraud administrator can take the necessary action to determine whether a series of calls based on a single billing number access to the system are authorized or unauthorized. This results in reducing fraud losses significantly.

7.4.2.9 Long Duration Calls

This fraud scenario is directed at determining when a completed call exceeds a predetermined length of time. This condition can be detected in accordance with the present invention either during the completed call or after the completed call is terminated. In some situations involving a long call, the condition can occur one or more times during the call and again after the call is finished. This fraud scenario is detected after the start of the call and the expiration of a predetermined amount of time 'Y' measured from the start of the call. Reference now is made to FIGS. 175, FIG. 191, and FIG. 179. FIG. 191 is a block diagram of the steps of the long duration call fraud scenario in accordance with the present invention.

The purpose of this fraud scenario in accordance with the present invention is to detect when a completed call lasts longer then a predefined length of time. If this long duration call is fraudulent, it will cost the carrier a significant amount of money. Consequently, this fraud scenario is performed to allow the fraud administrator to take appropriate action if she determines that fraud is taking place. It also allows the fraud administrator to take action against subsequent attempts.

The intermediate-long call message PA180 is provided throughout the completed call until the call is terminated. The intermediate-long call PA180 is provided to the fraud system PB102, as indicated by a block PS102. Note that this intermediate-long call message may be provided on successive occasions during a completed call that is of a long time duration. This fraud scenario will be repeated each time this intermediate-long call message is received. In addition, as discussed below, the long duration fraud scenario will be performed after the completed call is terminated upon receipt of the end of call message PA178.

The parameters for the intermediate-long duration call are obtained, as indicated by the block PS104. These parameters are obtained from BNUTHRS PA114. Next, a decision block PS106 determines whether there is a threshold in the BNUALARMS PA116 for intermediate-long duration calls. A typical value is 30 minutes. If decision block PS106 determines that no such threshold is set, the fraud scenario is completed and proceeds to the NO flow line labeled PS108. The fraud scenario then proceeds to DONE box PQ106.

Alternately, if the decision block PS106 determines that a threshold is set, as indicated by the YES flow line PS110, the fraud scenario proceeds to a decision block PS112. Decision block PS112 determines if the parameters (that is, time lapse) of the intermediate-long duration call from block PS104 are equal to or greater than the thresholds from decision block PS106. If the parameters are less than the thresholds, the intermediate-long duration calls fraud scenario has not been detected. This is indicated by the NO flow line labeled PS114. The intermediate-long duration call fraud scenario is completed and proceeds to DONE block PQ106.

Alternately, if decision block PS112 determines that the parameters of the intermediate-long duration call are equal to or greater than the thresholds, the scenario proceeds to the YES flow line PS116. The alarm indicating this intermediate-long duration call is then generated, as indicated by a block PS118. Two activities then take place. The intermediate-long duration call alarm PA170 is provided to the fraud administrator at the fraud console(s) PB106. This allows the fraud administrator to determine in real time that this on-going call has exceeded the time limit set for the detection of this fraud scenario and to take appropriate action concerning possible fraud. In addition, the intermediate-long duration call alarm data is provided to the BNUALARMS PA116 for storage and later analysis. Thereafter, the fraud scenario is completed, as indicated by DONE block PQ106.

As stated above, this intermediate-long duration call alarm fraud scenario is detected at each point in time during a completed call when the call exceeds the value threshold. Thus, for example, if the value threshold is 10-minutes, and the call has been in existence (completed) for more than 20-minutes, two intermediate-long duration call alarms will have occurred, one at the 10 minute mark of the call, and a second at the 20 minute mark of the call. In addition, as discussed below, there will also be a third intermediate-long duration call alarm at the end of the completed call if the time threshold for that parameter has also been exceeded by the call.

The fraud scenario for intermediate-long duration calls is also performed at the termination of the completed call. All of the steps set forth in FIG. 191 are performed at the end of the call after receipt of the END OF CALL MESSAGE PA176 by the fraud system PB102. Since the steps are essentially the same as those for monitoring the duration of the call that is in progress, no additional discussion is provided except that it should be understood that the time threshold(s) for the end of the call can be different from the time threshold(s) for the call that is in progress.

In this way, this fraud scenario allows the fraud administrator to determine in real time if an intermediate-long duration call is occurring. This allows her to take appropriate action in terms of fraud detection and/or prevention.

7.4.2.10 Call Cost (Wholesale and Retail)

The call cost (wholesale and retail) fraud scenario of the present invention allows the fraud administrator to determine if the cost of a call that has been completed and has terminated exceeds a monetary threshold. The amount of both wholesale and retail costs can be monitored in real time, and different thresholds can be set for each. In this way, the present invention allows for fraud detection and/or prevention of completed calls exceeding certain monetary amounts.

Typically, fraudulent calls are of long duration and of high monetary cost. Such calls provide great economic benefit to the hacker. The hacker knows that numerous calls attract the attention of a carrier's Security Department and will result in the card being deactivated. But a call in process doesn't usually get reported until the call is over in traditional systems. For this reason, this fraud scenario of the present invention allows the fraud administrator to monitor on a real-time basis the cost of a completed call that exceeds a monetary threshold so that appropriate action can be taken to protect the telecommunications system.

Typically, this fraud scenario is used for international calls which are of high cost per minute of calling time. However, this fraud scenario can also be used for local (domestic) calls where the calls are less costly.

Reference is now made to FIG. 175, FIG. 179, and FIG. 192. FIG. 192 is a block diagram of the steps of this call cost fraud scenario.

This fraud scenario cannot be performed until after the completed call terminates. At that time, rated call data PA172 is provided by rating system LA102 to fraud system PB102. This step is indicated by a block PS202. The parameters of the rated call data are then obtained, from BNUTHRS PA114 as indicated by a block PS204. The parameters of the call cost data can include wholesale cost, retail cost, or both. It should be understood that the present invention can monitor one or both of these costs for each call that is completed and is terminated.

A decision block PS206 determines if there are thresholds set for retail cost and for wholesale cost of the call. These retail cost and wholesale cost thresholds are found in BNUTHRS PA114. If no thresholds are found, the fraud scenario has been completed, as indicated by a NO flow line PS208. The fraud scenario then moves to the DONE block PQ106.

Alternately, if a retail cost threshold and/or a wholesale cost threshold is found, the fraud scenario proceeds to a YES flow line PS210. Next, a decision block PS212 determines if the cost parameters (at wholesale and retail) of the completed call that is terminated are greater than the corresponding wholesale or retail thresholds. If none of the thresholds that are in BNUTHRS PA114 have been exceeded (wholesale and/or retail), the fraud condition has not been detected. The fraud scenario then moves to a NO flow line PS214. The fraud scenario then moves to DONE block PQ106.

If decision block PS212 determines that either or both of the retail and wholesale thresholds have been exceeded, the fraud scenario has been detected, and the flow proceeds to a YES flow line PS216. The corresponding alarm, which can be either a wholesale cost alarm or a retail cost alarm or both, are then generated. This is indicated by a block PS218. Two activities then occur. The wholesale cost alarm PA170 or the retail cost alarm PA170 or both, depending on which has been generated, is provided to the fraud administrator at fraud console(s) PB106. This alarm(s) PA170 allows the fraud administrator to take appropriate action concerning future calls. This is especially important for international calls, since this allows her to take appropriate action to prevent additional international calls which are unauthorized. While not all international calls are fraudulent, most long duration high cost calls are fraudulent. Legitimate users tend to keep long-distance calls relatively short in length. In addition, the wholesale fraud alarm and the retail fraud alarm or both (depending on which has been generated) are provided to the BNUALARMS PA116 for storage and subsequent analysis.

It should be understood that the fraud system PB102 can be customized to monitor the wholesale and retail cost of all calls on a real-time basis after the completed calls are terminated. Alternatively, only particular or specified calls can be monitored. In this way, the fraud administrator can detect and/or prevent fraudulent activities by unauthorized users based on the cost of the calls, which results in significant cost savings.

7.4.3 Simultaneous Uses of a Billing Number

This fraud scenario detects and/or prevents simultaneous uses of a billing number. It prevents over charging of calls to a billing number. Fraud system PB102 uses messages from BSRVR BA108A and messages to and from validation system AG102 to provide this fraud scenario.

Reference is made to FIGS. 175, 193, and 195. FIG. 193 is a block diagram showing the flow between fraud system PB102, validation system AG102, and BSRVR BA108A. FIG. 194 is a block diagram of the steps in the fraud scenario involving the validation system AG102. FIG. 195 is a block diagram of the steps in the fraud scenario involving BSRVR BA108A.

In order to prevent simultaneous uses of a billing number, the CHNDFILE module PA118 was developed. There are certain business situations where it is important to ensure that there is only one use of a billing number at a time. An example is the Debit Card product, which is a card having a monetary amount that can be decremented to zero as the card is used to pay for calls. Because the debit card is monitored for when it has expired (that is, decremented to zero remaining monetary balance), only one use of the billing number of the debit card can occur at a time. This capability is needed because BSRVR BA108A tracks an active Debit Card call and cuts it off after the Debit Card has expired.

The current number of uses of a billing number is kept in a record (field) in the BNU PO450 record for the billing number. BNU PO450 file record is stored in BNUFILE module PA112. This number of uses of a billing number is incremented from a message PC104 coming from validation system AG102, and decremented from a message PZ102 coming from BSRVR BA108A. BSRVR BA108A does not have the billing number of the call to look it up in BNUFILE PA112, but it does have a unique callhandle BA305 for the call. Therefore, CHANDFILE PA118 was supplies the connection between callhandle BA305 and the billing number of the current call.

Referring now to FIG. 194, validator system AG102 sends an increment bill number uses message PC104 to fraud system PB102, as indicated by a block PZ104. When the increment bill number uses message PC104 is received, the billing number is searched for in BNUFILE PA112, as indicated by a block PZ106. As indicated by a decision block PZ108, if the BNU record is not found, as indicated by a NO flow line PZ110, a new BNU record is created based on the billing number, as indicated by a block PZ112. The fraud scenario proceeds via a YES flow line PZ114 to a step PZ116. The current number of uses is then incremented in this new or searched BNU record as indicated by a block PZ116.

At this time, a callhandle record PZ124 is created and stored in CHANDFILE PA118, as indicated by a block PZ118. The information stored in callhandle record PZ124 includes the callhandle BA305 and billing number of the current call. This callhandle record PZ124 is needed later when BSRVR BA108A sends a decrement number of bill number uses message PZ102 to decrement the number of uses.

Once step PZ116 is completed, a message PZ129 containing the new number of simultaneous uses is sent to the validator system AG102, as indicated by a block PZ120.

Referring now to FIG. 195, when a decrement number of bill number uses messages PZ102 from BSRVR BA108A is received, as indicated by \a block PZ130, the callhandle BA305 in the request message is used to search CHANDFILE PA118 to retrieve the billing number of the call just completed, as indicated by a block PZ132A. As shown by a decision block PZ136, if the billing number is not found, the fraud scenario is completed, as indicated by a DONE block PZ137. If, however, the record containing the billing number is found, as indicated by a YES flow line PZ138, it is used to look up a BNU record in BNUFILE PA112 using the billing number located in the CHANDFILE PA118 record, as indicated by a block PZ140.

As indicated by a decision block PZ142, if a BNU record is found in the BNUFILE PA112, the current number of simultaneous uses is decremented if it is greater then 1, as indicated by a block PZ148. If it is not found, as indicated by a NO flow line PZ144, the flow proceeds to step PZ150.

Since there now is no current or future use for the record found in the CHANDFILE PA118, it is deleted, as indicated by block PZ150. Step PZ150 completes the steps in the flow of the received message, as indicated by DONE block PZ150.

In this fraud scenario, the ability to accurately monitor the current number of uses of a billing number enables the validation system AG107 to block more then one simultaneous use of a billing number. In the present embodiment, Debit Cards are an example of a situation where use must be restricted only one current use of a billing number. This fraud scenario, however, does not need to be limited to Debit Cards, and encompasses any application involving simultaneous use of a billing number.

7.5 Graphical User Interface For Fraud Console

A representative graphical user interface (GUI) for a fraud console PB106 is shown in FIG. 203 and described below. This is a representative GUI, and the present invention contemplates any suitable display of information now present or later developed that assists the fraud administrator in detection and/or prevention of fraud. The example embodiment shown below illustrates the types of information that can be provided to the fraud administrator, and the kinds of interactions that the fraud administrator can use with the fraud system PB102 in connection with fraud detection and/or prevention.

The main screen shown in FIG. 203 is divided into an upper portion for the billed number usage (labeled ALARM TYPE and extending down to BNU ALARMS, and a lower portion for the failed bill number alarms (labeled ALARM TYPE and extending down to FNB HOT ORIG). The top portion of the screen labeled "Fraud Monitor" gives the maintenance information about the system. The current day and time are displayed, as well as how long the system has been running without interruption. If, for some reason, the system has been disabled, the BNU ALARM STATUS will show that condition. If this should occur for more than a few seconds, an alarm will sound in the Network Operations Center on the Log Box. This is a precaution to ensure that the system is operating at peak efficiency and to ensure that no alarms are missed, causing unnecessary losses to go undetected.

The system is designed to be extremely user-friendly as well as time-saving. To view an alarm, the fraud administrator simply highlights the record via a cursor and presses ENTER. A ALARM DETAIL INFO screen, as shown in FIG. 201, will "pop up" into the main screen. This preliminary screen gives very basic information about the type of alarm being viewed. When more than one call triggers an alarm, each call will be listed by BIR ID in this screen. For further detail, pressing ENTER will bring up another "pop up" window titled Fraud Short BIR INFO, as shown in FIG. 202, which contains the actual call detail record of the call.

7.5.1 Thresholds

Thresholds may be viewed or established for individual customers or for global situations. To view the current thresholds, the [BNU THRS] field of FIG. 203 is selected. This provides access to ALARM THRESHOLDS DETAIL INFO screen of FIG. 196. Each set of parameters is available for viewing or updating. The Default Global parameters are for cards and for operator services. The individual Threshold Key field allows for customized thresholds for specific accounts. The screen will indicate what parameters are set, and the tone and duration of the alarms.

Parameters with brackets ([]) indicate a yes or no threshold condition. To activate, the ENTER key is pressed after highlighting the bracket with the cursor. A ✓ will appear in the bracket. To deactivate, the ENTER key is depressed again, and the ✓ will disappear. This alerts the BNU file to check certain fields to see if a parameter has been set.

The Tones and Duration setting is set to establish what pitch the alarm will sound and how long it will beep. Most parameters are set with a duration of 100 ms, but may be set for as long as 300 ms. The tone settings may be set from 500 hz to 3000 hz. This allows for complete flexibility in customizing alarms on a customer-by-customer basis. It also allows the administrator to set pitches according to her own hearing capabilities; many people do not hear certain decibel levels or tones due to hearing loss or interference.

Parameters must be established for both the BNU as shown in FIG. 196, and the FBN, FIG. 196A. This is true of the Hot Originating and Hot Terminating ANI alarms since these alarms exist for both completed calls and failed calls. Once the parameters are set, it is necessary to enter the billing numbers and originating or terminating ANI's that are to be specifically monitored. The system will globally monitor all billing numbers, however, customers will often request specialized parameters. These special numbers are the ones that must be keyed individually.

The [BILLNUMS] screen, as shown in FIG. 197 is used to enter these customized numbers. It also allows the fraud administrator to search the system to see if a particular type of call has been made or to see if a particular billing number has been used to make a call. The arrow keys on the keyboard are used to select a billing method for which to set a parameter. The available fields, for example, are:

| | | |
|---|---|---|
| 800 NUMBER | 800 PIN | AMER EXPRESS |
| ANI | CALLED NUM | CAN LEC CARD |
| DEBIT CARD | DINERS CLUB | DISCOVER |
| LEC CARD | MASTER CARD | NOT USED |
| PCC | THIRD PARTY | UNKNOWN |
| VERIF REFUSED | VISA | |

Once a billing method is chosen, the Billing Number field of FIG. 197 is used to key in the number to be entered into the Threshold screen FIG. 196. The system is configured to make sure the number is not already entered to avoid duplication of records. If a duplication exists, a pop-up screen will appear and show the current records for that billing number. If the billing number does not appear in the system, it allows the number to be inserted into the system. A "Success" window will open to indicate a completed entry. To remove a billing number from the system, the fraud administrator simply follows the same procedures and uses the a specific function key to delete the record.

7.5.2 Search

From the main screen, FIG. 203, the system provides the ability to look at the toll history of any billing number or ANI in two ways. One way is by using the [BIRS] field; the other the [BILLNUMS] field. When using the BIR, as shown in FIG. 198, the system will bring up all BIRS, from the time requested, or it will start at the BIR specified and show everything following. By pressing the ENTER key, a FRAUD SHORT BIR INFO screen, as shown in FIG. 200, will open and show the call record specified.

In order to determine if the system has call detail for a specific billed number or any of the above listed criteria, the BILLNUMS screen, FIG. 197 is used. The fraud administrator may select from the appropriate criteria which field she wishes to search, enter the billing number needed, and by pressing a specific function key, see all of the call detail stored in the database which matches the search criteria. This method is faster than that used in traditional systems, which involves running a search on a switch database. In contrast, the present invention causes less strain on the call processing speed of the switch, which is always impacted when a request for call detail is made.

7.5.3 Failed Billed Number Screens

The FBN screens are used exactly the same as are the BNU screens of FIG. 197 and 198. Consequently, the only difference between these is discussed. The FBN screen only shows calls that failed for some reason. The call failure may have occurred because the billing number was invalid, the validation service was not returning the correct information, or some other reason as discussed elsewhere.

7.5.4 To View An Alarm

To view an alarm, the fraud administrator moves the cursor to highlight the record and presses ENTER. An ALARM DETAIL INFO screen will "pop up" into the main screen. A representative of this is shown in FIG. 201.

When more than one call triggers an alarm, each call will be listed by BIR ID on the screen of FIG. 201. The fraud administrator highlights the call she wishes to view, and presses ENTER to further examine the call record for this alarm. Referring again to FIG. 200, a "pop up" screen will display the BIR INFO for the call.

7.5.5 Exiting The System

To exit any of the pop-up screens, the fraud administrator presses [ESC]ape back to the main screen. To exit the entire system, she highlights the EXIT field and presses ENTER.

7.6 Reports

The Real Time System reports on calls as soon as they break the preset thresholds, but the Batch Reporting System provides an excellent back-up and catch-all for the Fraud Department. These reports are printed for specified time frames, or can be demand-selected at a moments notice. This provides great flexibility for the fraud administrator, who, while looking at something on the Fraud Monitor, may then query the database for further documentation. Documentation is necessary for evidentiary response in investigating fraud incidents. What follows is a general description of the reports generated by the fraud system.

7.6.1 Excessive Usage

This report is sorted in a number of different ways which assists in identifying unusual calling patterns. The fraud system allows this report to be queried or batch-reported at specified time frames. The detail shows:

| | |
|---|---|
| Date | Billing Method |
| Time | Access Number |
| Duration | BIR ID |
| OrigNumber | # Reoriginated |
| DialedNumber | Terminating Status |
| Billed To Number | Terminating Call Method |

The reports can be sorted by Originating ANI, Terminating Number, or Billed To Number. Many times different Originating ANI's will show numerous calls to the same terminating number, but the billing number will be different each time. If the report only looked at the billing number sort, it is possible that a fraud administrator would miss the usage. But by having the multiple sorts, the chances of missing an important fraud incident will be reduced.

7.6.2 Excessive Duration

This report keys off the long duration portion of the system and reports any call over one hour in duration. The fields are the same as above, and the sort is by longest duration to shortest. Again, this is simply a back-up to the real-time system. If only one or two long calls occurred during a given day, but were spaced far enough apart, the fraud administrator might miss the fact that a billing number made several long duration calls. This report will show that occurrence as the calls will be grouped together on the page.

8.0 Gateways

Call processing system AB102 uses a host gateway BA110 and a customer gateway BA112 to facilitate communications between the processes that make up NCP AB104 and subscribers AA114. As mentioned in the Network Control Processor Section of this document, host gateway BA110 and customer gateway BA112A perform communications format and/or protocol conversions so that NCP AB102 can communicate with subscribers AA114 and matrix switch AB106.

The types of communications formats and protocols used by subscribers AA114, NCP AB104, and matrix switch AB106 dictates whether customer gateway BA112A and host gateway BA110 are needed, and if so, what communications conversions must be performed.

In one embodiment, call data AA144 and other communications with customer switch AA104 and matrix switch AB106 is in the form of SS7 messages, such as Initial Address Messages (IAMs), Address Complete Messages (ACMs), Answer Messages (ANMs), et cetera. In this embodiment, customer gateway BA112 performs conversions necessary so that call data in the form of an SS7 message can be communicated across LAN AB122. Additionally, alternative embodiments are contemplated wherein SS7 and other message types can be interfaced to a NCP AB104 having a communications format other than LAN AB122.

The operation of customer gateways BA112 and host gateways BA110 is now described in terms of the operation of setting up a call, completing a call, and terminating a call in the embodiment using SS7 message formats. The example described is an operator-assisted call where the call is first routed through an operator console AB108. This example was chosen to illustrate interaction with operator consoles AB108.

FIG. 122 is a block diagram illustrating the data flow during call setup in one embodiment. FIG. 123, which comprises FIGS. 124 and 125, is an operational flow diagram illustrating the process followed during call setup in this embodiment. Referring now to FIGS. 122 and 123, when a user AA106 (illustrated in FIG. 3) places a call, customer switch AA104A generates an IAM#1 RA102 message. In a step RA202, IAM#1 RA102 is received at customer gateway BA112A.

In a step RA204, customer gateway BA112A converts IAM#1 RA102 to a CALL SETUP MESSAGE #1 RA104 and forwards CALL SETUP MESSAGE #1 RA104 to CMP BA102. In step RA204, customer gateway BA112A performs communications protocols and format conversions necessary to convert a standard IAM message to a message type that can be handled by CMP BA102. CMP BA102 forwards CALL SETUP MESSAGE #1 RA104 to host gateway BA110. Additionally, CMP BA102 performs other call setup duties as described above in the Network Control Processor Section of this document with reference to FIGS. 14, 12, and 13. The CALL SETUP MESSAGE #1 RA104 also contains the Console that has been allocated for the call.

In a step RA206, host gateway BA110 converts CALL SETUP MESSAGE #1 RA104 to IAM#2 RA106. Host gateway BA110 sends IAM#2 RA106 to matrix switch AB106 and stores the Console Number information in its tables. IAM#2 RA106 directs matrix switch AB106 to route call audio AA142 to a stub RA142. Depending oil the type of switch used, call audio AA144 is parked at stub RA142. This is done in the event the call has to be reoriginated. If the call has to be reoriginated, it will go to stub RA142 and not to a console AB108. This is because if a call needs to be reoriginated, the same console AB108 may not be available to handle that call upon reorigination. In this case, the call is routed to stub RA142 and a new console AB108 assigned. This allows allocation of the console best suited to handle the call.

In response, in a step RA207, matrix switch AB106 sends an IAM#2A RA108 to host gateway BA110. In a step RA208, host gateway BA110 sends an ACM#1 RA110 and an ANM#1 RA112 to matrix switch AB106. ACM#1 RA110 indicates to matrix switch AB106 that IAM#2A RA108 is received, the audio circuit is set up, and the network starts ringing. In this case, because this is an operator assisted call, the call is first routed to an operator console AB108. ANM#1 RA112 is generated by host gateway BA110 because stub RA142 is incapable of generating ANM#1 RA112. In effect, ANM#1 RA112 tells matrix switch AB106 that stub RA142 has "answered" the call.

Matrix switch AB106 then sends an ACM message RA130 and ANM message RA132 to the originating customer switch AA104 via host gateway AA110 and customer gateway AA112.

In a step RA324, host gateway BA110 sends call accept message #1 RA130 and call answer message #1 RA132 to customer gateway BA112A. This occurs in a step RA324.

In a step RA326, customer gateway BA112A sends ACM#3 and ANM#3 RA134 and ANM#3 RA136 to customer switch AA104. This indicates that the call has been answered (by an operator console AB108).

The host gateway then retrieves the console number from its tables, translates it to a ten-digit called number and constructs a FAR message with this information to send to the Matrix Switch. The host gateway sends FACILITY REQUEST MESSAGE#1 RA116 to the Matrix Switch AB106.

FACILITY REQUEST MESSAGE#1 RA116 instructs matrix switch AB106 to transfer call audio AA142 from stub RA142 to the console AB108 identified in FACILITY REQUEST MESSAGE #1 RA116. In this example, FACILITY REQUEST MESSAGE #1 RA116 is an example of switch control data AB122 (see FIG. 3).

Matrix switch AB106 generates a facility accept message RA118. Facility accept message is an acknowledgement by matrix switch AB106 that it has received facility request message #1 RA116. In a step RA214, host gateway BA110 receives facility accept message RA118.

In a step RA316, matrix switch AB106 generates a release stub message RA120. Release stub message RA120 is sent to and received by host gateway BA110. Release stub message RA120 indicates that call audio AB142 is no longer routed to stub RA142.

In a step RA318, matrix switch AB106 generates an IAM #3 RA122 indicating that matrix switch AB106 is requesting to route call audio AA142 to the designated operator console AB108. Host gateway BA110 receives address RA122 and converts it into a call setup message #3 RA124. Host gateway BA110 sends call setup message #3 RA124 to CMP BA102. Call setup message #3 RA124 is in the format recognized by CMP BA102.

In a step RA322, host gateway BA110 sends ACM#2 RA126 and ANM#2 RA128 to matrix switch AB106. These signals indicate that console AB108 has accepted and answered the call. In one embodiment, these signals are triggered by a response RA152 from CMP BA102 indicating that it received call setup message #3 RA124.

At this point, the call is setup in an operator console AB108. The human operator at manual operator console AB132 or the automated VRU AB134 can perform whatever operator operations are necessary to allow the call to go through. This can include validations, call rating, and verifying that a third party is willing to accept call charges.

Once operator console AB108 has verified that the call can be routed to its destination, call completion takes place. Call completion is now described. FIG. 126 is a data flow diagram illustrating the messages sent in completing the call. FIG. 127 is an operational flow diagram illustrating the steps followed in completing the call. Referring now to FIGS. 126 and 127, in a step RB202, operator console AB108 instructs CMP BA102 to complete the call. Before instructing CMP BA102 to complete the call, operator console AB108 has performed whatever validations or verifications are necessary before the call will be allowed.

In a step RB204, CMP BA102 sends a call complete message RB102 to host gateway BA110. In preparing call complete message RB102, CMP BA102 does a database look-up in a termination translation database to obtain a route number.

In a step RB206, host gateway BA110 creates facility request message #2 RB104 and sends facility request message #2 RB104 to matrix switch AB106. Facility request message #2 RB104 instructs matrix switch AB106 to transfer call audio AA142 from the assigned operator console AB108 to the number of terminating user AA106A.

Additionally, matrix switch AB106 sends a FACILITY ACCEPT MESSAGE RB105 and a RELEASE CONSOLE MESSAGE RB107 to host gateway BA110. FACILITY ACCEPT MESSAGE RB105 indicates that FACILITY REQUEST MESSAGE#2 is received and accepted. RELEASE CONSOLE MESSAGE RB107 indicates that the console can be released from the call. These messages are converted and forwarded to CMP BA102. CMP BA102 sends a message to CRD BA106 releasing the console.

Matrix switch AB106 sends IAM#4 RB106 to host gateway BA110. IAM#4 RB106 is the message sent by matrix switch AB106 to route the call to terminating user AA106B.

In response, in a step RB210, host gateway BA110 sends CALL SETUP MESSAGE #4 RB108 to the CMP. The CMP then instructs the Billing Server to add the CIC to its tables, and forwards the Call Setup Message to the Customer Gateway BA112B.

In a step RB212, customer gateway BA112B sends IAM#5 RB110 to customer switch AA104B. Thus, in steps RB210 and RB212, host gateway BA110 and customer gateway BA112B are forwarding the IAM sent from matrix switch AB106 to customer switch AA104B requesting that the call be routed. In response, in a step RB214, customer switch AA104B sends ACM#4 RB112 to customer gateway BA112B. This indicates that customer switch AA104B has accepted the call. Also in step RB214, when terminating user AA106B answers, customer switch AA104B sends an ANM#4 RB113 to customer gateway BA112B. This indicates that terminating user AA106B answered the call.

In a step RB216, customer gateway BA112B sends a CALL ACCEPT MESSAGE #2 RB114 and a CALL ANSWER MESSAGE #2 RB116 to host gateway BA110. CALL ACCEPT MESSAGE #2 RB114 is sent in response to ACM #4 RB112 message. CALL ACCEPT MESSAGE #2 RB114 is intended to indicate to matrix switch AB106 that the call has been accepted by customer switch AA104B. CALL ANSWER MESSAGE #2 RB116 is sent in response to ANM#4, and is intended to indicate to customer switch AA104A and to matrix switch AB106 that terminating user AA106B has answered the call.

So that CALL ACCEPT MESSAGE #2 RB114 reaches matrix switch AB106, host gateway BA110 converts it to ACM#5 RB118 and forwards it to matrix switch AB106. Similarly, host gateway BA110 converts CALL ANSWER MESSAGE #2 RB116 to ANM#5 RB120, and forwards ANM#5 RB120 to matrix switch AB106. Thus, matrix switch AB106 is informed that the call has been accepted by customer switch AA104B, and that terminating user AA106B has answered the call. Now, the call is completed and routed from originating user AA106A to terminating user AA106B. Host gateway sends a start timing message to start retail timing.

The process of releasing, or terminating the call is now described. FIG. 128 is a data flow diagram illustrating the data flow that occurs when a call is terminated. FIG. 129, which comprises FIGS. 130 and 131, is an operational flow diagram illustrating the process by which a call is terminated. Referring now to FIGS. 128 and 129, in a step RC202, when a user AA106 hangs up the phone, or otherwise severs the connection, a release message REL#1 is generated. In this example, terminating user AA106B severs the connection first. In this case, customer switch AA104B sends REL#1 RC102 to customer gateway BA112B.

In response, in a step RC204, customer gateway BA112B sends CALL RELEASE REQUEST MESSAGE #1 RC104 to CMP BA102 and sends out RLC #2 RC112 message to the customer switch AA104B. CMP BA102 forwards CALL RELEASE REQUEST MESSAGE #1 RC104 to host gateway BA110. CMP BA102 also passes messages to other processes within NCP AB104 so that a BIR EE322 can be updated with the time that the call was terminated.

In a step RC206, host gateway BA110 sends REL#2 RC106 to matrix switch AB106. REL#2 RC106 indicates to matrix switch AB106 that one of the users AA106 has hung up, or the connection has otherwise been severed.

Matrix switch AB106 then severs the connection of call audio AA142 so that the call is no longer routed to customer switch AA104B. Matrix switch AB106 sends RLC#1 (release complete) RC108 to host gateway BA110 as a response that it received REL#2 RC106. This occurs in a step RC208.

Matrix switch AB106 now needs to release customer switch AA104A so that the connection between customer switch AA104A and matrix switch AB106 can be terminated. Therefore, in a step RC214, matrix switch AB106 sends REL#3 RC114 to host gateway BA110 for ultimate transmission to customer switch AA104A.

In a step RC216, host gateway BA110 converts REL#3 RC114 to a CALL RELEASE REQUEST MESSAGE #2 RC116. Host gateway BA110 sends CALL RELEASE REQUEST MESSAGE #2 RC116 to customer gateway BA112A. In a preferred embodiment, CALL RELEASE REQUEST MESSAGE #2 RC116 is sent via CMP BA102. Again, this is done so that BIR EE322 for the call can be updated and so that CMP BA102 can delete a circuit identification code (CIC) for the call.

Host gateway BA110 then generates and sends a RELEASE COMPLETE MESSAGE (RLC) #4 REC224 to matrix switch AB106. RLC#4 REC224 indicates that release of the call is completed.

In a step RC318, customer gateway BA112A converts CALL RELEASE REQUEST MESSAGE #2 RC116 to an REL#4 RC118 for transmission to customer switch AA104A. This informs customer switch AA104A that the call has been released.

In response, customer switch AA104A sends an RLC#3 RC120 to customer gateway BA112A. This occurs in a step RC220. RLC#3 RC120 acknowledges that the call audio connection between customer switch AA104A and matrix switch AB106 has been terminated.

9.0 Client Server Interface (CLIF)

Conventional client servers are usually provided with the functionality to manage and maintain the connections with the various clients that interface thereto. Additionally, conventional client servers are often responsible for performing load sharing among the clients. These overhead functions consume valuable server processor time. This time takes away from the time that the server can be used to perform actual server functions such as database look-ups and retrievals.

The inventors have discovered that in many cases clients usually have more time to perform overhead functions than do the servers. This is often because each server is typically responsible for handling numerous clients. Therefore, the inventors have developed a client/server interface (CLIF) that operates differently from conventional client servers. According to the CLIF of the present invention, servers are only responsible for handling client requests and sending responses to clients. All of the management overhead burden is placed on the clients. The clients make all server requests, manage the server connection, perform retries, and other like functions. As a result, the server can handle and respond to client requests more quickly than a conventional server, and can even handle more clients.

The client interface according to the present invention is not limited to interfacing a client application with a server application. The client interface is also used to interface multiple clients. The client interface is now described at a high level. FIG. 132 is a high-level block diagram illustrating the use of the client interface according to the present invention. Referring now to FIG. 132, each component within call processing system AB102 (in other words CMP BA102, MOC AB132, etc.) has one or more applications SA102 to perform the functionality of that component. These applications SA102 can communicate with one another using a client interface (CLIF) SA104. Applications SA102 use CLIF SA104 to manage the transfer of messages between applications SA102. Not all applications SA102 require a CLIF SA104 to perform interface functions. However, certain benefits are provided by CLIF SA104 as is discussed in this section of the patent document.

One advantage of CLIF SA104 provides management of the connection between applications SA102. Consider the example of an operator console AB108 requesting a validation from validation system AG102. In this example, an application SA102 within operator console AB108 uses a CLIF SA104 to perform the message transfer in conjunction with a CLIF SA104 in validation system AG102.

Although there are numerous embodiments of CLIF SA104, one embodiment contemplates CLIF SA104 managing communications over an Ethernet LAN. This embodiment is now described. FIG. 133 is a diagram illustrating layers within a client and a server to handle communications over an Ethernet LAN. Applications SA102 provide the functionality of each particular component with call processing system AB102. As mentioned, SA102 is using CLIF SA104 to manage message traffic between it and other applications SA102. Thus, if an application SA102 has a message in which to send across a LAN SB122, it provides this message to CLIF SA104 to manage the transfer.

CLIF SA104 performs message management functions as discussed in this section of the patent document, and forwards the message to a user datagram protocol (UDP) layer SA202. UPD is commonly known in the communications industry; its use extends an Internet address with additional source/destination port numbers. In other words, a source and destination of data can be identified a concatenation of an Internet address and a port number known as a socket. UDP allows one physical address to be broken down into several logical addresses, thus allowing more specific addressing within a limited number of physical addresses.

UDP SA202 adds a header to the message. The header consists of source/destination ports, a 16-bit length field, and a simple check sum of the data being sent. UDP SA202 then forwards the data to the Ethernet layer, SA204.

It is again stressed that this example illustrates one embodiment using TCP/IP (Transmission Control Protocol/Internet Protocol). It is stressed that client interface SA104 and applications SA102 are not confined to communicating with one another using TCP/IP protocols nor are they confined to communicating via Ethernet. In fact, it is not even required that the communications be via a LAN, although this is preferred.

Ethernet layer SA204 attaches an Ethernet header to the packet and routes the packet over LAN SA112 to the destination Ethernet layer SA204. Ethernet layer SA204 at the destination removes the ethernet header information and provides the data to the UDP of layer SA202 at the destination. Here UDP SA202 removes the UDP header information and provides the message to CLIF SA104 at the destination. Note, where a CLIF SA104 is not used at the destination, this data is provided directly to the receiving application SA102. Also note that in the case of some servers, a simplified CLIF SA104 (referred to as SRVR SA206) is used in place of CLIF SA104. SRVR SA206 does not provide all of the functionality of CLIF SA104. For example, SRVR SA206 does not check to see if a message received is a duplicate message.

FIG. 134 is a diagram illustrating the configuration of a packet in this embodiment sent across LAN SA112. Referring now to FIG. 134, this packet is now described. LAN packet SA302 includes message data SA304. Message data SA304 is the original data provided by sending application SA102.

A CLIF header SA306 is a header provided by CLIF SA104. CLIF header SA306 contains information necessary for CLIF SA104 to perform message and management functionality as described below. This functionality can include automatic re-transmission of messages, checking for duplication of messages, and other message management-related functions. UDP header SA308 is a user datagram protocol header consisting of source/destination ports, a 16-bit length field, and a single check sum of the data in the packet. UDP header SA308 identifies the socket to which the packet should be sent.

IEEE 802.3 header SA310 is the Ethernet header used to route packet SA302 across Ethernet LAN SA112.

The functionality of CLIF SA104 is now described at a high level. FIG. 135 is a data flow diagram illustrating transmission of messages using CLIF SA104. FIG. 136 is a high-level operational flow diagram illustrating the process followed by CLIF SA104 in handling messages. Referring now to FIGS. 135, 136 and 137, application SA102A (FIG. 135) wishes to send a request SB102 to application SA102B. For example, application SA102A may be running in CMP BA102, and may wish to send a GET CALLHANDLE REQUEST BA304 to BSRVR BA108.

To send request SB102, application SA102 utilizes CLIF SA104. In a step SB202, CLIF SA104 sends request SB102 to application SA102B. Application SA102B may or may not have its own CLIF SA104, depending on the level of message management functionality required by application SA102B.

In a step SB204, CLIF SA104 sets a timer SA402 (illustrated in FIG. 137) to indicate the time that request SB102 was sent. Timer SA402 is used to establish a time-out. If a response SB104 is not received by the time the time-out period expires, CLIF SA104 may send another request SB102 to SB102B.

If response SB104 is received before time-out period expires (decision block SB206) CLIF SA104 provides response SB104 to application SA102A. This occurs in the step SB210.

If, on the other hand, a response is not received before the time-out period expires (decision block SB206), CLIF SA104 determines whether it should attempt to send request SB102 again (whether it should retry the request). This occurs in step SB208. If the number of retries is not exhausted, CLIF SA104 sends another request SB102 to application SA102B. This occurs in a step SB214. At this time, CLIF SA104 sets another timer SA402 in step SB204 and waits for the response to be received before the time-out period expires.

If, on the other hand, the number of retries allowed is exhausted in step SB208, CLIF SA104 determines whether there is another application SA102B to which request SB102 can be sent. For example, if a CLIF SA104 in CMP BA102 repeatedly fails to get a response to a GET CALLHANDLE REQUEST BA304 from a BSRVR BA108, that CLIF SA104 can determine whether another BSRVR BA108 can respond to the GET CALLHANDLE REQUEST BA304.

If no other application SA102B is available, in a step SB216 CLIF SA104 notifies application SA102A, that an error has occurred.

If, on the other hand, another application SA102B is available, CLIF SA104 begins the process again at step SB202 by sending request SB102 to the other application SA102B.

The described features of utilizing timer SA402 to determine a time-out, establishing a number of retries indicating the number of times that request SB102 can be resent, and finding an alternative server (application SA102B) are optional features of CLIF SA104.

One embodiment of CLIF SA104 is now described. FIG. 137 is a block diagram illustrating files and tables used by CLIF SA104 in one embodiment.

Referring now to FIG. 137, CLIF SA104 uses a timer SA402, a retry count SA408, a duplicate detection table SA412, an outstanding request list SA406, a configuration file SA404, a buffer pool SA414, and an incoming packet list SA410. In one embodiment, the retry count SA408 is maintained in outstanding request list SA406, and the initial number of retries allowed is kept in configuration file SA404.

Each CLIF SA104 performs message management functions for one or more procedures within an application SA102A. CLIF SA104 is responsible for sending messages to and receiving messages from other applications SA102D. Other applications SA102B may have their own CLIF SA104, or may communicate without using a CLIF SA104. Application SA102 may be networked with other applications SA102B via a local area network or a wide area network, or they may communicate via other communications means.

The process by which CLIF SA104 sends a message and receives a message is now described. In this description, the message sent is termed a request SB102 while the message received is termed a response SB104. It should be noted that CLIF SA104 can send any type of message, and that message need not be a request. However, according to one embodiment, all messages sent are replied to using a response so the sending CLIF SA104 can verify that the message has been received at the destination.

FIG. 138 is a block diagram illustrating a request being sent SB102 and a response received SB104 by a CLIF SA104. FIG. 138 is similar to FIG. 135, however, in FIG. 138, the application sending request SB102 and its CLIF are termed a requesting application SA102A and CLIF SA104A. Similarly, the application receiving request SB102 and sending a response SB104 is labeled responding application SA102B and its associated CLIF is labeled SA104B. Please note that a CLIF SA104B is optional on the responding side. FIG. 369, which comprises FIGS. 140 and 141, is an operational flow diagram illustrating the process by which CLIF SA104A sends and receives messages. FIG. 142, is an operational flow diagram illustrating what occurs when a response is received by CLIF SA104. Again, this discussion is made in terms of sending a request SB102 and receiving a response SB104 in reply to request SB102. It should be noted again that request SB102 and response SB104 are only one type of message that could be sent and received by a CLIF SA104.

Referring now to FIGS. 138 and 139, in a step SB402, applications SA102 (requesting application SA102A and responding application SA102B) inform their respective CLIFs SA104A as to the messages they will be accepting. In this manner, applications SA102A can use CLIF SA104A to effectively filter the messages that applications SA102 receive. Requesting application SA102A for example, can inform CLIF SA104A as to the certain types of messages that it is accepting. If a message is received by CLIF SA104 and it is not one of these message types, CLIF SA104A ignores or discards the message.

It should be noted that applications SA102 are only required to complete step SB402 if they expect requests to be made of them. It is not necessary for an application SA102 to inform CLIF SA104 that it will accept a response to a request made by that application SA102.

When requesting application SA102A wishes to send a request SB102 to a responding application SA102B, requesting application SA102A first informs CLIF SA104A that it wishes to send a request SB102. This occurs in a step SB404.

In a step SB406, CLIF SA104A determines which route to send request SB102 to responding application SA102B. This determination is made using information contained in configuration file SA404. To make this determination, CLIF SA104A uses a cost factor table and a range of client addresses table contained in configuration file SA404. The cost factor table provides the cost to send request SB102 to responding application SA102B over various routes. Using the cost factor table, CLIF SA104A can determine the most cost-effective route to use to send request SB102. The range of client address tables specifies a range of servers that can be used in sending request SB102.

In a preferred embodiment, the cost factor table is a matrix of sources and destinations. The intersection between each source and destination pair is the cost for routing between that source and destination. CLIF SA104A can use the information in the cost factor table to determine the cost between each source and destination pair and the total cost of a route made up of several source and destination pairs.

In a step SB408, CLIF SA104A saves request SB102 in outstanding request list SA406. Outstanding request list SA406 is used to track a request SB102. When a response to a request SB102 is received, that request SB102 is deleted from outstanding request list SA406. Thus, if a request SB102 is found in outstanding request list SA406, CLIF SA104A knows that no response SB104 has been received for that request SB102.

In a step SB410, CLIF SA104A sends request SB102 to the appropriate destination (to responding application SA102B).

At the same time, in a step SB412, CLIF SA104A starts timer SA402. As noted above, timer SA402 is used to establish a time-out period within which response SB104 should be received. If response SB104 to request SB102 is received before the time-out period has expired (decision block SB414), the operation continues in a step SB502 (illustrated in FIG. 142). If, on the other hand, response SB104 to request SB102 is not received within the time-out period, CLIF SA104A may attempt a retry. In other words, CLIF SA104A may attempt to resend request SB102 to the destination.

Before request SB102 is resent, CLIF SA104A examines the retry count SA408 for that request SB102. This occurs in a step SB416. If there are retries left, CLIF SA104A increments the retry count SA408 for that request SB102 in a step SB417. CLIF continues at step SB410 and resends request SB102.

If, on the other hand, no retries are left in step SB416, CLIF SA104A determines whether a new route can be chosen over which to send request SB102 to the destination. This occurs in a step SB418.

If a new route exists (decision block SB420), CLIF SA104A continues at step SB410 and sends request SB102 via the new route. If, however, no new route exists (decision block SB420), CLIF SA104A informs requesting application SA102A that an error has occurred. This occurs in step SB422. At this time, requesting application SA102A may decide to resend request SB102.

As mentioned above with reference to step SB414, if a response is received within the time-out period, the operation continues at step SB502. Turning now to FIG. 142, in step SB502, a received response SB104 is stored in a buffer pool SA414. In one embodiment, buffer pool SA414 is maintained by a procedure kernel which informs CLIF SA104 when there is a packet to be processed.

In a step SB504, CLIF SA104A matches the received response SB104 with the requests SB102 in outstanding request list SA406. If response SB104 corresponds to a request SB102 in outstanding request list SA406, this request SB102 is deleted from outstanding request list SA406 in a step SB506.

In a step SB508, CLIF SA104A provides response SB104 to application SA102A. In one embodiment, this step is accomplished by CLIF SA104A informing application SA102A that response SB104 has been received and stored in buffer pool SA414. Application SA102A then retrieves the response SB104 from buffer pool SA414.

FIGS. 138, 140, and 142 discussed message handling in terms of a CLIF SA104A sending a request SB102 and receiving a response SB104 in reply thereto. CLIF SA104A is not limited to receiving only responses SB104. In fact, the above discussion makes it obvious that CLIFs SA104 can receive requests SB102 from other applications SA102 or responses SB104 from other applications SA102. Therefore, when a message is received by a CLIF SA104, it first checks to determine whether it is a response SB104 to an outstanding request SB102, or whether it is a request SB102 from another application SA102. If the message received is a request SB102, CLIF SA104 informs application SA102 that a request SB102 has been received. CLIF SA104 makes request SB102 available to application SA102.

In one embodiment, request SB102 is stored in buffer pool SA414, and application SA102 is notified that request SB102 has been received if the receiving application SA102 has registered for requests from the sending application SA102. Information about the request SB102 (e.g. the identification of the sending application SA102, etc.) is stored in incoming packet list SA410.

A more detailed discussion of the procedure followed by a CLIF SA104 when it receives a request SB102 is now described. FIG. 143 is an operational flow diagram illustrating the process that occurs when a CLIF SA104 receives a request SB102.

Referring now to FIG. 143, in a step SB602, CLIF SA104 receives a request SB102.

In a step SB604, CLIF SA104 checks to see if the received request SB102 is a request that was previously sent and received by CLIF SA104. In one embodiment, CLIF SA104 checks a retry count in a header of the message. If the retry count is zero (0), this indicates that the request SB102 received is being sent from its originating application SA102 for the first time.

In this case, CLIF SA104 saves request SB102 in duplicate detection table SA412. This occurs in a step SB606. In one embodiment, request SB102 is saved in duplicate detection table SA412 along with the time that it was received. This enables CLIF SA104 to delete messages that have reached a certain age.

In a step SB608, CLIF SA104 provides request SB102 to application SA102B. In one embodiment, CLIF SA104 informs application SA102B that request SB102 is stored in buffer pool SA414 and application SA102B retrieves request SB102.

If, on the other hand, the retry count in step SB604 is greater than zero (0), this indicates that the request SB102 has been previously sent and this is a retry. In this case, CLIF SA104 checks duplicate detection table SA412 to see whether CLIF SA104 actually received this particular request SB102 before. This occurs in a step SB610. This check is useful because request SB102 may be a retry for several reasons. One reason may be because request SB102 was never received by CLIF SA104 when it was sent the first time due to a transmission error. In this case, no entry for that request SB102 will appear in duplicate detection table SA412, and CLIF SA104 treats request SB102 as a new message.

If the retried request SB102 is a duplicate (decision block SB612), in a step SB614, CLIF SA104 either resends response SB104 or sends a hold response SD104 (illustrated in FIG. 146). If, on the other hand, the retried request SB102 is not a duplicate, CLIF SA104 saves request SB102 in duplicate detection table SA412 in step SB606 and provides request SB102 to application SA102B in step SB608.

The above discussion on the client interface describes how CLIFs SA104 can be used to manage and handle message traffic. Additional features can be provided by CLIFs SA104, as are now described. These features can include duplicate detection (introduced above with reference to FIG. 143) and a request hold feature.

The feature of duplicate detection is now described in detail. FIG. 144 is a data flow diagram illustrating messages sent between requesting application SA102A and responding application SA102B using CLIFs SA104. FIG. 145 is a derailed operational flow diagram illustrating the process by which a CLIF SA104B detects the presence of a duplicate request SB102 and prevents responding application SA102B from having to respond more than once.

It is important to note that in order for this duplicate detection feature to operate, responding application SA102B must have an associated CLIF SA104B. Although, as mentioned above, responding applications SA102B need not have a CLIF SA104 to respond to requests, having a CLIF SA104 allows this duplicate detection feature to be implemented with reference to that responding application SA102B.

One example of where duplicate detection is not necessary is in the case of call process database and NCP AB104. In this scenario, NCP AB104 is analogous to requesting application SA102A. Debit card database KA272 is analogous to responding application SA102B. (See FIG. 118.) In this case, when NCP BA104 sends a debit card dollar amount update to debit card database KA272, debit card database KA272 does not care whether it gets updated twice (in other words, whether the same information is written into the database). Thus, in this scenario, having duplicate detection is not needed.

Referring now to FIG. 144 and 145, the duplicate detection will now be described in detail. In a step SC202, requesting application SA102A tells CLIF SA104A to send a request SB102. This is the same as the process that occurred in step SB404 of FIG. 140.

In a step SC204, CLIF SA104A sends request SB102 to destination CLIF SA104B. As described above, CLIF SA104A may set a timer SA402 when request SB102 is sent. In step SC206, CLIF SA104B receives request SB102. CLIF SA104B first determines that the message received is a request SB102 and then determines whether the request is a duplicate request. This occurs in step SC208. The manner by which CLIF SA104B determines whether request SB102 is a duplicate is illustrated in FIG. 143 with reference to steps SB602 through SB608.

If this is not a duplicate request SB102 (in other words, if this is the first time CLIF SA104B received this request SB102), CLIF SA104B provides request SB102 to responding application SA102B. This occurs in a step SC210. Responding application SA102B prepares a response SB104 to request SB102 and sends response SB104 to CLIF SA104B. In a step SC212, responding application SA102B tells CLIF SA104B to send response SB104.

In a step SC214, CLIF SA104B sends response SB104. In FIG. 144, this is illustrated as SB104A. According to this scenario, however, response SB104A does not make it to CLIF SA104A that originally sent request SB102. Therefore, when the time-out period expires at CLIF SA104A, CLIF SA104A will again send request SB102 to destination CLIF SA104B in step SC204. This is illustrated by request SB102B.

CLIF SA104B receives request SB102B in step SC206. In step SC208, CLIF SA104B determines whether received request SB102B is a duplicate request. Because it is a duplicate request, CLIF SA104B bypasses step SC210 and does not inform responding application SA102B of the request. This saves responding application SA102B from having to respond again to a second request. Instead, CLIF SA104B proceeds to step SC214 and resends response SB104. This is illustrated as SB104B in FIG. 144. This time, in step SC216, CLIF SA104A receives response SB104B within the time-out period. CLIF SA104A provides response SB104B to requesting application SA102A.

One key advantage gained by duplicate detection is that it protects the integrity of the data and the operation of call processing system AB102 by not allowing requests SB102 to be processed more than once. Additionally, duplicate detection saves responding application SA102B from having to respond to the same request SB102 twice. This shift of management overhead from responding application SA102B to CLIF SA104B saves valuable time in responding application SA102B. The management overhead associated with retrying the request SB102 is also shifted to CLIF SA104A, thus alleviating requesting application SA102A of the burden.

Another feature provided by CLIF SA104 is the ability to increase the time interval between retries if responding application SA102B is busy. This feature is now described. FIG. 146 is a data flow diagram illustrating the manner in which one CLIF SA104B can increase the time interval between retries of a second CLIF SA104A. FIG. 147 is a derailed operational flow diagram illustrating the process by which a first CLIF SA104B increases the time interval between retries of a second CLIF SA104A.

Referring now to FIGS. 146 and 147, in a step SD202, requesting application SA102A tells CLIF SA104A to send a request SB102.

In a step SD204, CLIF SA104A sends request SB102 to destination CLIF SA104B. CLIF SA104B receives request SB102 in step SD206. At this time, CLIF SA104B can perform duplicate detection and/or any other desired functions of message handling.

In a step SD208, CLIF SA104B provides request SB102 to application SA102B. However, in this scenario, application SA102B is busy and is responding to requests SB102 slower than is expected. This is illustrated in block SD210.

Because responding application SA102B is operating slower than expected, the time-out period in CLIF SA104A expires before a response SB104 is received. Thus, in step SD212, CLIF SA104A resends request SB102. This is illustrated by reference number SB102B in FIG. 146.

CLIF SA104B receives second request SB102B, examines the retry count, and determines that request SB102B was previously received and forwarded to responding application SA102B. Because responding application SA102B already received request SB102, CLIF protects responding application SA102B from receiving it again. Therefore, in a step SD216, CLIF SA104B sends a request hold message SD104 to CLIF SA104A. Request hold message SD104 indicates to CLIF SA104A that responding application SA102B received request SB102 (and request SB102B), and that a response is forthcoming in due time. In one embodiment, CLIF SA104A responds to request hold message SD104 by increasing the time-out time set by timer SA402. Thus, CLIF SA104A increases the time between retries.

An additional feature provided by CLIF SA104 is that it can provide automatic retransmission of a request SB102 to another application SA102 if requests SB102 to the first application SA102 have been unanswered. Thus, if a primary application SA102 appears busy or missing, CLIF SA104 can automatically transmit the request SB102 to a secondary application that can receive and process request SB102. Additionally, if the primary application SA102 again becomes available, CLIF SA104 automatically reroutes the requests SB102 to that primary application once again. Multiple secondary applications SA102 can be designated as back-ups to the primary. These can be prioritized to establish an order in which CLIF SA104 tries to send requests SB102 to them.

This prioritization can be accomplished by referring to a priority list of multiple applications SA102, each performing the same function, and a route table indicating to which application SA102 it would be most efficient to route request SB102. Thus, if there are several applications SA102 that perform the same function (for example, several applications SA102 that can respond to a GET CALLHANDLE REQUEST BA304), CLIF SA104 can determine which of those several applications SA102 should be used as the primary source, which should be secondary, and so on down the line, depending upon the number of applications SA102 available.

The manner in which CLIF SA104 prioritizes applications SA102 to which a request SB102 is sent is now described. FIG. 148 is a dataflow diagram illustrating the manner in which CLIF SA104 sends messages (for example, requests SB102) to an application SA102 with the highest priority. FIG. 149 is an operational flow diagram illustrating the process by which CLIF SA104 sends messages (for example, requests SB102) to an application SA102 having the highest priority.

Referring now to FIGS. 148 and 149, when CLIF SA104 receives a request to send a message to another application SA102, CLIF SA104 first checks a priority list in configuration file SA404 to determine the preferred application SA102 to which request SB102 should be sent and the order of priority of applications SA102 to which request SB102 may be sent. This occurs in a step SF202. In one embodiment, configuration file SA404 is examined at application start-up and its information, including priority information, is stored in a series of tables.

In a step SF204, CLIF SA104 sends request SB102 to the application SA102 having the highest priority. This is illustrated in FIG. 148 as application SA102C.

When CLIF SA104 does not get a response SB104 within the designated time-out period, CLIF SA104 resends request SB102. Because, in this scenario, the higher priority application SA102C is unavailable, the original request SB102 and all the subsequent retries of request SB102 remain unanswered. Therefore, CLIF SA104 continues to resend request SB102 until the number of retries permitted is exhausted in a step SF206. This is further illustrated in and described with reference to FIG. 140 in steps SB410–SB417.

CLIF SA104 updates its route tables to no longer show application SA102C as the higher priority application because this application SA102C is no longer available. Thus, all subsequent requests SB102 will be routed to a lower priority application SA102D until higher priority application SA102C is again available.

In a step SF208, CLIF SA104 determines the application SA102 next on the priority list (illustrated in FIG. 148 as application SA102D). CLIF SA104 sends request SB102 (and subsequent requests SB102) to application SA102D. This step is illustrated and discussed with reference to step SB418 in FIG. 140.

When request SB102 is re-routed to the lower priority application SA102D, CLIF also SA104 sends a check message to the controlling application (for example, the server controller) to determine if it is the entire server or just the application SA102C that is not responding. The frequency of CHECK MESSAGE SF102 can further be limited by a set time interval.

To enable CLIF SA104 to determine when the higher priority application SA102C again becomes available, CLIF SA104 sends a CHECK MESSAGE SF102 to the higher priority application SA102C. CLIF SA104 is expecting a CHECK MESSAGE RESPONSE SF104 when application SA102C is again available. CLIF SA104 can continue to send CHECK MESSAGE SF102 to application SA102C at periodic intervals until a CHECK MESSAGE RESPONSE SF104 is received. If application SA102C is available when it is sent a CHECK MESSAGE SF102, it sends CHECK MESSAGE RESPONSE SF104 to CLIF SA104. This is illustrated in step SF212.

In a step SF214, when CHECK MESSAGE RESPONSE SF104 is received, CLIF SA104 knows that SA102C is again available and updates its configuration file SA404 to again show application SA102C as the higher priority application. From this point on, new message (for example, requests SB102) will be sent to application SA102C, and the operation continues at step SF204.

10.0 DEF

One problem faced by developers of conventional call processing systems is that of developing call processing software that is easily maintainable and highly reconfigurable. Another problem is that of creating a call processing system capable of providing subscriber-unique features and capabilities. As the number of subscribers to the conventional call processing system increases, it becomes increasingly difficult to provide highly maintainable and reconfigurable code to handle a wide variety of custom and/or standard features using conventional software techniques.

In many conventional systems, the call processing software is coded in such a way that when changes are to be made to the system, entire sections of code have to be rewritten and recompiled. This can be a time-consuming task and requires that the platforms on which the code is running be brought to a non-operational status while the new software is loaded.

The inventors have developed a way to provide a wide array of subscriber-unique and standard call processing features while eliminating the need to recompile large portions of operational software. According to the present invention, the call processing operations are driven primarily by data records, known as DEF records. Call processing system AB102 uses DEF records in conjunction with call processes to provide subscriber-unique and standard call processing features. A call processes is started when a new call enters call processing system AB102. The call process access one or more data fields in a DEF record that indicate how the call is to be processed. Thus, DEF records can be used to dictate certain subscriber-unique features and generic features as well. When changes are to be made to call processing system AB102, the majority of these changes can be made by updating the data fields found in the DEF records. Thus, most changes to call processing system AB102 do not require operational software to be modified, recompiled, and re-loaded.

The manner in which call processing system AB102 uses DEF records to process calls is now described. FIG. 150 is a high-level block diagram illustrating the manner in which DEF records are used by call processing system AB102 to process calls. FIG. 151 is an operational flow diagram illustrating the manner in which call processing AB102 uses DEF records and processes to handle calls. Referring now to FIGS. 150 and 151, in a step TA202, a call is received by call processing AB102. As described above in the Network Control Processor Section of this document, call data AA144 is routed to NCP AB104 and call audio AA142 is routed to matrix switch AB106. For operator-assisted calls, call audio AA142 is then routed to an operator console AB108 to provide operator assistance.

In a step TA206, NCP AB104 identifies the call and the type of call being placed. The manner in which NCP AB104 processes the call is fully described in the NCP Section of this document.

In a step TA210, NCP sends operator control data AB124 to operator console AB108. Operator control data AB124 includes information required by operator console AB108 to process the call. This information includes a base process number, a DEF record number, and other call information such as ANI, called party number, subscriber identification, etc. At this time, operator console AB108 can begin processing the call.

In a step TA214, operator console AB108 starts a base process TA102. The base process TA102 started is the base process identified by the base process number that was sent by NCP AB104 with operator control data AB124. Base process TA102 is a process template that contains the basic steps that are to be followed by operator console AB108 in processing the call. Base process TA102 is coded to look for certain pieces of information within a DEF record TA104. Base process TA102 uses this information to process the call. This information can dictate that base process TA102 start other processes TA106, wait for user AA106 input, or wait for operator instructions.

In a step TA218, base process TA102 retrieves the DEF record TA104 as specified by the DEF record number that was sent with operator control data AB124.

In a step TA222, base process TA102 uses the information in DEF record TA104 to process the call. This process is described in more detail below with reference to FIGS. 152 and 153.

In one embodiment, when base process TA102 has completed all of its call processing operations, it starts a finish process TA108 and sends a DEF record number identifying a DEF record TA110 that finish process TA108 will use in finishing the call processing. The finish process TA108 is another process that is designed to look for specific data tags TB104 that describe how to finish the call process. For example, finish process TA108 may look for a specific tag TB104. This tag may point to a record that displays keys on the operator screen for the operator to press to complete the call, or that displays (or plays in the case of a VRU AB134) a closing script.

In a step TA230, finish process TA108 starts complete call process TA112. Complete call process TA112 completes the call placed by user AA106.

The structure of DEF records TA104 (and TA110 in the case of a finish process TA108) is now more fully described. FIG. 152 is a diagram illustrating the structure of a DEF record TA104 in one embodiment. DEF record TA104 includes a DEF record number TB102. DEF record number TB102 uniquely identifies each DEF record TA104. DEF record number TA102 is sent to operator console AB108 with operator control data AB124. NCP AB104 determines which DEF record number TB102 to provide to operator console AB108 using call data AB144 during the CALL ID LOOK-UP BA306. Different DEF records TA104 may be chosen and identified based on the type of call that is placed, the particular subscriber AA114 or other call information. Thus, the operation performed by base process TA102 can be custom tailored based on call data AA144 and by the use of different DEF records TA104.

The fields within DEF record TA104 include a tag number TB104, a length field TB106, and a data field TB108. Tag number TB104 is an identifier that base process TA102 uses to find specific data TB110 within DEF record TA104. Length field TB106 specifies the length of data field TB108. Data field TB108 contains data TB110 used in processing the call. Data TB110 can be the actual data used to process the call, or can be a reference to data in another data file, data table, or database.

Depending on the particular DEF record TA104, any number of fields, which comprise tag numbers TB104, length fields TB106 and data fields TB108, can be provided in a DEF record TA104.

Base process TA102 is coded to look for certain tag numbers TB104 within DEF record TA104 at certain times. For example, base process TA102 may be coded to look for tag number 1, then tag number 2, then tag number 3. Tag number 1 may be a tag identifying a greeting script to be played by an automated VRU AB134, or read by an operator at a manual operator console AB132. In this case, base process TA102 looks in DEF record TA104 for tag number 1 and reads data TB110 in data field TB108 associated with tag number 1. In the case of a greeting script, data TB110 will point to the script to be played, read, or synthesized to user AA106. The script can be customized to a particular customer AA110 in a number of different ways. One way is for NCP AB104 to provide customer AA110 identification to operator console AB108 with operator control data AB124. Operator console AB108 would then use this identification information in conjunction with data TB110 in data field TB108 associated with tag number 1 to read the carrier-unique greeting script found in a database. For example, operator console AB108 will go to the database to retrieve the script identified by data TB110 and the carrier identification. Operator console AB108 then plays this script to user AA106. In the case of a automated VRU AB134, the script played can be voice synthesized or played from a recording. In the case of a manual operator console AB132, the script is displayed in text format on a screen and the human operator reads the script to the user AA106. For example, the script may say "Welcome to XYZ Company's voice mail system," or "Thank you for using XYZ Long Distance Company. Please enter your calling card number now."

In addition to playing scripts, base process TA102 can be coded to find tags to perform numerous other functions. For example, base process TA102 can be coded to perform validation of data received. For example, base process TA102 may be coded to retrieve another tag that identifies that the called number should be validated to verify that the called number is the correct number of digits (for example, 10 digits). In this case, when base process reads the data TB110 associated with that tag number, base process TA102 may start an additional process TA106 that performs the validation. This results in a validation request GA122 being sent to the validation system AG102. Once base process TA102 starts the additional process TA106, it doesn't necessarily have to wait for the additional process TAI06 to be completed before moving on to the next tag.

As another example, base process TA102 may be coded to retrieve another tag that requires that the calling card number be validated through validation system AB102 as described in the Validation System Section of this document. In this case, data field TB108 associated with that tag will direct base process TA102 to send a request to validation system AG102 to validate the calling card number. Base process TA102 continues to read tags and perform the operations dictated by the tags. Thus, changes to call processing system AB102 can be made by redefining the data TB110 in data fields TB108.

Base process TA102 need not look for every tag number TB104 within a DEF record TA104. It may, instead, only be coded to search for certain tag numbers TB104 with a DEF record TA104.

When processing the call, base process TA102 is also capable of accepting and responding to inputs from user AA106. For example, data TB110 may also include strings which base process TA102 uses to match against user input. For example, base process TA102 may be programmed to retrieve TB104 that define data fields TB108 to match user input strings "1#," "2#," "3#". For each of these user input sequences, data TB110 uniquely defines a process TA106 to be started or another base process TA102 to be started. For example, one particular DEF record TA104 may define that when a user dials 1#, a second base process TA102 should be started. Data TB110 identifies this base process with a base process number and can also identify a specific DEF record TA104 for the new base process TA102 to use. For example, a user dialing 1# may indicate that the user wishes to access a speed-dial feature. In this case, data TB110 and DEF record TA104 will tell base process TA102 to start a speed-dial process when this string is detected.

To recapitulate, processes TA102, TA106, perform operations the can be done in a number of different manners. The way in which the operation is performed for a specific call is dictated by the data TB220 pointed to by the tags TB104 referenced. As the process TA102, TA106 performs an operation, it may come to a point where data TB110 from the DEF record TA104 is required. At this point, the tag TB104 is referenced and its associated data TB110 retrieved.

Consider the base process TA102 as an example. A base process TA102 is typically designed to collect information from a user AA106, validate the information collected, and pursue a course of action based on the information collected and the results of the validation. The general framework for completing these operations is coded in the base process TA102: it must prompt the user for information, validate the information, and follow a course of action. The data TB110 retrieved using tags TB104 provides the specific actions to be followed by the process TA102. These can include, but are not limited to: the manner in which the user is prompted, the order in which information is collected, the manner in which information is validated, the number of additional chances a user AA106 is given after a failed validation, the action to take in the event the number of additional chances is exhausted, the amount of time to wait for input, the action to take if the time-out period expires, and a large number of other parameters.

Thus, the data TB110 found in DEF records TA104 dictates how the call is to be processed by base process TA102. New features can be added, existing features changed or deleted, and features customized for specific users by updating one or more DEF records TA104. Thus, operational code does not have to be modified and recompiled to implement these types of changes.

To minimize the amount of duplication of data TB110, DEF records can be defined at various levels. FIG. 153 is a diagram illustrating how different levels of DEF records TA104 can be used to optimized data storage.

Referring now to FIG. 153, a generic DEF record TB202 includes data TB110 that is common to all subscribers AA114. A group DEF record TB204 can contain data TB110 that is unique to a customer AA110. Because this data TB110 is unique to a customer AA110, it is not contained in generic DEF record TB202. If a particular customer AA110 has a unique feature that is different from other carriers AA110, data TB110 for that feature is found in group DEF record TB204.

Specific DEF record TB206 defines data TB110 that is specific to a user AA106. If a user AA106 subscribes to features that are unique from other users AA106, data TB110 for those features will be contained in specific DEF record TB206.

In search for data TB110 using tag numbers TB104, base process TA102 will first start in specific DEF record TB206. If tag number TB104 is not found in specific DEF record TB206, base process TA102 then searches group DEF record TB204. If tag number TB104 is not found in group DEF record TB204, base process TA102 then goes to generic DEF record TB202 to find that tag number TB104. Thus, if a user AA106 has a unique feature, or that user's call is to be handled uniquely, the data TB110 instructing base process TA102 on how to handle that call will be found in specific DEF record TB206 and used.

A DEF record manager is a set of functions calls used to manage DEF records read by the application (for example, the operator console AB108). The DEF record manager associates a DEF record with a particular call process (base process TA102). The allows the application to search for any tag TB104 in the system or tags TB104 within a particular DEF record TA104. This is done so that some tags TB104 may be accessed by any process TA102, TA106 that may require it while other tags TB104 can be restricted only to the process TA102, TA106 reading the DEF record TA104 containing the tag TB104.

12.0 High-Level Operational Scenarios 12.1 Operator Services

Call processing system AB102 can be used to provide operator services to subscribers AA114A. Call processing system AB102 can provide operator assisted calling to originating users AA106A who subscribe to a processing system AB102, and to customers AA110. Customers AA110 may in turn offer these operator services to their subscribing users AA106. As discussed previously in this document, one feature of call processing AB102 is that it can offer customer AA110 unique and user AA106 unique customizable services. A high level scenario describing the manner in which operator services are provided by call processing system AB102 is now presented. FIG. 154, which comprises FIGS. 155, 156, 157, and 158, is an operational flow diagram illustrating the high level operator services scenario. Referring now to FIG. 155, in a step YA104, call processing system AB102 receives a call requiring operator assistance. In a step YA108, call data AA144 associated with the call is routed to NCP AB104. Call audio AA142 of the call is routed to matrix switch AB106.

In a step YA112, NCP AB104 receives call data AA144 for the call. NCP AB104 determines the type of call being placed and the call processing required based on call data AA144. In one embodiment, this is accomplished by NCP AB104 performing database look-ups using call data AA144 to search for data records. In this embodiment, the data records indicate the type of processing and operator services required to handle the call. An example of this is where CMP BA102 retrieves call parameters BA308 from a database served by DBS BA104 and is discussed in the NCP Section of this document with reference to FIGS. 10, 12, and 14. Also, NCP AB104 determines the optimal routing of the call.

In a step YA116, NCP AB104 sends the routing information to matrix switch AB106. Because this is an operator-assisted call, as determined by NCP AB104 in step YA112, the call routing information includes instructions from matrix switch AB106 regarding which operator console AB108 should receive call audio AA142 for the call. Thus, call audio AA142 can be routed to the proper operator console AB108. It should be noted that depending on the type of operator assistance required, the operator console AB108 to which the call is routed can be a voice response unit AB134, a manual operator console AB132, or a customer service console AB136. In response to this routing information, matrix switch AB106 routes the call to the designated operator console AB108. Because NCP AB104 is controlling the call data AB144, and the operator console AB108 only gets the call audio AB142 portion of the call from matrix switch AB106, operator console AB108 is treated as any other destination. Therefore, the specified operator console AB108 can be treated just like any other terminating point of matrix switch AB106. Traditionally, such treatment was limited only to other switches and special ports were required on the conventional matrix switch to interface to the operator consoles.

In a step YA120, NCP AB104 sends operator control data AB124 to the specified operator console AB108. Operator control data AB124 can include call ID information that indicates the type of call and the type of processing required to handle the call. Because call processing system AB102 is highly data driven, the type of call processing required for a call type can be customized for a specific originating user AA106A or customer AA110. Changes to the way in which a particular call is processed can be accomplished simply by changing the data in the data records retrieved by NCP AB104 when determining the call processing requirements.

Operator control data AB124 tells the specified operator console AB108 that it is receiving a call and how the call should be processed.

Depending on the type of call being placed, the call can be handled by either a manual operator console AB132 or a voice response unit AB134. For calls requiring a human operator, a manual operator console AB132 is desired. It should be noted that users AA106A or customers AA110 may specify whether automated call handling is acceptable at a VRU AB134 or whether they prefer that their calls are always handled by a human operator at a manual operator console AB132. In one embodiment, this is controlled by call parameters BA308 and can easily be changed by changing the data found in the data records retrieved for one or more originating users AA106A or customers AA110.

If the call requires a manual operator console AB132, the operation continues in a step YA304 as illustrated in FIG. 157. On the other hand, if the call can be handled using a VRU AB134, the operation continues in a step YA204 as illustrated in FIG. 156. The manner in which the call is set up using an automated voice response unit AB134 is now described with reference to FIG. 156. Referring now to FIG. 156, in a step YA204, the specified VRU AB134 requests information from originating user AA106A. The request can be a request for the number that originating user AA106A wishes to call, the feature the originating user AA106A wishes to access, calling card or credit card information, or other information required to complete the call. The order in which voice response unit AB134 requests this call information can be customized for each carrier AA110 or for each individual user AA106A. The customization can be based on call parameters BA308 and/or the manner in which DEF records are implemented for each originating user AA106A or customer AA110. DEF records are completely described in the DEF section of this document.

If originating user AA106A is placing a calling card, debit card, or credit card call, automated voice response unit AB134 may send this billing information to an external validation system AG102 so that it may be validated externally in one embodiment. This occurs in a step YA208. In alternative embodiments, validation of billing information is performed internal to call processing system AB102.

In a step YA212, if a terminating (called) number is entered, that number is validated to verify that it is a valid number. In one embodiment, this is accomplished by using an internal validation system to determine whether it is a valid number. Other validation checks can include a check to see that the number contains the correct number of digits, that is made to a geographic area as allowed by the customer AA110, has a valid area code, and other like validation information.

In a step YA216, fraud detection and prevention system AG112 can be used in one embodiment, to monitor the call for potential fraudulent uses. Such monitoring is fully described in the Fraud System Section of this document.

If all the information entered by originating user AA106A is valid (decision block YA220) the operation continues in a step YA404 (FIG. 158) in which the call completion commences. If, on the other hand, any or all of the information is found to be invalid, in a step YA222, automated voice response unit AB134 informs NCP AB104 that the call is transferred to an MOC. In response, call audio AA142 is routed back to matrix switch AB106, and NCP AB104 instructs matrix switch AB106 to route call audio AA142 to a manual operator console AB132. This occurs in a step YA226. This is done so that human operator intervention can be provided. The steps taken from this point are described beginning in a step YA316 in FIG. 157. This is described in detail below with reference to handling of the call with a manual operator console AB132. In alternative embodiments, automated VRU AB134 can provide originating user AA106A with options that could potentially assist in correcting the situation that led to the invalidation. For example, automated VRU AB134 may ask a user to enter a new credit card number where the originally-entered number was found to be invalid, or, automated voice response unit AB134 may ask a debit card user if they would like to replenish their debit card using a credit card if such a feature is offered. These examples serve to illustrate two of the numerous ways VRU AB134 may attempt to revalidate the card.

As discussed above with reference to step YA122 of FIG. 155, if manual operator handling is desired, the operation continues at a step YA304 in FIG. 157. Referring now to FIG. 157, the human operator requests information from a caller and enters the received information via a keyboard attached to the manual operator console AB132. Such information can include calling card number, a credit card number, a debit card number, a terminating (called) number, and other like information that may be required before the call can be completed.

In a step YA308, operator console AB132 performs validations, where required, on card numbers, called numbers, and other billing information, as described above with reference to steps YA202, YA212, and YA216. If the validated information checks out to be valid (decision block YA312) the operation continues in a step YA404 (illustrated in FIG. 158) in which the call is completed. If, on the other hand, one of the validated parameters proves to be invalid, the operator informs originating user AA106A of the problem and provides options to solve the problem. This occurs in a step YA316. These options can include asking the originating user AA106A for a new credit card number, a new calling card number, or other alternative information. If alternative information is provided, manual operator console AB132 validates this alternative information in a step YA308. This is illustrated with a feedback loop YA342. If no alternatives are provided, the call is terminated as illustrated in a step YA320.

As discussed above, when all the information is validated, the operator console AB108 chosen to handle the call begins the process of call completion. This is illustrated in FIG. 158. Referring now to FIG. 158, in a step YA404, operator console AB108 informs NCP AB104 that the call can be completed. In one embodiment, this information has operator response data AB126.

In a step YA408, NCP AB104 determines the optimum routing for the call. In one embodiment, the manner in which this is performed is described in this document with reference to FIGS. 17 and 21. In this embodiment, this is accomplished by doing a look-up using DBS BA104 to look-up the optimum routing of the call.

In step YA412, NCP AB104 instructs matrix switch AB106 to complete the call using the designated route. In this step, NCP AB104 sends switch control data AB122 to matrix switch AB106 to instruct matrix switch AB106 to complete the call.

In a step YA416, matrix switch AB106 mutes the call to the terminating (called) number as instructed in step YA412.

12.2 Enhanced Services Card Call

One feature of call processing system AB102 is that it allows users AA106 who are subscribers AA114 of call processing system AB102 to obtain an enhanced services card. The enhanced services card is a type of calling card that allows a user to access and utilize any or all of the features that can be provided by call processing system AB102. Additionally, customer AA110 can provide enhanced services cards to its subscribing users AA106.

A scenario describing the manner in which an enhanced services card call is processed by call processing system AB102 is now described. FIG. 159, which comprises FIGS. 160 and 161, is an operational flow diagram illustrating the manner in which call processing system AB102 processes an enhanced services card call according to one embodiment.

Referring now to FIGS. 160 and 161, an originating user AA106A places an enhanced services card call. This could be accomplished in a number of different ways. In one embodiment, originating user AA106A is provided with an 800 access number by which the call can be placed. In this embodiment, whenever an originating user AA106A wishes to place an enhanced services card call, she dials the designated 800 number. When a call comes into call processing system AB102 under this number, call processing system AB102 knows that it is an enhanced services card call and handles the call accordingly. In one embodiment, call processing system AB102 provides an audible menu from which originating user AA106A can choose the feature(s) she wishes to access.

In a step YB104, call processing system AB102 receives an enhanced services card call. As noted above, this could be via a specific 800 number designated for enhanced services card calls.

In a step YB108, call data AA144 is routed to NCP AB104, and call audio AA142 is routed to matrix switch AB106. When NCP AB104 receives call data AA144 in step YB112, NCP AB104 determines the type of call being placed and the processing required. Specifically, in this scenario, NCP AB104 determines that the call is an enhanced services card call and performs database look-ups to determine the type of call processing required. In this step, NCP AB104 determines that an operator console AB108 should be designated to handle the call. Because responses to menu prompts and card numbers can be entered using the telephone keypad, an automated voice response unit AB134 is all that is typically required to handle the call. Usually, enhanced services card calls do not require a human operator at a manual operator console AB132. Thus, in VRU step YB112, NCP AB104 determines that the call can be routed to AB134.

In a step YB116, NCP AB104 sends routing information to matrix switch AB106, indicating that the call can be routed to the proper VRU AB134. This call routing information can include instructions for matrix switch AB106 as to which specific voice response unit should receive the call audio AA142 portion of the call. In response, matrix switch AB106 routes call audio AB142 to the designated VRU AB134. After the call is routed, NCP AB104 sends operator control data AB124 to the designated VRU AB134. Operator control data AB124 includes call information, such as any pertinent information retrieved with call parameters BA308. Additionally, operator control data AB124 includes data telling that VRU AB134 that it is receiving a call and how the call should be processed. At this point, the call is completed to the designated VRU AB134.

In a step YB120, operator console AB108 requests required information from originating user AAI06A. This information can be information such as the number originating user AA106A wishes to call, the feature she wishes to access, calling card information, and any other like information. The information requested and the order in which it is requested can be customized as specified by subscriber AA114 and/or a user AA106 of customer AA110. In one embodiment, this customization is provided as a function of DEF records (described in the DEF Section of this document) and the call parameter BA308 data records retrieved during the call ID look-up. Originating user AA106A responds to this query by pressing the appropriate keys on the telephone keypad. This can be a selection from a menu, or entry of the card number.

In a step YB124, the enhanced services card information entered by originating user AA106A is validated. In one embodiment, this validation is performed by Validation System AG102. An internal validation may be performed to determine if external validation by Validation System AG102 is necessary.

If a magnetic card reader is provided at the location of originating user AA106A, originating user AA106A may not be required to enter her enhanced services card information as this can be read electronically and provided to automated VRU AB134.

In a step YB126, if a terminating (called) number is entered, this number is validated to determine that it is a valid number. In other words, it is validated to determine whether it contains the correct number of digits, the area code is valid, and other like parameters. Call processing system AB102 can also perform look-ups against information in the fraud detection and prevention system AG112 as discussed in the Fraud System Section of this document.

In a step YB202, if originating user AA106A enters a feature access code, this code is validated to determine whether it is a valid feature for that particular enhanced services card. Additionally, originating user AA106A may be prompted to enter a security code which can then be validated against the card number.

In one embodiment, the system performs look-ups to determine if enhanced features are available to the enhanced services card number that is being used, that the feature code is a valid access code, and which feature the code provides access to. In one embodiment, the database look-up for feature availability can be done at the time that the card number is entered as part of card number verification. Enhanced feature availability and access codes can be customized at the card level based on card numbers. Some of the features that can be provided include, but are not limited to, conference calling, voice mail, directory assistance, and information services. Again, this customization is a function of the DEF records and the call parameters BA308 retrieved during call ID look-up.

If any of the information entered by the caller is invalid (decision block YB203), automated VRU AB134 gives the caller a second chance to enter valid information. If the second attempt fails, the VRU informs NCP AB104 via operator response data AB126 of such a failed attempt. In this case, NCP AB104 can provide the call to a manual operator console for additional handling. In this case, the audio portion of the call is transferred back to matrix switch AB106 and then sent to the manual operator console AB132 based on information provided by NCP AB104.

This second attempt to enter valid information and the transfer to the manual operator console are options that are configurable on a per-user AA106 basis. The system can be set up so that any number of attempts can be permitted before the call is terminated. Additionally, it is not necessary that the call be sent to a manual operator console AB132 to request additional information from originating user AA106A. This could be performed at a certain level by automated VRU AB134. Also, call processing system AB102 could be set up so that the automated VRU AB134 plays or synthesizes a script asking the caller to call a customer service line, to hang up and try again, or whatever other additional instructions may be specified by customer AA110. If the information is validated as indicated by decision block YB203, in a step YB204, operator console AB108 informs NCP AB104 that the call can be completed. This information is provided via operator response data AB126.

In a step YB204, operator console AB108 informs NCP AB104 that the call can be completed. This information is provided in operator response data AB126.

In a step YB208, NCP AB104 determines the optimum routing to route the call to the terminating (called) number. This can be accomplished by data look-up as described above with reference to FIGS. 21 and 17. The look-up can be based on the originating number, terminating number, feature access, account, and access method. Once this is done, NCP AB104 sends a complete call request to matrix switch AB106. The complete call request contains all the information needed by matrix switch AB106 to generate call data required to route the call to the correct destination.

In a step YB212, matrix switch AB106 uses the information provided by NCP AB104 to complete the call. The call can be returned to the carrier network in the case of a customer AA110 that is a carrier, or a network of call processing system AB102 for completion.

At any point after call is completed to the destination number, originating user AA106A may press a designated key (for instance, the #) and re-originate the call. Re-origination takes the caller to the point where she entered a valid called number or feature access code. Thus, by re-originating, originating user AA106A may place another call without having to re-enter the card billing information. This is illustrated by a step YB216. The number of times a caller may re-originate a call is configurable.

12.3 Debit Card Calls

Call processing system AB102 can be used to provide subscribers with the option of making toll calls using debit cards. Call processing system AB102 can provide debit card calling to originating users AA106A who subscribe to a processing system AB102, and to customers AA110. Customers AA110 may in turn offer debit card calling to their subscribing users AA106. As discussed previously in this document, one feature of call processing system AB102 is that it can offer customer AA110 and user AA106 unique customizable services. A high level scenario describing the manner in which debit card calling can be provided by call processing system AB102 is now presented. FIG. 162, which comprises FIGS. 163, 164, 165, and 166, is an operational flow diagram illustrating a debit card calling scenario. Referring now to FIG. 163, in a step YC104, call processing system AB102 receives a call. In one embodiment, the call is made to a designated debit card 800 number. In this embodiment, call processing system AB102 knows that the call is a debit card call based on the 800 number. In an alternative embodiment, a 0, or 0+ call is placed. In this alternative, an operator console AB108 must intervene to process the debit card call.

In a step YC108, call data AA144 associated with the call is routed to NCP AB104. Call audio AA142 of the call is routed to matrix switch AB106.

In a step YC112, NCP AB104 receives call data AA144 for the call. NCP AB104 determines the type of call being placed and the call processing required based on call data AA144. In one embodiment, this is accomplished by NCP AB104 performing database look-ups using call data AA144 to search for data records. For example, CMP BA102 retrieves call parameters BA308 from a database served by DBS BA104 and based on the called number (the debit card 800#), call parameters indicate that a debit card call is being placed.

In a step YC116, NCP AB104 sends the routing information to matrix switch AB106. Because this is a debit card call, as determined by NCP AB104 in step YC112, the call routing information includes instructions from matrix switch AB106 regarding which operator console AB108 should receive call audio AA142 for the call. Thus, call audio AA142 can be routed to the proper operator console AB108. It should be noted that because this is a debit card call, the operator console AB108 to which the call is routed is preferably a VRU AB134. In response to this routing information, matrix switch AB106 routes the call to the designated operator console AB108. Because NCP AB104 is controlling the call data AB144, and the operator console AB108 only gets the call audio AB142 portion of the call from matrix switch AB106, operator console AB108 is treated as any other destination. Therefore, the specified operator console AB108 can be treated just like any other terminating point of matrix switch AB106. Traditionally, such treatment was limited only to other switches and special ports were required on the conventional matrix switch to interface to the operator consoles.

In a step YC120, NCP AB104 sends operator control data AB124 to the specified operator console AB108. Operator control data AB124 can include call ID information that indicates the type of call and the type of processing required to handle the call. Because call processing system AB102 is highly data driven, the type of call processing provided for a debit card call can be customized for a specific originating user AA106A or customer AA110. Changes to the way in which a particular call is processed can be accomplished simply by changing the data in the data records retrieved by NCP AB104 when determining the call processing requirements.

Operator control data AB124 tells the specified operator console AB108 that it is receiving a debit card call and how the call should be processed.

Because this is a debit card call, a VRU AB134 is preferred. It should be noted that users AA106A or customers AA110 may specify whether automated call handling is acceptable or whether they prefer that their calls are always handled by a human operator at a manual operator console AB132. In one embodiment, this is controlled by call parameters BA308 and can be easily be changed by changing the data found in data records retrieved for one or more originating users AA106A or customers AA110.

If the call requires a manual operator console, the operation continues in a step YC304 as illustrated in FIG. 165. On the other hand, if the call can be handled using an automated VRU AB134, the operation continues in a step YC204 as illustrated in FIG. 164. The manner in which the call is set up using an automated VRU AB134 is now described with reference to FIG. 164. Referring now to FIG. 164, in a step YC204, the specified VRU AB134 requests information from originating user AA106A. The request can be a request for the number that originating user AA106A wishes to call, and/or for the debit card number, or other information required to complete the call. The order in which VRU AB134 requests this call information can be customized for each carrier AA110 or for each individual user AA106A. The customization can be based on call parameters BA308 and/or the manner in which DEF records are implemented for each originating user AA106A or customer AA110. DEF records are completely described in the DEF Section of this document.

Debit card information (for example, debit card number, and/or security access code, etc) is sent by automated VRU AB134 to Validation System AG102 so that the information may be validated externally in one embodiment. This occurs in a step YC208. In alternative embodiments, validation of the debit card information is performed internal to the call processing system AB102.

In a step YC212, if a terminating (called) number is entered, that number is validated to verify that it is a valid number. In one embodiment, this is accomplished by using an internal validation system to determine whether it is a valid number. A validation check can include a check to see that the number contains the correct number of digits, that is made to a geographic area as allowed by the customer AA110, has a valid area code, and other like validation information.

In a step YC216, Fraud detection and prevention system AG112 can be used in one embodiment, to monitor the call for potential fraudulent uses. Such monitoring is fully described in the Fraud System Section of this document. Information provided to the Fraud detection and prevention system AG112 can include the ANI, the debit card number, the called number, and other call information.

In a step YC218, calling time is calculated based on rating information associated with the card. If the card is flat-rated, the remaining time is calculated against the remaining dollar balance on the card. If the card rates are based on call distance and/or time of day the system obtains a rate quote from Billing System AG102 as discussed above in the Billing System Section of this document, and calculates the remaining time. Debit card features can be customized for each carrier AA110 or for each individual user AA106A. The customization can be down to the card level. Debit card calling can be based on a flat rate or based on mileage and/or time of day in increments specified by subscriber AA114. The customization can be based on call parameters BA308 and/or the manner in which DEF records are implemented for each originating user AA106A or customer AA110. DEF records are completely described in the DEF Section of this document.

If all the information entered by originating user AA106A is valid (decision block YC220) the operation continues in a step YC404 (FIG. 166) in which the call completion commences. If, on the other hand, any or all of the information is found to be invalid, VRU AB134 may give the caller a "second chance" to enter the correct information. Or the user may be given a chance to replenish the debit card.

If it is still invalid, in a step YC222, automated VRU AB134 informs NCP AB104 that the call is invalid. In response, call audio AA142 is routed back to matrix switch AB106, and NCP AB104 instructs matrix switch AB106 to route call audio AA142 to a manual operator console AB132. This occurs in a step YC226. This is done so that human operator intervention can be provided. The steps taken from this point are described beginning in a step YC316 in FIG. 165. This is described in detail below with reference to handling of the call with a manual operator console AB132. In an alternative embodiment, the call is not routed to a manual operator console AB132 but is instead terminated by VRU AB134.

As discussed above with reference to step YC122 of FIG. 163, if manual operator handling is desired, the operation continues at a step YC304 in FIG. 165. Referring now to FIG. 165, the human operator requests information from the caller and enters the received information via a keyboard attached to the manual operator console AB132. Such information can include the debit card number, a terminating (called) number, and other like information that may be required before the call can be completed. If the caller wishes to replenish a debit card, this information can include a credit card number used to pay for replenishing the debit card.

In a step YC308, operator console AB132 performs validations, where required, on card numbers, called numbers, and other billing information, as described above with reference to steps YC202, YC212, and YC216. Manual operator console AB132 also computes the calling time allowed (as per step YC218). If the validated information checks out to be valid (decision block YC302) and there is enough time left on the debit card, the operation continues in a step YC404 (illustrated in FIG. 166) in which the call is completed. If, on the other hand, one of the validated parameters proves to be invalid, the operator informs originating user AA106A of the problem and provides options to solve the problem. This occurs in a step YC316. These options can include asking the originating user AA106A for a credit card number to replenish the debit card, or other alternative information. If alternative information is provided, manual operator console AB132 validates this alternative information in step YC308. This is illustrated with a feedback loop YC342. If no alternatives are provided, the call is terminated by MOC AB132 as illustrated in a step YC320.

If the call is terminated before it is completed, the operator console AB108 that terminates the call (VRU AB134 or MOC AB132) informs NCP AB104 that the call is terminated so that time and charges against the card are not accrued.

Whether a second chance is provided and whether the call is transferred to an manual operator console AB132 for additional assistance, are options that can be selected by the client. These options can be customized to the customer AA110, user AA106, or card level.

As discussed above, when all the information is validated, the operator console AB108 chosen to handle the call begins the process of call completion. This is illustrated in FIG. 166. Referring now to FIG. 166, in a step YC402, the operator console AB108 handling the call informs the caller of the calling time remaining on the call.

In a step YC404, operator console AB108 informs NCP AB104 that the call can be completed. In one embodiment, this information has operator response data AB126.

In a step YC408, NCP AB104 determines the optimum routing for the call. In one embodiment, the manner in which this is performed is described in this document with reference to FIGS. 17 and 21. In this embodiment, this is accomplished by doing a look-up using DBS BA104 to look-up the optimum routing of the call.

In step YC412, NCP AB104 instructs matrix switch AB106 to complete the call using the designated route. In this step, NCP AB104 sends switch control data AB122 to matrix switch AB106 to instruct matrix switch AB106 to complete the call.

In a step YC416, matrix switch AB106 routes the call to the terminating (called) number as instructed in step YC412.

In a step YC418, NCP AB104 monitors the call duration and provides warnings to the caller when the time remaining on the card is about to expire. The manner in which this is accomplished is fully discussed above in the Billing System Section of this document.

At any time, originating user AA106A (the caller) may press a designated key (for example, the # key) and reoriginate on call processing system AB102. Reorigination takes the caller to the step of entering a valid called number and placing another call without having to re-enter the card number. The number of times a caller may reoriginate is configurable and customizable to the user AA106, customer AA110 and card levels. The caller may be restricted from reoriginating when the remaining dollar amount on the card reaches zero.

12.4 800 Number Forwarding

An additional service provided by call processing system AB102 is the ability for a USER AA106 to program its 800 number to forward it (or re-route it) to another telephone number. This is useful for a salesperson, for example, who wants customers to reach her via her 800 number when she is travelling away from the office. The salesperson could access call processing system AB102, enter the 800 number and a security code, and then enter the number to which she wishes her 800 calls to be forwarded. This service is denominated "800 On The Go."

There are at least two scenarios that may occur in conjunction with 800 on the go. One scenario is that of the USER AA106 programming the number to which he wants his calls to forward ("800 On the Go" programming). A second scenario is the process followed by call processing system AB102 in completing a call placed to a forwarded 800 number. Note that this service is not limited to forwarding of 800 numbers, but could be implemented to forward other numbers as well.

A high level scenario describing the manner in which a subscriber AA114 re-routes an 800 number ("800 On The Go" programming) using call processing system AB102 is now presented. FIG. 167, which comprises FIGS. 168, 169, 170, and 171, is an operational flow diagram illustrating the manner in which a subscriber re-routes her 800 number. Referring now to FIG. 167, in a step YD104, call processing system AB102 receives an 800 re-routing call. In one embodiment, this call is placed to a specific 800 number designated for 800 number re-routing.

In a step YD108, call data AA144 associated with the call is routed to NCP AB104. Call audio AA142 of the call is routed to matrix switch AB106.

In a step YD112, NCP AB104 receives call data AA144 for the call. NCP AB104 determines the type of call being placed and the call processing required based on call data AA144. In one embodiment, this is accomplished by NCP AB104 performing database look-ups using call data AA144 to search for data records. In this embodiment, the data records indicate the type of processing and operator services required to handle the call. An example of this is where CMP BA102 retrieves call parameters BA308 from a database served DBS BA104 and is discussed in the Network Control Processor Section of this document. Also, NCP AB104 determines the optimal routing of the call. Because the terminating (called) number of this call is the designated 800 number for 800 number re-routing, NCP AB104 determines that the caller needs to interface to a VRU AB134 to perform the re-routing.

In a step YD116, NCP AB104 sends the routing information to matrix switch AB106. Because this is an 800 number re-routing call, as determined by NCP AB104 in step YD112, the call routing information includes instructions from matrix switch AB106 regarding which operator console AB108 should receive call audio AA142 for the call. Thus, call audio AA142 can be routed to the proper operator console AB108. It should be noted that because this is an 800 number re-routing call, the preferred operator console AB108 to which the call is routed is a VRU AB134. In response to this routing information, matrix switch AB106 routes the call to the designated operator console AB108. Because NCP AB104 is controlling the call data AB144, and the operator console AB108 only gets the call audio AB142 portion of the call from matrix switch AB106, operator console AB108 is treated as any other destination. Therefore, the specified operator console AB108 can be treated just like any other terminating point of matrix switch AB106. Traditionally, such treatment was limited only to other switches and special ports were required on the conventional matrix switch to interface to the operator consoles.

In a step YD120, NCP AB104 sends operator control data AB124 to the specified operator console AB108. Operator control data AB124 can include call ID information that indicates the call is an 800 number re-routing call, and the type of processing required to handle the call. Because call processing system AB102 is highly data driven, the type of call processing required for a call type can be customized for a specific originating user AA106A or customer AA110. Changes to the way in which a particular call is processed can be accomplished simply by changing the data in the data records retrieved by NCP AB104 when determining the call processing requirements.

Operator control data AB124 tells the specified operator console AB108 that it is receiving a call and how the call should be processed.

Even though the preferred handling is provided through a VRU AB134, the call can be handled by either a manual operator console AB132 or a VRU AB134. Users AA106A or customers AA110 may specify whether automated call handling is acceptable or whether they prefer that their calls are always handled by a human operator at a manual operator console AB132. In one embodiment, this is controlled by call parameters BA308 and can be easily be changed by changing the data found in data records retrieved for one or more originating users AA106A or customers AA110.

If the user AA106A or customer AA110 requested a human operator, the operation continues in a step YD304 as illustrated in FIG. 170. On the other hand, if the call can be handled using an automated VRU AB134, the operation continues in a step YD204 as illustrated in FIG. 169. The manner in which the call is set up using an automated VRU AB134 is now described with reference to FIG. 169.

Referring now to FIG. 169, in a step YD204, the specified VRU AB134 requests information from originating user AA106A. The request can be a request for the 800 number to be re-routed, a security code, and the number to which it should be routed. The user may be asked to confirm the re-route of the number by pressing a specified key (or key sequence) on the telephone keypad. The order in which VRU AB134 requests this call information can be customized for each carrier AA110 or for each individual user AA106A. The customization can be based on call parameters BA308 and/or the manner in which DEF records are implemented for each originating user AA106A or customer AA110. DEF records are completely described in the DEF Section of this document.

In a step YD208, the 800 number and the security code entered by the caller are sent to be validated. In one embodiment, this validation is performed using a translation database ZA106 (illustrated in FIG. 207). In alternative embodiments, validation can be performed internally in conjunction with callI look-up. Additional information entered by the caller is also validated in this step. An internal validation system determines if validation by Validation System AG102 is required. If such validation is required, it is performed as well.

In a step YD212, the terminating number to which the 800 number is to be re-routed is validated to verify that it is a valid number. In one embodiment, this is accomplished by using an internal validation system to determine whether it is a valid number. A validation check can include a check to see that the number contains the correct number of digits, that is made to a geographic area as allowed by the customer AA110, has a valid area code, and other like validation information.

In a step YD216, Fraud detection and prevention system AG112 can be used in one embodiment, to monitor the call for potential fraudulent uses. Such monitoring is fully described in the Fraud System Section of this document.

In a step YD218, the number to which the 800 number should route is replayed and the caller is requested to press a key (or key sequence) to accept the re-routing. If the change is accepted, a call processing database is updated with the new number.

If all the information entered by originating user AA106A is valid (decision block YD220) the operation continues in a step YD404 (FIG. 171) in which the call completion commences. If, on the other hand, any or all of the information is found to be invalid, in a step YD222, automated VRU AB134 informs NCP AB104 that the call is invalid and gives the caller a second chance to re-enter the information. The information is again validated as illustrated by feedback loop YD262. Alternatively, the call could be terminated when information is found to be invalid either before or after the second chance is provided. The number of chances, if any, provided to a caller is customizable on a per user AA106 or per customer AA110 basis.

If the caller declines to re-enter the information, or if the second chance is already exhausted, call audio AA142 is routed back to matrix switch AB106, and NCP AB104 instructs matrix switch AB106 to route call audio AA142 to a manual operator console AB132. This occurs in a step YD226. This is done so that human operator intervention can be provided. The steps taken from this point are described beginning in a step YD316 in FIG. 170. This is described in detail below with reference to handling of the call with a manual operator console AB132.

As discussed above with reference to step YD122 of FIG. 168, if manual operator handling is desired, the operation continues at a step YD304 in FIG. 170. Referring now to FIG. 170, the human operator requests information from a caller and enters the received information via a keyboard attached to the manual operator console AB132. The request can be a request for the 800 number to be re-routed, a security code, and the number to which it should be routed. The user may be asked to confirm the re-route of the number. The operator is prompted to make the request by prompts appearing on the operator screen. The order in which this call information is requested can be customized for each carrier AA110 or for each individual user AA106A. The customization can be based on call parameters BA308 and/or the manner in which DEF records are implemented for each originating user AA106A or customer AA110. DEF records are completely described in the DEF section of this document.

In a step YD308, operator console AB132 performs validations, where required, as described above with reference to steps YD208, YD212, and YD216. Operator console AB132 may also ask for confirmation of the number to which the 800 number is to be re-routed. If the validated information checks out to be valid (decision block YD312) the operation continues in a step YD404 (illustrated in FIG. 171) in which the call is completed. If, on the other hand, one of the validated parameters proves to be invalid, the operator informs originating user AA106A of the problem and provides options to solve the problem. This occurs in a step YD316. These options can include asking the originating user AA106A for a new security code, a new re-route number, or other alternative information. If alternative information is provided, manual operator console AB132 validates this alternative information in a step YD308. This is illustrated with a feedback loop YD342. If no alternatives are provided, or the caller declines to furnish the information, the call is terminated as illustrated in a step YD320.

When all information is entered and validated, the 800 number can be programmed to re-route. This is illustrated in FIG. 171. Referring now to FIG. 171, in a step YD404, operator console AB108 informs NCP AB104 that the 800 number is to be re-routed when called. In one embodiment, this information has operator response data AB126.

In a step YD408, NCP updates a master call processing database.

In step YD412, Distribution System HA100 (illustrated in FIG. 93) updates the affected Slave Databases HA110.

In a step YD416, the caller is informed that the re-routing is completed and all calls on that 800 number will be forwarded to the designated number when received. If the change is made using a VRU AB134, the information is provided by taped or synthesized voice. If made by a human operator at a MOC AB132, a script is read from the operator screen.

In a step YD418, the call is terminated.

12.5 Direct-Dial Long-Distance calling

A high level scenario describing the manner in which a direct-dial long-distance call is processed by call processing system AB102 is now presented. FIG. 172, is an operational flow diagram illustrating the placement of a direct-dial long-distance call. Referring now to FIG. 172, in a step YE104, call processing system AB102 receives a direct-dial long-distance call (for example a 1+ call). In a step YE108, call data AA144 associated with the call is routed to NCP AB104. Call audio AA142 of the call is routed to matrix switch AB106.

In a step YE112, NCP AB104 assigns a callhandle BA305 to identify the call. Callhandle BA305 is a unique number used to identify the call at each phase of processing within call processing system AB102. Callhandle BA305 is also used to identify the call for billing purposes.

In a step YE116, NCP AB104 determines the type of processing to be provided to the call. This is accomplished by determining the call parameters BA308 for the call.

In a step YE120, the call is validated to determine whether it should be completed. One parameter that may be validated for the call is the called number. The validation check can include a check to see that the number contains the correct number of digits, that is made to a geographic area as allowed by the customer AA110, has a valid area code, and other like validation information.

In a step YE124, if the call is valid, it is completed to the destination. This is accomplished as described above with reference to steps YA408 through YA416 in FIG. 171. If the call is invalid, it can either be terminated, or the audio AA142 routed to an operator console AB108 to inform the user AA106 that the call cannot be completed. The manner in which the call is routed to operator console AB108 is described above with reference to steps YA116 to YA122 in FIG. 155.

13.0 Operator Console Display

When a call is routed to a MOC AB132, information derived from operator control data AB124 is displayed on an operator display screen. An example implementation of an operator display screen is now described. FIG. 205 is a diagram illustrating an example implementation of an operator display screen. Referring now to FIG. 205, in one embodiment an operator display screen VA100 comprises five key areas. A script portion VA102 is the portion of the screen in which a script appears that is read by the operator when greeting or addressing the caller. An origination portion VA104 is a portion of the screen in which information about the origin of the call is displayed. A termination portion VA108 is a portion of the screen in which information about the termination (actual or desired) of the call is displayed. An information portion VA106 of the screen displays information about the call and the call type. Finally, a function key portion VA114 displays information about the functions performed when a particular function key is pressed.

An example of display screen VA100 with call information is now described. FIG. 206 is a diagram illustrating an example of display screen VA100 with call information displayed thereon. Referring now to FIG. 206, script portion VA102 displays the script to be read to the user AA106A. In this example the script "May I have the area code and number you are calling?" is displayed so it can be read by the operator. The script displayed is dependent upon the call type and at what stage the call is in call processing. As described in the DEF Section of this application, one method used to determine the script to be displayed (and therefore read) is by using processes TA102, TA106, and DEF records TA104.

The origination portion VA104 in this example indicates that the duration of the call up to the current time is 20 seconds. In one embodiment, the duration updates once per second. The local time at the origination point is 7:22:01. The time is also updated once per second in one embodiment. Also displayed on the origination portion VA104 is the origination user's name, area code and phone number, and city and state. If the originating user AA106A is a client of a customer, that information is displayed in the field designated "carrier."

The call information portion VA106 in this example includes a call type, a billing number, and a called number. In this case, the call type is a LinkUSA enhanced services card (ESC). Because in this example the user dialed the ESC number, no called number appears on the screen.

When a call is completed, the termination portion displays the terminating user's name, area code and phone number, and city and state. The termination portion VA108 also includes the call duration from the time the call was completed and the completion time.

14. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be noted that the block diagrams depicted throughout this document illustrate an example of how the functionality of the various systems can be implemented. Although physical or logical architectures may be inferred by the diagrams and the text describing these diagrams, it is important to note that this is done by way of example only. Numerous alternative physical and/or logical architectures can be chosen when implementing the systems described herein.

APPENDIX

| REF. | FIG. |
|---|---|
| AA1 | 1 |
| AD1 | 2 |
| AB1 | 3 |
| AB2 | 4 |
| AC1 | 5 |
| AE0 | 6 |
| AE1 | 7 |
| AF1 | 8 |
| AG1 | 9 |

APPENDIX-continued

| REF. | FIG. |
|---|---|
| BA1 | 10 |
| BA0 | 11 |
| BA2 | 12 |
| BC1 | 13 |
| BA3 | 14 |
| BD0 | 15 |
| BD1 | 16 |
| BD2 | 17 |
| BD3 | 18 |
| BE0 | 19 |
| BE1 | 20 |
| BE2 | 21 |
| BE3 | 22 |
| BF1 | 23 |
| CC1 | 24 |
| CA1 | 25 |
| CB1 | 26 |
| DD1 | 27 |
| DB1 | 28 |
| DG1 | 29 |
| DE0 | 30 |
| DE1 | 31 |
| DF1 | 32 |
| DM1 | 33 |
| DM0 | 34 |
| DM2 | 35 |
| DM3 | 36 |
| DH1 | 37 |
| DJ0 | 38 |
| DJ1 | 39 |
| DJ2 | 40 |
| DK0 | 41 |
| DK1 | 42 |
| DK2 | 43 |
| DK3 | 44 |
| DK4 | 45 |
| DL1 | 46 |
| DL2 | 47 |
| DL3 | 48 |
| DL4 | 49 |
| EE1 | 50 |
| EE3 | 51 |
| EE4 | 52 |
| EA1 | 53 |
| EB1 | 54 |
| EG1 | 55 |
| EG2 | 56 |
| EC0 | 57 |
| EC1 | 58 |
| EC2 | 59 |
| EH1 | 60 |
| EK1 | 61 |
| EL1 | 62 |
| EM1 | 63 |
| EP1 | 64 |
| ER1 | 65 |
| ET1 | 66 |
| ET2 | 67 |
| ET3 | 68 |
| FA2 | 69 |
| FA1 | 70 |
| FB0 | 71 |
| FB1 | 72 |
| FB2 | 73 |
| FC1 | 74 |
| FD1 | 75 |
| FD2 | 76 |
| FD3 | 77 |
| FF4/FF8 | 78A/78B |
| FF7 | 79 |
| FF1 | 80 |
| FF2 | 81 |
| FF3 | 82 |
| FF5 | 83 |
| FG1 | 84 |
| FG2 | 85 |

APPENDIX-continued

| REF. | FIG. |
|---|---|
| FG3 | 86 |
| GA1 | 87 |
| GA2 | 88 |
| GA3 | 89 |
| GA0 | 90 |
| GA4 | 91 |
| GA5 | 92 |
| HA1 | 93 |
| HA2 | 94 |
| HB1 | 95 |
| HB2 | 96 |
| HB3 | 97 |
| HC1 | 98 |
| HB4 | 99 |
| HB5 | 100 |
| JA1 | 101 |
| JA2 | 102 |
| JB1 | 103 |
| LA1 | 104 |
| LA2 | 105 |
| LA3 | 106 |
| LA4 | 107 |
| LD1 | 108 |
| LD2 | 109 |
| LE2 | 110 |
| LD3 | 111 |
| LL1 | 112 |
| KA1 | 113 |
| KA2 | 114 |
| KA4 | 115 |
| KA5 | 116 |
| KA6 | 117 |
| KB1 | 118 |
| KB0 | 119 |
| KB2 | 120 |
| KB4 | 121 |
| RA1 | 122 |
| RA0 | 123 |
| RA2 | 124 |
| RA3 | 125 |
| RB1 | 126 |
| RB2 | 127 |
| RC1 | 128 |
| RL0 | 129 |
| RC2 | 130 |
| RC3 | 131 |
| SA1 | 132 |
| SA2 | 133 |
| SA3 | 134 |
| SB1 | 135 |
| SB2 | 136 |
| SB4 | 137 |
| SB3 | 138 |
| SB0 | 139 |
| SB4 | 140 |
| SB7 | 141 |
| SB5 | 142 |
| SB6 | 143 |
| SC1 | 144 |
| SC2 | 145 |
| SD1 | 146 |
| SD2 | 147 |
| SF1 | 148 |
| SF2 | 149 |
| TA1 | 150 |
| TA2 | 151 |
| TB1 | 152 |
| TB2 | 153 |
| YA0 | 154 |
| YA1 | 155 |
| YA2 | 156 |
| YA3 | 157 |
| YA4 | 158 |
| YB0 | 159 |
| YB1 | 160 |
| YB2 | 161 |
| YC0 | 162 |

APPENDIX-continued

| REF. | FIG. |
|---|---|
| YC1 | 163 |
| YC2 | 164 |
| YC3 | 165 |
| YC4 | 166 |
| YD0 | 167 |
| YD1 | 168 |
| YD2 | 169 |
| YD3 | 170 |
| YD4 | 171 |
| YE1 | 172 |
| PB1 | 173 |
| PC1 | 174 |
| PA1 | 175 |
| PF1 | 176 |
| PD1 | 177 |
| PE1 | 178 |
| PO4 | 179 |
| PP1 | 180 |
| PP2 | 181 |
| PP3 | 182 |
| PP4 | 183 |
| PQ0 | 184 |
| PQ1 | 185 |
| PR1 | 186 |
| PR2 | 187 |
| PR3 | 188 |
| PR4 | 189 |
| PR5 | 190 |
| PS1 | 191 |
| PS2 | 192 |
| PZ1 | 193 |
| PZ2 | 194 |
| PZ3 | 195 |
| PG1 | 196 |
| PH1 | 197 |
| PI1 | 198 |
| PJ1 | 199 |
| PK1 | 200 |
| PL1 | 201 |
| PM1 | 202 |
| PN1 | 203 |
| KB3 | 204 |
| VA1 | 205 |
| VA1 | 206 |
| ZA1 | 207 |

What is claimed is:

1. A system for detecting fraudulent or attempted fraudulent use of a telephone network, the system comprising:

means for creating a usage record for a call, said usage record including call information pertaining to said call, wherein said usage record is created for a terminating number associated with said call;

means for updating said usage record if a new call is directed to said terminating number; and means for comparing said call information in said usage record to one or more thresholds to determine whether said call information indicates a possible fraudulent usage.

2. The system of claim 1, wherein said means for creating creates a usage record for a completed call.

3. The system of claim 1, wherein said means for creating creates a usage record for a failed call.

4. A method of detecting fraudulent or attempted fraudulent use of a telephone network, the method comprising the steps of:

(1) creating a usage record for a call, said usage record including call information pertaining to said call, wherein said usage record is created for a terminating number associated with said call;

(2) updating said usage record if a new call is directed to said terminating number; and (3) comparing said call information in said usage record to one or more thresholds to determine whether said call information indicates a possible fraudulent usage.

5. The method of claim 4, wherein said step (1) comprises the step of creating a usage record for a completed call.

6. The method of claim 4, wherein said step (1) comprises the step of creating a usage record for a failed call.

7. A fraud system that detects fraudulent or attempted fraudulent use of a telephone network, the system comprising:

means for receiving call information pertaining to a call that has been completed to a destination external to the fraud system;

means for creating a usage record for a completed call to reflect said call information, wherein said usage record is created for an identifying number associated with said completed call; and means for comparing said call information in said usage record to one or more thresholds stored in a threshold file to determine whether said call information indicates a possible fraudulent usage;

wherein said call information is compared to said one or more thresholds as soon as said new call is completed to permit a real-time response to said possible fraudulent usage to be initiated prior to termination of said new call.

8. The system of claim 7, further comprising means for receiving a start of call message from a billing server to indicate that said call has been completed.

9. The system of claim 7, further comprising means for receiving cost information from a call rating system.

10. The system of claim 7, further comprising means for receiving questionable use information from a validation system.

11. The system of claim 7, further comprising:

a billing number usage record file module that creates usage records for completed calls based on said identifying number;

a billed number usage threshold file module that contains parameters for completed calls to be used by the system for determining fraudulent uses;

a short billing information record file module that receives truncated billing information record data from said billing server;

a billing number usage alarms file module that stores alarm information from previous fraudulent uses; and a callhandle file module that stores call data.

12. The system of claim 7, wherein said identifying number is a billing number.

13. The system of claim 7, further comprising means for communicating with a plurality of fraud consoles that monitor and verify possible fraudulent uses.

14. The system of claim 7, further comprising means for updating said billed number usage data if a new call having said identifying number is completed to reflect call information of said new call.

15. A method using a fraud system to detect fraudulent or attempted fraudulent use of a telephone network, the method comprising the steps of:

receiving call information pertaining to a call that has been completed to a destination external to the fraud system;

creating a usage record for a completed call to reflect said call information, wherein said usage record is created for an identifying number associated with said completed call; and comparing said call information in said usage record to one or more thresholds stored in a threshold file to determine whether said call information indicates a possible fraudulent usage;

wherein said call information is compared to said one or more thresholds as soon as said new call is completed to permit a real-time response to said possible fraudulent usage to be initiated prior to termination of said new call.

16. The method of claim 15, further comprising the step of generating an alarm signal if said call information indicates a possible fraudulent usage in said comparing step.

17. The method of claim 15, further comprising the step of updating said usage record if a new call having said identifying number is completed to reflect call information of said new call.

18. The method of claim 15, wherein said comparing step comprises the steps of:

checking said usage record for an originating number; and determining whether said originating number was previously identified as a number from which or to which fraud was occurring.

19. The method of claim 15, wherein said comparing step comprises the steps of:

checking said usage record for an originating number; and identifying whether said originating number is an international number.

20. The method of claim 15, wherein said comparing step comprises the steps of:

checking said usage record for a terminating number; and determining whether said terminating number was previously identified as a number from which or to which fraud was occurring.

21. The method of claim 15, wherein said comparing step comprises the steps of:

checking said usage record for a terminating number; and identifying whether said terminating number is an international number.

22. The method of claim 15, wherein said usage record is created for a billing number associated with said call.

23. The method of claim 22, wherein said comparing step comprises the steps of:

retrieving a usage threshold from said threshold file to determine a maximum number of completed calls permitted to occur within a given period of time for said billing number;

checking said usage record for said billing number to determine an actual number of calls completed within said given period of time; and comparing said actual number to said threshold to determine whether a fraudulent use is occurring.

24. The method of claim 22, wherein said comparing step comprises the steps of:

retrieving a simultaneous calls threshold from said threshold file to determine a maximum number of calls permitted to occur simultaneously for said billing number;

checking said usage record for said identifying number to determine an actual number of calls occurring simultaneously for said billing number; and comparing said actual number to said threshold to determine whether a fraudulent use is occurring.

25. The method of claim 22, wherein said comparing step comprises the steps of:

retrieving an anomalous calls threshold from said threshold file to determine a maximum number of calls permitted to occur for said billing number from different originating locations;

checking said usage record for said billing number to determine an actual number of calls originating from different locations; and comparing said actual number to said threshold to determine whether a fraudulent use is occurring.

26. The method of claim 22, wherein said comparing step comprises the steps of:

retrieving a reorigination threshold from said threshold file to determine a maximum number of reoriginations permitted to occur for said billing number;

checking said usage record for said billing number to determine an actual number of calls reoriginated for said billing number; and comparing said actual number to said threshold to determine whether a fraudulent use is occurring.

27. The method of claim 22, wherein said comparing step comprises the steps of:

retrieving a simultaneous use threshold from said threshold file to determine a maximum number of simultaneous calls permitted to occur for said billing number;

checking said usage record for said billing number to determine an actual number of simultaneous calls for said billing number; and comparing said actual number to said threshold to determine whether a fraudulent use is occurring.

28. A fraud system that detects fraudulent or attempted fraudulent use of a telephone network, the system comprising:

means for receiving call information pertaining to failed call, said failed call intended for a destination external to the fraud system;

means for creating a usage record for said failed call to reflect said call information, wherein said usage record is created for an identifying number associated with said failed call; and means for comparing said call information in said usage record to one or more thresholds stored in a threshold file to determine whether said call information indicates a possible fraudulent usage.

29. The system of claim 28, further comprising means for receiving a failed call attempt message from at least one of a manual operator console and a voice response unit indicating a failed call attempt.

30. The system of claim 28, further comprising:

a failed billing number usage record file module that creates usage records for failed call attempts based on said identifying number;

a failed billed number usage threshold file module that contains parameters for failed call attempts to be used by the system for determining fraudulent uses;

a short failed billing number file module that receives truncated failed billing number record data from said plurality of operator consoles; and a failed billing number alarm file module that stores alarm information from previous fraudulent uses.

31. The system of claim 28, wherein said identifying number is an originating number.

32. The system of claim 28, wherein said identifying number is a terminating number.

33. The system of claim 28, further comprising means for communicating with a plurality of fraud consoles that monitor and verify possible fraudulent uses.

34. The system of claim 28, further comprising means for updating said failed billed number usage data if another failed call having said identifying number is attempted to reflect call information of said another failed call.

35. A method using a fraud system to detect fraudulent or attempted fraudulent use of a telephone network, the method comprising the steps of:

receiving call information pertaining to a failed call, said failed call intended for a destination external to the fraud system;

creating a usage record for said failed call to reflect said call information, wherein said usage record is created for an identifying number associated with said failed call; and comparing said call information in said usage record to one or more thresholds stored in a threshold file to determine whether said call information indicates a possible fraudulent usage.

36. The method of claim 35, further comprising the step of generating an alarm signal if said call information indicates a possible fraudulent usage in said comparing step.

37. The method of claim 35, further comprising the step of updating said usage record if another failed call having said identifying number is attempted to reflect call information of said another failed call.

38. The method of claim 35, wherein said usage record is created for an originating number associated with said call.

39. The method of claim 38, wherein said comparing step comprises the step of determining whether said originating number was previously identified as a number from which or to which fraud was occurring.

40. The method of claim 38, wherein said comparing step comprises the steps of:

retrieving a usage threshold from said threshold file to determine a maximum number of failed calls attempted within a given period of time for said originating number;

checking said usage record for said originating number to determine an actual number of failed calls attempted within said given period of time; and comparing said actual number to said threshold to determine whether a fraudulent use is occurring.

41. The method of claim 35, wherein said usage record is created for a terminating number associated with said call.

42. The method of claim 41, wherein said comparing step comprises the step of determining whether said terminating number was previously identified as a number from which or to which fraud was occurring.

43. The method of claim 41, wherein said comparing step comprises the steps of:

retrieving a usage threshold from said threshold file to determine a maximum number of failed calls attempted within a given period of time for said terminating number;

checking said usage record for said terminating number to determine an actual number of failed calls attempted within said given period of time; and comparing said actual number to said threshold to determine whether a fraudulent use is occurring.

* * * * *